US012384808B2

(12) United States Patent
Kanouni et al.

(10) Patent No.: US 12,384,808 B2
(45) Date of Patent: Aug. 12, 2025

(54) MODULATORS OF TNF-α ACTIVITY

(71) Applicant: Forward Therapeutics, Inc., Palm Beach Gardens, FL (US)

(72) Inventors: Toufike Kanouni, Palm Beach Gardens, FL (US); Chris De Savi, Stow, MA (US)

(73) Assignee: FORWARD THERAPEUTICS, INC., Palm Beach Gardens, FL (US)

( * ) Notice: Subject to any disclaimer, the term of this patent is extended or adjusted under 35 U.S.C. 154(b) by 0 days.

(21) Appl. No.: 18/516,560

(22) Filed: Nov. 21, 2023

(65) Prior Publication Data

US 2024/0247014 A1 Jul. 25, 2024

Related U.S. Application Data

(60) Provisional application No. 63/518,062, filed on Aug. 7, 2023, provisional application No. 63/384,919, filed on Nov. 23, 2022.

(51) Int. Cl.

| | |
|---|---|
| ***C07F 9/6561*** | (2006.01) |
| ***C07B 59/00*** | (2006.01) |
| ***C07F 9/6568*** | (2006.01) |
| ***C07F 9/6571*** | (2006.01) |

(52) U.S. Cl.

CPC .......... *C07F 9/6561* (2013.01); *C07B 59/002* (2013.01); *C07F 9/65685* (2013.01); *C07F 9/657163* (2013.01); *C07B 2200/05* (2013.01)

(58) Field of Classification Search

CPC ..................................................... C07F 9/6561

See application file for complete search history.

(56) References Cited

U.S. PATENT DOCUMENTS

| | | | |
|---|---|---|---|
| 5,846,514 | A | 12/1998 | Foster et al. |
| 6,334,997 | B1 | 1/2002 | Foster et al. |

FOREIGN PATENT DOCUMENTS

| | | | | |
|---|---|---|---|---|
| AU | 2016239270 B2 | 3/2020 | |
| WO | WO-2016050975 A1 * | 4/2016 | ......... A61K 31/4184 |
| WO | WO-2017167994 A1 | 10/2017 | |
| WO | WO-2017167995 A1 | 10/2017 | |
| WO | WO-2018167176 A1 | 9/2018 | |
| WO | WO-2018197503 A1 | 11/2018 | |
| WO | WO-2020084008 A1 | 4/2020 | |
| WO | WO-2024112796 A1 | 5/2024 | |
| WO | WO-2024129763 A1 | 6/2024 | |
| WO | WO-2024148191 A1 | 7/2024 | |
| WO | WO-2024223740 A1 | 10/2024 | |
| WO | WO-2024251282 A1 | 12/2024 | |
| WO | WO-2025038927 A1 | 2/2025 | |

OTHER PUBLICATIONS

Finkbeiner "Phosphine Oxides from a Medicinal Chemist's Perspective: Physicochemical and in Vitro Parameters Relevant for Drug Discovery" J. Med. Chem. 2020, 63, 7081-7107.*

Berge et al. Pharmaceutical Salts. Journal of Pharmaceutical Sciences 66(1):1-19 (Jan. 1977).

Braga et al., Overview of TNF Inhibitors for Treating Inflammatory Bowel Disease. US Pharm. 46(5):34-37 (2021).

Dean. Recent Advances in the Synthesis and Applications of Radiolabeled Compounds for Drug Discovery and Development. In: Curr. Pharm. Des., 6(10):110 (2000) (Preface only).

Dietrich et al., Development of Orally Efficacious Allosteric Inhibitors of TNFα via Fragment-Based Drug Design. J Med Chem 64:417-429 (2021).

Dömling et al. TNF-α: The shape of small molecules to come? Drug Discov Today 27(1):3-7 (2022).

Evans. Synthesis of radiolabeled compounds. J Radioanal Chem 64(1-2):9-32 (1981).

Fresegna et al., Re-Examining the Role of TNF in MS Pathogenesis and Therapy. Cells 9:2290 (2020).

He et al., Small-molecule inhibition of TNF-alpha. Science 310:1022-1025 (2015).

Kabalka et al. The Synthesis of Radiolabeled Compounds via Organometallic Intermediates. Tetrahedron 45(21):6601-6621 (1989).

O'Connell et al., Small molecules that inhibit TNF signalling by stabilising an asymmetric form of the trimer. Nature Commun 10:5795 (2019).

Orti-Casañ et al., Targeting TNFR2 as a Novel Therapeutic Strategy for Alzheimer's Disease. Front Neurosci. 13:49 (2019).

Shulman et al., Neuroinflammation and Tinnitus. Curr Top Behav Neurosci. 51:161-174 (2021).

Wang et al., Neuroinflammation mediates noise-induced synaptic imbalance and tinnitus in rodent models. PLoS Biol. 17(6):e3000307 (2019).

Xiao et al., Biologic-like In Vivo Efficacy with Small Molecule Inhibitors of TNFα Identified Using Scaffold Hopping and Structure-Based Drug Design Approaches. J Med Chem 63(23):15050-15071 (2020).

Martin et al. Synthesis and Evaluation of a Phosphonate Analogue of the Soluble Guanylate Cyclase Activator YC-1. Bioorg Med Chem Lett 17(17):4938-4941 (2007).

PCT/US2023/080758 International Search Report and Written Opinion dated Mar. 6, 2024.

* cited by examiner

*Primary Examiner* — David K O'Dell

(74) *Attorney, Agent, or Firm* — WILSON SONSINI GOODRICH & ROSATI

(57) ABSTRACT

Provided herein are inhibitors of TNFα, pharmaceutical compositions comprising the inhibitory compounds, and methods for using the TNFα inhibitory compounds for the treatment of diseases or disorders.

22 Claims, No Drawings

MODULATORS OF TNF-α ACTIVITY

CROSS-REFERENCE

This application claims the benefit of U.S. Provisional Application No. 63/518,062, filed Aug. 7, 2023, and U.S. Provisional Application No. 63/384,919, filed Nov. 23, 2022, both of which are incorporated herein by reference in their entirety.

BACKGROUND

Tumor necrosis factor alpha (TNFα) is an inflammatory cytokine that is responsible for a wide range of signaling events within cells. Aberrant TNFα signaling gives rise to inflammatory conditions and is thought to be an important component of inflammatory disease, such as rheumatoid arthritis.

BRIEF SUMMARY OF THE INVENTION

Provided herein are inhibitors of TNFα, pharmaceutical compositions comprising said inhibitory compounds, and methods for using said inhibitory compounds for the treatment of inflammatory or autoimmune disease or disorder.

One embodiment provides a compound of Formula (I), or pharmaceutically acceptable salt, solvate, or N-oxide thereof:

(I)

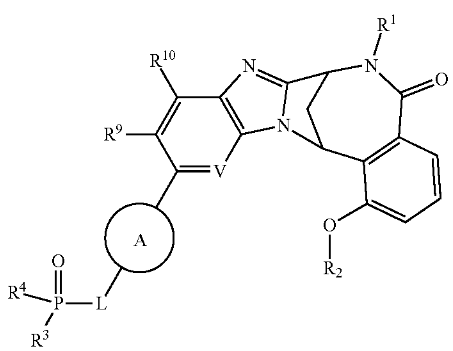

wherein,

Ring A is selected from

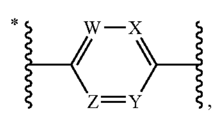

wherein the * denotes point of attachment to L, or an optionally substituted heteroarylene selected from pyrazolene, imidazoline, oxazolene, or thiazolene;

V is N or C—$R^{11}$;

W is N or C—$R^5$;

X is N or C—$R^6$;

Y is N or C—$R^7$;

Z is N or C—$R^8$;

L is a bond, —NH—, —$(CH_2)$n-, —$C(R^{12})(R^{13})$—, —$O(CH_2)$n-*, or —$NH(CH_2)$n-*, wherein the * denotes point of attachment to phosphorous;

n is 1, 2, or 3;

$R^1$ is selected from hydrogen, optionally substituted C1-C6 alkyl, optionally substituted C3-C6 cycloalkyl, or optionally substituted C4-C7 cycloalkylalkyl;

$R^2$ is hydrogen, or optionally substituted C1-C3 alkyl;

$R^3$ is hydroxy, optionally substituted C1-C3 alkoxy, or optionally substituted C1-C6 alkyl;

$R^4$ is hydroxy, optionally substituted C1-C3 alkoxy, or optionally substituted C1-C6 alkyl; or $R^3$ and $R^4$ join to form optionally substituted phosphorus-containing 3- to 8-membered ring;

each $R^5$, $R^6$, $R^7$, and $R^8$ is independently selected from hydrogen, halogen, —CN, —$NH_2$, optionally substituted C1-C3 alkyl, optionally substituted C1-C3 alkoxy, or —NH(optionally substituted C1-C3 alkyl);

$R^9$ is selected from hydrogen, halogen, or optionally substituted C1-C6 alkyl;

$R^{10}$ is selected from hydrogen or halogen;

$R^{11}$ is selected from hydrogen, halogen, or optionally substituted C1-C6 alkyl; and $R^{12}$ and $R^{13}$ are independently selected from hydrogen, —OH, F, and $CH_3$.

One embodiment provides a pharmaceutical composition comprising a compound of Formula (I), or pharmaceutically acceptable salt, solvate, or N-oxide thereof, and at least one pharmaceutically acceptable excipient.

One embodiment provides a method of treating a disease or disorder in a patient in need thereof comprising administering to the patient a compound of Formula (I), or pharmaceutically acceptable salt, solvate, or N-oxide thereof. Another embodiment provides the method wherein the disease or disorder is rheumatoid arthritis.

INCORPORATION BY REFERENCE

All publications, patents, and patent applications mentioned in this specification are herein incorporated by reference for the specific purposes identified herein.

DETAILED DESCRIPTION OF THE INVENTION

As used herein and in the appended claims, the singular forms "a," "and," and "the" include plural referents unless the context clearly dictates otherwise. Thus, for example, reference to "an agent" includes a plurality of such agents, and reference to "the cell" includes reference to one or more cells (or to a plurality of cells) and equivalents thereof known to those skilled in the art, and so forth. When ranges are used herein for physical properties, such as molecular weight, or chemical properties, such as chemical formulae, all combinations and subcombinations of ranges and specific embodiments therein are intended to be included. The term "about" when referring to a number or a numerical range means that the number or numerical range referred to is an approximation within experimental variability (or within statistical experimental error), and thus the number or numerical range, in some instances, will vary between 1% and 15% of the stated number or numerical range. The term "comprising" (and related terms such as "comprise" or "comprises" or "having" or "including") is not intended to exclude that in other certain embodiments, for example, an embodiment of any composition of matter, composition, method, or process, or the like, described herein, "consist of" or "consist essentially of" the described features.

Definitions

As used in the specification and appended claims, unless specified to the contrary, the following terms have the meaning indicated below.

"Amino" refers to the —$NH_2$ radical.

"Cyano" refers to the —CN radical.

"Nitro" refers to the —$NO_2$ radical.

"Oxa" refers to the —O— radical.

"Oxo" refers to the =O radical.

"Thioxo" refers to the =S radical.

"Imino" refers to the =N—H radical.

"Oximo" refers to the =N—OH radical.

"Hydrazino" refers to the =N—$NH_2$ radical.

"Alkyl" refers to a straight or branched hydrocarbon chain radical consisting solely of carbon and hydrogen atoms, containing no unsaturation, having from one to fifteen carbon atoms (e.g., $C_1$-$C_{15}$ alkyl). In certain embodiments, an alkyl comprises one to thirteen carbon atoms (e.g., $C_1$-$C_{13}$ alkyl). In certain embodiments, an alkyl comprises one to eight carbon atoms (e.g., $C_1$-$C_8$ alkyl). In other embodiments, an alkyl comprises one to five carbon atoms (e.g., $C_1$-$C_5$ alkyl). In other embodiments, an alkyl comprises one to four carbon atoms (e.g., $C_1$-$C_4$ alkyl). In other embodiments, an alkyl comprises one to three carbon atoms (e.g., $C_1$-$C_3$ alkyl). In other embodiments, an alkyl comprises one to two carbon atoms (e.g., $C_1$-$C_2$ alkyl). In other embodiments, an alkyl comprises one carbon atom (e.g., $C_1$ alkyl). In other embodiments, an alkyl comprises five to fifteen carbon atoms (e.g., $C_5$-$C_{15}$ alkyl). In other embodiments, an alkyl comprises five to eight carbon atoms (e.g., $C_5$-$C_8$ alkyl). In other embodiments, an alkyl comprises two to five carbon atoms (e.g., $C_2$-$C_5$ alkyl). In other embodiments, an alkyl comprises three to five carbon atoms (e.g., $C_3$-$C_5$ alkyl). In other embodiments, the alkyl group is selected from methyl, ethyl, 1-propyl (n-propyl), 1-methylethyl (iso-propyl), 1-butyl (n-butyl), 1-methylpropyl (sec-butyl), 2-methylpropyl (iso-butyl), 1,1-dimethylethyl (tert-butyl), 1-pentyl (n-pentyl). The alkyl is attached to the rest of the molecule by a single bond. Unless stated otherwise specifically in the specification, an alkyl group is optionally substituted by one or more of the following substituents: halo, cyano, nitro, oxo, thioxo, imino, oximo, trimethylsilanyl, —$OR^a$, —$SR^a$, —OC(O)—$R^a$, —$N(R^a)_2$, —C(O)$R^a$, —C(O)$OR^a$, —C(O)$N(R^a)_2$, —$N(R^a)C(O)OR^a$, —OC(O)—$N(R^a)_2$, —$N(R^a)C(O)R^a$, —$N(R^a)S(O)_tR^a$ (where t is 1 or 2), —$S(O)_tOR^a$ (where t is 1 or 2), —$S(O)_tR^a$ (where t is 1 or 2) and —$S(O)_tN(R^a)_2$ (where t is 1 or 2) where each $R^a$ is independently hydrogen, alkyl (optionally substituted with halogen, hydroxy, methoxy, or trifluoromethyl), fluoroalkyl, carbocyclyl (optionally substituted with halogen, hydroxy, methoxy, or trifluoromethyl), carbocyclylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl). In certain embodiments, an optionally substituted alkyl is a haloalkyl. In other embodiments, an optionally substituted alkyl is a fluoroalkyl. In other embodiments, an optionally substituted alkyl is a —$CF_3$ group.

"Alkoxy" refers to a radical bonded through an oxygen atom of the formula —O-alkyl, where alkyl is an alkyl chain as defined above.

"Alkenyl" refers to a straight or branched hydrocarbon chain radical group consisting solely of carbon and hydrogen atoms, containing at least one carbon-carbon double bond, and having from two to twelve carbon atoms. In certain embodiments, an alkenyl comprises two to eight carbon atoms. In other embodiments, an alkenyl comprises two to four carbon atoms. The alkenyl is attached to the rest of the molecule by a single bond, for example, ethenyl (i.e., vinyl), prop-1-enyl (i.e., allyl), but-1-enyl, pent-1-enyl, penta-1,4-dienyl, and the like. Unless stated otherwise specifically in the specification, an alkenyl group is optionally substituted by one or more of the following substituents: halo, cyano, nitro, oxo, thioxo, imino, oximo, trimethylsilanyl, —$OR^a$, —$SR^a$, —OC(O)—$R^a$, —$N(R^a)_2$, —C(O)$R^a$, —C(O)$OR^a$, —C(O)$N(R^a)_2$, —$N(R^a)C(O)OR^a$, —OC(O)—$N(R^a)_2$, —$N(R^a)C(O)R^a$, —$N(R^a)S(O)_tR^a$ (where t is 1 or 2), —$S(O)_tOR^a$ (where t is 1 or 2), —$S(O)_tR^a$ (where t is 1 or 2) and —$S(O)_tN(R^a)_2$ (where t is 1 or 2) where each $R^a$ is independently hydrogen, alkyl (optionally substituted with halogen, hydroxy, methoxy, or trifluoromethyl), fluoroalkyl, carbocyclyl (optionally substituted with halogen, hydroxy, methoxy, or trifluoromethyl), carbocyclylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl).

"Alkynyl" refers to a straight or branched hydrocarbon chain radical group consisting solely of carbon and hydrogen atoms, containing at least one carbon-carbon triple bond, having from two to twelve carbon atoms. In certain embodiments, an alkynyl comprises two to eight carbon atoms. In other embodiments, an alkynyl comprises two to six carbon atoms. In other embodiments, an alkynyl comprises two to four carbon atoms. The alkynyl is attached to the rest of the molecule by a single bond, for example, ethynyl, propynyl, butynyl, pentynyl, hexynyl, and the like. Unless stated otherwise specifically in the specification, an alkynyl group is optionally substituted by one or more of the following substituents: halo, cyano, nitro, oxo, thioxo, imino, oximo, trimethylsilanyl, —$OR^a$, —$SR^a$, —OC(O)—$R^a$, —$N(R^a)_2$, —C(O)$R^a$, —C(O)$OR^a$, —C(O)$N(R^a)_2$, —$N(R^a)C(O)OR^a$, —OC(O)—$N(R^a)_2$, —$N(R^a)C(O)R^a$, —$N(R^a)S(O)_tR^a$ (where t is 1 or 2), —$S(O)_tR^a$ (where t is 1 or 2), —$S(O)_tR^a$ (where t is 1 or 2) and —$S(O)_tN(R^a)_2$ (where t is 1 or 2) where each $R^a$ is independently hydrogen, alkyl (optionally substituted with halogen, hydroxy, methoxy, or trifluoromethyl), fluoroalkyl, carbocyclyl (optionally substituted with halogen, hydroxy, methoxy, or trifluoromethyl), carbocyclylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl).

"Alkylene" or "alkylene chain" refers to a straight or branched divalent hydrocarbon chain linking the rest of the molecule to a radical group, consisting solely of carbon and hydrogen, containing no unsaturation, and having from one to twelve carbon atoms, for example, methylene, ethylene, propylene, n-butylene, and the like. The alkylene chain is attached to the rest of the molecule through a single bond and to the radical group through a single bond. The points of attachment of the alkylene chain to the rest of the molecule and to the radical group are through one carbon in the alkylene chain or through any two carbons within the chain. In certain embodiments, an alkylene comprises one to eight carbon atoms (e.g., $C_1$-$C_8$ alkylene). In other embodiments, an alkylene comprises one to five carbon atoms (e.g., $C_1$-$C_5$ alkylene). In other embodiments, an alkylene comprises one to four carbon atoms (e.g., $C_1$-$C_4$ alkylene). In other embodiments, an alkylene comprises one to three carbon atoms (e.g., $C_1$-$C_3$ alkylene). In other embodiments, an alkylene comprises one to two carbon atoms (e.g., $C_1$-$C_2$ alkylene). In other embodiments, an alkylene comprises one carbon atom (e.g., $C_1$ alkylene). In other embodiments, an alkylene comprises five to eight carbon atoms (e.g., $C_5$-$C_8$ alkylene). In other embodiments, an alkylene comprises two to five carbon atoms (e.g., $C_2$-$C_5$ alkylene). In other embodiments, an alkylene comprises three to five carbon atoms (e.g., $C_3$-$C_5$ alkylene). Unless stated otherwise specifically in the specification, an alkylene chain is optionally substituted by one or more of the following substituents: halo, cyano, nitro, oxo, thioxo, imino, oximo, trimethylsilanyl, —OR$^a$, —SR$^a$, —OC(O)—R$^a$, —N(R$^a$)$_2$, —C(O)R$^a$, —C(O)OR$^a$, —C(O)N(R$^a$)$_2$, —N(R$^a$)C(O)OR$^a$, —OC(O)—N(R$^a$)$_2$, —N(R$^a$)C(O)R$^a$, —N(R$^a$)S(O)$_t$R$^a$ (where t is 1 or 2), —S(O)$_t$OR$^a$ (where t is 1 or 2), —S(O)$_t$R$^a$ (where t is 1 or 2) and —S(O)$_t$N(R$^a$)$_2$ (where t is 1 or 2) where each R$^a$ is independently hydrogen, alkyl (optionally substituted with halogen, hydroxy, methoxy, or trifluoromethyl), fluoroalkyl, carbocyclyl (optionally substituted with halogen, hydroxy, methoxy, or trifluoromethyl), carbocyclylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl).

"Alkenylene" or "alkenylene chain" refers to a straight or branched divalent hydrocarbon chain linking the rest of the molecule to a radical group, consisting solely of carbon and hydrogen, containing at least one carbon-carbon double bond, and having from two to twelve carbon atoms. The alkenylene chain is attached to the rest of the molecule through a single bond and to the radical group through a single bond. In certain embodiments, an alkenylene comprises two to eight carbon atoms (e.g., $C_2$-$C_8$ alkenylene). In other embodiments, an alkenylene comprises two to five carbon atoms (e.g., $C_2$-$C_5$ alkenylene). In other embodiments, an alkenylene comprises two to four carbon atoms (e.g., $C_2$-$C_4$ alkenylene). In other embodiments, an alkenylene comprises two to three carbon atoms (e.g., $C_2$-$C_3$ alkenylene). In other embodiments, an alkenylene comprises two carbon atoms (e.g., $C_2$ alkenylene). In other embodiments, an alkenylene comprises five to eight carbon atoms (e.g., $C_5$-$C_8$ alkenylene). In other embodiments, an alkenylene comprises three to five carbon atoms (e.g., $C_3$-$C_5$ alkenylene). Unless stated otherwise specifically in the specification, an alkenylene chain is optionally substituted by one or more of the following substituents: halo, cyano, nitro, oxo, thioxo, imino, oximo, trimethylsilanyl, —OR$^a$, —SR$^a$, —OC(O)—R$^a$, —N(R$^a$)$_2$, —C(O)R$^a$, —C(O)OR$^a$, —C(O)N(R$^a$)$_2$, —N(R$^a$)C(O)OR$^a$, —OC(O)—N(R$^a$)$_2$, —N(R$^a$)C(O)R$^a$, —N(R$^a$)S(O)$_t$R$^a$ (where t is 1 or 2), —S(O)$_t$OR$^a$ (where t is 1 or 2), —S(O)$_t$R$^a$ (where t is 1 or 2) and —S(O)$_t$N(R$^a$)$_2$ (where t is 1 or 2) where each R$^a$ is independently hydrogen, alkyl (optionally substituted with halogen, hydroxy, methoxy, or trifluoromethyl), fluoroalkyl, carbocyclyl (optionally substituted with halogen, hydroxy, methoxy, or trifluoromethyl), carbocyclylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl).

"Alkynylene" or "alkynylene chain" refers to a straight or branched divalent hydrocarbon chain linking the rest of the molecule to a radical group, consisting solely of carbon and hydrogen, containing at least one carbon-carbon triple bond, and having from two to twelve carbon atoms. The alkynylene chain is attached to the rest of the molecule through a single bond and to the radical group through a single bond. In certain embodiments, an alkynylene comprises two to eight carbon atoms (e.g., $C_2$-$C_8$ alkynylene). In other embodiments, an alkynylene comprises two to five carbon atoms (e.g., $C_2$-$C_5$ alkynylene). In other embodiments, an alkynylene comprises two to four carbon atoms (e.g., $C_2$-$C_4$ alkynylene). In other embodiments, an alkynylene comprises two to three carbon atoms (e.g., $C_2$-$C_3$ alkynylene). In other embodiments, an alkynylene comprises two carbon atoms (e.g., $C_2$ alkynylene). In other embodiments, an alkynylene comprises five to eight carbon atoms (e.g., $C_5$-$C_8$alkynylene). In other embodiments, an alkynylene comprises three to five carbon atoms (e.g., $C_3$-$C_5$ alkynylene). Unless stated otherwise specifically in the specification, an alkynylene chain is optionally substituted by one or more of the following substituents: halo, cyano, nitro, oxo, thioxo, imino, oximo, trimethylsilanyl, —OR$^a$, —SR, —OC(O)—R$^a$, —N(R$^a$)$_2$, —C(O)R$^a$, —C(O)OR$^a$, —C(O)N(R$^a$)$_2$, —N(R$^a$)C(O)OR$^a$, —OC(O)—N(R$^a$)$_2$, —N(R$^a$)C(O)R$^a$, —N(R$^a$)S(O)$_t$R$^a$ (where t is 1 or 2), —S(O)$_t$R$^a$ (where t is 1 or 2), —S(O)$_t$R$^a$ (where t is 1 or 2) and —S(O)$_t$N(R$^a$)$_2$ (where t is 1 or 2) where each R$^a$ is independently hydrogen, alkyl (optionally substituted with halogen, hydroxy, methoxy, or trifluoromethyl), fluoroalkyl, carbocyclyl (optionally substituted with halogen, hydroxy, methoxy, or trifluoromethyl), carbocyclylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl).

"Aryl" refers to a radical derived from an aromatic monocyclic or multicyclic hydrocarbon ring system by removing a hydrogen atom from a ring carbon atom. The aromatic monocyclic or multicyclic hydrocarbon ring system contains only hydrogen and carbon from five to eighteen carbon atoms, where at least one of the rings in the ring system is fully unsaturated, i.e., it contains a cyclic, delocalized (4n+2) π-electron system in accordance with the Hückel theory. The ring system from which aryl groups are derived include, but are not limited to, groups such as benzene, fluorene, indane, indene, tetralin and naphthalene. Unless stated otherwise specifically in the specification, the term "aryl" or the prefix "ar-" (such as in "aralkyl") is meant to include aryl radicals optionally substituted by one or more substituents independently selected from optionally substituted alkyl, optionally substituted alkenyl, optionally substituted alkynyl, halo, cyano, nitro, —$R^b$—$OR^a$, —$R^b$—OC(O)—$R^a$, —$R^b$—OC(O)—$OR^a$, —$R^b$—OC(O)—$N(R^a)_2$, —$R^b$—$N(R^a)_2$, —$R^b$—C(O)$R^a$, —$R^b$—C(O)O$R^a$, —$R^b$—C(O)$N(R^a)_2$, —$R^b$—O—$R^c$—C(O)$N(R^a)_2$, —$R^b$—N($R^a$)C(O)O$R^a$, —$R^b$—N($R^a$)C(O)$R^a$, —$R^b$—N($R^a$)$S(O)_tR^a$ (where t is 1 or 2), —$R^b$—$S(O)_tR^a$ (where t is 1 or 2), —$R^b$—$S(O)_tOR^a$ (where t is 1 or 2) and —$R^b$—$S(O)_tN(R^a)_2$ (where t is 1 or 2), where each $R^a$ is independently hydrogen, alkyl (optionally substituted with halogen, hydroxy, methoxy, or trifluoromethyl), fluoroalkyl, cycloalkyl (optionally substituted with halogen, hydroxy, methoxy, or trifluoromethyl), cycloalkylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl), each $R^b$ is independently a direct bond or a straight or branched alkylene or alkenylene chain, and $R^c$ is a straight or branched alkylene or alkenylene chain, and where each of the $R^a$, $R^b$, or $R^c$ substituents is unsubstituted unless otherwise indicated.

"Aralkyl" refers to a radical of the formula —$R^c$-aryl where $R^c$ is an alkylene chain as defined above, for example, methylene, ethylene, and the like. The alkylene chain part of the aralkyl radical is optionally substituted as described above for an alkylene chain. The aryl part of the aralkyl radical is optionally substituted as described above for an aryl group.

"Aralkenyl" refers to a radical of the formula —$R^d$-aryl where $R^d$ is an alkenylene chain as defined above. The aryl part of the aralkenyl radical is optionally substituted as described above for an aryl group. The alkenylene chain part of the aralkenyl radical is optionally substituted as defined above for an alkenylene group.

"Aralkynyl" refers to a radical of the formula —$R^e$-aryl, where $R^e$ is an alkynylene chain as defined above. The aryl part of the aralkynyl radical is optionally substituted as described above for an aryl group. The alkynylene chain part of the aralkynyl radical is optionally substituted as defined above for an alkynylene chain.

"Aralkoxy" refers to a radical bonded through an oxygen atom of the formula —O—$R^c$-aryl where $R^c$ is an alkylene chain as defined above, for example, methylene, ethylene, and the like. The alkylene chain part of the aralkyl radical is optionally substituted as described above for an alkylene chain. The aryl part of the aralkyl radical is optionally substituted as described above for an aryl group.

"Carbocyclyl" refers to a stable non-aromatic monocyclic or polycyclic hydrocarbon radical consisting solely of carbon and hydrogen atoms, which includes fused or bridged ring systems, having from three to fifteen carbon atoms. In certain embodiments, a carbocyclyl comprises three to ten carbon atoms. In other embodiments, a carbocyclyl comprises five to seven carbon atoms. The carbocyclyl is attached to the rest of the molecule by a single bond. Carbocyclyl is saturated (i.e., containing single C—C bonds only) or unsaturated (i.e., containing one or more double bonds or triple bonds). A fully saturated carbocyclyl radical is also referred to as "cycloalkyl." Examples of monocyclic cycloalkyls include, e.g., cyclopropyl, cyclobutyl, cyclopentyl, cyclohexyl, cycloheptyl, and cyclooctyl. An unsaturated carbocyclyl is also referred to as "cycloalkenyl." Examples of monocyclic cycloalkenyls include, e.g., cyclopentenyl, cyclohexenyl, cycloheptenyl, and cyclooctenyl. Polycyclic carbocyclyl radicals include, for example, adamantyl, norbornyl (i.e., bicyclo[2.2.1]heptanyl), norbornenyl, decalinyl, 7,7-dimethyl-bicyclo[2.2.1]heptanyl, and the like. Unless otherwise stated specifically in the specification, the term "carbocyclyl" is meant to include carbocyclyl radicals that are optionally substituted by one or more substituents independently selected from optionally substituted alkyl, optionally substituted alkenyl, optionally substituted alkynyl, halo, oxo, thioxo, cyano, nitro, —$R^b$—$OR^a$, —$R^b$—OC(O)—$R^a$, —$R^b$—OC(O)—$OR^a$, —$R^b$—OC(O)—$N(R^a)_2$, —$R^b$—$N(R^a)_2$, —$R^b$—C(O)$R^a$, —$R^b$—C(O)O$R^a$, —$R^b$—C(O)$N(R^a)_2$, —$R^b$—O—$R^c$—C(O)$N(R^a)_2$, —$R^b$—N($R^a$)C(O)O$R^a$, —$R^b$—N($R^a$)C(O)$R^a$, —$R^b$—N($R^a$)$S(O)_tR^a$ (where t is 1 or 2), —$R^b$—$S(O)_tR^a$ (where t is 1 or 2), —$R^b$—$S(O)_tOR^a$ (where t is 1 or 2) and —$R^b$—$S(O)_tN(R^a)_2$ (where t is 1 or 2), where each $R^a$ is independently hydrogen, alkyl (optionally substituted with halogen, hydroxy, methoxy, or trifluoromethyl), fluoroalkyl, cycloalkyl (optionally substituted with halogen, hydroxy, methoxy, or trifluoromethyl), cycloalkylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl), each $R^b$ is independently a direct bond or a straight or branched alkylene or alkenylene chain, and $R^c$ is a straight or branched alkylene or alkenylene chain, and where each of the $R^a$, $R^b$, or $R^c$ substituents is unsubstituted unless otherwise indicated.

"Carbocyclylalkyl" refers to a radical of the formula —$R^c$-carbocyclyl where $R^c$ is an alkylene chain as defined above. The alkylene chain and the carbocyclyl radical is optionally substituted as defined above.

"Carbocyclylalkynyl" refers to a radical of the formula —$R^c$-carbocyclyl where $R^c$ is an alkynylene chain as defined above. The alkynylene chain and the carbocyclyl radical is optionally substituted as defined above.

"Carbocyclylalkoxy" refers to a radical bonded through an oxygen atom of the formula —O—$R^c$-carbocyclyl where $R^c$ is an alkylene chain as defined above. The alkylene chain and the carbocyclyl radical is optionally substituted as defined above.

"Halo" or "halogen" refers to bromo, chloro, fluoro or iodo substituents.

"Fluoroalkyl" refers to an alkyl radical, as defined above, that is substituted by one or more fluoro radicals, as defined above, for example, trifluoromethyl, difluoromethyl, fluoromethyl, 2,2,2-trifluoroethyl, 1-fluoromethyl-2-fluoroethyl, and the like. In some embodiments, the alkyl part of the fluoroalkyl radical is optionally substituted as defined above for an alkyl group.

"Heterocyclyl" refers to a stable 3- to 18-membered non-aromatic ring radical that comprises two to twelve carbon atoms and from one to six heteroatoms selected from nitrogen, oxygen and sulfur. Unless stated otherwise specifically in the specification, the heterocyclyl radical is a monocyclic, bicyclic, tricyclic, or tetracyclic ring system, which optionally includes fused or bridged ring systems. The heteroatoms in the heterocyclyl radical are optionally oxidized. One or more nitrogen atoms, if present, are optionally quaternized. The heterocyclyl radical is partially or fully saturated. The heterocyclyl is attached to the rest of the molecule through any atom of the ring(s). Examples of such heterocyclyl radicals include, but are not limited to, dioxolanyl, thienyl[1,3]dithianyl, decahydroisoquinolyl, imidazolinyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, oxazolidinyl, piperidinyl, piperazinyl, 4-piperidonyl, pyrrolidinyl, pyrazolidinyl, quinuclidinyl, thiazolidinyl, tetrahydrofuryl, trithianyl, tetrahydropyranyl, thiomorpholinyl, thiamorpholinyl, 1-oxo-thiomorpholinyl, and 1,1-dioxo-thiomorpholinyl. Unless stated otherwise specifically in the specification, the term "heterocyclyl" is meant to include heterocyclyl radicals as defined above that are optionally substituted by one or more substituents selected from optionally substituted alkyl, optionally substituted alkenyl, optionally substituted alkynyl, halo, fluoroalkyl, oxo, thioxo, cyano, nitro, $—R^b—OR^a$, $—R^b—OC(O)—R^a$, $—R^b—OC(O)—OR^a$, $—R^b—OC(O)—N(R^a)_2$, $—R^b—N(R^a)_2$, $—R^b—C(O)R^a$, $—R^b—C(O)OR^a$, $—R^b—C(O)N(R^a)_2$, $—R^b—O—R^c—C(O)N(R^a)_2$, $—R^b—N(R^a)C(O)OR^a$, $—R^b—N(R^a)C(O)R^a$, $—R^b—N(R^a)S(O)_tR^a$ (where t is 1 or 2), $—R^b—S(O)_tR^a$ (where t is 1 or 2), $—R^b—S(O)_tOR^a$ (where t is 1 or 2) and $—R^b—S(O)_tN(R^a)_2$ (where t is 1 or 2), where each $R^a$ is independently hydrogen, alkyl (optionally substituted with halogen, hydroxy, methoxy, or trifluoromethyl), fluoroalkyl, cycloalkyl (optionally substituted with halogen, hydroxy, methoxy, or trifluoromethyl), cycloalkylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl), each $R^b$ is independently a direct bond or a straight or branched alkylene or alkenylene chain, and $R^c$ is a straight or branched alkylene or alkenylene chain, and where each of the $R^a$, $R^b$, or $R^c$ substituents is unsubstituted unless otherwise indicated.

"N-heterocyclyl" or "N-attached heterocyclyl" refers to a heterocyclyl radical as defined above containing at least one nitrogen and where the point of attachment of the heterocyclyl radical to the rest of the molecule is through a nitrogen atom in the heterocyclyl radical. An N-heterocyclyl radical is optionally substituted as described above for heterocyclyl radicals. Examples of such N-heterocyclyl radicals include, but are not limited to, 1-morpholinyl, 1-piperidinyl, 1-piperazinyl, 1-pyrrolidinyl, pyrazolidinyl, and imidazolidinyl.

"C-heterocyclyl" or "C-attached heterocyclyl" refers to a heterocyclyl radical as defined above containing at least one heteroatom and where the point of attachment of the heterocyclyl radical to the rest of the molecule is through a carbon atom in the heterocyclyl radical. A C-heterocyclyl radical is optionally substituted as described above for heterocyclyl radicals. Examples of such C-heterocyclyl radicals include, but are not limited to, 2-morpholinyl, 2- or 3- or 4-piperidinyl, 2-piperazinyl, 2- or 3-pyrrolidinyl, and the like.

"Heterocyclylalkyl" refers to a radical of the formula $—R^c$-heterocyclyl where $R^c$ is an alkylene chain as defined above. If the heterocyclyl is a nitrogen-containing heterocyclyl, the heterocyclyl is optionally attached to the alkyl radical at the nitrogen atom. The alkylene chain of the heterocyclylalkyl radical is optionally substituted as defined above for an alkylene chain. The heterocyclyl part of the heterocyclylalkyl radical is optionally substituted as defined above for a heterocyclyl group.

"Heterocyclylalkoxy" refers to a radical bonded through an oxygen atom of the formula $—O—R^c$-heterocyclyl where $R^c$ is an alkylene chain as defined above. If the heterocyclyl is a nitrogen-containing heterocyclyl, the heterocyclyl is optionally attached to the alkyl radical at the nitrogen atom. The alkylene chain of the heterocyclylalkoxy radical is optionally substituted as defined above for an alkylene chain. The heterocyclyl part of the heterocyclylalkoxy radical is optionally substituted as defined above for a heterocyclyl group.

"Heteroaryl" refers to a radical derived from a 3- to 18-membered aromatic ring radical that comprises two to seventeen carbon atoms and from one to six heteroatoms selected from nitrogen, oxygen, and sulfur. As used herein, the heteroaryl radical is a monocyclic, bicyclic, tricyclic, or tetracyclic ring system, wherein at least one of the rings in the ring system is fully unsaturated, i.e., it contains a cyclic, delocalized (4n+2) π-electron system in accordance with the Hückel theory. Heteroaryl includes fused or bridged ring systems. The heteroatom(s) in the heteroaryl radical is optionally oxidized. One or more nitrogen atoms, if present, are optionally quaternized. The heteroaryl is attached to the rest of the molecule through any atom of the ring(s). Examples of heteroaryls include, but are not limited to, azepinyl, acridinyl, benzimidazolyl, benzindolyl, 1,3-benzodioxolyl, benzofuranyl, benzooxazolyl, benzo[d]thiazolyl, benzothiadiazolyl, benzo[b][1,4]dioxepinyl, benzo[b][1,4]oxazinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzothieno[3,2-d]pyrimidinyl, benzotriazolyl, benzo[4,6]imidazo[1,2-a]pyridinyl, carbazolyl, cinnolinyl, cyclopenta[d]pyrimidinyl, 6,7-dihydro-5H-cyclopenta[4,5]thieno[2,3-d]pyrimidinyl, 5,6-dihydrobenzo[h]quinazolinyl, 5,6-dihydrobenzo[h]cinnolinyl, 6,7-dihydro-5H-benzo[6,7]cyclohepta[1,2-c]pyridazinyl, dibenzofuranyl, dibenzothiophenyl, furanyl, furanonyl, furo[3,2-c]pyridinyl, 5,6,7,8,9,10-hexahydrocycloocta[d]pyrimidinyl, 5,6,7,8,9,10-hexahydrocycloocta[d]pyridazinyl, 5,6,7,8,9,10-hexahydrocycloocta[d]pyridinyl, isothiazolyl, imidazolyl, indazolyl, indolyl, indazolyl, isoindolyl, indolinyl, isoindolinyl, isoquinolyl, indolizinyl, isoxazolyl, 5,8- methano-5,6,7,8-tetrahydroquinazolinyl, naphthyridinyl, 1,6-naphthyridinonyl, oxadiazolyl, 2-oxoazepinyl, oxazolyl, oxiranyl, 5,6,6a,7,8,9,10,10a-octahydrobenzo[h]quinazolinyl, 1-phenyl-1H-pyrrolyl, phenazinyl, phenothiazinyl, phenoxazinyl, phthalazinyl, pteridinyl, purinyl, pyrrolyl, pyrazolyl, pyrazolo[3,4-d]pyrimidinyl, pyridinyl, pyrido[3,2-d]pyrimidinyl, pyrido[3,4-d]pyrimidinyl, pyrazinyl, pyrimidinyl, pyridazinyl, pyrrolyl, quinazolinyl, quinoxalinyl, quinolinyl, isoquinolinyl, tetrahydroquinolinyl, 5,6,7,8-tetrahydroquinazolinyl, 5,6,7,8-tetrahydrobenzo[4,5]thieno[2,3-d]pyrimidinyl, 6,7,8,9-tetrahydro-5H-cyclohepta[4,5]thieno[2,3-d]pyrimidinyl, 5,6,7,8-tetrahydropyrido[4,5-c]pyridazinyl, thiazolyl, thiadiazolyl, triazolyl, tetrazolyl, triazinyl, thieno[2,3-d]pyrimidinyl, thieno[3,2-d]pyrimidinyl, thieno[2,3-c]pyridinyl, and thiophenyl (i.e. thienyl). Unless stated otherwise specifically in the specification, the term "heteroaryl" is meant to include heteroaryl radicals as defined above which are optionally substituted by one or more substituents selected from optionally substituted alkyl, optionally substituted cycloalkylalkyl, optionally substituted heterocyclylalkyl, optionally substituted alkenyl, optionally substituted alkynyl, halo, optionally substituted fluoroalkyl, optionally substituted haloalkenyl, optionally substituted haloalkynyl, oxo, thioxo, cyano, nitro, —$R^b$—$OR^a$, —$R^b$—OC(O)—$R^a$, —$R^b$—OC(O)—$OR^a$, —$R^b$—OC(O)—$N(R^a)_2$, —$R^b$—$N(R^a)_2$, —$R^b$—C(O)$R^a$, —$R^b$—C(O)O$R^a$, —$R^b$—C(O)$N(R^a)_2$, —$R^b$—O—$R^c$—C(O)$N(R^a)_2$, —$R^b$—$N(R^a)$C(O)O$R^a$, —$R^b$—$N(R^a)$C(O)$R^a$, —$R^b$—$N(R^a)$$S(O)_t$N$R^a$ (where t is 1 or 2), —$R^b$—$S(O)_t$$R^a$ (where t is 1 or 2), —$R^b$—$S(O)_t$O$R^a$ (where t is 1 or 2) and —$R^b$—$S(O)_t$$N(R^a)_2$ (where t is 1 or 2), where each $R^a$ is independently hydrogen, alkyl (optionally substituted with halogen, hydroxy, methoxy, or trifluoromethyl), fluoroalkyl, cycloalkyl (optionally substituted with halogen, hydroxy, methoxy, or trifluoromethyl), cycloalkylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl), each $R^b$ is independently a direct bond or a straight or branched alkylene or alkenylene chain, and $R^c$ is a straight or branched alkylene or alkenylene chain, and where each of the $R^a$, $R^b$, or $R^c$ substituents is unsubstituted unless otherwise indicated.

"N-heteroaryl" refers to a heteroaryl radical as defined above containing at least one nitrogen and where the point of attachment of the heteroaryl radical to the rest of the molecule is through a nitrogen atom in the heteroaryl radical. An N-heteroaryl radical is optionally substituted as described above for heteroaryl radicals.

"C-heteroaryl" refers to a heteroaryl radical as defined above and where the point of attachment of the heteroaryl radical to the rest of the molecule is through a carbon atom in the heteroaryl radical. A (C-heteroaryl radical is optionally substituted as described above for heteroaryl radicals.

"Heteroarylalkyl" refers to a radical of the formula —$R^c$-heteroaryl, where $R^c$ is an alkylene chain as defined above. If the heteroaryl is a nitrogen-containing heteroaryl, the heteroaryl is optionally attached to the alkyl radical at the nitrogen atom. The alkylene chain of the heteroarylalkyl radical is optionally substituted as defined above for an alkylene chain. The heteroaryl part of the heteroarylalkyl radical is optionally substituted as defined above for a heteroaryl group.

"Heteroarylalkoxy" refers to a radical bonded through an oxygen atom of the formula —O—$R^c$-heteroaryl, where $R^c$ is an alkylene chain as defined above. If the heteroaryl is a nitrogen-containing heteroaryl, the heteroaryl is optionally attached to the alkyl radical at the nitrogen atom. The alkylene chain of the heteroarylalkoxy radical is optionally substituted as defined above for an alkylene chain. The heteroaryl part of the heteroarylalkoxy radical is optionally substituted as defined above for a heteroaryl group.

The compounds disclosed herein, in some embodiments, contain one or more asymmetric centers and thus give rise to enantiomers, diastereomers, and other stereoisomeric forms that are defined, in terms of absolute stereochemistry, as (R)— or (S)—. Unless stated otherwise, it is intended that all stereoisomeric forms of the compounds disclosed herein are contemplated by this disclosure. When the compounds described herein contain alkene double bonds, and unless specified otherwise, it is intended that this disclosure includes both E and Z geometric isomers (e.g., cis or trans.) Likewise, all possible isomers, as well as their racemic and optically pure forms, and all tautomeric forms are also intended to be included. The term "geometric isomer" refers to E or Z geometric isomers (e.g., cis or trans) of an alkene double bond. The term "positional isomer" refers to structural isomers around a central ring, such as ortho-, meta-, and para-isomers around a benzene ring.

As used herein, "carboxylic acid bioisostere" refers to a functional group or moiety that exhibits similar physical, biological and/or chemical properties as a carboxylic acid moiety. Examples of carboxylic acid bioisosteres include, but are not limited to,

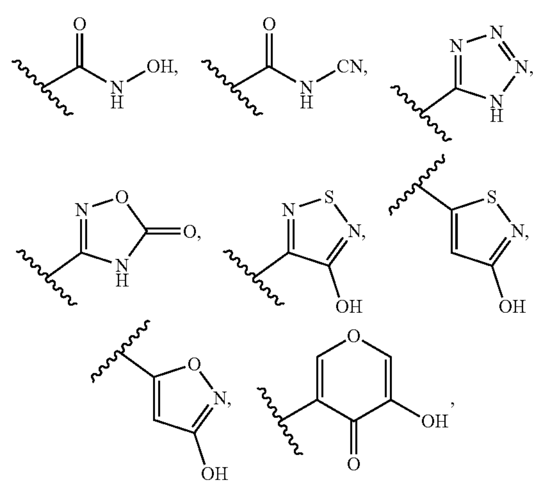

and the like.

A "tautomer" refers to a molecule wherein a proton shift from one atom of a molecule to another atom of the same molecule is possible. The compounds presented herein, in certain embodiments, exist as tautomers. In circumstances where tautomerization is possible, a chemical equilibrium of the tautomers will exist. The exact ratio of the tautomers depends on several factors, including physical state, temperature, solvent, and pH. Some examples of tautomeric equilibrium include:

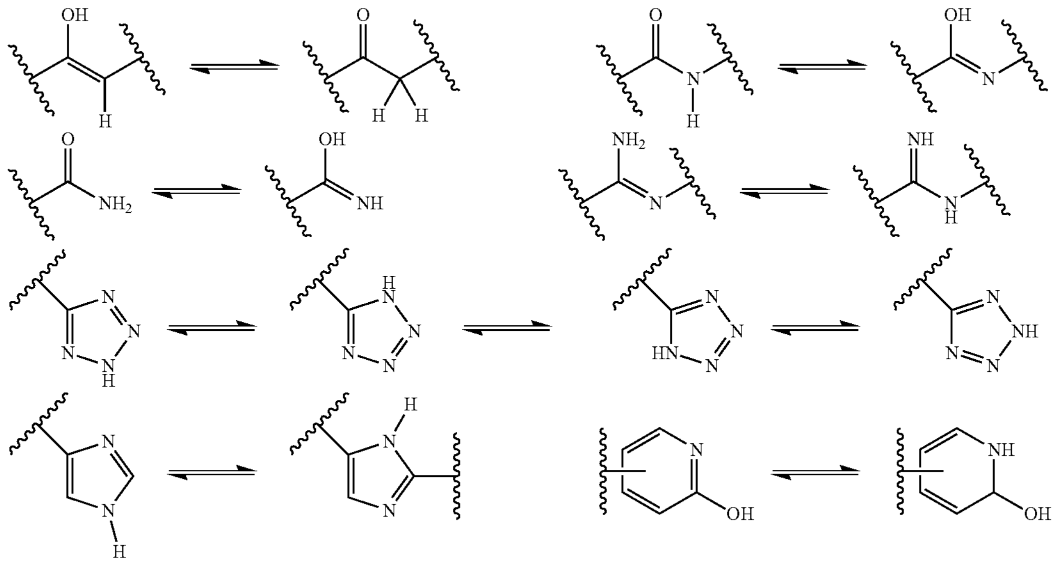

The compounds disclosed herein, in some embodiments, are used in different enriched isotopic forms, e.g., enriched in the content of $^{2}H$, $^{3}H$, $^{11}C$, $^{13}C$ and/or $^{14}C$. In one particular embodiment, the compound is deuterated in at least one position. Such deuterated forms can be made by the procedure described in U.S. Pat. Nos. 5,846,514 and 6,334, 997. As described in U.S. Pat. Nos. 5,846,514 and 6,334, 997, deuteration can improve the metabolic stability and or efficacy, thus increasing the duration of action of drugs.

Unless otherwise stated, structures depicted herein are intended to include compounds which differ only in the presence of one or more isotopically enriched atoms. For example, compounds having the present structures except for the replacement of a hydrogen by a deuterium or tritium, or the replacement of a carbon by $^{13}C$- or $^{14}C$-enriched carbon are within the scope of the present disclosure.

The compounds of the present disclosure optionally contain unnatural proportions of atomic isotopes at one or more atoms that constitute such compounds. For example, the compounds may be labeled with isotopes, such as for example, deuterium ($^{2}H$), tritium ($^{3}H$), iodine-125 ($^{121}I$) or carbon-14 ($^{14}C$). Isotopic substitution with $^{2}H$, $^{11}C$, $^{13}C$, $^{14}C$, $^{15}C$, $^{12}N$, $^{13}N$, $^{15}N$, $^{16}N$, $^{16}O$, $^{17}O$, $^{14}F$, $^{15}F$, $^{16}F$, $^{17}F$, $^{18}F$, $^{33}S$, $^{34}S$, $^{35}S$, $^{36}S$, $^{35}Cl$, $^{37}Cl$, $^{79}Br$, $^{81}Br$, $^{125}I$ are all contemplated. In some embodiments, isotopic substitution with $^{18}F$ is contemplated. All isotopic variations of the compounds of the present invention, whether radioactive or not, are encompassed within the scope of the present invention.

In certain embodiments, the compounds disclosed herein have some or all of the $^{1}H$ atoms replaced with $^{2}H$ atoms. The methods of synthesis for deuterium-containing compounds are known in the art and include, by way of non-limiting example only, the following synthetic methods.

Deuterium substituted compounds are synthesized using various methods such as described in: Dean, Dennis C.; Editor. Recent Advances in the Synthesis and Applications of Radiolabeled Compounds for Drug Discovery and Development. [Curr., Pharm. Des., 2000; 6(10)] 2000, 110 pp; George W.; Varma, Rajender S. The Synthesis of Radiolabeled Compounds via Organometallic Intermediates, Tetrahedron, 1989, 45(21), 6601-21; and Evans, E. Anthony. Synthesis of radiolabeled compounds, J. Radioanal. Chem., 1981, 64(1-2), 9-32.

Deuterated starting materials are readily available and are subjected to the synthetic methods described herein to provide for the synthesis of deuterium-containing compounds. Large numbers of deuterium-containing reagents and building blocks are available commercially from chemical vendors, such as Aldrich Chemical Co.

Deuterium-transfer reagents suitable for use in nucleophilic substitution reactions, such as iodomethane-$d_3$ ($CD_3I$), are readily available and may be employed to transfer a deuterium-substituted carbon atom under nucleophilic substitution reaction conditions to the reaction substrate. The use of $CD_3I$ is illustrated, by way of example only, in the reaction schemes below.

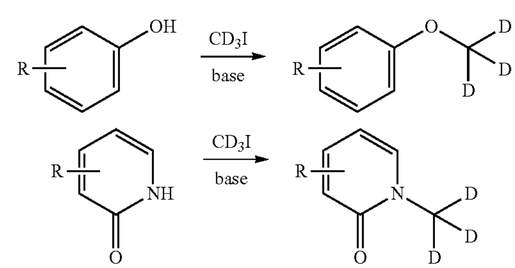

Deuterium-transfer reagents, such as lithium aluminum deuteride ($LiAlD_4$), are employed to transfer deuterium under reducing conditions to the reaction substrate. The use of $LiAlD_4$ is illustrated, by way of example only, in the reaction schemes below.

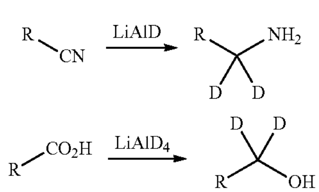

-continued

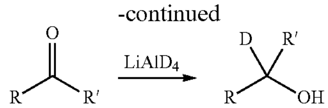

Deuterium gas and palladium catalyst are employed to reduce unsaturated carbon-carbon linkages and to perform a reductive substitution of aryl carbon-halogen bonds as illustrated, by way of example only, in the reaction schemes below.

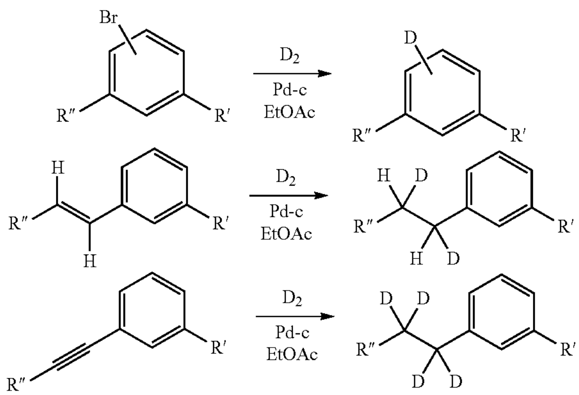

In one embodiment, the compounds disclosed herein contain one deuterium atom. In another embodiment, the compounds disclosed herein contain two deuterium atoms. In another embodiment, the compounds disclosed herein contain three deuterium atoms. In another embodiment, the compounds disclosed herein contain four deuterium atoms. In another embodiment, the compounds disclosed herein contain five deuterium atoms. In another embodiment, the compounds disclosed herein contain six deuterium atoms. In another embodiment, the compounds disclosed herein contain more than six deuterium atoms. In another embodiment, the compound disclosed herein is fully substituted with deuterium atoms and contains no non-exchangeable $^1H$ hydrogen atoms. In one embodiment, the level of deuterium incorporation is determined by synthetic methods in which a deuterated synthetic building block is used as a starting material.

"Pharmaceutically acceptable salt" includes both acid and base addition salts. A pharmaceutically acceptable salt of any one of the TNFα inhibitory compounds described herein is intended to encompass any and all pharmaceutically suitable salt forms. Preferred pharmaceutically acceptable salts of the compounds described herein are pharmaceutically acceptable acid addition salts and pharmaceutically acceptable base addition salts.

"Pharmaceutically acceptable acid addition salt" refers to those salts which retain the biological effectiveness and properties of the free bases, which are not biologically or otherwise undesirable, and which are formed with inorganic acids such as hydrochloric acid, hydrobromic acid, sulfuric acid, nitric acid, phosphoric acid, hydroiodic acid, hydrofluoric acid, phosphorous acid, and the like. Also included are salts that are formed with organic acids such as aliphatic mono- and dicarboxylic acids, phenyl-substituted alkanoic acids, hydroxy alkanoic acids, alkanedioic acids, aromatic acids, aliphatic and. aromatic sulfonic acids, etc. and include, for example, acetic acid, trifluoroacetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like. Exemplary salts thus include sulfates, pyrosulfates, bisulfates, sulfites, bisulfites, nitrates, phosphates, monohydrogenphosphates, dihydrogenphosphates, metaphosphates, pyrophosphates, chlorides, bromides, iodides, acetates, trifluoroacetates, propionates, caprylates, isobutyrates, oxalates, malonates, succinate suberates, sebacates, fumarates, maleates, mandelates, benzoates, chlorobenzoates, methylbenzoates, dinitrobenzoates, phthalates, benzenesulfonates, toluenesulfonates, phenylacetates, citrates, lactates, malates, tartrates, methanesulfonates, and the like. Also contemplated are salts of amino acids, such as arginates, gluconates, and galacturonates (see, for example, Berge S. M. et al., "Pharmaceutical Salts," *Journal of Pharmaceutical Science,* 66:1-19 (1997)). Acid addition salts of basic compounds are, in some embodiments, prepared by contacting the free base forms with a sufficient amount of the desired acid to produce the salt according to methods and techniques with which a skilled artisan is familiar.

"Pharmaceutically acceptable base addition salt" refers to those salts that retain the biological effectiveness and properties of the free acids, which are not biologically or otherwise undesirable. These salts are prepared from addition of an inorganic base or an organic base to the free acid. Pharmaceutically acceptable base addition salts are, in some embodiments, formed with metals or amines, such as alkali and alkaline earth metals or organic amines. Salts derived from inorganic bases include, but are not limited to, sodium, potassium, lithium, ammonium, calcium, magnesium, iron, zinc, copper, manganese, aluminum salts and the like. Salts derived from organic bases include, but are not limited to, salts of primary, secondary, and tertiary amines, substituted amines including naturally occurring substituted amines, cyclic amines and basic ion exchange resins, for example, isopropylamine, trimethylamine, diethylamine, triethylamine, tripropylamine, ethanolamine, diethanolamine, 2-dimethylaminoethanol, 2-diethylaminoethanol, dicyclohexylamine, lysine, arginine, histidine, caffeine, procaine, N,N-dibenzylethylenediamine, chloroprocaine, hydrabamine, choline, betaine, ethylenediamine, ethylenedianiline, N-methylglucamine, glucosamine, methylglucamine, theobromine, purines, piperazine, piperidine, N-ethylpiperidine, polyamine resins and the like. See Berge et al., supra.

"Pharmaceutically acceptable solvate" refers to a composition of matter that is the solvent addition form. In some embodiments, solvates contain either stoichiometric or non-stoichiometric amounts of a solvent, and are formed during the process of making with pharmaceutically acceptable solvents such as water, ethanol, and the like. Hydrates are formed when the solvent is water, or alcoholates are formed when the solvent is alcohol. Solvates of compounds described herein are conveniently prepared or formed during the processes described herein. The compounds provided herein exist in either unsolvated or solvated forms.

The term "subject" or "patient" encompasses mammals. Examples of mammals include, but are not limited to, any member of the Mammalian class: humans, non-human primates such as chimpanzees, and other apes and monkey species; farm animals such as cattle, horses, sheep, goats, swine; domestic animals such as rabbits, dogs, and cats, laboratory animals including rodents, such as rats, mice and guinea pigs, and the like. In one aspect, the mammal is a human.

As used herein, "treatment" or "treating," or "palliating" or "ameliorating" are used interchangeably. These terms refer to an approach for obtaining beneficial or desired results including but not limited to therapeutic benefit and/or a prophylactic benefit. By "therapeutic benefit" is meant eradication or amelioration of the underlying disorder being treated. Also, a therapeutic benefit is achieved with the eradication or amelioration of one or more of the physiological symptoms associated with the underlying disorder such that an improvement is observed in the patient, notwithstanding that the patient is still afflicted with the underlying disorder. For prophylactic benefit, the compositions are, in some embodiments, administered to a patient at risk of developing a particular disease, or to a patient reporting one or more of the physiological symptoms of a disease, even though a diagnosis of this disease has not been made.

Tumor Necrosis Factor Alpha (TNFα) Protein and Function

Tumor necrosis factor alpha (TNFα) proteins are members of the TNF superfamily, comprising various transmembrane proteins with a homologous TNF domain forming trimers. The TNF superfamily comprises 19 family members, including, but not limited to tumor necrosis factor alpha (also known as tumor necrosis factor, or TNF), lymphotoxin alpha (TNFβ), lymphotoxin beta (TNFγ), OX40 ligand, CD40 ligand, Fas ligand, CD27 ligand, CD30 ligand, CD137 ligand, CD137 ligand, and TNF-related apoptosis-inducing ligand. TNFα proteins are cytokines and adipokines (cytokines secreted by adipose tissue).

TNFα is a transmembrane protein, with soluble TNFα (sTNFα) released via protein cleavage. The sTNFα can propagate signaling by binding to two receptors, TNFR1 and TNFR2. TNFα is a regulator of immune responses for cell signaling and can mediate cell survival and cell death inducing signaling. There are two receptors for TNF signaling, TNFR1 and TNFR2. sTNFα-TNFR1 signaling promotes immune cell activation and drives acute and chronic inflammation. Membrane TNFα-TNFR2 signaling promotes inflammation resolution, immune cell regulatory functions and cell survival.

The extracellular region of both TNFR1 and TNFR2 have four homologous cysteine-rich domains, but they have structurally different intracellular regions. TNFR1 has a protein binding region called a death domain which allows homo- and hetero-typic interactions with other death domain-containing proteins. In contrast, TNFR2 has a TNF Receptor Associated Factor (TRAF) that interacts with TRAF family of signaling adaptors. The distinct profiles and differences of the two TNF receptors influence the cellular activity and physiological roles. TNFR1 can activate NF-κB and MAPK signaling, and cell death, and is important to regulate inflammatory diseases. TNFR2 is highly regulated and restricted to specific cell types such as endothelial cells and T cells. TNFR1 primarily promotes tissue degeneration and inflammation, while TNFR2 typically mediates local homeostatic effects such as tissue regeneration and cell survival (D. Fresegna et al., Cells, 2020, 9, 2290).

Binding of TNFα to TNFR1 can activate NF-κB for mediating transcription of various proteins involved in cell survival and proliferation, anti-apoptotic factors, and inflammatory response. Further, the MAPK pathway can also be activated by binding of TNFα to TNFR1, which is involved in cell differentiation and proliferation. When TNFα binds to TNFR1, it triggers receptor trimerization, leading to the assembly of a TNFR1-associated signaling complex. This complex recruits the receptor interacting protein 1 (RIP1) and TNF receptor associated death domain (TRADD) to the TNFR1 through the receptive death domains. TRADD then recruits adaptor proteins TRAF2 and TRAF5, which can engage the E3 ligases cellular inhibitors of apoptosis (c-IAP1, c-IAP2). c-IAP1/2 are important for TNFR1 complex signaling, which can eventually lead to the recruitment of the signaling kinase complexes of kinase IKKα and IKKβ, which are inhibitors of kappa B kinase 1 and 2, and transforming growth factor beta-activated kinase 1 (TAK1) leading to activation of NF-κB and MAPK signaling. Activation of these signaling pathways can result in gene activation and expression of pro-inflammatory cytokines and pro-survival proteins.

TNF signaling is regulated by post-translational ubiquitination, which is essential for my biological processes. Post-translational modifications of TNFR1-associated signaling complexes can result in a change from inflammatory gene signaling to cell death. This switch is dependent upon the ubiquitination status of RIP1, which is formed as part of the TNFR1-associated signaling complex from TNFα binding.

TNF has long been known to be a key regulator of the inflammatory response, and recently has been known to be involved in brain functioning (D. Fresegna et al., Cells, 2020, 9, 2290). As a regulator of the inflammatory response, TNF can regulate many aspects of T cell biology including, but not limited to proliferation, survival, priming, and apoptotic fate. TNF is also known to play a role in conclusion of lymphocyte response, by the ability to promote cell death in both CD4 and CD8P T cells, through TNFR1. Specific inflammatory conditions can also result in TNFR2 promoting or supporting T cell apoptosis.

In normal adult brains, TNF is expressed at low levels, and it is believed that the expression could be influenced by presence or absence of cytokines that can cross the blood brain barrier. TNFRs in the brain are expressed by glia and neurons cells, and have regulatory functions, including, but not limited to homeostatic synaptic plasticity, astrocyte-mediated synaptic transmission, and neurogenesis. These functions are useful for regulating learning and memory functions amongst other roles.

TNF is recognized to be physiological gliotransmitter for the communication between neurons and glial cells, which in turn affects synaptic regulation. Glial TNF is important for maintenance of normal surface expression of AMPA receptors, and for homeostatic synaptic scaling, which allows for adjustment of the strength of all synapses on a neuron.

Prior Art Small Molecules Inhibitors

Diseases treated with biologic TNFα inhibitors include, but are not limited to rheumatoid arthritis, inflammatory bowel disease, psoriatic arthritis, psoriasis, and ankylosing spondylitis. Patients with neuroinflammatory conditions and degenerative disease, including, but not limited to Alzheimer's disease, Parkinson's disease, multiple sclerosis, treatment resistant depression, and tinnitus, may benefit from treatment with oral CNS sTNFα inhibitors by disrupting the sTNFα signaling and sparing the mTNFα signaling. Previous reports have also indicated targeting TNFR2 for treating Alzheimer's Disease (N. Orti-Casañ et al., Front Neurosci. 2019; 13: 49).

Small molecules have been developed for treatment of rheumatoid arthritis as some patients have responded poorly to monotherapy of approved anti-TNFα drugs (J. D. Dietrich et al., J. Med. Chem. 2021, 64, 417-429). Anti-TNFα drugs have also been expanded for use in other chronic autoimmune diseases, including, but not limited to, Crohn's disease, psoriasis, psoriatic arthritis, ulcerative colitis, inflammatory bowel disease, ankylosing spondylitis, and juvenile rheumatoid arthritis. Small molecules have been developed as an alternative to anti-TNFα biologics since the long-term clinical response rate is generally around 60-70% for rheumatoid arthritis.

Previous research has also indicated that TNFα inhibitors can be therapeutic for treatment of multiple sclerosis (D. Fresegna et al., Cells, 2020, 9, 2290). There has been evidence of the involvement of TNF in various pathological issues of multiple sclerosis, including immune dysregulation, demylination, synaptopathy, and neuroinflammation. TNFα inhibitors have the potential for treatment of multiple sclerosis, other potential chronic neurodegenerative diseases of the central nervous system.

More than 50 million Americans struggle with tinnitus, which is the hearing of a sound with no external source. It has been shown that TNFα is necessary for noise-induced neuroinflammation and synaptic imbalance (W. Wang et al., PLoS Biol. 2019 Jun. 18; 17(6):e3000307; A. Shulman et al., Curr Top Behav Neurosci. 2021; 51:161-174). It is believed that certain inhibitors of TNFα have activities for treating tinnitus.

Recent reports also indicate that TNFα inhibitors can be used alone or in combination for treatment with inflammatory bowel disease (S. F. Fowler Braga and K. J. Clark, US Pharm. 2021; 46(5):34-37). TNFα is a mediator of the abnormal immune response of inflammatory bowel disease, which leads to disruption of the intestinal mucosa and epithelial wall barrier. The anti-TNF agents can block TNF-mediated activation of the proinflammatory pathways to result in decreased immune-mediated inflammation.

Small molecule sTNFα inhibitors are active in pharmacology models of sTNFα/TNFR1 signaling in addition to demonstrating efficacy in a model of collagen antibody induced arthritis. There is currently limited data in the public domain for small molecule sTNFα inhibitors. Some TNFα inhibitors include, but are not limited to XPro1595, Etanercept, Infliximab, Adalimumab, Certolizumab pegol, Golimumab, and other inhibitors described in "TNF-α: The Shape of Small Molecules to Come?" (A. Dömling and X. Li, Drug Discov Today 2022 January; 27(1):3-7) and "Small Molecules that Inhibit TNF Signalling by Stabilising an Asymmetric Form of the Trimer (J. O'Connell et al., Nature Communications 10, 5795 (2019)). Additional small molecule inhibitors of TNFα include, but are not limited to the inhibitors described in "Biologic-like In Vivo Efficacy with Small Molecule Inhibitors of TNFα Identified Using Scaffold Hopping and Structure-Based Drug Design Approaches" (H-Y Xiao et al., J. Med. Chem. 2020, 15050-15071), "Development of Orally Efficacious Allosteric Inhibitors of TNFα via Fragment-Based Drug Design" (J. D. Dietrich et al., J. Med. Chem. 2021, 64, 417-429), and "Small-Molecule Inhibition of TNF-α" (M. M. He et al., Science, 310 (2015), 1022-1025).

Small molecule sTNFα inhibitors have potential as a valuable therapy for patients currently treated with biologic TNFα inhibitors which affect mTNFα with the ability to fine tune oral dosing requirements and avoid anti-drug antibody responses, thereby improving short and long responses (A. Dömling and X. Li, Drug Discov Today 2022 January; 27(1):3-7).

Novel Compounds Inhibiting TNFα

In one aspect, provided herein are TNFα inhibitory compounds.

One embodiment provides a compound of Formula (I), or pharmaceutically acceptable salt, solvate, or N-oxide thereof:

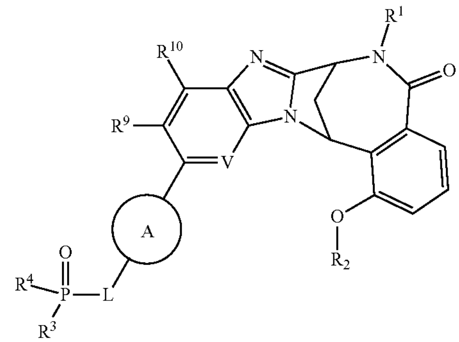

(I)

wherein,

Ring A is selected from

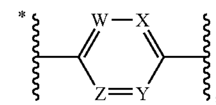

wherein the * denotes point of attachment to L, or an optionally substituted heteroarylene selected from pyrazolene, imidazoline, oxazolene, or thiazolene;

V is N or C—$R^{11}$;

W is N or C—$R^5$;

X is N or C—$R^6$;

Y is N or C—$R^7$;

Z is N or C—$R^8$;

L is a bond, —NH—, —$(CH_2)$n-, —$CR^{12}R^{13}$—, —$O(CH_2)$n-*, or —$NH(CH_2)$n-*, wherein the * denotes point of attachment to phosphorous, n is 1, 2, or 3;

$R^1$ is selected from hydrogen, optionally substituted C1-C6 alkyl, optionally substituted C3-C6 cycloalkyl, or optionally substituted C4-C7 cycloalkylalkyl;

$R^2$ is hydrogen, or optionally substituted C1-C3 alkyl;

$R^3$ is hydroxy, optionally substituted C1-C3 alkoxy, or optionally substituted C1-C6 alkyl;

$R^4$ is hydroxy, optionally substituted C1-C3 alkoxy, or optionally substituted C1-C6 alkyl; or $R^3$ and $R^4$ join to form optionally substituted phosphorus-containing 3- to 8-membered ring;

each $R^5$, $R^6$, $R^7$, and $R^8$ is independently selected from hydrogen, halogen, —CN, —$NH_2$, optionally substituted C1-C3 alkyl, optionally substituted C1-C3 alkoxy, or —NH(optionally substituted C1-C3 alkyl);

$R^9$ is selected from hydrogen, halogen, or optionally substituted C1-C6 alkyl;

$R^{10}$ is selected from hydrogen or halogen;

$R^{11}$ is selected from hydrogen, halogen, or optionally substituted C1-C6 alkyl; and $R^{12}$ and $R^{13}$ are independently selected from hydrogen, —OH, F, and $CH_3$.

One embodiment provides compound of Formula (Ia), or pharmaceutically acceptable salt, solvate, or N-oxide thereof:

(Ia)

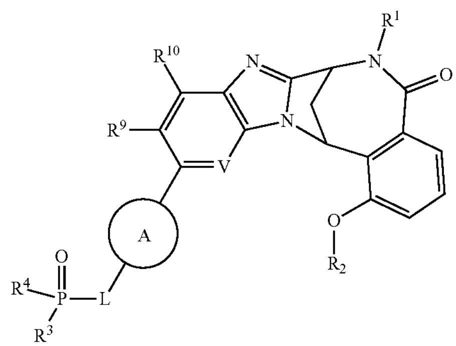

wherein,

Ring A is selected from

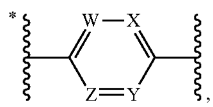

wherein the * denotes point of attachment to L, or an optionally substituted heteroarylene selected from pyrazolene, imidazoline, oxazolene, or thiazolene;

V is N or C—$R^{11}$;

W is N or C—$R^5$;

X is N or C—$R^6$;

Y is N or C—$R^7$;

Z is N or C—$R^8$;

L is a bond, —NH—, —$(CH_2)$n-, —$O(CH_2)$n-*, or —NH$(CH_2)$n-*, wherein the * denotes point of attachment to phosphorous;

n is 1, 2, or 3;

$R^1$ is selected from hydrogen, optionally substituted C1-C6 alkyl, optionally substituted C3-C6 cycloalkyl, or optionally substituted C4-C7 cycloalkylalkyl;

$R^2$ is hydrogen, or optionally substituted C1-C3 alkyl;

$R^3$ is hydroxy, optionally substituted C1-C3 alkoxy, or optionally substituted C1-C6 alkyl;

$R^4$ is hydroxy, optionally substituted C1-C3 alkoxy, or optionally substituted C1-C6 alkyl; or $R^3$ and $R^4$ join to form optionally substituted phosphorus-containing 3- to 8-membered ring;

each $R^5$, $R^6$, $R^7$, and $R^8$ is independently selected from hydrogen, halogen, —CN, optionally substituted C1-C3 alkyl, optionally substituted C1-C3 alkoxy, or —NH(optionally substituted C1-C3 alkyl);

$R^9$ is selected from hydrogen, halogen, or optionally substituted C1-C6 alkyl;

$R^{10}$ is selected from hydrogen or halogen; and $R^{11}$ is selected from hydrogen, halogen, or optionally substituted C1-C6 alkyl.

Another embodiment provides the compound of Formula (I) or (Ia), or pharmaceutically acceptable salt, solvate, or N-oxide thereof, wherein ring A is selected from

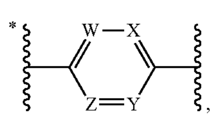

wherein the * denotes point of attachment to L.

Another embodiment provides the compound of Formula (I) or (Ia), or pharmaceutically acceptable salt, solvate, or N-oxide thereof, wherein W is N. Another embodiment provides the compound of Formula (I) or (Ia), or pharmaceutically acceptable salt, solvate, or N-oxide thereof, wherein W is C—$R^5$.

Another embodiment provides the compound of Formula (I) or (Ia), or pharmaceutically acceptable salt, solvate, or N-oxide thereof, wherein X is N. Another embodiment provides the compound of Formula (I) or (Ia), or pharmaceutically acceptable salt, solvate, or N-oxide thereof, wherein X is C—$R^6$.

Another embodiment provides the compound of Formula (I) or (Ia), or pharmaceutically acceptable salt, solvate, or N-oxide thereof, wherein Y is N. Another embodiment provides the compound of Formula (I) or (Ia), or pharmaceutically acceptable salt, solvate, or N-oxide thereof, wherein Y is C—$R^7$.

Another embodiment provides the compound of Formula (I) or (Ia), or pharmaceutically acceptable salt, solvate, or N-oxide thereof, wherein Z is N. Another embodiment provides the compound of Formula (I) or (Ia), or pharmaceutically acceptable salt, solvate, or N-oxide thereof, wherein Z is C—$R^8$.

Another embodiment provides the compound of Formula (I) or (Ia), or pharmaceutically acceptable salt, solvate, or N-oxide thereof, wherein W is C—$R^5$, X is C—$R^6$, Y is C—$R^7$, and Z is C—$R^8$. Another embodiment provides the compound of Formula (I) or (Ia), or pharmaceutically acceptable salt, solvate, or N-oxide thereof, wherein W is C—F, X is C—H, Y is C—H, and Z is C—H.

Another embodiment provides the compound of Formula (I) or (Ia), or pharmaceutically acceptable salt, solvate, or N-oxide thereof, wherein each $R^5$, $R^6$, $R^7$, and $R^8$ is independently selected from hydrogen or halogen.

Another embodiment provides the compound of Formula (I) or (Ia), or pharmaceutically acceptable salt, solvate, or N-oxide thereof, wherein W is N, X is C—$R^6$, Y is C—$R^7$, and Z is C—$R^8$.

Another embodiment provides the compound of Formula (I) or (Ia), or pharmaceutically acceptable salt, solvate, or N-oxide thereof, wherein W is C—$R^5$, X is N, Y is C—$R^7$, and Z is C—$R^8$.

Another embodiment provides the compound of Formula (I) or (Ia), or pharmaceutically acceptable salt, solvate, or N-oxide thereof, wherein W is C—$R^5$, X is C—$R^6$, Y is N, and Z is C—$R^8$.

Another embodiment provides the compound of Formula (I) or (Ia), or pharmaceutically acceptable salt, solvate, or N-oxide thereof, wherein W is C—$R^5$, X is C—$R^6$, Y is C—$R^7$, and Z is N.

Another embodiment provides the compound of Formula (I) or (Ia), or pharmaceutically acceptable salt, solvate, or N-oxide thereof, wherein $R^1$ is hydrogen.

Another embodiment provides the compound of Formula (I) or (Ia), or pharmaceutically acceptable salt, solvate, or N-oxide thereof, wherein $R^1$ is optionally substituted C1-C6 alkyl.

Another embodiment provides the compound of Formula (I) or (Ia), or pharmaceutically acceptable salt, solvate, or N-oxide thereof, wherein $R^1$ is $CH_3$.

Another embodiment provides the compound of Formula (I) or (Ia), or pharmaceutically acceptable salt, solvate, or N-oxide thereof, wherein $R^1$ is $CD_3$.

Another embodiment provides the compound of Formula (I) or (Ia), or pharmaceutically acceptable salt, solvate, or N-oxide thereof, wherein $R^2$ is optionally substituted C1-C3 alkyl. Another embodiment provides the compound of Formula (I) or (Ia), or pharmaceutically acceptable salt, solvate, or N-oxide thereof, wherein the optionally substituted C1-C3 alkyl is substituted with a halogen. Another embodiment provides the compound of Formula (I) or (Ia), or pharmaceutically acceptable salt, solvate, or N-oxide thereof, wherein the optionally substituted C1-C3 alkyl is —$CHF_2$.

Another embodiment provides the compound of Formula (I) or (Ia), or pharmaceutically acceptable salt, solvate, or N-oxide thereof, wherein one of $R^3$ or $R^4$ is hydroxy. Another embodiment provides the compound of Formula (I) or (Ia), or pharmaceutically acceptable salt, solvate, or N-oxide thereof, wherein $R^3$ and $R^4$ are hydroxy. Another embodiment provides the compound of Formula (I) or (Ia), or pharmaceutically acceptable salt, solvate, or N-oxide thereof, wherein one of $R^3$ or $R^4$ is optionally substituted C1-C3 alkoxy. Another embodiment provides the compound of Formula (I) or (Ia), or pharmaceutically acceptable salt, solvate, or N-oxide thereof, wherein $R^3$ and $R^4$ are optionally substituted C1-C3 alkoxy. Another embodiment provides the compound of Formula (I) or (Ia), or pharmaceutically acceptable salt, solvate, or N-oxide thereof, wherein one of $R^3$ or $R^4$ is optionally substituted C1-C3 alkoxy. Another embodiment provides the compound of Formula (I) or (Ia), or pharmaceutically acceptable salt, solvate, or N-oxide thereof, wherein $R^3$ and $R^4$ are optionally substituted C1-C3 alkoxy. Another embodiment provides the compound of Formula (I) or (Ia), or pharmaceutically acceptable salt, solvate, or N-oxide thereof, wherein $R^3$ and $R^4$ are each independently optionally substituted C1-C6 alkyl. Another embodiment provides the compound of Formula (I) or (Ia), or pharmaceutically acceptable salt, solvate, or N-oxide thereof, wherein $R^3$ and $R^4$ are each independently methyl, ethyl, n-propyl, iso-propyl, n-butyl, or iso-butyl. Another embodiment provides the compound of Formula (I) or (Ia), or pharmaceutically acceptable salt, solvate, or N-oxide thereof, wherein $R^3$ and $R^4$ are each methyl. Another embodiment provides the compound of Formula (I) or (Ia), or pharmaceutically acceptable salt, solvate, or N-oxide thereof, wherein $R^3$ and $R^4$ are each ethyl. Another embodiment provides the compound of Formula (I) or (Ia), or pharmaceutically acceptable salt, solvate, or N-oxide thereof, wherein $R^3$ is hydroxy and $R^4$ is methyl, ethyl, n-propyl, iso-propyl, n-butyl, or iso-butyl. Another embodiment provides the compound of Formula (I) or (Ia), or pharmaceutically acceptable salt, solvate, or N-oxide thereof, wherein $R^3$ and $R^4$ are each methyl or ethyl. Another embodiment provides the compound of Formula (I) or (Ia), or pharmaceutically acceptable salt, solvate, or N-oxide thereof, wherein $R^3$ is OH and $R^4$ is methyl.

Another embodiment provides the compound of Formula (I) or (Ia), or pharmaceutically acceptable salt, solvate, or N-oxide thereof, wherein $R^3$ and $R^4$ join to form optionally substituted phosphorus-containing 3- to 8-membered heterocyclyl. Another embodiment provides the compound of Formula (I) or (Ia), or pharmaceutically acceptable salt, solvate, or N-oxide thereof, wherein $R^3$ and $R^4$ join to form optionally substituted phosphorus-containing 3- to 8-membered heterocyclyl which comprises 1 or 2 additional heteroatoms each independently selected from N, O, and S. Another embodiment provides the compound of Formula (I) or (Ia), or pharmaceutically acceptable salt, solvate, or N-oxide thereof, wherein $R^3$ and $R^4$ join to form optionally substituted phosphorus-containing 4- to 6-membered heterocyclyl. Another embodiment provides the compound of Formula (I) or (Ia), or pharmaceutically acceptable salt, solvate, or N-oxide thereof, wherein $R^3$ and $R^4$ join to form optionally substituted phosphorus-containing 4-membered heterocyclyl. Another embodiment provides the compound of Formula (I) or (Ia), or pharmaceutically acceptable salt, solvate, or N-oxide thereof, wherein $R^3$ and $R^4$ join to form optionally substituted phosphorus-containing 5-membered heterocyclyl. Another embodiment provides the compound of Formula (I) or (Ia), or pharmaceutically acceptable salt, solvate, or N-oxide thereof, wherein $R^3$ and $R^4$ join to form optionally substituted phosphorus-containing 6-membered heterocyclyl.

Another embodiment provides the compound of Formula (I) or (Ia), or pharmaceutically acceptable salt, solvate, or N-oxide thereof, wherein $R^3$ and $R^4$ taken together with the phosphorus atom to which they are attached to join to form a ring selected from:

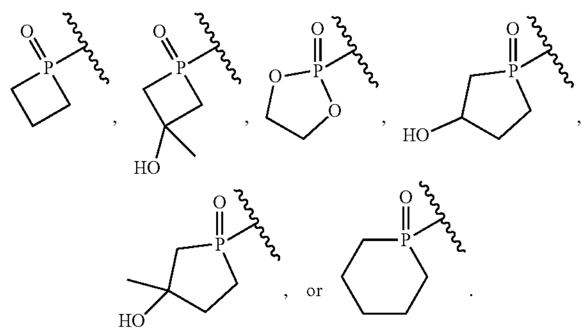

Another embodiment provides the compound of Formula (I) or (Ia), or pharmaceutically acceptable salt, solvate, or N-oxide thereof, wherein $R^3$ and $R^4$ taken together with the phosphorus atom to which they are attached to join to form a ring selected from:

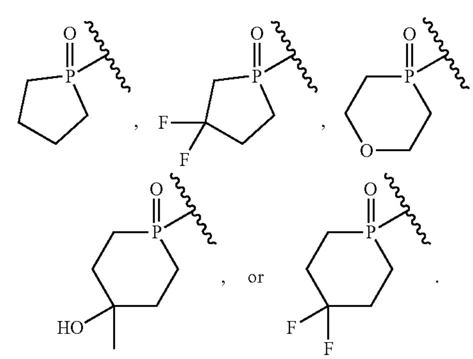

Another embodiment provides the compound of Formula (I) or (Ia), or pharmaceutically acceptable salt, solvate, or N-oxide thereof, wherein L is a bond. Another embodiment provides the compound of Formula (I) or (Ia), or pharmaceutically acceptable salt, solvate, or N-oxide thereof, wherein L is —$CH_2$—. Another embodiment provides the compound of Formula (I) or (Ia), or pharmaceutically acceptable salt, solvate, or N-oxide thereof, wherein L is —$OCH_2$—*. Another embodiment provides the compound of Formula (I) or (Ia), or pharmaceutically acceptable salt, solvate, or N-oxide thereof, wherein L is —$NHCH_2$—*.

Another embodiment provides the compound of Formula (I) or (Ia), or pharmaceutically acceptable salt, solvate, or N-oxide thereof, wherein $R^9$ is hydrogen. Another embodiment provides the compound of Formula (I) or (Ia), or pharmaceutically acceptable salt, solvate, or N-oxide thereof, wherein $R^9$ is halogen. Another embodiment provides the compound of Formula (I) or (Ia), or pharmaceutically acceptable salt, solvate, or N-oxide thereof, wherein $R^{10}$ is hydrogen.

Another embodiment provides the compound of Formula (I) or (Ia), or pharmaceutically acceptable salt, solvate, or N-oxide thereof, wherein ring A is an optionally substituted heteroarylene.

Another embodiment provides the compound of Formula (I) or (Ia), or pharmaceutically acceptable salt, solvate, or N-oxide thereof, wherein the optionally substituted heteroarylene is a N-linked heteroarylene, wherein the N-link is to the benzimidazole ring of Formula (I).

Another embodiment provides the compound of Formula (I) or (Ia), or pharmaceutically acceptable salt, solvate, or N-oxide thereof, wherein the optionally substituted heteroarylene is a C-linked heteroarylene, wherein the C-link is to the benzimidazole ring of Formula (I).

Another embodiment provides the compound of Formula (I) or (Ia), or pharmaceutically acceptable salt, solvate, or N-oxide thereof, wherein V is N. Another embodiment provides the compound of Formula (I) or (Ia), or pharmaceutically acceptable salt, solvate, or N-oxide thereof, wherein V is C—$R^{11}$. Another embodiment provides the compound of Formula (I) or (Ia), or pharmaceutically acceptable salt, solvate, or N-oxide thereof, wherein V is C—$R^{11}$ and $R^{11}$ is hydrogen.

Another embodiment provides the compound of Formula (I) or (Ia), or pharmaceutically acceptable salt, solvate, or N-oxide thereof, wherein W is C—F, X is C—H, Y is C—H, and Z is C—H; and L is a bond. Another embodiment provides the compound of Formula (I) or (Ia), or pharmaceutically acceptable salt, solvate, or N-oxide thereof, wherein L is a bond, and $R^3$ and $R^4$ are each methyl or ethyl. Another embodiment provides the compound of Formula (I) or (Ia), or pharmaceutically acceptable salt, solvate, or N-oxide thereof, wherein W is C—F, X is C—H, Y is C—H, and Z is C—H; L is a bond; and $R^3$ and $R^4$ are each methyl.

Another embodiment provides the compound of Formula (I) or (Ia), or pharmaceutically acceptable salt, solvate, or N-oxide thereof, wherein $R^1$ is $CD_3$; and $R^2$ is C1-C3 alkyl substituted with a halogen. Another embodiment provides the compound of Formula (I) or (Ia), or pharmaceutically acceptable salt, solvate, or N-oxide thereof, wherein $R^1$ is $CD_3$; and $R^2$ is —$CHF_2$.

Another embodiment provides the compound of Formula (I) or (Ia), or pharmaceutically acceptable salt, solvate, or N-oxide thereof, wherein $R^9$ is hydrogen, $R^{10}$ is hydrogen, and V is C—H. Another embodiment provides the compound of Formula (I) or (Ia), or pharmaceutically acceptable salt, solvate, or N-oxide thereof, wherein $R^9$ is F, $R^{10}$ is hydrogen, and V is C—H. Another embodiment provides the compound of Formula (I) or (Ia), or pharmaceutically acceptable salt, solvate, or N-oxide thereof, wherein $R^9$ is hydrogen, $R^{10}$ is hydrogen, and V is C—F.

Another embodiment provides the compound of Formula (I) or (Ia), or pharmaceutically acceptable salt, solvate, or N-oxide thereof, wherein $R^1$ is $CD_3$; $R^2$ is C1-C3 alkyl substituted with a halogen; $R^9$ is hydrogen; $R^{10}$ is hydrogen; and V is C—H. Another embodiment provides the compound of Formula (I) or (Ia), or pharmaceutically acceptable salt, solvate, or N-oxide thereof, wherein $R^1$ is $CD_3$; $R^2$ is C1-C3 alkyl substituted with a halogen; $R^9$ is F; $R^{10}$ is hydrogen; and V is C—H. Another embodiment provides the compound of Formula (I) or (Ia), or pharmaceutically acceptable salt, solvate, or N-oxide thereof, wherein $R^1$ is $CD_3$; $R^2$ is C1-C3 alkyl substituted with a halogen; $R^9$ is hydrogen; $R^{10}$ is hydrogen; and V is C—F.

One embodiment provides a TNFα inhibitory compound, or a pharmaceutically acceptable salt, solvate, or N-oxide thereof, having a structure presented in Table 1.

TABLE 1

| Synthetic Chemistry Example | Compound Structure | Compound Name |
|---|---|---|
| 1 | 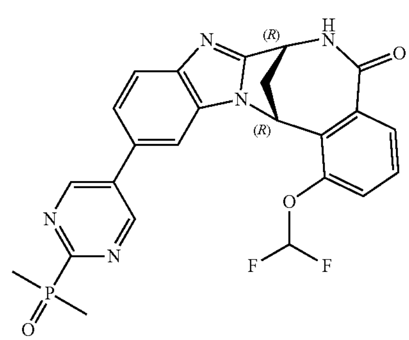 | (7R,14R)-1-(difluoromethoxy)-11-(2-(dimethylphosphoryl)pyrimidin-5-yl)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 2 | 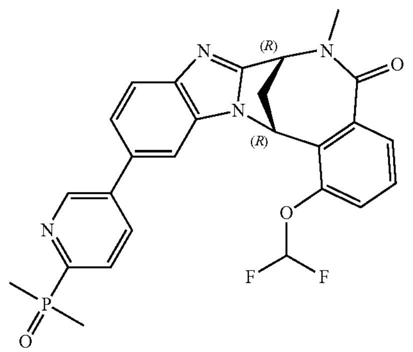 | (7R,14R)-1-(difluoromethoxy)-11-(6-(dimethylphosphoryl)pyridin-3-yl)-6-methyl-6,7-dihydro-7,14-methanobenzo[f]benzo[4,5]imidazo[1,2-a][1,4]diazocin-5(14H)-one |
| 3 | 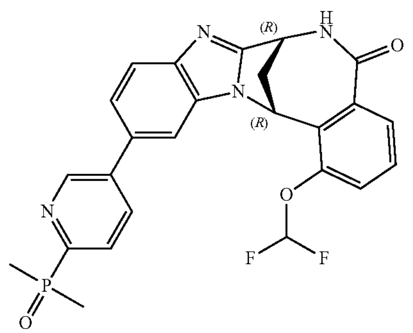 | (7R,14R)-1-(difluoromethoxy)-11-(6-(dimethylphosphoryl)pyridin-3-yl)-6,7-dihydro-7,14-methanobenzo[f]benzo[4,5]imidazo[1,2-a][1,4]diazocin-5(14H)-one |
| 4 | 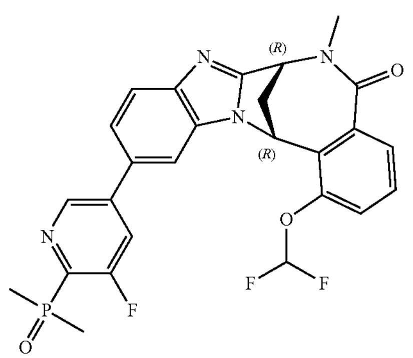 | (7R,14R)-1-(difluoromethoxy)-11-(6-(dimethylphosphoryl)-5-fluoropyridin-3-yl)-6-methyl-6,7-dihydro-7,14-methanobenzo[f]benzo[4,5]imidazo[1,2-a][1,4]diazocin-5(14H)-one |
| 5 | 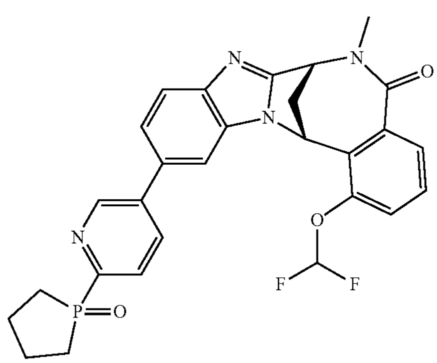 [SMILES: CN1C(=O)c2cccc(OC(F)F)c2[C@H]2C[C@@H]1c1nc3ccc(-c4ccc(P5(=O)CCCC5)nc4)cc3n12] | (1R,11R)-18-(difluoromethoxy)-12-methyl-5-[6-(1-oxo-1lambda5-phospholan-1-yl)pyridin-3-yl]-2,9,12-triazapentacyclo[9.8.1.0^{2,10}.0^{3,8}.0^{14,19}]icosa-3(8),4,6,9,14(19),15,17-heptaen-13-one |

TABLE 1-continued

| Synthetic Chemistry Example | Compound Structure | Compound Name |
|---|---|---|
| 6 | 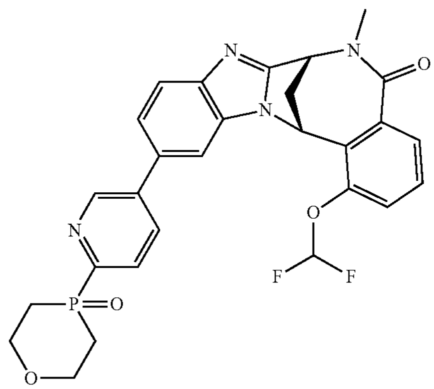 [SMILES: CN1C(=O)c2cccc(OC(F)F)c2[C@H]2C[C@@H]1c1nc3ccc(-c4ccc(P5(=O)CCOCC5)nc4)cc3n12] | (1R,11R)-18-(difluoromethoxy)-12-methyl-5-[6-(4-oxo-1,4lambda5-oxaphosphinan-4-yl)pyridin-3-yl]-2,9,12-triazapentacyclo[9.8.1.0^{2,10}.0^{3,8}.0^{14,19}]icosa-3(8),4,6,9,14(19),15,17-heptaen-13-one |
| 7 | 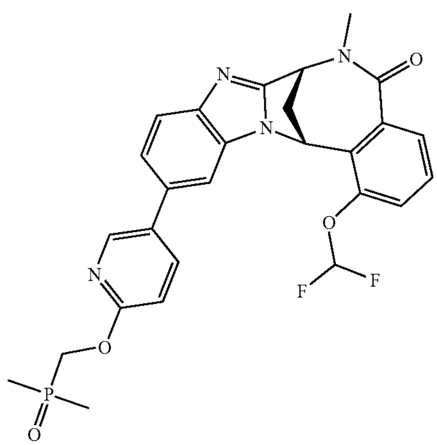 [SMILES: CN1C(=O)c2cccc(OC(F)F)c2[C@H]2C[C@@H]1c1nc3ccc(-c4ccc(OCP(C)(C)=O)nc4)cc3n12] | (1R,11R)-18-(difluoromethoxy)-5-{6-[(dimethylphosphoryl)methoxy]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one |
| 8 | 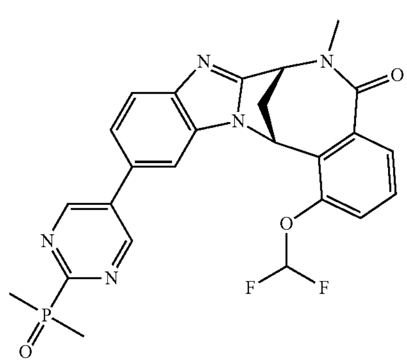 [SMILES: CN1C(=O)c2cccc(OC(F)F)c2[C@H]2C[C@@H]1c1nc3ccc(-c4cnc(P(C)(C)=O)nc4)cc3n12] | (1R,11R)-18-(difluoromethoxy)-5-[2-(dimethylphosphoryl)pyrimidin-5-yl]-12-methyl-2,9,12-triazapentacyclo[9.8.1.0^{2,10}.0^{3,8}.0^{14,19}]icosa-3(8),4,6,9,14(19),15,17-heptaen-13-one |

TABLE 1-continued

| Synthetic Chemistry Example | Compound Structure | Compound Name |
|---|---|---|
| 9 | 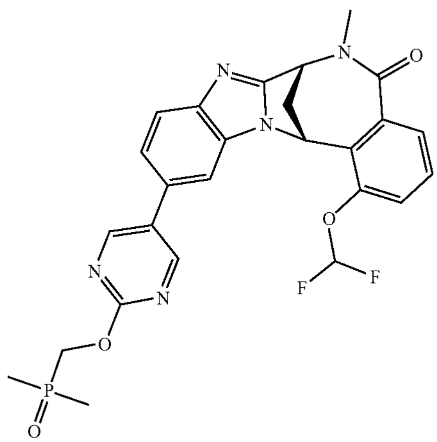 [SMILES: CN1C(=O)c2cccc(OC(F)F)c2[C@H]2C[C@@H]1c1nc3ccc(-c4cnc(OCP(C)(C)=O)nc4)cc3n12] | (1R,11R)-18-(difluoromethoxy)-5-{2-[(dimethylphosphoryl)methoxy]pyrimidin-5-yl}-12-methyl-2,9,12-triazapentacyclo[9.8.1.0^{2,10}.0^{3,8}.0^{14,19}]icosa-3(8),4,6,9,14(19),15,17-heptaen-13-one |
| 10 | 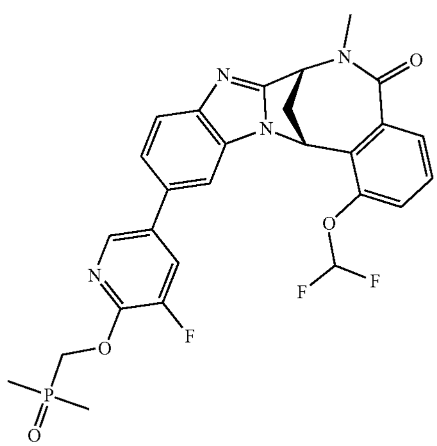 [SMILES: CN1C(=O)c2cccc(OC(F)F)c2[C@H]2C[C@@H]1c1nc3ccc(-c4cnc(OCP(C)(C)=O)c(F)c4)cc3n12] | (1R,11R)-18-(difluoromethoxy)-5-{6-[(dimethylphosphoryl)methoxy]-5-fluoropyridin-3-yl}-12-methyl-2,9,12-triazapentacyclo [9.8.1.0^ {2,10}.0^ {3,8}.0^ {14,19}] icosa-3(8),4,6,9,14(19),15,17-heptaen-13-one |
| 11 | 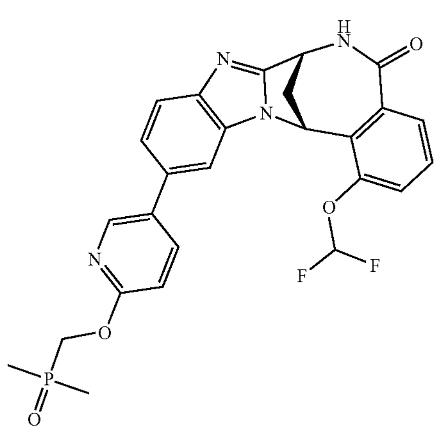 [SMILES: CP(C)(=O)COc1ccc(-c2ccc3nc4n(c3c2)[C@@H]2C[C@H]4NC(=O)c3cccc(OC(F)F)c32)cn1] | (1R,11R)-18-(difluoromethoxy)-5-{6-[(dimethylphosphoryl)methoxy]pyridin-3-yl}-2,9,12-triazapentacyclo[9.8.1.0^{2,10}.0^{3,8}.0^{14,19}]icosa-3(8),4,6,9,14(19),15,17-heptaen-13-one |

TABLE 1-continued

| Synthetic Chemistry Example | Compound Structure | Compound Name |
|---|---|---|
| 12 | 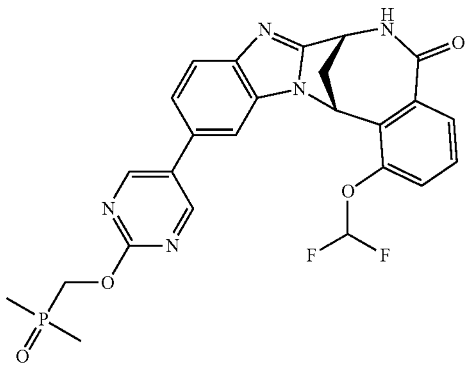 [SMILES: CP(C)(=O)COc1ncc(-c2ccc3nc4n(c3c2)[C@@H]2C[C@H]4NC(=O)c3cccc(OC(F)F)c32)cn1] | (1R,11R)-18-(difluoromethoxy)-5-(2-[(dimethylphosphoryl)methoxy]pyrimidin-5-yl}-2,9,12-triazapentacyclo[9.8.1.0^{2,10}.0^{3,8}.0^{14,19}]icosa-3(8),4,6,9,14(19),15,17-heptaen-13-one |
| 13 | 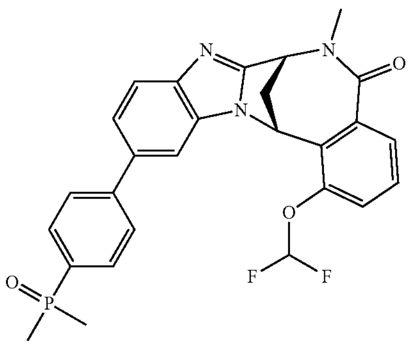 [SMILES: CN1C(=O)c2cccc(OC(F)F)c2[C@H]2C[C@@H]1c1nc3ccc(-c4ccc(P(C)(C)=O)cc4)cc3n12] | (1R,11R)-18-(difluoromethoxy)-5-[4-(dimethylphosphoryl)phenyl]-12-methyl-2,9,12-triazapentacyclo[9.8.1.0^{2,10}.0^{3,8}.0^{14,19}]icosa-3(8),4,6,9,14(19),15,17-heptaen-13-one |
| 14 | 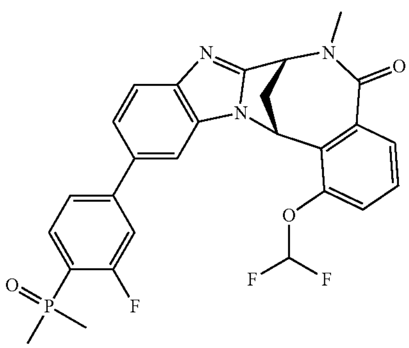 [SMILES: CN1C(=O)c2cccc(OC(F)F)c2[C@H]2C[C@@H]1c1nc3ccc(-c4ccc(P(C)(C)=O)c(F)c4)cc3n12] | (1R,11R)-18-(difluoromethoxy)-5-[4-(dimethylphosphoryl)-3-fluorophenyl]-12-methyl-2,9,12-triazapentacyclo[9.8.1.0^{2,10}.0^{3,8}.0^{14,19}]icosa-3(8),4,6,9,14(19),15,17-heptaen-13-one |
| 15 | 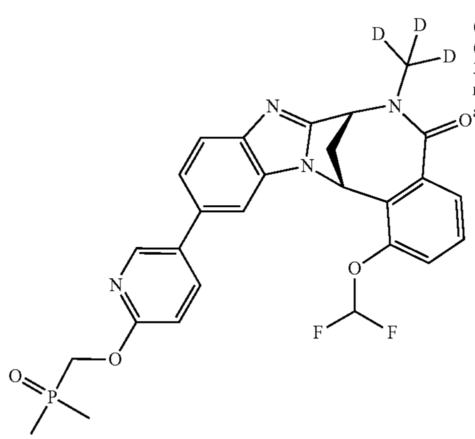 | (7R,14R)-1-(difluoromethoxy)-11-(6-((dimethylphosphoryl)methoxy)pyridin-3-yl)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 16 | 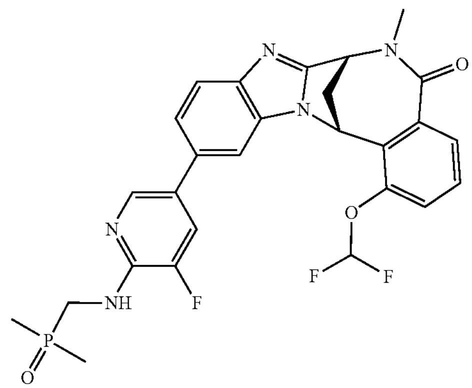 [SMILES: CN1C(=O)c2cccc(OC(F)F)c2[C@H]2C[C@@H]1c1nc3ccc(-c4cnc(NCP(C)(C)=O)c(F)c4)cc3n12] | (1R,11R)-18-(difluoromethoxy)-5-(6-{[(dimethylphosphoryl)methyl]amino}-5-fluoropyridin-3-yl)-12-methyl-2,9,12-triazapentacyclo[9.8.1.0^{2,10}.0^{3,8}.0^{14,19}]icosa-3(8),4,6,9,14(19),15,17-heptaen-13-one |
| 17 | 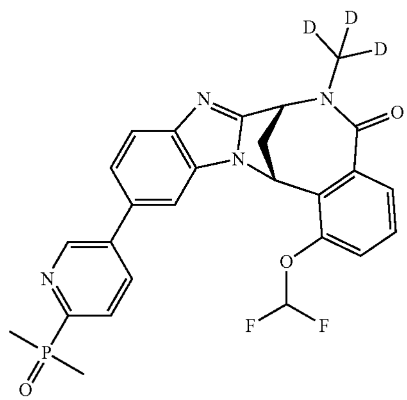 [SMILES: [2H]C([2H])([2H])N1C(=O)c2cccc(OC(F)F)c2[C@H]2C[C@@H]1c1nc3ccc(-c4ccc(P(C)(C)=O)nc4)cc3n12] | (7R,14R)-1-(difluoromethoxy)-11-(6-(dimethylphosphoryl)pyridin-3-yl)-6-(methyl-ds)-6,7-dihydro-7,14-methanobenzobenzo[4,5]imidazo[1,2-a][1,4]diazocin-5(14H)-one |
| 18 | 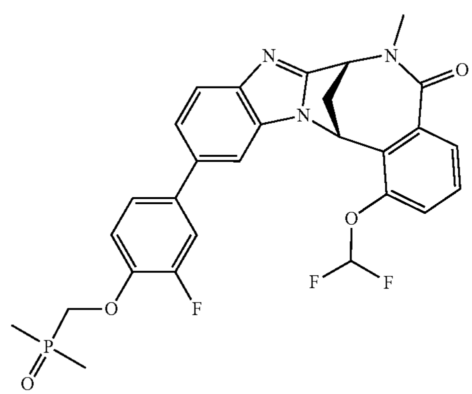 [SMILES: CN1C(=O)c2cccc(OC(F)F)c2[C@H]2C[C@@H]1c1nc3ccc(-c4ccc(OCP(C)(C)=O)c(F)c4)cc3n12] | (1R,11R)-18-(difluoromethoxy)-5-{4-[(dimethylphosphoryl)methoxy]-3-fluorophenyl}-12-methyl-2,9,12-triazapentacyclo[9.8.1.0^{2,10}.0^{3,8}.0^{14,19}]icosa-3(8),4,6,9,14(19),15,17-heptaen-13-one |
| 19 | 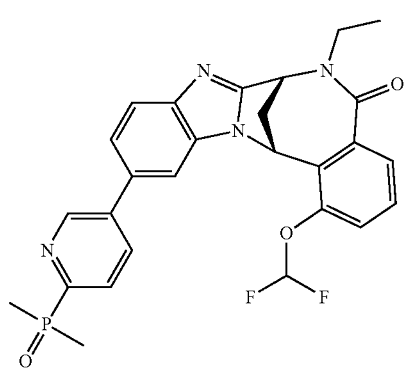 [SMILES: CCN1C(=O)c2cccc(OC(F)F)c2[C@H]2C[C@@H]1c1nc3ccc(-c4ccc(P(C)(C)=O)nc4)cc3n12] | (1R,11R)-18-(difluoromethoxy)-5-[6-(dimethylphosphoryl)pyridin-3-yl]-12-ethyl-2,9,12-triazapentacyclo[9.8.1.0^{2,10}.0^{3,8}.0^{14,19}]icosa-3(8),4,6,9,14(19),15,17-heptaen-13-one |

TABLE 1-continued

| Synthetic Chemistry Example | Compound Structure | Compound Name |
|---|---|---|
| 20 | 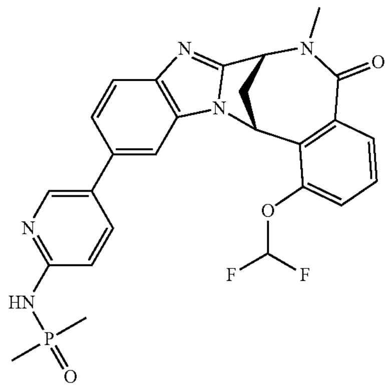 [SMILES: CN1C(=O)c2cccc(OC(F)F)c2[C@H]2C[C@@H]1c1nc3ccc(-c4ccc(NP(C)(C)=O)nc4)cc3n12] | (1R,11R)-18-(difluoromethoxy)-5-{6-[(dimethylphosphoryl)amino]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one |
| 21 | 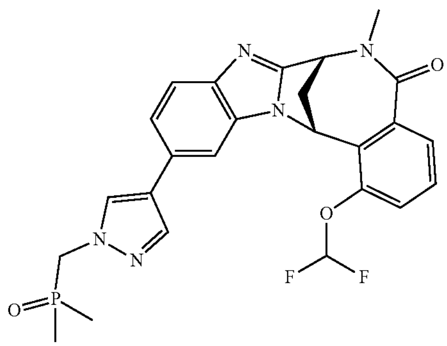 [SMILES: CN1C(=O)c2cccc(OC(F)F)c2[C@H]2C[C@@H]1c1nc3ccc(-c4cnn(CP(C)(C)=O)c4)cc3n12] | (1R,11R)-18-(difluoromethoxy)-5-{1-[(dimethylphosphoryl)methyl]pyrazol-4-yl}-12-methyl-2,9,12-triazapentacyclo[9.8.1.0^{2,10}.0^{3,8}.0^{14,19}]icosa-3(8),4,6,9,14(19),15,17-heptaen-13-one |
| 22 | 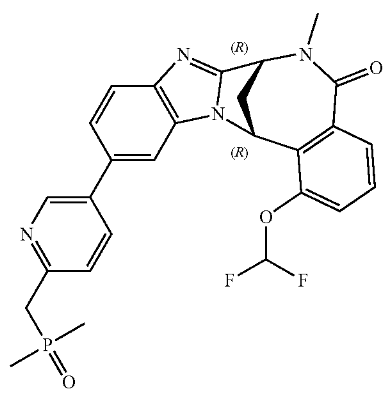 | (1R,11R)-18-(difluoromethoxy)-5-{6-[(dimethylphosphoryl)methyl]pyridin-3-yl}-12-methyl-2,9,12-triazapentacyclo[9.8.1.0^{2,10}.0^{3,8}.0^{ 14,19}]icosa-3(8),4,6,9,14(19),15,17-heptaen-13-one |
| 23 | 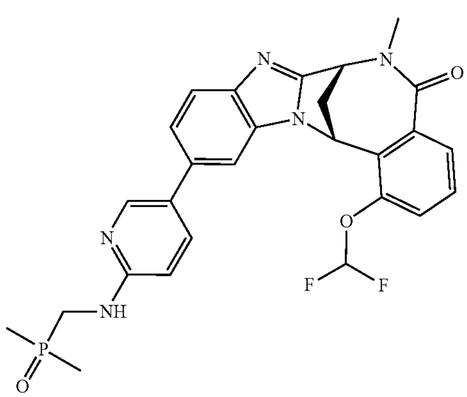 [SMILES: CN1C(=O)c2cccc(OC(F)F)c2[C@H]2C[C@@H]1c1nc3ccc(-c4ccc(NCP(C)(C)=O)nc4)cc3n12] | (1R,11R)-18-(difluoromethoxy)-5-(6-{[(dimethylphosphoryl)methyl]amino}pyridin-3-yl)-12-methyl-2,9,12-triazapentacyclo[9.8.1.0^{2,10}.0^{3,8}.0^{14,19}]icosa-3(8),4,6,9,14(19),15,17-heptaen-13-one |

TABLE 1-continued

| Synthetic Chemistry Example | Compound Structure | Compound Name |
|---|---|---|
| 24 | 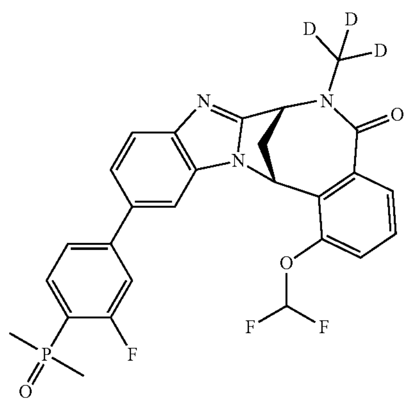 [SMILES: [2H]C([2H])([2H])N1C(=O)c2cccc(OC(F)F)c2[C@H]2C[C@@H]1c1nc3ccc(-c4ccc(P(C)(C)=O)c(F)c4)cc3n12] | (7R,14R)-1-(difluoromethoxy)-11-(4-(dimethylphosphoryl)-3-fluorophenyl)-6-(methyl-$d_3$)-6,7-dihydro-7,14-methanobenzo[f]benzo[4,5]imidazo[1,2-a][1,4]diazocin-5(14H)-one |
| 25 | 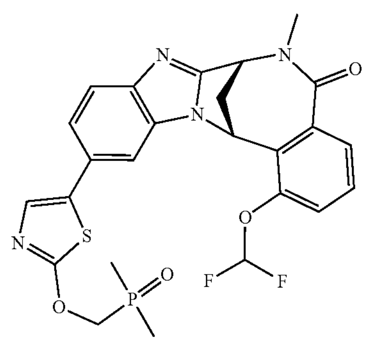 [SMILES: CN1C(=O)c2cccc(OC(F)F)c2[C@H]2C[C@@H]1c1nc3ccc(-c4cnc(OCP(C)(C)=O)s4)cc3n12] | (1R,11R)-18-(difluoromethoxy)-5-{2-[(dimethylphosphoryl)methoxy]-1,3-thiazol-5-yl}-12-methyl-2,9,12-triazapentacyclo[9.8.1.0^{2,10}.0^{3,8}.0^{14,19}]icosa-3(8),4,6,9,14(19),15,17-heptaen-13-one |
| 26 | 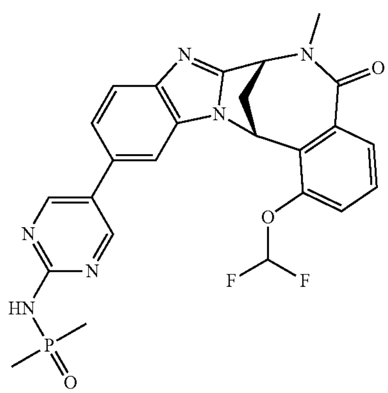 [SMILES: CN1C(=O)c2cccc(OC(F)F)c2[C@H]2C[C@@H]1c1nc3ccc(-c4cnc(NP(C)(C)=O)nc4)cc3n12] | (1R,11R)-18-(difluoromethoxy)-5-{2-[(dimethylphosphoryl)amino]pyrimidin-5-yl}-12-methyl-2,9,12-triazapentacyclo[9.8.1.0^{2,10}.0^{3,8}.0^{14,19}]icosa-3(8),4,6,9,14(19),15,17-heptaen-13-one |
| 27 | 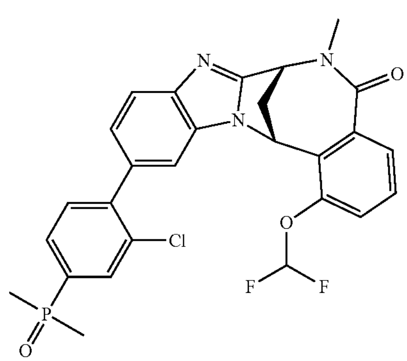 | (1R,11R)-5-[2-chloro-4-(dimethylphosphoryl)phenyl]-18-(difluoromethoxy)-12-methyl-2,9,12-triazapentacyclo[9.8.1.0^{2,10}.0^{3,8}.0^{14,19}]icosa-3(8),4,6,9,14(19),15,17-heptaen-13-one |

TABLE 1-continued

| Synthetic Chemistry Example | Compound Structure | Compound Name |
|---|---|---|
| 28 | 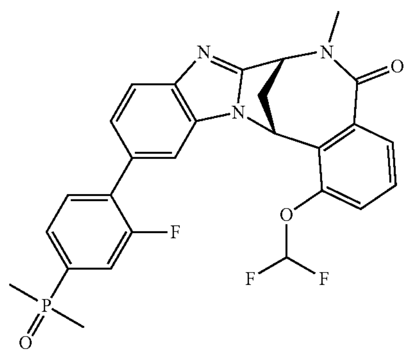 | (1R,11R)-18-(difluoromethoxy)-5-[4-(dimethylphosphoryl)-2-fluorophenyl]-12-methyl-2,9,12-triazapentacyclo[9.8.1.0^{2,10}.0^{3,8}.0^{14,19}]icosa-3(8),4,6,9,14(19),15,17-heptaen-13-one |
| 29 | 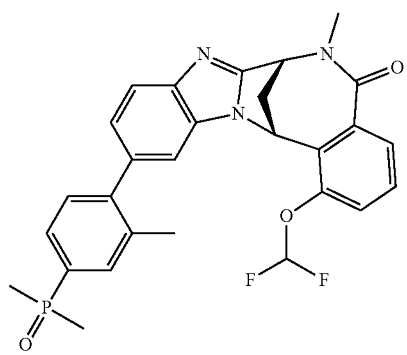 [SMILES: Cc1cc(P(C)(C)=O)ccc1-c1ccc2nc3n(c2c1)[C@@H]1C[C@H]3N(C)C(=O)c2cccc(OC(F)F)c21] | (1R,11R)-18-(difluoromethoxy)-5-[4-(dimethylphosphoryl)-2-methylphenyl]-12-methyl-2,9,12-triazapentacyclo[9.8.1.0^{2,10}.0^{3,8}.0^{14,19}]icosa-3(8),4,6,9,14(19),15,17-heptaen-13-one |
| 30 | 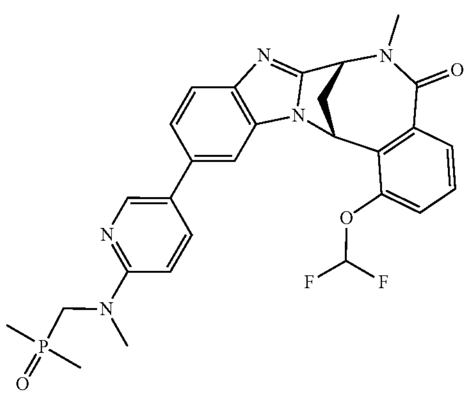 [SMILES: CN(CP(C)(C)=O)c1ccc(-c2ccc3nc4n(c3c2)[C@@H]2C[C@H]4N(C)C(=O)c3cccc(OC(F)F)c32)cn1] | (1R,11R)-18-(difluoromethoxy)-5-(6-{[(dimethylphosphoryl)methyl](methyl)amino}pyridin-3-yl)-12-methyl-2,9,12-triazapentacyclo[9.8.1.0^{2,10}.0^{3,8}.0^{14,19}]icosa-3(8),4,6,9,14(19),15,17-heptaen-13-one |
| 31 | 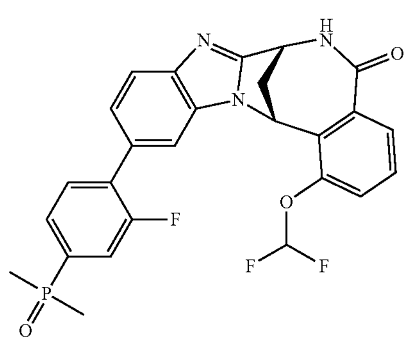 [SMILES: Cc1cc(P(C)(C)=O)ccc1-c1ccc2nc3n(c2c1)[C@@H]1C[C@H]3NC(=O)c2cccc(OC(F)F)c21] | (1R,11R)-18-(difluoromethoxy)-5-[4-(dimethylphosphoryl)-2-fluorophenyl]-2,9,12-triazapentacyclo[9.8.1.0^{2,10}.0^{3,8}.0^{14,19}]icosa-3(8),4,6,9,14(19),15,17-heptaen-13-one |

TABLE 1-continued

| Synthetic Chemistry Example | Compound Structure | Compound Name |
|---|---|---|
| 32 | 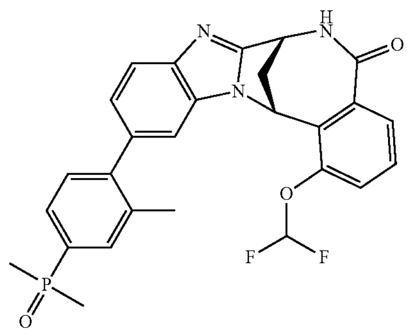 | (1R,11R)-18-(difluoromethoxy)-5-[4-(dimethylphosphoryl)-2-methylphenyl]-2,9,12-triazapentacyclo[9.8.1.0^{2,10}.0^{3,8}.0^{14,19}]icosa-3(8),4,6,9,14(19),15,17-heptaen-13-one |
| 33 | 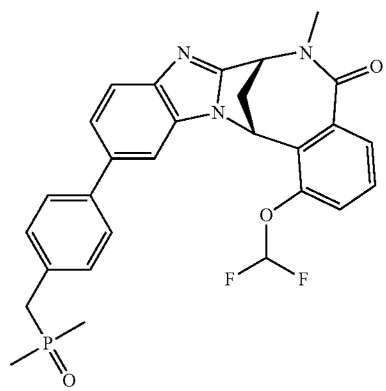 [SMILES: CN1C(=O)c2cccc(OC(F)F)c2[C@H]2C[C@@H]1c1nc3ccc(-c4ccc(CP(C)(C)=O)cc4)cc3n12] | (1R,11R)-18-(difluoromethoxy)-5-{4-[(dimethylphosphoryl)methyl]phenyl}-12-methyl-2,9,12-triazapentacyclo[9.8.1.0^{2,10}.0^{3,8}.0^{14,19}]icosa-3(8),4,6,9,14(19),15,17-heptaen-13-one |
| 34 | 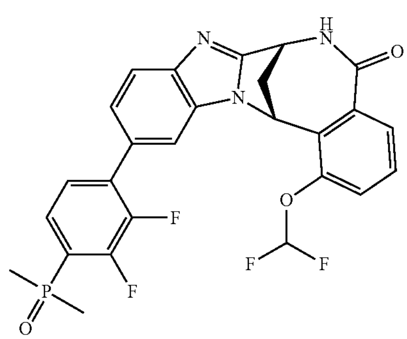 [SMILES: CP(C)(=O)c1ccc(-c2ccc3nc4n(c3c2)[C@@H]2C[C@H]4NC(=O)c3cccc(OC(F)F)c32)c(F)c1F] | (1R,11R)-18-(difluoromethoxy)-5-[4-(dimethylphosphoryl)-2,3-difluorophenyl]-2,9,12-triazapentacyclo[9.8.1.0^{2,10}.0^{3,8}.0^{14,19}]icosa-3(8),4,6,9,14(19),15,17-heptaen-13-one |
| 35 | 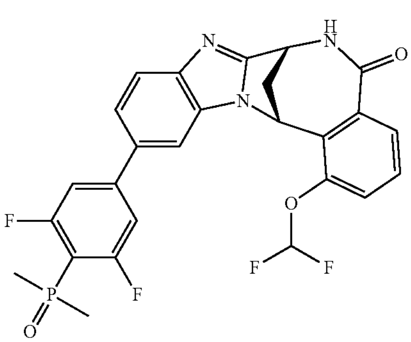 [SMILES: CP(C)(=O)c1c(F)cc(-c2ccc3nc4n(c3c2)[C@@H]2C[C@H]4NC(=O)c3cccc(OC(F)F)c32)cc1F] | (1R,11R)-18-(difluoromethoxy)-5-[4-(dimethylphosphoryl)-3,5-difluorophenyl]-2,9,12-triazapentacyclo[9.8.1.0^{2,10}.0^{3,8}.0^{14,19}]icosa-3(8),4,6,9,14(19),15,17-heptaen-13-one |

TABLE 1-continued

| Synthetic Chemistry Example | Compound Structure | Compound Name |
|---|---|---|
| 36 | 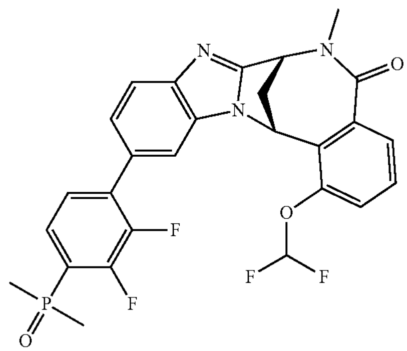 [SMILES: CN1C(=O)c2cccc(OC(F)F)c2[C@H]2C[C@@H]1c1nc3ccc(-c4ccc(P(C)(C)=O)c(F)c4F)cc3n12] | (1R,11R)-18-(difluoromethoxy)-5-[4-(dimethylphosphoryl)-2,3-difluorophenyl]-12-methyl-2,9,12-triazapentacyclo[9.8.1.0^{2,10}.0^{3,8}.0^{14,19}]icosa-3(8),4,6,9,14(19),15,17-heptaen-13-one |
| 37 | 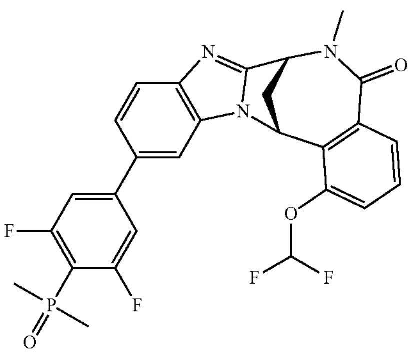 [SMILES: CN1C(=O)c2cccc(OC(F)F)c2[C@H]2C[C@@H]1c1nc3ccc(-c4cc(F)c(P(C)(C)=O)c(F)c4)cc3n12] | (1R,11R)-18-(difluoromethoxy)-5-[4-(dimethylphosphoryl)-3,5-difluorophenyl]-12-methyl-2,9,12-triazapentacyclo[9.8.1.0^{2,10}.0^{3,8}.0^{14,19}]icosa-3(8),4,6,9,14(19),15,17-heptaen-13-one |
| 38 | 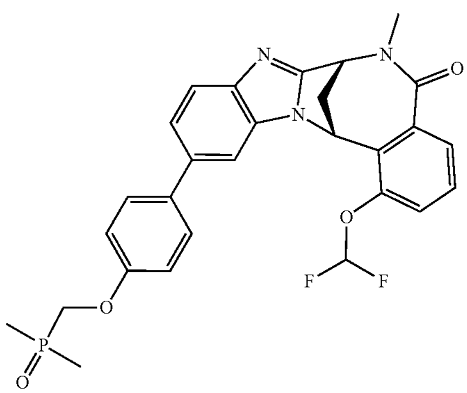 [SMILES: CN1C(=O)c2cccc(OC(F)F)c2[C@H]2C[C@@H]1c1nc3ccc(-c4ccc(OCP(C)(C)=O)cc4)cc3n12] | (1R,11R)-18-(difluoromethoxy)-5-14-[(dimethylphosphoryl)methoxy]phenyl}-12-methyl-2,9,12-triazapentacyclo[9.8.1.0^{2,10}.0^{3,8}.0^{14,19}]icosa-3(8),4,6,9,14(19),15,17-heptaen-13-one |
| 39 | 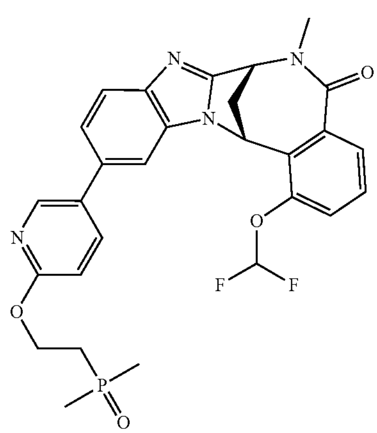 [SMILES: CN1C(=O)c2cccc(OC(F)F)c2[C@H]2C[C@@H]1c1nc3ccc(-c4ccc(OCCP(C)(C)=O)nc4)cc3n12] | (1R,11R)-18-(difluoromethoxy)-5-{6-[2-(dimethylphosphoryl)ethoxy]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one |

TABLE 1-continued

| Synthetic Chemistry Example | Compound Structure | Compound Name |
| --- | --- | --- |
| 40 | 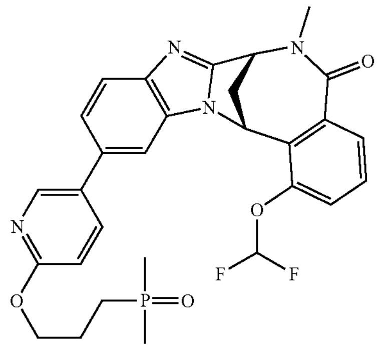 [SMILES: CN1C(=O)c2cccc(OC(F)F)c2[C@H]2C[C@@H]1c1nc3ccc(-c4ccc(OCCCP(C)(C)=O)nc4)cc3n12] | (1R,11R)-18-(difluoromethoxy)-5-{6-[3-(dimethylphosphoryl)propoxy]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one |
| 41 | 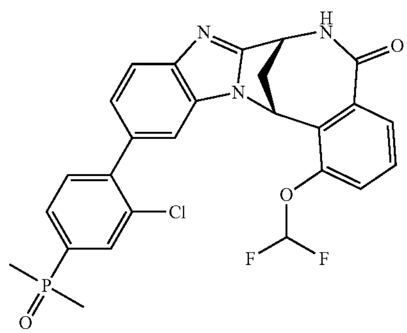 [SMILES: CP(C)(=O)c1ccc(-c2ccc3nc4n(c3c2)[C@@H]2C[C@H]4NC(=O)c3cccc(OC(F)F)c32)c(Cl)c1] | (1R,11R)-5-[2-chloro-4-(dimethylphosphoryl)phenyl]-18-(difluoromethoxy)-2,9,12-triazapentacyclo[9.8.1.0^{2,10}.0^{3,8}.0^{14,19}]icosa-3(8),4,6,9,14(19),15,17-heptaen-13-one |
| 42 | 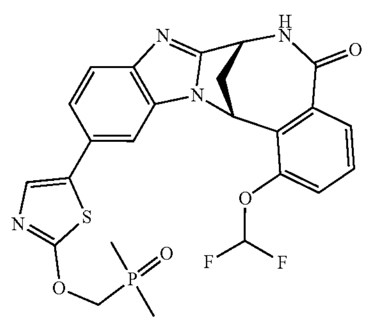 [SMILES: CP(C)(=O)COc1ncc(-c2ccc3nc4n(c3c2)[C@@H]2C[C@H]4NC(=O)c3cccc(OC(F)F)c32)s1] | (1R,11R)-18-(difluoromethoxy)-5-{2-[(dimethylphosphoryl)methoxy]-1,3-thiazol-5-yl}-2,9,12-triazapentacyclo[9.8.1.0^{2,10}.0^{3,8}.0^{14,19}]icosa-3(8),4,6,9,14(19),15,17-heptaen-13-one |
| 43 | 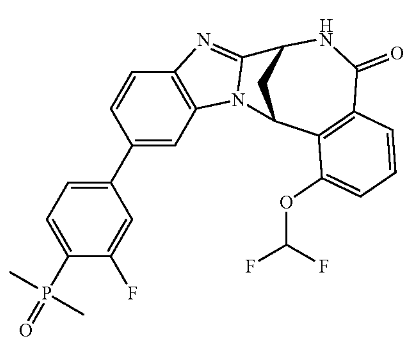 [SMILES: CP(C)(=O)c1ccc(-c2ccc3nc4n(c3c2)[C@@H]2C[C@H]4NC(=O)c3cccc(OC(F)F)c32)cc1F] | (1R,11R)-18-(difluoromethoxy)-5-[4-(dimethylphosphoryl)-3-fluorophenyl]-2,9,12-triazapentacyclo[9.8.1.0^{2,10}.0^{3,8}.0^{14,19}]icosa-3(8),4,6,9,14(19),15,17-heptaen-13-one |

TABLE 1-continued

| Synthetic Chemistry Example | Compound Structure | Compound Name |
|---|---|---|
| 44 | 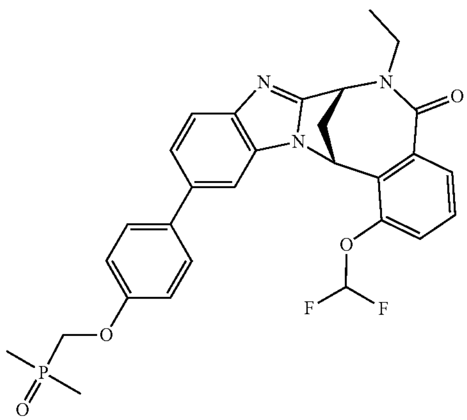 [SMILES: CCN1C(=O)c2cccc(OC(F)F)c2[C@H]2C[C@@H]1c1nc3ccc(-c4ccc(OCP(C)(C)=O)cc4)cc3n12] | (1R,11R)-18-(difluoromethoxy)-5-{4-[(dimethylphosphoryl)methoxy ]phenyl }-12-cthyl-2,9,12-triazapentacyclo[9.8.1.0^{2,10}.0^{3,8}.0^{14,19}]icosa-3(8),4,6,9,14(19),15,17-heptaen-13-one |
| 45 | 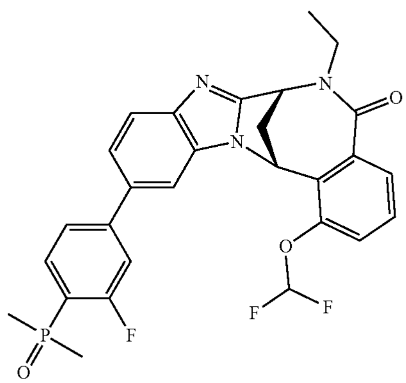 [SMILES: CCN1C(=O)c2cccc(OC(F)F)c2[C@H]2C[C@@H]1c1nc3ccc(-c4ccc(P(C)(C)=O)c(F)c4)cc3n12] | (1R,11R)-18-(difluoromethoxy)-5-[4-(dimethylphosphoryl)-3-fluorophenyl]-12-ethyl-2,9,12-triazapentacyclo[9.8.1.0^{2,10}.0^{3,8}.0^{14,19}]icosa-3(8),4,6,9,14(19),15,17-heptaen-13-one |
| 46 | 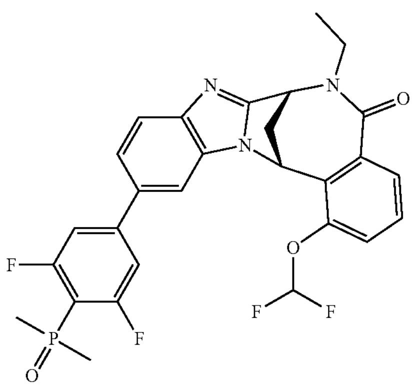 [SMILES: CCN1C(=O)c2cccc(OC(F)F)c2[C@H]2C[C@@H]1c1nc3ccc(-c4cc(F)c(P(C)(C)=O)c(F)c4)cc3n12] | (1R,11R)-18-(difluoromethoxy)-5-[4-(dimethylphosphoryl)-3,5-difluorophenyl]-12-ethyl-2,9,12-triazapentacyclo[9.8.1.0^{2,10}.0^{3,8}.0^{14,19}]icosa-3(8),4,6,9,14(19),15,17-heptaen-13-one |
| 47 | 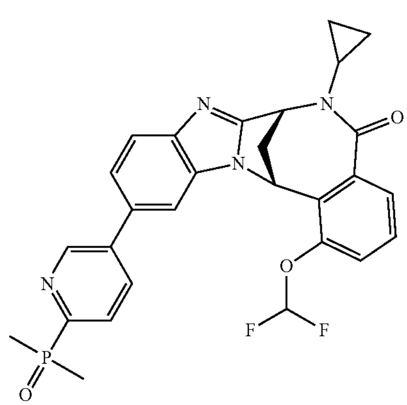 [SMILES: CP(C)(=O)c1ccc(-c2ccc3nc4n(c3c2)[C@@H]2C[C@H]4N(C3CC3)C(=O)c3cccc(OC(F)F)c32)cn1] | (1R,11R)-12-cyclopropyl-18-(difluoromethoxy)-5-[6-(dimethylphosphoryl)pyridin-3-yl]-2,9,12-triazapentacyclo[9.8.1.0^{2,10}.0^{3,8}.0^{14,19}]icosa-3(8),4,6,9,14(19),15,17-heptaen-13-one |

TABLE 1-continued

| Synthetic Chemistry Example | Compound Structure | Compound Name |
| --- | --- | --- |
| 48 | 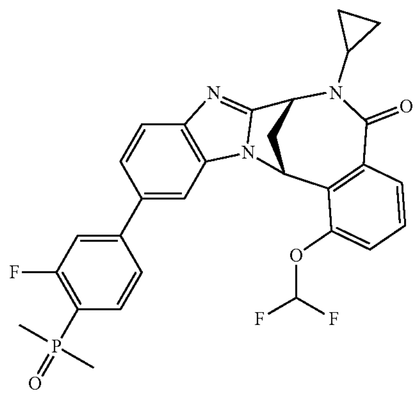 [SMILES: CP(C)(=O)c1ccc(-c2ccc3nc4n(c3c2)[C@@H]2C[C@H]4N(C3CC3)C(=O)c3cccc(OC(F)F)c32)cc1F] | (1R,11R)-12-cyclopropyl-18-(difluoromethoxy)-5-[4-(dimethylphosphoryl)-3-fluorophenyl]-2,9,12-triazapentacyclo[9.8.1.0^{2,10}.0^{3,8}.0^{14,19}]icosa-3(8),4,6,9,14(19),15,17-heptaen-13-one |
| 49 | 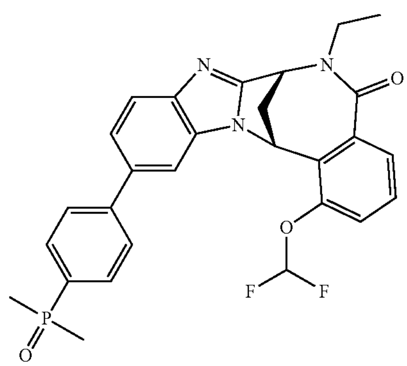 [SMILES: CCN1C(=O)c2cccc(OC(F)F)c2[C@H]2C[C@@H]1c1nc3ccc(-c4ccc(P(C)(C)=O)cc4)cc3n12] | (1R,11R)-18-(difluoromethoxy)-5-[4-(dimethylphosphoryl)phenyl]-12-ethyl-2,9,12-triazapentacyclo[9.8.1.0^{2,10}.0^{3,8}.0^{14,19}]icosa-3(8),4,6,9,14(19),15,17-heptaen-13-one |
| 50 | 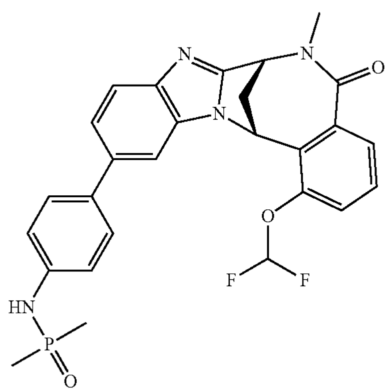 [SMILES: CN1C(=O)c2cccc(OC(F)F)c2[C@H]2C[C@@H]1c1nc3ccc(-c4ccc(NP(C)(C)=O)cc4)cc3n12] | (1R,11R)-18-(difluoromethoxy)-5-{4-[(dimethylphosphoryl)amino]phenyl}-12-methyl-2,9,12-triazapentacyclo[9.8.1.0^{2,10}.0^{3,8}.0^{14,19}]icosa-3(8),4,6,9,14(19),15,17-heptaen-13-one |
| 51 | 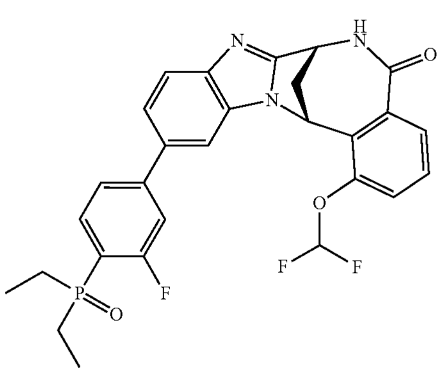 [SMILES: CCP(=O)(CC)c1ccc(-c2ccc3nc4n(c3c2)[C@@H]2C[C@H]4NC(=O)c3cccc(OC(F)F)c32)cc1F] | (1R,11R)-5-[4-(diethylphosphoryl)-3-fluorophenyl]-18-(difluoromethoxy)-2,9,12-triazapentacyclo[9.8.1.0^{2,10}.0^{3,8}.0^{14,19}]icosa-3(8),4,6,9,14(19),15,17-heptaen-13-one |

TABLE 1-continued

| Synthetic Chemistry Example | Compound Structure | Compound Name |
|---|---|---|
| 52 | 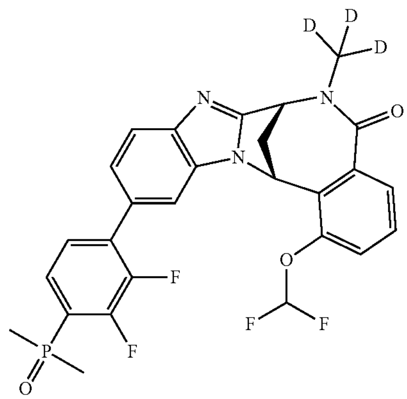 [SMILES: [2H]C([2H])([2H])N1C(=O)c2cccc(OC(F)F)c2[C@H]2C[C@@H]1c1nc3ccc(-c4ccc(P(C)(C)=O)c(F)c4F)cc3n12] | (7R,14R)-1-(difluoromethoxy)-11-(4-(dimethylphosphoryl)-2,3-difluorophenyl)-6-(methyl-$d_3$)-6,7-dihydro-7,14-methanobenzo[f]benzo[4,5]imidazo[1,2-a][1,4]diazocin-5(14H)-one |
| 53 | 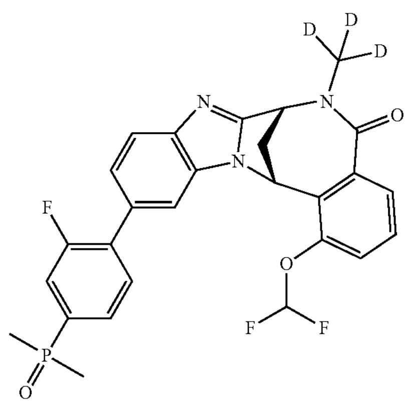 [SMILES: [2H]C([2H])([2H])N1C(=O)c2cccc(OC(F)F)c2[C@H]2C[C@@H]1c1nc3ccc(-c4ccc(P(C)(C)=O)cc4F)cc3n12] | (7R,14R)-1-(difluoromethoxy)-11-(4-(dimethylphosphoryl)-2-fluorophenyl)-6-(methyl-$d_3$)-6,7-dihydro-7,14-methanobenzo[f]benzo[4,5]imidazo[1,2-a][1,4]diazocin-5(14H)-one |
| 54 | 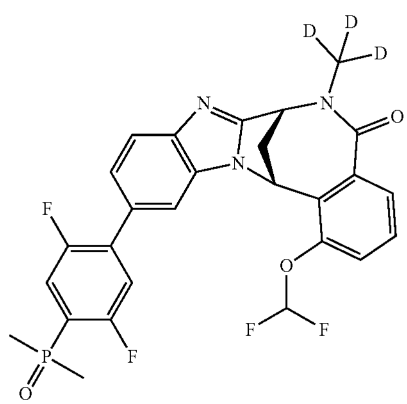 [SMILES: [2H]C([2H])([2H])N1C(=O)c2cccc(OC(F)F)c2[C@H]2C[C@@H]1c1nc3ccc(-c4cc(F)c(P(C)(C)=O)cc4F)cc3n12] | (7R,14R)-1-(difluoromethoxy)-11-(4-(dimethylphosphoryl)-2,5-difluorophenyl)-6-(methyl-$d_3$)-6,7-dihydro-7,14-methanobenzo[f]benzo[4,5]imidazo[1,2-a][1,4]diazocin-5(14H)-one |
| 55 | 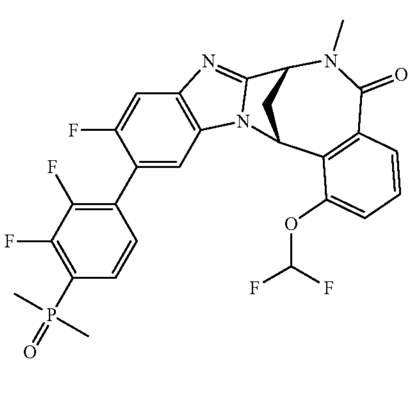 [SMILES: CN1C(=O)c2cccc(OC(F)F)c2[C@H]2C[C@@H]1c1nc3cc(F)c(-c4ccc(P(C)(C)=O)c(F)c4F)cc3n12] | (1R,11R)-18-(difluoromethoxy)-5-[4-(dimethylphosphoryl)-2,3-difluorophenyl]-6-fluoro-12-methyl-2,9,12-triazapentacyclo[9.8.1.0^{2,10}.0^{3,8}.0^{14,19}]icosa-3(8),4,6,9,14(19),15,17-heptaen-13-one |

TABLE 1-continued

| Synthetic Chemistry Example | Compound Structure | Compound Name |
|---|---|---|
| 56 | 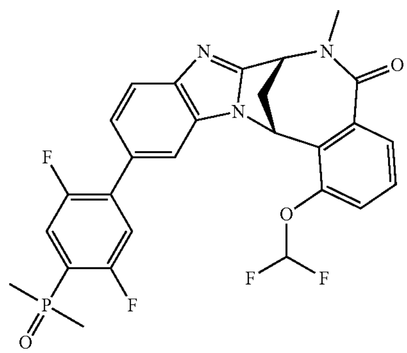 [SMILES: CN1C(=O)c2cccc(OC(F)F)c2[C@H]2C[C@@H]1c1nc3ccc(-c4cc(F)c(P(C)(C)=O)cc4F)cc3n12] | (1R,11R)-18-(difluoromethoxy)-5-[4-(dimethylphosphoryl)-2,5-difluorophenyl]-12-methyl-2,9,12-triazapentacyclo[9.8.1.0^{2,10}.0^{3,8}.0^{14,19}]icosa-3(8),4,6,9,14(19),15,17-heptaen-13-one |
| 57 | 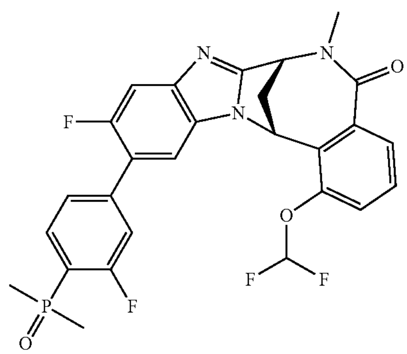 [SMILES: CN1C(=O)c2cccc(OC(F)F)c2[C@H]2C[C@@H]1c1nc3cc(F)c(-c4ccc(P(C)(C)=O)c(F)c4)cc3n12] | (1R,11R)-18-(difluoromethoxy)-5-[4-(dimethylphosphoryl)-3-fluorophenyl]-6-fluoro-12-methyl-2,9,12-triazapentacyclo[9.8.1.0^{2,10}.0^{3,8}.0^{14,19}]icosa-3(8),4,6,9,14(19),15,17-heptaen-13-one |
| 58 | 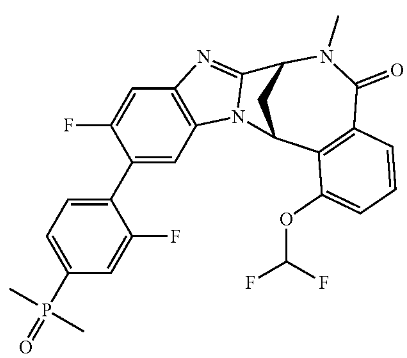 [SMILES: CN1C(=O)c2cccc(OC(F)F)c2[C@H]2C[C@@H]1c1nc3cc(F)c(-c4ccc(P(C)(C)=O)cc4F)cc3n12] | (1R,11R)-18-(difluoromethoxy)-5-[4-(dimethylphosphoryl)-2-fluorophenyl]-6-fluoro-12-methyl-2,9,12-triazapentacyclo[9.8.1.0^{2,10}.0^{3,8}.0^{14,19}]icosa-3(8),4,6,9,14(19),15,17-heptaen-13-one |
| 59 | 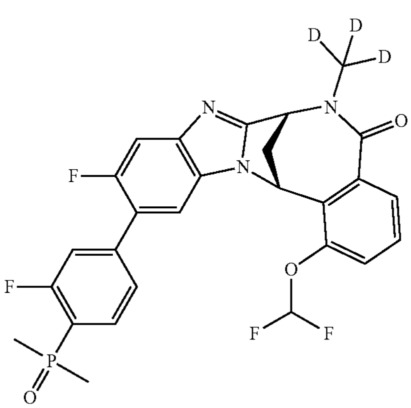 [SMILES: [2H]C([2H])([2H])N1C(=O)c2cccc(OC(F)F)c2[C@H]2C[C@@H]1c1nc3cc(F)c(-c4ccc(P(C)(C)=O)c(F)c4)cc3n12] | (7R,14R)-1-(difluoromethoxy)-11-(4-(dimethylphosphoryl)-3-fluorophenyl)-10-fluoro-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 60 | 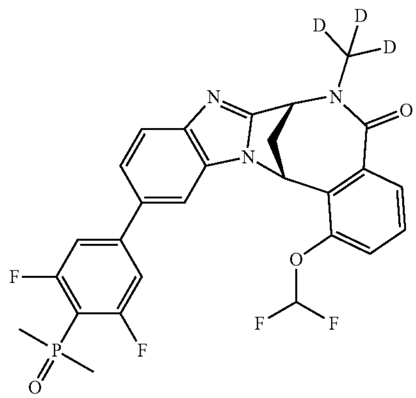 [SMILES: [2H]C([2H])([2H])N1C(=O)c2cccc(OC(F)F)c2[C@H]2C[C@@H]1c1nc3ccc(-c4cc(F)c(P(C)(C)=O)c(F)c4)cc3n12] | (7R,14R)-1-(difluoromethoxy)-11-(4-(dimethylphosphoryl)-3,5-difluorophenyl)-6-(methyl-$d_3$)-6,7-dihydro-7,14-methanobenzo[f]benzo[4,5]imidazo[1,2-a][1,4]diazocin-5(14H)-one |
| 61 | 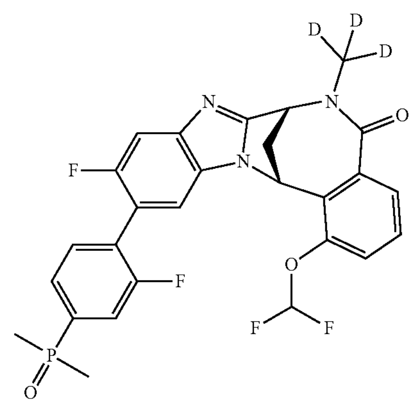 [SMILES: [2H]C([2H])([2H])N1C(=O)c2cccc(OC(F)F)c2[C@H]2C[C@@H]1c1nc3cc(F)c(-c4ccc(P(C)(C)=O)cc4F)cc3n12] | (7R,14R)-1-(difluoromethoxy)-11-(4-(dimethylphosphoryl)-2-fluorophenyl)-10-fluoro-6-(methyl-$d_3$)-6,7-dihydro-7,14-methanobenzo[f]benzo[4,5]imidazo[1,2-a][1,4]diazocin-5(14H)-one |
| 62 | 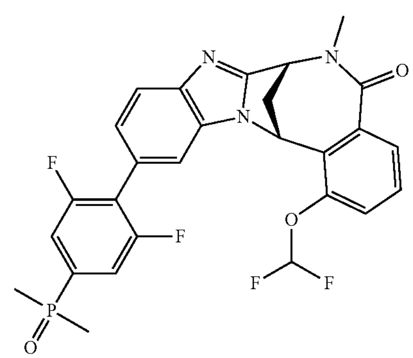 [SMILES: CN1C(=O)c2cccc(OC(F)F)c2[C@H]2C[C@@H]1c1nc3ccc(-c4c(F)cc(P(C)(C)=O)cc4F)cc3n12] | (1R,11R)-18-(difluoromethoxy)-5-[4-(dimethylphosphoryl)-2,6-difluorophenyl]-12-methyl-2,9,12-triazapentacyclo[9.8.1.0^{2,10}.0^{3,8}.0^{14,19}]icosa-3(8),4,6,9,14(19),15,17-heptaen-13-one |
| 63 | 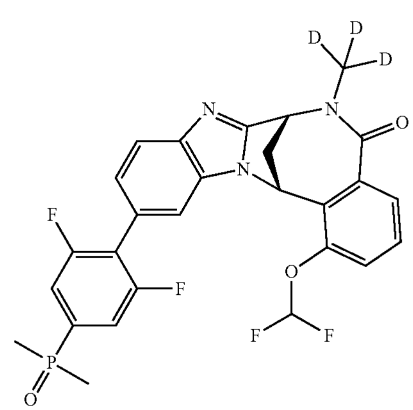 [SMILES: [2H]C([2H])([2H])N1C(=O)c2cccc(OC(F)F)c2[C@H]2C[C@@H]1c1nc3ccc(-c4c(F)cc(P(C)(C)=O)cc4F)cc3n12] | (7R,14R)-1-(difluoromethoxy)-11-(4-(dimethylphosphoryl)-2,6-difluorophenyl)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 64 | 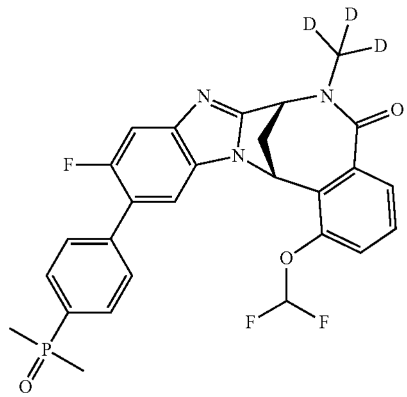 [SMILES: [2H]C([2H])([2H])N1C(=O)c2cccc(OC(F)F)c2[C@H]2C[C@@H]1c1nc3cc(F)c(-c4ccc(P(C)(C)=O)cc4)cc3n12] | (7R,14R)-1-(difluoromethoxy)-11-(4-(dimethylphosphoryl)phenyl)-10-fluoro-6-(methyl-$d_3$)-6,7-dihydro-7,14-methanobenzo[f]benzo[4,5]imidazo[1,2-a][1,4]diazocin-5(14H)-one |
| 65 | 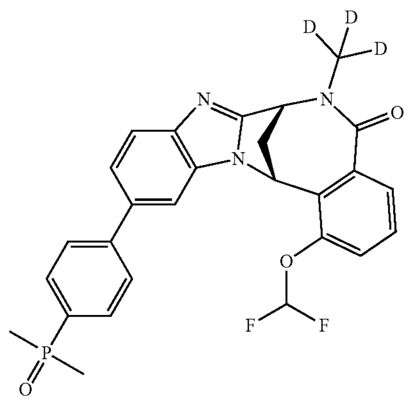 [SMILES: [2H]C([2H])([2H])N1C(=O)c2cccc(OC(F)F)c2[C@H]2C[C@@H]1c1nc3ccc(-c4ccc(P(C)(C)=O)cc4)cc3n12] | (7R,14R)-1-(difluoromethoxy)-11-(4-(dimethylphosphoryl)phenyl)-6-(methyl-$d_3$)-6,7-dihydro-7,14-methanobenzo[f]benzo[4,5]imidazo[1,2-a][1,4]diazocin-5(14H)-one |
| 66 | 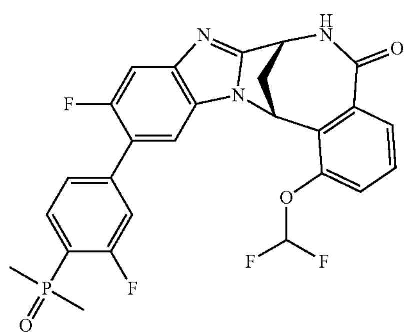 [SMILES: CP(C)(=O)c1ccc(-c2cc3c(cc2F)nc2n3[C@@H]3C[C@H]2NC(=O)c2cccc(OC(F)F)c23)cc1F] | (7R,14R)-1-(difluoromethoxy)-11-(4-(dimethylphosphoryl)-3-fluorophenyl)-10-fluoro-6,7-dihydro-7,14-methanobenzo[f]benzo[4,5]imidazo[1,2-a][1,4]diazocin-5(14H)-one |
| 67 | 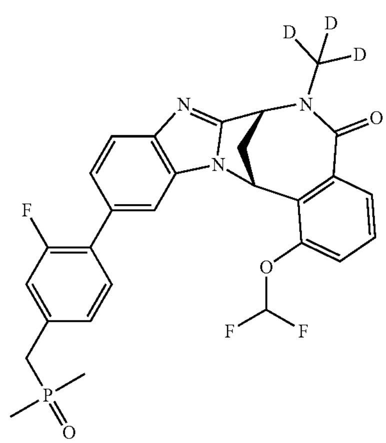 [SMILES: [2H]C([2H])([2H])N1C(=O)c2cccc(OC(F)F)c2[C@H]2C[C@@H]1c1nc3ccc(-c4ccc(CP(C)(C)=O)cc4F)cc3n12] | (7R,14R)-1-(difluoromethoxy)-11-(4-((dimethylphosphoryl)methyl)-2-fluorophenyl)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
| --- | --- | --- |
| 68 | 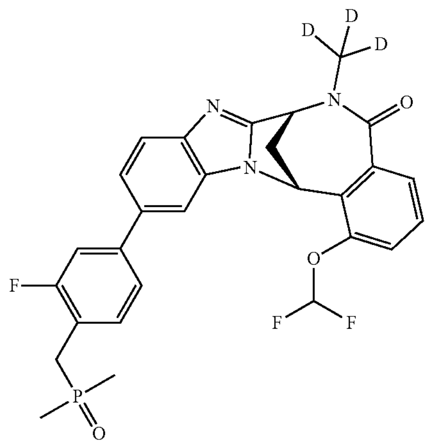 [SMILES: [2H]C([2H])([2H])N1C(=O)c2cccc(OC(F)F)c2[C@H]2C[C@H]1c1nc3ccc(-c4ccc(CP(C)(C)=O)c(F)c4)cc3n12] | (7R,14R)-1-(difluoromethoxy)-11-(4-((dimethylphosphoryl)methyl)-3-fluorophenyl)-6-(methyl-$d_3$)-6,7-dihydro-7,14-methanobenzo[f]benzo[4,5]imidazo[1,2-a][1,4]diazocin-5(14H)-one |
| 69 | 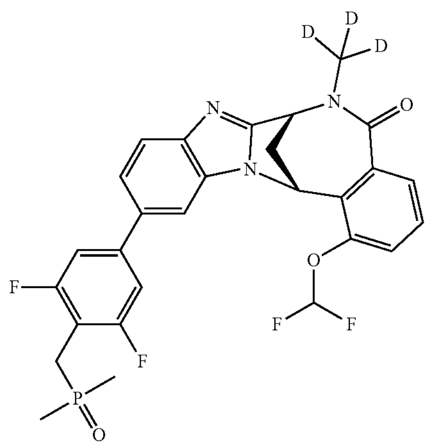 [SMILES: [2H]C([2H])([2H])N1C(=O)c2cccc(OC(F)F)c2[C@H]2C[C@H]1c1nc3ccc(-c4cc(F)c(CP(C)(C)=O)c(F)c4)cc3n12] | (7R,14R)-1-(difluoromethoxy)-11-(4-((dimethylphosphoryl)methyl)-3,5-difluorophenyl)-6-(methyl-$d_3$)-6,7-dihydro-7,14-methanobenzo[f]benzo[4,5]imidazo[1,2-a][1,4]diazocin-5(14H)-one |
| 70 | 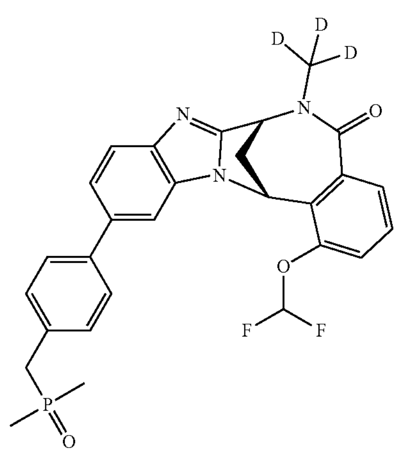 [SMILES: [2H]C([2H])([2H])N1C(=O)c2cccc(OC(F)F)c2[C@H]2C[C@H]1c1nc3ccc(-c4ccc(CP(C)(C)=O)cc4)cc3n12] | (7R,14R)-1-(difluoromethoxy)-11-(4-((dimethylphosphoryl)methyl)phenyl)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 71 | 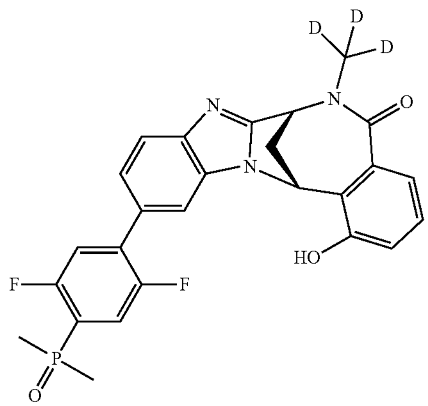 [SMILES: [2H]C([2H])([2H])N1C(=O)c2cccc(O)c2[C@H]2C[C@H]1c1nc3ccc(-c4cc(F)c(P(C)(C)=O)cc4F)cc3n12] | (7R,14R)-11-(4-(dimethylphosphoryl)-2,5-difluorophenyl)-1-hydroxy-6-(methyl-$d_3$)-6,7-dihydro-7,14-methanobenzo[f]benzo[4,5]imidazo[1,2-a][1,4]diazocin-5(14H)-one |
| 72 | 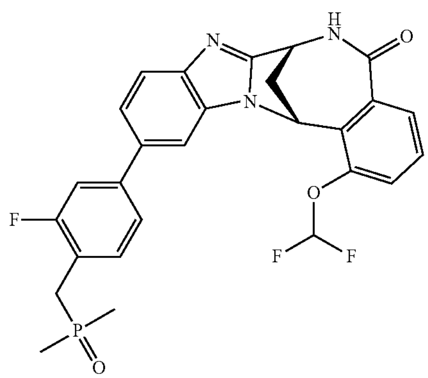 [SMILES: CP(C)(=O)Cc1ccc(-c2ccc3nc4n(c3c2)[C@@H]2C[C@@H]4NC(=O)c3cccc(OC(F)F)c32)cc1F] | (7R,14R)-1-(difluoromethoxy)-11-(4-((dimethylphosphoryl)methyl)-3-fluorophenyl)-6,7-dihydro-7,14-methanobenzo[f]benzo[4,5]imidazo[1,2-a][1,4]diazocin-5(14H)-one |
| 73 | 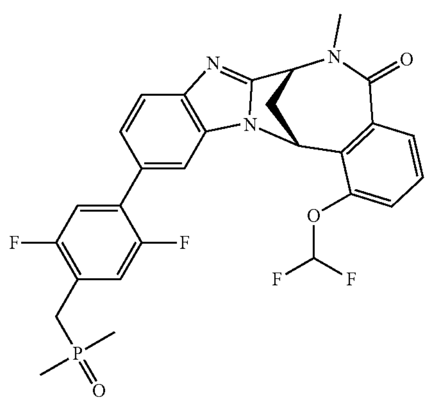 [SMILES: CN1C(=O)c2cccc(OC(F)F)c2[C@H]2C[C@H]1c1nc3ccc(-c4cc(F)c(CP(C)(C)=O)cc4F)cc3n12] | (7R,14R)-1-(difluoromethoxy)-11-(4-((dimethylphosphoryl)methyl)-2,5-difluorophenyl)-6-methyl-6,7-dihydro-7,14-methanobenzo[f]benzo[4,5]imidazo[1,2-a][1,4]diazocin-5(14H)-one |
| 74 | 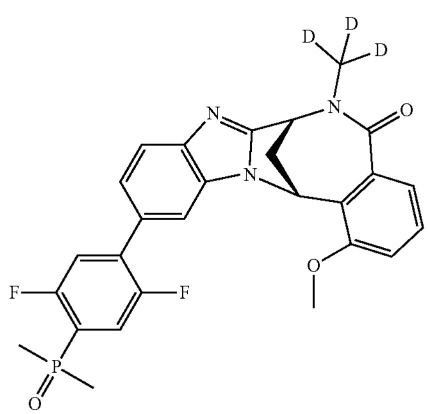 [SMILES: [2H]C([2H])([2H])N1C(=O)c2cccc(OC)c2[C@H]2C[C@H]1c1nc3ccc(-c4cc(F)c(P(C)(C)=O)cc4F)cc3n12] | (7R,14R)-11-(4-(dimethylphosphoryl)-2,5-difluorophenyl)-1-methoxy-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
| --- | --- | --- |
| 75 | 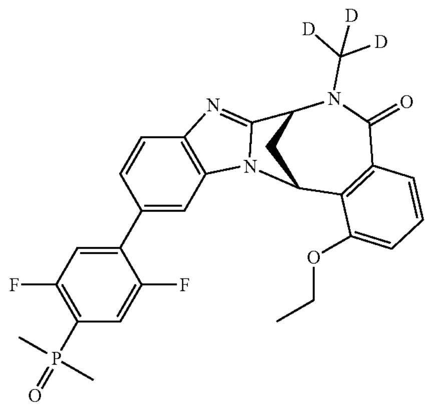 [SMILES: [2H]C([2H])([2H])N1C(=O)c2cccc(OCC)c2[C@H]2C[C@H]1c1nc3ccc(-c4cc(F)c(P(C)(C)=O)cc4F)cc3n12] | (7R,14R)-11-(4-(dimethylphosphoryl)-2,5-difluorophenyl)-1-ethoxy-6-(methyl-$d_3$)-6,7-dihydro-7,14-methanobenzo[f]benzo[4,5]imidazo[1,2-a][1,4]diazocin-5(14H)-one |
| 76 | 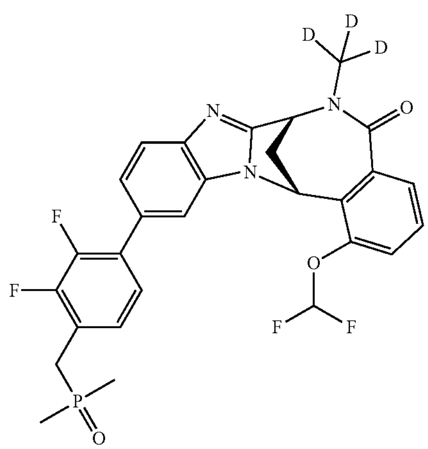 [SMILES: [2H]C([2H])([2H])N1C(=O)c2cccc(OC(F)F)c2[C@H]2C[C@H]1c1nc3ccc(-c4ccc(CP(C)(C)=O)c(F)c4F)cc3n12] | (7R,14R)-1-(difluoromethoxy)-11-(4-((dimethylphosphoryl)methyl)-2,3-difluorophenyl)-6-(methyl-$d_3$)-6,7-dihydro-7,14-methanobenzo[f]benzo[4,5]imidazo[1,2-a][1,4]diazocin-5(14H)-one |
| 77 | 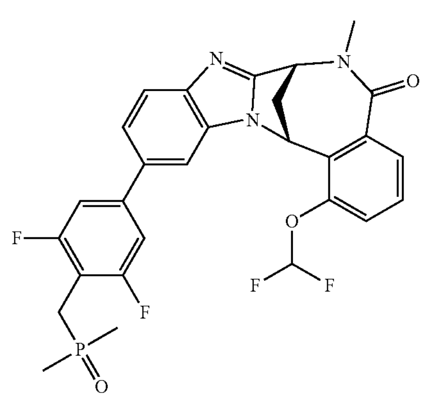 [SMILES: CN1C(=O)c2cccc(OC(F)F)c2[C@H]2C[C@@H]1c1nc3ccc(-c4cc(F)c(CP(C)(C)=O)c(F)c4)cc3n12] | (7R,14R)-1-(difluoromethoxy)-11-(4-((dimethylphosphoryl)methyl)-3,5-difluorophenyl)-6-methyl-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
| --- | --- | --- |
| 78 | 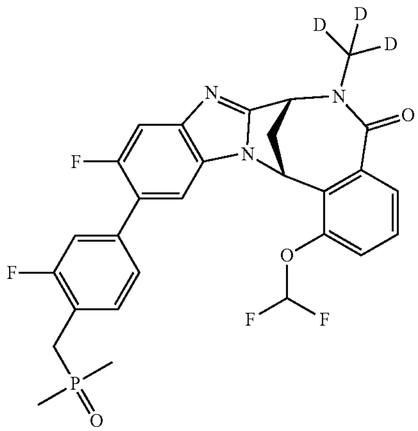 [SMILES: [2H]C([2H])([2H])N1C(=O)c2cccc(OC(F)F)c2[C@H]2C[C@@H]1c1nc3cc(F)c(-c4ccc(CP(C)(C)=O)c(F)c4)cc3n12] | (7R,14R)-1-(difluoromethoxy)-11-(4-((dimethylphosphoryl)methyl)-3-fluorophenyl)-10-fluoro-6-(methyl-$d_3$)-6,7-dihydro-7,14-methanobenzo[f]benzo[4,5]imidazo[1,2-a][1,4]diazocin-5(14H)-one |
| 79 | 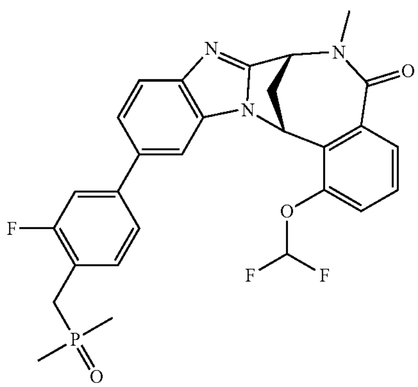 [SMILES: CN1C(=O)c2cccc(OC(F)F)c2[C@H]2C[C@@H]1c1nc3ccc(-c4ccc(CP(C)(C)=O)c(F)c4)cc3n12] | (7R,14R)-1-(difluoromethoxy)-11-(4-((dimethylphosphoryl)methyl)-3-fluorophenyl)-6-methyl-6,7-dihydro-7,14-methanobenzo[f]benzo[4,5]imidazo[1,2-a][1,4]diazocin-5(14H)-one |
| 80 | 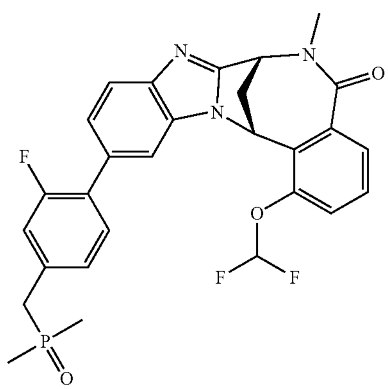 [SMILES: CN1C(=O)c2cccc(OC(F)F)c2[C@H]2C[C@@H]1c1nc3ccc(-c4ccc(CP(C)(C)=O)cc4F)cc3n12] | (7R,14R)-1-(difluoromethoxy)-11-(4-((dimethylphosphoryl)methyl)-2-fluorophenyl)-6-methyl-6,7-dihydro-7,14-methanobenzo[f]benzo[4,5]imidazo[1,2-a][1,4]diazocin-5(14H)-one |
| 81 | 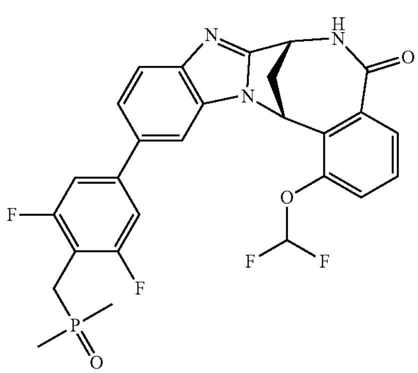 [SMILES: CP(C)(=O)Cc1c(F)cc(-c2ccc3nc4n(c3c2)[C@@H]2C[C@H]4NC(=O)c3cccc(OC(F)F)c32)cc1F] | (7R,14R)-1-(difluoromethoxy)-11-(4-((dimethylphosphoryl)methyl)-3,5-difluorophenyl)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 82 | 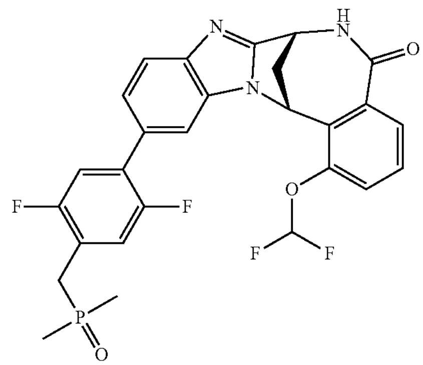 [SMILES: CP(C)(=O)Cc1cc(F)c(-c2ccc3nc4n(c3c2)[C@@H]2C[C@H]4NC(=O)c3cccc(OC(F)F)c32)cc1F] | (7R,14R)-1-(difluoromethoxy)-11-(4-((dimethylphosphoryl)methyl)-2,5-difluorophenyl)-6,7-dihydro-7,14-methanobenzo[f]benzo[4,5]imidazo[1,2-a][1,4]diazocin-5(14H)-one |
| 83 | 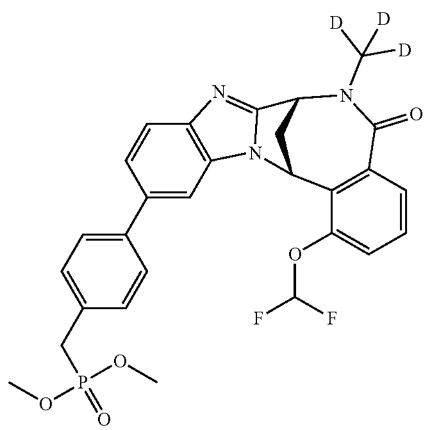 [SMILES: [2H]C([2H])([2H])N1C(=O)c2cccc(OC(F)F)c2[C@H]2C[C@@H]1c1nc3ccc(-c4ccc(CP(=O)(OC)OC)cc4)cc3n12] | dimethyl (4-((7R,14R)-1-(difluoromethoxy)-6-(methyl-$d_3$)-5-oxo-5,6,7,14-tetrahydro-7,14-methanobenzo[f]benzo[4,5]imidazo[1,2-a][1,4]diazocin-11-yl)benzyl)phosphonate |
| 84 | 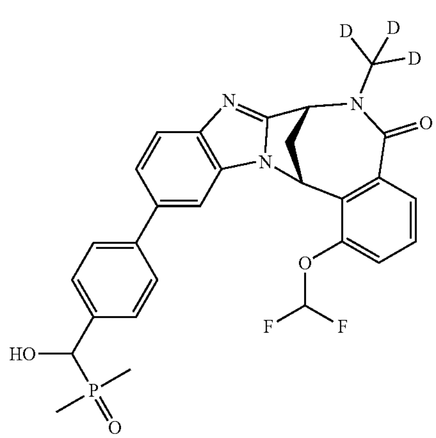 [SMILES: [2H]C([2H])([2H])N1C(=O)c2cccc(OC(F)F)c2[C@H]2C[C@@H]1c1nc3ccc(-c4ccc(C(O)P(C)(C)=O)cc4)cc3n12] | (7R,14R)-1-(difluoromethoxy)-11-(4-((dimethylphosphoryl)(hydroxy)methyl)phenyl)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 85 and 86 | 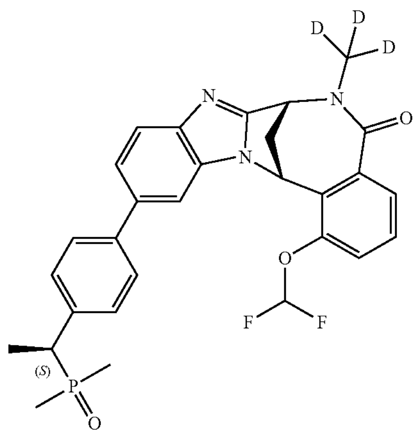 + 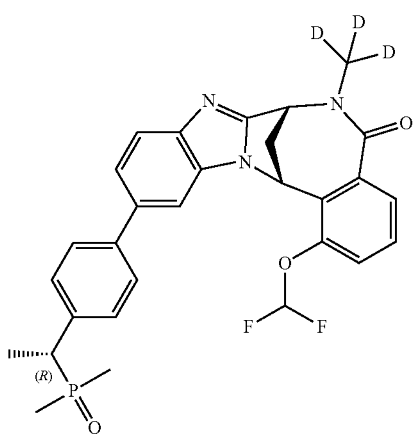 | (7R,14R)-1-(difluoromethoxy)-11-(4-((S or R)-1-(dimethylphosphoryl)ethyl)phenyl)-6-(methyl-$d_3$)-6,7-dihydro-7,14-methanobenzo[f]benzo[4,5]imidazo[1,2-a][1,4]diazocin-5(14H)-one And (7R,14R)-1-(difluoromethoxy)-11-(4-((R or S)-1-(dimethylphosphoryl)ethyl)phenyl)-6-(methyl-$d_3$)-6,7-dihydro-7,14-methanobenzo[f]benzo[4,5]imidazo[1,2-a][1,4]diazocin-5(14H)-one |
| 87 | 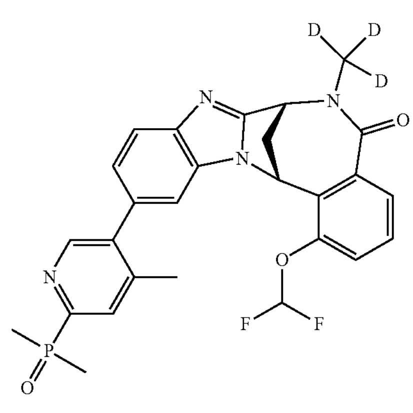 [SMILES: [2H]C([2H])([2H])N1C(=O)c2cccc(OC(F)F)c2[C@H]2C[C@@H]1c1nc3ccc(-c4cnc(P(C)(C)=O)cc4C)cc3n12] | (7R,14R)-1-(difluoromethoxy)-11-(6-(dimethylphosphoryl)-4-methylpyridin-3-yl)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 88 | 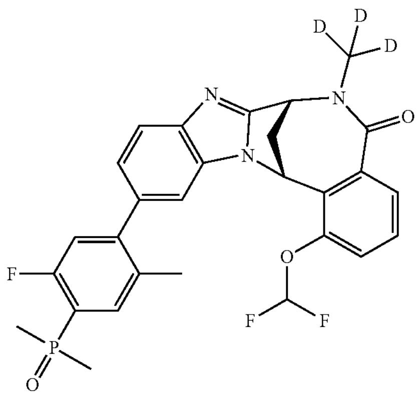 [SMILES: [2H]C([2H])([2H])N1C(=O)c2cccc(OC(F)F)c2[C@H]2C[C@@H]1c1nc3ccc(-c4cc(F)c(P(C)(C)=O)cc4C)cc3n12] | (7R,14R)-1-(difluoromethoxy)-11-(4-(dimethylphosphoryl)-5-fluoro-2-methylphenyl)-6-(methyl-$d_3$)-6,7-dihydro-7,14-methanobenzo[f]benzo[4,5]imidazo[1,2-a][1,4]diazocin-5(14H)-one |
| 89 | 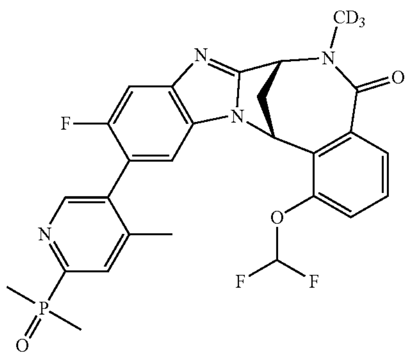 [SMILES: [2H]C([2H])([2H])N1C(=O)c2cccc(OC(F)F)c2[C@H]2C[C@@H]1c1nc3cc(F)c(-c4cnc(P(C)(C)=O)cc4C)cc3n12] | (7R,14R)-1-(difluoromethoxy)-11-(6-(dimethylphosphoryl)-4-methylpyridin-3-yl)-10-fluoro-6-(methyl-$d_3$)-6,7-dihydro-7,14-methanobenzo[f]benzo[4,5]imidazo[1,2-a][1,4]diazocin-5(14H)-one |
| 90 | 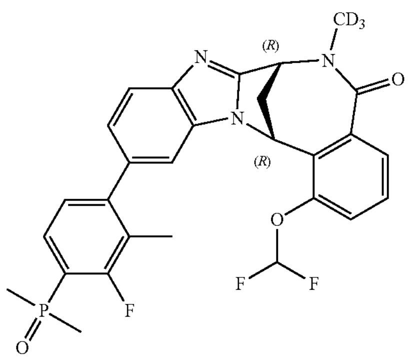 | (7R,14R)-1-(difluoromethoxy)-11-(4-(dimethylphosphoryl)-3-fluoro-2-methylphenyl)-6-(methyl-$d_3$)-6,7-dihydro-7,14-methanobenzo[f]benzo[4,5]imidazo[1,2-a][1,4]diazocin-5(14H)-one |
| 91 | 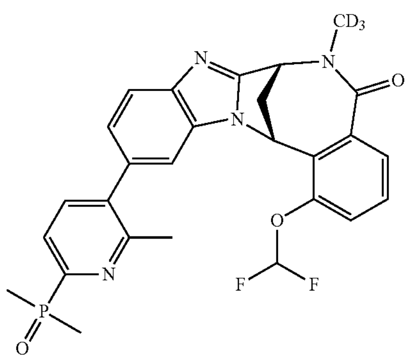 [SMILES: [2H]C([2H])([2H])N1C(=O)c2cccc(OC(F)F)c2[C@H]2C[C@@H]1c1nc3ccc(-c4ccc(P(C)(C)=O)nc4C)cc3n12] | (7R,14R)-1-(difluoromethoxy)-11-(6-(dimethylphosphoryl)-2-methylpyridin-3-yl)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 92 | 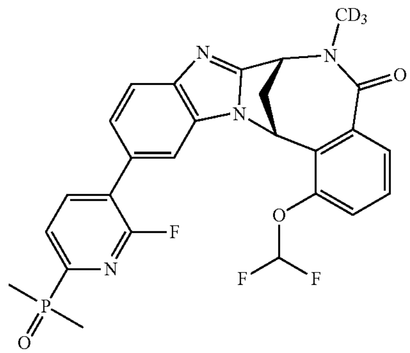 | (7R,14R)-1-(difluoromethoxy)-11-(6-(dimethylphosphoryl)-2-fluoropyridin-3-yl)-6-(methyl-$d_3$)-6,7-dihydro-7,14-methanobenzo[f]benzo[4,5]imidazo[1,2-a][1,4]diazocin-5(14H)-one |
| 93 | 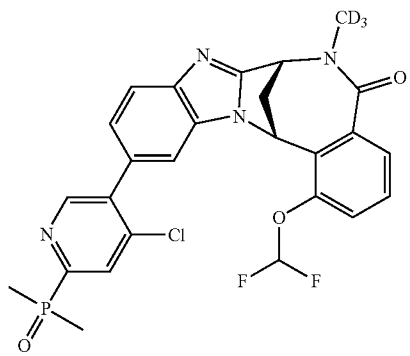 [SMILES: [2H]C([2H])([2H])N1C(=O)c2cccc(OC(F)F)c2[C@H]2C[C@@H]1c1nc3ccc(-c4cnc(P(C)(C)=O)cc4Cl)cc3n12] | (7R,14R)-11-(4-chloro-6-(dimethylphosphoryl)pyridin-3-yl)-1-(difluoromethoxy)-6-(methyl-$d_3$)-6,7-dihydro-7,14-methanobenzo[f]benzo[4,5]imidazo[1,2-a][1,4]diazocin-5(14H)-one |
| 94 | 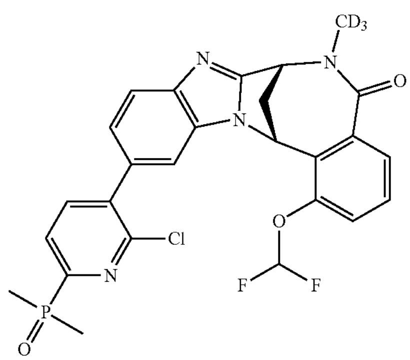 [SMILES: [2H]C([2H])([2H])N1C(=O)c2cccc(OC(F)F)c2[C@H]2C[C@@H]1c1nc3ccc(-c4ccc(P(C)(C)=O)nc4Cl)cc3n12] | (7R,14R)-11-(2-chloro-6-(dimethylphosphoryl)pyridin-3-yl)-1-(difluoromethoxy)-6-(methyl-$d_3$)-6,7-dihydro-7,14-methanobenzo[f]benzo[4,5]imidazo[1,2-a][1,4]diazocin-5(14H)-one |
| 95 | 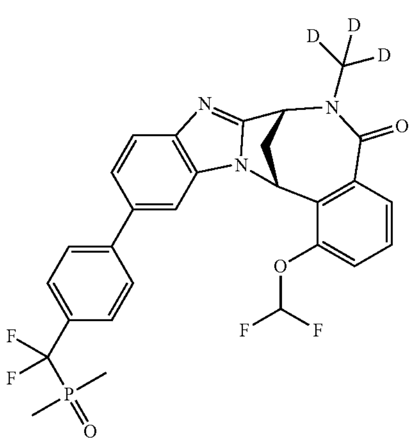 [SMILES: [2H]C([2H])([2H])N1C(=O)c2cccc(OC(F)F)c2[C@H]2C[C@@H]1c1nc3ccc(-c4ccc(C(F)(F)P(C)(C)=O)cc4)cc3n12] | (7R,14R)-1-(difluoromethoxy)-11-(4-((dimethylphosphoryl)difluoromethyl)phenyl)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 96 | 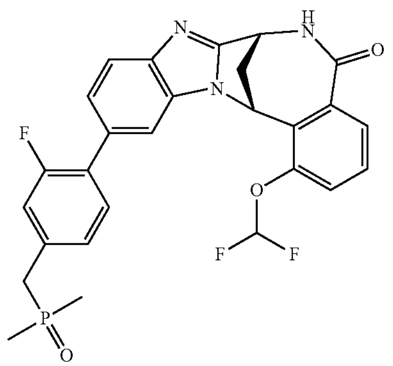 [SMILES: CP(C)(=O)Cc1ccc(-c2ccc3nc4n(c3c2)[C@@H]2C[C@H]4NC(=O)c3cccc(OC(F)F)c32)c(F)c1] | (7R,14R)-1-(difluoromethoxy)-11-(4-((dimethylphosphoryl)methyl)-2-fluorophenyl)-6,7-dihydro-7,14-methanobenzo[f]benzo[4,5]imidazo[1,2-a][1,4]diazocin-5(14H)-one |
| 97 | 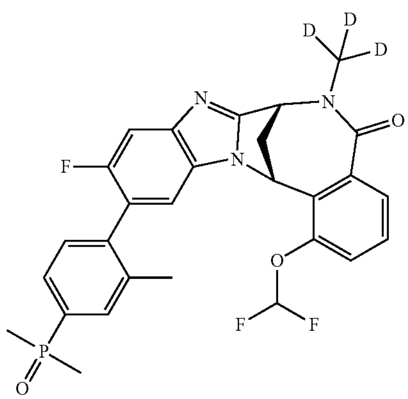 [SMILES: [2H]C([2H])([2H])N1C(=O)c2cccc(OC(F)F)c2[C@H]2C[C@@H]1c1nc3cc(F)c(-c4ccc(P(C)(C)=O)cc4C)cc3n12] | (7R,14R)-1-(difluoromethoxy)-11-(6-(dimethylphosphoryl)-2-methylpyridin-3-yl)-10-fluoro-6-(methyl-$d_3$)-6,7-dihydro-7,14-methanobenzo[f]benzo[4,5]imidazo[1,2-a][1,4]diazocin-5(14H)-one |
| 98 | 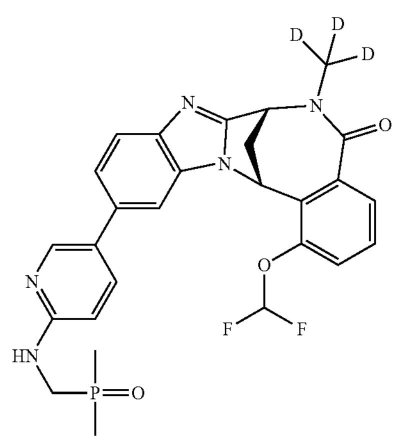 [SMILES: [2H]C([2H])([2H])N1C(=O)c2cccc(OC(F)F)c2[C@H]2C[C@@H]1c1nc3ccc(-c4ccc(NCP(C)(C)=O)nc4)cc3n12] | (7R,14R)-1-(difluoromethoxy)-11-(6-(((dimethylphosphoryl)methyl)amino)pyridin-3-yl)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 99 and 100 | 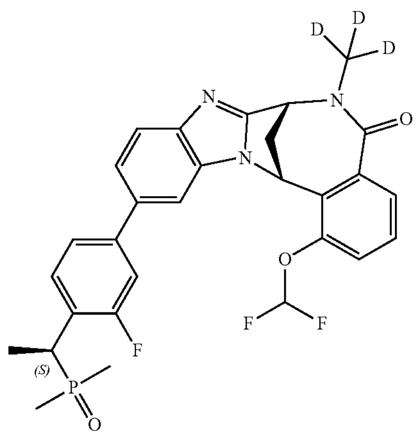 + 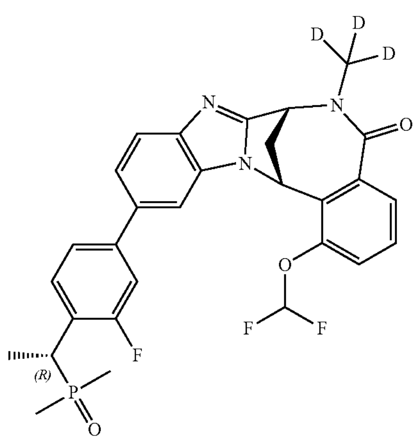 | (7R,14R)-1-(difluoromethoxy)-11-(4-((S or R)-1-(dimethylphosphoryl)ethyl)-3-fluorophenyl)-6-(methyl-$d_3$)-6,7-dihydro-7,14-methanobenzo[f]benzo[4,5]imidazo[1,2-a][1,4]diazocin-5(14H)-one And (7R,14R)-1-(difluoromethoxy)-11-(4-((R or S)-1-(dimethylphosphoryl)ethyl)-3-fluorophenyl)-6-(methyl-$d_3$)-6,7-dihydro-7,14-methanobenzo[f]benzo[4,5]imidazo[1,2-a][1,4]diazocin-5(14H)-one |
| 101 | 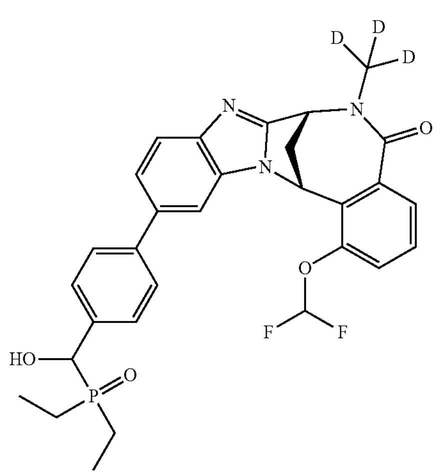 [SMILES: [2H]C([2H])([2H])N1C(=O)c2cccc(OC(F)F)c2[C@H]2C[C@@H]1c1nc3ccc(-c4ccc(C(O)P(=O)(CC)CC)cc4)cc3n12] | (7R,14R)-11-(4-((diethylphosphoryl)(hydroxy)methyl)phenyl)-1-(difluoromethoxy)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 102 | 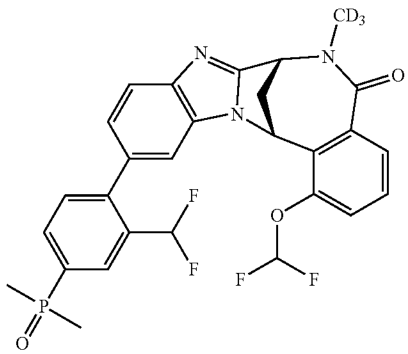 [SMILES: [2H]C([2H])([2H])N1C(=O)c2cccc(OC(F)F)c2[C@H]2C[C@@H]1c1nc3ccc(-c4ccc(P(C)(C)=O)cc4C(F)F)cc3n12] | (7R,14R)-1-(difluoromethoxy)-11-(2-(difluoromethyl)-4-(dimethylphosphoryl)phenyl)-6-(methyl-$d_3$)-6,7-dihydro-7,14-methanobenzo[f]benzo[4,5]imidazo[1,2-a][1,4]diazocin-5(14H)-one |
| 103 | 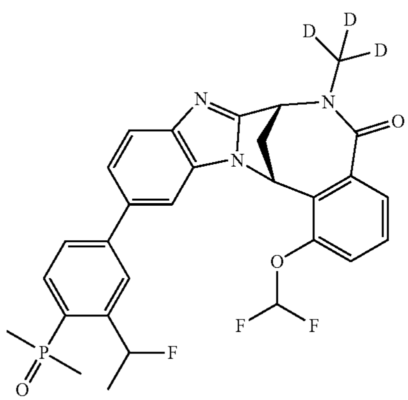 [SMILES: [2H]C([2H])([2H])N1C(=O)c2cccc(OC(F)F)c2[C@H]2C[C@@H]1c1nc3ccc(-c4ccc(P(C)(C)=O)c(C(C)F)c4)cc3n12] | (7R,14R)-1-(difluoromethoxy)-11-(3-(difluoromethyl)-4-(dimethylphosphoryl)phenyl)-6-(methyl-$d_3$)-6,7-dihydro-7,14-methanobenzo[f]benzo[4,5]imidazo[1,2-a][1,4]diazocin-5(14H)-one |
| 104 | 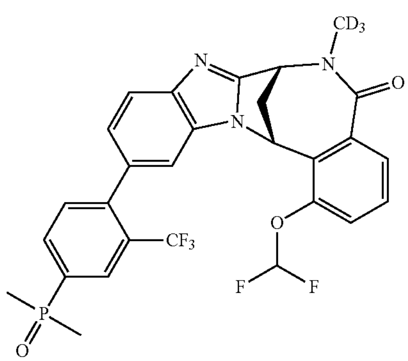 [SMILES: [2H]C([2H])([2H])N1C(=O)c2cccc(OC(F)F)c2[C@H]2C[C@@H]1c1nc3ccc(-c4ccc(P(C)(C)=O)cc4C(F)(F)F)cc3n12] | (7R,14R)-1-(difluoromethoxy)-11-(4-(dimethylphosphoryl)-2-(trifluoromethyl)phenyl)-6-(methyl-$d_3$)-6,7-dihydro-7,14-methanobenzo[f]benzo[4,5]imidazo[1,2-a][1,4]diazocin-5(14H)-one |
| 105 | 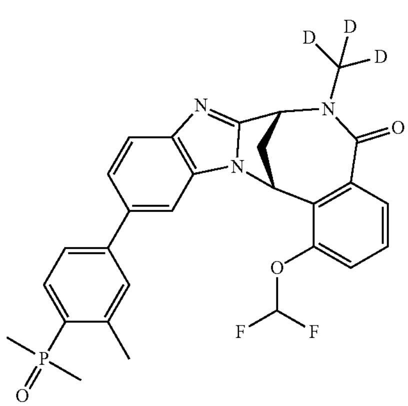 [SMILES: [2H]C([2H])([2H])N1C(=O)c2cccc(OC(F)F)c2[C@H]2C[C@@H]1c1nc3ccc(-c4ccc(P(C)(C)=O)c(C)c4)cc3n12] | (7R,14R)-1-(difluoromethoxy)-11-(4-(dimethylphosphoryl)-3-methylphenyl)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 106 | 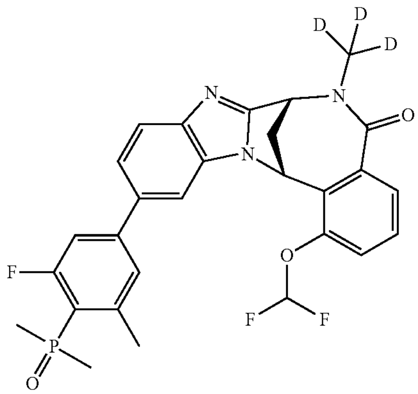 [SMILES: [2H]C([2H])([2H])N1C(=O)c2cccc(OC(F)F)c2[C@H]2C[C@@H]1c1nc3ccc(-c4cc(C)c(P(C)(C)=O)c(F)c4)cc3n12] | (7R,14R)-1-(difluoromethoxy)-11-(4-(dimethylphosphoryl)-3-fluoro-5-methylphenyl)-6-(methyl-$d_3$)-6,7-dihydro-7,14-methanobenzo[f]benzo[4,5]imidazo[1,2-a][1,4]diazocin-5(14H)-one |
| 107 | 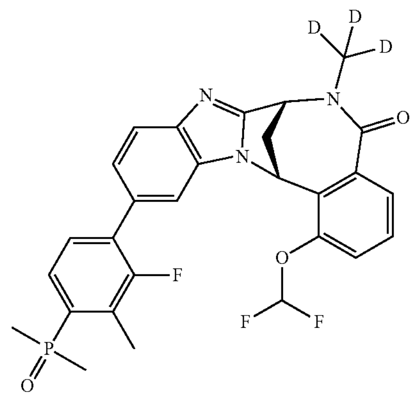 [SMILES: [2H]C([2H])([2H])N1C(=O)c2cccc(OC(F)F)c2[C@H]2C[C@@H]1c1nc3ccc(-c4ccc(P(C)(C)=O)c(C)c4F)cc3n12] | (7R,14R)-1-(difluoromethoxy)-11-(4-(dimethylphosphoryl)-2-fluoro-3-methylphenyl)-6-(methyl-$d_3$)-6,7-dihydro-7,14-methanobenzo[f]benzo[4,5]imidazo[1,2-a][1,4]diazocin-5(14H)-one |
| 108 | 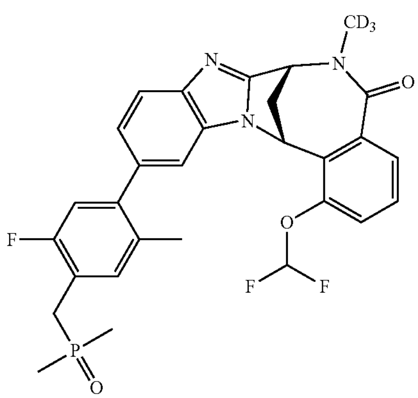 [SMILES: [2H]C([2H])([2H])N1C(=O)c2cccc(OC(F)F)c2[C@H]2C[C@@H]1c1nc3ccc(-c4cc(F)c(CP(C)(C)=O)cc4C)cc3n12] | (7R,14R)-1-(difluoromethoxy)-11-(4-((dimethylphosphoryl)methyl)-5-fluoro-2-methylphenyl)-6-(methyl-$d_3$)-6,7-dihydro-7,14-methanobenzo[f]benzo[4,5]imidazo[1,2-a][1,4]diazocin-5(14H)-one |
| 109 | 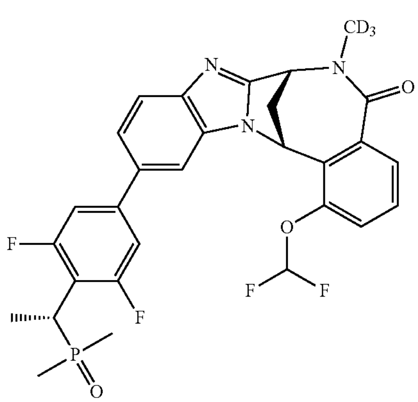 [SMILES: [2H]C([2H])([2H])N1C(=O)c2cccc(OC(F)F)c2[C@H]2C[C@@H]1c1nc3ccc(-c4cc(F)c([C@@H](C)P(C)(C)=O)c(F)c4)cc3n12] | (7R,14R)-1-(difluoromethoxy)-11-(4-((R or S)-1-(dimethylphosphoryl)ethyl)-3,5-difluorophenyl)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 110 and 111 | 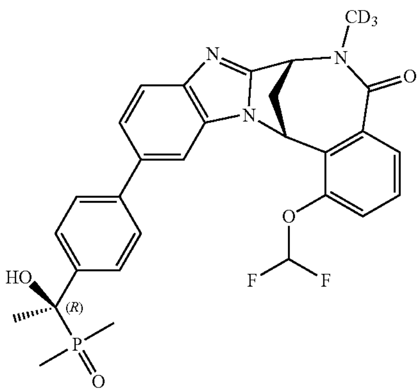 + 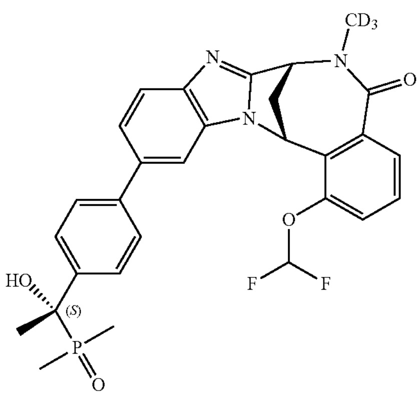 | (7R,14R)-1-(difluoromethoxy)-11-(4-((S or R)-1-(dimethylphosphoryl)-1-hydroxyethyl)phenyl)-6-(methyl-$d_3$)-6,7-dihydro-7,14-methanobenzo[f]benzo[4,5]imidazo[1,2-a][1,4]diazocin-5(14H)-one And (7R,14R)-1-(difluoromethoxy)-11-(4-((R or S)-1-(dimethylphosphoryl)-1-hydroxyethyl)phenyl)-6-(methyl-$d_3$)-6,7-dihydro-7,14-methanobenzo[f]benzo[4,5]imidazo[1,2-a][1,4]diazocin-5(14H)-one |
| 112 | 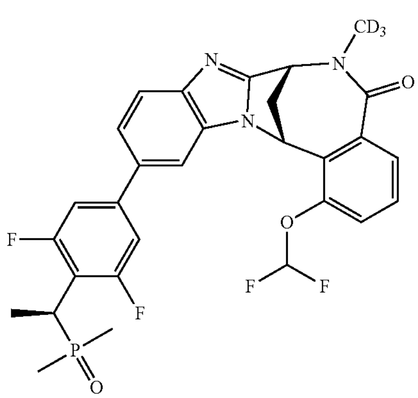 [SMILES: [2H]C([2H])([2H])N1C(=O)c2cccc(OC(F)F)c2[C@H]2C[C@@H]1c1nc3ccc(-c4cc(F)c([C@H](C)P(C)(C)=O)c(F)c4)cc3n12] | (7R,14R)-1-(difluoromethoxy)-11-(4-((S or R)-1-(dimethylphosphoryl)ethyl)-3,5-difluorophenyl)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
| --- | --- | --- |
| 113 and 114 | 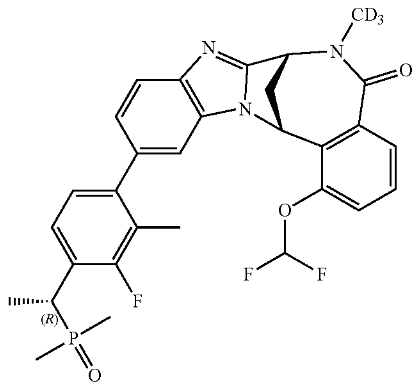 + 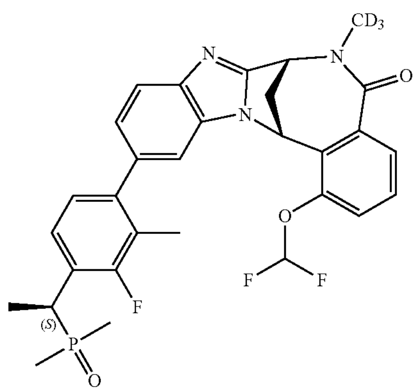 | (7R,14R)-1-(difluoromethoxy)-11-(4-((R or S)-1-(dimethylphosphoryl)ethyl)-3-fluoro-2-methylphenyl)-6-(methyl-$d_3$)-6,7-dihydro-7,14-methanobenzo[f]benzo[4,5]imidazo[1,2-a][1,4]diazocin-5(14H)-one And (7R,14R)-1-(difluoromethoxy)-11-(4-((S or R)-1-(dimethylphosphoryl)ethyl)-3-fluoro-2-methylphenyl)-6-(methyl-$d_3$)-6,7-dihydro-7,14-methanobenzo[f]benzo[4,5]imidazo[1,2-a][1,4]diazocin-5(14H)-one |
| 115 | 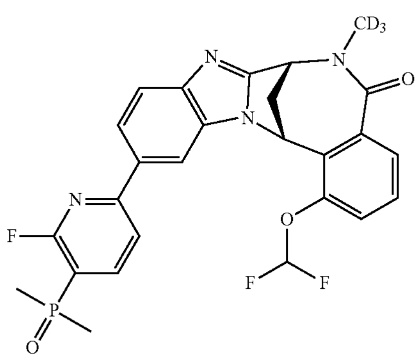 [SMILES: [2H]C([2H])([2H])N1C(=O)c2cccc(OC(F)F)c2[C@H]2C[C@@H]1c1nc3ccc(-c4ccc(P(C)(C)=O)c(F)n4)cc3n12] | (7R,14R)-1-(difluoromethoxy)-11-(5-(dimethylphosphoryl)-6-fluoropyridin-2-yl)-6-(methyl-$d_3$)-6,7-dihydro-7,14-methanobenzo[f]benzo[4,5]imidazo[1,2-a][1,4]diazocin-5(14H)-one |
| 116 | 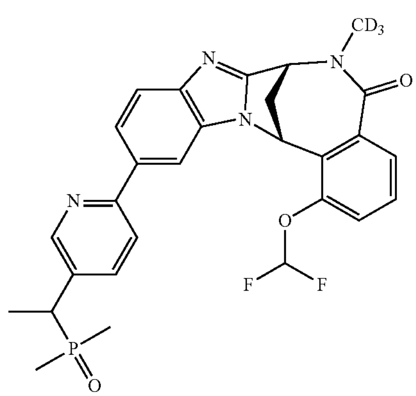 [SMILES: [2H]C([2H])([2H])N1C(=O)c2cccc(OC(F)F)c2[C@H]2C[C@@H]1c1nc3ccc(-c4ccc(C(C)P(C)(C)=O)cn4)cc3n12] | (7R,14R)-1-(difluoromethoxy)-11-(6-(1-(dimethylphosphoryl)ethyl)pyridin-3-yl)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
| --- | --- | --- |
| 117 | 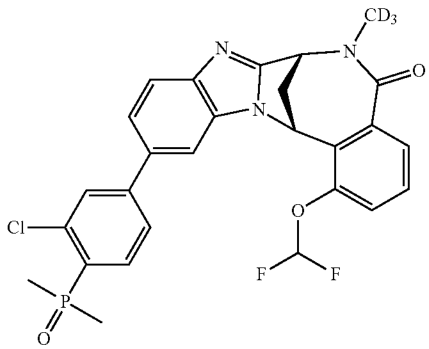 [SMILES: [2H]C([2H])([2H])N1C(=O)c2cccc(OC(F)F)c2[C@H]2C[C@@H]1c1nc3ccc(-c4ccc(P(C)(C)=O)c(Cl)c4)cc3n12] | (7R,14R)-11-(3-chloro-4-(dimethylphosphoryl)phenyl)-1-(difluoromethoxy)-6-(methyl-$d_3$)-6,7-dihydro-7,14-methanobenzo[f]benzo[4,5]imidazo[1,2-a][1,4]diazocin-5(14H)-one |
| 118 and 119 | 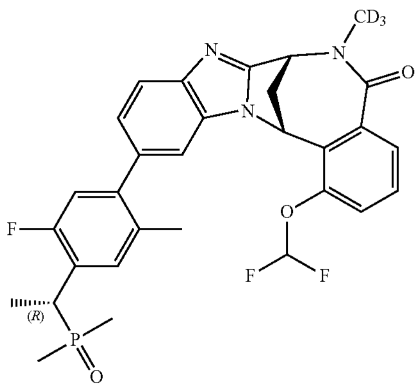 + 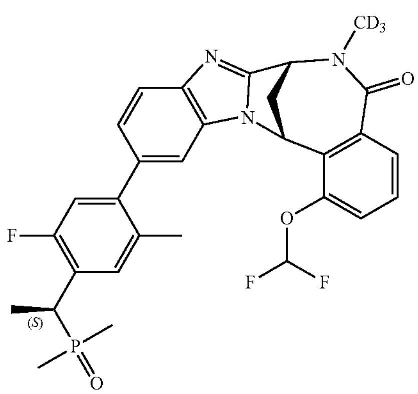 | (7R,14R)-1-(difluoromethoxy)-11-(4-((R or S)-1-(dimethylphosphoryl)ethyl)-5-fluoro-2-methylphenyl)-6-(methyl-$d_3$)-6,7-dihydro-7,14-methanobenzo[f]benzo[4,5]imidazo[1,2-a][1,4]diazocin-5(14H)-one And (7R,14R)-1-(difluoromethoxy)-11-(4-((S or R)-1-(dimethylphosphoryl)ethyl)-5-fluoro-2-methylphenyl)-6-(methyl-$d_3$)-6,7-dihydro-7,14-methanobenzo[f]benzo[4,5]imidazo[1,2-a][1,4]diazocin-5(14H)-one |
| 120 | 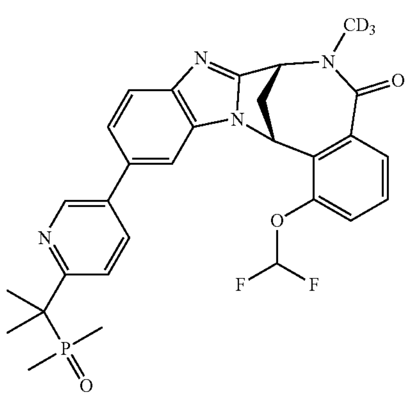 [SMILES: [2H]C([2H])([2H])N1C(=O)c2cccc(OC(F)F)c2[C@H]2C[C@@H]1c1nc3ccc(-c4ccc(C(C)(C)P(C)(C)=O)nc4)cc3n12] | (7R,14R)-1-(difluoromethoxy)-11-(6-(2-(dimethylphosphoryl)propan-2-yl)pyridin-3-yl)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 121 | 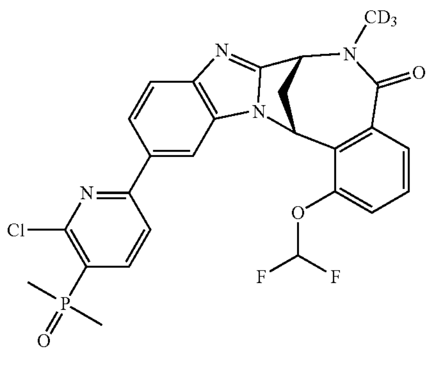 [SMILES: [2H]C([2H])([2H])N1C(=O)c2cccc(OC(F)F)c2[C@H]2C[C@@H]1c1nc3ccc(-c4ccc(P(C)(C)=O)c(Cl)n4)cc3n12] | (7R,14R)-11-(6-chloro-5-(dimethylphosphoryl)pyridin-2-yl)-1-(difluoromethoxy)-6-(methyl-$d_3$)-6,7-dihydro-7,14-methanobenzo[f]benzo[4,5]imidazo[1,2-a][1,4]diazocin-5(14H)-one |
| 122 | 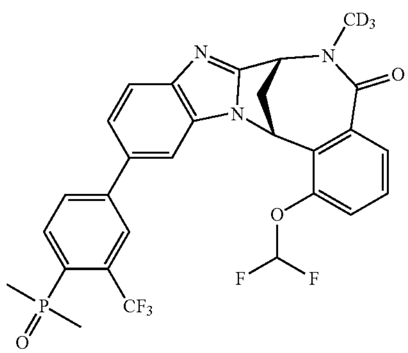 [SMILES: [2H]C([2H])([2H])N1C(=O)c2cccc(OC(F)F)c2[C@H]2C[C@@H]1c1nc3ccc(-c4ccc(P(C)(C)=O)c(C(F)(F)F)c4)cc3n12] | (7R,14R)-1-(difluoromethoxy)-11-(4-(dimethylphosphoryl)-3-(trifluoromethyl)phenyl)-6-(methyl-$d_3$)-6,7-dihydro-7,14-methanobenzo[f]benzo[4,5]imidazo[1,2-a][1,4]diazocin-5(14H)-one |
| 123 | 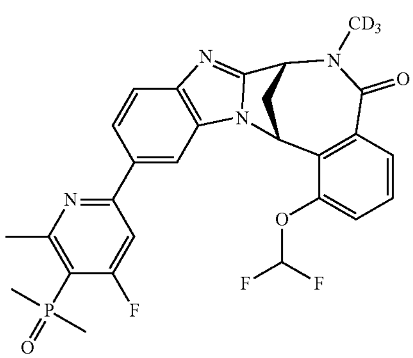 [SMILES: [2H]C([2H])([2H])N1C(=O)c2cccc(OC(F)F)c2[C@H]2C[C@@H]1c1nc3ccc(-c4cc(F)c(P(C)(C)=O)c(C)n4)cc3n12] | (7R,14R)-1-(difluoromethoxy)-11-(5-(dimethylphosphoryl)-4-fluoro-6-methylpyridin-2-yl)-6-(methyl-$d_3$)-6,7-dihydro-7,14-methanobenzo[f]benzo[4,5]imidazo[1,2-a][1,4]diazocin-5(14H)-one |
| 124 | 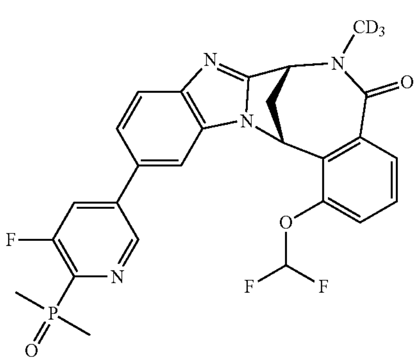 [SMILES: [2H]C([2H])([2H])N1C(=O)c2cccc(OC(F)F)c2[C@H]2C[C@@H]1c1nc3ccc(-c4cnc(P(C)(C)=O)c(F)c4)cc3n12] | (7R,14R)-1-(difluoromethoxy)-11-(6-(dimethylphosphoryl)-5-fluoropyridin-3-yl)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 125 | 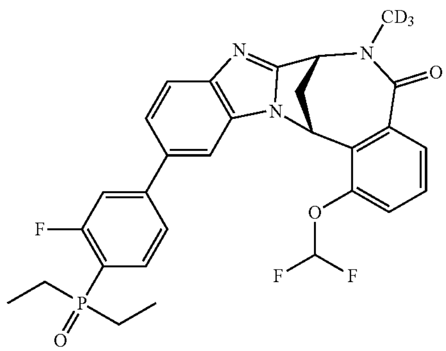 [SMILES: [2H]C([2H])([2H])N1C(=O)c2cccc(OC(F)F)c2[C@H]2C[C@@H]1c1nc3ccc(-c4ccc(P(=O)(CC)CC)c(F)c4)cc3n12] | (7R,14R)-11-(4-(diethylphosphoryl)-3-fluorophenyl)-1-(difluoromethoxy)-6-(methyl-$d_3$)-6,7-dihydro-7,14-methanobenzo[f]benzo[4,5]imidazo[1,2-a][1,4]diazocin-5(14H)-one |
| 126 | 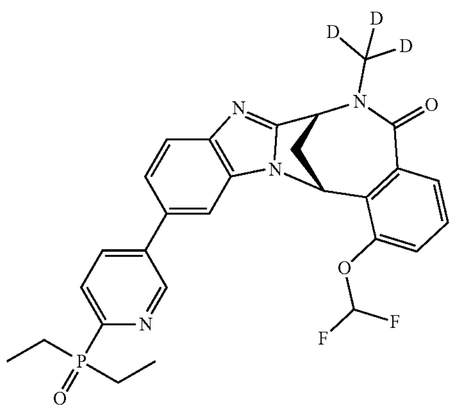 [SMILES: [2H]C([2H])([2H])N1C(=O)c2cccc(OC(F)F)c2[C@H]2C[C@H]1c1nc3ccc(-c4ccc(P(=O)(CC)CC)nc4)cc3n12] | (7R,14R)-11-(6-(diethylphosphoryl)pyridin-3-yl)-1-(difluoromethoxy)-6-(methyl-$d_3$)-6,7-dihydro-7,14-methanobenzo[f]benzo[4,5]imidazo[1,2-a][1,4]diazocin-5(14H)-one |
| 127 | 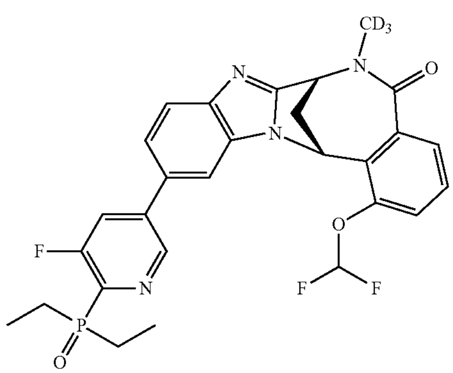 [SMILES: [2H]C([2H])([2H])N1C(=O)c2cccc(OC(F)F)c2[C@H]2C[C@H]1c1nc3ccc(-c4cnc(P(=O)(CC)CC)c(F)c4)cc3n12] | (7R,14R)-11-(6-(diethylphosphory])-5-fluoropyridin-3-yl)-1-(difluoromethoxy)-6-(methyl-$d_3$)-6,7-dihydro-7,14-methanobenzo[f]benzo[4,5]imidazo[1,2-a][1,4]diazocin-5(14H)-one |
| 128 | 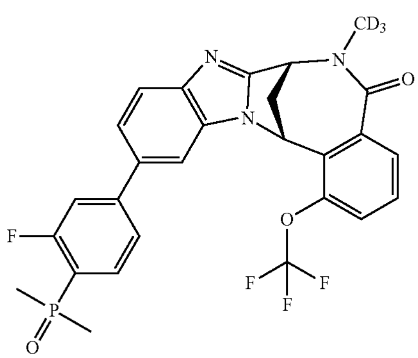 [SMILES: [2H]C([2H])([2H])N1C(=O)c2cccc(OC(F)(F)F)c2[C@H]2C[C@@H]1c1nc3ccc(-c4ccc(P(C)(C)=O)c(F)c4)cc3n12] | (7R,14R)-11-(4-(dimethylphosphoryl)-3-fluorophenyl)-6-(methyl-$d_3$)-1-(trifluoromethoxy)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 129 | 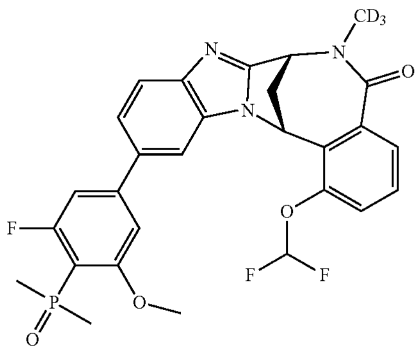 [SMILES: [2H]C([2H])([2H])N1C(=O)c2cccc(OC(F)F)c2[C@H]2C[C@@H]1c1nc3ccc(-c4cc(F)c(P(C)(C)=O)c(OC)c4)cc3n12] | (7R,14R)-1-(difluoromethoxy)-11-(4-(dimethylphosphoryl)-3-fluoro-5-methoxyphenyl)-6-(methyl-$d_3$)-6,7-dihydro-7,14-methanobenzo[f]benzo[4,5]imidazo[1,2-a][1,4]diazocin-5(14H)-one |
| 130 | 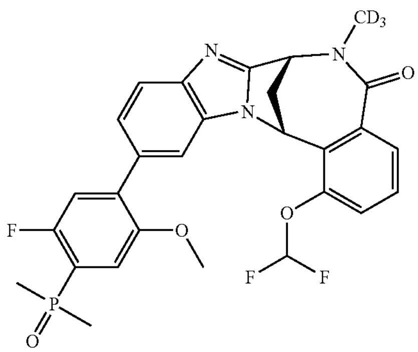 [SMILES: [2H]C([2H])([2H])N1C(=O)c2cccc(OC(F)F)c2[C@H]2C[C@@H]1c1nc3ccc(-c4cc(F)c(P(C)(C)=O)cc4OC)cc3n12] | (7R,14R)-1-(difluoromethoxy)-11-(4-(dimethylphosphoryl)-5-fluoro-2-methoxyphenyl)-6-(methyl-$d_3$)-6,7-dihydro-7,14-methanobenzo[f]benzo[4,5]imidazo[1,2-a][1,4]diazocin-5(14H)-one |
| 131 | 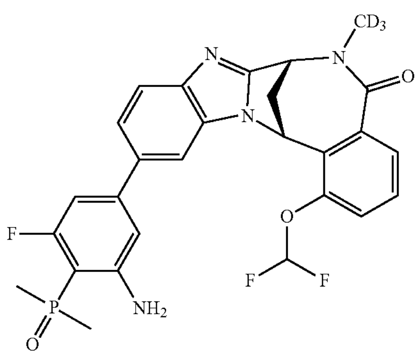 [SMILES: [2H]C([2H])([2H])N1C(=O)c2cccc(OC(F)F)c2[C@H]2C[C@@H]1c1nc3ccc(-c4cc(N)c(P(C)(C)=O)c(F)c4)cc3n12] | (7R,14R)-11-(3-amino-4-(dimethylphosphoryl)-5-fluorophenyl)-1-(difluoromethoxy)-6-(methyl-$d_3$)-6,7-dihydro-7,14-methanobenzo[f]benzo[4,5]imidazo[1,2-a][1,4]diazocin-5(14H)-one |
| 132 | 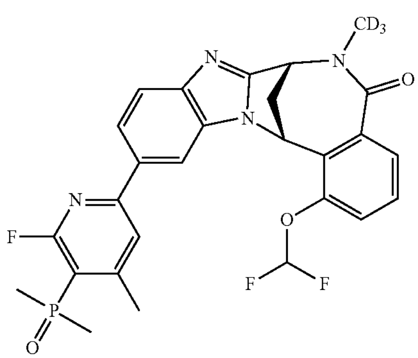 [SMILES: [2H]C([2H])([2H])N1C(=O)c2cccc(OC(F)F)c2[C@H]2C[C@@H]1c1nc3ccc(-c4cc(C)c(P(C)(C)=O)c(F)n4)cc3n12] | (7R,14R)-1-(difluoromethoxy)-11-(5-(dimethylphosphoryl)-6-fluoro-4-methylpyridin-2-yl)-6-(methyl-$d_3$)-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 133 | 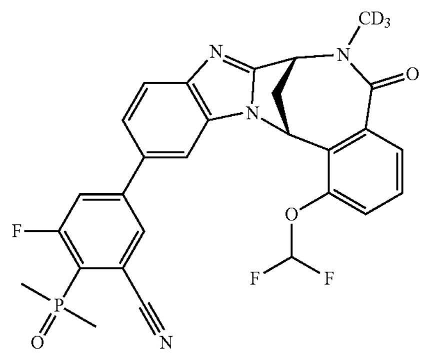 [SMILES: [2H]C([2H])([2H])N1C(=O)c2cccc(OC(F)F)c2[C@H]2C[C@@H]1c1nc3ccc(-c4cc(F)c(P(C)(C)=O)c(C#N)c4)cc3n12] | 5-((7R,14R)-1-(difluoromethoxy)-6-(methyl-$d_3$)-5-oxo-5,6,7,14-tetrahydro-7,14-methanobenzo[f]benzo[4,5]imidazo[1,2-a][1,4]diazocin-11-yl)-2-(dimethylphosphoryl)-3-fluorobenzonitrile |
| 134 | 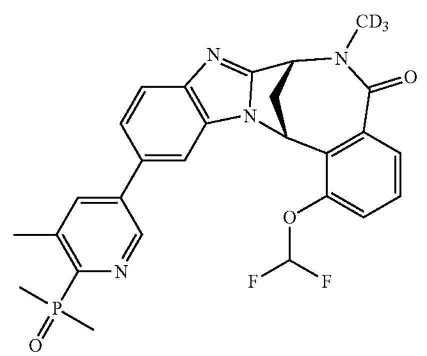 [SMILES: [2H]C([2H])([2H])N1C(=O)c2cccc(OC(F)F)c2[C@H]2C[C@@H]1c1nc3ccc(-c4cnc(P(C)(C)=O)c(C)c4)cc3n12] | (7R,14R)-1-(difluoromethoxy)-11-(6-(dimethylphosphoryl)-5-methylpyridin-3-yl)-6-(methyl-$d_3$)-6,7-dihydro-7,14-methanobenzo[f]benzo[4,5]imidazo[1,2-a][1,4]diazocin-5(14H)-one |
| 135 | 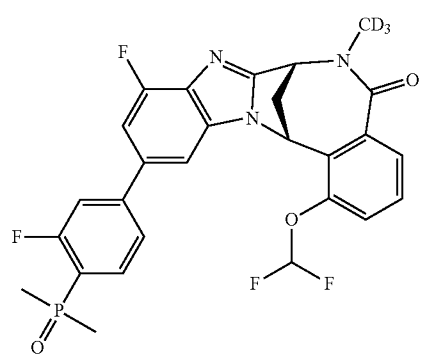 [SMILES: [2H]C([2H])([2H])N1C(=O)c2cccc(OC(F)F)c2[C@H]2C[C@@H]1c1nc3c(F)cc(-c4ccc(P(C)(C)=O)c(F)c4)cc3n12] | (7R,14R)-1-(difluoromethoxy)-11-(4-(dimethylphosphoryl)-3-fluorophenyl)-9-fluoro-6-(methyl-$d_3$)-6,7-dihydro-7,14-methanobenzo[f]benzo[4,5]imidazo[1,2-a][1,4]diazocin-5(14H)-one |
| 136 | 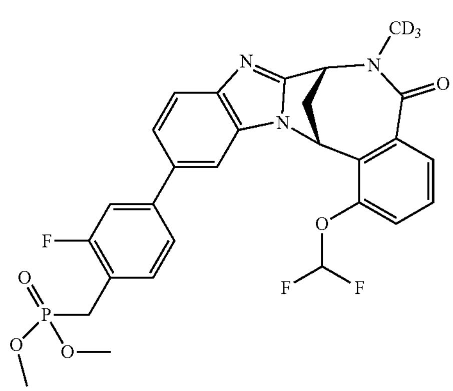 [SMILES: [2H]C([2H])([2H])N1C(=O)c2cccc(OC(F)F)c2[C@H]2C[C@@H]1c1nc3ccc(-c4ccc(CP(=O)(OC)OC)c(F)c4)cc3n12] | dimethyl (4-((7R,14R)-1-(difluoromethoxy)-6-(methyl-$d_3$)-5-oxo-5,6,7,14-tetrahydro-7,14-methanobenzo[f]benzo[4,5]imidazo[1,2-a][1,4]diazocin-11-yl)-2-fluorobenzyl)phosphonate |

TABLE 1-continued

| Synthetic Chemistry Example | Compound Structure | Compound Name |
|---|---|---|
| 137 | 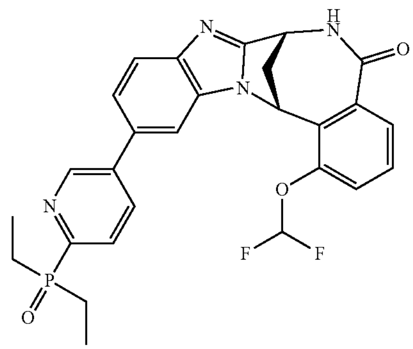 [SMILES: CCP(=O)(CC)c1ccc(-c2ccc3nc4n(c3c2)[C@@H]2C[C@H]4NC(=O)c3cccc(OC(F)F)c32)cn1] | (7R,14R)-11-(6-(diethylphosphoryl)pyridin-3-yl)-1-(difluoromethoxy)-6,7-dihydro-7,14-methanobenzo[f]benzo[4,5]imidazo[1,2-a][1,4]diazocin-5(14H)-one |
| 138 | 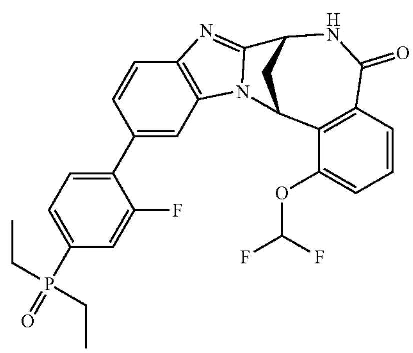 [SMILES: CCP(=O)(CC)c1ccc(-c2ccc3nc4n(c3c2)[C@@H]2C[C@H]4NC(=O)c3cccc(OC(F)F)c32)c(F)c1] | (7R,14R)-11-(4-(diethylphosphoryl)-2-fluorophenyl)-1-(difluoromethoxy)-6,7-dihydro-7,14-methanobenzo[f]benzo[4,5]imidazo[1,2-a][1,4]diazocin-5(14H)-one |
| 139 | 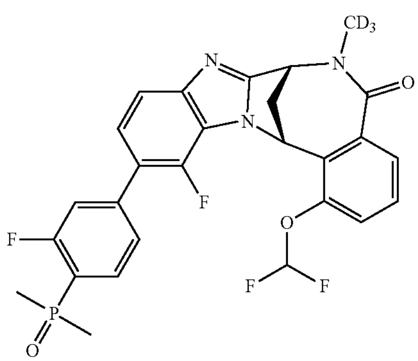 [SMILES: [2H]C([2H])([2H])N1C(=O)c2cccc(OC(F)F)c2[C@H]2C[C@@H]1c1nc3ccc(-c4ccc(P(C)(C)=O)c(F)c4)c(F)c3n12] | (7R,14R)-1-(difluoromethoxy)-11-(4-(dimethylphosphoryl)-3-fluorophenyl)-12-fluoro-6-(methyl-$d_3$)-6,7-dihydro-7,14-methanobenzo[f]benzo[4,5]imidazo[1,2-a][1,4]diazocin-5(14H)-one |
| 140 | 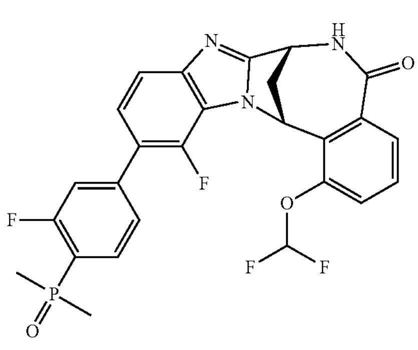 [SMILES: CP(C)(=O)c1ccc(-c2ccc3nc4n(c3c2F)[C@@H]2C[C@H]4NC(=O)c3cccc(OC(F)F)c32)cc1F] | (7R,14R)- 1-(difluoromethoxy)-11-(4-(dimethylphosphoryl)-3-fluorophenyl)-12-fluoro-6,7-dihydro-7,14-methanobenzo[f]benzo[4,5]imidazo[1,2-a][1,4]diazocin-5(14H)-one |

TABLE 1-continued

| Synthetic Chemistry Example | Compound Structure | Compound Name |
|---|---|---|
| 141 | 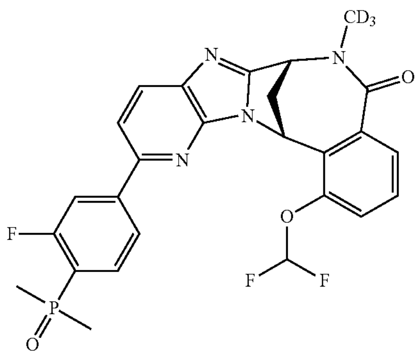 [SMILES: [2H]C([2H])([2H])N1C(=O)c2cccc(OC(F)F)c2[C@H]2C[C@@H]1c1nc3ccc(-c4ccc(P(C)(C)=O)c(F)c4)nc3n12] | (7R,14R)-1-(difluoromethoxy)-11-(4-(dimethylphosphoryl)-3-fluorophenyl)-6-(methyl-d$_3$)-6,7-dihydro-7,14-methanobenzo[f]pyrido[3',2':4,5]imidazo[1,2-a][1,4]diazocin-5(14H)-one |
| 142 | 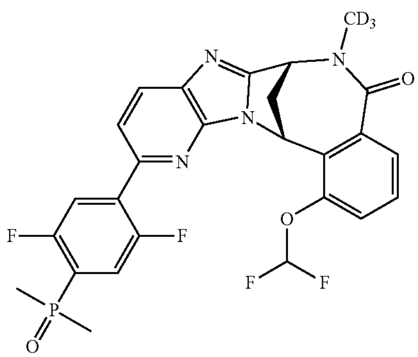 [SMILES: [2H]C([2H])([2H])N1C(=O)c2cccc(OC(F)F)c2[C@H]2C[C@@H]1c1nc3ccc(-c4cc(F)c(P(C)(C)=O)cc4F)nc3n12] | (7R,14R)-1-(difluoromethoxy)-11-(4-(dimethylphosphoryl)-2,5-difluorophenyl)-6-(methyl-d$_3$)-6,7-dihydro-7,14-methanobenzo[f]pyrido[3',2':4,5]imidazo[1,2-a][1,4]diazocin-5(14H)-one |

Another embodiment provides a TNFα inhibitory compound, or a pharmaceutically acceptable salt, solvate, or N-oxide thereof, having a structure presented in Table 2.

TABLE 2

| |
|---|
| 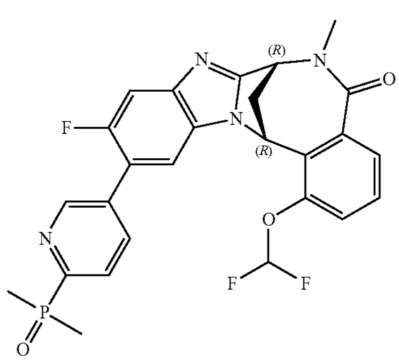 |

TABLE 2-continued

| |
|---|
| 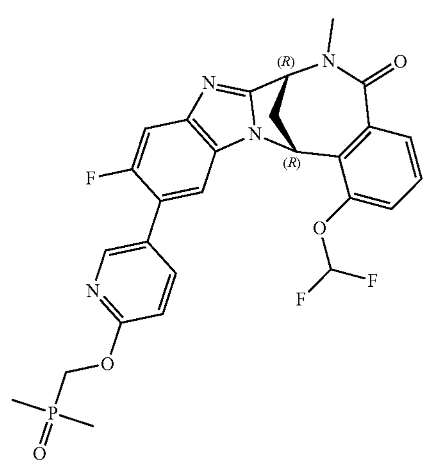 |

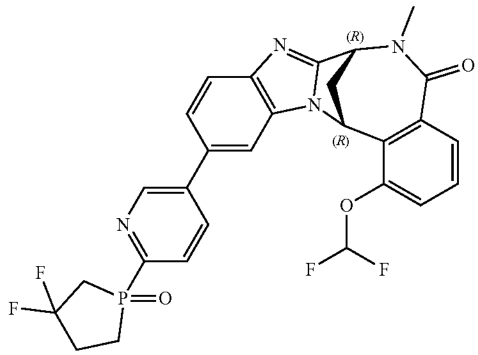
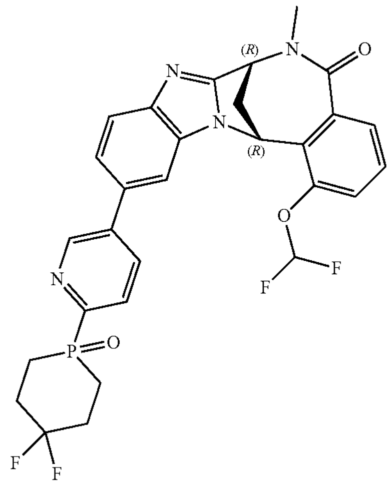
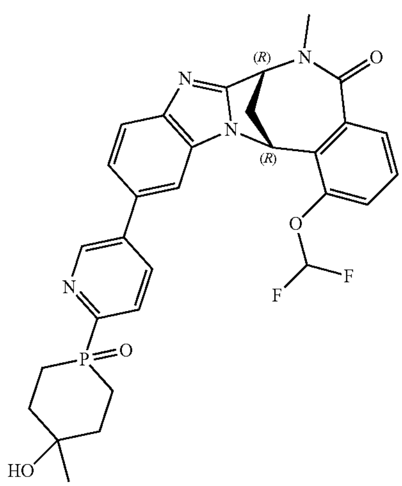
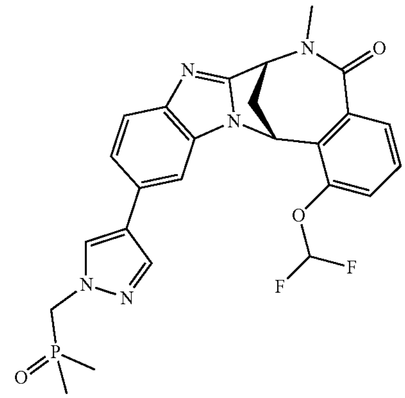 [SMILES: CN1C(=O)c2cccc(OC(F)F)c2[C@H]2C[C@@H]1c1nc3ccc(-c4cnn(CP(C)(C)=O)c4)cc3n12]
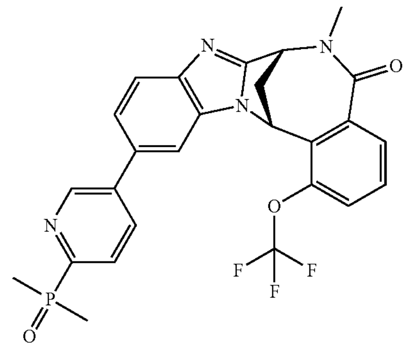 [SMILES: CN1C(=O)c2cccc(OC(F)(F)F)c2[C@H]2C[C@@H]1c1nc3ccc(-c4ccc(P(C)(C)=O)nc4)cc3n12]
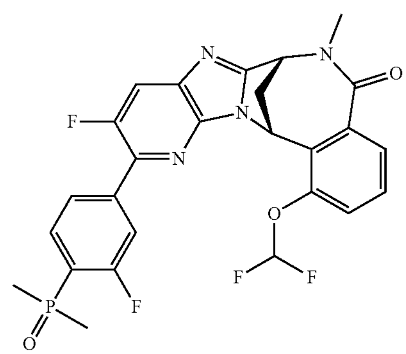 [SMILES: CN1C(=O)c2cccc(OC(F)F)c2[C@H]2C[C@@H]1c1nc3cc(F)c(-c4ccc(P(C)(C)=O)c(F)c4)nc3n12]
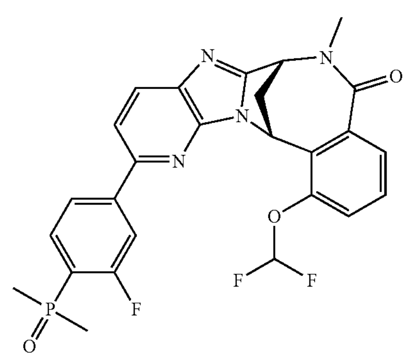 [SMILES: CN1C(=O)c2cccc(OC(F)F)c2[C@H]2C[C@@H]1c1nc3ccc(-c4ccc(P(C)(C)=O)c(F)c4)nc3n12]

TABLE 2-continued

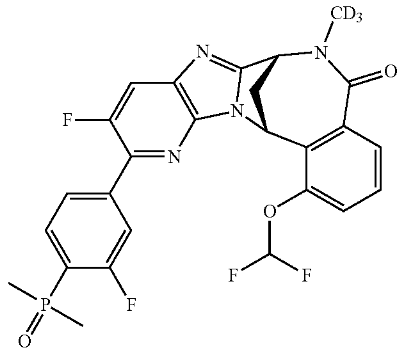 [SMILES: [2H]C([2H])([2H])N1C(=O)c2cccc(OC(F)F)c2[C@H]2C[C@@H]1c1nc3cc(F)c(-c4ccc(P(C)(C)=O)c(F)c4)nc3n12]

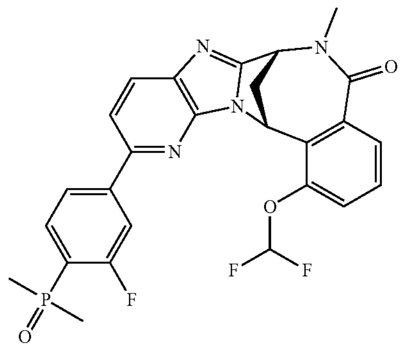 [SMILES: CN1C(=O)c2cccc(OC(F)F)c2[C@H]2C[C@@H]1c1nc3ccc(-c4ccc(P(C)(C)=O)c(F)c4)nc3n12]

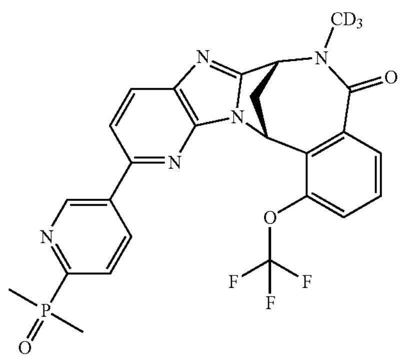 [SMILES: [2H]C([2H])([2H])N1C(=O)c2cccc(OC(F)(F)F)c2[C@H]2C[C@@H]1c1nc3ccc(-c4ccc(P(C)(C)=O)nc4)nc3n12]

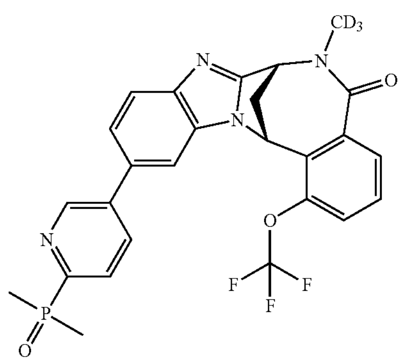 [SMILES: [2H]C([2H])([2H])N1C(=O)c2cccc(OC(F)(F)F)c2[C@H]2C[C@@H]1c1nc3ccc(-c4ccc(P(C)(C)=O)nc4)cc3n12]

Preparation of Compounds

The compounds used in the synthetic chemistry reactions described herein are made according to organic synthesis techniques known to those skilled in this art, starting from commercially available chemicals and/or from compounds described in the chemical literature. "Commercially available chemicals" are obtained from standard commercial sources including Acros Organics (Pittsburgh, PA), Aldrich Chemical (Milwaukee, WI, including Sigma Chemical and Fluka), Apin Chemicals Ltd. (Milton Park, UK), Avocado Research (Lancashire, U.K.), BDH Inc. (Toronto, Canada), Bionet (Cornwall, U.K.), Chemservice Inc. (West Chester, PA), Crescent Chemical Co. (Hauppauge, NY), Eastman Organic Chemicals, Eastman Kodak Company (Rochester, NY), Fisher Scientific Co. (Pittsburgh, PA), Fisons Chemicals (Leicestershire, UK), Frontier Scientific (Logan, UT), ICN Biomedicals, Inc. (Costa Mesa, CA), Key Organics (Cornwall, U.K.), Lancaster Synthesis (Windham, NH), Maybridge Chemical Co. Ltd. (Cornwall, U.K.), Parish Chemical Co. (Orem, UT), Pfaltz & Bauer, Inc. (Waterbury, CN), Polyorganix (Houston, TX), Pierce Chemical Co. (Rockford, IL), Riedel de Haen AG (Hanover, Germany), Spectrum Quality Product, Inc. (New Brunswick, NJ), TCI America (Portland, OR), Trans World Chemicals, Inc. (Rockville, MD), and Wako Chemicals USA, Inc. (Richmond, VA).

Suitable reference books and treatise that detail the synthesis of reactants useful in the preparation of compounds described herein, or provide references to articles that describe the preparation, include for example, "Synthetic Organic Chemistry", John Wiley & Sons, Inc., New York; S. R. Sandler et al., "Organic Functional Group Preparations," 2nd Ed., Academic Press, New York, 1983; H. O. House, "Modern Synthetic Reactions", 2nd Ed., W. A. Benjamin, Inc. Menlo Park, Calif. 1972; T. L. Gilchrist, "Heterocyclic Chemistry", 2nd Ed., John Wiley & Sons, New York, 1992; J. March, "Advanced Organic Chemistry: Reactions, Mechanisms and Structure", 4th Ed., Wiley-Interscience, New York, 1992. Additional suitable reference books and treatise that detail the synthesis of reactants useful in the preparation of compounds described herein, or provide references to articles that describe the preparation, include for example, Fuhrhop, J. and Penzlin G. "Organic Synthesis: Concepts, Methods, Starting Materials", Second, Revised and Enlarged Edition (1994) John Wiley & Sons ISBN: 3-527-29074-5; Hoffman, R. V. "Organic Chemistry, An Intermediate Text" (1996) Oxford University Press, ISBN 0-19-509618-5; Larock, R. C. "Comprehensive Organic Transformations: A Guide to Functional Group Preparations" 2nd Edition (1999) Wiley-VCH, ISBN: 0-471-19031-4; March, J. "Advanced Organic Chemistry: Reactions, Mechanisms, and Structure" 4th Edition (1992) John Wiley & Sons, ISBN: 0-471-60180-2; Otera, J. (editor) "Modern Carbonyl Chemistry" (2000) Wiley-VCH, ISBN: 3-527-29871-1; Patai, S. "Patai's 1992 Guide to the Chemistry of Functional Groups" (1992) Interscience ISBN: 0-471-93022-9; Solomons, T. W. G. "Organic Chemistry" 7th Edition (2000) John Wiley & Sons, ISBN: 0-471-19095-0; Stowell, J. C., "Intermediate Organic Chemistry" 2nd Edition (1993) Wiley-Interscience, ISBN: 0-471-57456-2; "Industrial Organic Chemicals: Starting Materials and Intermediates: An Ullmann's Encyclopedia" (1999) John Wiley & Sons, ISBN: 3-527-29645-X, in 8 volumes; "Organic Reactions" (1942-2000) John Wiley & Sons, in over 55 volumes; and "Chemistry of Functional Groups" John Wiley & Sons, in 73 volumes.

Specific and analogous reactants are optionally identified through the indices of known chemicals prepared by the Chemical Abstract Service of the American Chemical Society, which are available in most public and university libraries, as well as through on-line databases (contact the American Chemical Society, Washington, D.C. for more details). Chemicals that are known but not commercially available in catalogs are optionally prepared by custom chemical synthesis houses, where many of the standard chemical supply houses (e.g., those listed above) provide custom synthesis services. A reference useful for the preparation and selection of pharmaceutical salts of the compounds described herein is P. H. Stahl & C. G. Wermuth "Handbook of Pharmaceutical Salts", Verlag Helvetica Chimica Acta, Zurich, 2002.

Pharmaceutical Compositions

In certain embodiments, the TNFα inhibitory compound described herein is administered as a pure chemical. In other embodiments, the TNFα inhibitory compound described herein is combined with a pharmaceutically suitable or acceptable carrier (also referred to herein as a pharmaceutically suitable (or acceptable) excipient, physiologically suitable (or acceptable) excipient, or physiologically suitable (or acceptable) carrier) selected on the basis of a chosen route of administration and standard pharmaceutical practice as described, for example, in *Remington: The Science and Practice of Pharmacy* (Gennaro, 21st Ed. Mack Pub. Co., Easton, PA (2005)).

Provided herein is a pharmaceutical composition comprising at least one TNFα inhibitory compound as described herein, or pharmaceutically acceptable salt, solvate, or N-oxide thereof, together with one or more pharmaceutically acceptable carriers. The carrier(s) (or excipient(s)) is acceptable or suitable if the carrier is compatible with the other ingredients of the composition and not deleterious to the recipient (i.e., the subject or the patient) of the composition.

One embodiment provides a pharmaceutical composition comprising a pharmaceutically acceptable excipient and a compound of Formula (I) or (Ia), or pharmaceutically acceptable salt, solvate, or N-oxide thereof.

One embodiment provides a method of preparing a pharmaceutical composition comprising mixing a compound of Formula (I) or (Ia), or a pharmaceutically acceptable salt, solvate, or N-oxide thereof, and a pharmaceutically acceptable carrier.

In certain embodiments, the TNFα inhibitory compound as described by Formula (I) or (Ia), or a pharmaceutically acceptable salt, solvate, or N-oxide thereof, is substantially pure, in that it contains less than about 5%, or less than about 2%, or less than about 1%, or less than about 0.5%, or less than about 0.1%, of other organic small molecules, such as unreacted intermediates or synthesis by-products that are created, for example, in one or more of the steps of a synthesis method.

One embodiment provides a pharmaceutical composition comprising a pharmaceutically acceptable excipient and a compound of Table 1 or Table 2, or a pharmaceutically acceptable salt, solvate, or N-oxide thereof.

One embodiment provides a method of preparing a pharmaceutical composition comprising mixing a compound of Table 1 or Table 2, or a pharmaceutically acceptable salt, solvate, or N-oxide thereof, and a pharmaceutically acceptable carrier.

In certain embodiments, the TNFα inhibitory compound as described by Table 1 or Table 2, or a pharmaceutically acceptable salt, solvate, or N-oxide thereof, is substantially pure, in that it contains less than about 5%, or less than about 2%, or less than about 1%, or less than about 0.5%, or less than about 0.1%, of other organic small molecules, such as unreacted intermediates or synthesis by-products that are created, for example, in one or more of the steps of a synthesis method.

Suitable oral dosage forms include, for example, tablets, pills, sachets, or capsules of hard or soft gelatin, methylcellulose or of another suitable material easily dissolved in the digestive tract. In some embodiments, suitable nontoxic solid carriers are used which include, for example, pharmaceutical grades of mannitol, lactose, starch, magnesium stearate, sodium saccharin, talcum, cellulose, glucose, sucrose, magnesium carbonate, and the like. (See, e.g., *Remington: The Science and Practice of Pharmacy* (Gennaro, 21st Ed. Mack Pub. Co., Easton, PA (2005)).

In some embodiments, the TNFα inhibitory compound as described by Formula (I) or (Ia) or Table 1 or Table 2, or pharmaceutically acceptable salt or solvate thereof, is formulated for administration by injection. In some instances, the injection formulation is an aqueous formulation. In some instances, the injection formulation is a non-aqueous formulation. In some instances, the injection formulation is an oil-based formulation, such as sesame oil, or the like.

The dose of the composition comprising at least one TNFα inhibitory compound as described herein differs depending upon the subject or patient's (e.g., human) condition. In some embodiments, such factors include general health status, age, and other factors.

Pharmaceutical compositions are administered in a manner appropriate to the disease to be treated (or prevented). An appropriate dose and a suitable duration and frequency of administration will be determined by such factors as the condition of the patient, the type and severity of the patient's disease, the particular form of the active ingredient, and the method of administration. In general, an appropriate dose and treatment regimen provides the composition(s) in an amount sufficient to provide therapeutic and/or prophylactic benefit (e.g., an improved clinical outcome, such as more frequent complete or partial remissions, or longer disease-free and/or overall survival, or a lessening of symptom severity. Optimal doses are generally determined using experimental models and/or clinical trials. The optimal dose depends upon the body mass, weight, or blood volume of the patient.

Oral doses typically range from about 1.0 mg to about 1000 mg, one to four times, or more, per day.

Methods of Treatment

One embodiment provides a compound of Formula (I) or (Ia), or a pharmaceutically acceptable salt, solvate, or N-oxide thereof, for use in a method of treatment of the human or animal body.

One embodiment provides a compound of Formula (I) or (Ia), or a pharmaceutically acceptable salt, solvate, or N-oxide thereof, for use in a method of treatment of inflammatory or autoimmune disease or disorder. Another embodiment provides a compound of Formula (I) or (Ia), or a pharmaceutically acceptable salt, solvate, or N-oxide thereof, for use in a method of treatment of inflammatory disease or disorder. Yet another embodiment provides a compound of Formula (I) or (Ia), or a pharmaceutically acceptable salt, solvate, or N-oxide thereof, for use in a method of treatment of autoimmune disease or disorder.

One embodiment provides a pharmaceutical composition comprising a compound of Formula (I) or (Ia), or a pharmaceutically acceptable salt, solvate, or N-oxide thereof, and a pharmaceutically acceptable excipient for use in a method of treatment of inflammatory or autoimmune disease or disorder.

One embodiment provides a use of a compound of Formula (I) or (Ia), or a pharmaceutically acceptable salt, solvate, or N-oxide thereof, in the manufacture of a medicament for the treatment of inflammatory or autoimmune disease or disorder.

In some embodiments is provided a method of treating an inflammatory or autoimmune disease or disorder, in a patient in need thereof, comprising administering to the patient a compound of Formula (I) or (Ia), or a pharmaceutically acceptable salt, solvate, or N-oxide thereof. In some embodiments is provided a method of treating inflammatory or autoimmune disease or disorder, in a patient in need thereof, comprising administering to the patient a pharmaceutical composition comprising a compound of Formula (I) or (Ia), or a pharmaceutically acceptable salt, solvate, or N-oxide thereof, and a pharmaceutically acceptable excipient. One embodiment provides a method of treating an inflammatory disease or disorder. Another embodiment provides a method of treating an autoimmune disease or disorder.

One embodiment provides a compound of Table 1 or Table 2, or a pharmaceutically acceptable salt, solvate, or N-oxide thereof, for use in a method of treatment of the human or animal body.

One embodiment provides a compound of Table 1 or Table 2, or a pharmaceutically acceptable salt, solvate, or N-oxide thereof, for use in a method of treatment of inflammatory or autoimmune disease or disorder.

One embodiment provides a pharmaceutical composition comprising a compound of Table 1 or Table 2, or a pharmaceutically acceptable salt, solvate, or N-oxide thereof, and a pharmaceutically acceptable excipient for use in a method of treatment of inflammatory or autoimmune disease or disorder.

One embodiment provides a use of a compound of Table 1 or Table 2, or a pharmaceutically acceptable salt, solvate, or N-oxide thereof, in the manufacture of a medicament for the treatment of inflammatory or autoimmune disease or disorder.

In some embodiments is provided a method of treating an inflammatory or autoimmune disease or disorder in a patient in need thereof, comprising administering to the patient a compound of Table 1 or Table 2, or a pharmaceutically acceptable salt, solvate, or N-oxide thereof. In some embodiments is provided a method of treating an inflammatory or autoimmune disease or disorder, in a patient in need thereof, comprising administering to the patient a pharmaceutical composition comprising a compound of Table 1 or Table 2, or a pharmaceutically acceptable salt, solvate, or N-oxide thereof, and a pharmaceutically acceptable excipient.

In some embodiments the inflammatory and autoimmune disease or disorder is selected from, but are not limited to: rheumatoid arthritis, psoriatic arthritis, systemic onset juvenile idiopathic arthritis, multiple sclerosis, lupus nephritis, systemic lupus erythematosus, psoriasis, Crohn's disease, colitis, asthma, graft versus host disease, allograft rejection, chronic obstructive pulmonary disease, multiple sclerosis, Alzheimer's disease, Graves' disease, cutaneous lupus, ankylosing spondylitis, cryopyrin-associated periodic syndromes (CAPS), gout, and gouty arthritis, ulcerative TNF receptor associated periodic syndrome (TRAPS), Wegener's granulomatosis, sarcoidosis, familial Mediterranean fever (FMF), neuropathic pain, and adult onset stills.

Provided herein is the method wherein the pharmaceutical composition is administered orally. Provided herein is the method wherein the pharmaceutical composition is administered by injection.

One embodiment provides a method of inhibiting TNFα activity comprising contacting the TNFα protein with a compound of Formula (I) or (Ia) or Table 1 or Table 2. Another embodiment provides the method of inhibiting TNFα activity, wherein the TNFα protein is contacted in an in vivo setting. Another embodiment provides the method of inhibiting TNFα activity, wherein the TNFα protein is contacted in an in vitro setting.

Other embodiments and uses will be apparent to one skilled in the art in light of the present disclosures. The following examples are provided merely as illustrative of various embodiments and shall not be construed to limit the invention in any way.

EXAMPLES

I. Chemical Synthesis

In some embodiments, the TNFα inhibitory compounds disclosed herein are synthesized according to the following examples. As used below, and throughout the description of the invention, the following abbreviations, unless otherwise indicated, shall be understood to have the following meanings:

ACN acetonitrile

° C. degrees Celsius $\delta_H$ chemical shift in parts per million downfield from tetramethylsilane DCM dichloromethane ($CH_2Cl_2$)

DIAD diisopropyl azodicarboxylate

DIEA diisopropylethylamine

DMF dimethylformamide

DMSO dimethylsulfoxide

EA ethyl acetate

EtOAc ethyl acetate

ESI electrospray ionization

Et ethyl g gram(s)

h hour(s)

HPLC high performance liquid chromatography

Hz hertz

J coupling constant (in NMR spectrometry)

LCMS liquid chromatography mass spectrometry

μ micro m multiplet (spectral); meter(s); milli

M molar $M^+$ parent molecular ion

Me methyl

MsCl methanesulfonyl chloride

MHz megahertz min minute(s)

mol mole(s); molecular (as in mol wt)

mL milliliter

MS mass spectrometry nm nanometer(s)

NMR nuclear magnetic resonance pH potential of hydrogen; a measure of the acidity or basicity of an aqueous solution PE petroleum ether RT room temperature s singlet (spectral)

t triplet (spectral)

SFC Supercritical fluid chromatography

T temperature

TFA trifluoroacetic acid

THF tetrahydrofuran

TPP Triphenylphosphine
Example 1: (7R,14R)-1-(difluoromethoxy)-11-(2-(dimethylphosphoryl)pyrimidin-5-yl)-6,7-dihydro-7,14-methanobenzo[f]benzo[4,5]imidazo[1,2-a][1,4]diazocin-5(14H)-one
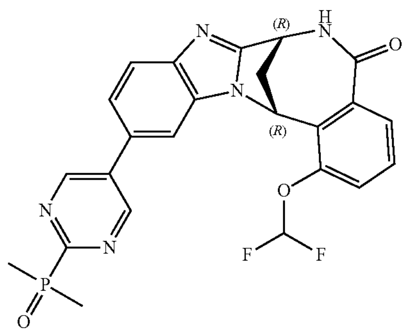
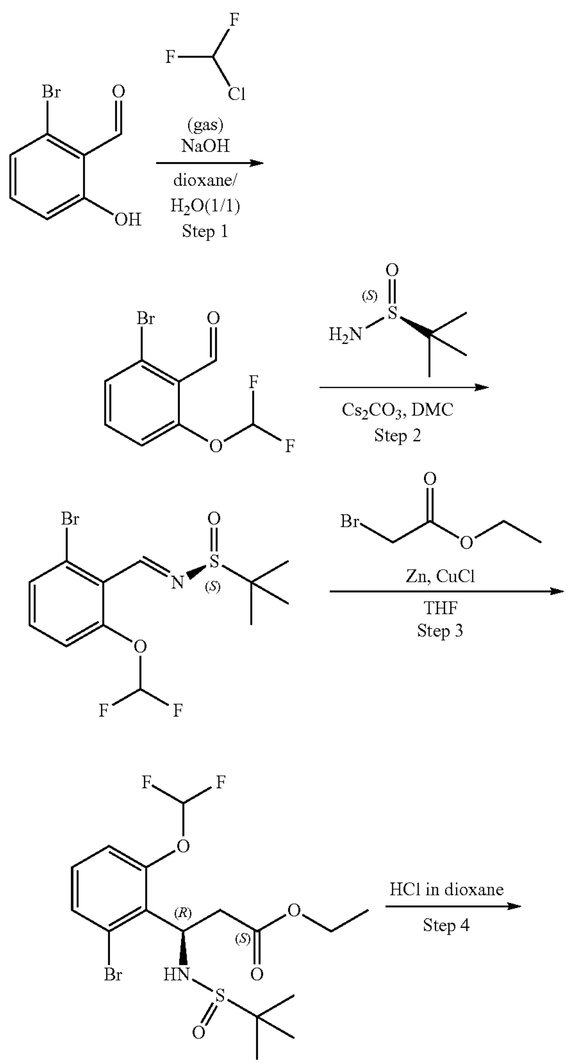
-continued
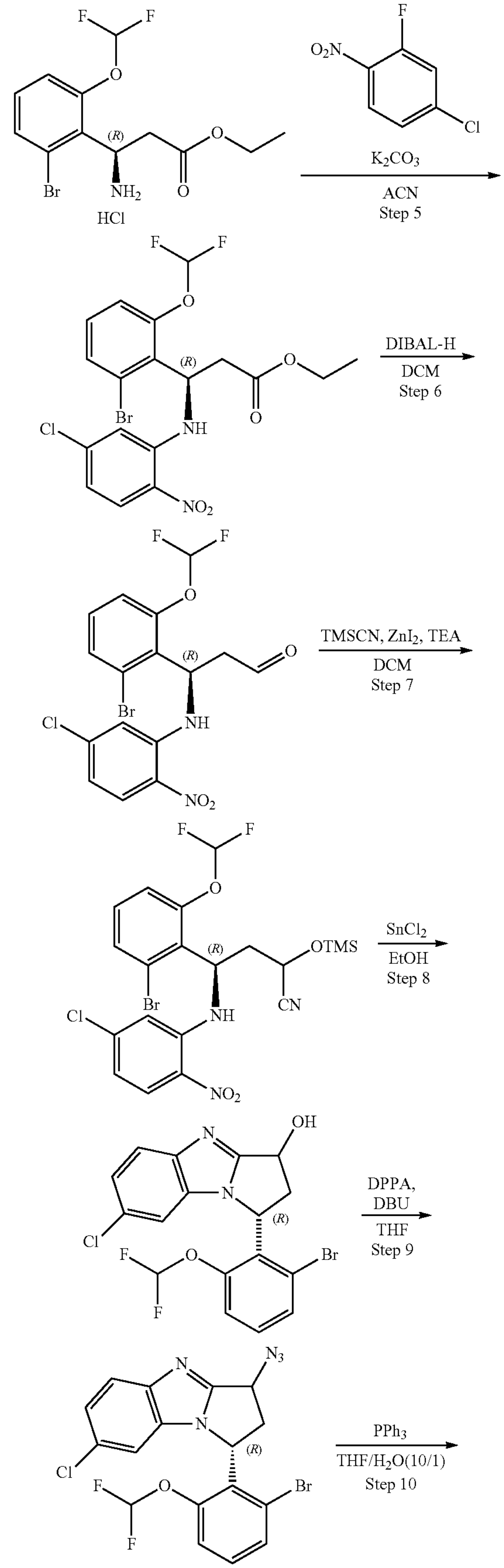

-continued

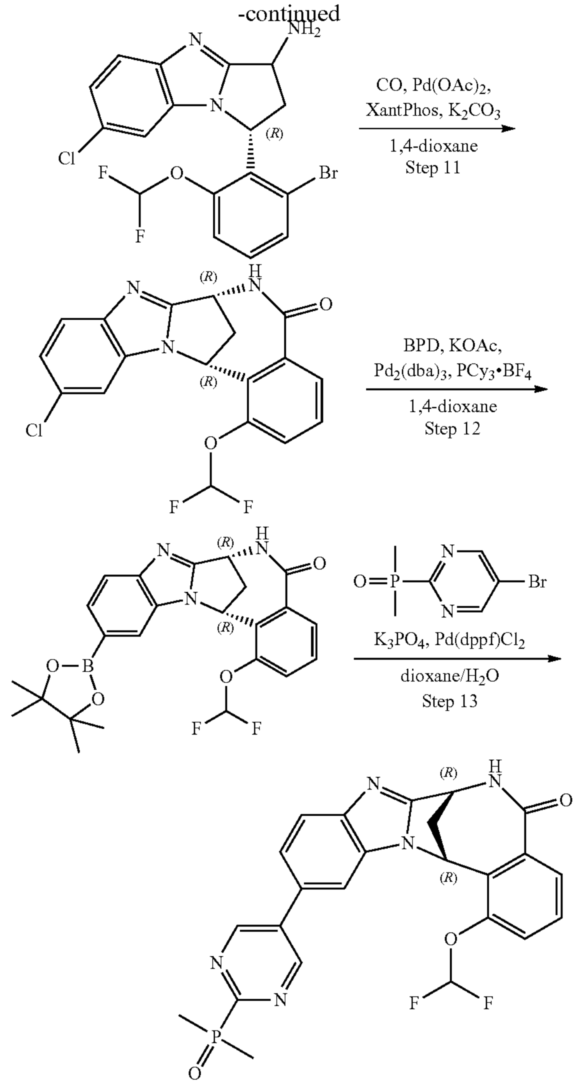

Preparation 1A: 2-bromo-6-(difluoromethoxy)benzaldehyde

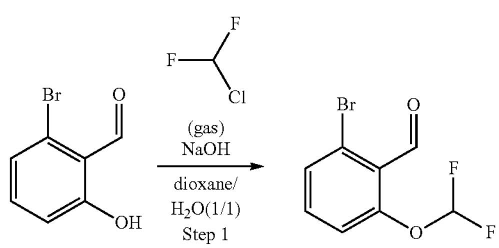

To a stirred solution of 2-bromo-6-hydroxybenzaldehyde (90.00 g, 447.719 mmol) in 1,4-dioxane (900 mL) was added the solution of NaOH (107.44 g, 2686.314 mmol) in $H_2O$ (900 mL) dropwise at room temperature. The mixture was heated at 65° C. and chlorodifluoromethane (gas) was passed through the solution. The reaction mixture was allowed to cool down to room temperature. The resulting mixture was filtered, and the filter cake was washed with EtOAc (3×100 mL). The filtrate was extracted with EtOAc (3×500 mL). The combined organic layers were dried over anhydrous $Na_2SO_4$. After filtration, the filtrate was concentrated under reduced pressure. The residue was purified by silica gel column chromatography, eluted with PE/EA (20:1) to afford 2-bromo-6-(difluoromethoxy)benzaldehyde (80.00 g, 71%) as a yellow oil. $^1$H NMR (300 MHz, Chloroform-d) δ 10.35 (s, 1H), 7.58 (d, J=8.1 Hz, 1H), 7.41 (t, J=8.1 Hz, 1H), 7.26 (d, J=7.9 Hz, 1H), 6.61 (t, J=73.4 Hz, 1H).

Preparation 1B: (S)—N-{[2-bromo-6-(difluoromethoxy)phenyl]methylidene}-2-methylpropane-2-sulfinamide

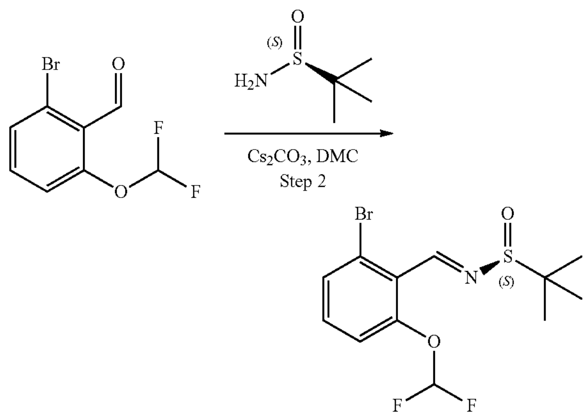

To a stirred solution of 2-bromo-6-(difluoromethoxy) benzaldehyde (80.00 g, 318.691 mmol) and (S)-2-methylpropane-2-sulfinamide (38.63 g, 318.691 mmol) in $CH_2Cl_2$ (800 mL) was added $Cs_2CO_3$ (207.67 g, 637.382 mmol) at room temperature. The resulting mixture was stirred for 16 h at room temperature. The resulting mixture was diluted with water (1 L). The resulting mixture was extracted with EtOAc (3×500 mL). The combined organic layers were washed with brine (1×1 L), dried over anhydrous $Na_2SO_4$. After filtration, the filtrate was concentrated under reduced pressure. The residue was purified by silica gel column chromatography, eluted with PE/EA (10:1) to afford (S)—N-{[2-bromo-6-(difluoromethoxy)phenyl]methylidene}-2-methylpropane-2-sulfinamide (90.00 g, 80%) as a yellow oil. MS ESI calculated for $C_{12}H_{14}BrF_2NO_2S$ $[M+H]^+$ 353.99 355.99, found 353.80 355.75. $^1$H NMR (300 MHz, Chloroform-d) δ 8.84 (s, 1H), 7.59-7.57 (m, 1H), 7.35-7.31 (m, 1H), 7.26-7.24 (m, 1H), 6.57 (t, J=73.8 Hz, 1H), 1.30 (s, 9H).

Preparation 1C: ethyl (3R)-3-[2-bromo-6-(difluoromethoxy)phenyl]-3-{[(S)-2-methylpropane-2-sulfinyl]amino}propanoate

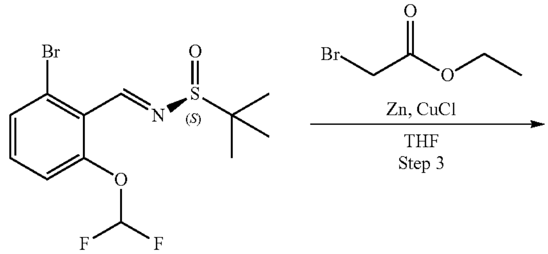

-continued

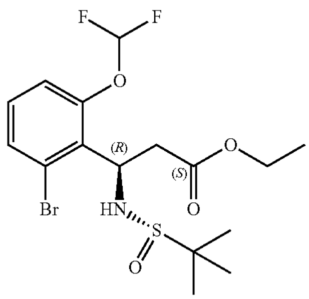

To a stirred mixture of Zn powder (36.92 g, 564.640 mmol) in THF (200 mL) was added anhydrous CuCl (5.59 g, 56.464 mmol) at room temperature. The resulting mixture was stirred for 0.5 h at 70° C. The mixture was allowed to cool down to room temperature. To the above mixture was added solution of ethyl bromoacetate (23.57 g, 141.160 mmol) in THF (200 mL) dropwise at room temperature. The resulting mixture was stirred for additional 0.5 h at 50° C. The resulting mixture was filtered. To the above filtrate was added solution of (S)—N-{[2-bromo-6-(difluoromethoxy) phenyl]methylidene}-2-methylpropane-2-sulfinamide (20.00 g, 56.464 mmol) in THF (20 mL) dropwise at 0° C. The resulting mixture was stirred for additional 2 h at room temperature. The reaction was quenched with sat. $NH_4Cl$ (aq.) at room temperature. The resulting mixture was filtered, and the filter cake was washed with ethyl acetate (3×100 mL). The filtrate was extracted with EtOAc (3×200 mL). The combined organic layers were washed with brine (1×500 mL), dried over anhydrous $Na_2SO_4$. After filtration, the filtrate was concentrated under reduced pressure. The residue was purified by silica gel column chromatography, eluted with $CH_2Cl_2$/MeOH (10:1) to afford ethyl (3R)-3-[2-bromo-6-(difluoromethoxy)phenyl]-3-{[(S)-2-methylpropane-2-sulfinyl]amino}propanoate (21.00 g, 84%) as a yellow oil. MS ESI calculated for $C_{16}H_{22}BrF_2NO_4S$ $[M+H]^+$ 442.04 444.4, 441.90 443.90. $^1H$ NMR (300 MHz, Chloroform-d) δ 7.50-7.42 (m, 1H), 7.23-7.00 (m, 2H), 6.62 (t, J=73.0 Hz, 1H), 5.68-5.55 (m, 1H), 4.18-4.03 (m, 2H), 3.36-2.92 (m, 2H), 1.22 (t, J=7.0 Hz, 3H), 1.16 (s, 9H).

Preparation 1D: ethyl (3R)-3-amino-3-[2-bromo-6-(difluoromethoxy)phenyl]propanoate Hydrochloride

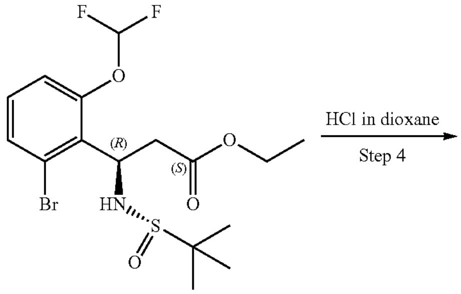

-continued

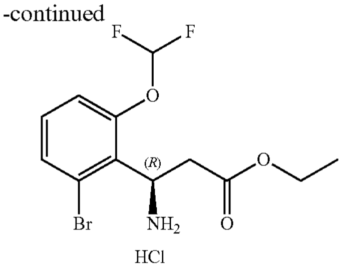

To a stirred solution of ethyl (3R)-3-[2-bromo-6-(difluoromethoxy)phenyl]-3-{[(S)-2-methylpropane-2-sulfinyl]amino}propanoate (24.00 g, 54.259 mmol) in $Et_2O$ (50 mL) and EtOH (25 mL) was added 4N HCl (gas) in 1,4-dioxane (70 mL) at room temperature. The resulting mixture was stirred for 3 h at room temperature. The resulting mixture was concentrated under reduced pressure. This resulting in ethyl (3R)-3-amino-3-[2-bromo-6-(difluoromethoxy)phenyl]propanoate hydrochloride (20.00 g, 98%) as a yellow oil. MS ESI calculated for $C_{12}H_{14}BrF_2NO_3$ $[M+H]^+$ 338.01 340.01, found 338.00 340.00.

Preparation 1E: ethyl (3R)-3-[2-bromo-6-(difluoromethoxy)phenyl]-3-[(5-chloro-2-nitrophenyl)amino]propanoate

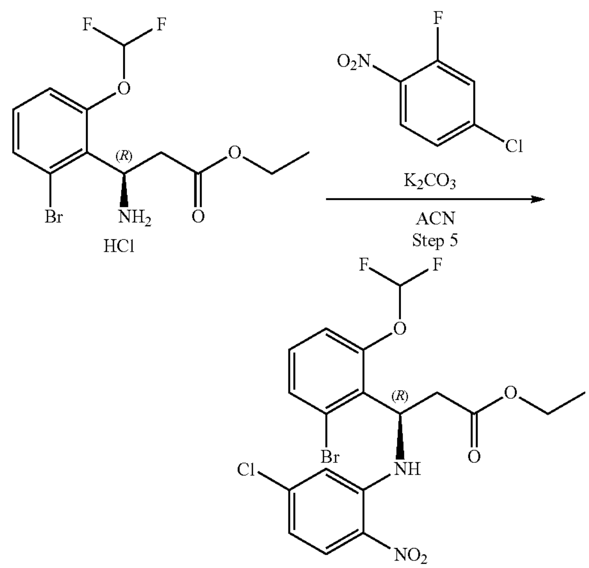

To a stirred solution of ethyl (3R)-3-amino-3-[2-bromo-6-(difluoromethoxy)phenyl]propanoate hydrochloride (20.00 g, 53.389 mmol) and 4-chloro-2-fluoro-1-nitrobenzene (11.25 g, 64.067 mmol) in ACN (200 mL) was added potassium carbonate (22.30 g, 160.167 mmol) at room temperature. The mixture was stirred for 16 h at 80° C. The resulting mixture was diluted with water (200 mL), and extracted with EtOAc (3×500 mL). The combined organic layers were washed with brine (1×500 mL), dried over anhydrous $Na_2SO_4$. After filtration, the filtrate was concentrated under reduced pressure. The residue was purified by silica gel column chromatography, eluted with PE/EA (10:1) to afford ethyl (3R)-3-[2-bromo-6-(difluoromethoxy)phenyl]-3-[(5-chloro-2-nitrophenyl)amino]propanoate (20.00 g, 76%) as a yellow oil. MS ESI calculated for $C_{18}H_{16}BrClF_2N_2O_5$ $[M+H]^+$ 492.99 494.99, found 492.95 494.85. $^1H$ NMR (400 MHz, Chloroform-d) δ 8.92 (d, J=8.8 Hz, 1H), 8.08 (d, J=9.1 Hz, 1H), 7.48-7.43 (m, 1H), 7.23-7.11 (m, 2H), 7.11-7.04 (m, 1H), 6.65 (t, J=73.0 Hz, 1H), 6.63-6.57 (m, 1H), 5.87-5.77 (m, 1H), 4.18-4.09 (m, 2H), 3.23-3.17 (m, 1H), 3.02-2.85 (m, 1H), 1.22 (t, J=7.1 Hz, 3H).

Preparation 1F: (3R)-3-[2-bromo-6-(difluoromethoxy)phenyl]-3-[(5-chloro-2-nitrophenyl)amino]propanal

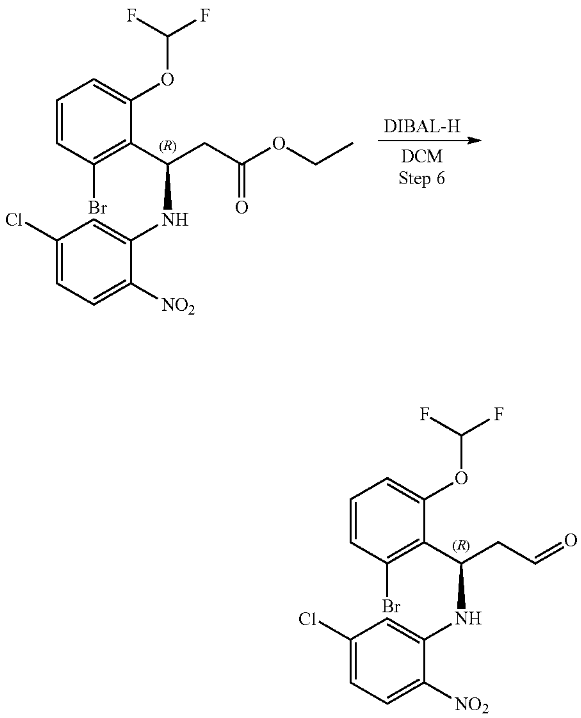

To a stirred solution of ethyl (3R)-3-[2-bromo-6-(difluoromethoxy)phenyl]-3-[(5-chloro-2-nitrophenyl)amino]propanoate (18.00 g, 36.460 mmol) in $CH_2Cl_2$ (200 mL) was added 1N DIBAl-H (73 mL, 73.000 mmol) in THF dropwise at −78° C. under nitrogen atmosphere. The reaction was stirred for 3 h at −78° C. under nitrogen atmosphere. The resulting mixture was quenched with sat. $NH_4Cl$ (aq.) at −78° C., and extracted with $CH_2Cl_2$ (3×500 mL). The combined organic layers were dried over anhydrous $Na_2SO_4$. After filtration, the filtrate was concentrated under reduced pressure. The residue was purified by silica gel column chromatography, eluted with PE/EA (10:1) to afford (3R)-3-[2-bromo-6-(difluoromethoxy)phenyl]-3-[(5-chloro-2-nitrophenyl)amino]propanal (12.00 g, 73%) as a yellow oil. MS ESI calculated for $C_{16}H_{12}BrClF_2N_2O_4$ $[M+H]^+$ 448.96 450.96, found 448.95 450.95. $^1H$ NMR (400 MHz, Chloroform-d) δ 9.81 (s, 1H), 8.84 (d, J=9.0 Hz, 1H), 8.08 (d, J=9.1 Hz, 1H), 7.49-7.43 (m, 1H), 7.22-7.14 (m, 2H), 7.13-7.06 (m, 1H), 6.67 (t, J=73.0 Hz, 1H), 6.65-6.60 (m, 1H), 5.97-5.88 (m, 1H), 3.56-3.41 (m, 1H), 3.22-2.93 (m, 1H).

Preparation 1G: (4R)-4-[2-bromo-6-(difluoromethoxy)phenyl]-4-[(5-chloro-2-nitrophenyl)amino]-2-[(trimethylsilyl)oxy]butanenitrile

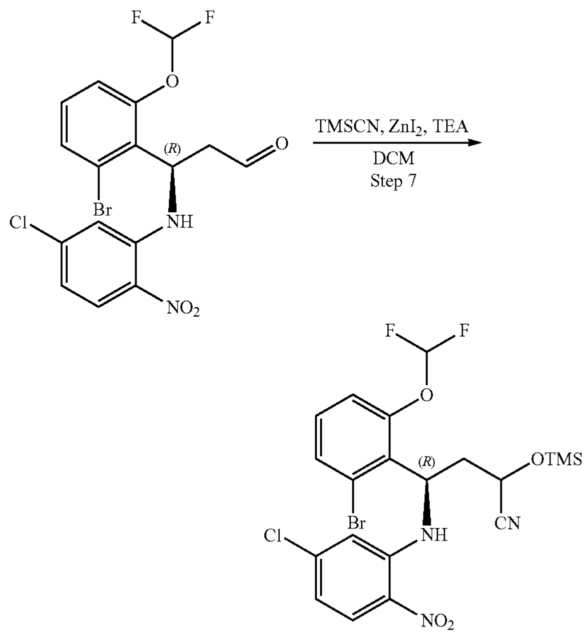

To a stirred solution of (3R)-3-[2-bromo-6-(difluoromethoxy)phenyl]-3-[(5-chloro-2-nitrophenyl)amino]propanal (12.00 g, 26.689 mmol) in $CH_2Cl_2$ (120 mL) were added $ZnI_2$ (852 mg, 2.669 mmol) and TMSCN (5.30 g, 53.378 mmol) at room temperature. The mixture was stirred for 16 h at room temperature. The resulting mixture was diluted with water (50 mL), and extracted with $CH_2Cl_2$ (3×50 mL). The combined organic layers were dried over anhydrous $Na_2SO_4$. After filtration, the filtrate was concentrated under reduced pressure to afford (4R)-4-[2-bromo-6-(difluoromethoxy)phenyl]-4-[(5-chloro-2-nitrophenyl)amino]-2-[(trimethylsilyl)oxy]butanenitrile (13.00 g, 89%) as a yellow oil. The crude product was used in the next step directly without further purification. MS ESI calculated for $C_{20}H_{21}BrClF_2N_3O_4Si$ $[M+H]^+$ 548.01 550.01, found 548.05 550.00.

Preparation 1H: (3R)-3-[2-bromo-6-(difluoromethoxy)phenyl]-11-chloro-2,7-diazatricyclo[6.4.0.0^{2,6}]dodeca-1(8),6,9,11-tetraen-5-ol

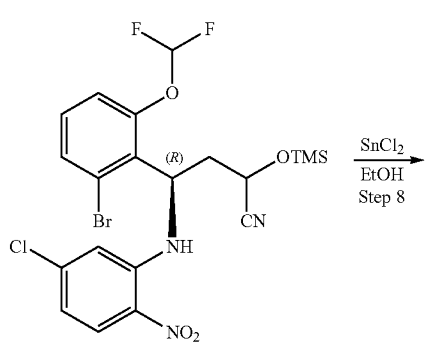

-continued

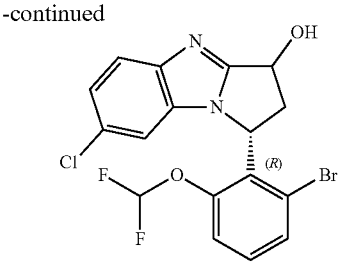

To a stirred solution of (4R)-4-[2-bromo-6-(difluoromethoxy)phenyl]-4-[(5-chloro-2-nitrophenyl)amino]-2-[(trimethylsilyl)oxy]butanenitrile (13.00 g, 23.686 mmol) in EtOH (100 mL) was added $SnCl_2 \cdot 2H_2O$ (26.96 g, 118.430 mmol) at room temperature. The mixture was stirred for 16 h at 80° C. The reaction was quenched by the addition of water (50 mL) at room temperature, and basified to pH 8 with 1N KOH (aq.). The mixture was filtered, the filter cake was washed with EtOAc (3×50 mL), and extracted with EtOAc (3×100 mL). The combined organic layers were washed with brine (1×100 mL), dried over anhydrous $Na_2SO_4$. After filtration, the filtrate was concentrated under reduced pressure. The residue was purified by silica gel column chromatography, eluted with PE/EA (1:2) to afford (3R)-3-[2-bromo-6-(difluoromethoxy)phenyl]-11-chloro-2,7-diazatricyclo[6.4.0.0^{2,6}]dodeca-1(8),6,9,11-tetraen-5-ol (7.00 g, 69%) as a yellow solid. MS ESI calculated for $C_{17}H_{12}BrClF_2N_2O_2$ $[M+H]^+$ 428.97 430.97, found 429.00 431.00.

Preparation 1I: (3R)-5-azido-3-[2-bromo-6-(difluoromethoxy)phenyl]-11-chloro-2,7-diazatricyclo [6.4.0.0^{2,6}]dodeca-1(8),6,9,11-tetraene

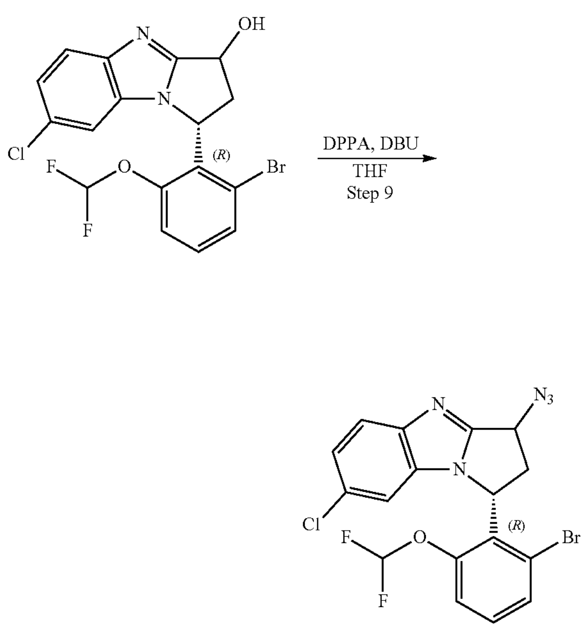

To a stirred solution of (3R)-3-[2-bromo-6-(difluoromethoxy)phenyl]-11-chloro-2,7-diazatricyclo[6.4.0.0^{2,6}]dodeca-1(8),6,9,11-tetraen-5-ol (22.00 g, 51.204 mmol) in THF (200 mL) were added DPPA (16.91 g, 61.445 mmol) and DBU (15.59 g, 102.408 mmol) at 0° C. The mixture was stirred for 16 h at room temperature. The resulting mixture was extracted with EtOAc (3×500 mL). The combined organic layers were washed with brine (1×500 mL), dried over anhydrous $Na_2SO_4$. After filtration, the filtrate was concentrated under reduced pressure. The residue was purified by silica gel column chromatography, eluted with $CH_2Cl_2$/MeOH (20:1) to afford desired mixture of (3R)-5-azido-3-[2-bromo-6-(difluoromethoxy)phenyl]-11-chloro-2,7-diazatricyclo[6.4.0.0^{2,6}]dodeca-1(8),6,9,11-tetraene (15.00 g, 64%) as a green oil. MS ESI calculated for $C_{17}H_{11}BrClF_2N_5O$ $[M+H]^+$ 453.98 455.98, found 454.05 456.05.

Preparation 1J: (3R)-3-[2-bromo-6-(difluoromethoxy)phenyl]-11-chloro-2,7-diazatricyclo [6.4.0.0^{2,6}]dodeca-1(8),6,9,11-tetraen-5-amine

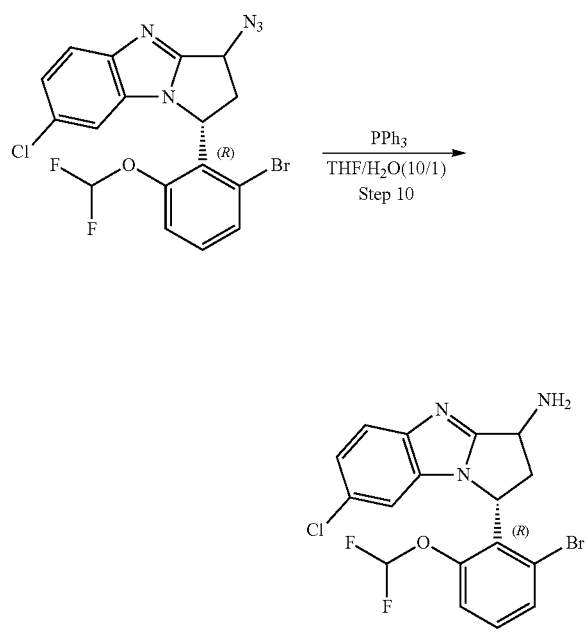

To a stirred solution of (3R)-5-azido-3-[2-bromo-6-(difluoromethoxy)phenyl]-11-chloro-2,7-diazatricyclo [6.4.0.0^{2,6}]dodeca-1(8),6,9,11-tetraene (15.00 g, 32.992 mmol) in THF (50 mL) and $H_2O$ (5 mL) was added $PPh_3$ (12.98 g, 49.488 mmol) at room temperature. The mixture was stirred for 16 h at room temperature. The resulting mixture was concentrated under reduced pressure. The residue was purified by silica gel column chromatography, eluted with $CH_2Cl_2$/MeOH (12:1) to afford (3R)-3-[2-bromo-6-(difluoromethoxy)phenyl]-11-chloro-2,7-diazatricyclo[6.4.0.0^{2,6}]dodeca-1(8),6,9,11-tetraen-5-amine (10 g, 71%) as a yellow solid. MS ESI calculated for $C_{17}H_{13}BrClF_2N_3O$ $[M+H]^+$ 427.99 429.99, found 428.00 430.00. $^1H$ NMR (400 MHz, Chloroform-d) δ 7.70-7.58 (m, 2H), 7.35-7.28 (m, 1H), 7.23-7.00 (m, 2H), 6.90-6.46 (m, 1H), 6.17-6.06 (m, 1H), 5.98-5.58 (m, 1H), 4.77-4.57 (m, 1H), 3.60-3.40 (m 1H), 2.82-2.55 (m, 1H).

Preparation 1K: (1R,11R)-5-chloro-18-(difluoromethoxy)-2,9,12-triazapentacyclo[9.8.1.0^{2,10}.0^{3,8}.0^{14,19}]icosa-3(8),4,6,9,14(19),15,17-heptaen-13-one

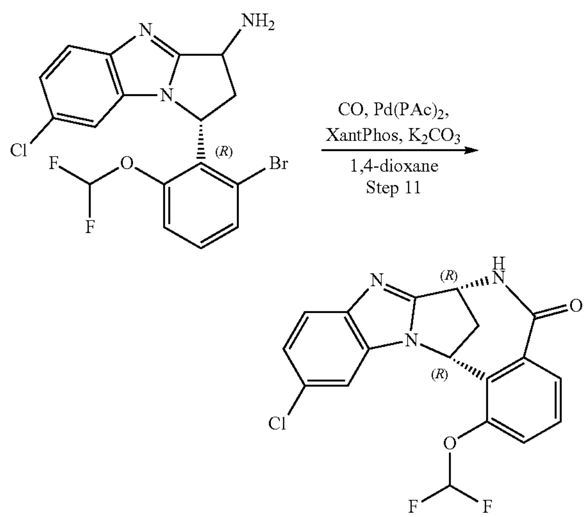

To a solution of (3R)-3-[2-bromo-6-(difluoromethoxy)phenyl]-11-chloro-2,7-diazatricyclo[6.4.0.0^{2,6}]dodeca-1(8),6,9,11-tetraen-5-amine (500 mg, 1.166 mmol) in 1,4-dioxane (10 mL) were added $K_2CO_3$ (806 mg, 5.830 mmol), XantPhos (34 mg, 0.058 mmol) and $Pd(OAc)_2$ (13 mg, 0.058 mmol) in a pressure tank. The mixture was purged with nitrogen for 5 min and then was pressurized to 1 atm with carbon monoxide at 100° C. for 16 h. The resulting mixture was concentrated under reduced pressure. The residue was purified by silica gel column chromatography, eluted with $CH_2Cl_2$/MeOH (10:1) to afford (1R,11R)-5-chloro-18-(difluoromethoxy)-2,9,12-triazapentacyclo[9.8.1.0^{2,10}.0^{3,8}.0^{14,19}]icosa-3(8),4,6,9,14(19),15,17-heptaen-13-one (200 mg, 46%) as a white solid. MS ESI calculated for $C_{18}H_{12}ClF_2N_3O_2$ $[M+H]^+$ 376.06, found 375.95. $^1H$ NMR (400 MHz, Chloroform-d) δ 8.44 (d, J=8.0 Hz, 1H), 7.64 (d, J=8.7 Hz, 1H), 7.52-7.35 (m, 4H), 7.24-7.19 (m, 1H), 6.85 (t, J=72.6 Hz, 1H), 6.29 (d, J=7.3 Hz, 1H), 4.94 (t, J=6.6 Hz, 1H), 3.53-3.41 (m, 1H), 2.85 (d, J=13.3 Hz, 1H).

Preparation 1L: (1R,11R)-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptan-13-one

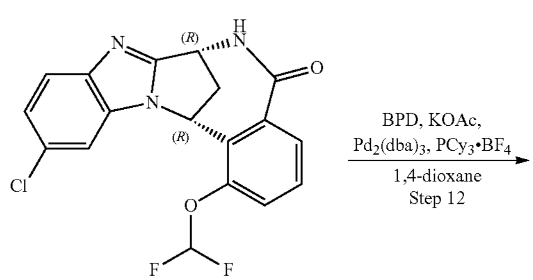

-continued

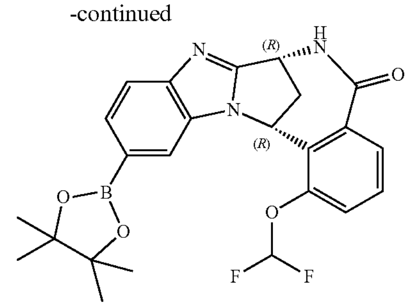

To a stirred solution of (1R,11R)-5-chloro-18-(difluoromethoxy)-2,9,12-triazapentacyclo[9.8.1.0^{2,10}.0^{3,8}.0^{14,19}]icosa-3(8),4,6,9,14(19),15,17-heptaen-13-one (50 mg, 0.133 mmol) and BPD (51 mg, 0.200 mmol) in 1,4-dioxane (2 mL) were added KOAc (39 mg, 0.399 mmol), $Pd_2(dba)_3$ (12 mg, 0.013 mmol) and $PCy_3{\cdot}HBF_4$ (5 mg, 0.013 mmol) at room temperature under nitrogen atmosphere. The mixture was stirred for 16 h at 140° C. under nitrogen atmosphere. The resulting mixture was concentrated under reduced pressure. The residue was purified by silica gel column chromatography, eluted with $CH_2Cl_2$/MeOH (10:1) to afford (1R,11R)-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (22 mg, 35%) as a yellow oil. MS ESI calculated for $C_{24}H_{24}BF_2N_3O_4$ $[M+H]^+$ 468.18, found 467.95.

Example 1: (7R,14R)-1-(difluoromethoxy)-11-(2-(dimethylphosphoryl)pyrimidin-5-yl)-6,7-dihydro-7,14-methanobenzo[f]benzo[4,5]imidazo[1,2-a][1,4]diazocin-5(14H)-one

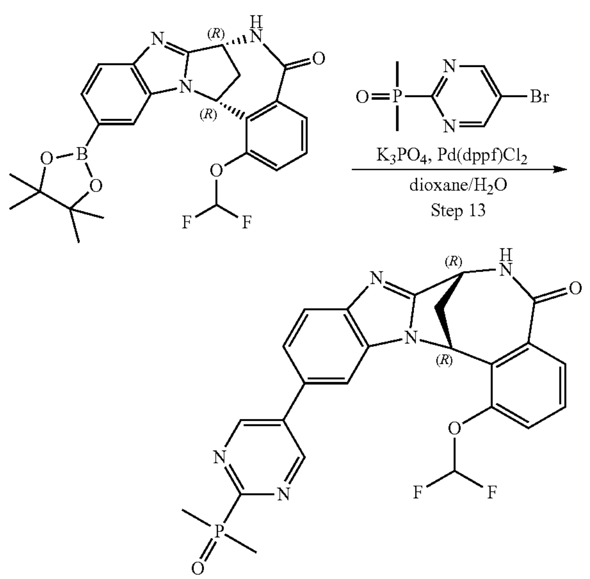

To a stirred solution of (1R,11R)-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (22 mg, 0.047 mmol) and 5-bromo-2-(dimethylphosphoryl)pyrimidine (11 mg, 0.047 mmol) in 1,4-dioxane (2 mL) was added solution of $K_3PO_4$ (30 mg, 0.141 mmol) in $H_2O$ (0.5 mL) at room temperature under nitrogen atmosphere. To the above mixture was added Pd(dppf)$Cl_2$·$CH_2Cl_2$ (4 mg, 0.005 mmol) at room temperature. The resulting mixture was stirred for 2 h at 100° C. under nitrogen atmosphere. The solution was purified by Prep-HPLC to afford (1R,11R)-18-(difluoromethoxy)-5-[2-(dimethylphosphoryl)pyrimidin-5-yl]-2,9,12-triazapentacyclo[9.8.1.0^{2,10}.0^{3,8}.0^{14,19}]icosa-3(8),4,6,9,14(19),15,17-heptaen-13-one (15 mg, 64%) as a white solid. MS ESI calculated for $C_{24}H_{20}F_2N_5O_3P$ $[M+H]^+$ 496.13, found 496.20. $^1H$ NMR (400 MHz, DMSO-$d_6$) δ 9.24 (s, 2H), 9.16 (d, J=6.8 Hz, 1H), 8.26-8.21 (m, 1H), 7.89-7.66 (m, 4H), 7.52-7.50 (m, 2H), 6.39-6.38 (m, 1H), 4.93-4.90 (m, 1H), 3.53-3.46 (m, 1H), 2.78-2.75 (m, 1H), 1.83 (s, 3H), 1.80 (s, 3H). $^{19}F$ NMR (377 MHz, DMSO-$d_6$) δ −81.53 (d, J=169.3 Hz) (1F), −82.84 (d, J=169.3 Hz) (1F). $^{31}P$ NMR (162 MHz, DMSO-$d_6$) δ 33.89.

Example 2: (7R,14R)-1-(difluoromethoxy)-11-(6-(dimethylphosphoryl)pyridin-3-yl)-6-methyl-6,7-dihydro-7,14-methanobenzo[f]benzo[4,5]imidazo[1,2-a][1,4]diazocin-5(14H)-one

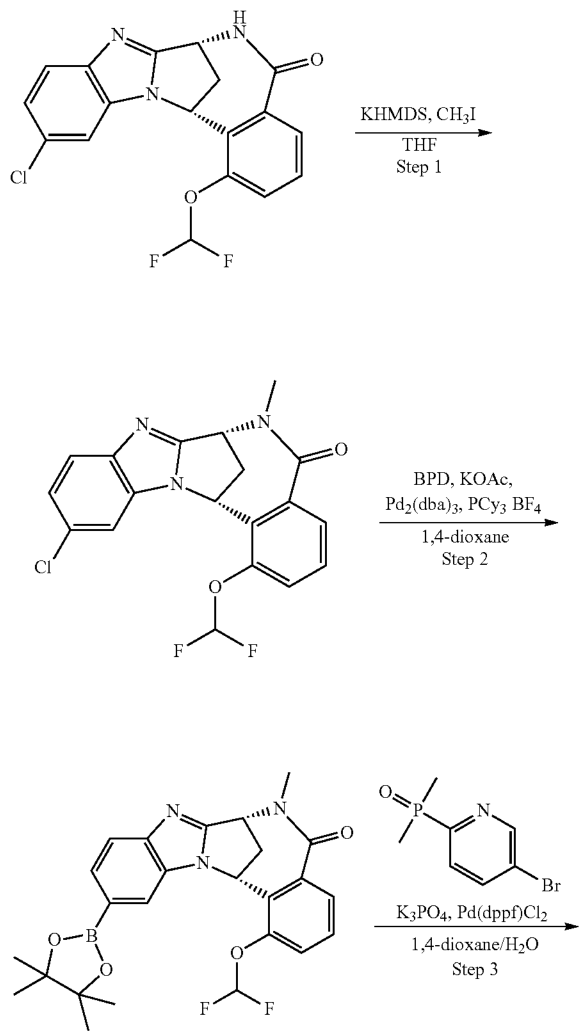

-continued

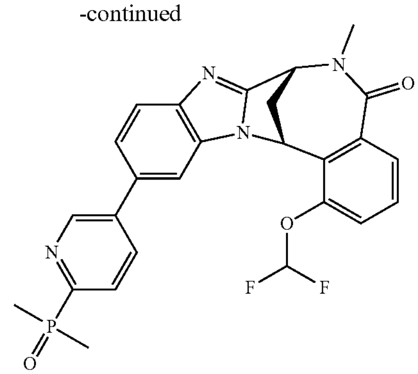

Preparation 2A: (1R,11R)-5-chloro-18-(difluoromethoxy)-12-methyl-2,9,12-triazapentacyclo[9.8.1.0^{2,10}.0^{3,8}.0^{14,19}]icosa-3(8),4,6,9,14(19),15,17-heptaen-13-one

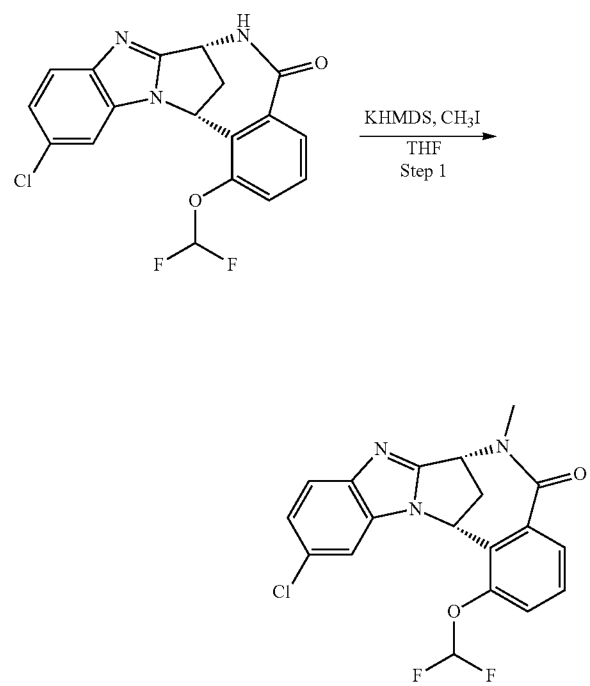

To a stirred solution of (1R,11R)-5-chloro-18-(difluoromethoxy)-2,9,12-triazapentacyclo[9.8.1.0^{2,10}.0^{3,8}.0^{14,19}]icosa-3(8),4,6,9,14(19),15,17-heptaen-13-one (120 mg, 0.319 mmol) in dry THF (2 mL) was added 1N KHMDS (0.4 mL, 0.40 mmol) in THF dropwise at −78° C. under nitrogen atmosphere. This reaction was stirred for 1 h at −78° C. under nitrogen atmosphere. To the above solution was added $CH_3I$ (68 mg, 0.479 mmol) dropwise over 2 min at −78° C. The mixture was stirred for 1 h at room temperature. The reaction was quenched by the addition of sat. $NH_4Cl$ (aq.) (1 mL) at room temperature. The resulting mixture was concentrated under reduced pressure. The residue was purified by silica gel column chromatography, eluted with $CH_2Cl_2$/MeOH (10:1) to afford (1R,11R)-5-chloro-18-(difluoromethoxy)-12-methyl-2,9,12-triazapentacyclo[9.8.1.0^{2,10}.0^{3,8}.0^{14,19}]icosa-3(8),4,6,9,14(19),15,17-heptaen-13-one (85 mg, 68%) as a yellow solid. MS ESI calculated for $C_{19}H_{14}ClF_2N_3O_2$ $[M+H]^+$ 390.07 392.07, found 390.25 392.25. $^1$H NMR (300 MHz, Chloroform-d) δ 8.50 (d, J=8.2 Hz, 1H), 7.65 (d, J=8.7 Hz, 1H), 7.48-7.42 (m, 2H), 7.38-7.32 (m, 1H), 7.25-7.22 (m, 1H), 6.84 (t, J=72.6 Hz, 1H), 6.24-6.21 (m, 1H), 5.02-5.00 (m, 1H), 3.53 (s, 3H), 3.49-3.41 (m, 1H), 2.90-2.86 (m, 1H).

Preparation 2B: (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one

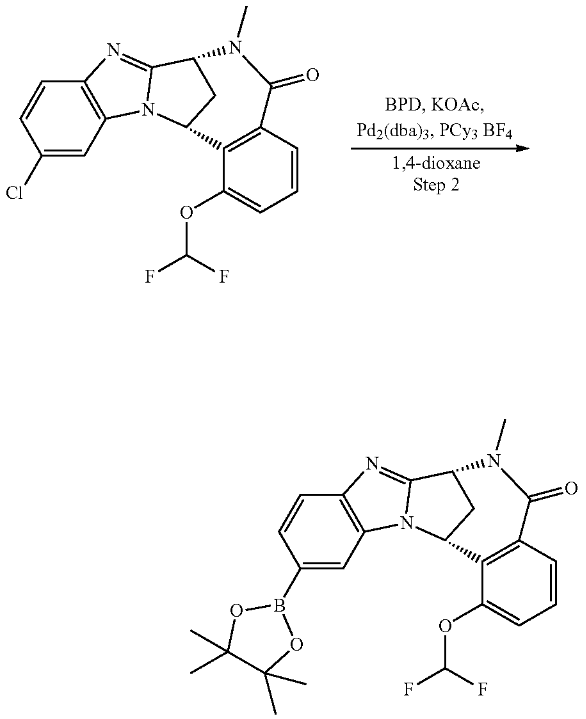

To a stirred mixture of (1R,11R)-5-chloro-18-(difluoromethoxy)-12-methyl-2,9,12-triazapentacyclo[9.8.1.0^{2,10}.0^{3,8}.0^{14,19}]icosa-3(8),4,6,9,14(19),15,17-heptaen-13-one (85 mg, 0.218 mmol), KOAc (64 mg, 0.654 mmol) and BPD (83 mg, 0.327 mmol) in 1,4-dioxane (3 mL) were added $PCy_3{\cdot}HBF_4$ (8 mg, 0.022 mmol) and $Pd_2(dba)_3$ (20 mg, 0.022 mmol) at room temperature under nitrogen atmosphere. The mixture was stirred for 16 h at 140° C. under nitrogen atmosphere. The resulting mixture was concentrated under reduced pressure. The residue was purified by silica gel column chromatography, eluted with $CH_2Cl_2$/MeOH (10:1) to afford (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (65 mg, 62%) as a yellow oil. MS ESI calculated for $C_{25}H_{26}BF_2N_3O_4$ $[M+H]^+$ 482.20, found 481.90.

Example 2: (7R,14R)-1-(difluoromethoxy)-11-(6-(dimethylphosphoryl)pyridin-3-yl)-6-methyl-6,7-dihydro-7,14-methanobenzo[f]benzo[4,5]imidazo[1,2-a][1,4]diazocin-5(14H)-one

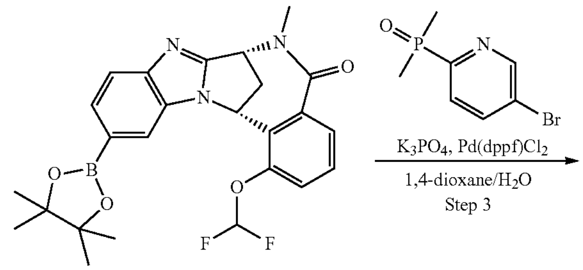

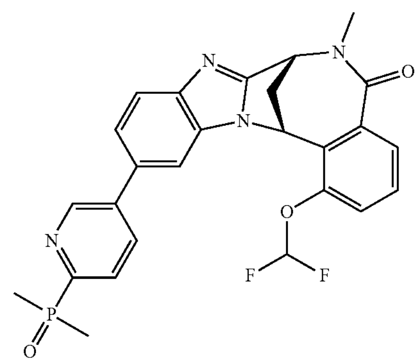

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (60 mg, 0.125 mmol) and 5-bromo-2-(dimethylphosphoryl)pyridine (29 mg, 0.125 mmol) in 1,4-dioxane (3 mL) was added a solution of $K_3PO_4$ (79 mg, 0.375 mmol) in $H_2O$ (1 mL) at room temperature under nitrogen atmosphere. To the above solution was added $Pd(dppf)Cl_2{\cdot}CH_2Cl_2$ (10 mg, 0.013 mmol) at room temperature under nitrogen atmosphere. The mixture was stirred for 16 h at 100° C. The solution was purified by reversed-phase flash chromatography (C18 Column 120 g; Mobile Phase A: water (10 mmol/L, FA), Mobile Phase B: $CH_3CN$; Flow rate: 50 mL/min; Gradient: 20% B to 40% B in 25 min; 254/220 nm) and the fractions containing the desired product were collected at 33% B, concentrated under reduced pressure to afford (1R,11R)-18-(difluoromethoxy)-5-[6-(dimethylphosphoryl)pyridin-3-yl]-12-methyl-2,9,12-triazapentacyclo[9.8.1.0^{2,10}.0^{3,8}.0^{14,19}]icosa-3(8),4,6,9,14(19),15,17-heptaen-13-one (40 mg, 63%) as an off-white solid. MS ESI calculated for $C_{26}H_{23}F_2N_4O_3P$ $[M+H]^+$ 509.15, found 509.00. $^1$H NMR (400 MHz, Chloroform-d) δ 8.97-8.92 (m, 1H), 8.52-8.47 (m, 1H), 8.22-8.15 (m, 1H), 8.05-7.99 (m, 1H), 7.84 (d, J=8.5 Hz, 1H), 7.76-7.72 (m, 1H), 7.54-7.47 (m, 1H), 7.46-7.41 (m, 1H), 7.34-7.29 (m, 1H), 6.86 (t, J=72.9 Hz, 1H), 6.31 (d, J=7.1 Hz, 1H), 5.02 (d, J=7.0 Hz, 1H), 3.54 (s, 3H), 3.53-3.45 (m, 1H), 2.91 (d, J=13.6 Hz, 1H), 1.84 (s, 3H), 1.81 (s, 3H). $^{19}$F NMR (377 MHz, Chloroform-d) δ −80.73 (2F). $^{31}$P NMR (162 MHz, Chloroform-d) δ 36.56.

Example 3: (7R,14R)-1-(difluoromethoxy)-11-(6-(dimethylphosphoryl)pyridin-3-yl)-6,7-dihydro-7,14-methanobenzo[f]benzo[4,5]imidazo[1,2-a][1,4]diazocin-5(14H)-one

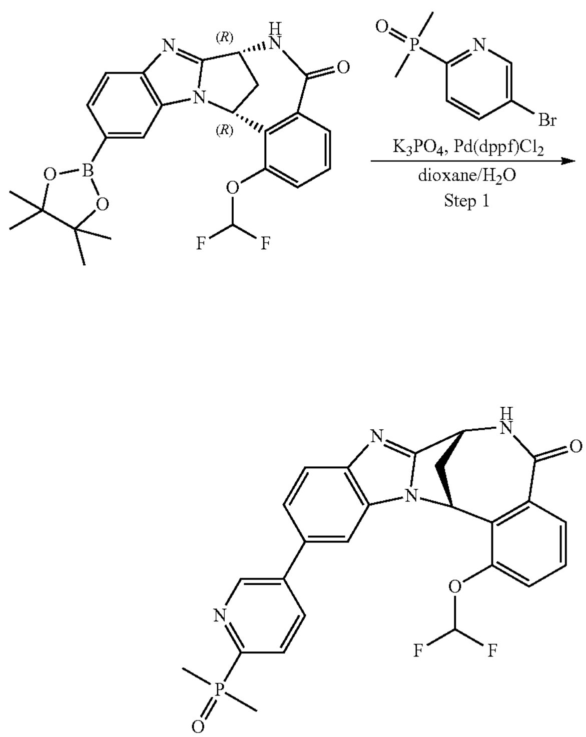

To a stirred solution of (1R,11R)-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.107 mmol) and 5-bromo-2-(dimethylphosphoryl)pyridine (25 mg, 0.107 mmol) in 1,4-dioxane (2 mL) was added a solution of $K_3PO_4$ (68 mg, 0.321 mmol) in $H_2O$ (0.5 mL) at room temperature under nitrogen atmosphere. To the above mixture was added $Pd(dppf)Cl_2 \cdot CH_2Cl_2$ (9 mg, 0.011 mmol) at room temperature under nitrogen atmosphere. The mixture was stirred for 16 h at 100° C. The resulting mixture was concentrated under reduced pressure. The residue was purified by reversed-phase flash chromatography (C18 Column 40 g; Mobile Phase A: water (10 mmol/L, FA), Mobile Phase B: $CH_3CN$; Flow rate: 25 mL/min; Gradient: 20% B to 40% B in 30 min; 254/220 nm) to afford (1R,11R)-18-(difluoromethoxy)-5-[6-(dimethylphosphoryl)pyridin-3-yl]-2,9,12-triazapentacyclo[9.8.1.0^{2,10}.0^{3,8}.0^{14,19}]icosa-3(8),4,6,9,14(19),15,17-heptaen-13-one (25 mg, 47%) as a white solid. MS ESI calculated for $C_{25}H_{21}F_2N_4O_3P$ $[M+H]^+$ 495.13, found 495.00. $^1H$ NMR (400 MHz, Chloroform-d) δ 8.95 (d, J=2.3 Hz, 1H), 8.48-8.42 (m, 1H), 8.24-8.16 (m, 1H), 8.05-7.99 (m, 1H), 7.87 (d, J=8.5 Hz, 1H), 7.73 (d, J=1.7 Hz, 1H), 7.57-7.49 (m, 2H), 7.46 (t, J=8.1 Hz, 1H), 7.41-7.35 (m, 1H), 6.87 (t, J=72.7 Hz, 1H), 6.42 (d, J=7.2 Hz, 1H), 5.07 (t, J=6.6 Hz, 1H), 3.57-3.47 (m, 1H), 2.91 (d, J=13.3 Hz, 1H), 1.85 (s, 3H), 1.82 (s, 3H). $^{19}F$ NMR (377 MHz, Chloroform-d) δ −80.82 (1F), −80.83 (1F). $^{31}P$ NMR (162 MHz, Chloroform-d) δ 36.48.

Example 4: (7R,14R)-1-(difluoromethoxy)-11-(6-(dimethylphosphoryl)-5-fluoropyridin-3-yl)-6-methyl-6,7-dihydro-7,14-methanobenzo[f]benzo[4,5]imidazo[1,2-a][1,4]diazocin-5(14H)-one

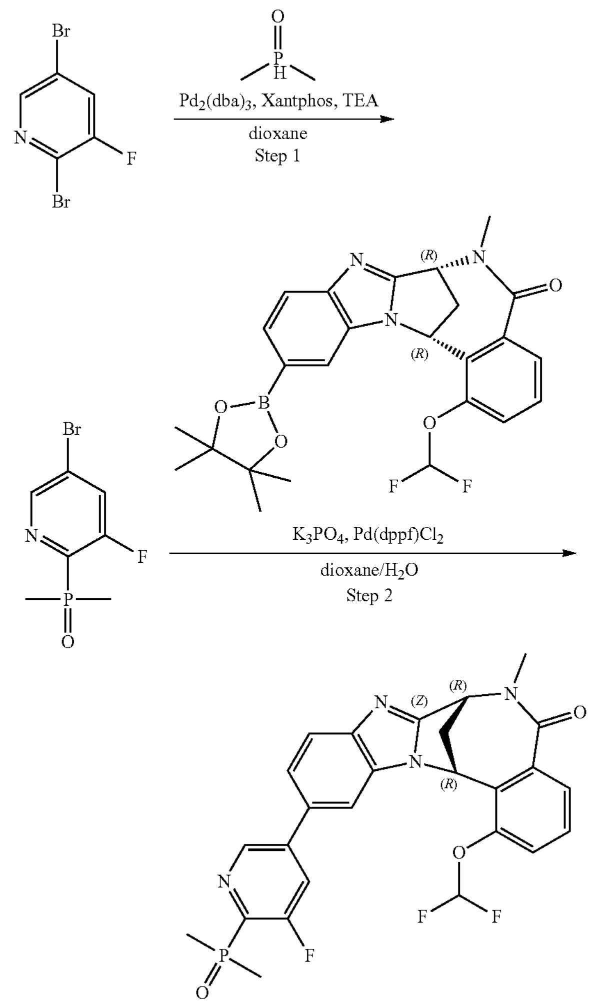

Preparation 4A: 5-bromo-2-(dimethylphosphoryl)-3-fluoropyridine

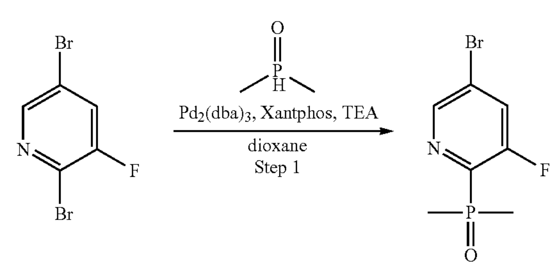

To a stirred solution of 2,5-dibromo-3-fluoropyridine (5.00 g, 19.617 mmol) and (methylphosphonoyl)methane (1.68 g, 21.579 mmol) in 1,4-dioxane (50 mL) were added $Pd_2(dba)_3$ (898 mg, 0.981 mmol) and TEA (3.3 mL, 23.540 mmol) at room temperature. The resulting mixture was stirred for overnight at 90° C. under nitrogen atmosphere. The resulting mixture was concentrated under reduced pressure. The residue was purified by silica gel column chromatography, eluted with $CH_2Cl_2$/MeOH (10:1), to afford 5-bromo-2-(dimethylphosphoryl)-3-fluoropyridine (1.78 g, 36%) as a brown solid. MS ESI calculated for $C_7H_8BrFNOP$ $[M+H]^+$ 251.95 253.95, found 251.95 253.95. $^1H$ NMR (300 MHz, Chloroform-d) δ8.65 (s, 1H), 7.76-7.69 (m, 1H), 1.90 (s, 3H), 1.87 (s, 3H).

Example 4: (7R,14R)-1-(difluoromethoxy)-11-(6-(dimethylphosphoryl)-5-fluoropyridin-3-yl)-6-methyl-6,7-dihydro-7,14-methanobenzo[f]benzo[4,5]imidazo[1,2-a][1,4]diazocin-5(14H)-one

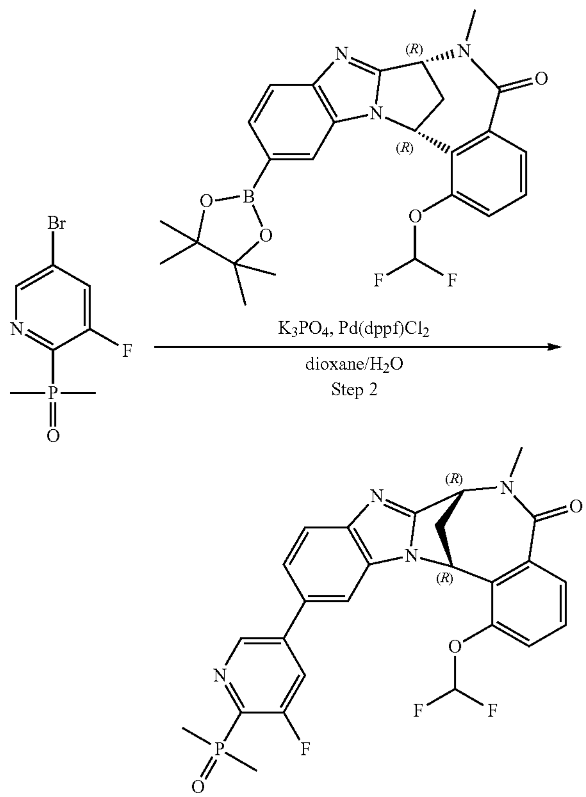

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.104 mmol) and 5-bromo-2-(dimethylphosphoryl)-3-fluoropyridine (26 mg, 0.104 mmol) in 1,4-dioxane (2 mL) was added a solution of $K_3PO_4$ (66 mg, 0.312 mmol) in $H_2O$ (0.5 mL) at room temperature under nitrogen atmosphere. To the above solution was added $Pd(dppf)Cl_2 \cdot CH_2Cl_2$ (8 mg, 0.010 mmol) at room temperature under nitrogen atmosphere. The resulting mixture was stirred for 2 h at 100° C. The mixture was allowed to cool down to room temperature. The resulting mixture was concentrated under vacuum. The residue was purified by silica gel column chromatography, eluted with DCM/MeOH (0% to 10%), followed by Prep-HPLC (C18 Column 120 g; Mobile Phase A: water (0.1% FA), Mobile Phase B: $CH_3CN$; Flow rate: 50 mL/min; Gradient: 20% B to 40% B in 40 min; 254/220 nm) to afford (1R,11R)-18-(difluoromethoxy)-5-[6-(dimethylphosphoryl)-5-fluoropyridin-3-yl]-12-methyl-2,9,12-triazapentacyclo[9.8.1.0^{2,10}.0^{3,8}.0^{14,19}]icosa-3(8),4,6,9,14(19),15,17-heptaen-13-one (16 mg, 29%) as a white solid. MS ESI calculated for $C_{26}H_{22}F_3N_4O_3P$ $[M+H]^+$ 527.14, found 527.20. $^1H$ NMR (300 MHz, Chloroform-d) δ 8.81 (s, 1H), 8.54-8.44 (m, 1H), 7.88-7.78 (m, 1H), 7.77-7.71 (m, 1H), 7.70-7.60 (m, 1H), 7.51-7.37 (m, 2H), 7.36-7.26 (m, 1H), 6.90 (t, J=72.8 Hz, 1H), 6.37-6.26 (m, 1H), 5.07-4.95 (m, 1H), 3.53 (s, 3H), 3.54-3.45 (m, 1H), 2.97-2.85 (m, 1H), 1.96 (s, 3H), 1.90 (s, 3H). $^{19}F$ NMR (282 MHz, Chloroform-d) δ −80.81 (1F), −80.83 (1F), −117.00 (1F). $^{31}P$ NMR (122 MHz, Chloroform-d) δ 35.14 (1P).

Example 5: (1R,11R)-18-(difluoromethoxy)-12-methyl-5-[6-(1-oxo-1lambda5-phospholan-1-yl)pyridin-3-yl]-2,9,12-triazapentacyclo[9.8.1.0^{2,10}.0^{3,8}.0^{14,19}]icosa-3(8),4,6,9,14(19),15,17-heptaen-13-one

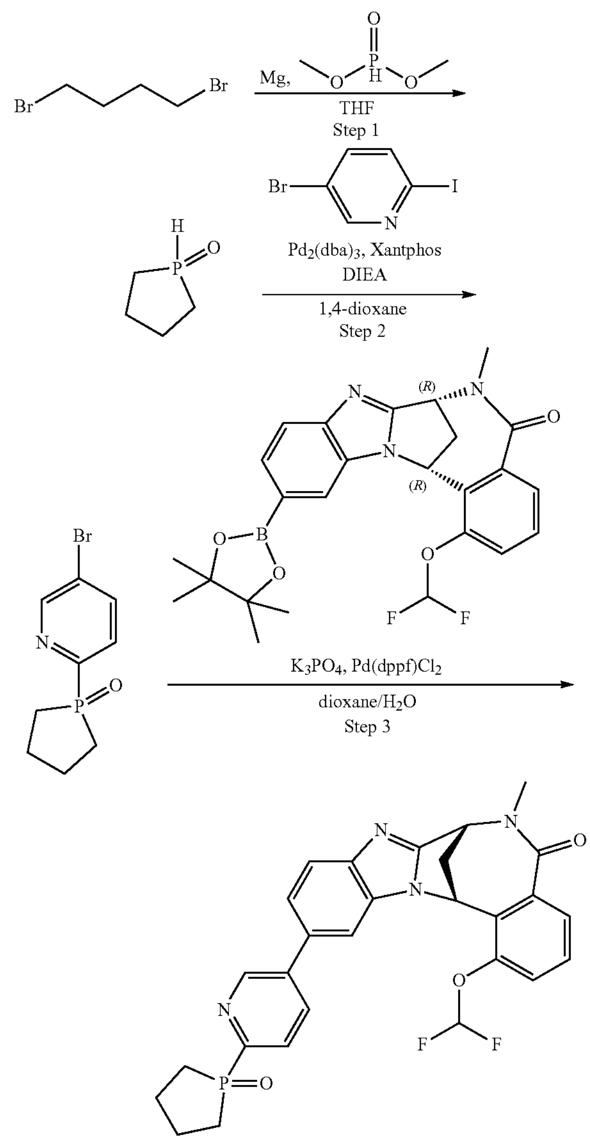

Preparation 5A: 1lambda5-phospholan-1-one

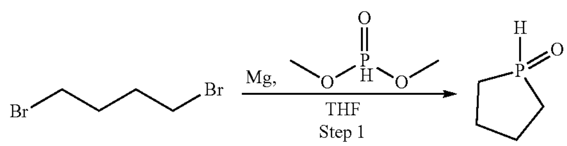

To a solution of 1,4-dibromobutane (19.62 g, 90.868 mmol) in THF (100 mL) was added activated magnesium powder (4.42 g, 181.736 mmol) in ports. The mixture was stirred at <30° C. for 2 h. To the above mixture was added dimethyl phosphite (5.00 g, 45.434 mmol) in 50 mL THF dropwise over 0.5 h at <30° C. The resulting mixture was stirred for additional 1 h at room temperature. The reaction was quenched by the addition of 20 g of $K_2CO_3$ in water (50 mL) at 20° C. The resulting mixture was filtered, and the filter cake was washed with EtOH (3×10 mL). The filtrate was concentrated under reduced pressure. This resulted in 1lambda5-phospholan-1-one (3.10 g, 51%) as a colorless oil. $^{31}$P NMR (162 MHz, Chloroform-d) δ 47.62 (1P).

Preparation 5B: 1-(5-bromopyridin-2-yl)-1lambda5-phospholan-1-one

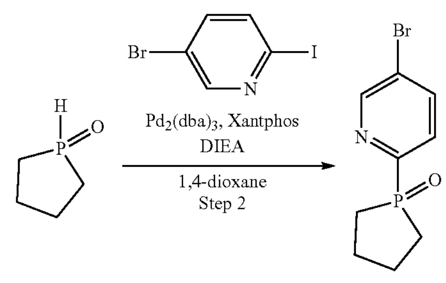 [SMILES: O=[PH]1CCCC1 ; Brc1ccc(I)nc1 ; O=P1(c2ccc(Br)cn2)CCCC1]

A solution of $Pd_2(dba)_3$ (320 mg, 0.352 mmol), DIPEA (0.55 g, 4.226 mmol) and XantPhos (410 mg, 0.704 mmol) in 1,4-dioxane (6 mL) was stirred for 15 min at room temperature under nitrogen atmosphere. To the above mixture were added 5-bromo-2-iodopyridine (1.00 g, 3.522 mmol) and 1lambda5-phospholan-1-one (1.47 g, 14.088 mmol) at room temperature under nitrogen atmosphere. The resulting mixture was stirred for additional overnight at 80° C. The resulting mixture was concentrated under reduced pressure. The residue was purified by silica gel column chromatography, eluted with $CH_2Cl_2$/MeOH (20:1) to afford 1-(5-bromopyridin-2-yl)-1lambda5-phospholan-1-one (218 mg, 23%) as a yellow solid. MS ESI calculated for $C_9H_{11}BrNOP$ [M+H]$^+$, 259.98 261.98, found 259.90 261.90. $^1$H NMR (400 MHz, Chloroform-d) δ 8.78 (s, 1H), 8.09-8.02 (m, 1H), 8.02-7.95 (m, 1H), 2.25-1.87 (m, 8H).

Example 5: (1R,11R)-18-(difluoromethoxy)-12-methyl-5-[6-(1-oxo-1lambda5-phospholan-1-yl)pyridin-3-yl]-2,9,12-triazapentacyclo[9.8.1.0^{2,10}.0^{3,8}.0^{14,19}]icosa-3(8),4,6,9,14(19),15,17-heptaen-13-one

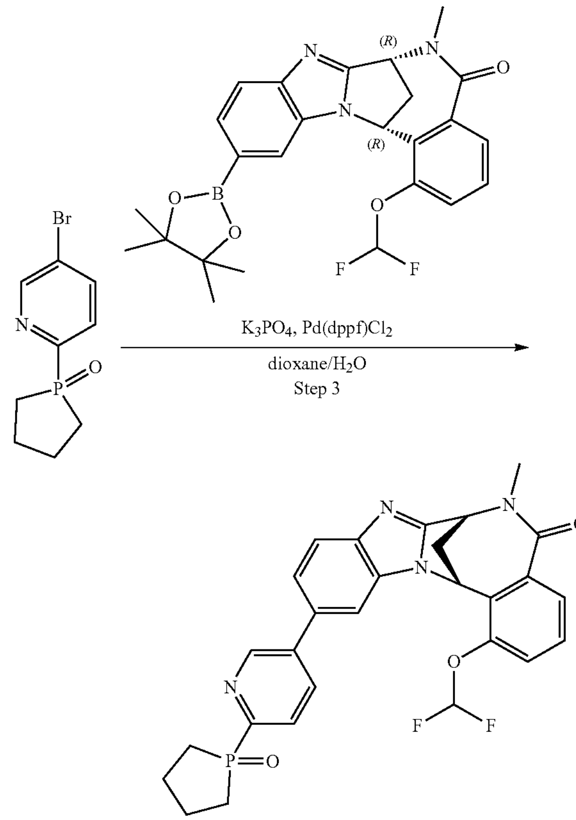

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.104 mmol) and 1-(5-bromopyridin-2-yl)-1lambda5-phospholan-1-one (27 mg, 0.104 mmol) in 1,4-dioxane (2 mL) was added a solution of $K_3PO_4$ (66 mg, 0.312 mmol) in $H_2O$ (0.5 mL) at room temperature. To the above solution was added Pd(dppf)$Cl_2$·$CH_2Cl_2$ (8 mg, 0.010 mmol) at room temperature under nitrogen atmosphere. The resulting mixture was stirred for additional 2 h at 100° C. The mixture was allowed to cool down to room temperature. The resulting mixture was concentrated under vacuum. The residue was purified by silica gel column chromatography, eluted with DCM/MeOH (0% to 10%) followed by Prep-HPLC (C18 Column 120 g; Mobile Phase A: water (0.1% FA), Mobile Phase B: $CH_3CN$; Flow rate: 50 mL/min; Gradient: 20% B to 40% B in 40 min; 254/220 nm) to afford (1R,11R)-18-(difluoromethoxy)-12-methyl-5-[6-(1-oxo-1lambda5-phospholan-1-yl)pyridin-3-yl]-2,9,12-triazapentacyclo[9.8.1.0^{2,10}.0^{3,8}.0^{14,19}]icosa-3(8),4,6,9,14(19),15,17-heptaen-13-one (25 mg, 45%) as a white solid. MS ESI calculated for $C_{28}H_{25}F_2N_4O_3P$ [M+H]$^+$ 535.16, found 535.15. $^1$H NMR (300 MHz, Chloroform-d) δ 8.95 (s, 1H), 8.50 (d, J=8.1 Hz, 1H), 8.25-8.20 (m, 1H), 8.03-7.98 (m, 1H), 7.86-7.71 (m, 2H), 7.52-7.27 (m, 3H), 7.11-6.62 (m, 1H), 6.32-6.29 (m, 1H), 5.02-4.99 (m, 1H), 3.56-3.46 (m, 4H), 2.94-2.88 (m, 1H), 2.24-1.95 (m, 8H). $^{19}$F NMR (282 MHz, Chloroform-d) δ −80.73 (2F). $^{31}$P NMR (122 MHz, Chloroform-d) δ 62.17 (1P).

Example 6: (1R,11R)-18-(difluoromethoxy)-12-methyl-5-[6-(4-oxo-1,4lambda5-oxaphosphinan-4-yl)pyridin-3-yl]-2,9,12-triazapentacyclo[9.8.1.0^{2,10}.0^{3,8}.0^{14,19}]icosa-3(8),4,6,9,14(19),15,17-heptaen-13-one

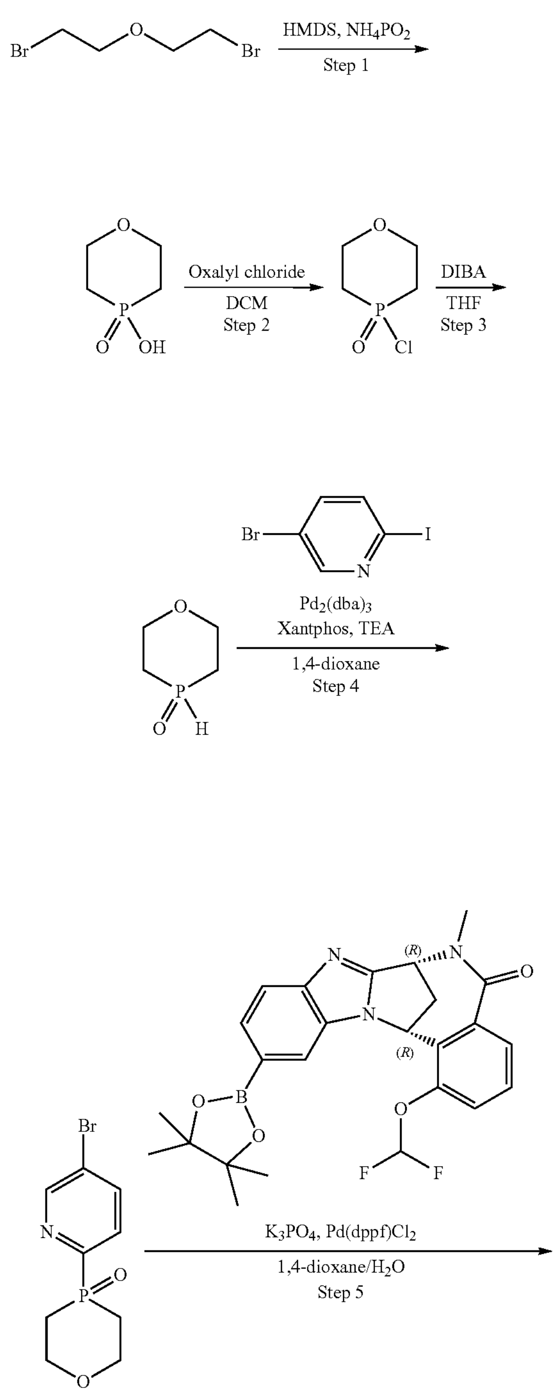

-continued

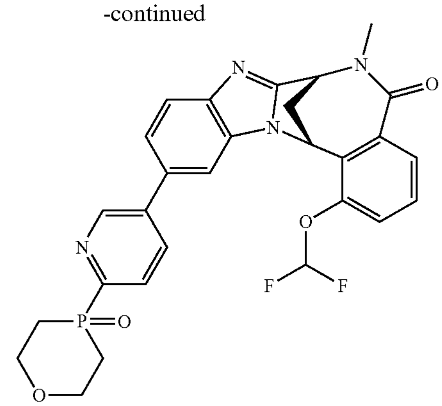

Preparation 6A. 4-hydroxy-1,4lambda5-oxaphosphinan-4-one

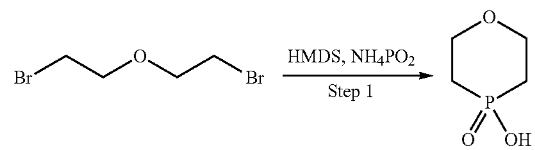 [SMILES: BrCCOCCBr ; O=P1(O)CCOCC1]

A mixture of ammonium hypophosphite (3.49 g, 43.119 mmol) and hexamethyldisilazane (13.92 g, 86.238 mmol) was stirred for 4 h at 120° C. under nitrogen atmosphere. To the above mixture was added 1-bromo-2-(2-bromoethoxy)ethane (10.00 g, 43.119 mmol) dropwise over 10 min at 120° C. The resulting mixture was stirred for additional 4 h at 120° C. The mixture was allowed to cool down to room temperature and added EtOH (20 mL). The resulting mixture was stirred for additional 1 h at 100° C. The resulting mixture was allowed to cool down to room temperature. The mixture was filtered, the filter cake was washed with dichloromethane (2×10 mL). The filtrate was concentrated under reduced pressure to afford the crude 4-hydroxy-1,4lambda5-oxaphosphinan-4-one (7.40 g, 25%) as a yellow liquid. The crude product was used in the next step directly without further purification.

Preparation 6B: 4-chloro-1,4lambda5-oxaphosphinan-4-one

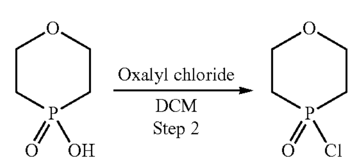 [SMILES: O=P1(O)CCOCC1 ; O=P1(Cl)CCOCC1]

To a stirred solution of 4-hydroxy-1,4lambda5-oxaphosphinan-4-one (5.80 g, 42.620 mmol) in DCM (60 mL) was added oxalyl chloride (9.20 g, 72.454 mmol) dropwise at 0° C. under nitrogen atmosphere. The resulting mixture was stirred for overnight at room temperature. The resulting mixture was concentrated under reduced pressure. The residue was dissolved in toluene (50 mL). The mixture was concentrated under vacuum to afford the crude 4-chloro-1,4lambda5-oxaphosphinan-4-one (6.00 g, 91%) as a yellow liquid. The crude product was used in the next step directly without further purification.

Preparation 6C: 1,4lambda5-oxaphosphinan-4-one

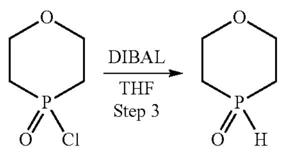 [SMILES: O=P1(Cl)CCOCC1 ; O=[PH]1CCOCC1]

To a stirred solution of 4-chloro-1,4lambda5-oxaphosphinan-4-one (5.60 g, 36.239 mmol) in DCM (60 mL) was added 1N DIBAL-H (36.24 mL, 36.239 mmol) dropwise at −78° C. under nitrogen atmosphere. The resulting mixture was stirred for 2 h at −78° C. The reaction was quenched by the addition of $CH_3OH$ (6 mL) at −78° C., then this reaction was stirred for 5 min at −78° C. The mixture was allowed to warm up to 0° C. and was added 10% acetic acid in water (50 mL). The resulting mixture was extracted with DCM (5×100 mL). The combined organic layers were dried over anhydrous $Na_2SO_4$. After filtration, the filtrate was concentrated under reduced pressure to afford the crude 1,4lambda5-oxaphosphinan-4-one (2.50 g, 57%) as a yellow oil. MS ESI calculated for $C_4H_9O_2P$ $[M+H]^+$ 121.03, found 121.25.

Preparation 6D: 4-(5-bromopyridin-2-yl)-1,4lambda5-oxaphosphinan-4-one

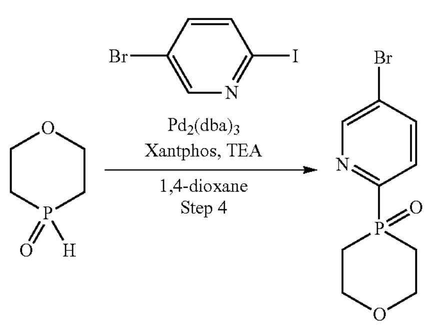 [SMILES: O=[PH]1CCOCC1 ; Brc1ccc(I)nc1 ; O=P1(c2ccc(Br)cn2)CCOCC1]

A solution of $Pd_2(dba)_3$ (258 mg, 0.282 mmol) and XantPhos (326 mg, 0.564 mmol) in 1,4-dioxane (10 mL) was stirred for 10 min at room temperature under nitrogen atmosphere. To the above mixture were added a solution of 5-bromo-2-iodopyridine (800 mg, 2.818 mmol) and TEA (0.60 mL, 4.227 mmol) in 1,4-dioxane (10 mL) at room temperature. The resulting mixture was stirred for additional overnight at 80° C. under nitrogen atmosphere. The resulting mixture was concentrated under reduced pressure. The residue was purified by silica gel column chromatography, eluted with $CH_2Cl_2$/MeOH (20:1) to afford 4-(5-bromopyridin-2-yl)-1,4lambda5-oxaphosphinan-4-one (260 mg, 33%) as a white solid. MS ESI calculated for $C_9H_{11}BrNO_2P$ $[M+H]^+$ 275.97 277.97, found 275.95 277.95. $^1H$ NMR (300 MHz, Chloroform-d) δ 8.82 (s, 1H), 8.04-7.99 (m, 2H), 4.25-4.15 (m, 4H), 2.51-2.36 (m, 2H), 2.13-1.99 (m, 2H).

Example 6: (1R,11R)-18-(difluoromethoxy)-12-methyl-5-[6-(4-oxo-1,4lambda5-oxaphosphinan-4-yl)pyridin-3-yl]-2,9,12-triazapentacyclo[9.8.1.0^{2,10}.0^{3,8}.0^{14,19}]icosa-3(8),4,6,9,14(19),15,17-heptaen-13-one

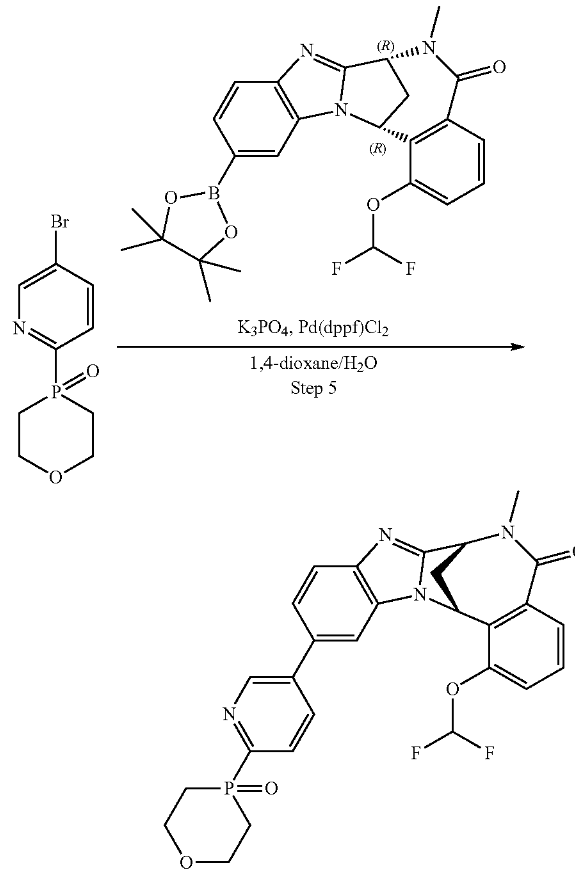

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.104 mmol) and 4-(5-bromopyridin-2-yl)-1,4lambda5-oxaphosphinan-4-one (29 mg, 0.104 mmol) in 1,4-dioxane (2 mL) was added a solution of $K_3PO_4$ (66 mg, 0.312 mmol) in $H_2O$ (0.5 mL) at room temperature under nitrogen atmosphere. To the above solution was added $Pd(dppf)Cl_2 \cdot CH_2Cl_2$ (8 mg, 0.010 mmol) at room temperature under nitrogen atmosphere. The resulting mixture was stirred for additional 2 h at 100° C. The mixture was allowed to cool down to room temperature. The resulting mixture was concentrated under vacuum. The residue was purified by silica gel column chromatography, eluted with DCM/MeOH (0% to 10%) followed by Prep-HPLC (Column: C18 Column 120 g; Mobile Phase A: water (0.1% FA), Mobile Phase B: $CH_3CN$; Flow rate: 50 mL/min; Gradient: 20% B to 40% B in 40 min; 254/220 nm) to afford (1R,11R)-18-(difluoromethoxy)-12-methyl-5-[6-(4-oxo-1,4lambda5-oxaphosphinan-4-yl)pyridin-3-yl]-2,9,12-triazapentacyclo[9.8.1.0^{2,10}.0^{3,8}.0^{14,19}]icosa-3(8),4,6,9,14(19),15,17-heptaen-13-one (25 mg, 44%) as a white solid. MS ESI calculated for $C_{28}H_{25}F_2N_4O_4P$ $[M+H]^+$ 551.16, found 551.05. $^1H$ NMR (300 MHz, Chloroform-d) δ 8.99 (s, 1H), 8.58-8.41 (m, 1H), 8.20-8.15 (m, 1H), 8.06-8.01 (m, 1H), 7.86-7.66 (m, 2H), 7.60-7.40 (m, 2H), 7.37-7.21 (m, 1H), 6.86 (t, J=73.1 Hz, 1H), 6.32-6.29 (m, 1H), 5.02-4.96 (m, 1H), 4.28-4.18 (m, 4H), 3.54-3.44 (m, 4H), 2.94-2.85 (m, 1H), 2.61-2.51 (m, 2H), 2.13-2.02 (m, 2H). $^{19}$F NMR (282 MHz, Chloroform-d) δ −80.71 (2F). $^{31}$P NMR (122 MHz, Chloroform-d) δ 25.96 (1P).

Example 7: (1R,11R)-18-(difluoromethoxy)-5-{6-[(dimethylphosphoryl)methoxy]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one

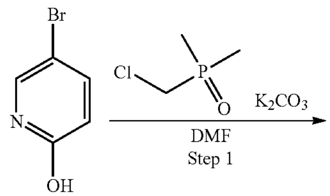

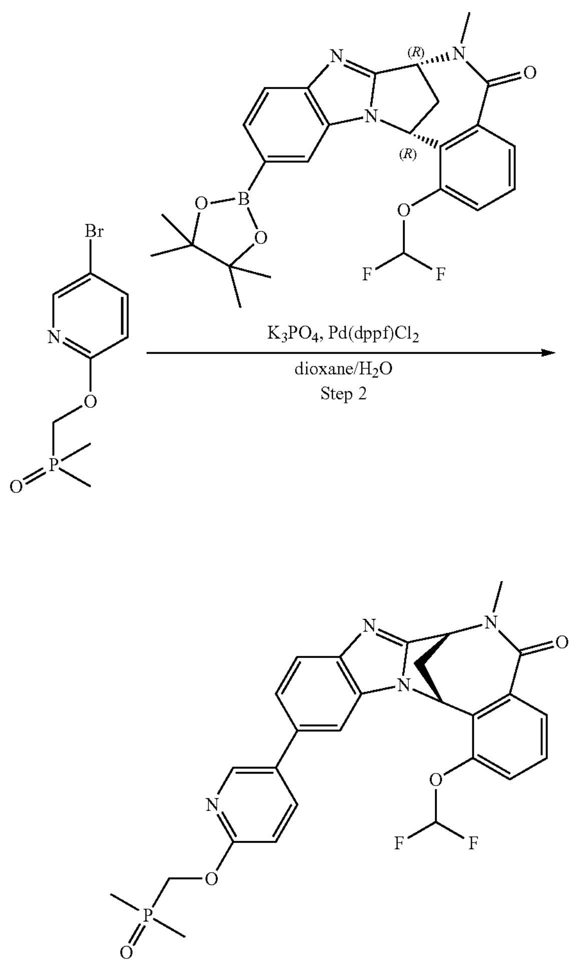

Preparation 7A: 5-bromo-2-[(dimethylphosphoryl)methoxy]pyridine

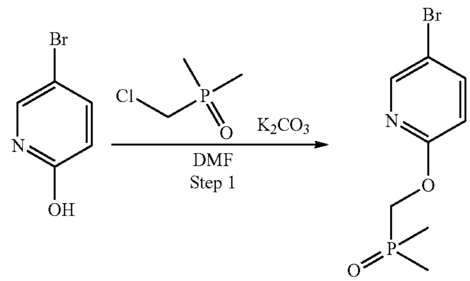

To a solution of 5-bromopyridin-2-ol (2.30 g, 13.219 mmol) and chloro(dimethylphosphoryl)methane (1.05 g, 8.276 mmol) in DMF (12 mL) was added $K_2CO_3$ (5.48 g, 39.657 mmol) at room temperature. The mixture was stirred for overnight at 100° C. The resulting mixture was allowed to cool down to room temperature and purified by reversed-phase flash chromatography to afford 5-bromo-2-[(dimethylphosphoryl)methoxy]pyridine (538 mg, 29%) as a yellow solid. MS ESI calculated for $C_8H_{11}BrNO_2P$ $[M+H]^+$ 263.97 265.97, found 264.00 266.00. $^1$H NMR (300 MHz, Chloroform-d) δ 8.20 (d, J=2.5 Hz, 1H), 7.73-7.68 (m, 1H), 6.75 (d, J=8.7 Hz, 1H), 4.65 (d, J=5.9 Hz, 2H), 1.63 (s, 3H), 1.59 (s, 3H).

Example 7: (1R,11R)-18-(difluoromethoxy)-5-{6-[(dimethylphosphoryl)methoxy]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one

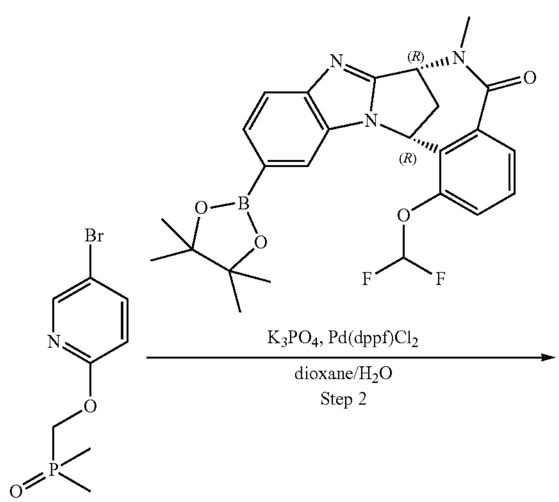

-continued

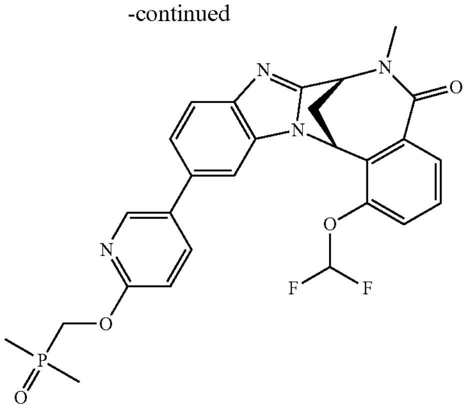

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.104 mmol) and 5-bromo-2-[(dimethylphosphoryl)methoxy]pyridine (27 mg, 0.104 mmol) in 1,4-dioxane (2 mL) was added a solution of $K_3PO_4$ (66 mg, 0.312 mmol) in $H_2O$ (0.5 mL) at room temperature under nitrogen atmosphere. To the above solution was added $Pd(dppf)Cl_2 \cdot CH_2Cl_2$ (8 mg, 0.010 mmol) at room temperature under nitrogen atmosphere. The resulting mixture was stirred for 2 h at 100° C. The mixture was allowed to cool down to room temperature. The resulting mixture was concentrated under vacuum. The residue was purified by silica gel column chromatography, eluted with DCM/MeOH (0% to 10%) followed by Prep-HPLC (C18 Column 120 g; Mobile Phase A: water (0.1% FA), Mobile Phase B: $CH_3CN$; Flow rate: 50 mL/min; Gradient: 20% B to 40% B in 40 min; 254/220 nm) to afford (1R,11R)-18-(difluoromethoxy)-5-{6-[(dimethylphosphoryl)methoxy]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one (20 mg, 36%) as a white solid. MS ESI calculated for $C_{27}H_{25}F_2N_4O_4P$ $[M+H]^+$ 539.16, found 539.20. $^1H$ NMR (300 MHz, Chloroform-d) δ 8.54-8.45 (m, 1H), 8.40-8.33 (m, 1H), 7.93-7.71 (m, 2H), 7.67-7.60 (m, 1H), 7.49-7.35 (m, 2H), 7.36-7.23 (m, 1H), 6.94-6.88 (m, 1H), 6.85 (t, J=72.9 Hz, 1H), 6.34-6.19 (m, 1H), 4.97-4.94 (m, 1H), 4.78-4.71 (m, 2H), 3.61-3.33 (m, 4H), 2.93-2.84 (m, 1H), 1.66 (s, 3H), 1.61 (s, 3H). $^{19}F$ NMR (282 MHz, Chloroform-d) δ −80.68 (1F), −80.71 (1F). $^{31}P$ NMR (122 MHz, Chloroform-d) δ 41.71 (1P).

Example 8: (1R,11R)-18-(difluoromethoxy)-5-[2-(dimethylphosphoryl)pyrimidin-5-yl]-12-methyl-2,9,12-triazapentacyclo[9.8.1.0^{2,10}.0^{3,8}.0^{14,19}]icosa-3(8),4,6,9,14(19),15,17-heptaen-13-one

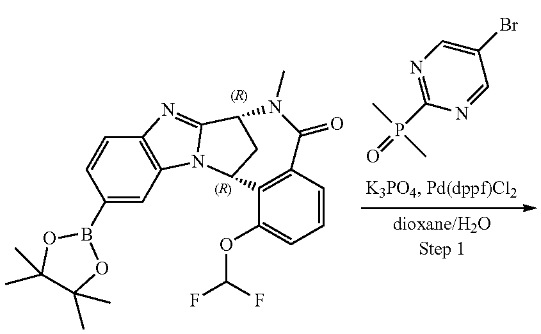

-continued

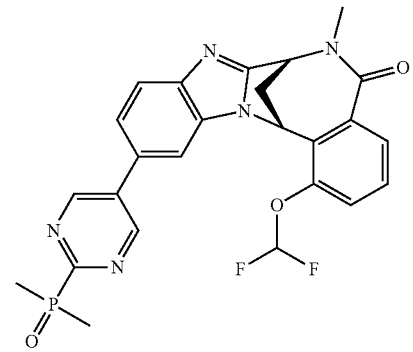

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.104 mmol) and 5-bromo-2-(dimethylphosphoryl)pyrimidine (24 mg, 0.104 mmol) in 1,4-dioxane (2 mL) was added a solution of $K_3PO_4$ (66 mg, 0.312 mmol) in $H_2O$ (0.5 mL) at room temperature under nitrogen atmosphere. To the above solution was added $Pd(dppf)Cl_2 \cdot CH_2Cl_2$ (8 mg, 0.010 mmol) at room temperature under nitrogen atmosphere. The resulting mixture was stirred for 2 h at 100° C. The mixture was allowed to cool down to room temperature. The resulting mixture was concentrated under vacuum. The residue was purified by silica gel column chromatography, eluted with DCM/MeOH (0% to 10%) followed by Prep-HPLC (C18 Column 120 g; Mobile Phase A: water (0.1% FA), Mobile Phase B: $CH_3CN$; Flow rate: 50 mL/min; Gradient: 20 B to 40 B in 40 min; 254/220 nm) to afford (1R,11R)-18-(difluoromethoxy)-5-[2-(dimethylphosphoryl)pyrimidin-5-yl]-12-methyl-2,9,12-triazapentacyclo[9.8.1.0^{2,10}.0^{3,8}.0^{14,19}]icosa-3(8),4,6,9,14(19),15,17-heptaen-13-one (20 mg, 38%) as a white solid. MS ESI calculated for $C_{25}H_{22}F_2N_5O_3P$ $[M+H]^+$ 510.14, found 510.15. $^1H$ NMR (300 MHz, Chloroform-d) δ 9.14-9.04 (m, 2H), 8.55-8.44 (m, 1H), 7.92-7.82 (m, 1H), 7.78-7.71 (m, 1H), 7.53-7.36 (m, 2H), 7.35-7.25 (m, 1H), 6.87 (t, J=72.7 Hz, 1H), 6.38-6.27 (m, 1H), 5.06-4.96 (m, 1H), 3.63-3.42 (m, 4H), 2.98-2.86 (m, 1H), 1.98-1.85 (m, 6H). $^{19}F$ NMR (282 MHz, Chloroform-d) δ −80.68 (1F), −80.76 (1F). $^{31}P$ NMR (162 MHz, Chloroform-d) δ 34.60 (1P).

Example 9: (1R,11R)-18-(difluoromethoxy)-5-(2-[(dimethylphosphoryl)methoxy]pyrimidin-5-yl)-12-methyl-2,9,12-triazapentacyclo[9.8.1.0^{2,10}.0^{3,8}.0^{14,19}]icosa-3(8),4,6,9,14(19),15,17-heptaen-13-one

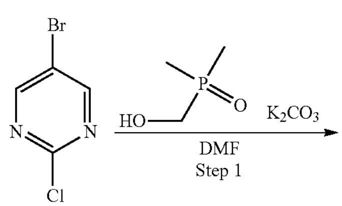

-continued

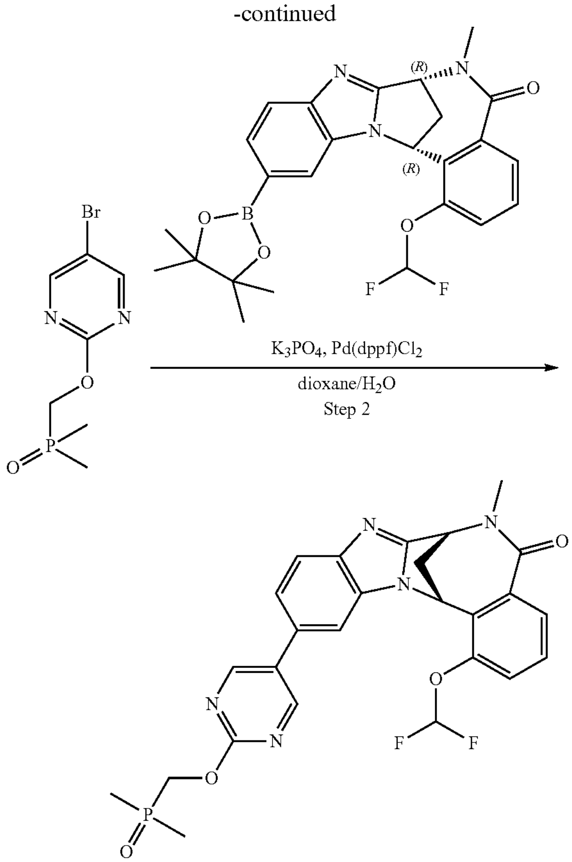

Preparation 9A: 5-bromo-2-[(dimethylphosphoryl) methoxy]pyrimidine

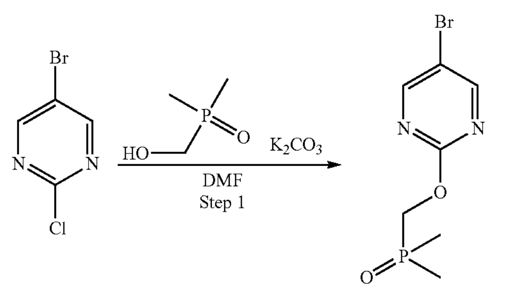

To a stirred solution of 5-bromo-2-chloropyrimidine (3.50 g, 18.094 mmol) and (dimethylphosphoryl)methanol (2.35 g, 21.713 mmol) in DMF (40 mL) was added $K_2CO_3$ (7.50 g, 54.282 mmol) at room temperature. The resulting mixture was stirred for 16 h at 80° C. The resulting mixture was diluted with water (250 mL) and extracted with $CH_2Cl_2$ (3×100 mL). The combined organic layers were washed with brine (5×50 mL), dried over anhydrous $Na_2SO_4$. After filtration, the filtrate was concentrated under reduced pressure. The residue was purified by silica gel column chromatography, eluted with $CH_2Cl_2$/MeOH (10:1) to afford 5-bromo-2-[(dimethylphosphoryl)methoxy]pyrimidine (3.90 g, 81%) as a white solid. MS ESI calculated for $C_7H_{10}BrN_2O_2P$ $[M+H]^+$ 264.97 266.97, found 264.85

266.85. $^1$H NMR (300 MHz, MeOD) δ 8.70 (s, 2H), 4.78 (d, J=5.5 Hz, 2H), 1.69 (s, 3H), 1.65 (s, 3H).

Example 9: (1R,11R)-18-(difluoromethoxy)-5-{2-[(dimethylphosphoryl)methoxy]pyrimidin-5-yl}-12-methyl-2,9,12-triazapentacyclo[9.8.1.0^{2,10}.0^{3,8}.0^{14,19}]icosa-3(8),4,6,9,14(19),15,17-heptaen-13-one

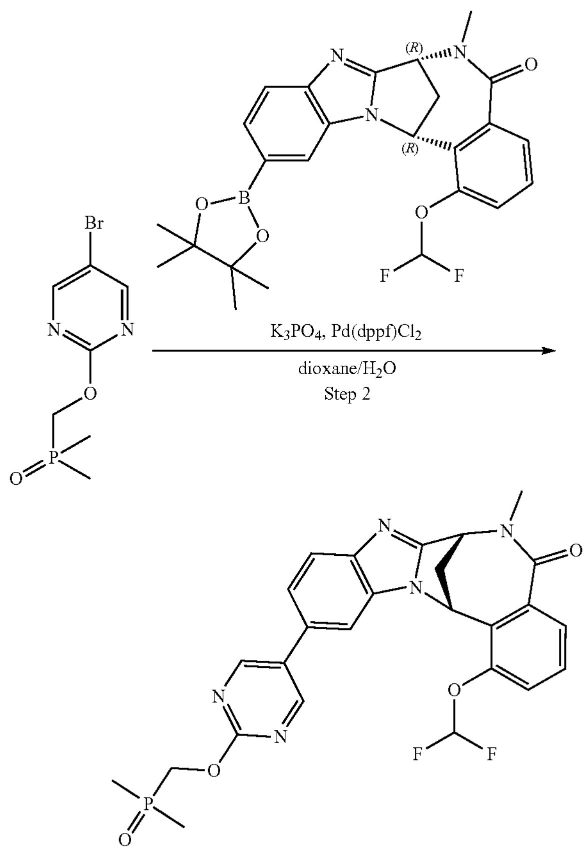

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.104 mmol) and 4-(5-bromopyridin-2-yl)-1,4lambda5-oxaphosphinan-4-one (29 mg, 0.104 mmol) in 1,4-dioxane (2 mL) was added solution of $K_3PO_4$ (66 mg, 0.312 mmol) in $H_2O$ (0.5 mL) at room temperature under nitrogen atmosphere. To the above solution was added $Pd(dppf)Cl_2 \cdot CH_2Cl_2$ (8 mg, 0.010 mmol) at room temperature under nitrogen atmosphere. The resulting mixture was stirred for additional 2 h at 100° C. The mixture was allowed to cool down to room temperature. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (0.1% FA), Mobile Phase B: $CH_3CN$; Flow rate: 50 mL/min; Gradient: 20% B to 40% B in 40 min; 254/220 nm to afford (1R,11R)-18-(difluoromethoxy)-5-{2-[(dimethylphosphoryl)methoxy]pyrimidin-5-yl}-12-methyl-2,9,12-triazapentacyclo[9.8.1.0^{2,10}.0^{3,8}.0^{14,19}]icosa-3(8),4,6,9,14(19),15,17-heptaen-13-one (25 mg, 45%) as a white solid.

MS ESI calculated for $C_{26}H_{24}F_2N_5O_4P$ $[M+H]^+$ 540.15, found 540.20. $^1H$ NMR (400 MHz, Chloroform-d) δ 8.75 (s, 2H), 8.53-847 (m, 1H), 7.85 (d, J=8.5, 1H), 7.68-7.65 (m, 1H), 7.48-7.40 (m, 2H), 7.35-7.31 (m, 1H), 6.88 (t, J=72.8 Hz, 1H), 6.32 (d, J=7.2 Hz, 1H), 5.10 (d, J=7.1 Hz, 1H), 4.81 (d, J=6.9 Hz, 2H), 3.52-3.48 (m, 4H), 2.92 (d, J=13.6 Hz, 1H), 1.74 (s, 3H), 1.70 (s, 3H). $^{19}F$ NMR (377 MHz, Chloroform-d) δ −80.73 (1F), −80.90 (1F). $^{31}P$ NMR (162 MHz, Chloroform-d) δ 43.56 (1P).

Example 10: (1R,11R)-18-(difluoromethoxy)-5-{6-[(dimethylphosphoryl)methoxy]-5-fluoropyridin-3-yl}-12-methyl-2,9,12-triazapentacyclo [9.8.1.0^{2,10}.0^{3,8}.0^{14,19}]icosa-3(8),4,6,9,14(19),15,17-heptaen-13-one

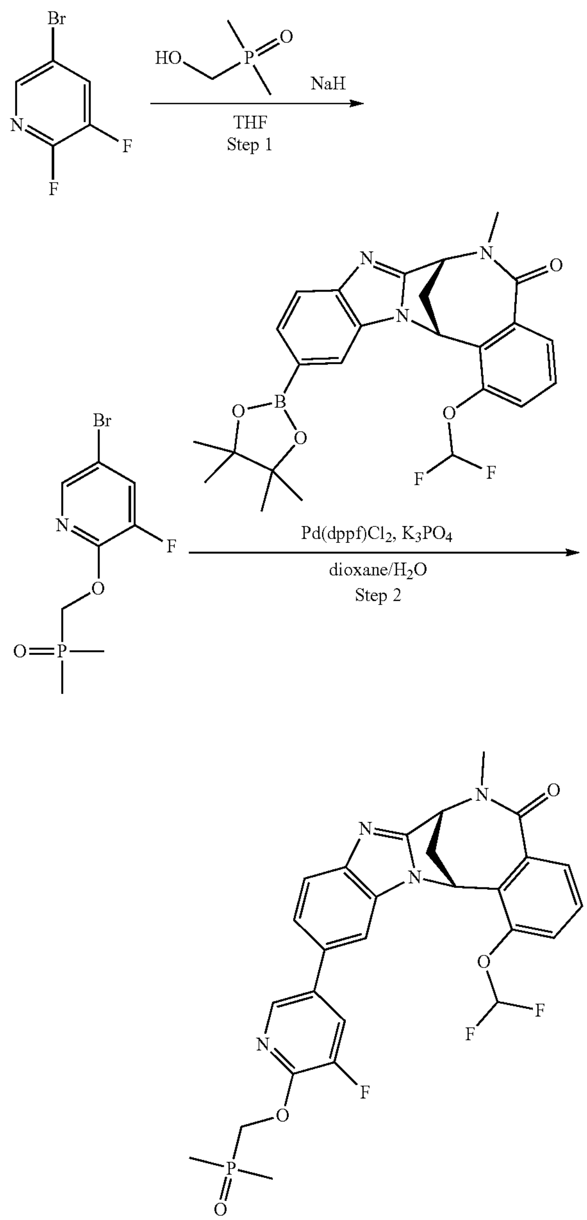

Preparation 10A: 5-bromo-2-[(dimethyl phosphoryl) methoxy]-3-fluoropyridine

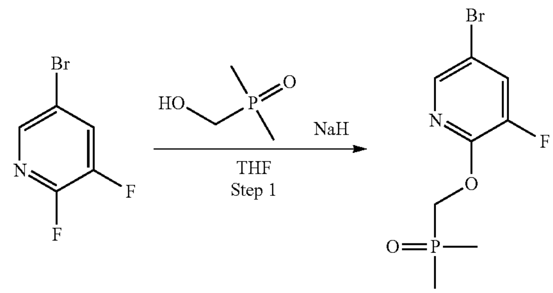

A mixture of (dimethyl phosphoryl) methanol (56 mg, 0.516 mmol) and NaH (21 mg, 0.516 mmol, 60%) in THF (2 mL) was stirred for 30 min at 0° C. To the above mixture was added 5-bromo-2,3-difluoropyridine (100 mg, 0.516 mmol) at room temperature. The resulting mixture was stirred for additional 3 h at room temperature. The reaction was quenched with water and purified by reversed-phase flash chromatography (C18 silica gel; mobile phase, $CH_3CN$ in water (10 mmol/L $NH_4HCO_3$), 10% to 50% gradient in 30 min; detector, 254 nm) to give in 5-bromo-2-[(dimethyl phosphoryl) methoxy]-3-fluoropyridine (120 mg, 82%) as a white solid. MS ESI calculated for $C_8H_{10}BrFNO_2P$ $[M+H]^+$, 281.96, found 281.9. $^1H$ NMR (400 MHz, Chloroform-d) δ 8.02 (d, J=2.1 Hz, 1H), 7.57-7.52 (m, 1H), 4.70 (d, J=6.2 Hz, 2H), 1.66 (s, 3H), 1.63 (s, 3H).

Example 10: (1R,11R)-18-(difluoromethoxy)-5-{6-[(dimethylphosphoryl)methoxy]-5-fluoropyridin-3-yl}-12-methyl-2,9,12-triazapentacyclo [9.8.1.0^{2,10}.0^{3,8}.0^{14,19}]icosa-3(8),4,6,9,14(19),15,17-heptaen-13-one

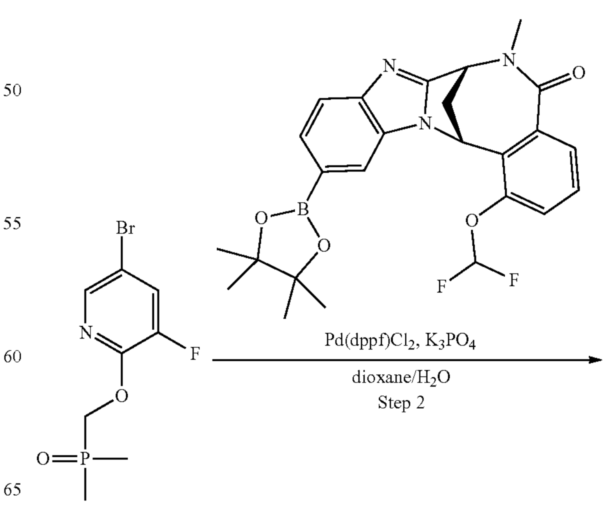

-continued

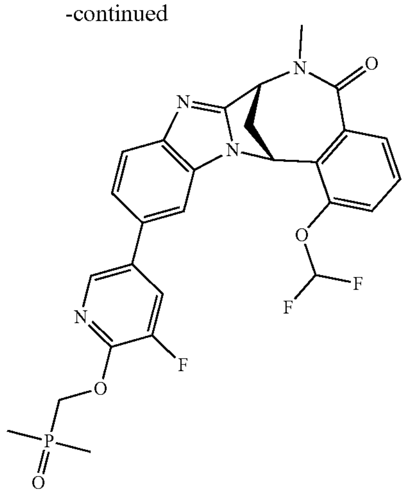

To a solution of 5-bromo-2-[(dimethyl phosphoryl) methoxy]-3-fluoropyridine (32 mg, 0.114 mmol) and (1R, 11R)-18-(difluoromethoxy)-12-methyl-5-(4,4,5,5-tetramethyl-1,3,2-dioxaborolan-2-yl)-2,9,12-triazapentacyclo [9.8.1.0^{2,10}.0^{3,8}.0^{14,19}]icosa-3(8),4,6,9,14(19), 15,17-heptaen-13-one (50 mg, 0.104 mmol) in dioxane (0.5 mL) and $H_2O$ (0.1 mL) were added $K_3PO_4$ (66 mg, 0.312 mmol) and Pd(dppf)$Cl_2$·$CH_2Cl_2$ (8 mg, 0.010 mmol). After stirring for 2 h at 100° C. under a nitrogen atmosphere. The mixture was allowed to cool down to room temperature. The resulting mixture was concentrated under vacuum. The residue was purified by silica gel column chromatography (DCM/MeOH, 0% to 10%), followed by Prep-HPLC (C18 silica gel; mobile phase, $CH_3CN$ in water (10 mmol/L $NH_4HCO_3$), 10% to 40% gradient in 30 min; detector, 254 nm) to give (1R,11R)-18-(difluoromethoxy)-5-{6-[(dimethylphosphoryl)methoxy]-5-fluoropyridin-3-yl}-12-methyl-2, 9,12-triazapentacyclo [9.8.1.0^{2,10}.0^{3,8}.0^{14,19}] icosa-3(8),4,6,9,14(19),15,17-heptaen-13-one (19 mg, 32%) as a white solid. MS ESI calculated for $C_{27}H_{24}F_3N_4O_4P$ $[M+H]^+$, 557.15, found 557.00. $^{1}$H NMR (400 MHz, Chloroform-d) δ 8.50 (d, J=8.2 Hz, 1H), 8.15 (d, J=2.1 Hz, 1H), 7.79 (d, J=8.5 Hz, 1H), 7.66-7.56 (m, 2H), 7.43 (t, J=8.2 Hz, 1H), 7.41-7.36 (m, 1H), 7.35-7.29 (m, 1H), 6.86 (t, J=72.9 Hz, 1H), 6.29 (d, J=7.1 Hz, 1H), 4.99 (d, J=7.1 Hz, 1H), 4.79 (d, J=6.4 Hz, 2H), 3.53 (s, 3H), 3.52-3.42 (m, 1H), 2.90 (d, J=13.5 Hz, 1H), 1.69 (s, 3H), 1.66 (s, 3H). $^{19}$F NMR (377 MHz, Chloroform-d) δ −80.76 (2F), −139.34 (1F). $^{31}$P NMR (162 MHz, Chloroform-d) δ 42.01 (1P).

Example 11: (1R,11R)-18-(difluoromethoxy)-5-{6-[(dimethylphosphoryl)methoxy]pyridin-3-yl}-2,9,12-triazapentacyclo[9.8.1.0^{2,10}.0^{3,8}.0^{14,19}]icosa-3(8),4,6,9,14(19),15,17-heptaen-13-one

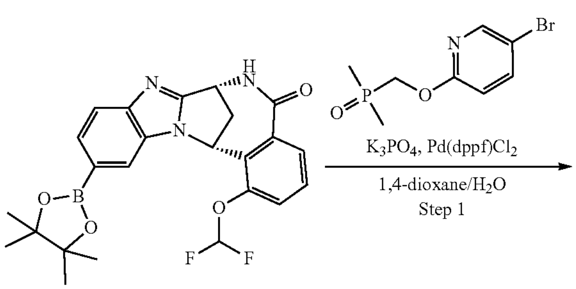

-continued

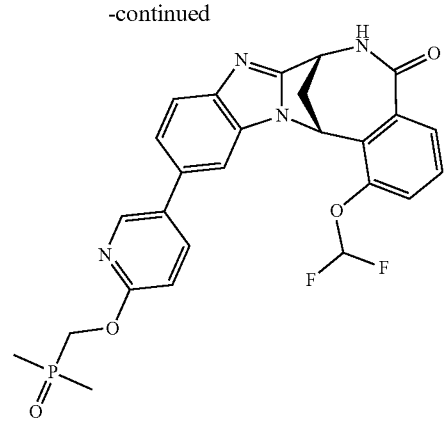

To a stirred solution of (1R,11R)-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3 (8),4,6,9,14(19),15,17-heptaen-13-one (60 mg, 0.128 mmol) and 5-bromo-2-(dimethylphosphoryl)pyridine (25 mg, 0.107 mmol) in 1,4-dioxane (2 mL) was added a solution of $K_3PO_4$ (82 mg, 0.384 mmol) in $H_2O$ (0.5 mL) at room temperature. To the above solution was added Pd(dppf) $Cl_2$·$CH_2Cl_2$ (10 mg, 0.013 mmol) at room temperature under nitrogen atmosphere. The resulting mixture was stirred for 2 h at 100° C. The mixture was allowed to cool down to room temperature. The resulting mixture was concentrated under vacuum. The residue was purified by silica gel column chromatography (DCM/MeOH, 0% to 10%), followed by Prep-HPLC (C18 Column 120 g; Mobile Phase A: water (0.1% FA), Mobile Phase B: $CH_3CN$; Flow rate: 50 mL/min; Gradient: 20 B to 40 B in 40 min; 254/220 nm) to afford (1R,11R)-18-(difluoromethoxy)-5-(6-[(dimethylphosphoryl)methoxy]pyridin-3-yl)-2,9,12-triazapentacyclo [9.8.1.0^{2,10}.0^{3,8}.0^{14,19}]icosa-3(8),4,6,9,14(19), 15,17-heptaen-13-one (35 mg, 52%) as a white solid. MS ESI calculated for $C_{26}H_{23}F_2N_4O_4P$ $[M+H]^+$ 525.14, found 525.20. $^{1}$H NMR (400 MHz, Chloroform-d) δ 8.47-8.40 (m, 1H), 8.39-8.29 (m, 1H), 7.87-7.65 (m, 3H), 7.64-7.53 (m, 1H), 7.50-7.29 (m, 3H), 7.08-6.65 (m, 2H), 6.37 (d, J=7.2 Hz, 1H), 4.99 (t, J=6.6 Hz, 1H), 4.75 (d, J=6.0 Hz, 2H), 3.55-3.40 (m, 1H), 2.88 (d, J=13.3 Hz, 1H), 1.66 (s, 3H), 1.63 (s, 3H). $^{19}$F NMR (377 MHz, Chloroform-d) δ −80.79 (2F). $^{31}$P NMR (162 MHz, Chloroform-d) δ 41.85 (1P).

Example 12: (1R,11R)-18-(difluoromethoxy)-5-(2-[(dimethylphosphoryl)methoxy]pyrimidin-5-yl)-2,9,12-triazapentacyclo[9.8.1.0^{2,10}.0^{3,8}.0^{14,19}]icosa-3(8),4,6,9,14(19),15,17-heptaen-13-one

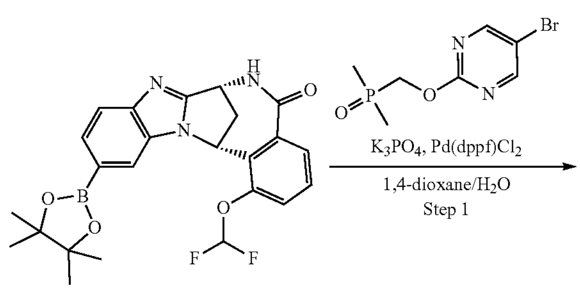

-continued

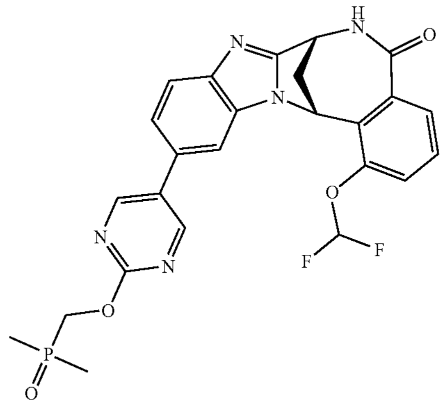

To a stirred solution of (1R,11R)-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (60 mg, 0.128 mmol) and 5-bromo-2-[(dimethylphosphoryl)methoxy]pyrimidine (34 mg, 0.128 mmol) in 1,4-dioxane (2 mL) was added a solution of $K_3PO_4$ (82 mg, 0.384 mmol) in $H_2O$ (0.5 mL) at room temperature. To the above solution was added $Pd(dppf)Cl_2 \cdot CH_2Cl_2$ (10 mg, 0.013 mmol) at room temperature under nitrogen atmosphere. The resulting mixture was stirred for 2 h at 100° C. The mixture was allowed to cool down to room temperature. The resulting mixture was concentrated under vacuum. The residue was purified by silica gel column chromatography (DCM/MeOH, 0% to 10%) followed by Prep-HPLC (C18 Column 120 g; Mobile Phase A: water (0.1% FA), Mobile Phase B: $CH_3CN$; Flow rate: 50 mL/min; Gradient: 20 B to 40 B in 40 min; 254/220 nm to afford (1R,11R)-18-(difluoromethoxy)-5-{2-[(dimethylphosphoryl)methoxy]pyrimidin-5-yl}-2,9,12-triazapentacyclo[9.8.1.0^{2,10}.0^{3,8}.0^{14,19}]icosa-3(8),4,6,9,14(19),15,17-heptaen-13-one (35 mg, 52%) as a white solid. MS ESI calculated for $C_{25}H_{22}F_2N_5O_4P$ $[M+H]^+$ 526.14, found 526.05. $^1H$ NMR (400 MHz, DMSO-$d_6$) δ 9.15 (d, J=6.9 Hz, 1H), 8.90 (s, 2H), 8.28-8.17 (m, 1H), 7.88-7.65 (m, 3H), 7.58-7.53 (m, 1H), 7.52-7.45 (m, 2H), 6.36 (d, J=7.1 Hz, 1H), 4.89 (t, J=6.8 Hz, 1H), 4.70 (d, J=5.2 Hz, 2H), 3.53-3.44 (m, 1H), 2.75 (d, J=13.3 Hz, 1H), 1.56 (s, 3H), 1.52 (s, 3H). $^{19}F$ NMR (377 MHz, DMSO-$d_6$) δ −81.89 (1F), −82.58 (1F). $^{31}P$ NMR (162 MHz, DMSO-$d_6$) δ 37.61 (1P).

Example 13: (1R,11R)-18-(difluoromethoxy)-5-[4-(dimethylphosphoryl)phenyl]-12-methyl-2,9,12-triazapentacyclo[9.8.1.0^{2,10}.0^{3,8}.0^{14,19}]icosa-3(8),4,6,9,14(19),15,17-heptaen-13-one

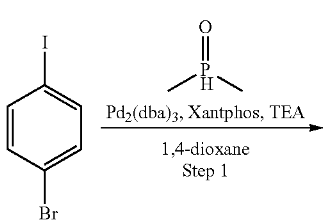

-continued

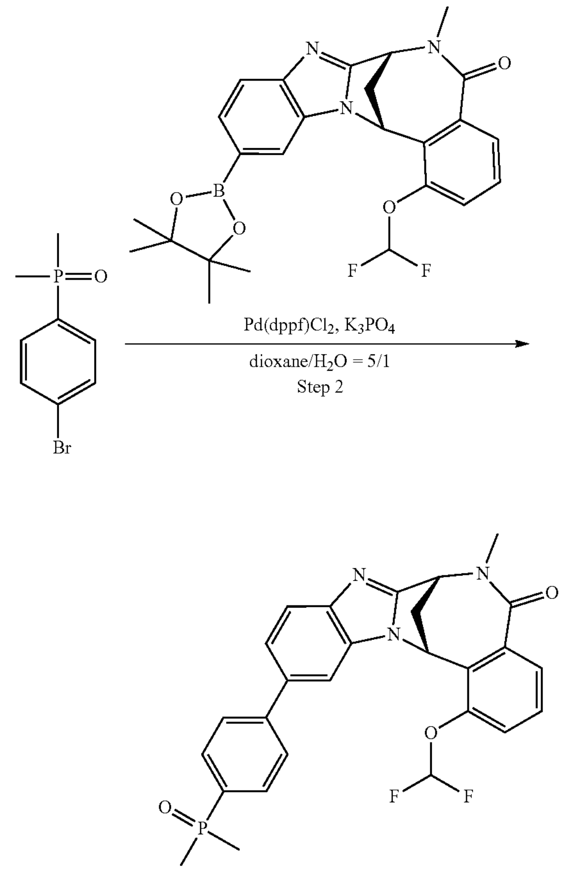

Preparation 13A: 1-bromo-4-(dimethylphosphoryl)benzene

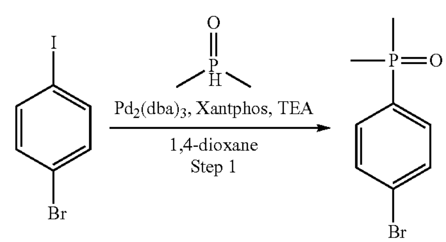

To a stirred solution of 4-bromoiodobenzene (20.00 g, 70.695 mmol) and (methylphosphonoyl)methane (5.52 g, 70.695 mmol) in 1,4-dioxane (200 mL) were added Xantphos (4.09 g, 7.069 mmol), TEA (8.58 g, 84.834 mmol) and $Pd_2(dba)_3$ (3.24 g, 3.535 mmol) at room temperature under nitrogen atmosphere. The resulting mixture was stirred for 4 h at 100° C. under nitrogen atmosphere. The resulting mixture was concentrated under vacuum. The residue was purified by silica gel column chromatography ($CH_2Cl_2$/MeOH, 10:1) to afford 1-bromo-4-(dimethylphosphoryl)benzene (14.10 g, 85%) as a yellow solid. MS ESI calculated for $C_8H_{10}BrOP$ $[M+H]^+$, 232.97 234.97, found 233.00 235.00. $^1H$ NMR (300 MHz, Chloroform-d) δ 7.69-7.48 (m, 4H), 1.74 (s, 3H), 1.70 (s, 3H).

Example 13: (1R,11R)-18-(difluoromethoxy)-5-[4-(dimethylphosphoryl)phenyl]-12-methyl-2,9,12-triazapentacyclo[9.8.1.0^{2,10}.0^{3,8}.0^{14,19}]icosa-3(8),4,6,9,14(19),15,17-heptaen-13-one

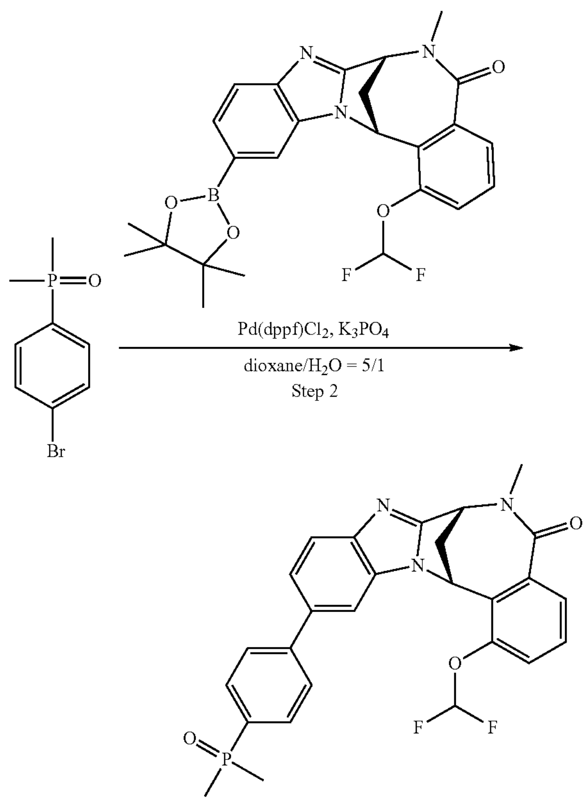

A mixture of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (60 mg, 0.125 mmol), 1-bromo-4-(dimethylphosphoryl)benzene (34 mg, 0.150 mmol), $K_3PO_4$ (79 mg, 0.375 mmol) and Pd(dppf)$Cl_2$·$CH_2Cl_2$ (10 mg, 0.013 mmol) in dioxane (1 mL) and $H_2O$ (0.2 mL) was stirred for 2 h at 100° C. under nitrogen atmosphere. The mixture was allowed to cool down to room temperature. and concentrated under vacuum. The residue was purified by silica gel column chromatography (DCM/MeOH, 0% to 10%) followed by Prep-HPLC (C18 Column 120 g; Mobile Phase A: water (10 mmol/L $NH_4HCO_3$), Mobile Phase B: $CH_3CN$; Flow rate: 60 mL/min; Gradient: 30% B to 60% B in 20 min; 254/220 nm) to afford (1R,11R)-18-(difluoromethoxy)-5-[4-(dimethylphosphoryl)phenyl]-12-methyl-2,9,12-triazapentacyclo[9.8.1.0^{2,10}.0^{3,8}.0^{14,19}]icosa-3(8),4,6,9,14(19),15,17-heptaen-13-one (23 mg, 36%) as a white solid. MS ESI calculated for $C_{27}H_{24}F_2N_3O_3P$ $[M+H]^+$, 508.15, found 508.25. $^1H$ NMR (300 MHz, Chloroform-d) δ 8.56-8.48 (m, 1H), 7.91-7.70 (m, 6H), 7.59-7.53 (m, 1H), 7.46 (t, J=8.2 Hz, 1H), 7.37-7.30 (m, 1H), 6.87 (t, J=72.8 Hz, 1H), 6.34 (d, J=6.9 Hz, 1H), 5.08 (d, J=6.7 Hz, 1H), 3.57 (s, 3H), 3.56-3.43 (m, 1H), 2.93 (d, J=13.5 Hz, 1H), 1.83 (s, 3H), 1.79 (s, 3H). $^{19}F$ NMR (282 MHz, Chloroform-d) δ −80.70 (2F). $^{31}P$ NMR (121 MHz, Chloroform-d) δ 34.00 (1P).

Example 14: (1R,11R)-18-(difluoromethoxy)-5-[4-(dimethylphosphoryl)-3-fluorophenyl]-12-methyl-2,9,12-triazapentacyclo[9.8.1.0^{2,10}.0^{3,8}.0^{14,19}]icosa-3(8),4,6,9,14(19),15,17-heptaen-13-one

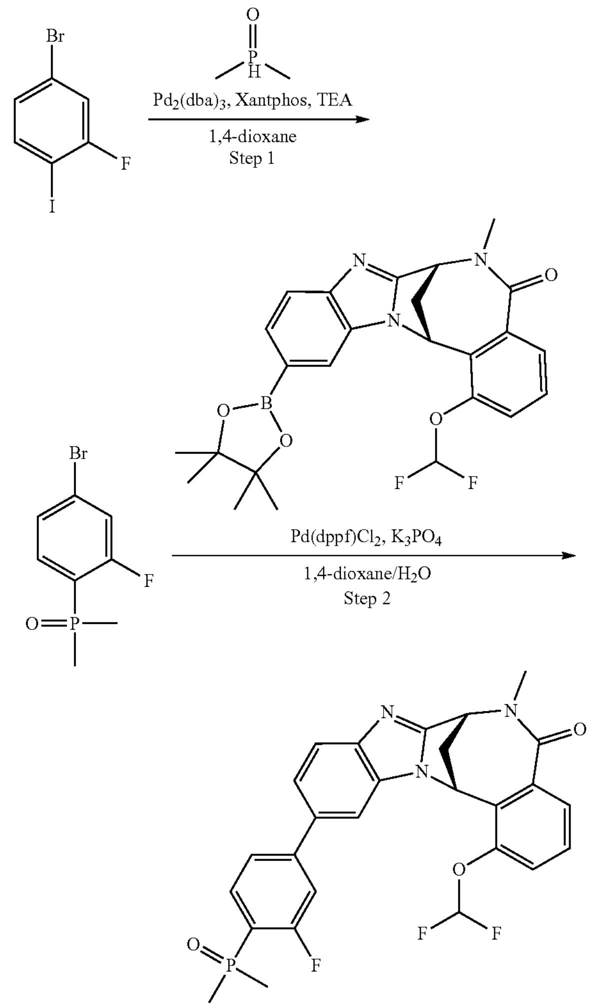

Preparation 14A: 4-bromo-1-(dimethylphosphoryl)-2-fluorobenzene

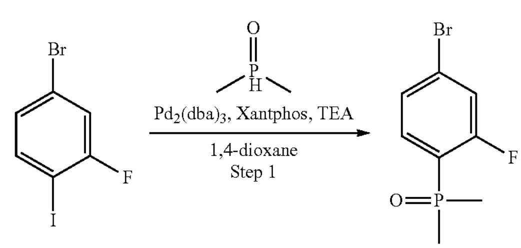

To a solution of 4-bromo-2-fluoro-1-iodobenzene (2.00 g, 6.647 mmol) and (methylphosphonoyl)methane (0.57 g, 7.312 mmol) in 1,4-dioxane (20 mL) were added TEA (0.81 g, 7.976 mmol), Xantphos (0.38 g, 0.665 mmol) and $Pd_2(dba)_3$ (0.30 g, 0.332 mmol) at room temperature under nitrogen atmosphere. The resulting mixture was stirred for 16 h at 70° C. under nitrogen atmosphere. The mixture was diluted with water (50 mL). The aqueous layer was extracted with $CH_2Cl_2$ (3×100 mL). The combined organic layers were washed with brine (3×50 mL), dried over anhydrous $Na_2SO_4$. After filtration, the filtrate was concentrated under reduced pressure. The residue was purified by silica gel column chromatography ($CH_2Cl_2$/MeOH, 20:1) to afford 4-bromo-1-(dimethylphosphoryl)-2-fluorobenzene (1.24 g, 74%) as a yellow solid. MS ESI calculated for $C_8H_9BrFOP$ $[M+H]^+$, 250.96 252.96, found 250.90 252.90. $^1H$ NMR (400 MHz, Chloroform-d) δ 7.90-7.81 (m, 1H), 7.52-7.47 (m, 1H), 7.35-7.30 (m, 1H), 1.81 (d, J=1.2 Hz, 3H), 1.78 (d, J=1.2 Hz, 3H).

Example 14: (1R,11R)-18-(difluoromethoxy)-5-[4-(dimethylphosphoryl)-3-fluorophenyl]-12-methyl-2,9,12-triazapentacyclo[9.8.1.0^{2,10}.0^{3,8}.0^{14,19}]icosa-3(8),4,6,9,14(19),15,17-heptaen-13-one

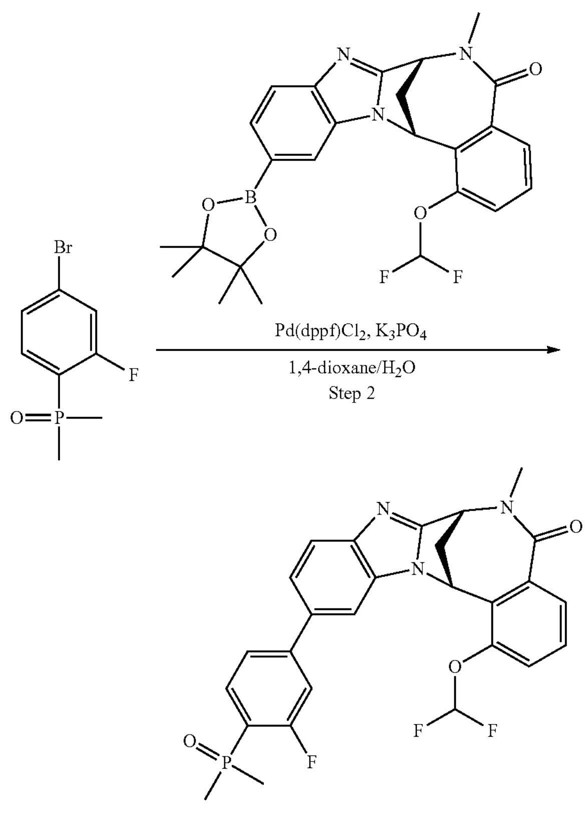

A mixture of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (60 mg, 0.125 mmol), 4-bromo-1-(dimethylphosphoryl)-2-fluorobenzene (37 mg, 0.150 mmol), $K_3PO_4$ (79 mg, 0.375 mmol) and $Pd(dppf)Cl_2·CH_2Cl_2$ (10 mg, 0.013 mmol) in 1,4-dioxane (1 mL) and $H_2O$ (0.2 mL) was stirred for 2 h at 100° C. under nitrogen atmosphere. The mixture was allowed to cool down to room temperature and concentrated under vacuum. The residue was purified by silica gel column chromatography (DCM/MeOH, 0% to 10%), followed by Prep-HPLC (C18 Column 120 g; Mobile Phase A: water (10 mmol/L $NH_4HCO_3$), Mobile Phase B: $CH_3CN$; Flow rate: 60 mL/min; Gradient: 30% B to 55% B in 20 min; 254/220 nm) to afford (1R,11R)-18-(difluoromethoxy)-5-[4-(dimethylphosphoryl)-3-fluorophenyl]-12-methyl-2,9,12-triazapentacyclo[9.8.1.0^{2,10}.0^{3,8}.0^{14,19}]icosa-3(8),4,6,9,14(19),15,17-heptaen-13-one (17 mg, 26%) as a white solid. MS ESI calculated for $C_{27}H_{23}F_3N_3O_3P$ $[M+H]^+$, 526.14, found 526.30. $^1H$ NMR (300 MHz, Chloroform-d) δ 8.52 (d, J=8.2 Hz, 1H), 8.14-7.98 (m, 1H), 7.89-7.76 (m, 2H), 7.62-7.52 (m, 2H), 7.47 (t, J=8.2 Hz, 1H), 7.41-7.31 (m, 2H), 6.89 (t, J=72.9 Hz, 1H), 6.40-6.30 (m, 1H), 5.20-5.03 (m, 1H), 3.58 (s, 3H), 3.56-3.41 (m, 1H), 1.89 (s, 4H), 1.84 (s, 3H). $^{19}F$ NMR (282 MHz, Chloroform-d) δ −80.79 (2F), −105.70 (1F). $^{31}P$ NMR (121 MHz, Chloroform-d) δ 30.54 (1P).

Example 15: (7R,14R)-1-(difluoromethoxy)-11-(6-((dimethylphosphoryl)methoxy)pyridin-3-yl)-6-(methyl-$d_3$)-6,7-dihydro-7,14-methanobenzo[f]benzo[4,5]imidazo[1,2-a][1,4]diazocin-5(14H)-one

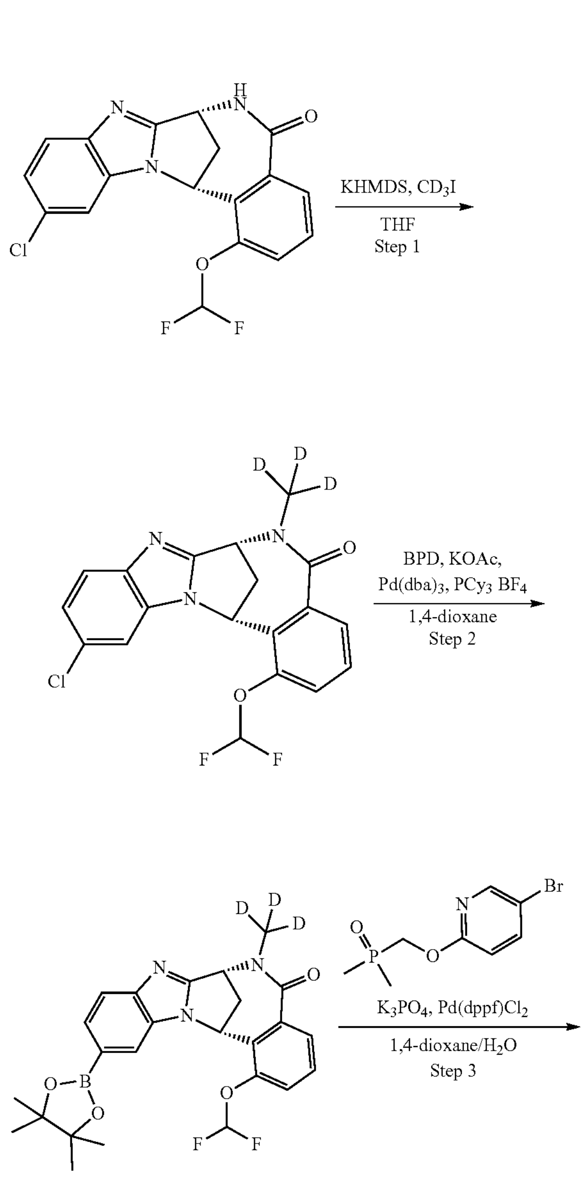

-continued

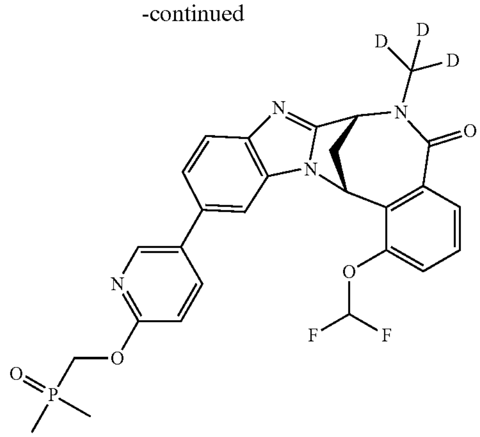

Preparation 15A: (7R,14R)-11-chloro-1-(difluoromethoxy)-6-(methyl-d)-6,7-dihydro-7,14-methanobenzo[f]benzo[4,5]imidazo[1,2-a][1,4]diazocin-5(14H)-one

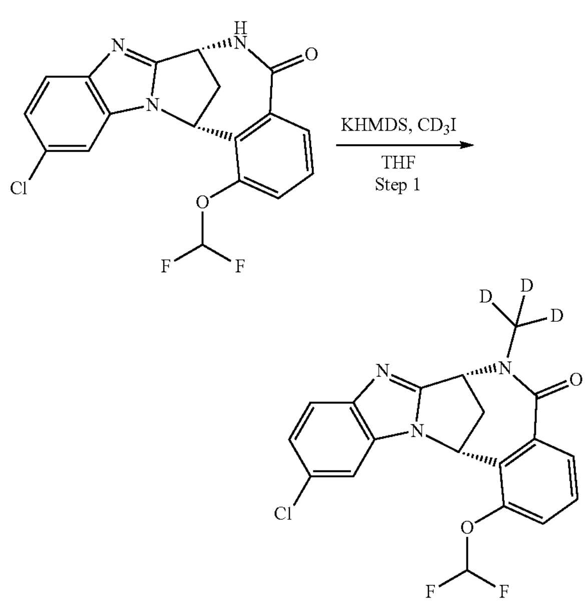

To a stirred solution of (1R,11R)-5-chloro-18-(difluoromethoxy)-2,9,12-triazapentacyclo[9.8.1.0^{2,10}.0^{3,8}.0^{14,19}]icosa-3(8),4,6,9,14(19),15,17-heptaen-13-one (300 mg, 0.798 mmol) in dry THF (6 mL) was added 1N KHMDS (0.96 mL, 0.958 mmol) in THF dropwise at −78° C. under nitrogen atmosphere. The resulting solution was stirred for 1 h at −78° C. under nitrogen atmosphere. To the above solution was added iodomethane-$d_3$ (231 mg, 1.596 mmol) dropwise over 2 min at −78° C. The resulting mixture was allowed to warm slowly to room temperature, and stirred for 3 h at room temperature under nitrogen atmosphere. The resulting solution was quenched by the addition of sat. $NH_4Cl$ (aq.) (10 mL), and extracted with EtOAc (2×15 mL). The combined organic layers were washed with brine (20 mL), dried over anhydrous $Na_2SO_4$. After filtration, the filtrate was concentrated under reduced pressure. After filtration, the filtrate was concentrated under reduced pressure. The residue was purified by silica gel column chromatography ($CH_2Cl_2$/MeOH, 10:1) to afford (7R,14R)-11-chloro-1-(difluoromethoxy)-6-(methyl-$d_3$)-6,7-dihydro-7,14-methanobenzo[f]benzo[4,5]imidazo[1,2-a][1,4]diazocin-5(14H)-one (290 mg, 92%) as a white solid. MS ESI calculated for $C_{19}H_{11}D_3ClF_2N_3O_2$ $[M+H]^+$ 393.09 395.09, found 393.05 395.05. $^1H$ NMR (400 MHz, Chloroform-d) δ 8.49 (dd, J=8.2, 1.3 Hz, 1H), 7.62 (d, J=8.7 Hz, 1H), 7.46-7.41 (m, 2H), 7.35-7.32 (m, 1H), 7.21 (dd, J=8.7, 2.0 Hz, 1H), 7.02-6.65 (m, 1H), 6.21-6.19 (m, 1H), 4.95-4.93 (m, 1H), 3.47-3.40 (m, 1H), 2.88-2.84 (m, 1H).

Preparation 15B: (7R,14R)-1-(difluoromethoxy)-6-(methyl-$d_3$)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one

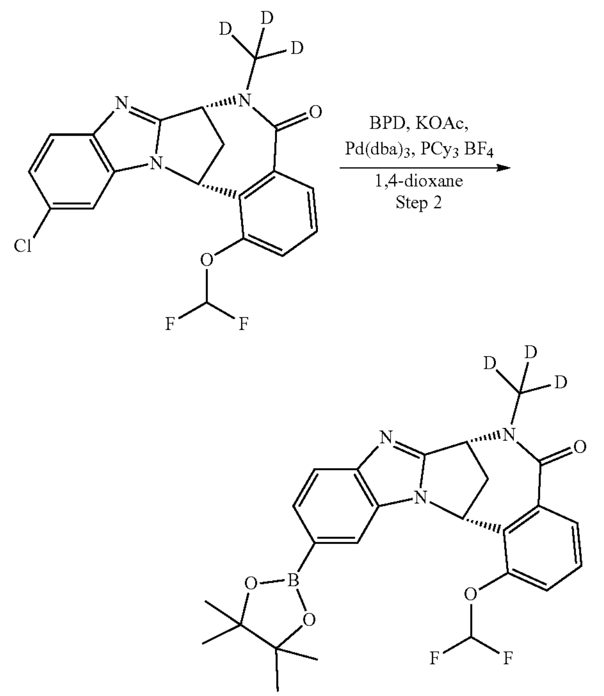

To a stirred mixture of (1R,11R)-5-chloro-18-(difluoromethoxy)-12-(2H3)methyl-2,9,12-triazapentacyclo[9.8.1.0^{2,10}.0^{3,8}.0^{14,19}]icosa-3(8),4,6,9,14(19),15,17-heptaen-13-one (300 mg, 0.764 mmol), KOAc (225 mg, 2.292 mmol) and BPD (291 mg, 1.146 mmol) in 1,4-dioxane (5 mL) were added $PCy_3 \cdot HBF_4$ (28 mg, 0.076 mmol) and $Pd_2(dba)_3$ (70 mg, 0.076 mmol) at room temperature under nitrogen atmosphere. The resulting mixture was stirred for 16 h at 140° C. under nitrogen atmosphere. The mixture was allowed to cool down to room temperature and concentrated under reduced pressure. The residue was purified by silica gel column chromatography, eluted with $CH_2Cl_2$/MeOH (10:1) to afford (7R,14R)-1-(difluoromethoxy)-6-(methyl-$d_3$)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (300 mg, 81%) as a yellow oil. MS ESI calculated for $C_{25}H_{23}D_3BF_2N_3O_4$ $[M+H]^+$ 485.22, found 485.20.

Example 15: (7R,14R)-1-(difluoromethoxy)-11-(6-((dimethylphosphoryl)methoxy)pyridin-3-yl)-6-(methyl-d$_3$)-6,7-dihydro-7,14-methanobenzo[f]benzo[4,5]imidazo[1,2-a][1,4]diazocin-5(14H)-one

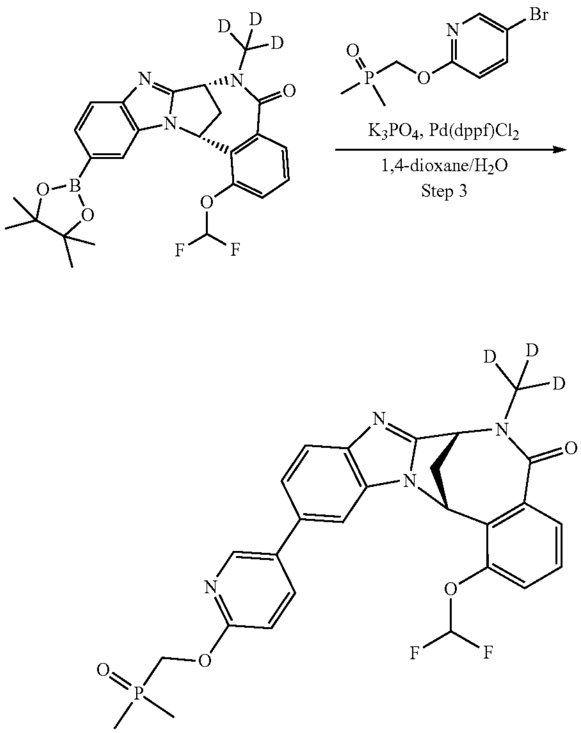 [SMILES: [2H]C([2H])([2H])N1C(=O)c2cccc(OC(F)F)c2[C@H]2C[C@@H]1c1nc3ccc(B4OC(C)(C)C(C)(C)O4)cc3n12 ; CP(C)(=O)COc1ccc(Br)cn1 ; [2H]C([2H])([2H])N1C(=O)c2cccc(OC(F)F)c2[C@H]2C[C@@H]1c1nc3ccc(-c4ccc(OCP(C)(C)=O)nc4)cc3n12]

To a stirred solution of (7R,14R)-1-(difluoromethoxy)-6-(methyl-d$_3$)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol) and 5-bromo-2-[(dimethylphosphoryl)methoxy]pyridine (27 mg, 0.103 mmol) in 1,4-dioxane (2 mL) was added a solution of $K_3PO_4$ (66 mg, 0.309 mmol) in $H_2O$ (0.5 mL) at room temperature under nitrogen atmosphere. To the above solution was added Pd(dppf)$Cl_2$·$CH_2Cl_2$ (8 mg, 0.010 mmol) at room temperature under nitrogen atmosphere. The resulting mixture was stirred for additional 2 h at 100° C. The mixture was allowed to cool down to room temperature and concentrated under vacuum. The residue was purified by silica gel column chromatography (DCM/MeOH, 0% to 10%) followed by Prep-HPLC (C18 Column 120 g; Mobile Phase A: water (0.1% FA), Mobile Phase B: $CH_3CN$; Flow rate: 50 mL/min; Gradient: 20 B to 40 B in 40 min; 254/220 nm) to afford (7R,14R)-1-(difluoromethoxy)-11-(6-((dimethylphosphoryl)methoxy)pyridin-3-yl)-6-(methyl-d$_3$)-6,7-dihydro-7,14-methanobenzo[f]benzo[4,5]imidazo[1,2-a][1,4]diazocin-5(14H)-one (20 mg, 36%) as a white solid. MS ESI calculated for $C_{27}H_{22}D_3F_2N_4O_4P$ $[M+H]^+$ 542.18, found 542.25. $^1$H NMR (400 MHz, DMSO-d$_6$) δ 8.41 (d, J=2.5 Hz, 1H), 8.29-8.24 (m, 1H), 8.02-7.98 (m, 1H), 7.82-7.63 (m, 3H), 7.52-7.45 (m, 3H), 7.04-7.02 (m, 1H), 6.30-6.28 (m, 1H), 5.23-5.21 (m, 1H), 4.63 (d, J=5.2 Hz, 2H), 3.48-3.40 (m, 1H), 2.83-2.80 (m, 1H), 1.54 (s, 3H), 1.51 (s, 3H). $^{19}$F NMR (377 MHz, DMSO-d$_6$) δ −82.00 (1F), −82.15 (1F). $^{31}$P NMR (162 MHz, DMSO-d$_6$) δ 39.72 (1P).

Example 16: (1R,11R)-18-(difluoromethoxy)-5-(6-{[(dimethylphosphoryl)methyl]amino}-5-fluoropyridin-3-yl)-12-methyl-2,9,12-triazapentacyclo[9.8.1.0^{2,10}.0^{3,8}.0^{14,19}]icosa-3(8),4,6,9,14(19),15,17-heptaen-13-one

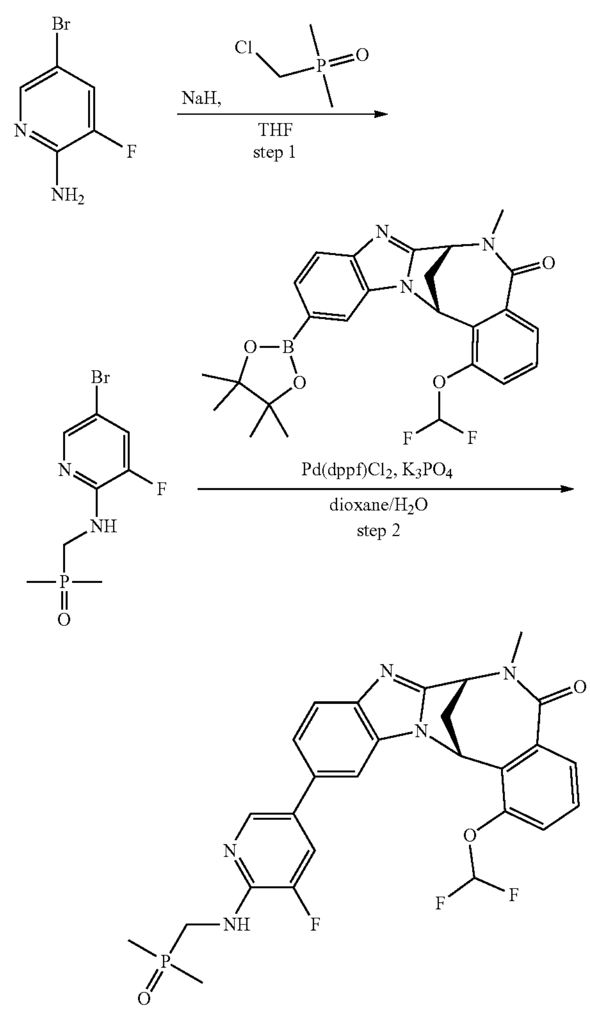

Preparation 16A: 5-bromo-N-[(dimethylphosphoryl)methyl]-3-fluoropyridin-2-amine

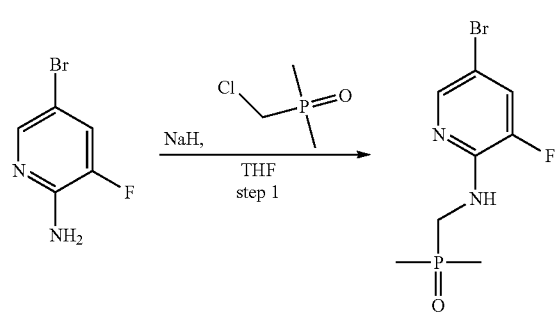

To a solution of 5-bromo-3-fluoropyridin-2-amine (500 mg, 2.618 mmol) in THF (10 mL) was added sodium hydride (120 mg, 3.011 mmol, 60% in oil) in ports at room temperature. The mixture was stirred for 30 min at room temperature. Then chloro(dimethylphosphoryl)methane (380 mg, 3.011 mmol) was added and the mixture was allowed to warm to 50° C. and stirred for 3 h. The reaction mixture was quenched by water and extracted with DCM (3×25 mL). The combined organic layers were concentrated under reduced pressure. The residue was purified by reversed-phase flash chromatography with the following conditions: column, C18 silica gel; mobile phase, $CH_3CN$ in water (10 mmol/L $NH_4HCO_3$), 10% to 50% gradient in 30 min; detector, 254 nm. This resulted in 5-bromo-N-[(dimethylphosphoryl)methyl]-3-fluoropyridin-2-amine (227 mg, 30%) as a white solid. MS ESI calculated for $C_8H_{11}BrFN_2OP$ $[M+H]^+$, 280.98, found 280.9. $^1H$ NMR (300 MHz, Chloroform-d) δ 7.93 (d, J=1.9 Hz, 1H), 7.37-7.31 (m, 1H), 5.56 (s, 1H), 4.04-3.88 (m, 2H), 1.69 (s, 3H), 1.65 (s, 3H).

Example 16: (1R,11R)-18-(difluoromethoxy)-5-(6-{[(dimethylphosphoryl)methyl]amino}-5-fluoropyridin-3-yl)-12-methyl-2,9,12-triazapentacyclo [9.8.1.0^{2,10}.0^{3,8}.0^{14,19}]icosa-3(8),4,6,9,14(19),15,17-heptaen-13-one

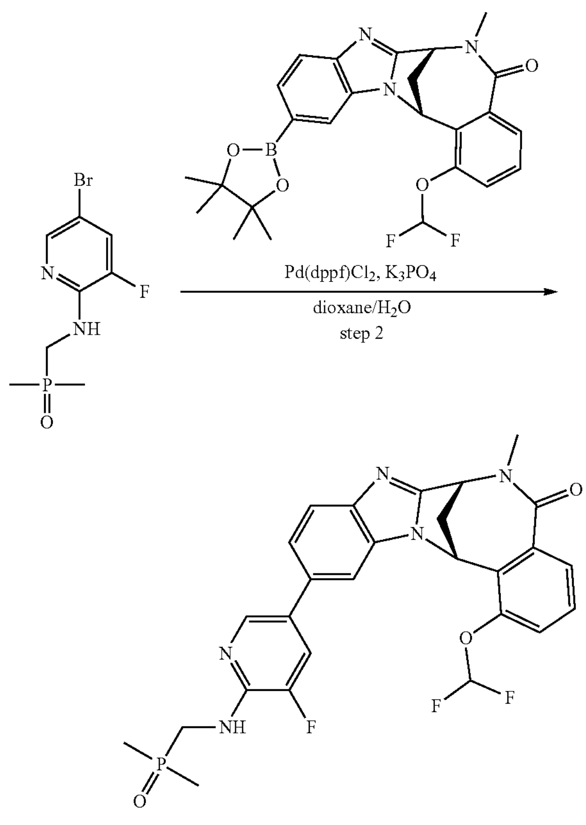

To a solution of 5-bromo-N-[(dimethylphosphoryl)methyl]-3-fluoropyridin-2-amine (32 mg, 0.114 mmol) and (1R,11R)-18-(difluoromethoxy)-12-methyl-5-(4,4,5,5-tetramethyl-1,3,2-dioxaborolan-2-yl)-2,9,12-triazapentacyclo [9.8.1.0^{2,10}.0^{3,8}.0^{14,19}]icosa-3(8),4,6,9,14(19),15,17-heptaen-13-one (50 mg, 0.104 mmol) in 1,4-dioxane (0.5 mL) and $H_2O$ (0.1 mL) were added $K_3PO_4$ (66 mg, 0.312 mmol) and $Pd(dppf)Cl_2 \cdot CH_2Cl_2$ (8 mg, 0.010 mmol). After stirring for 2 h at 80° C. under a nitrogen atmosphere, the resulting mixture was concentrated under reduced pressure. The resulting mixture was filtered, and the filter cake was washed with $CH_3OH$ (3×10 mL). The filtrate was concentrated under reduced pressure. The residue was purified by reversed-phase flash chromatography with the following conditions: column, C18 silica gel; mobile phase, $CH_3CN$ in water (10 mmol/L $NH_4HCO_3$), 10% to 50% gradient in 30 min; detector, 254 nm. This resulted in (1R,11R)-18-(difluoromethoxy)-5-(6-{[(dimethylphosphoryl)methyl]amino}-5-fluoropyridin-3-yl)-12-methyl-2,9,12-triazapentacyclo[9.8.1.0^{2,10}.0^{3,8}.0^{14,19}]icosa-3(8),4,6,9,14(19),15,17-heptaen-13-one (30 mg, 52%) as a white solid. MS ESI calculated for $C_{27}H_{25}F_3N_5O_3P$ $[M+H]^+$, 556.16, found 556.10. $^1H$ NMR (300 MHz, Chloroform-d) δ 8.53-8.45 (m, 1H), 8.16-8.09 (m, 1H), 7.79-7.71 (m, 1H), 7.61-7.56 (m, 1H), 7.49-7.29 (m, 4H), 6.85 (t, J=72.9 Hz, 1H), 6.27 (d, J=7.2 Hz, 1H), 5.36-5.26 (m, 1H), 4.97 (d, J=7.1 Hz, 1H), 4.03 (t, J=6.0 Hz, 2H), 3.52 (s, 3H), 3.51-3.41 (m, 1H), 2.88 (d, J=13.6 Hz, 1H), 1.61 (s, 3H), 1.57 (s, 3H). $^{19}F$ NMR (282 MHz, Chloroform-d) δ −80.68 (1F), −80.73 (1F), −140.77 (1F). $^{31}P$ NMR (122 MHz, Chloroform-d) δ 42.22 (1P).

Example 17: (7R,14R)-1-(difluoromethoxy)-11-(6-(dimethylphosphoryl)pyridin-3-yl)-6-(methyl-$d_3$)-6,7-dihydro-7,14-methanobenzo[f]benzo[4,5]imidazo[1,2-a][1,4]diazocin-5(14H)-one

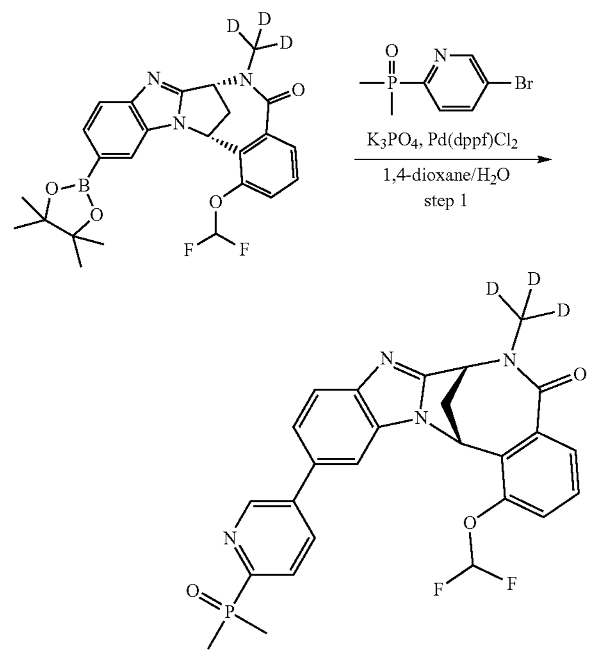

To a stirred solution of (7R,14R)-1-(difluoromethoxy)-6-(methyl-$d_3$)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol) and 5-bromo-2-(dimethylphosphoryl)pyridine (24 mg, 0.103 mmol) in 1,4-dioxane (2 mL) was added solution of $K_3PO_4$ (66 mg, 0.309 mmol) in $H_2O$ (0.5 mL) at room temperature under nitrogen atmosphere. To the above solution was added $Pd(dppf)Cl_2 \cdot CH_2Cl_2$ (8 mg, 0.010 mmol) at room temperature under nitrogen atmosphere. The resulting mixture was stirred for 2 h at 100° C. The mixture was allowed to cool down to room temperature. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (0.1% FA), Mobile Phase B: $CH_3CN$; Flow rate: 50 mL/min; Gradient: 20 B to 40 B in 40 min; 254/220 nm to afford (7R,14R)-1-(difluoromethoxy)-11-(6-(dimethylphosphoryl)pyridin-3-yl)-6-(methyl-$d_3$)-6,7-dihydro-7,14-methanobenzo[f]benzo[4,5]imidazo[1,2-a][1,4]diazocin-5(14H)-one (20 mg, 38%) as a white solid. MS ESI calculated for $C_{26}H_{20}D_3F_2N_4O_3P$ $[M+H]^+$ 512.17, found 512.20. $^1H$ NMR (400 MHz, DMSO-$d_6$) δ 9.03 (s, 1H), 8.30-8.24 (m, 1H), 8.21-8.16 (m, 1H), 8.05-8.01 (m, 1H), 7.86-7.67 (m, 3H), 7.62-7.60 (m, 1H), 7.51-7.49 (m, 2H), 6.33-6.30 (m, 1H), 5.27-5.24 (m, 1H), 3.58-3.50 (m, 1H), 2.87-2.82 (m, 1H), 1.73 (s, 3H), 1.69 (s, 3H). $^{19}F$ NMR (377 MHz, DMSO-$d_6$) δ −81.82 (1F), −82.28 (1F). $^{31}P$ NMR (162 MHz, DMSO-$d_6$) δ 34.01 (1P).

Example 18: (1R,11R)-18-(difluoromethoxy)-5-{4-[(dimethylphosphoryl)methoxy]-3-fluorophenyl}-12-methyl-2,9,12-triazapentacyclo[9.8.1.0^{2,10}.0^{3,8}.0^{14,19}]icosa-3(8),4,6,9,14(19),15,17-heptaen-13-one

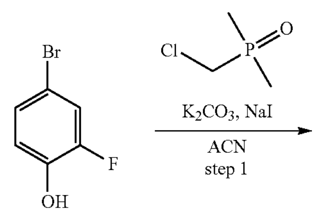

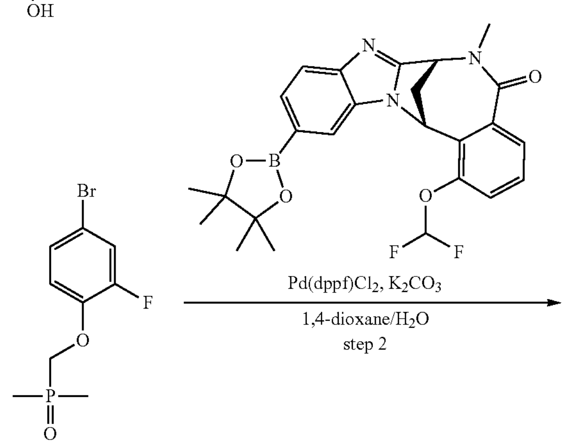

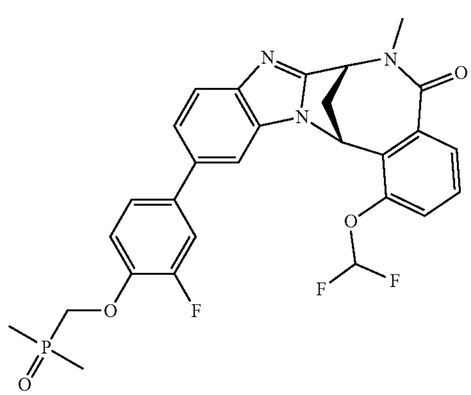

Preparation 18A: 4-bromo-1-[(dimethylphosphoryl)methoxy]-2-fluorobenzene

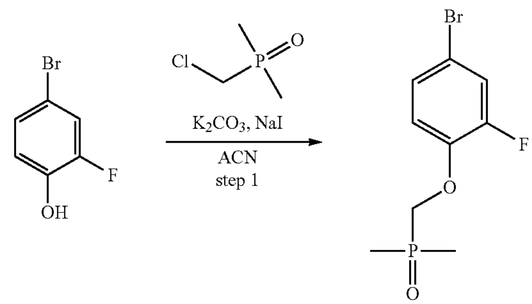

A solution of 4-bromo-2-fluorophenol (200 mg, 1.047 mmol) in $CH_3CN$ (4 mL) were treated with $K_2CO_3$ (434 mg, 3.141 mmol) and NaI (16 mg, 0.105 mmol) for 10 min at room temperature followed by the addition of chloro(dimethylphosphoryl)methane (265 mg, 2.094 mmol) dropwise at room temperature. The resulting mixture was stirred for 48 h at 80° C. The resulting mixture was concentrated under reduced pressure. The residue was purified by silica gel column chromatography, eluted with $CH_2Cl_2$/MeOH (12/1) to afford 4-bromo-1-[(dimethylphosphoryl)methoxy]-2-fluorobenzene (252 mg, 85%) as an off-white solid. MS ESI calculated for $C_9H_{11}BrFO_2P$ $[M+H]^+$, 280.97, found 280.80. $^1H$ NMR (300 MHz, Chloroform-d) δ 7.33-7.28 (m, 1H), 7.27-7.22 (m, 1H), 6.98-6.90 (m, 1H), 4.29 (d, J=8.1 Hz, 2H), 1.72 (s, 3H), 1.68 (s, 3H).

Example 18: (1R,11R)-18-(difluoromethoxy)-5-{4-[(dimethylphosphoryl)methoxy]-3-fluorophenyl}-12-methyl-2,9,12-triazapentacyclo[9.8.1.0^{2,10}.0^{3,8}.0^{14,19}]icosa-3(8),4,6,9,14(19),15,17-heptaen-13-one

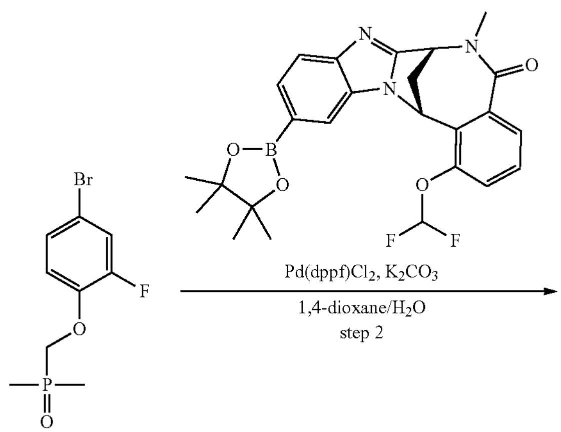

-continued

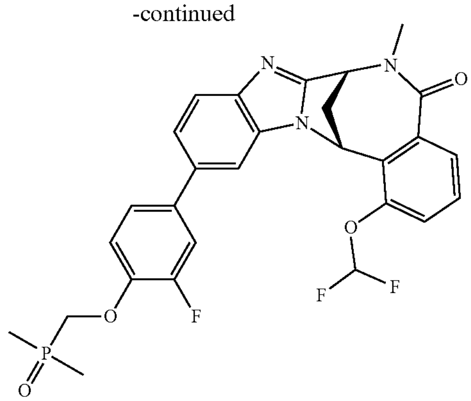

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3,5,7,9,14,16,18-heptaen-13-one (80 mg, 0.166 mmol) and 4-bromo-1-[(dimethylphosphoryl)methoxy]-2-fluorobenzene (70 mg, 0.249 mmol) in 1,4-dioxane (1 mL) and $H_2O$ (0.2 mL) were added $K_2CO_3$ (57 mg, 0.415 mmol) and Pd(dppf)$Cl_2$—$CH_2Cl_2$ (14 mg, 0.017 mmol) at room temperature under nitrogen atmosphere. The resulting mixture was stirred for 2 h at 80° C. under nitrogen atmosphere. The resulting mixture was concentrated under reduced pressure. The residue was purified by silica gel column chromatography, eluted with $CH_2Cl_2$/MeOH (12/1) followed by reversed-phase flash chromatography with the following conditions: column, C18 silica gel; mobile phase, $CH_3CN$ in water (10 mmol/L $NH_4HCO_3$), 30% to 50% gradient in 30 min; detector, 254 nm. This resulted in (1R,11R)-18-(difluoromethoxy)-5-{4-[(dimethylphosphoryl)methoxy]-3-fluorophenyl}-12-methyl-2,9,12-triazapentacyclo[9.8.1.0^{2,10}.0^{3,8}.0^{14,19}]icosa-3(8),4,6,9,14(19),15,17-heptaen-13-one (48 mg, 52%) as a white solid. MS ESI calculated for $C_{28}H_{25}F_3N_3O_4P$ $[M+H]^+$, 556.15, found 556.10. $^1H$ NMR (400 MHz, Chloroform-d) δ 8.52-8.48 (m, 1H), 7.78 (d, J=8.5 Hz, 1H), 7.66 (d, J=1.7 Hz, 1H), 7.49-7.40 (m, 2H), 7.38-7.29 (m, 3H), 7.16-7.08 (m, 1H), 6.86 (t, J=72.9 Hz, 1H), 6.31 (d, J=6.9 Hz, 1H), 5.08 (d, J=6.8 Hz, 1H), 4.36 (d, J=8.2 Hz, 2H), 3.55 (s, 3H), 3.53-3.43 (m, 1H), 2.91 (d, J=13.4 Hz, 1H), 1.73 (s, 3H), 1.70 (s, 3H). $^{19}F$ NMR (377 MHz, Chloroform-d) δ −80.75 (2F), −133.46 (1F). $^{31}P$ NMR (162 MHz, Chloroform-d) δ 42.79 (1P).

Example 19: (1R,11R)-18-(difluoromethoxy)-5-[6-(dimethylphosphoryl)pyridin-3-yl]-12-ethyl-2,9,12-triazapentacyclo[9.8.1.0^{2,10}.0^{3,8}.0^{14,19}]icosa-3(8),4,6,9,14(19),15,17-heptaen-13-one -continued

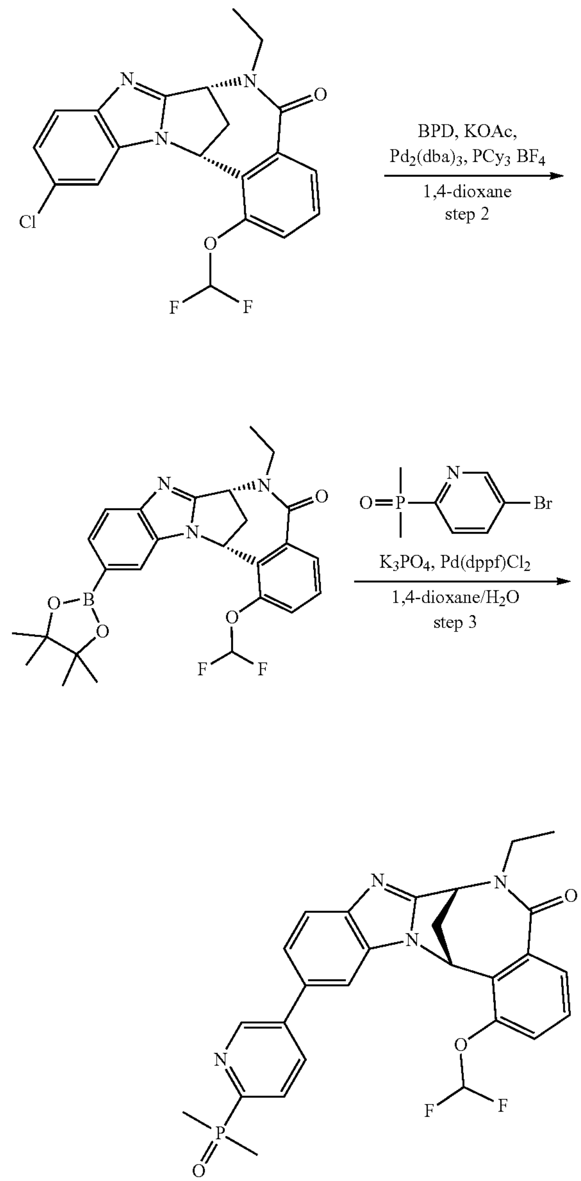

Preparation 19 A: (1R,11R)-5-chloro-18-(difluoromethoxy)-12-ethyl-2,9,12-triazapentacyclo[9.8.1.0^{2,10}.0^{3,8}.0^{14,19}]icosa-3(8),4,6,9,14(19),15,17-heptaen-13-one

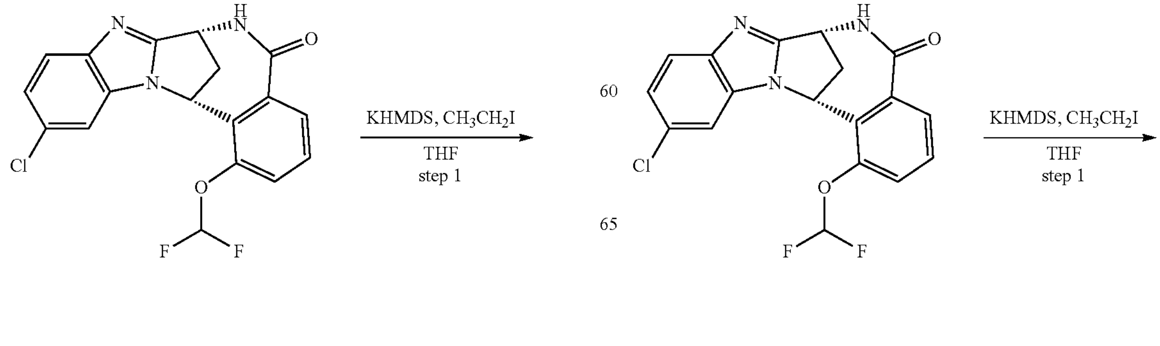

-continued

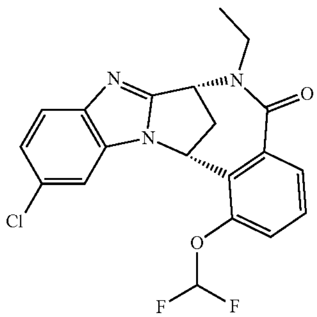

To a stirred solution of (1R,11R)-5-chloro-18-(difluoromethoxy)-2,9,12-triazapentacyclo[9.8.1.0^{2,10}.0^{3,8}.0^{14,19}]icosa-3(8),4,6,9,14(19),15,17-heptaen-13-one (100 mg, 0.266 mmol) in THF (3 mL) was added KHMDS (0.3 mL, 0.319 mmol, 1 M in THF) dropwise at −78° C. under nitrogen atmosphere. The resulting mixture was stirred for 0.5 h at −78° C. under nitrogen atmosphere. To the above mixture was added ethyl iodide (62 mg, 0.399 mmol) dropwise at −78° C. The resulting mixture was stirred for additional overnight at room temperature. The reaction was quenched with 1 mL sat. $NH_4Cl$ (aq.) at room temperature. The resulting mixture was concentrated under reduced pressure. The residue was purified by silica gel column chromatography, eluted with $CH_2Cl_2$/MeOH (20/1) to afford (1R,11R)-5-chloro-18-(difluoromethoxy)-12-ethyl-2,9,12-triazapentacyclo[9.8.1.0^{2,10}.0^{3,8}.0^{14,19}]icosa-3(8),4,6,9,14(19),15,17-heptaen-13-one (75 mg, 64%) as a white solid. MS ESI calculated for $C_{20}H_{16}ClF_2N_3O_2$ $[M+H]^+$, 404.09, found 403.95. $^1H$ NMR (400 MHz, Chloroform-d) δ 8.52 (d, J=8.3 Hz, 1H), 7.63 (d, J=8.7 Hz, 1H), 7.49 (d, J=2.0 Hz, 1H), 7.43 (t, J=8.2 Hz, 1H), 7.37-7.31 (m, 1H), 7.24-7.20 (m, 1H), 6.83 (t, J=73.1 Hz, 1H), 6.22 (d, J=7.1 Hz, 1H), 5.02 (d, J=7.1 Hz, 1H), 4.13-4.05 (m, 1H), 3.90-3.80 (m, 1H), 3.53-3.42 (m, 1H), 2.82 (d, J=13.5 Hz, 1H), 1.44 (t, J=7.1 Hz, 3H).

Preparation 19B: (1R,11R)-18-(difluoromethoxy)-12-ethyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one

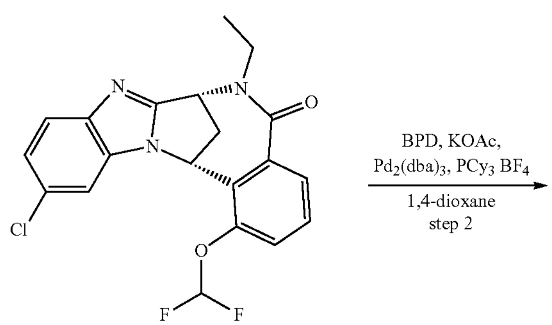

-continued

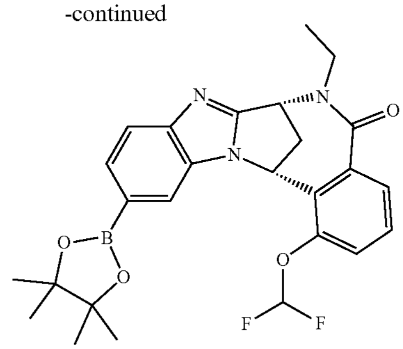

To a stirred mixture of (1R,11R)-5-chloro-18-(difluoromethoxy)-12-ethyl-2,9,12-triazapentacyclo[9.8.1.0^{2,10}.0^{3,8}.0^{14,19}]icosa-3(8),4,6,9,14(19),15,17-heptaen-13-one (75 mg, 0.186 mmol), potassium acetate (54 mg, 0.558 mmol) and BPD (70.75 mg, 0.279 mmol) in 1,4-dioxane (1 mL) were added $Pd_2(dba)_3$ (17 mg, 0.019 mmol) and $PCy_3 \cdot HBF_4$ (7 mg, 0.019 mmol) at room temperature under nitrogen atmosphere. The resulting mixture was stirred for 16 h at 140° C. under nitrogen atmosphere. The mixture was allowed to cool down to room temperature. The resulting mixture was concentrated under reduced pressure. The residue was purified by silica gel column chromatography, eluted with $CH_2Cl_2$/MeOH (10/1) to afford (1R,11R)-18-(difluoromethoxy)-12-ethyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (100 mg, 86%) as a yellow oil. MS ESI calculated for $C_{26}H_{28}BF_2N_3O_4$ $[M+H]^+$ 496.21, found 496.05.

Example 19: (1R,11R)-18-(difluoromethoxy)-5-[6-(dimethylphosphoryl)pyridin-3-yl]-12-ethyl-2,9,12-triazapentacyclo[9.8.1.0^{2,10}.0^{3,8}.0^{14,19}]icosa-3(8),4,6,9,14(19),15,17-heptaen-13-one

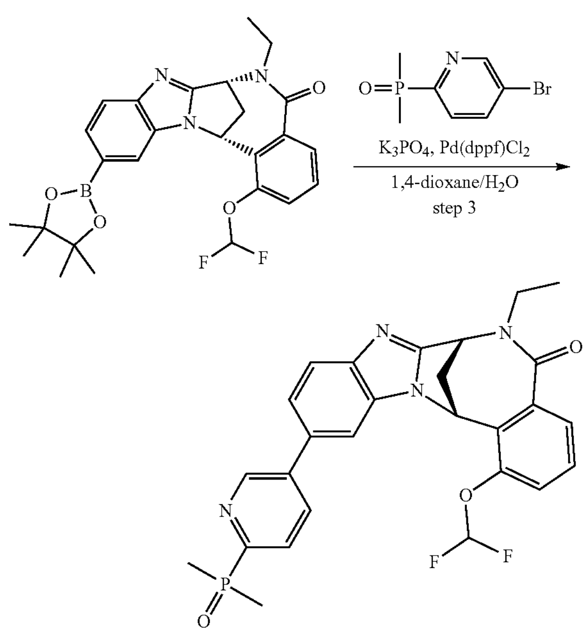

To a solution of (1R,11R)-18-(difluoromethoxy)-12-ethyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (100 mg, 0.202 mmol) and 5-bromo-2-(dimethylphosphoryl)pyridine (47 mg, 0.202 mmol) in 1,4-dioxane (2 mL) and $H_2O$ (0.4 mL) were added $K_3PO_4$ (128 mg, 0.606 mmol) and Pd(dppf)$Cl_2$·$CH_2Cl_2$ (16 mg, 0.020 mmol). After stirring for 2 h at 100° C. under a nitrogen atmosphere, the resulting mixture was concentrated under reduced pressure. The residue was purified by silica gel column chromatography, eluted with $CH_2Cl_2$/MeOH (10/1) followed by reversed-phase flash chromatography with the following conditions: column, C18 silica gel; mobile phase, $CH_3CN$ in water (0.1% FA), 15% to 40% gradient in 25 min; detector, 254 nm to afford (1R,11R)-18-(difluoromethoxy)-5-[6-(dimethylphosphoryl)pyridin-3-yl]-12-ethyl-2,9,12-triazapentacyclo[9.8.1.0^{2,10}.0^{3,8}.0^{14,19}]icosa-3(8),4,6,9,14(19),15,17-heptaen-13-one (50 mg, 47%) as a white solid. MS ESI calculated for $C_{27}H_{25}F_2N_4O_3P$ $[M+H]^+$, 523.16, found 523.15. $^1H$ NMR (400 MHz, Chloroform-d) δ 8.98-8.93 (m, 1H), 8.53 (d, J=8.3 Hz, 1H), 8.23-8.16 (m, 1H), 8.05-7.99 (m, 1H), 7.84 (d, J=8.4 Hz, 1H), 7.77 (d, J=1.9 Hz, 1H), 7.55-7.48 (m, 1H), 7.43 (t, J=8.2 Hz, 1H), 7.39-7.27 (m, 1H), 6.85 (t, J=72.9 Hz, 1H), 6.32 (d, J=7.0 Hz, 1H), 5.05 (d, J=7.1 Hz, 1H), 4.16-4.03 (m, 1H), 3.92-3.81 (m, 1H), 3.56-3.46 (m, 1H), 2.86 (d, J=13.4 Hz, 1H), 1.84 (s, 3H), 1.81 (s, 3H), 1.47 (t, J=7.1 Hz, 3H). $^{19}F$ NMR (377 MHz, Chloroform-d) δ −80.76 (1F), −80.77 (1F). $^{31}P$ NMR (162 MHz, Chloroform-d) δ 36.52.

Example 20: (1R,11R)-18-(difluoromethoxy)-5-(6-[(dimethylphosphoryl)amino]pyridin-3-yl-12-methyl-2,9,12-triazapentacyclo[9.8.1.0^{2,10}.0^{3,8}.0^{14,19}]icosa-3(8),4,6,9,14(19),15,17-heptaen-13-one

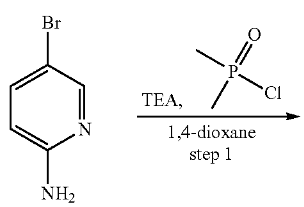

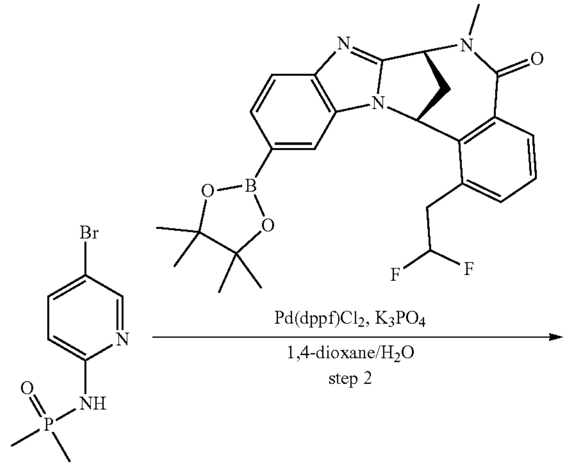

-continued

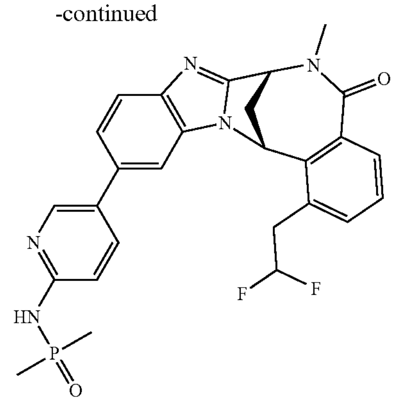

Preparation 20A: 5-bromo-N-(dimethylphosphoryl)pyridin-2-amine

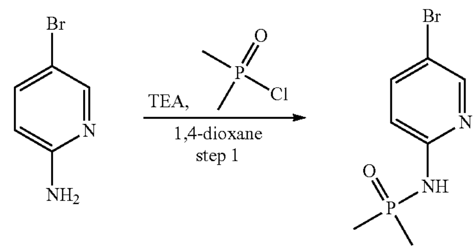

A mixture of dimethylphosphinyl chloride (430 mg, 3.823 mmol) and 5-bromopyridin-2-amine (860 mg, 4.970 mmol) and TEA (774 mg, 7.646 mmol) in 1,4-dioxane (10 mL) was stirred for overnight at 80° C. under nitrogen atmosphere. The resulting mixture was concentrated under vacuum. The residue was purified by silica gel column chromatography, eluted with $CH_2Cl_2$/MeOH (9/1) to afford 5-bromo-N-(dimethylphosphoryl)pyridin-2-amine (220 mg, 23%) as a white solid. MS ESI calculated for $C_7H_{10}BrN_2OP$ $[M+H]^+$, 248.97, found 248.80. $^1H$ NMR (400 MHz, Chloroform-d) δ 8.20 (s, 1H), 7.62-7.56 (m, 1H), 6.82-6.74 (m, 1H), 1.83 (s, 3H), 1.80 (s, 3H).

Example 20: (1R,11R)-18-(difluoromethoxy)-5-{6-[(dimethylphosphoryl)amino]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one

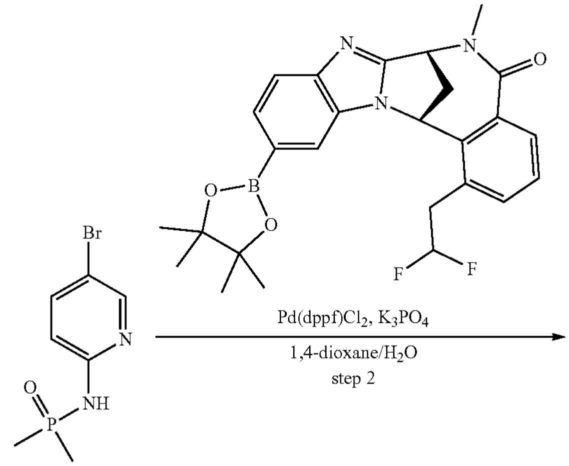

-continued

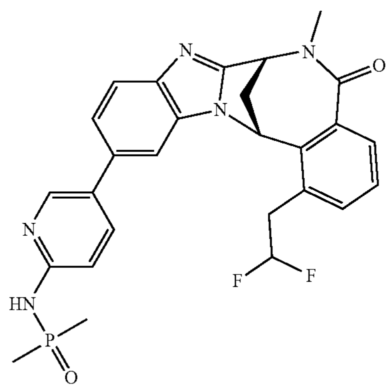

To a solution of 5-bromo-N-(dimethylphosphoryl)pyridin-2-amine (28 mg, 0.114 mmol) and (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.104 mmol) in 1,4-dioxane (1 mL) and $H_2O$ (0.1 mL) were added $K_3PO_4$ (66 mg, 0.312 mmol) and Pd(dppf)$Cl_2 \cdot CH_2Cl_2$ (8 mg, 0.010 mmol). After stirring for 2 h at 100° C. under a nitrogen atmosphere, the resulting mixture was concentrated under reduced pressure. The residue was purified by silica gel column chromatography, eluted with DCM/MeOH (0% to 10%) followed by Prep-HPLC with the following conditions: column, C18 silica gel; mobile phase, $CH_3CN$ in water (10 mmol/L $NH_4HCO_3$), 10% to 50% gradient in 30 min; detector, 254 nm. This resulted in (1R,11R)-18-(difluoromethoxy)-5-{6-[(dimethylphosphoryl)amino]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one (50 mg, 92%) as a white solid. MS ESI calculated for $C_{26}H_{24}F_2N_5O_3P$ $[M+H]^+$, 524.16, found 524.10. $^1H$ NMR (400 MHz, Chloroform-d) δ 8.49 (d, J=8.2 Hz, 1H), 8.40 (d, J=2.5 Hz, 1H), 7.80-7.71 (m, 2H), 7.60 (s, 1H), 7.46-7.36 (m, 2H), 7.30 (d, J=8.1 Hz, 1H), 6.86 (d, J=73.0 Hz, 1H), 6.85-6.82 (m, 1H), 6.27 (d, J=7.2 Hz, 1H), 5.78 (s, 1H), 4.97 (d, J=7.1 Hz, 1H), 3.52 (s, 3H), 3.51-3.40 (m, 1H), 2.88 (d, J=13.6 Hz, 1H), 1.89 (s, 3H), 1.85 (s, 3H). $^{19}F$ NMR (376 MHz, Chloroform-d) δ −80.62 (1F), −80.71 (1F). $^{31}P$ NMR (162 MHz, Chloroform-d) δ 41.80 (1P).

Example 21: (1R,11R)-18-(difluoromethoxy)-5-{1-[(dimethylphosphoryl)methyl]pyrazol-4-yl}-12-methyl-2,9,12-triazapentacyclo[9.8.1.0^{2,10}.0^{3,8}.0^{14,19}]icosa-3(8),4,6,9,14(19),15,17-heptaen-13-one

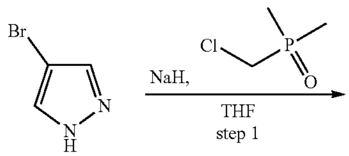

-continued

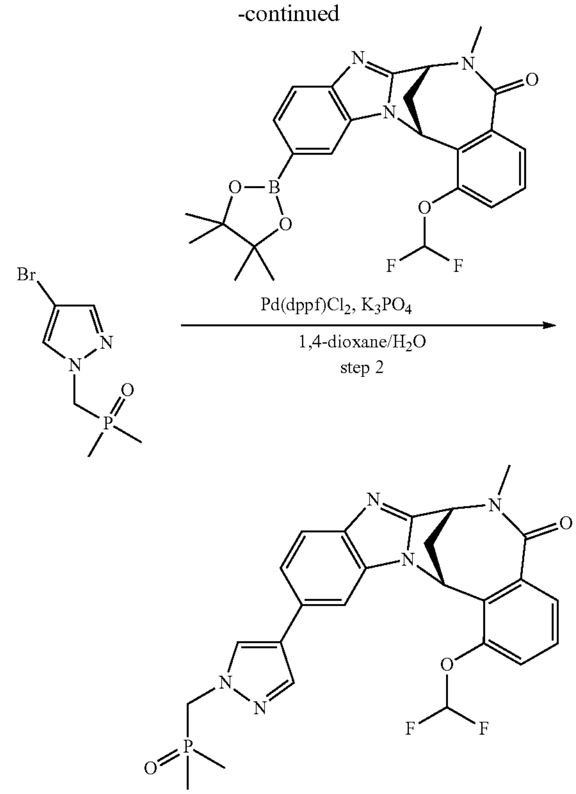

Preparation 21A: 4-bromo-1-[(dimethylphosphoryl)methyl]pyrazole

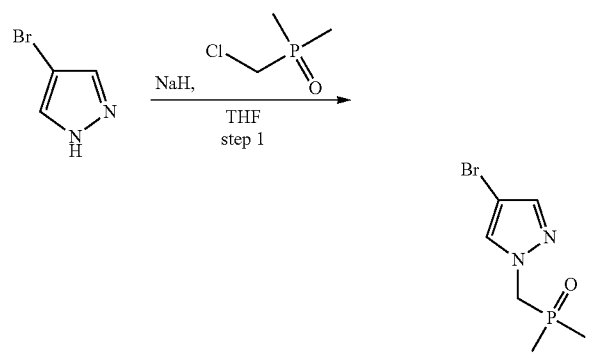

To a solution of 4-bromopyrazole (100 mg, 0.680 mmol) in THF (2 mL) was added sodium hydride (30 mg, 0.748 mmol, 60% in oil) at 0° C. The mixture was stirred for 30 min. Then to above solution was added chloro(dimethylphosphoryl)methane (86 mg, 0.680 mmol). The mixture was stirred for 4 h at room temperature. The reaction mixture was quenched by water and extracted with DCM (3×10 mL). The combined organic layers were concentrated under reduced pressure. The residue was purified by reversed-phase flash chromatography with the following conditions: column, C18 silica gel; mobile phase, $CH_3CN$ in water (10 mmol/L $NH_4HCO_3$), 10% to 50% gradient in 30 min; detector, 254 nm. This resulted in 4-bromo-1-[(dimethylphosphoryl)methyl]pyrazole (100 mg, 62%) as a white solid. MS ESI calculated for $C_6H_{10}BrN_2OP$ $[M+H]^+$, 236.97

238.97, found 236.90 238.90. $^1$H NMR (400 MHz, Chloroform-d) δ 7.59 (s, 1H), 7.50 (s, 1H), 4.53 (d, J=7.4 Hz, 2H), 1.56 (s, 3H), 1.53 (s, 3H).

Example 21: (1R,11R)-18-(difluoromethoxy)-5-(1-[(dimethylphosphoryl)methyl]pyrazol-4-yl)-12-methyl-2,9,12-triazapentacyclo[9.8.1.0^{2,10}.0^{3,8}.0^{14,19}]icosa-3(8),4,6,9,14(19),15,17-heptaen-13-one

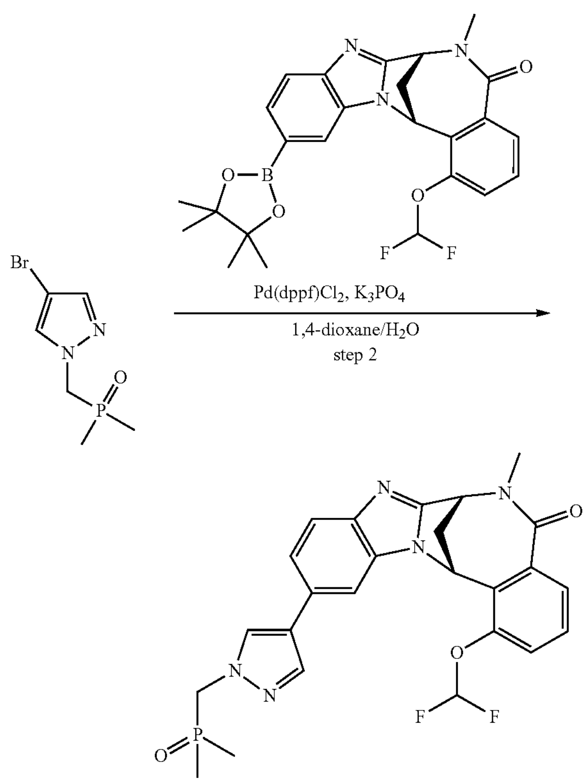

To a solution of 4-bromo-1-[(dimethylphosphoryl)methyl]pyrazole (27 mg, 0.114 mmol) and (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.104 mmol) in 1,4-dioxane (1 mL) and $H_2O$ (0.1 mL) were added $K_3PO_4$ (66 mg, 0.312 mmol) and $Pd(dppf)Cl_2 \cdot CH_2Cl_2$ (8 mg, 0.010 mmol). After stirring for 2 h at 100° C. under a nitrogen atmosphere. The mixture was allowed to cool down to room temperature. The resulting mixture was concentrated under vacuum. The residue was purified by silica gel column chromatography, eluted with DCM/MeOH (0% to 10%) followed by Prep-HPLC with the following conditions: column, C18 silica gel; mobile phase, $CH_3CN$ in water (10 mmol/L $NH_4HCO_3$), 10% to 50% gradient in 30 min; detector, 254 nm. This resulted in (1R,11R)-18-(difluoromethoxy)-5-{1-[(dimethylphosphoryl)methyl]pyrazol-4-yl}-12-methyl-2,9,12-triazapentacyclo[9.8.1.0^{2,10}.0^{3,8}.0^{14,19}]icosa-3(8),4,6,9,14(19),15,17-heptaen-13-one (38 mg, 72%) as a white solid. MS ESI calculated for $C_{25}H_{24}F_2N_5O_3P$ $[M+H]^+$, 512.16, found 512.05. $^1$H NMR (400 MHz, Chloroform-d) δ 8.51 (d, J=8.2 Hz, 1H), 7.83 (s, 2H), 7.78 (d, J=8.5 Hz, 1H), 7.68 (s, 1H), 7.52-7.43 (m, 2H), 7.33 (d, J=8.2 Hz, 1H), 6.94 (t, J=72.8 Hz, 1H), 6.36 (d, J=6.3 Hz, 1H), 5.26 (s, 1H), 4.61 (d, J=7.3 Hz, 2H), 3.62 (s, 3H), 3.59-3.48 (m, 1H), 2.95 (d, J=13.3 Hz, 1H), 1.61 (d, J=3.9 Hz, 3H), 1.57 (d, J=3.9 Hz, 3H). $^{19}$F NMR (376 MHz, Chloroform-d) δ −80.78 (1F), −80.97 (1F). $^{31}$P NMR (162 MHz, Chloroform-d) δ 540.53.

Example 22: (1R,11R)-18-(difluoromethoxy)-5-{6-[(dimethylphosphoryl)methyl]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one Preparation 22A: 5-bromo-2-(chloromethyl)pyridine

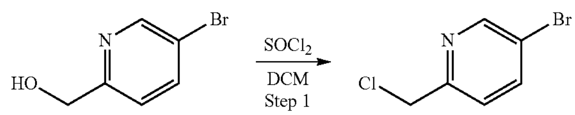

To a stirred solution of (5-bromopyridin-2-yl)methanol (5.00 g, 26.592 mmol) in DCM (50 mL) was added thionyl chloride (4.75 g, 39.888 mmol) dropwise at 0° C. under nitrogen atmosphere. The resulting mixture was stirred for 16 h at room temperature under nitrogen atmosphere. The reaction was quenched by the addition of sat. sodium bicarbonate (50 mL) at 0° C. The resulting mixture was extracted with $CH_2Cl_2$ (3×100 mL). The combined organic layers were washed with brine (2×50 mL), dried over anhydrous $Na_2SO_4$. After filtration, the filtrate was concentrated under reduced pressure. This resulted in 5-bromo-2-(chloromethyl)pyridine (4.50 g, 81%) as a brown oil. $^1$H NMR (300 MHz, Chloroform-d) δ 8.66-8.60 (m, 1H), 7.88-7.80 (m, 1H), 7.42-7.36 (m, 1H), 4.63 (s, 2H).

Preparation 22B: 5-bromo-2-[(dimethylphosphoryl)methyl]pyridine

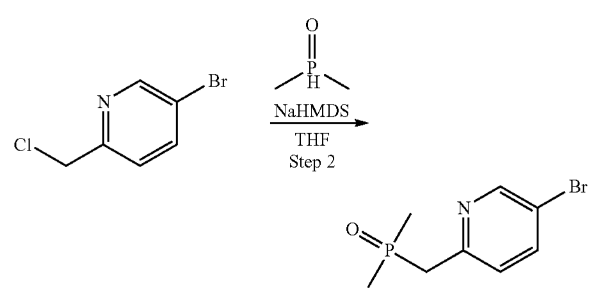

A solution of (methylphosphonoyl)methane (756 mg, 9.687 mmol) in THF (5 mL) was treated with NaHMDS (4.9 mL, 9.687 mmol, 2 N in THF) for 0.5 h at 0° C. under nitrogen atmosphere followed by the addition of 5-bromo-2-(chloromethyl)pyridine (2.00 g, 9.687 mmol) in THF (20 mL) dropwise at 0° C. The resulting mixture was stirred for 16 h at room temperature under nitrogen atmosphere. The reaction was quenched by the addition of water (50 mL) at room temperature. The resulting mixture was extracted with $CH_2Cl_2$ (3×50 mL). The combined organic layers were washed with brine (3×50 mL), dried over anhydrous $Na_2SO_4$. After filtration, the filtrate was concentrated under reduced pressure. The residue was purified by silica gel column chromatography, eluted with $CH_2Cl_2$/MeOH (10:1) to afford 5-bromo-2-[(dimethylphosphoryl)methyl]pyridine (270 mg, 11%) as a brown yellow oil. MS ESI calculated for $C_8H_{11}BrNOP$ $[M+H]^+$, 247.98 249.98, found 247.90 249.90. $^1H$ NMR (400 MHz, Chloroform-d) δ 8.60 (d, J=2.5 Hz, 1H), 7.83-7.78 (m, 1H), 7.31-7.27 (m, 1H), 3.35 (d, J=14.9 Hz, 2H), 1.54 (s, 3H), 1.51 (s, 3H).

Example 22: (1R,11R)-18-(difluoromethoxy)-5-{6-[(dimethylphosphoryl)methyl]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one

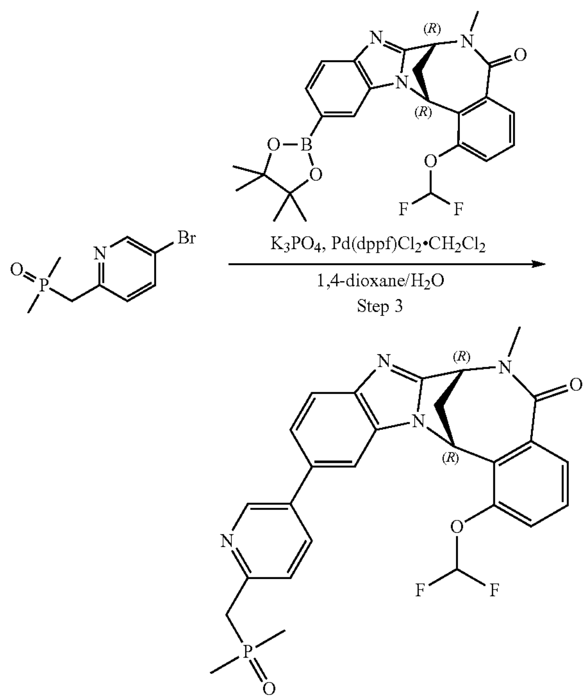

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (51 mg, 0.107 mmol) and 5-bromo-2-[(dimethylphosphoryl)methyl]pyridine (22 mg, 0.089 mmol) in 1,4-dioxane (2 mL) were added $K_3PO_4$ (56 mg, 0.267 mmol) in $H_2O$ (0.5 mL) and Pd(dppf)$Cl_2 \cdot CH_2Cl_2$ (7 mg, 0.009 mmol) at room temperature under nitrogen atmosphere. The resulting mixture was stirred for 16 h at 100° C. under nitrogen atmosphere. The mixture was allowed to cool down to room temperature. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (0.1% $NH_4HCO_3$), Mobile Phase B: $CH_3CN$; Flow rate: 60 mL/min; Gradient: 20 B to 50 B in 30 min; 254/220 nm to afford (1R,11R)-18-(difluoromethoxy)-5-{6-[(dimethylphosphoryl)methyl]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one (29 mg, 63%) as a white solid. MS ESI calculated for $C_{27}H_{25}F_2N_4O_3P$ $[M+H]^+$, 523.16, found 523.20. $^1H$ NMR (400 MHz, DMSO-$d_6$) δ 8.77 (d, J=2.4 Hz, 1H), 8.30-8.23 (m, 1H), 8.00-7.94 (m, 1H), 7.87-7.66 (m, 3H), 7.58-7.53 (m, 1H), 7.52-7.46 (m, 2H), 7.45-7.40 (m, 1H), 6.30 (d, J=7.1 Hz, 1H), 5.25 (d, J=7.1 Hz, 1H), 3.57-3.47 (m, 1H), 3.39 (d, J=15.3 Hz, 2H), 3.36 (s, 3H), 2.83 (d, J=13.8 Hz, 1H), 1.45 (s, 3H), 1.42 (s, 3H). $^{19}F$ NMR (377 MHz, DMSO-$d_6$) δ −81.53, −81.98, −82.38, −82.83. $^{31}P$ NMR (162 MHz, DMSO) δ 38.92.

Example 23: (1R,11R)-18-(difluoromethoxy)-5-(6-{[(dimethylphosphoryl)methyl]amino}pyridin-3-yl)-12-methyl-2,9,12-triazapentacyclo[9.8.1.0^{2,10}.0^{3,8}.0^{14,19}]icosa-3(8),4,6,9,14(19),15,17-heptaen-13-one

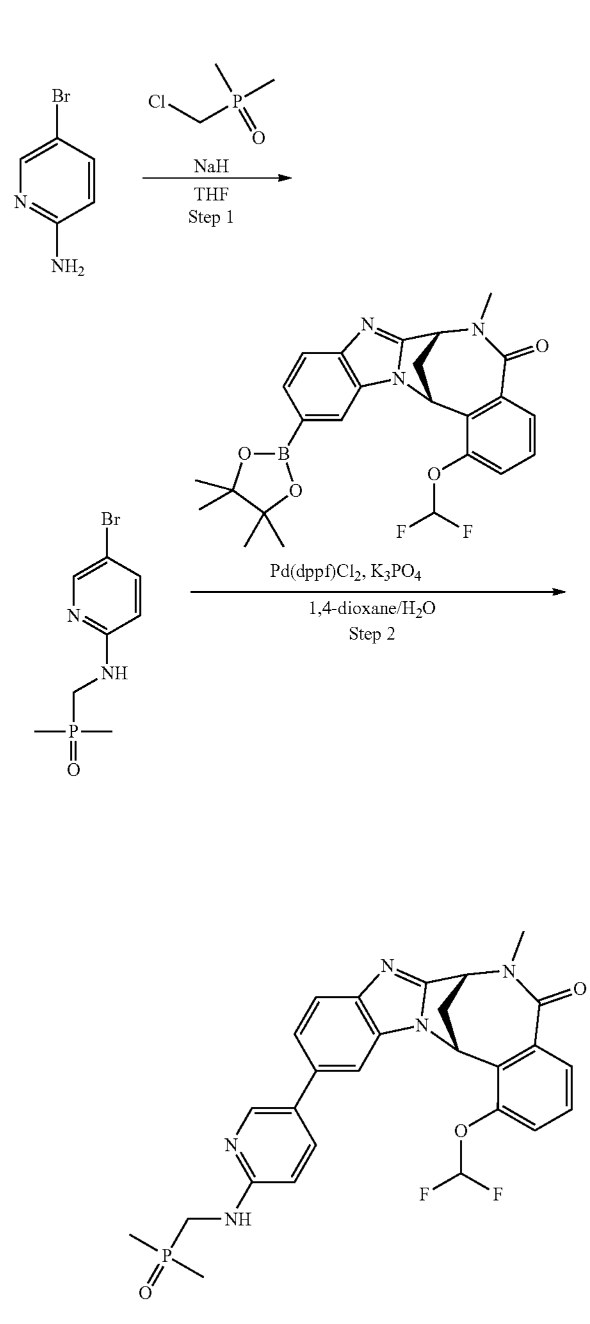

Preparation 23A: 5-bromo-N-[(dimethylphosphoryl) methyl]pyridin-2-amine

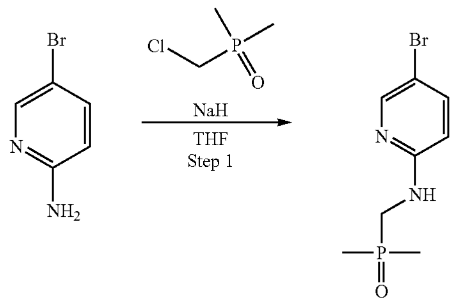

To a solution of 5-bromopyridin-2-amine (250 mg, 1.445 mmol) in THF (5 mL) was added sodium hydride (60% in oil, 64 mg) at 0 degrees C. The mixture was stirred for 30 min. chloro(dimethylphosphoryl)methane (183 mg, 1.445 mmol) was added and the mixture was allowed to warm to room temperature and stirred for 3 h. The reaction mixture was quenched by water and extracted with DCM (3×25 mL). The residue was purified by reversed-phase flash chromatography with the following conditions: column, C18 silica gel; mobile phase, $CH_3CN$ in water (10 mmol/L $NH_4HCO_3$), 10% to 50% gradient in 30 min; detector, 254 nm. This resulted in 5-bromo-N-[(dimethylphosphoryl)methyl]pyridin-2-amine (50 mg, 13%) as a white solid. MS ESI calculated for $C_8H_{12}BrN_2OP$ $[M+H]^+$, 262.99 264.99, found 263.00 265.00. $^1H$ NMR (400 MHz, Chloroform-d) δ 8.08 (d, J=2.4 Hz, 1H), 7.53-7.45 (m, 1H), 6.52 (d, J=8.9 Hz, 1H), 5.57 (s, 1H), 3.88 (s, 2H), 1.57 (s, 3H), 1.54 (s, 3H).

Example 23: (1R,11R)-18-(difluoromethoxy)-5-(6-{[(dimethylphosphoryl)methyl]amino}pyridin-3-yl)-12-methyl-2,9,12-triazapentacyclo[9.8.1.0^{2,10}.0^{3,8}.0^{14,19}]icosa-3(8),4,6,9,14(19),15,17-heptaen-13-one

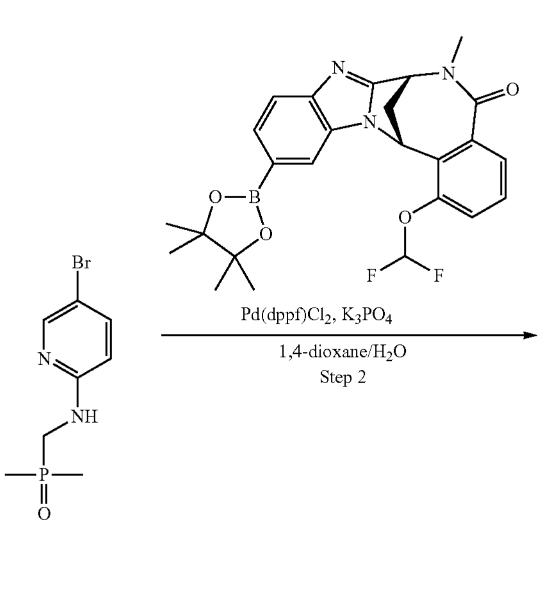

-continued

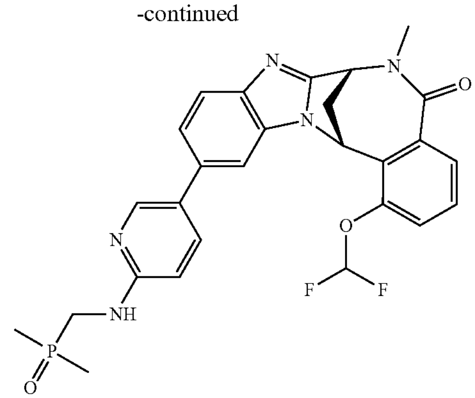

To a solution of 5-bromo-N-[(dimethylphosphoryl)methyl]pyridin-2-amine (30 mg, 0.114 mmol) and (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.104 mmol) in 1,4-dioxane (0.5 mL) and $H_2O$ (0.1 mL) were added $K_3PO_4$ (66 mg, 0.312 mmol) and $Pd(dppf)Cl_2 \cdot CH_2Cl_2$ (8 mg, 0.010 mmol). After stirring for 2 h at 100° C. under a nitrogen atmosphere, the resulting mixture was concentrated under reduced pressure. The resulting mixture was filtered; the filter cake was washed with MeOH (3×5 mL). The filtrate was concentrated under reduced pressure. The residue was purified by reversed-phase flash chromatography with the following conditions: column, C18 silica gel; mobile phase, $CH_3CN$ in water (10 mmol/L $NH_4HCO_3$), 10% to 50% gradient in 30 min; detector, 254 nm. This resulted in (1R,11R)-18-(difluoromethoxy)-5-(6-{[(dimethylphosphoryl)methyl]amino}pyridin-3-yl)-12-methyl-2,9,12-tri azapentacyclo[9.8.1.0^{2,10}.0^{3,8}.0^{14,19}]icosa-3(8),4,6,9,14(19),15,17-heptaen-13-one (22 mg, 39%) as a white solid. MS ESI calculated for $C_{27}H_{26}F_2N_5O_3P$ $[M+H]^+$, 538.17, found 538.05. $^1H$ NMR (400 MHz, Chloroform-d) δ 8.52-8.46 (m, 1H), 8.29 (d, J=2.4 Hz, 1H), 7.75 (d, J=8.5 Hz, 1H), 7.72-7.67 (m, 1H), 7.57 (d, J=1.6 Hz, 1H), 7.46-7.34 (m, 2H), 7.30 (d, J=8.1 Hz, 1H), 7.05-6.61 (m, 2H), 6.25 (d, J=7.2 Hz, 1H), 5.49 (s, 1H), 4.96 (d, J=7.1 Hz, 1H), 3.95 (t, J=5.7 Hz, 2H), 3.52 (s, 3H), 3.51-3.42 (m, 1H), 2.87 (d, J=13.5 Hz, 1H), 1.61 (s, 3H), 1.58 (s, 3H). $^{19}F$ NMR (377 MHz, Chloroform-d) δ −80.09, −80.54, −80.71, −81.15. $^{31}P$ NMR (162 MHz, Chloroform-d) δ 42.08.

Example 24: (7R,14R)-1-(difluoromethoxy)-11-(4-(dimethylphosphoryl)-3-fluorophenyl)-6-(methyl-d3)-6,7-dihydro-7,14-methanobenzo[f]benzo[4,5]imidazo[1,2-a][1,4]diazocin-5(14H)-one

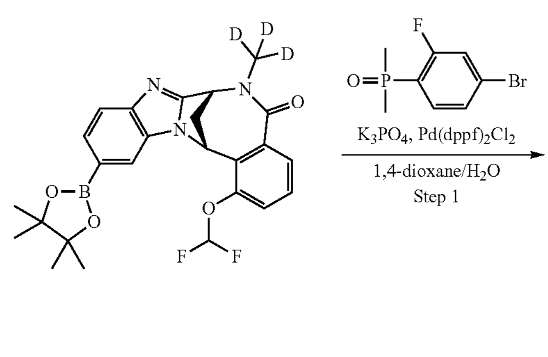

-continued

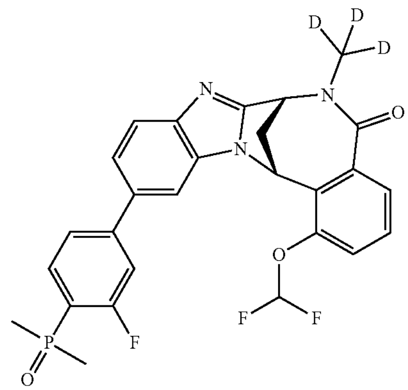

Into a 8 mL vial were added (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (70 mg, 0.145 mmol), 4-bromo-1-(dimethylphosphoryl)-2-fluorobenzene (36 mg, 0.145 mmol), $K_3PO_4$ (92 mg, 0.435 mmol), $Pd(dppf)Cl_2 \cdot CH_2Cl_2$ (10 mg, 0.014 mmol), 1,4-dioxane (2 mL) and water (0.6 mL) at room temperature. The resulting mixture was stirred for overnight at 80° C. under nitrogen atmosphere. The mixture was allowed to cool down to room temperature. The resulting mixture was concentrated under reduced pressure. The residue was purified by silica gel column chromatography, eluted with DCM/MeOH (0% to 10%) followed by reversed-phase flash chromatography with the following conditions: column, C18 silica gel; mobile phase, $CH_3CN$ in water (10 mmol/L $NH_4HCO_3$), 35% to 60% gradient in 20 min; detector, 254 nm. to afford (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (28 mg, 35%) as a white solid. MS ESI calculated for $C_{27}H_{20}D_3F_3N_3O_3P$ $[M+H]^+$, 529.16, found 529.30. $^1H$ NMR (400 MHz, Chloroform-d) δ 8.52-8.47 (m, 1H), 8.07-7.98 (m, 1H), 7.79 (d, J=8.5 Hz, 1H), 7.74 (d, J=1.8 Hz, 1H), 7.59-7.54 (m, 1H), 7.52-7.46 (m, 1H), 7.43 (t, J=8.2 Hz, 1H), 7.39-7.28 (m, 2H), 6.87 (t, J=72.9 Hz, 1H), 6.30 (d, J=7.2 Hz, 1H), 4.98 (d, J=7.1 Hz, 1H), 3.54-3.43 (m, 1H), 2.90 (d, J=13.6 Hz, 1H), 1.86 (s, 3H), 1.82 (s, 3H). $^{19}F$ NMR (377 MHz, Chloroform-d) δ −80.77, −105.83, −105.84. $^{31}P$ NMR (162 MHz, Chloroform-d) δ 30.76.

Example 25: (1R,11R)-18-(difluoromethoxy)-5-{2-[(dimethylphosphoryl)methoxy]-1,3-thiazol-5-yl}-12-methyl-2,9,12-triazapentacyclo[9.8.1.0^{2,10}.0^{3,8}.0^{14,19}]icosa-3(8),4,6,9,14(19),15,17-heptaen-13-one

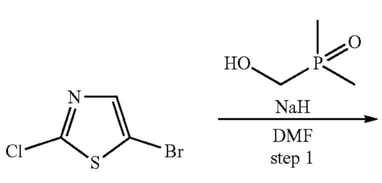

-continued

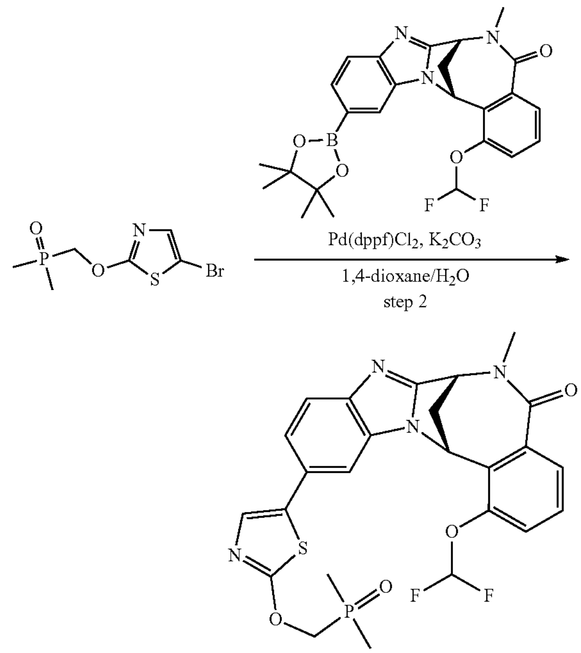

Preparation 25A: 5-bromo-2-[(dimethylphosphoryl)methoxy]-1,3-thiazole

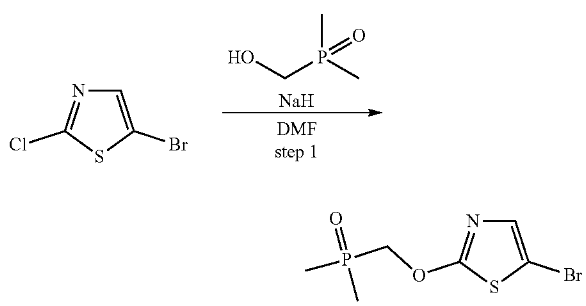

To a stirred solution of 5-bromo-2-chloro-1,3-thiazole (500 mg, 2.519 mmol) in DMF (5 mL) was added NaH (111 mg, 2.771 mmol, 60%) at 0° C. under nitrogen atmosphere. The resulting mixture was stirred for 30 min at room temperature under nitrogen atmosphere. To the above mixture was added (dimethylphosphoryl)methanol (272 mg, 2.519 mmol) at 0° C. The resulting mixture was stirred for additional overnight at room temperature. The resulting mixture was diluted with EtOAc (100 mL). The resulting mixture was washed with 3×30 mL of water. The organic layers were concentrated under reduced pressure. The residue was purified by silica gel column chromatography, eluted with $CH_2Cl_2$/MeOH (12/1) to afford 5-bromo-2-[(dimethylphosphoryl)methoxy]-1,3-thiazole (135 mg, 20%) as a yellow solid. MS ESI calculated for $C_6H_9BrNO_2PS$ $[M+H]^+$, 269.93 271.93, found 269.95 271.95. $^1H$ NMR (400 MHz, Chloroform-d) δ 7.07 (s, 1H), 4.74 (d, J=5.8 Hz, 2H), 1.65 (s, 3H), 1.62 (s, 3H). $^{31}P$ NMR (162 MHz, Chloroform-d) δ 40.02.

Example 25: (1R,11R)-18-(difluoromethoxy)-5-{2-[(dimethylphosphoryl)methoxy]-1,3-thiazol-5-yl}-12-methyl-2,9,12-triazapentacyclo[9.8.1.0^{2,10}.0^{3,8}.0^{14,19}]icosa-3(8),4,6,9,14(19),15,17-heptaen-13-one

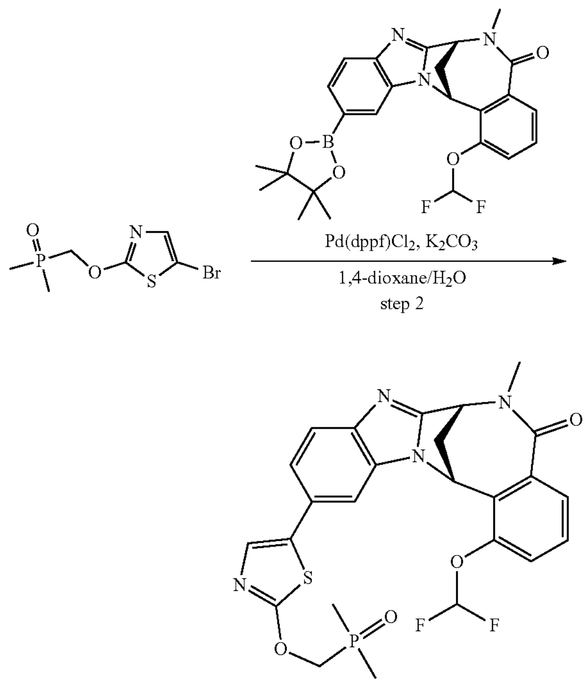 [SMILES: CN1C(=O)c2cccc(OC(F)F)c2[C@H]2C[C@@H]1c1nc3ccc(B4OC(C)(C)C(C)(C)O4)cc3n12 ; CP(C)(=O)COc1ncc(Br)s1 ; CN1C(=O)c2cccc(OC(F)F)c2[C@H]2C[C@@H]1c1nc3ccc(-c4cnc(OCP(C)(C)=O)s4)cc3n12]

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3,5,7,9,14,16,18-heptaen-13-one (50 mg, 0.104 mmol) and 5-bromo-2-[(dimethylphosphoryl)methoxy]-1,3-thiazole (42 mg, 0.156 mmol) in 1,4-dioxane (1 mL) and $H_2O$ (0.2 mL) were added $Pd(dppf)Cl_2 \cdot CH_2Cl_2$ (9 mg, 0.010 mmol) and $K_2CO_3$ (36 mg, 0.260 mmol) at room temperature under nitrogen atmosphere. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (15/1) followed by reversed-phase flash chromatography with the following conditions: column, C18 silica gel; mobile phase, $CH_3CN$ in water (10 mmol/L $NH_4HCO_3$), 25% to 40% gradient in 30 min; detector, 254 nm. This resulted in (1R,11R)-18-(difluoromethoxy)-5-{2-[(dimethylphosphoryl)methoxy]-1,3-thiazol-5-yl}-12-methyl-2,9,12-triazapentacyclo[9.8.1.0^{2,10}.0^{3,8}.0^{14,19}]icosa-3(8),4,6,9,14(19),15,17-heptaen-13-one (37 mg, 65%) as a white solid. MS ESI calculated for $C_{25}H_{23}F_2N_4O_4PS$ $[M+H]^+$, 545.11, found 545.00. $^1H$ NMR (400 MHz, Chloroform-d) δ 8.52-8.47 (m, 1H), 7.70 (d, J=8.5 Hz, 1H), 7.56 (d, J=1.7 Hz, 1H), 7.43 (t, J=8.3 Hz, 1H), 7.38-7.27 (m, 3H), 6.87 (t, J=72.9 Hz, 1H), 6.26 (d, J=7.2 Hz, 1H), 4.97 (d, J=7.1 Hz, 1H), 4.79 (d, J=6.0 Hz, 2H), 3.52 (s, 3H), 3.50-3.41 (m, 1H), 2.88 (d, J=13.6 Hz, 1H), 1.68 (s, 3H), 1.65 (s, 3H). $^{19}F$ NMR (377 MHz, Chloroform-d) δ −80.54. $^{31}P$ NMR (162 MHz, Chloroform-d) δ 40.06.

Example 26: (1R,11R)-18-(difluoromethoxy)-5-{2-[(dimethylphosphoryl)amino]pyrimidin-5-yl}-12-methyl-2,9,12-triazapentacyclo[9.8.1.0^{2,10}.0^{3,8}.0^{14,19}]icosa-3(8),4,6,9,14(19),15,17-heptaen-13-one

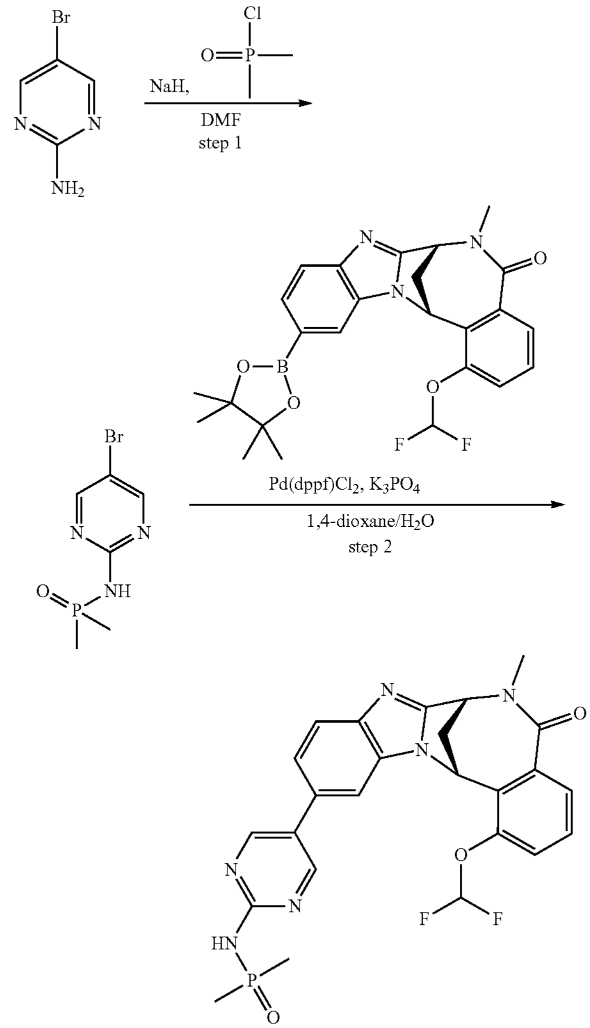

Preparation 26A: 5-bromo-N-(dimethylphosphoryl)pyrimidin-2-amine

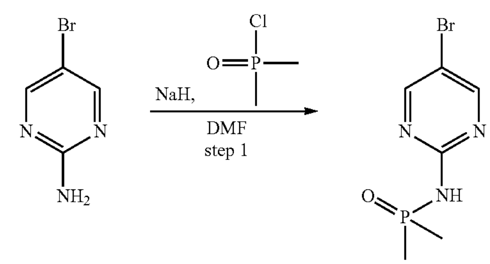

A solution of 5-bromopyrimidin-2-amine (619 mg, 3.556 mmol) in DMF (7 mL) was treated with NaH (142 mg, 3.556 mmol, 60%) for 30 min at 50° C. under nitrogen atmosphere followed by the addition of dimethylphosphinyl chloride (100 mg, 0.889 mmol) at 0° C. The resulting mixture was stirred for 2 h at room temperature under nitrogen atmosphere. The reaction was quenched with water at room temperature. The aqueous layer was extracted with EtOAc (3×100 mL). The aqueous layer was concentrated under reduced pressure, to afford 5-bromo-N-(dimethylphosphoryl)pyrimidin-2-amine (80 mg, 9%) as a yellow solid. MS ESI calculated for $C_6H_9BrN_3OP$ $[M+H]^+$, 249.97 251.97, found 250.10, 252.10. $^1H$ NMR (400 MHz, Chloroform-d) δ 8.50 (s, 2H), 1.86 (s, 3H), 1.82 (s, 3H).

Example 26: (1R,11R)-18-(difluoromethoxy)-5-{2-[(dimethylphosphoryl)amino]pyrimidin-5-yl)-12-methyl-2,9,12-triazapentacyclo[9.8.1.0^{2,10}}.0^{3,8}.0^{14,19}]icosa-3(8),4,6,9,14(19),15,17-heptaen-13-one

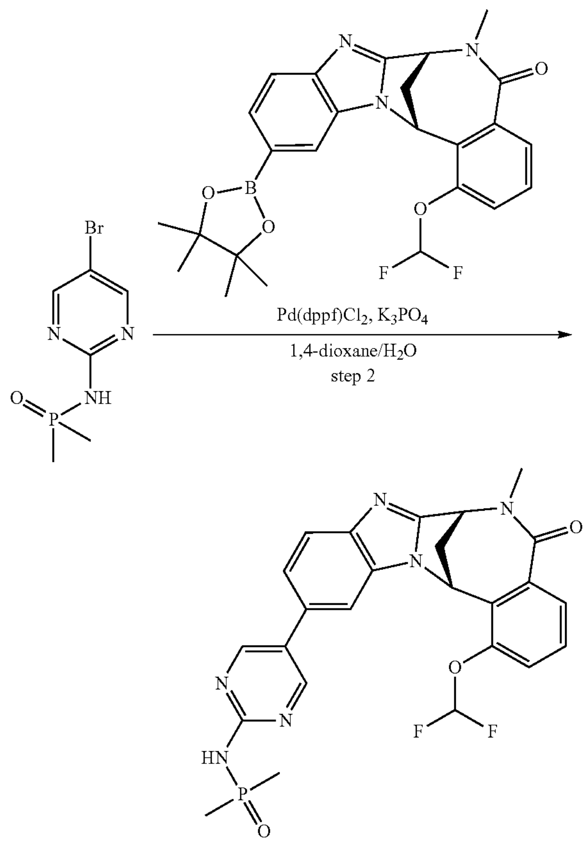

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3,5,7,9,14,16,18-heptaen-13-one (50 mg, 0.104 mmol) and 5-bromo-N-(dimethylphosphoryl)pyrimidin-2-amine (26 mg, 0.104 mmol) in 1,4-dioxane (1 mL) and $H_2O$ (0.2 mL) were added $K_3PO_4$ (66 mg, 0.312 mmol) and $Pd(dppf)Cl_2{\cdot}CH_2Cl_2$ (9 mg, 0.010 mmol) at room temperature under nitrogen atmosphere. The resulting mixture was stirred for 2 h at 100° C. under nitrogen atmosphere. The resulting mixture was concentrated under reduced pressure. The residue was purified by silica gel column chromatography, eluted with $CH_2Cl_2$/MeOH (15/1) followed by reversed-phase flash chromatography with the following conditions: column, C18 silica gel; mobile phase, $CH_3CN$ in water (10 mmol/L $NH_4HCO_3$), 25% to 40% gradient in 30 min; detector, 254 nm. This resulted in (1R,11R)-18-(difluoromethoxy)-5-{2-[(dimethylphosphoryl)amino]pyrimidin-5-yl}-12-methyl-2,9,12-triazapentacyclo[9.8.1.0^{2,10}.0^{3,8}.0^{14,19}]icosa-3(8),4,6,9,14(19),15,17-heptaen-13-one (10 mg, 18%) as a white solid. MS ESI calculated for $C_{25}H_{23}F_2N_6O_3P$ $[M+H]^+$, 525.15, found 525.10. $^1H$ NMR (400 MHz, Chloroform-d) δ 8.71 (s, 2H), 8.51-8.47 (m, 1H), 7.80 (d, J=8.5 Hz, 1H), 7.63 (d, J=1.7 Hz, 1H), 7.47-7.36 (m, 2H), 7.35-7.31 (m, 1H), 7.21-6.80 (m, 1H), 6.30 (d, J=7.2 Hz, 1H), 4.99 (d, J=7.1 Hz, 1H), 3.53 (s, 3H), 3.52-3.43 (m, 1H), 2.90 (d, J=13.5 Hz, 1H), 1.93 (d, J=3.2 Hz, 3H), 1.89 (d, J=3.2 Hz, 3H). $^{19}F$ NMR (377 MHz, Chloroform-d) δ −80.44, −80.88, −81.30, −81.75. $^{31}P$ NMR (162 MHz, Chloroform-d) δ 41.11.

Example 27: (1R,11R)-5-[2-chloro-4-(dimethylphosphoryl)phenyl]-18-(difluoromethoxy)-12-methyl-2,9,12-triazapentacyclo[9.8.1.0^{2,10}.0^{3,8}.0^{14,19}]icosa-3(8),4,6,9,14(19),15,17-heptaen-13-one

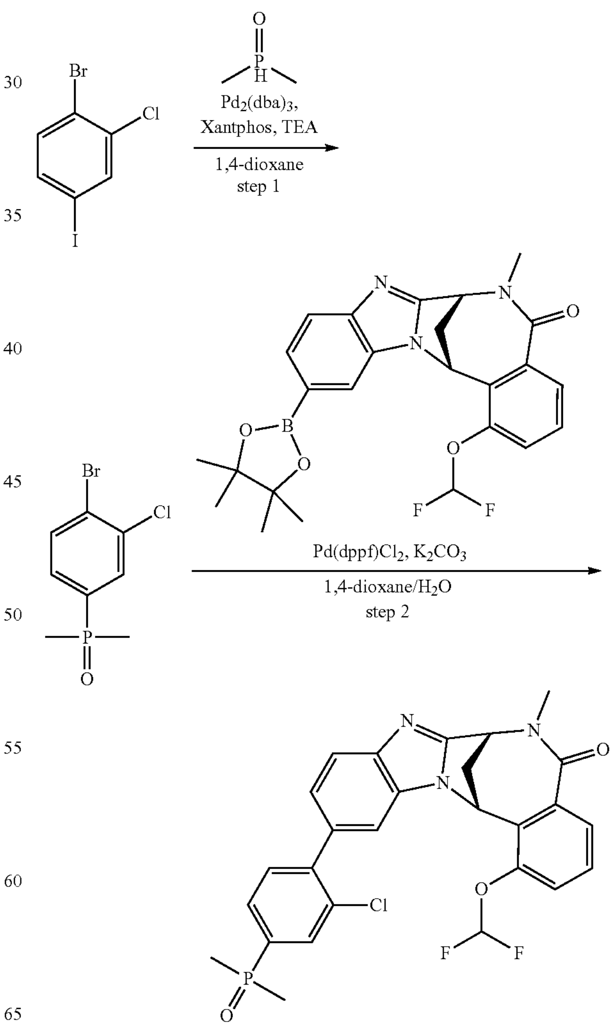

Preparation 27A: 1-bromo-2-chloro-4-(dimethylphosphoryl)benzene

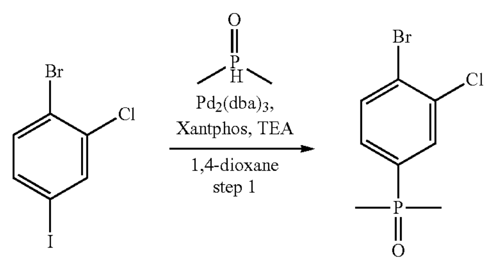

A mixture of 1-bromo-2-chloro-4-iodobenzene (1.00 g, 3.151 mmol), (methylphosphonoyl)methane (270 mg, 3.466 mmol), $Pd_2(dba)_3$ (144 mg, 0.158 mmol), XantPhos (182 mg, 0.315 mmol) and TEA (383 mg, 3.781 mmol) in 1,4-dioxane (10 mL) was stirred for 2 h at 80° C. under nitrogen atmosphere. The resulting mixture was concentrated under reduced pressure. The residue was purified by silica gel column chromatography, eluted with $CH_2Cl_2$/MeOH (12/1) to afford 1-bromo-2-chloro-4-(dimethylphosphoryl)benzene (800 mg, 95%) as a yellow solid. MS ESI calculated for $C_8H_9BrClOP$ $[M+H]^+$, 266.93 268.92, found 267.00 269.00. $^1H$ NMR (400 MHz, Chloroform-d) δ 7.92-7.71 (m, 2H), 7.52-7.41 (m, 1H), 1.76 (s, 3H), 1.73 (s, 3H). $^{31}P$ NMR (162 MHz, Chloroform-d) δ 33.00.

Example 27: (1R,11R)-5-[2-chloro-4-(dimethylphosphoryl)phenyl]-18-(difluoromethoxy)-12-methyl-2,9,12-triazapentacyclo[9.8.1.0^{2,10}.0^{3,8}.0^{14,19}]icosa-3(8),4,6,9,14(19),15,17-heptaen-13-one

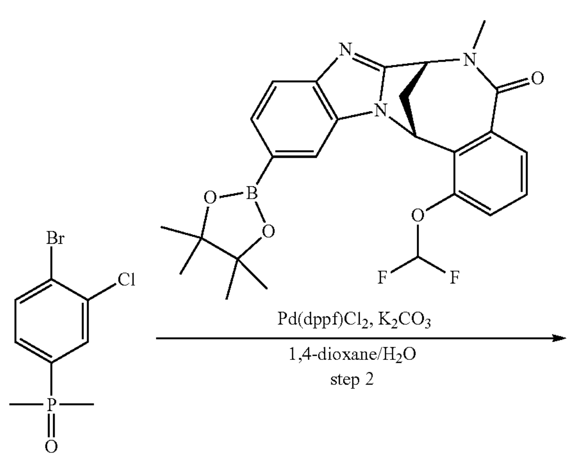

-continued

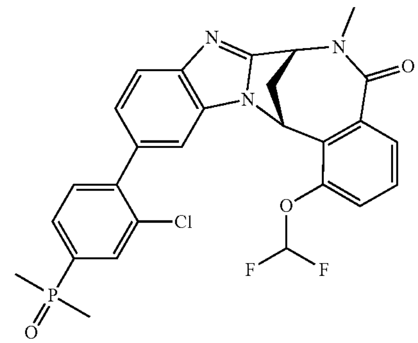

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3,5,7,9,14,16,18-heptaen-13-one (50 mg, 0.104 mmol) and 1-bromo-2-chloro-4-(dimethylphosphoryl)benzene (42 mg, 0.156 mmol) in 1,4-dioxane (1 mL) and $H_2O$ (0.2 mL) were added $K_2CO_3$ (36 mg, 0.260 mmol) and $Pd(dppf)Cl_2 \cdot CH_2Cl_2$ (9 mg, 0.010 mmol) at room temperature under nitrogen atmosphere. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (15/1) followed by reversed-phase flash chromatography with the following conditions: column, C18 silica gel; mobile phase, $CH_3CN$ in water (10 mmol/L $NH_4HCO_3$), 25% to 40% gradient in 30 min; detector, 254 nm. This resulted in (1R,11R)-5-[2-chloro-4-(dimethylphosphoryl)phenyl]-18-(difluoromethoxy)-12-methyl-2,9,12-triazapentacyclo[9.8.1.0^{2,10}.0^{3,8}.0^{14,19}]icosa-3(8),4,6,9,14(19),15,17-heptaen-13-one (37 mg, 65%) as a white solid. MS ESI calculated for $C_{27}H_{23}ClF_2N_3O_3P$ $[M+H]^+$, 542.11, found 542.00. $^1H$ NMR (400 MHz, Chloroform-d) δ 8.52-8.48 (m, 1H), 7.88-7.76 (m, 2H), 7.72-7.63 (m, 1H), 7.63-7.59 (m, 1H), 7.50-7.46 (m, 1H), 7.42 (t, J=8.2 Hz, 1H), 7.36-7.27 (m, 2H), 6.78 (d, J=72.3 Hz, 1H), 6.28 (d, J=7.2 Hz, 1H), 5.01 (d, J=7.1 Hz, 1H), 3.54 (s, 3H), 3.51-3.42 (m, 1H), 2.90 (d, J=13.6 Hz, 1H), 1.82 (s, 3H), 1.78 (s, 3H). $^{19}F$ NMR (377 MHz, Chloroform-d) δ −80.04, −80.48, −80.93, −81.37. $^{31}P$ NMR (162 MHz, Chloroform-d) δ 33.04.

Example 28: (1R,11R)-18-(difluoromethoxy)-5-[4-(dimethylphosphoryl)-2-fluorophenyl]-12-methyl-2,9,12-triazapentacyclo[9.8.1.0^{2,10}.0^{3,8}.0^{14,19}]icosa-3(8),4,6,9,14(19),15,17-heptaen-13-one

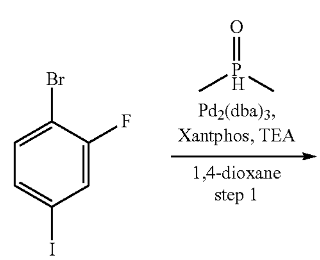

-continued

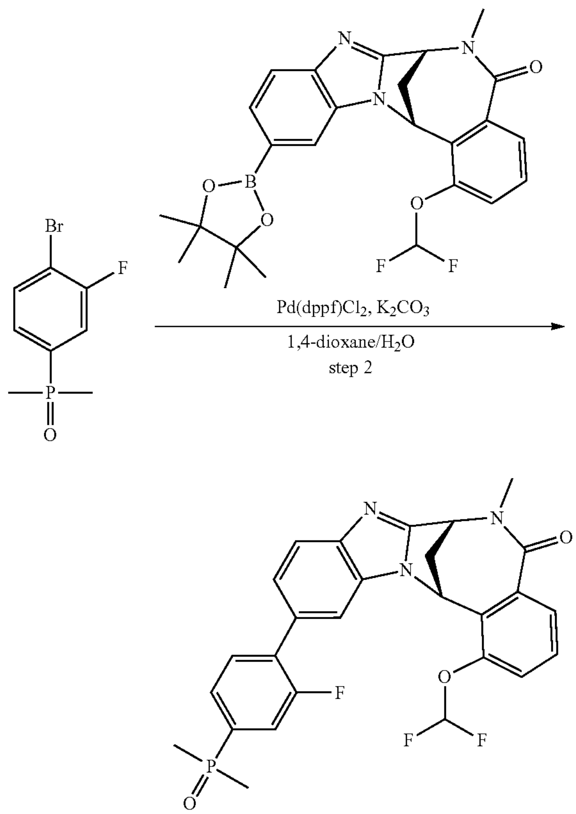

Preparation 28A: 1-bromo-4-(dimethylphosphoryl)-2-fluorobenzene

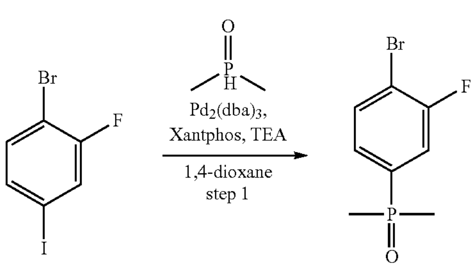

A mixture of 1-bromo-2-fluoro-4-iodobenzene (1.00 g, 3.323 mmol), (methylphosphonoyl)methane (285 mg, 3.655 mmol), $Pd_2(dba)_3$ (152 mg, 0.166 mmol), XantPhos (192 mg, 0.332 mmol) and TEA (404 mg, 3.988 mmol) in 1,4-dioxane (10 mL) was stirred for 2 h at 80° C. under nitrogen atmosphere. The resulting mixture was concentrated under reduced pressure. The residue was purified by silica gel column chromatography, eluted with $CH_2Cl_2$/MeOH (12/1) to afford 1-bromo-4-(dimethylphosphoryl)-2-fluorobenzene (820 mg, 98%) as a yellow solid. MS ESI calculated for $C_8H_9BrFOP$ $[M+H]^+$, 250.96 252.98, found 251.00 253.00. $^1H$ NMR (400 MHz, Chloroform-d) δ 7.73-7.69 (m, 1H), 7.53-7.47 (m, 1H), 7.41-7.34 (m, 1H), 1.77 (s, 3H), 1.73 (s, 3H). $^{31}P$ NMR (162 MHz, Chloroform-d) δ 33.08.

Example 28: (1R,11R)-18-(difluoromethoxy)-5-[4-(dimethylphosphoryl)-2-fluorophenyl]-12-methyl-2,9,12-triazapentacyclo[9.8.1.0^{2,10}.0^{3,8}.0^{14,19}]icosa-3(8),4,6,9,14(19),15,17-heptaen-13-one

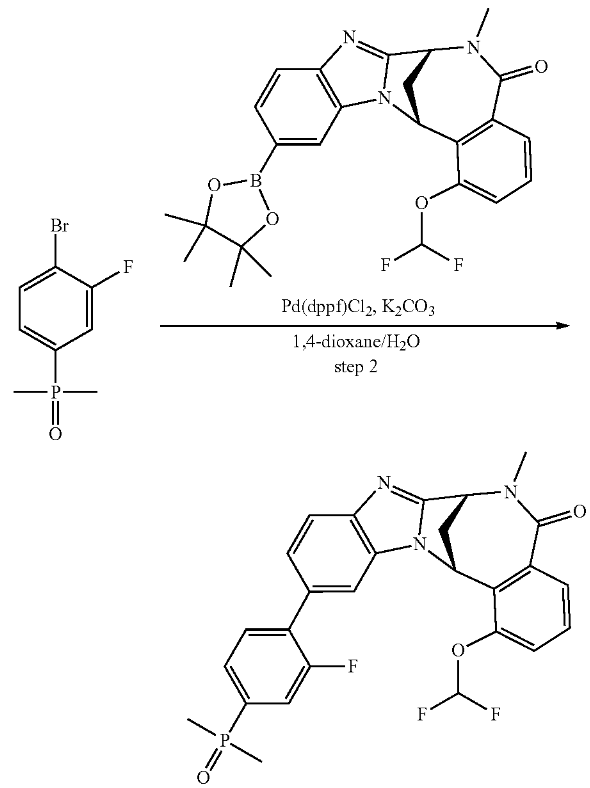

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3,5,7,9,14,16,18-heptaen-13-one (50 mg, 0.104 mmol) and 1-bromo-4-(dimethylphosphoryl)-2-fluorobenzene (39 mg, 0.156 mmol) in 1,4-dioxane (1 mL) and $H_2O$ (0.2 mL) were added $K_2CO_3$ (36 mg, 0.260 mmol) and $Pd(dppf)Cl_2 \cdot CH_2Cl_2$ (9 mg, 0.010 mmol) at room temperature under nitrogen atmosphere. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (15/1) followed by reversed-phase flash chromatography with the following conditions: column, C18 silica gel; mobile phase, $CH_3CN$ in water (10 mmol/L $NH_4HCO_3$), 25% to 40% gradient in 30 min; detector, 254 nm. This resulted in (1R,11R)-18-(difluoromethoxy)-5-[4-(dimethylphosphoryl)-2-fluorophenyl]-12-methyl-2,9,12-triazapentacyclo[9.8.1.0^{2,10}.0^{3,8}.0^{14,19}]icosa-3(8),4,6,9,14(19),15,17-heptaen-13-one (20 mg, 36%) as a white solid. MS ESI calculated for $C_{27}H_{23}F_3N_3O_3P$ $[M+H]^+$, 526.14, found 526.15. $^1H$ NMR (400 MHz, Chloroform-d) δ 8.49 (d, J=8.1 Hz, 1H), 7.85-7.78 (m, 1H), 7.75 (s, 1H), 7.62-7.51 (m, 3H), 7.47-7.40 (m, 2H), 7.34-7.29 (m, 1H), 6.81 (t, J=72.8 Hz, 1H), 6.31 (d, J=7.1 Hz, 1H), 5.04 (s, 1H), 3.54 (s, 3H), 3.53-3.44 (m, 1H), 2.90 (d, J=13.5 Hz, 1H), 1.82 (s, 3H), 1.78 (s, 3H). $^{19}F$ NMR (377 MHz, Chloroform-d) δ −79.94, −80.39, −81.12, −81.57, −116.60. $^{31}$P NMR (162 MHz, Chloroform-d) δ 33.07.

Example 29: (1R,11R)-18-(difluoromethoxy)-5-[4-(dimethylphosphoryl)-2-methylphenyl]-12-methyl-2,9,12-triazapentacyclo[9.8.1.0^{2,10}.0^{3,8}.0^{14,19}]icosa-3(8),4,6,9,14(19),15,17-heptaen-13-one

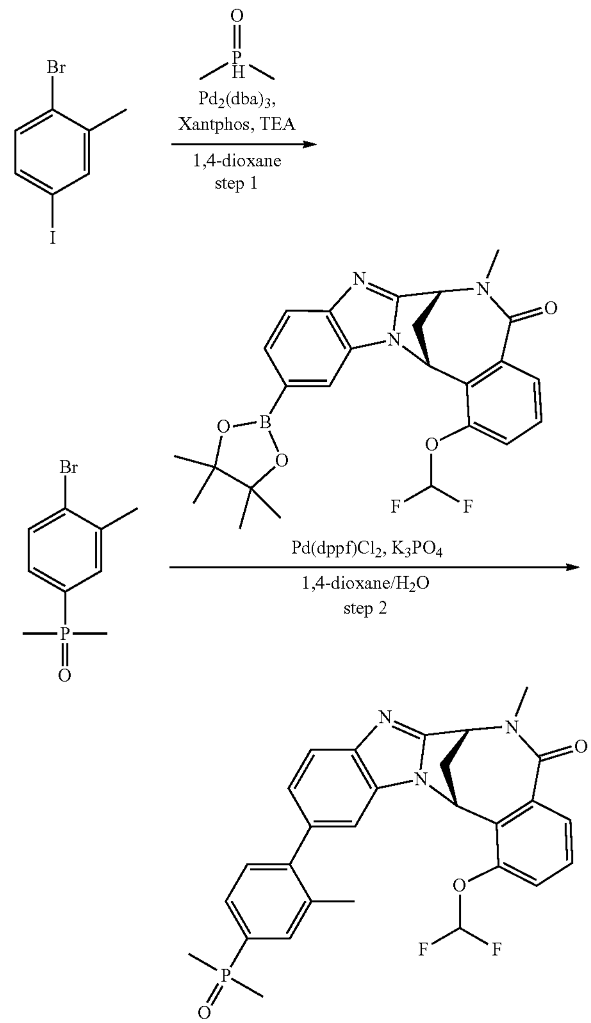

Preparation 29A: 1-bromo-4-(dimethylphosphoryl)-2-methylbenzene

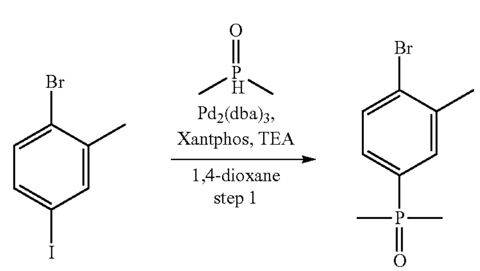

A solution of 1-bromo-4-iodo-2-methylbenzene (1.00 g, 3.368 mmol), (methylphosphonoyl)methane (289 mg, 3.705 mmol), $Pd_2(dba)_3$ (154 mg, 0.168 mmol), XantPhos (195 mg, 0.337 mmol) and TEA (409 mg, 4.042 mmol) in 1,4-dioxane (10 mL) was stirred for 2 h at 80° C. under nitrogen atmosphere. The resulting mixture was concentrated under reduced pressure. The residue was purified by silica gel column chromatography, eluted with $CH_2Cl_2$/MeOH (15/1) to afford 1-bromo-4-(dimethylphosphoryl)-2-methylbenzene (453 mg, 54%) as a yellow solid. MS ESI calculated for $C_9H_{12}BrOP$ $[M+H]^+$, 246.98 248.98, found 247.05 249.15. $^1$H NMR (400 MHz, Chloroform-d) δ 7.71-7.57 (m, 2H), 7.38-7.31 (m, 1H), 1.74 (s, 3H), 1.71 (s, 3H). $^{31}$P NMR (162 MHz, Chloroform-d) δ 33.90.

Example 29: (1R,11R)-18-(difluoromethoxy)-5-[4-(dimethylphosphoryl)-2-methylphenyl]-12-methyl-2,9,12-triazapentacyclo[9.8.1.0^{2,10}.0^{3,8}.0^{14,19}]icosa-3(8),4,6,9,14(19),15,17-heptaen-13-one

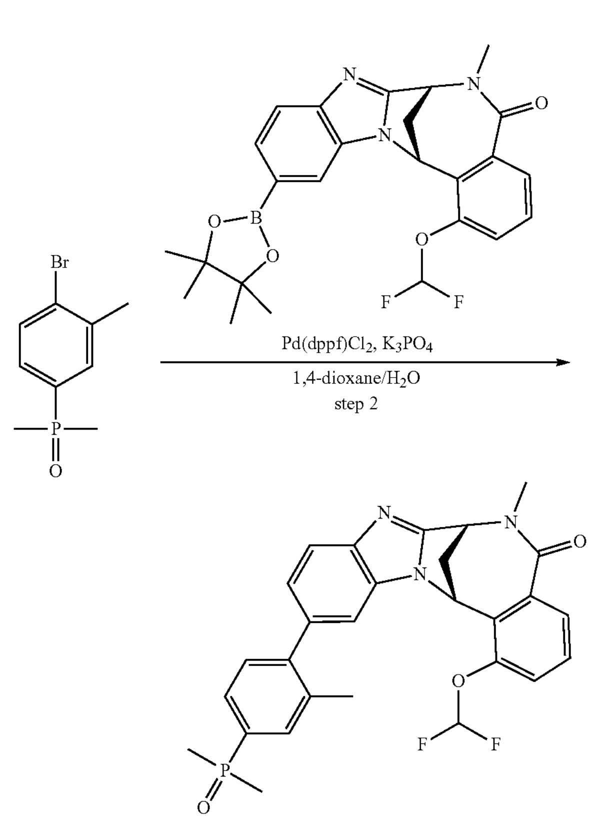

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.104 mmol) and 1-bromo-4-(dimethylphosphoryl)-2-methylbenzene (39 mg, 0.156 mmol) in 1,4-dioxane (1 mL) and $H_2O$ (0.2 mL) were added $K_3PO_4$ (66 mg, 0.312 mmol) and $Pd(dppf)Cl_2 \cdot CH_2Cl_2$ (9 mg, 0.010 mmol) at room temperature under nitrogen atmosphere. The resulting mixture was stirred for 16 at 100° C. under nitrogen atmosphere. The resulting mixture was concentrated under reduced pressure. The residue was purified by silica gel column chromatography, eluted with $CH_2Cl_2$/MeOH (15/1) followed by reversed-phase flash chromatography with the following conditions: column, C18 silica gel; mobile phase, $CH_3CN$ in water (10 mmol/L $NH_4HCO_3$), 25% to 40% gradient in 30 min; detector, 254 nm. This resulted in (1R,11R)-18-(difluoromethoxy)-5-[4-(dimethylphosphoryl)-2-methylphenyl]-12-methyl-2,9,12-triazapentacyclo[9.8.1.0^{2,10}.0^{3,8}.0^{14,19}]icosa-3(8),4,6,9,14(19),15,17-heptaen-13-one (12 mg, 21%) as a white solid. MS ESI calculated for $C_{28}H_{26}F_2N_3O_3P$ $[M+H]^+$, 522.17, found 522.20. $^1H$ NMR (400 MHz, Chloroform-d) δ 8.54-8.47 (m, 1H), 7.77 (d, J=8.4 Hz, 1H), 7.73-7.65 (m, 1H), 7.60-7.51 (m, 1H), 7.47-7.38 (m, 2H), 7.38-7.27 (m, 2H), 7.24-7.17 (m, 1H), 6.75 (t, J=72.8 Hz, 1H), 6.25 (d, J=7.1 Hz, 1H), 5.00 (d, J=7.0 Hz, 1H), 3.54 (s, 3H), 3.52-3.43 (m, 1H), 2.89 (d, J=13.6 Hz, 1H), 2.30 (s, 3H), 1.80 (s, 3H), 1.77 (s, 3H). $^{19}F$ NMR (377 MHz, Chloroform-d) δ −80.16, −80.61, −80.73, −81.17. $^{31}P$ NMR (162 MHz, Chloroform-d) δ 34.08.

Example 30: (1R,11R)-18-(difluoromethoxy)-5-(6-{[(dimethylphosphoryl)methyl](methyl)amino}pyridin-3-yl)-12-methyl-2,9,12-triazapentacyclo[9.8.1.0^{2,10}.0^{3,8}.0^{14,19}]icosa-3(8),4,6,9,14(19),15,17-heptaen-13-one

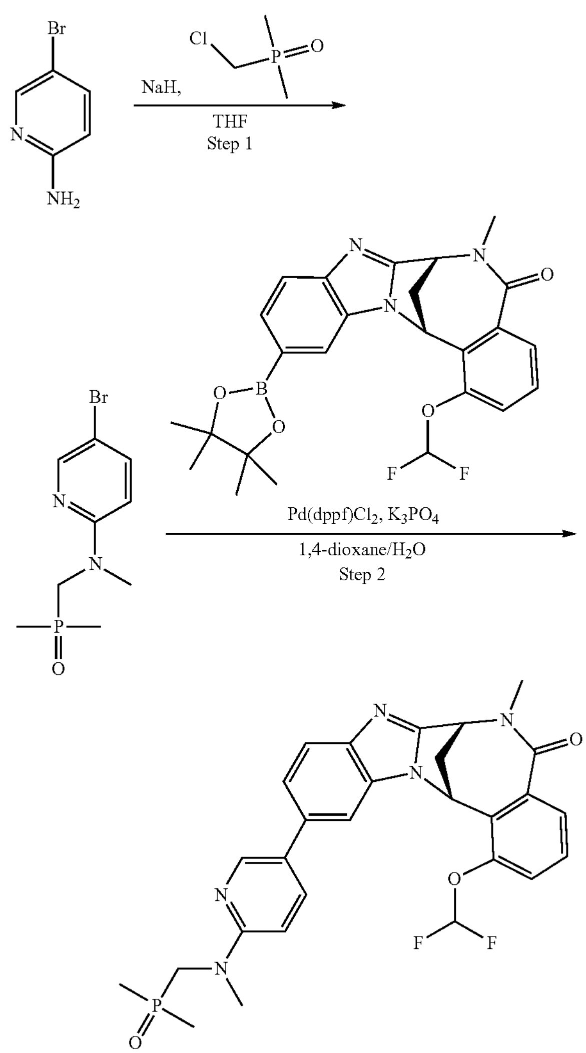

Preparation 30A: 5-bromo-N-[(dimethylphosphoryl)methyl]-N-methylpyridin-2-amine

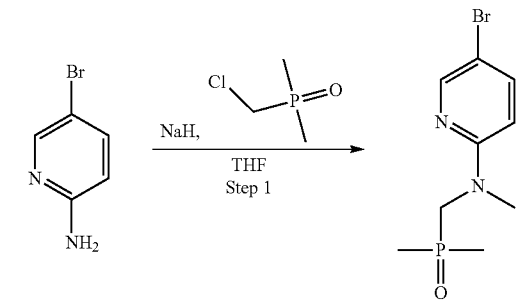

To a solution of 5-bromopyridin-2-amine (250 mg, 1.445 mmol) in THF (5 mL) was added sodium hydride (60% in oil, 64 mg) at 0 degrees C. The mixture was stirred for 30 min. chloro(dimethylphosphoryl)methane (183 mg, 1.445 mmol) was added and the mixture was allowed to warm to room temperature and stirred for 3 h. The reaction mixture was quenched by water and extracted with DCM (3×25 mL). The combined organic layers were concentrated under reduced pressure. The residue was purified by reversed-phase flash chromatography with the following conditions: column, C18 silica gel; mobile phase, CH3CN in water (10 mmol/L $NH_4HCO_3$), 10% to 50% gradient in 30 min; detector, 254 nm. This resulted in 5-bromo-N-[(dimethylphosphoryl)methyl]-N-methylpyridin-2-amine (50 mg, 12%) as a white solid. MS ESI calculated for $C_9H_{14}BrN_2OP$ $[M+H]^+$, 277.00, found 277.01. $^1H$ NMR (400 MHz, Chloroform-d) δ 8.13-8.09 (m, 1H), 7.58-7.52 (m, 1H), 6.53-6.47 (m, 1H), 4.13 (d, J=4.7 Hz, 2H), 3.19 (s, 3H), 1.51 (s, 3H), 1.48 (s, 3H). $^{31}P$ NMR (162 MHz, Chloroform-d) δ 43.67.

Example 30: (1R,11R)-18-(difluoromethoxy)-5-(6-{[(dimethylphosphoryl)methyl](methyl)amino)pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one

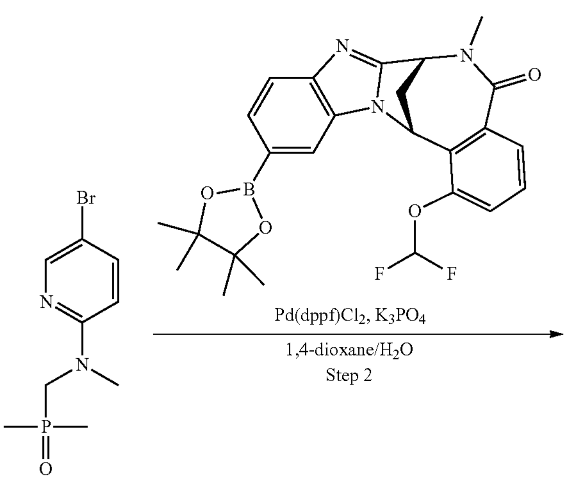

-continued

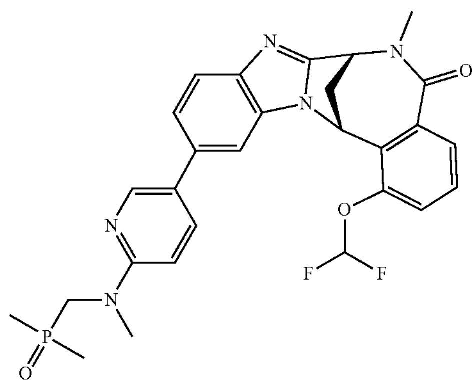

To a solution of 5-bromo-N-[(dimethylphosphoryl)methyl]-N-methylpyridin-2-amine (32 mg, 0.114 mmol) and (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.104 mmol) in 1,4-dioxane (0.5 mL) and $H_2O$ (0.1 mL) were added $K_3PO_4$ (66 mg, 0.312 mmol) and Pd(dppf)$Cl_2 \cdot CH_2Cl_2$ (8 mg, 0.010 mmol). After stirring for 2 h at 100° C. under a nitrogen atmosphere, the resulting mixture was concentrated under reduced pressure. The resulting mixture was filtered, and the filter cake was washed with MeOH (3×5 mL). The filtrate was concentrated under reduced pressure. The residue was purified by reversed-phase flash chromatography with the following conditions: column, C18 silica gel; mobile phase, $CH_3CN$ in water (10 mmol/L $NH_4HCO_3$), 10% to 50% gradient in 30 min; detector, 254 nm. This resulted in (1R,11R)-18-(difluoromethoxy)-5-(6-{[(dimethylphosphoryl)methyl](methyl)amino}pyridin-3-yl)-12-methyl-2,9,12-triazapentacyclo[9.8.1.0^{2,10}.0^{3,8}.0^{14,19}]icosa-3(8),4,6,9,14(19),15,17-heptaen-13-one (21 mg, 36%) as a white solid. MS ESI calculated for $C_{28}H_{28}F_2N_5O_3P$ $[M+H]^+$, 552.19, found 552.10. $^1H$ NMR (400 MHz, Chloroform-d) δ 8.51-8.46 (m, 1H), 8.36 (d, J=2.4 Hz, 1H), 7.80-7.72 (m, 2H), 7.60 (d, J=1.7 Hz, 1H), 7.46-7.36 (m, 2H), 7.33-7.28 (m, 1H), 7.07-6.62 (m, 2H), 6.27 (d, J=7.1 Hz, 1H), 4.96 (d, J=7.0 Hz, 1H), 4.26 (s, 2H), 3.52 (s, 3H), 3.51-3.41 (m, 1H), 3.28 (s, 3H), 2.88 (d, J=13.5 Hz, 1H), 1.57 (s, 3H), 1.54 (s, 3H). $^{19}F$ NMR (376 MHz, Chloroform-d) δ −80.11, −80.56, −80.74, −81.19. $^{31}P$ NMR (162 MHz, Chloroform-d) δ 43.95.

Example 31: (1R,11R)-18-(difluoromethoxy)-5-[4-(dimethylphosphoryl)-2-fluorophenyl]-2,9,12-triazapentacyclo[9.8.1.0^{2,10}.0^{3,8}.0^{14,19}]icosa-3(8),4,6,9,14(19),15,17-heptaen-13-one

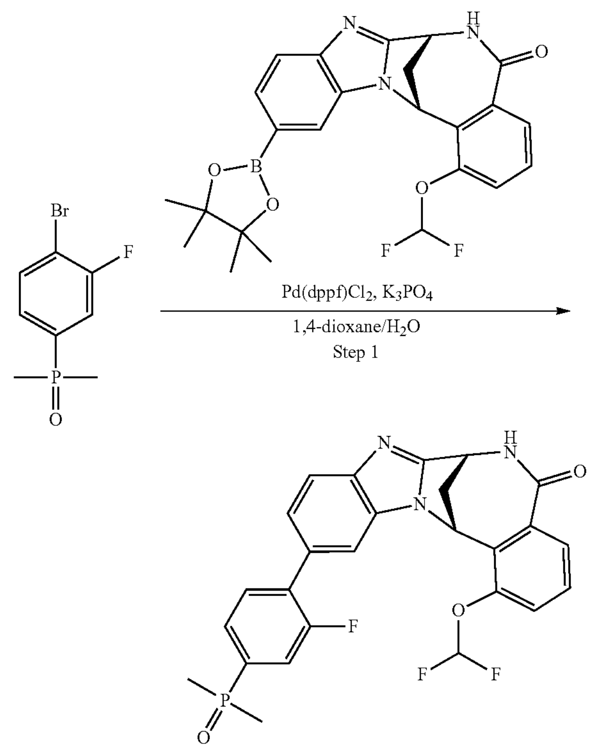

To a solution of 1-bromo-4-(dimethylphosphoryl)-2-fluorobenzene (30 mg, 0.118 mmol) and (1R,11R)-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.107 mmol) in 1,4-dioxane (0.5 mL) and $H_2O$ (0.1 mL) were added $K_3PO_4$ (68 mg, 0.321 mmol) and Pd(dppf)$Cl_2 \cdot CH_2Cl_2$ (9 mg, 0.011 mmol). After stirring for 1 h at 100° C. under a nitrogen atmosphere, the resulting mixture was concentrated under reduced pressure. The resulting mixture was filtered, and the filter cake was washed with MeOH (3×4 mL). The filtrate was concentrated under reduced pressure. The residue was purified by reversed-phase flash chromatography with the following conditions: column, C18 silica gel, mobile phase, $CH_3CN$ in water (10 mmol/L $NH_4HCO_3$), 20% to 60% gradient in 30 min; detector, 254 nm. This resulted in (1R,11R)-18-(difluoromethoxy)-5-[4-(dimethylphosphoryl)-2-fluorophenyl]-2,9,12-triazapentacyclo[9.8.1.0^{2,10}.0^{3,8}.0^{14,19}]icosa-3(8),4,6,9,14(19),15,17-heptaen-13-one (16 mg, 29%) as a white solid. MS ESI calculated for $C_{26}H_{21}F_3N_3O_3P$ $[M+H]^+$, 512.13, found 512.05. $^1H$ NMR (400 MHz, Chloroform-d) δ 8.46-8.40 (m, 1H), 7.82 (d, J=8.5 Hz, 1H), 7.72 (d, J=1.8 Hz, 1H), 7.64-7.51 (m, 3H), 7.48-7.40 (m, 2H), 7.38-7.33 (m, 1H), 7.32-7.29 (m, 1H), 6.82 (t, J=73.3 Hz, 1H), 6.39 (d, J=7.2 Hz, 1H), 5.00 (t, J=6.6 Hz, 1H), 3.55-3.45 (m, 1H), 2.89 (d, J=13.3 Hz, 1H), 1.81 (s, 3H), 1.78 (s, 3H). $^{19}F$ NMR (377 MHz, Chloroform-d) δ −80.04, −80.49, −81.15, −81.59, −116.63. $^{31}P$ NMR (162 MHz, Chloroform-d) δ 33.04.

Example 32: (1R,11R)-18-(difluoromethoxy)-5-[4-(dimethylphosphoryl)-2-methylphenyl]-2,9,12-triazapentacyclo[9.8.1.0^{2,10}.0^{3,8}.0^{14,19}]icosa-3(8),4,6,9,14(19),15,17-heptaen-13-one

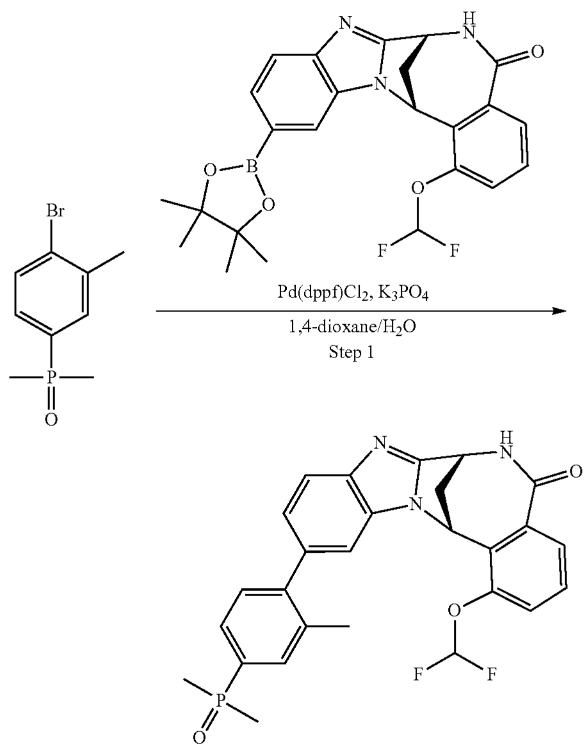

To a solution of 1-bromo-4-(dimethylphosphoryl)-2-methylbenzene (29 mg, 0.118 mmol) and (1R,11R)-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.107 mmol) in 1,4-dioxane (0.5 mL) and $H_2O$ (0.1 mL) were added $K_3PO_4$ (68 mg, 0.321 mmol) and Pd(dppf)$Cl_2 \cdot CH_2Cl_2$ (9 mg, 0.011 mmol). After stirring for 1 h at 100° C. under a nitrogen atmosphere, the resulting mixture was concentrated under reduced pressure. The resulting mixture was filtered, and the filter cake was washed with MeOH (3×5 mL). The filtrate was concentrated under reduced pressure. The residue was purified by reversed-phase flash chromatography with the following conditions: column, C18 silica gel; mobile phase, $CH_3CN$ in water (10 mmol/L $NH_4HCO_3$), 20% to 60% gradient in 10 min; detector, 254 nm. This resulted in (1R,11R)-18-(difluoromethoxy)-5-[4-(dimethylphosphoryl)-2-methylphenyl]-2,9,12-triazapentacyclo[9.8.1.0^{2,10}.0^{3,8}.0^{14,19}]icosa-3(8),4,6,9,14(19),15,17-heptaen-13-one (39 mg, 70%) as a white solid. MS ESI calculated for $C_{27}H_{24}F_2N_3O_3P$ $[M+H]^+$, 508.15, found 508.10. $^1H$ NMR (400 MHz, Chloroform-d) δ 8.49-8.42 (m, 1H), 7.79 (d, J=8.4 Hz, 1H), 7.70 (d, J=12.0 Hz, 1H), 7.61-7.51 (m, 1H), 7.54-7.49 (m, 1H), 7.49-7.41 (m, 2H), 7.39-7.31 (m, 2H), 7.23 (d, J=8.0 Hz, 1H), 6.77 (t, J=72.6 Hz, 1H), 6.37 (d, J=6.6 Hz, 1H), 5.10 (s, 1H), 3.56-3.48 (m, 1H), 2.90 (d, J=13.1 Hz, 1H), 2.29 (s, 3H), 1.81 (s, 3H), 1.77 (s, 3H). $^{19}F$ NMR (377 MHz, Chloroform-d) δ −80.32, −80.77, −80.80, −81.25. $^{31}P$ NMR (162 MHz, Chloroform-d) δ 33.88.

Example 33: (1R,11R)-18-(difluoromethoxy)-5-{4-[(dimethylphosphoryl)methyl]phenyl}-12-methyl-2,9,12-triazapentacyclo[9.8.1.0^{2,10}.0^{3,8}.0^{14,19}]icosa-3(8),4,6,9,14(19),15,17-heptaen-13-one

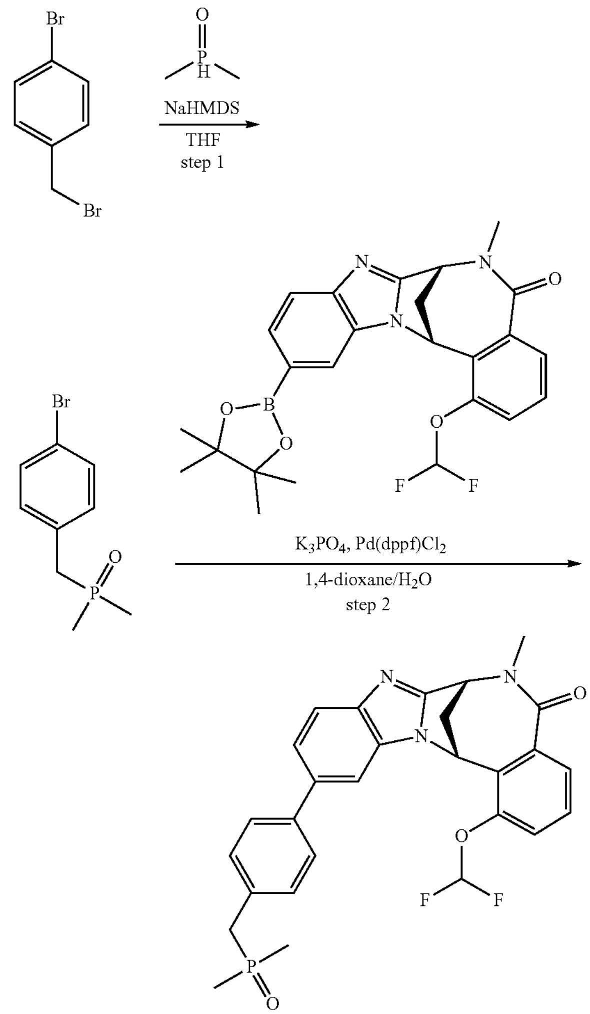

Preparation 33A: 1-bromo-4-[(dimethylphosphoryl)methyl]benzene

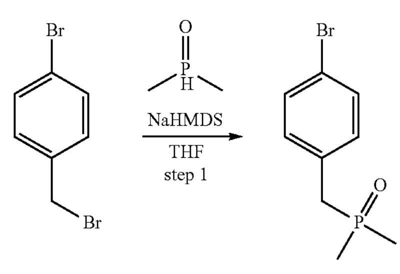

A solution of (methylphosphonoyl)methane (172 mg, 2.201 mmol) in THF (5 mL) was treated with NaHMDS (1 mL, 2.001 mmol, 1N in THF) for 15 min at 0° C. under nitrogen atmosphere followed by the addition of 1-bromo- 4-(bromomethyl)benzene (500 mg, 2.001 mmol) in THF (3 mL) dropwise at 0° C. The resulting mixture was stirred for 16 h at room temperature under nitrogen atmosphere. The reaction was quenched with water at 0° C. The resulting mixture was extracted with $CH_2Cl_2$ (3×100 mL). The combined organic layers were washed with brine (2×50 mL), dried over anhydrous $Na_2SO_4$. After filtration, the filtrate was concentrated under reduced pressure. The residue was purified by silica gel column chromatography, eluted with $CH_2Cl_2$/MeOH (10:1) to afford 1-bromo-4-[(dimethylphosphoryl)methyl]benzene (240 mg, 48%) as a white solid. MS ESI calculated for $C_9H_{12}BrOP$ $[M+H]^+$, 246.98 248.98, found 247.05 249.05. $^1H$ NMR (400 MHz, Chloroform-d) δ 7.51-7.42 (m, 2H), 7.18-7.09 (m, 2H), 3.12 (d, J=14.9 Hz, 2H), 1.47 (s, 3H), 1.44 (s, 3H).

Example 33: (1R,11R)-18-(difluoromethoxy)-5-(4-[(dimethylphosphoryl)methyl]phenyl)-12-methyl-2,9,12-triazapentacyclo[9.8.1.0^{2,10}.0^{3,8}.0^{14,19}]icosa-3(8),4,6,9,14(19),15,17-heptaen-13-one

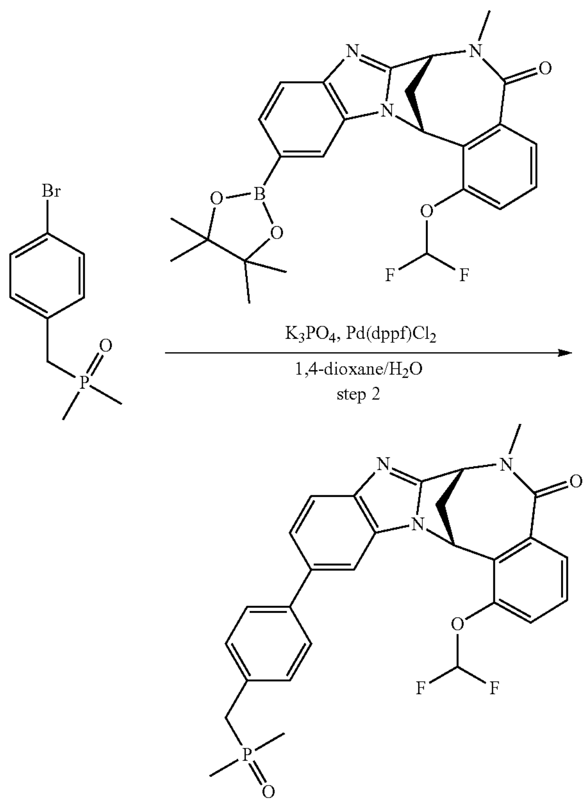

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (51 mg, 0.107 mmol) and 1-bromo-4-[(dimethylphosphoryl)methyl]benzene (22 mg, 0.089 mmol) in 1,4-dioxane (2 mL) were added $K_3PO_4$ (57 mg, 0.267 mmol) in $H_2O$ (0.5 mL) and $Pd(dppf)Cl_2 \cdot CH_2Cl_2$ (7 mg, 0.009 mmol) at room temperature under nitrogen atmosphere. The resulting mixture was stirred for 16 h at 100° C. under nitrogen atmosphere. The mixture was allowed to cool down to room temperature. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (0.1% $NH_4HCO_3$), Mobile Phase B: $CH_3CN$; Flow rate: 60 mL/min; Gradient: 30 B to 50 B in 30 min; 254/220 nm to afford (1R,11R)-18-(difluoromethoxy)-5-{4-[(dimethylphosphoryl)methyl]phenyl}-12-methyl-2,9,12-triazapentacyclo[9.8.1.0^{2,10}.0^{3,8}.0^{14,19}]icosa-3(8),4,6,9,14(19),15,17-heptaen-13-one (28 mg, 59%) as a white solid. MS ESI calculated for $C_{28}H_{26}F_2N_3O_3P$ $[M+H]^+$, 522.17, found 522.15. $^1H$ NMR (400 MHz, Chloroform-d) δ 8.53-8.46 (m, 1H), 7.80-7.75 (m, 1H), 7.69 (d, J=1.7 Hz, 1H), 7.57 (d, J=7.8 Hz, 2H), 7.52-7.46 (m, 1H), 7.42 (t, J=8.2 Hz, 1H), 7.37-7.28 (m, 3H), 6.84 (t, J=72.8 Hz, 1H), 6.29 (d, J=7.1 Hz, 1H), 5.00 (d, J=7.0 Hz, 1H), 3.54 (s, 3H), 3.52-3.42 (m, 1H), 3.21 (d, J=15.1 Hz, 2H), 2.89 (d, J=13.5 Hz, 1H), 1.51 (s, 3H), 1.48 (s, 3H). $^{19}F$ NMR (377 MHz, Chloroform-d) δ −80.20, −80.64, −80.86, −81.30. $^{31}P$ NMR (162 MHz, Chloroform-d) δ 40.86.

Example 34: (1R,11R)-18-(difluoromethoxy)-5-[4-(dimethylphosphoryl)-2,3-difluorophenyl]-2,9,12-triazapentacyclo[9.8.1.0^{2,10}.0^{3,8}.0^{14,19}]icosa-3(8),4,6,9,14(19),15,17-heptaen-13-one

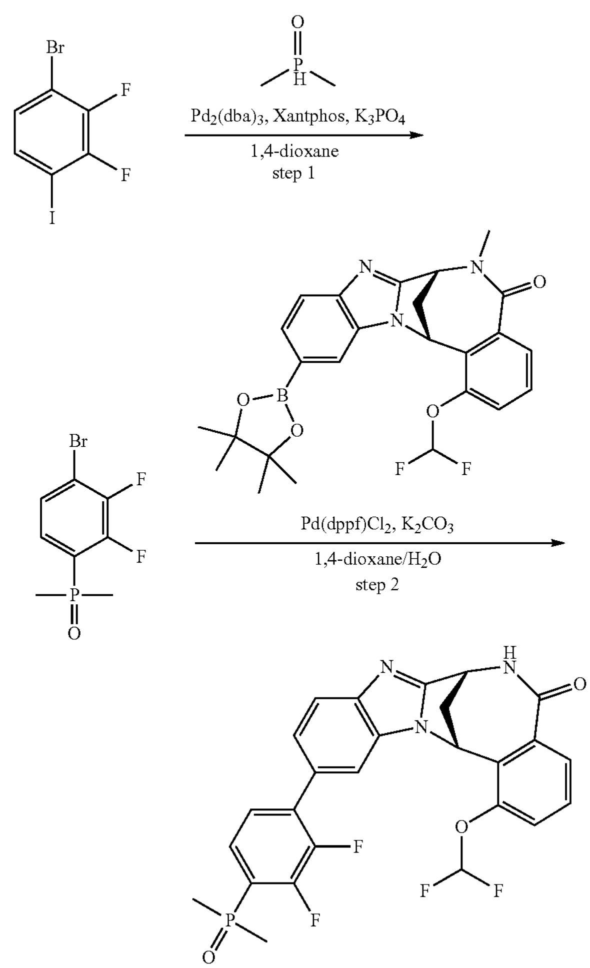

Preparation 34A: 1-bromo-4-(dimethylphosphoryl)-2,3-difluorobenzene

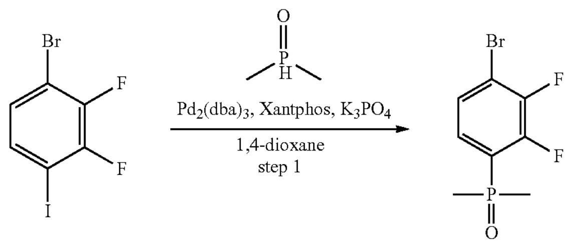

To a stirred mixture of 1-bromo-2,3-difluoro-4-iodobenzene (1.00 g, 3.136 mmol) and (methylphosphonoyl)methane (0.27 g, 3.450 mmol) in 1,4-dioxane (10 mL) were added $K_3PO_4$ (0.80 g, 3.763 mmol), XantPhos (0.18 g, 0.314 mmol) and $Pd_2(dba)_3$ (0.14 g, 0.157 mmol) at room temperature under nitrogen atmosphere. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (15:1) to afford 1-bromo-4-(dimethylphosphoryl)-2,3-difluorobenzene (650 mg, 77%) as a yellow solid. MS ESI calculated for $C_8H_8BrF_2OP$ $[M+H]^+$, 268.95 270.94, found 268.80 270.80. $^1H$ NMR (400 MHz, Chloroform-d) δ 7.70-7.59 (m, 1H), 7.52 (m, J=8.1, 5.5 Hz, 1H), 1.85 (s, 3H), 1.81 (s, 3H). $^{31}P$ NMR (162 MHz, Chloroform-d) δ 30.19.

Example 34: (1R,11R)-18-(difluoromethoxy)-5-[4-(dimethylphosphoryl)-2,3-difluorophenyl]-2,9,12-triazapentacyclo[9.8.1.0^{2,10}.0^{3,8}.0^{14,19}]icosa-3(8),4,6,9,14(19),15,17-heptaen-13-one

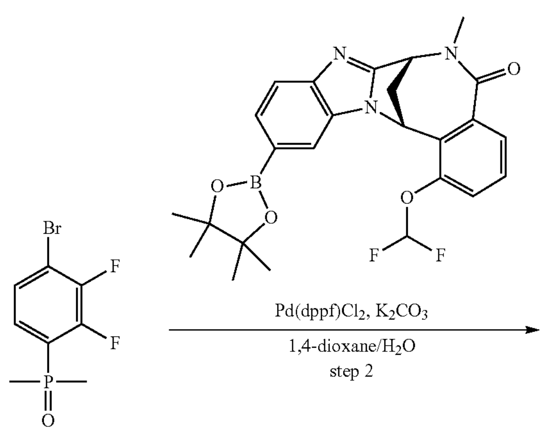

-continued

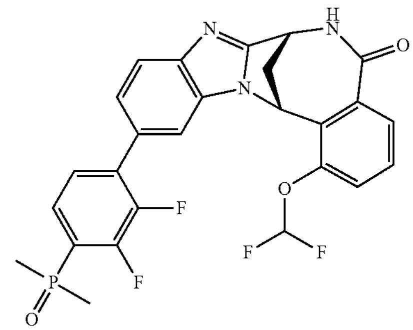

To a stirred solution of (1R,11R)-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3,5,7,9,14,16,18-heptaen-13-one (50 mg, 0.107 mmol) and 1-bromo-4-(dimethylphosphoryl)-2,3-difluorobenzene (43 mg, 0.161 mmol) in 1,4-dioxane (1 mL) and $H_2O$ (0.2 mL) were added $K_2CO_3$ (37 mg, 0.268 mmol) and Pd(dppf) $Cl_2{\cdot}CH_2Cl_2$ (9 mg, 0.011 mmol) at room temperature under nitrogen atmosphere. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (15/1) followed by reversed-phase flash chromatography with the following conditions: column, C18 silica gel; mobile phase, $CH_3CN$ in water (10 mmol/L $NH_4HCO_3$), 25% to 40% gradient in 30 min; detector, 254 nm. This resulted in (1R,11R)-18-(difluoromethoxy)-5-[4-(dimethylphosphoryl)-2,3-difluorophenyl]-2,9,12-triazapentacyclo[9.8.1.0^{2,10}.0^{3,8}.0^{14,19}]icosa-3(8),4,6,9,14(19),15,17-heptaen-13-one (17 mg, 30%) as a white solid. MS ESI calculated for $C_{26}H_{20}F_4N_3O_3P$ $[M+H]^+$, 530.12, found 529.95. $^1H$ NMR (400 MHz, Chloroform-d) δ 8.47-8.41 (m, 1H), 7.87-7.70 (m, 3H), 7.50-7.34 (m, 4H), 7.29 (d, J=6.2 Hz, 1H), 6.84 (t, J=72.6 Hz, 1H), 6.41 (d, J=7.1 Hz, 1H), 5.06 (t, J=6.4 Hz, 1H), 3.58-3.45 (m, 1H), 2.90 (d, J=13.3 Hz, 1H), 1.89 (s, 3H), 1.86 (s, 3H). $^{19}F$ NMR (377 MHz, Chloroform-d) δ −80.28, −80.73, −81.05, −81.49, −131.17, −131.18, −131.23, −131.24, −143.47, −143.49, −143.53, −143.55. $^{31}P$ NMR (162 MHz, Chloroform-d) δ 29.81.

Example 35: (1R,11R)-18-(difluoromethoxy)-5-[4-(dimethylphosphoryl)-3,5-difluorophenyl]-2,9,12-triazapentacyclo[9.8.1.0^{2,10}.0^{3,8}.0^{14,19}]icosa-3(8),4,6,9,14(19),15,17-heptaen-13-one

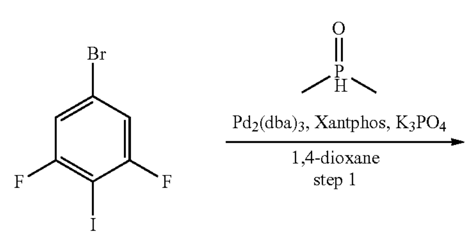

-continued

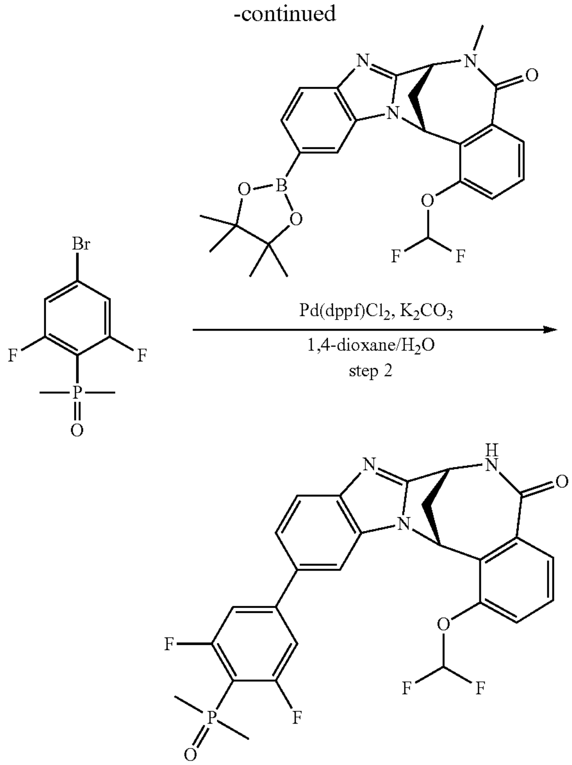

Preparation 35A: 5-bromo-2-(dimethylphosphoryl)-1,3-difluorobenzene

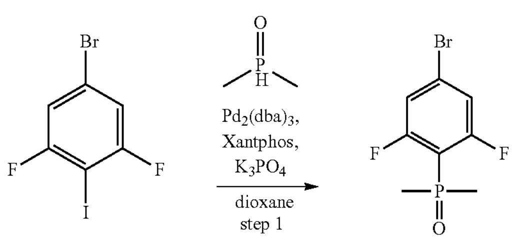

To a stirred mixture of (methylphosphonoyl)methane (0.27 g, 3.450 mmol) and 5-bromo-1,3-difluoro-2-iodobenzene (1.00 g, 3.136 mmol) in 1,4-dioxane (10 mL) were added $K_3PO_4$ (0.80 g, 3.763 mmol), XantPhos (0.18 g, 0.314 mmol) and $Pd_2(dba)_3$ (0.14 g, 0.157 mmol) at room temperature under nitrogen atmosphere. The resulting mixture was stirred for 16 h at 60° C. under nitrogen atmosphere. The reaction was quenched with sat. $NaHCO_3$ (aq.) at room temperature. The aqueous layer was extracted with $CH_2Cl_2$ (3×50 mL). The combined organic layers were washed with brine (2×50 mL), dried over anhydrous $Na_2SO_4$. After filtration, the filtrate was concentrated under reduced pressure. The residue was purified by silica gel column chromatography, eluted with $CH_2Cl_2$/MeOH (20/1) to afford 5-bromo-2-(dimethylphosphoryl)-1,3-difluorobenzene (170 mg, 20%) as a brown yellow solid. MS ESI calculated for $C_8H_8BrF_2OP$ $[M+H]^+$, 268.95 270.94, found 268.80 270.80. $^1$H NMR (400 MHz, Chloroform-d) δ 7.23-7.14 (m, 2H), 1.93 (t, J=1.8 Hz, 3H), 1.89 (t, J=1.8 Hz, 3H). $^{31}$P NMR (162 MHz, Chloroform-d) δ 30.03.

Example 35: (1R,11R)-18-(difluoromethoxy)-5-[4-(dimethylphosphoryl)-3,5-difluorophenyl]-2,9,12-triazapentacyclo[9.8.1.0^{2,10}.0^{3,8}.0^{14,19}]icosa-3(8),4,6,9,14(19),15,17-heptaen-13-one

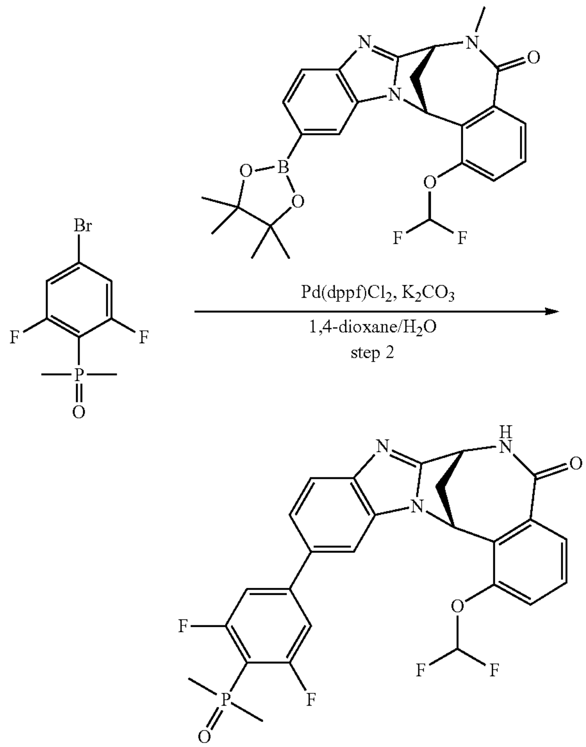

To a stirred solution of (1R,11R)-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3,5,7,9,14,16,18-heptaen-13-one (50 mg, 0.107 mmol) and 5-bromo-2-(dimethylphosphoryl)-1,3-difluorobenzene (43 mg, 0.161 mmol) in 1,4-dioxane (1 mL) and $H_2O$ (0.2 mL) were added $K_2CO_3$ (37 mg, 0.268 mmol) and Pd(dppf)$Cl_2$·$CH_2Cl_2$ (9 mg, 0.011 mmol) at room temperature under nitrogen atmosphere. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (15/1) to followed by reversed-phase flash chromatography with the following conditions: column, C18 silica gel; mobile phase, $CH_3CN$ in water (10 mmol/L $NH_4HCO_3$), 25% to 40% gradient in 30 min; detector, 254 nm. This resulted in (1R,11R)-18-(difluoromethoxy)-5-[4-(dimethylphosphoryl)-3,5-difluorophenyl]-2,9,12-triazapentacyclo[9.8.1.0^{2,10}.0^{3,8}.0^{14,19}]icosa-3(8),4,6,9,14(19),15,17-heptaen-13-one (17 mg, 30%) as a white solid. MS ESI calculated for $C_{26}H_{20}F_4N_3O_3P$ $[M+H]^+$, 530.12, found 529.95. $^1$H NMR (400 MHz, Chloroform-d) δ 8.46-8.42 (m, 1H), 7.83 (d, J=8.5 Hz, 1H), 7.69 (d, J=1.8 Hz, 1H), 7.49-7.43 (m, 2H), 7.42-7.35 (m, 2H), 7.22-7.15 (m, 2H), 6.89 (t, J=72.8 Hz, 1H), 6.41 (d, J=7.1 Hz, 1H), 5.04 (t, J=6.6 Hz, 1H), 3.59-3.47 (m, 1H), 2.90 (d, J=13.4 Hz, 1H), 1.98 (s, 3H), 1.94 (s, 3H). $^{19}$F NMR (377 MHz, Chloroform-d) δ −80.45, −80.90, −81.03, −81.48, −101.77. $^{31}$P NMR (162 MHz, Chloroform-d) δ 30.76.

Example 36: (1R,11R)-18-(difluoromethoxy)-5-[4-(dimethylphosphoryl)-2,3-difluorophenyl]-12-methyl-2,9,12-triazapentacyclo[9.8.1.0^{2,10}.0^{3,8}.0^{14,19}]icosa-3(8),4,6,9,14(19),15,17-heptaen-13-one

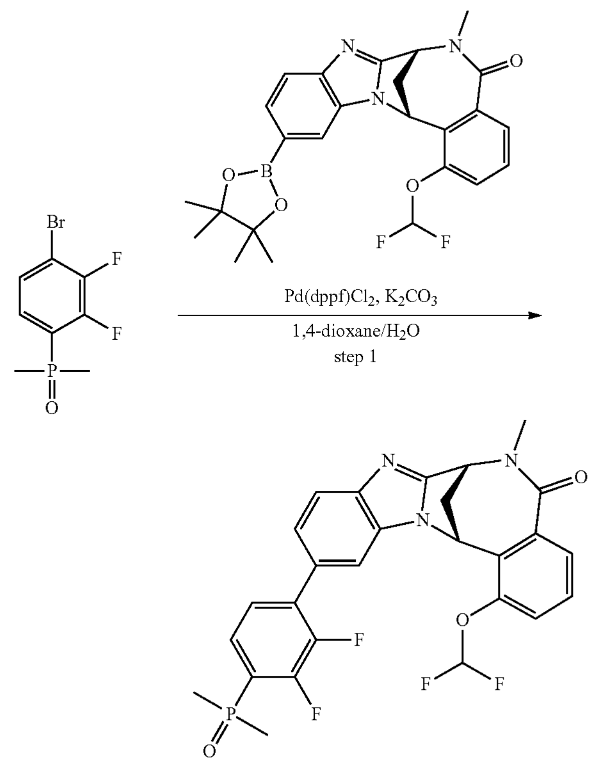

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3,5,7,9,14,16,18-heptaen-13-one (50 mg, 0.104 mmol) and 1-bromo-4-(dimethylphosphoryl)-2,3-difluorobenzene (42 mg, 0.156 mmol) in 1,4-dioxane (1 mL) and $H_2O$ (0.2 mL) were added $K_2CO_3$ (36 mg, 0.260 mmol) and $Pd(dppf)Cl_2 \cdot CH_2Cl_2$ (9 mg, 0.010 mmol) at room temperature under nitrogen atmosphere. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (15/1) followed by reversed-phase flash chromatography with the following conditions: column, C18 silica gel; mobile phase, $CH_3CN$ in water (10 mmol/L $NH_4HCO_3$), 25% to 40% gradient in 30 min; detector, 254 nm. This resulted in (1R,11R)-18-(difluoromethoxy)-5-[4-(dimethylphosphoryl)-2,3-difluorophenyl]-12-methyl-2,9,12-triazapentacyclo[9.8.1.0^{2,10}.0^{3,8}.0^{14,19}]icosa-3(8),4,6,9,14(19),15,17-heptaen-13-one (17 mg, 31%) as a white solid. MS ESI calculated for $C_{27}H_{22}F_4N_3O_3P$ $[M+H]^+$, 544.13, found 544.00. $^{1}$H NMR (400 MHz, Chloroform-d) δ 8.53-8.47 (m, 1H), 7.86-7.71 (m, 3H), 7.50-7.36 (m, 3H), 7.34-7.29 (m, 1H), 6.82 (t, J=72.8 Hz, 1H), 6.31 (d, J=7.1 Hz, 1H), 5.03 (d, J=7.0 Hz, 1H), 3.54 (s, 3H), 3.53-3.44 (m, 1H), 2.91 (d, J=13.5 Hz, 1H), 1.89 (s, 3H), 1.85 (s, 3H). $^{19}$F NMR (377 MHz, Chloroform-d) δ −80.11, −80.56, −81.01, −81.45, −131.22, −131.23, −131.28, −131.29, −143.47, −143.48, −143.53, −143.54. $^{31}$P NMR (162 MHz, Chloroform-d) δ 29.83.

Example 37: (1R,11R)-18-(difluoromethoxy)-5-[4-(dimethylphosphoryl)-3,5-difluorophenyl]-12-methyl-2,9,12-triazapentacyclo[9.8.1.0^{2,10}.0^{3,8}.0^{14,19}]icosa-3(8),4,6,9,14(19),15,17-heptaen-13-one

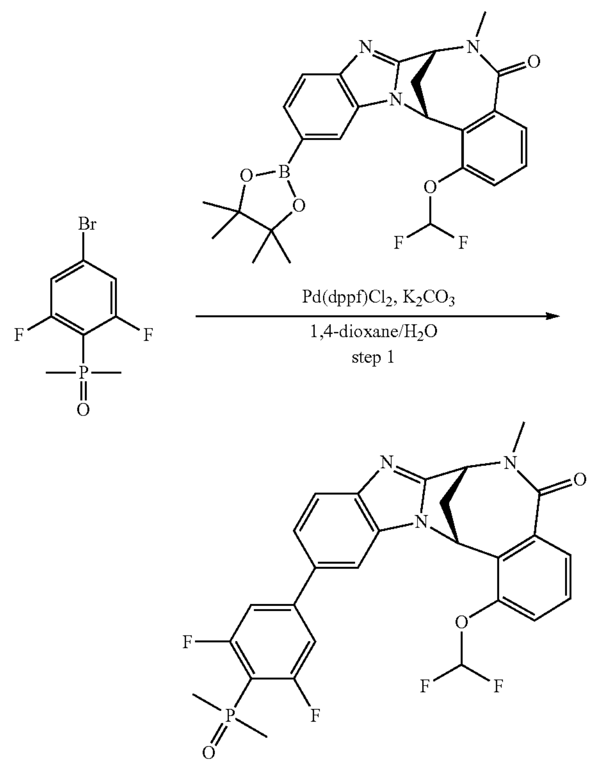

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3,5,7,9,14,16,18-heptaen-13-one (50 mg, 0.104 mmol) and 5-bromo-2-(dimethylphosphoryl)-1,3-difluorobenzene (42 mg, 0.156 mmol) in 1,4-dioxane (1 mL) and $H_2O$ (0.2 mL) were added $K_2CO_3$ (36 mg, 0.260 mmol) and $Pd(dppf)Cl_2 \cdot CH_2Cl_2$ (8 mg, 0.010 mmol) at room temperature under nitrogen atmosphere. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (15/1) followed by reversed-phase flash chromatography with the following conditions: column, C18 silica gel; mobile phase, $CH_3CN$ in water (10 mmol/L $NH_4HCO_3$), 25% to 40% gradient in 30 min; detector, 254 nm. This resulted in (1R,11R)-18-(difluoromethoxy)-5-[4-(dimethylphosphoryl)-3,5-difluorophenyl]-12-methyl-2,9,12-triazapentacyclo[9.8.1.0^{2,10}.0^{3,8}.0^{14,19}]icosa-3(8),4,6,9,14(19),15,17-heptaen-13-one (22 mg, 39%) as a white solid. MS ESI calculated for $C_{27}H_{22}F_4N_3O_3P$ $[M+H]^+$, 544.13, found 544.05. $^{1}$H NMR (400 MHz, Chloroform-d) δ 8.52-8.47 (m, 1H), 7.82 (d, J=8.5 Hz, 11H), 7.73 (d, J=1.7 Hz, 1H), 7.52-7.41 (m, 2H), 7.36-7.30 (m, 1H), 7.24-7.16 (m, 2H), 6.88 (t, J=72.9 Hz, 1H), 6.32 (d, J=7.1 Hz, 1H), 5.06 (d, J=7.0 Hz, 1H), 3.55 (s, 3H), 3.54-3.45 (m, 1H), 2.92 (d, J=13.6 Hz, 1H), 1.98 (s, 3H), 1.94 (s, 3H). $^{19}$F NMR (377 MHz, Chloroform-d) δ −80.38, −80.83, −80.91, −81.36, −101.70. $^{31}$P NMR (162 MHz, Chloroform-d) δ 30.80.

Example 38: (1R,11R)-18-(difluoromethoxy)-5-{4-[(dimethylphosphoryl)methoxy]phenyl}-12-methyl-2,9,12-triazapentacyclo[9.8.1.0^{2,10}.0^{3,8}.0^{14,19}]icosa-3(8),4,6,9,14(19),15,17-heptaen-13-one

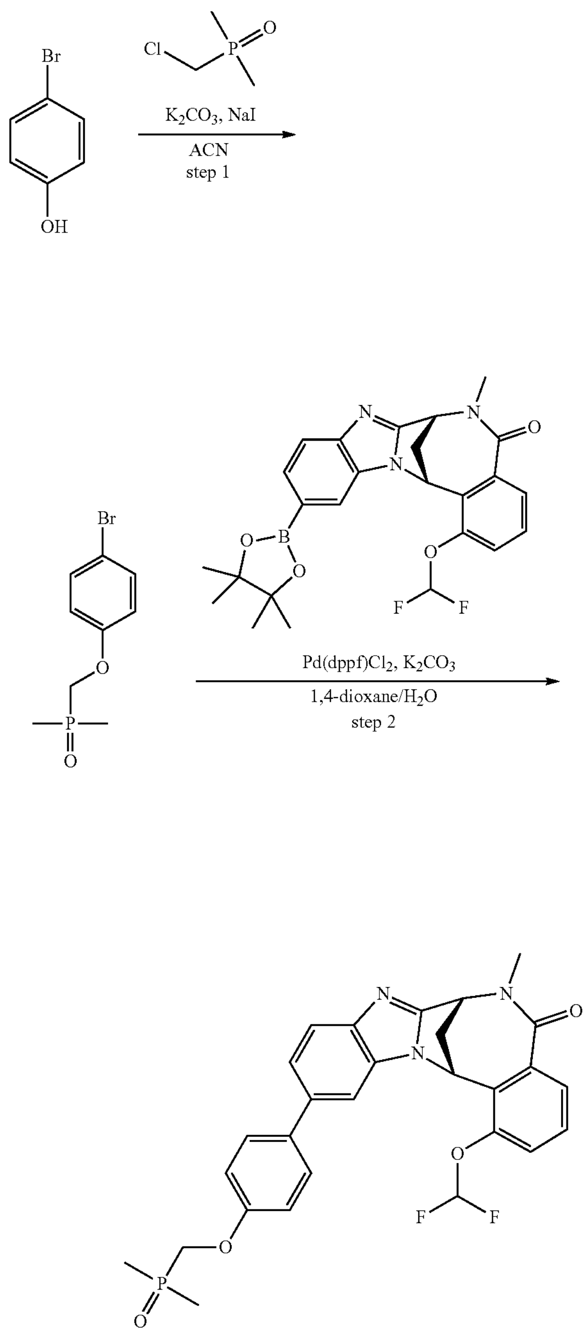

Preparation 38A: 1-bromo-4-[(dimethylphosphoryl)methoxy]benzene

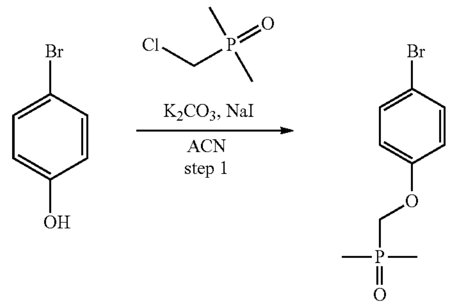

A solution of 4-bromophenol (200 mg, 1.156 mmol) in MeCN (4 mL) was treated with $K_2CO_3$ (367 mg, 3.468 mmol) and NaI (17 mg, 0.116 mmol) for 10 min at room temperature followed by the addition of chloro(dimethylphosphoryl)methane (146 mg, 1.156 mmol) dropwise at room temperature. The resulting mixture was stirred for 48 h at 80° C. The resulting mixture was concentrated under reduced pressure. The residue was purified by silica gel column chromatography, eluted with $CH_2Cl_2$/MeOH (12:1) to afford 1-bromo-4-[(dimethylphosphoryl)methoxy]benzene (190 mg, 62.48%) as an off-white solid. MS ESI calculated for $C_9H_{12}BrO_2P$ $[M+H]^+$, 262.98 264.98, found 262.80 264.80. $^1$H NMR (400 MHz, Chloroform-d) δ 7.46-7.38 (m, 2H), 6.87-6.78 (m, 2H), 4.21 (d, J=8.3 Hz, 2H), 1.68 (s, 3H), 1.64 (s, 3H). $^{31}$P NMR (162 MHz, Chloroform-d) δ 42.12.

Example 38: (1R,11R)-18-(difluoromethoxy)-5-{4-[(dimethylphosphoryl)methoxy]phenyl}-12-methyl-2,9,12-triazapentacyclo[9.8.1.0^{2,10}.0^{3,8}.0^{14,19}]icosa-3(8),4,6,9,14(19),15,17-heptaen-13-one

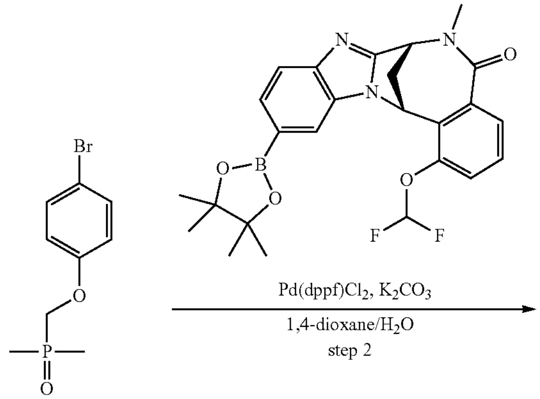

-continued

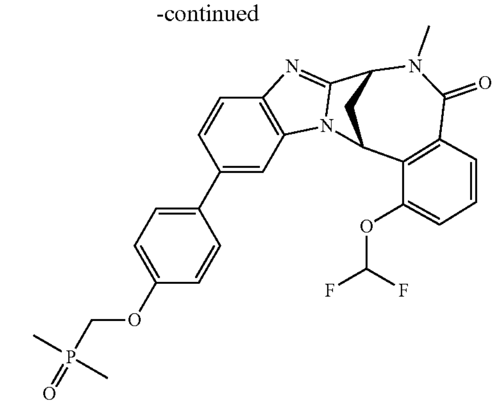

To a stirred solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3,5,7,9,14,16,18-heptaen-13-one (50 mg, 0.104 mmol) and 1-bromo-4-[(dimethylphosphoryl)methoxy]benzene (41 mg, 0.156 mmol) in 1,4-dioxane (1 mL) and $H_2O$ (0.2 mL) were added $K_2CO_3$ (36 mg, 0.260 mmol) and $Pd(dppf)Cl_2 \cdot CH_2Cl_2$ (9 mg, 0.010 mmol) at room temperature under nitrogen atmosphere. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (15/1) followed by reversed-phase flash chromatography with the following conditions: column, C18 silica gel; mobile phase, $CH_3CN$ in water (10 mmol/L $NH_4HCO_3$), 25% to 40% gradient in 30 min; detector, 254 nm. This resulted in (1R,11R)-18-(difluoromethoxy)-5-{4-[(dimethylphosphoryl)methoxy]phenyl}-12-methyl-2,9,12-triazapentacyclo[9.8.1.0^{2,10}.0^{3,8}.0^{14,19}]icosa-3(8),4,6,9,14(19),15,17-heptaen-13-one (20 mg, 35%) as a white solid. MS ESI calculated for $C_{28}H_{26}F_2N_3O_4P$ $[M+H]^+$, 538.16, found 538.05. $^1H$ NMR (400 MHz, Chloroform-d) δ 8.52-8.47 (m, 1H), 7.77 (d, J=8.5 Hz, 1H), 7.66 (d, J=1.7 Hz, 1H), 7.59-7.52 (m, 2H), 7.48-7.39 (m, 2H), 7.30 (d, J=8.3 Hz, 1H), 7.08-6.99 (m, 2H), 6.74 (t, J=72.9 Hz, 1H), 6.30 (d, J=7.1 Hz, 1H), 5.02 (d, J=7.0 Hz, 1H), 4.30 (d, J=8.3 Hz, 2H), 3.54 (s, 3H), 3.52-3.41 (m, 1H), 2.89 (d, J=13.5 Hz, 1H), 1.70 (s, 3H), 1.67 (s, 3H). $^{19}F$ NMR (377 MHz, Chloroform-d) δ −80.14, −80.59, −80.67, −81.12. $^{31}P$ NMR (162 MHz, Chloroform-d) δ 42.08.

Example 39: (1R,11R)-18-(difluoromethoxy)-5-{6-[2-(dimethylphosphoryl)ethoxy]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one

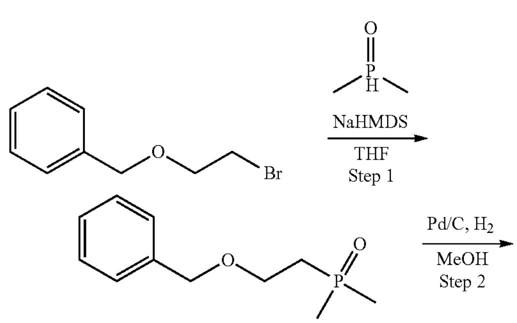

-continued

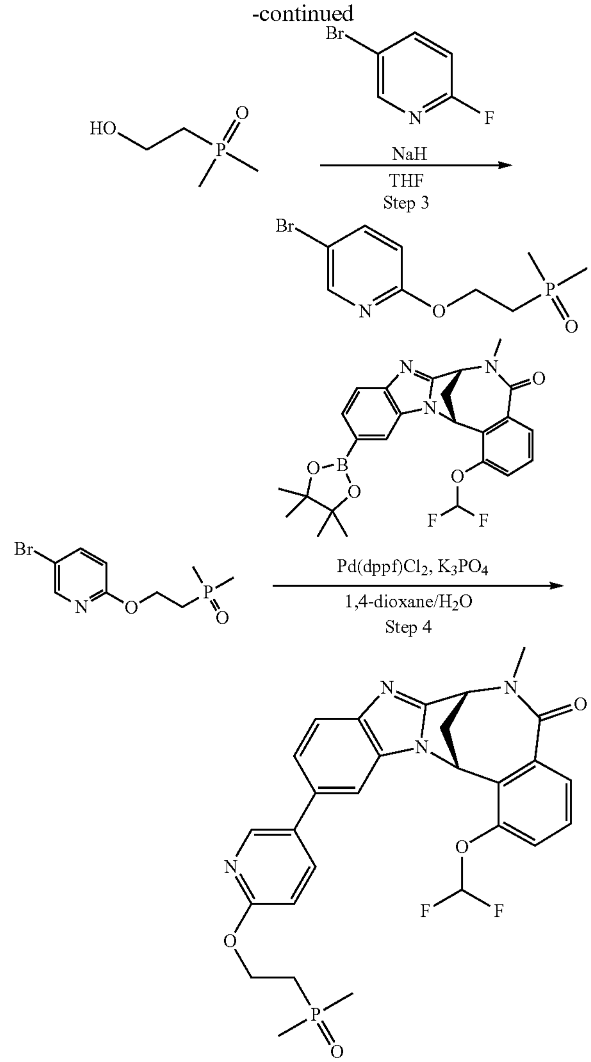

Preparation 39A: {[2-(dimethylphosphoryl)ethoxy]methyl}benzene

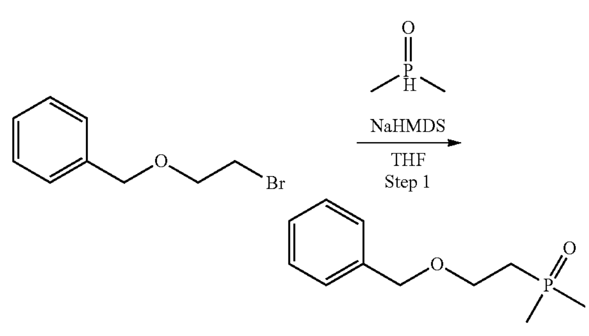

To a stirred solution of (methylphosphonoyl)methane (1.81 g, 23.246 mmol) in THF (20 mL) was added NaHMDS (11.62 mL, 23.246 mmol, 2N in THF) dropwise at 0° C. under nitrogen atmosphere. The resulting mixture was stirred for 15 min at room temperature under nitrogen atmosphere. A solution of [(2-bromoethoxy)methyl]benzene (5.00 g, 23.246 mmol) in THF (30 mL) was added above solution dropwise at room temperature under nitrogen atmosphere. The resulting mixture was stirred for overnight at room temperature under nitrogen atmosphere. The reaction was quenched with water at room temperature. The resulting mixture was extracted with $CH_2Cl_2$ (3×100 mL). The combined organic layers were washed with brine (1×200 mL), dried over anhydrous $Na_2SO_4$. After filtration, the filtrate was concentrated under reduced pressure. The residue was purified by silica gel column chromatography, eluted with $CH_2Cl_2$/MeOH (7/1) to afford {[2-(dimethylphosphoryl) ethoxy]methyl}benzene (3.44 g, 69%) as a colorless liquid. $^1H$ NMR (400 MHz, Chloroform-d) δ 7.38-7.28 (m, 5H), 4.53 (s, 2H), 3.87-3.79 (m, 2H), 2.09 (t, J=6.2 Hz, 2H), 1.55 (s, 3H), 1.52 (s, 3H).

Preparation 39B: 2-(dimethylphosphoryl)ethanol

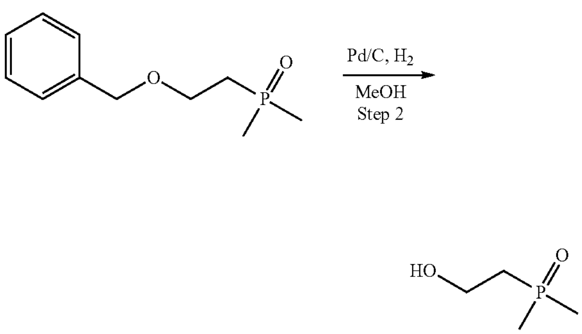

To a solution of {[2-(dimethylphosphoryl)ethoxy] methyl}benzene (3.44 g, 16.209 mmol) in 30 mL MeOH was added Pd/C (10%, 300 mg) under nitrogen atmosphere in a 100 mL round-bottom flask. The mixture was hydrogenated at room temperature for overnight under hydrogen atmosphere using a hydrogen balloon, filtered through a celite pad and concentrated under reduced pressure to afford 2-(dimethylphosphoryl)ethanol (1.95 g, 98%) as a colorless oil. $^1H$ NMR (400 MHz, Chloroform-d) δ 4.76 (s, 1H), 4.09-4.01 (m, 2H), 2.05-1.99 (m, 2H), 1.59 (s, 3H), 1.56 (s, 3H).

Preparation 39C: 5-bromo-2-[2-(dimethylphosphoryl)ethoxy]pyridine

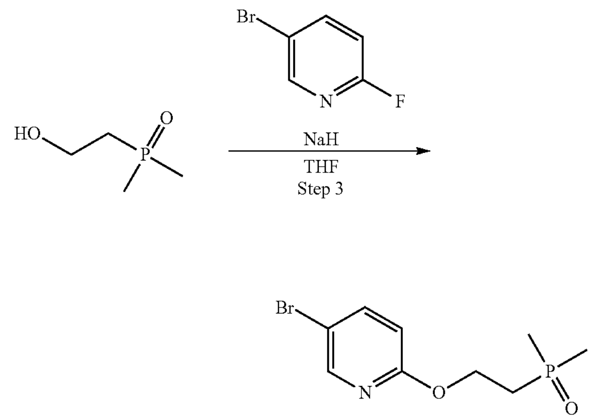

To a stirred solution of 2-(dimethylphosphoryl)ethanol (300 mg, 2.457 mmol) in THF (3 mL) was added NaH (117 mg, 2.948 mmol, 60%) at 0° C. The resulting mixture was stirred for 15 min at room temperature. To the above mixture was added 5-bromo-2-fluoropyridine (432 mg, 2.457 mmol) dropwise at 0° C. The resulting mixture was stirred for additional 2 h at room temperature. The reaction was quenched with water at 0° C. The resulting mixture was extracted with EtOAc (3×20 mL). The combined organic layers were washed with water (2×10 mL), dried over anhydrous $Na_2SO_4$. After filtration, the filtrate was concentrated under reduced pressure. The residue was purified by silica gel column chromatography, eluted with $CH_2Cl_2$/MeOH (8/1) to afford 5-bromo-2-[2-(dimethylphosphoryl) ethoxy]pyridine (187 mg, 27%) as a colorless oil. MS ESI calculated for $C_9H_{13}BrNO_2P$ $[M+H]^+$, 277.99 279.99, found 278.00 279.00. $^1H$ NMR (300 MHz, Chloroform-d) δ 8.21 (d, J=2.4 Hz, 1H), 7.70-7.66 (m, 1H), 6.67 (d, J=8.8 Hz, 1H), 4.71-4.61 (m, 2H), 2.38-2.27 (m, 2H), 1.64 (s, 3H), 1.59 (s, 3H).

Example 39: (1R,11R)-18-(difluoromethoxy)-5-{6-[2-(dimethylphosphoryl)ethoxy]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one

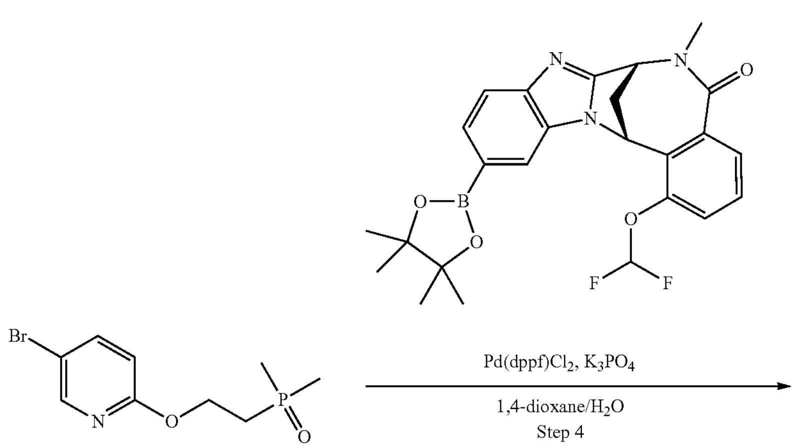

-continued

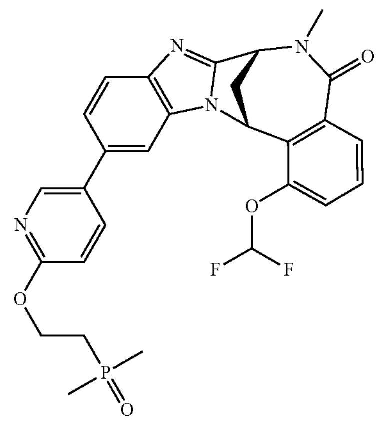

A mixture of 5-bromo-2-[2-(dimethylphosphoryl)ethoxy] pyridine (31 mg, 0.114 mmol), (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.104 mmol), Pd(dppf)$Cl_2$·$CH_2Cl_2$ (8 mg, 0.010 mmol) and $K_3PO_4$ (66 mg, 0.312 mmol) in 1,4-dioxane (1 mL) and $H_2O$ (0.2 mL) was stirred for 2 h at 100° C. under nitrogen atmosphere. The mixture was allowed to cool down to room temperature. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (10 mmol/L $NH_4HCO_3$), Mobile Phase B: $CH_3CN$; Flow rate: 60 mL/min; Gradient: 30% B to 70% B in 20 min; 254/220 nm to afford (1R,11R)-18-(difluoromethoxy)-5-{6-[2-(dimethylphosphoryl)ethoxy]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one (24 mg, 42%) as a white solid. MS ESI calculated for $C_{28}H_{27}F_2N_4O_4P$ $[M+H]^+$, 553.17, found 553.20. $^1H$ NMR (400 MHz, Chloroform-d) δ 8.50 (d, J=8.2 Hz, 1H), 8.36 (d, J=2.2 Hz, 1H), 7.83-7.76 (m, 2H), 7.65-7.61 (m, 1H), 7.42 (t, J=8.2 Hz, 2H), 7.31 (d, J=7.9 Hz, 1H), 7.04-6.65 (m, 2H), 6.29 (d, J=7.1 Hz, 1H), 5.00 (d, J=7.0 Hz, 1H), 4.77-4.67 (m, 2H), 3.54 (s, 3H), 3.51-3.44 (m, 1H), 2.89 (d, J=13.6 Hz, 1H), 2.37-2.30 (m, 2H), 1.63 (s, 3H), 1.60 (s, 3H); $^{19}F$ NMR (377 MHz, Chloroform-d) δ −80.18, −80.63, −80.74, −81.19. $^{31}P$ NMR (162 MHz, Chloroform-d) δ 40.68.

Example 40: (1R,11R)-18-(difluoromethoxy)-5-{6-[3-(dimethylphosphoryl)propoxy]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one

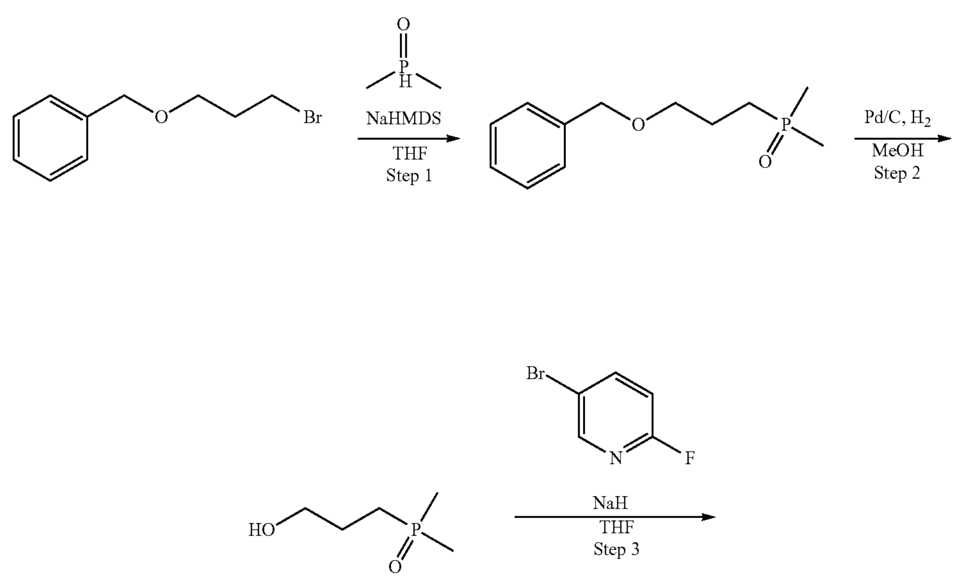

-continued

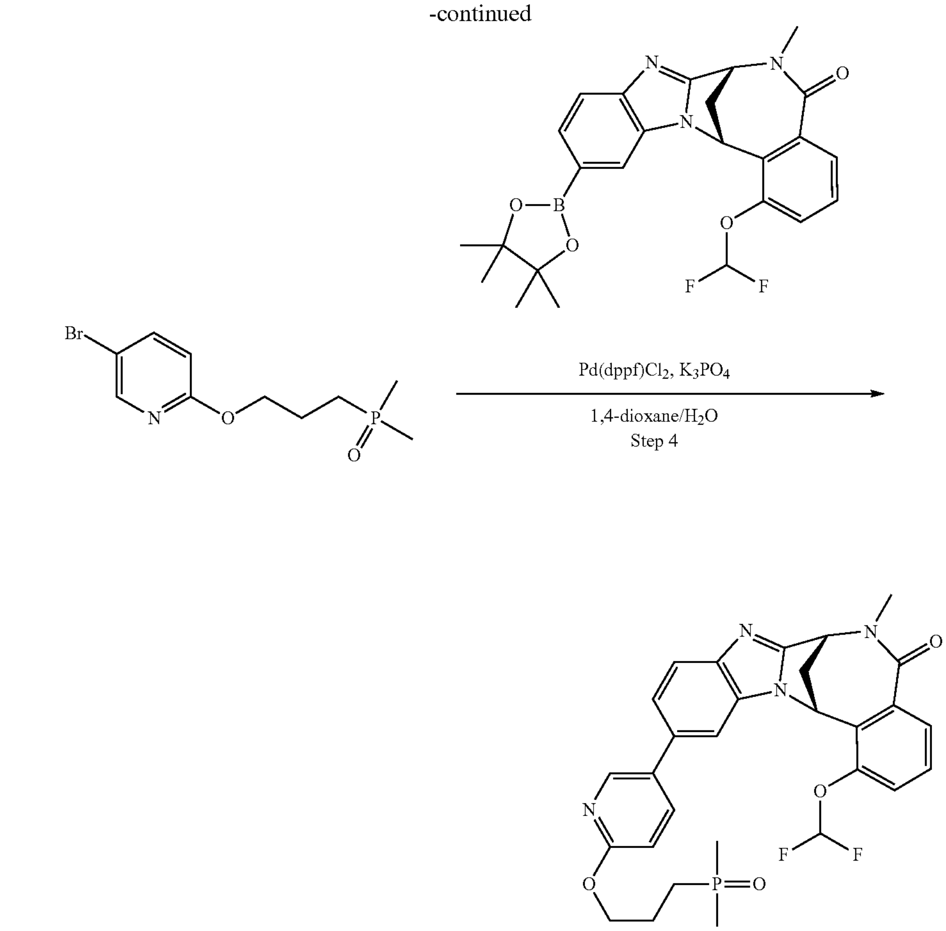

Preparation 40A: {[3-(dimethylphosphoryl)propoxy]methyl}benzene

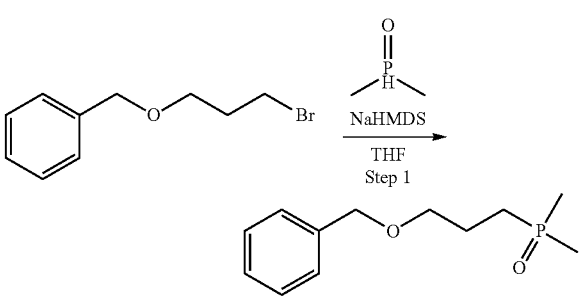

To a stirred solution of (methylphosphonoyl)methane (0.68 g, 8.729 mmol) in THF (30 mL) was added NaHMDS (4.36 mL, 8.729 mmol, 2N in THF) dropwise at about 0° C. under nitrogen atmosphere. The mixture was stirred for <15 min. The above mixture was added to [(3-bromopropoxy) methyl]benzene (2.00 g, 8.729 mmol) in THF (30 mL) dropwise over 2 min at room temperature. The resulting mixture was stirred for additional 16 h at room temperature. The resulting mixture was concentrated under reduced pressure. The residue was purified by silica gel column chromatography, eluted with $CH_2Cl_2$/MeOH (10/1) to afford [(3-(dimethyl phosphoryl)propoxy]methyl)benzene (1.20 g, 60%) as a colorless oil. MS ESI calculated for $C_{12}H_{19}O_2P$ $[M+H]^+$, 227.11, found 226.95. $^1H$ NMR (400 MHz, Chloroform-d) δ 7.38-7.28 (m, 5H), 4.51 (s, 2H), 3.56 (t, J=5.8 Hz, 2H), 1.98-1.79 (m, 4H), 1.50 (s, 3H), 1.47 (s, 3H).

Preparation 40B: 3-(dimethylphosphoryl)propan-1-ol

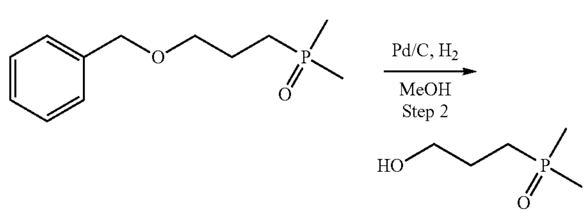

To a solution of {[3-(dimethylphosphoryl)propoxy]methyl}benzene (1.80 g, 7.956 mmol) in MeOH (20 mL) was added Pd/C (0.42 g, 0.398 mmol, 10%) under nitrogen atmosphere. The mixture was hydrogenated at room temperature for overnight under hydrogen atmosphere using a hydrogen balloon, filtered through a celite pad and concentrated under reduced pressure. This resulted in 3-(dimethylphosphoryl)propan-1-ol (1.00 g, 92%) as a colorless oil. $^1H$ NMR (400 MHz, Chloroform-d) δ 3.72 (t, J=5.3 Hz, 2H), 1.96-1.83 (m, 4H), 1.55 (s, 3H), 1.52 (s, 3H).

Preparation 40C: 5-bromo-2-[3-(dimethylphosphoryl)propoxy]pyridine

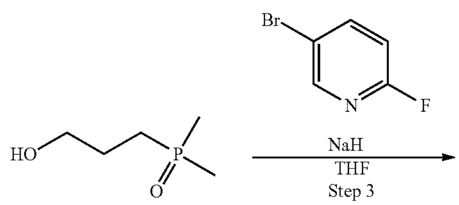

-continued

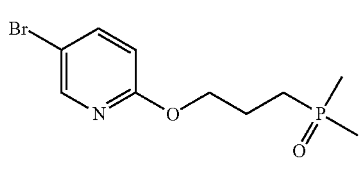

To a solution of 3-(dimethylphosphoryl)propan-1-ol (300 mg, 2.204 mmol) in DMF (10 mL) was added NaH (105 mg, 2.645 mmol, 60%) at 0 degrees C. The mixture was stirred for 15 min. 5-bromo-2-fluoropyridine (388 mg, 2.204 mmol) was added and the mixture was allowed to warm to room temperature and stirred for 2 h. The reaction mixture was quenched by water and purified by reversed-phase flash chromatography with the following conditions: column, C18 silica gel; mobile phase, $CH_3CN$ in water (10 mmol/L $NH_4HCO_3$), 10% to 50% gradient in 20 min; detector, 254 nm. This resulted in 5-bromo-2-[3-(dimethylphosphoryl)propoxy]pyridine (380 mg, 59%) as a colorless oil. MS ESI calculated for $C_{10}H_{15}BrNO_2P$ $[M+H]^+$, 292.00 294.00 found 291.80 293.80. $^1H$ NMR (400 MHz, Chloroform-d) δ 8.17 (d, J=2.3 Hz, 1H), 7.66-7.63 (m, 1H), 6.65 (d, J=8.8 Hz, 1H), 4.35 (t, J=6.2 Hz, 2H), 2.15-2.05 (m, 2H), 1.92-1.85 (m, 2H), 1.54 (s, 3H), 1.51 (s, 3H).

Example 40: (1R,11R)-18-(difluoromethoxy)-5-{6-[3-(dimethylphosphoryl)propoxy]pyridin-3-yl}-12-methyl-2,9,12-triazapentacyclo[9.8.1.0^{2,10}.0^{3,8}.0^{14,19}]icosa-3(8),4,6,9,14(19),15,17-heptaen-13-one

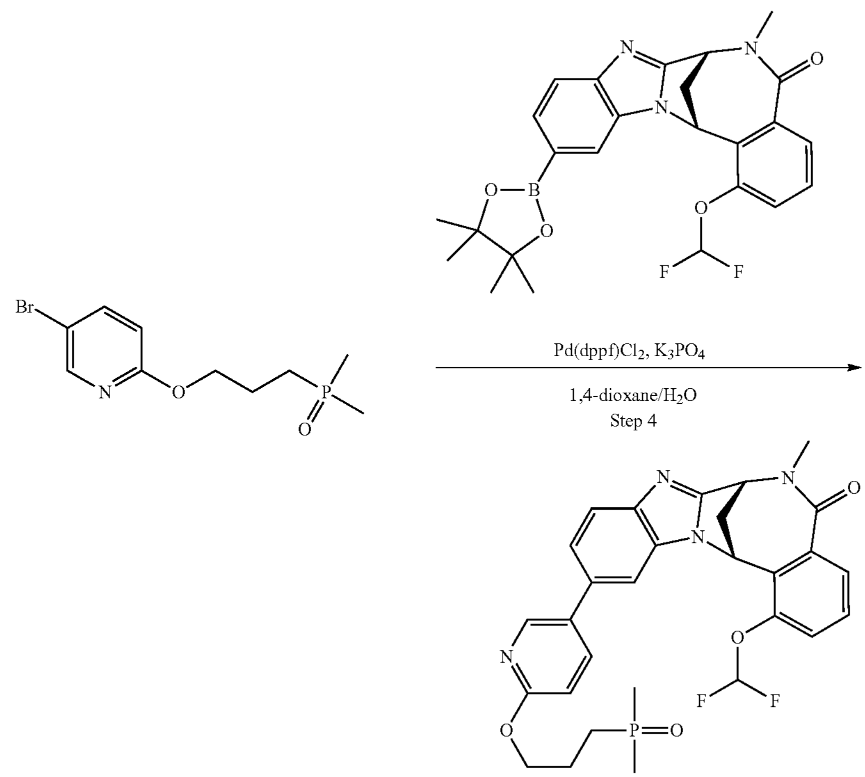

A mixture of 5-bromo-2-[3-(dimethylphosphoryl)propoxy]pyridine (33 mg, 0.114 mmol), (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.104 mmol), $Pd(dppf)Cl_2{\cdot}CH_2Cl_2$ (8 mg, 0.010 mmol) and $K_3PO_4$ (66 mg, 0.312 mmol) in 1,4-dioxane (1 mL) and $H_2O$ (0.2 mL) was stirred for 2 h at 100° C. under nitrogen atmosphere. The mixture was allowed to cool down to room temperature. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (10 mmol/L $NH_4HCO_3$), Mobile Phase B: $CH_3CN$; Flow rate: 60 mL/min; Gradient: 30% B to 70% B in 20 min; 254/220 nm to afford (1R,11R)-18-(difluoromethoxy)-5-{6-[3-(dimethylphosphoryl)propoxy]pyridin-3-yl}-12-methyl-2,9,12-triazapentacyclo[9.8.1.0^{2, 10}.0^{3,8}.0^{14,19}]icosa-3(8),4,6,9,14(19),15,17-heptaen-13-one (20 mg, 34%) as a white solid. MS ESI calculated for $C_{29}H_{29}F_2N_4O_4P$ $[M+H]^+$, 567.19, found 567.20. $^1H$ NMR (400 MHz, Chloroform-d) δ 8.53-8.47 (m, 1H), 8.35 (d, J=2.3 Hz, 1H), 7.81-7.78 (m, 2H), 7.66-7.62 (m, 1H), 7.45-7.41 (m, 2H), 7.31 (d, J=7.9 Hz, 1H), 7.04-6.64 (m, 2H), 6.31 (d, J=7.1 Hz, 1H), 5.04 (d, J=7.1 Hz, 1H), 4.44 (t, J=6.1 Hz, 2H), 3.55 (s, 3H), 3.53-3.45 (m, 1H), 2.91 (d, J=13.5 Hz, 1H), 2.19-2.10 (m, 2H), 1.96-1.90 (m, 2H), 1.55 (s, 3H), 1.52 (s, 3H); $^{19}F$ NMR (377 MHz, Chloroform-d) δ −80.20, −80.64, −80.77, −81.21. $^{31}P$ NMR (162 MHz, Chloroform-d) δ 42.25.

Example 41: (1R,11R)-5-[2-chloro-4-(dimethylphosphoryl)phenyl]-18-(difluoromethoxy)-2,9,12-triazapentacyclo[9.8.1.0^{2,10}.0^{3,8}.0^{14,19}]icosa-3(8),4,6,9,14(19),15,17-heptaen-13-one

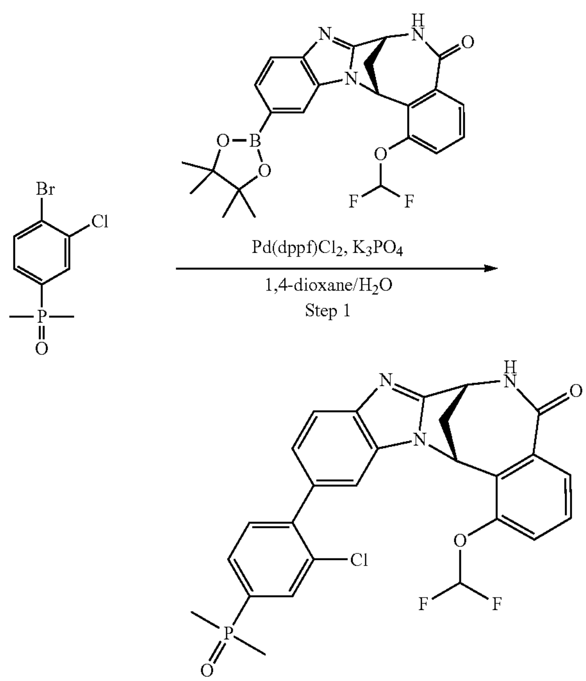

To a solution of 1-bromo-2-chloro-4-(dimethylphosphoryl)benzene (31 mg, 0.118 mmol) and (1R,11R)-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.107 mmol) in 1,4-dioxane (0.5 mL) and $H_2O$ (0.1 mL) were added $K_3PO_4$ (68 mg, 0.321 mmol) and Pd(dppf)$Cl_2$·$CH_2Cl_2$ (9 mg, 0.011 mmol). After stirring for 1 h at 100° C. under a nitrogen atmosphere, the resulting mixture was concentrated under reduced pressure. The resulting mixture was filtered, and the filter cake was washed with MeOH (3×4 mL). The filtrate was concentrated under reduced pressure. The residue was purified by reversed-phase flash chromatography with the following conditions: column, C18 silica gel; mobile phase, $CH_3CN$ in water (10 mmol/L $NH_4HCO_3$), 20% to 60% gradient in 30 min; detector, 254 nm. This resulted in (1R,11R)-5-[2-chloro-4-(dimethylphosphoryl)phenyl]-18-(difluoromethoxy)-2,9,12-triazapentacyclo[9.8.1.0^{2,10}.0^{3,8}.0^{14,19}]icosa-3(8),4,6,9,14(19),15,17-heptaen-13-one (23 mg, 41%) as a white solid. MS ESI calculated for $C_{26}H_{21}ClF_2N_3O_3P$ $[M+H]^+$, 528.10, found 527.95. $^1H$ NMR (400 MHz, Chloroform-d) δ 8.47-8.41 (m, 1H), 7.89-7.78 (m, 2H), 7.72-7.65 (m, 1H), 7.61 (d, J=1.6 Hz, 1H), 7.51-7.41 (m, 2H), 7.39-7.32 (m, 2H), 6.79 (t, J=72.6 Hz, 1H), 6.39 (d, J=7.2 Hz, 1H), 5.07 (t, J=6.6 Hz, 1H), 3.57-3.44 (m, 1H), 2.90 (d, J=13.3 Hz, 1H), 1.82 (s, 3H), 1.79 (s, 3H). $^{19}F$ NMR (377 MHz, Chloroform-d) δ −80.23, −80.68, −80.99, −81.43. $^{31}P$ NMR (162 MHz, Chloroform-d) δ 33.28.

Example 42: (1R,11R)-18-(difluoromethoxy)-5-{2-[(dimethylphosphoryl)methoxy]-1,3-thiazol-5-yl}-2,9,12-triazapentacyclo[9.8.1.0^{2,10}.0^{3,8}.0^{14,19}]icosa-3(8),4,6,9,14(19),15,17-heptaen-13-one

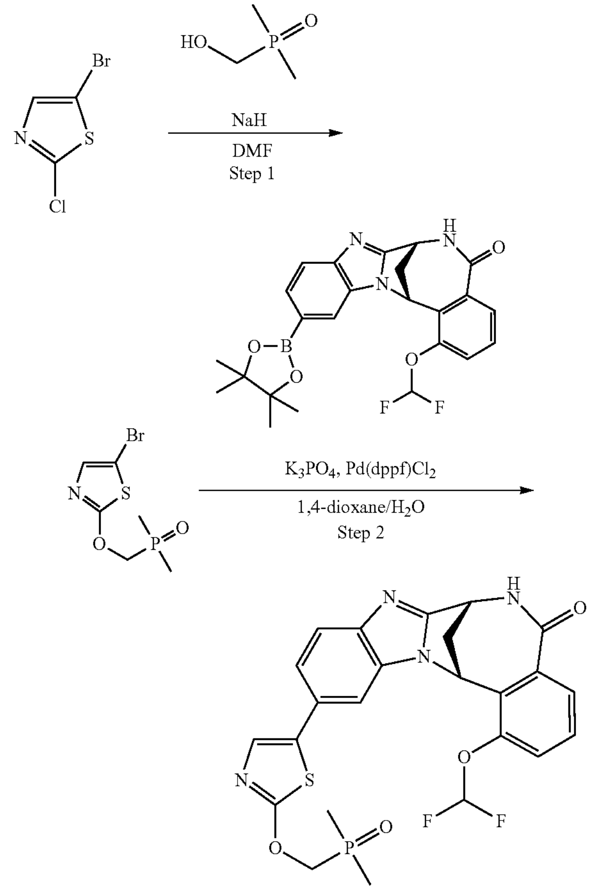

Preparation 42A: 5-bromo-2-[(dimethylphosphoryl)methoxy]-1,3-thiazole

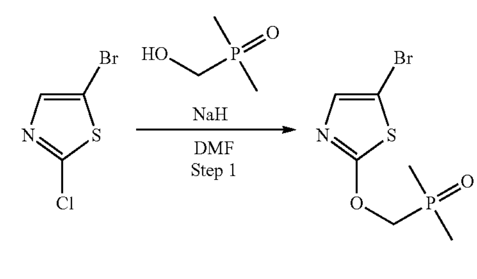

To a stirred solution of (dimethylphosphoryl)methanol (272 mg, 2.519 mmol) in DMF (5 mL) was added NaH (111 mg, 2.771 mmol, 60%) at 0° C. under nitrogen atmosphere. The resulting mixture was stirred for 30 min at room temperature under nitrogen atmosphere. To the above mixture was added 5-bromo-2-chloro-1,3-thiazole (500 mg, 2.519 mmol) at 0° C. The resulting mixture was stirred for additional overnight at room temperature. The resulting mixture was quenched with water and extracted with EtOAc (3×50 mL). The organic layers were concentrated under reduced pressure. The residue was purified by silica gel column chromatography, eluted with $CH_2Cl_2$/MeOH (12:1) to afford 5-bromo-2-[(dimethylphosphoryl)methoxy]-1,3-thiazole (135 mg, 20%) as a yellow solid. MS ESI calculated for $C_6H_9BrNO_2PS$ $[M+H]^+$, 269.93 271.93, found 269.95 272.00. $^1H$ NMR (400 MHz, Chloroform-d) δ 7.07 (s, 1H), 4.74 (d, J=5.8 Hz, 2H), 1.65 (s, 3H), 1.62 (s, 3H).

Example 42: (1R,11R)-18-(difluoromethoxy)-5-{2-[(dimethylphosphoryl)methoxy]-1,3-thiazol-5-yl}-2,9,12-triazapentacyclo[9.8.1.0^{2,10}.0^{3,8}.0^{14,19}]icosa-3(8),4,6,9,14(19),15,17-heptaen-13-one

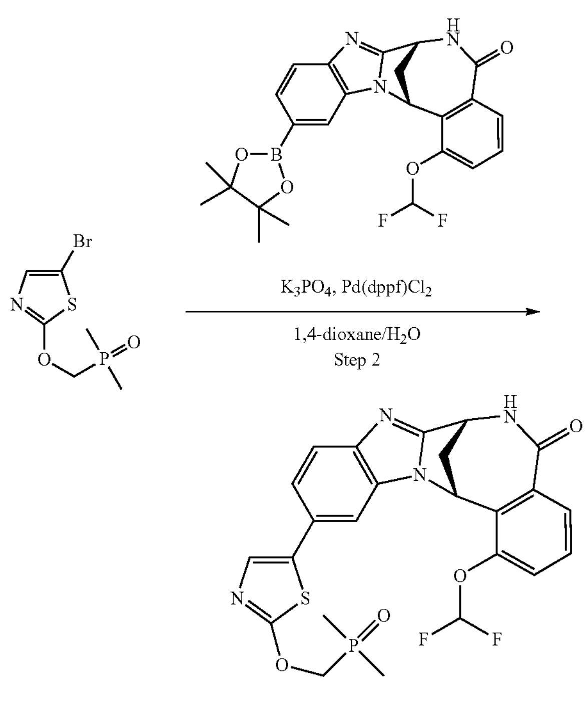

To a stirred mixture of (1R,11R)-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.107 mmol) and 5-bromo-2-[(dimethylphosphoryl)methoxy]-1,3-thiazole (24 mg, 0.089 mmol) in 1,4-dioxane (2 mL) were added $Pd(dppf)Cl_2 \cdot CH_2Cl_2$ (7 mg, 0.009 mmol) and $K_3PO_4$ (57 mg, 0.267 mmol) in $H_2O$ (0.5 mL) at room temperature under nitrogen atmosphere. The resulting mixture was stirred for 16 h at 100° C. under nitrogen atmosphere. The mixture was allowed to cool down to room temperature. The resulting mixture was concentrated under vacuum. The residue was purified by silica gel column chromatography, eluted with DCM/MeOH (0% to 15%) followed by Prep-HPLC with the following conditions: Column: C18 Column 120 g; Mobile Phase A: water (0.1% $NH_4HCO_3$), Mobile Phase B: $CH_3CN$; Flow rate: 60 mL/min; Gradient: 30 B to 50 B in 30 min; 254/220 nm to afford (1R,11R)-18-(difluoromethoxy)-5-{2-[(dimethylphosphoryl)methoxy]-1,3-thiazol-5-yl}-2,9,12-triazapentacyclo[9.8.1.0^{2,10}.0^{3,8}.0^{14,19}]icosa-3(8),4,6,9,14(19),15,17-heptaen-13-one (15 mg, 32%) as a white solid. MS ESI calculated for $C_{24}H_{21}F_2N_4O_4PS$ $[M+H]^+$, 531.10, found 530.95. $^1H$ NMR (400 MHz, Chloroform-d) δ 8.47-8.40 (m, 1H), 7.75-7.67 (m, 1H), 7.60-7.51 (m, 1H), 7.49-7.41 (m, 1H), 7.37-7.24 (m, 3H), 6.88 (t, J=72.8 Hz, 1H), 6.39-6.31 (m, 1H), 4.96 (t, J=6.6 Hz, 1H), 4.85-4.76 (m, 2H), 3.54-3.43 (m, 1H), 2.92-2.83 (m, 1H), 1.69 (s, 3H), 1.65 (s, 3H). $^{19}F$ NMR (377 MHz, Chloroform-d) δ −80.18, −80.62, −80.66, −81.11. $^{31}P$ NMR (162 MHz, Chloroform-d) δ 40.00.

Example 43: (1R,11R)-18-(difluoromethoxy)-5-[4-(dimethylphosphoryl)-3-fluorophenyl]-2,9,12-triazapentacyclo[9.8.1.0^{2,10}.0^{3,8}.0^{14,19}]icosa-3(8),4,6,9,14(19),15,17-heptaen-13-one

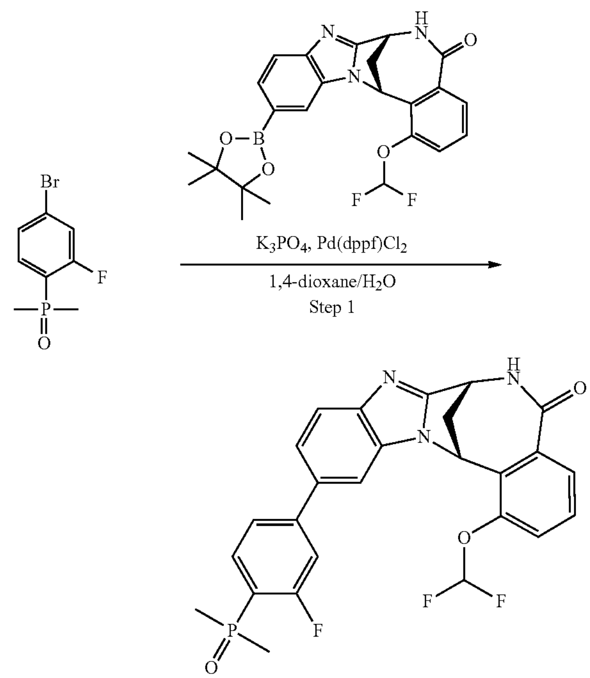

To a stirred mixture of (1R,11R)-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.106 mmol) and 4-bromo-1-(dimethylphosphoryl)-2-fluorobenzene (22 mg, 0.088 mmol) in 1,4-dioxane (2 mL) were added $Pd(dppf)Cl_2 \cdot CH_2Cl_2$ (7 mg, 0.009 mmol) and $K_3PO_4$ (56 mg, 0.264 mmol) in $H_2O$ (0.5 mL) at room temperature under nitrogen atmosphere. The resulting mixture was stirred for 16 h at 100° C. under nitrogen atmosphere. The mixture was allowed to cool down to room temperature. The resulting mixture was concentrated under vacuum. The residue was purified by silica gel column chromatography, eluted with DCM/MeOH (0% to 15%) followed by Prep-HPLC with the following conditions: Column: C18 Column 120 g; Mobile Phase A: water (0.1% $NH_4HCO_3$), Mobile Phase B: $CH_3CN$; Flow rate: 60 mL/min; Gradient: 30 B to 50 B in 30 min; 254/220 nm to afford (1R,11R)-18-(difluoromethoxy)-5-[4-(dimethylphosphoryl)-3-fluorophenyl]-2,9,12-triazapentacyclo[9.8.1.0^{2,10}.0^{3,8}.0^{14,19}]icosa-3(8),4,6,9,14(19),15,17-heptaen-13-one (10 mg, 21%) as a white solid. MS ESI calculated for $C_{26}H_{21}F_3N_3O_3P$ $[M+H]^+$, 512.13, found 512.00. $^1H$ NMR (400 MHz, Chloroform-d) δ 8.44 (d, J=8.0 Hz, 1H), 8.06-8.02 (m, 1H), 7.81 (d, J=7.9 Hz, 1H), 7.73 (s, 1H), 7.56-7.50 (m, 2H), 7.47-7.42 (m, 1H), 7.41-7.30 (m, 2H), 7.06-6.69 (m, 1H), 6.41 (d, J=6.7 Hz, 1H), 5.03 (s, 1H), 3.51 (t, J=7.0 Hz, 1H), 3.01-2.81 (m, 1H), 1.87 (s, 3H), 1.83 (s, 3H). $^{19}F$ NMR (377 MHz, Chloroform-d) δ −80.41, −80.86, −80.92, −81.36, −105.79. $^{31}P$ NMR (162 MHz, Chloroform-d) δ 30.56.

Example 44: (1R,11R)-18-(difluoromethoxy)-5-{4-[(dimethylphosphoryl)methoxy]phenyl}-12-ethyl-2,9,12-triazapentacyclo[9.8.1.0^{2,10}.0^{3,8}.0^{14,19}]icosa-3(8),4,6,9,14(19),15,17-heptaen-13-one

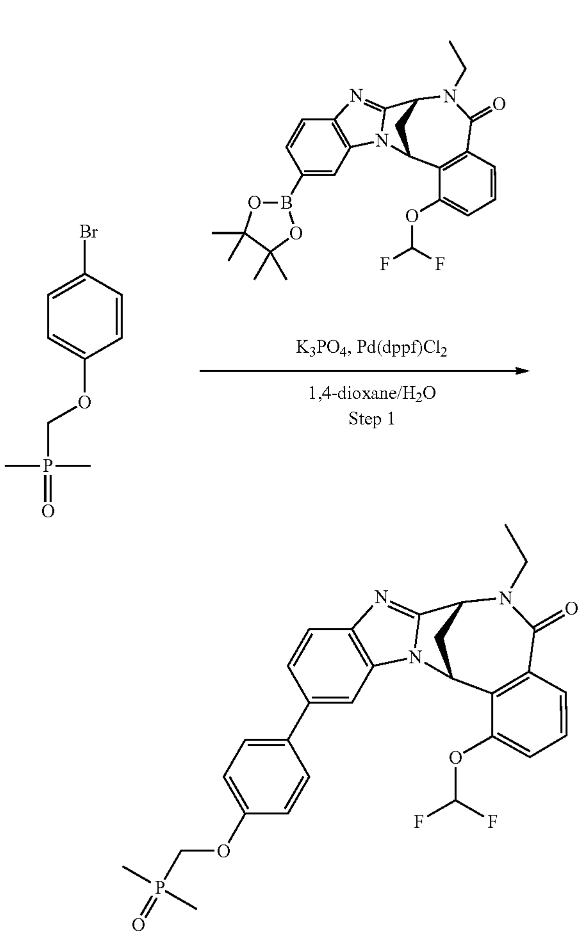

To a stirred solution of (1R,11R)-18-(difluoromethoxy)-12-ethyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.101 mmol) and 1-bromo-4-[(dimethylphosphoryl)methoxy]benzene (26 mg, 0.101 mmol) in 1,4-dioxane (2 mL) and $H_2O$ (0.4 mL) were added $K_3PO_4$ (64 mg, 0.303 mmol) and $Pd(dppf)Cl_2 \cdot CH_2Cl_2$ (8 mg, 0.010 mmol) at room temperature. The resulting mixture was stirred for 16 h at 100° C. under nitrogen atmosphere. The resulting mixture was concentrated under vacuum. The residue was purified by silica gel column chromatography, eluted with $CH_2Cl_2$/MeOH (10:1) followed by reversed-phase flash chromatography with the following conditions: column, C18 silica gel; mobile phase, $CH_3CN$ in water (10 mmol/L $NH_4HCO_3$), 20% to 50% gradient in 30 min; detector, 254 nm. This resulted in (1R,11R)-18-(difluoromethoxy)-5-{4-[(dimethylphosphoryl)methoxy]phenyl}-12-ethyl-2,9,12-triazapentacyclo[9.8.1.0^{2,10}.0^{3,8}.0^{14,19}]icosa-3(8),4,6,9,14(19),15,17-heptaen-13-one (15 mg, 26%) as a white solid. MS ESI calculated for $C_{29}H_{28}F_2N_3O_4P$ $[M+H]^+$, 552.18, found 552.15. $^1H$ NMR (400 MHz, DMSO-$d_6$) δ 8.35-8.29 (m, 1H), 7.85-7.63 (m, 3H), 7.61-7.53 (m, 2H), 7.53-7.41 (m, 3H), 7.18-7.10 (m, 2H), 6.28 (d, J=7.1 Hz, 1H), 5.28 (d, J=7.2 Hz, 1H), 4.36 (d, J=6.7 Hz, 2H), 3.90-3.73 (m, 2H), 3.57-3.45 (m, 1H), 2.78 (d, J=13.6 Hz, 1H), 1.54 (s, 3H), 1.51 (s, 3H), 1.35 (t, J=7.0 Hz, 3H). $^{19}F$ NMR (377 MHz, DMSO-$d_6$) δ −81.72, −82.64. $^{31}P$ NMR (162 MHz, DMSO-$d_6$) δ 38.42.

Example 45: (1R,11R)-18-(difluoromethoxy)-5-[4-(dimethylphosphoryl)-3-fluorophenyl]-12-ethyl-2,9,12-triazapentacyclo[9.8.1.0^{2,10}.0^{3,8}.0^{14,19}]icosa-3(8),4,6,9,14(19),15,17-heptaen-13-one

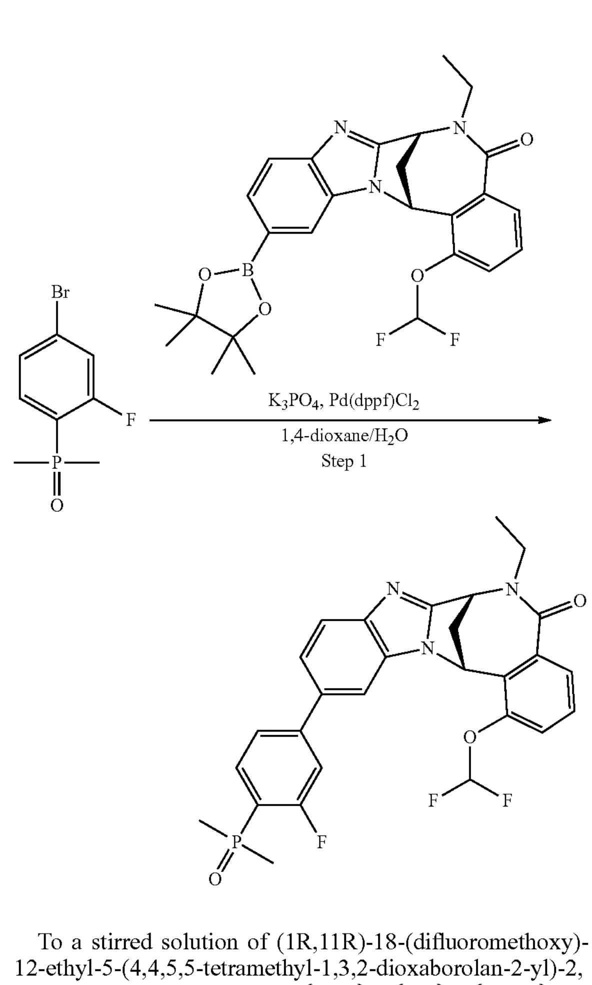

To a stirred solution of (1R,11R)-18-(difluoromethoxy)-12-ethyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.101 mmol) and 4-bromo-1-(dimethylphosphoryl)-2-fluorobenzene (25 mg, 0.101 mmol) in 1,4-dioxane (2 mL) and $H_2O$ (0.4 mL) were added $K_3PO_4$ (64 mg, 0.303 mmol) and $Pd(dppf)Cl_2 \cdot CH_2Cl_2$ (8 mg, 0.010 mmol) at room temperature. The resulting mixture was stirred for 16 h at 100° C. under nitrogen atmosphere. The resulting mixture was concentrated under reduced pressure. The residue was purified by silica gel column chromatography, eluted with $CH_2Cl_2$/MeOH (10:1) followed by reversed-phase flash chromatography with the following conditions: column, C18 silica gel; mobile phase, $CH_3CN$ in water (10 mmol/L $NH_4HCO_3$), 20% to 50% gradient in 30 min; detector, 254 nm. The resulting mixture was concentrated under reduced pressure. This resulted in (1R,11R)-18-(difluoromethoxy)-5-[4-(dimethylphosphoryl)-3-fluorophenyl]-12-ethyl-2,9,12-triazapentacyclo[9.8.1.0^{2,10}.0^{3,8}.0^{14,19}]icosa-3(8),4,6,9,14(19),15,17-heptaen-13-one (26 mg, 47%) as a white solid. MS ESI calculated for $C_{28}H_{25}F_3N_3O_3P$ $[M+H]^+$, 540.16, found 540.10. $^1H$ NMR (400 MHz, DMSO-$d_6$) δ 8.35-8.28 (m, 1H), 7.89-7.80 (m, 1H), 7.83-7.76 (m, 1H), 7.73 (d, J=8.5 Hz, 1H), 7.71-7.46 (m, 6H), 6.31 (d, J=7.0 Hz, 1H), 5.30 (d, J=7.2 Hz, 1H), 3.89-3.76 (m, 2H), 3.58-3.48 (m, 1H), 2.80 (d, J=13.7 Hz, 1H), 1.76 (s, 3H), 1.73 (s, 3H), 1.35 (t, J=7.0 Hz, 3H). $^{19}F$ NMR (377 MHz, DMSO-$d_6$) δ −81.77, −82.23, −82.38, −82.83, −105.69. $^{31}P$ NMR (162 MHz, DMSO-$d_6$) δ 28.34.

Example 46: (1R,11R)-18-(difluoromethoxy)-5-[4-(dimethylphosphoryl)-3,5-difluorophenyl]-12-ethyl-2,9,12-triazapentacyclo[9.8.1.0^{2,10}.0^{3,8}.0^{14,19}]icosa-3(8),4,6,9,14(19),15,17-heptaen-13-one

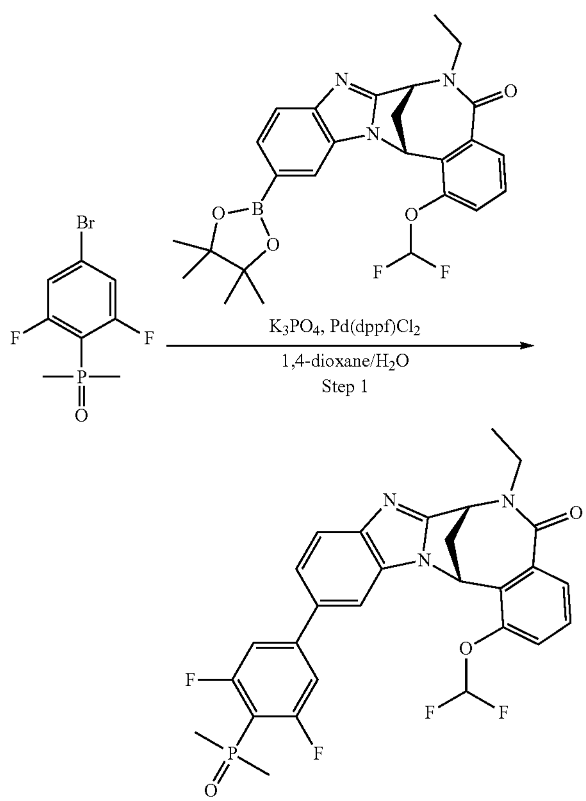

To a stirred solution of (1R,11R)-18-(difluoromethoxy)-12-ethyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.101 mmol) and 5-bromo-2-(dimethylphosphoryl)-1,3-difluorobenzene (27 mg, 0.101 mmol) in 1,4-dioxane (2 mL) and $H_2O$ (0.4 mL) were added $K_3PO_4$ (64 mg, 0.303 mmol) and Pd(dppf)$Cl_2$·$CH_2Cl_2$ (8 mg, 0.010 mmol) at room temperature. The resulting mixture was stirred for 16 h at 100° C. under nitrogen atmosphere. The resulting mixture was concentrated under vacuum. The residue was purified by silica gel column chromatography, eluted with $CH_2Cl_2$/MeOH (10:1) followed by reversed-phase flash chromatography with the following conditions: column, C18 silica gel; mobile phase, $CH_3CN$ in water (10 mmol/L $NH_4HCO_3$), 20% to 50% gradient in 30 min; detector, 254 nm. This resulted in (1R,11R)-18-(difluoromethoxy)-5-[4-(dimethylphosphoryl)-3,5-difluorophenyl]-12-ethyl-2,9,12-triazapentacyclo[9.8.1.0^{2,10}.0^{3,8}.0^{14,19}]icosa-3(8),4,6,9,14(19),15,17-heptaen-13-one (19 mg, 34%) as a white solid. MS ESI calculated for $C_{28}H_{24}F_4N_3O_3P$ $[M+H]^+$, 558.15, found 558.10. $^1H$ NMR (400 MHz, DMSO-$d_6$) δ 8.36-8.27 (m, 1H), 7.92-7.69 (m, 3H), 7.66-7.61 (m, 1H), 7.55-7.44 (m, 4H), 6.31 (d, J=7.0 Hz, 1H), 5.31 (d, J=7.3 Hz, 1H), 3.90-3.75 (m, 2H), 3.57-3.48 (m, 1H), 2.80 (d, J=13.8 Hz, 1H), 1.88 (s, 3H), 1.84 (s, 3H), 1.35 (t, J=7.0 Hz, 3H). $^{19}F$ NMR (377 MHz, DMSO-$d_6$) δ −81.82, −82.27, −82.49, −82.95, −102.26. $^{31}P$ NMR (162 MHz, DMSO-$d_6$) δ 29.10.

Example 47: (1R,11R)-12-cyclopropyl-18-(difluoromethoxy)-5-[6-(dimethylphosphoryl)pyridin-3-yl]-2,9,12-triazapentacyclo[9.8.1.0^{2,10}.0^{3,8}.0^{14,19}]icosa-3(8),4,6,9,14(19),15,17-heptaen-13-one

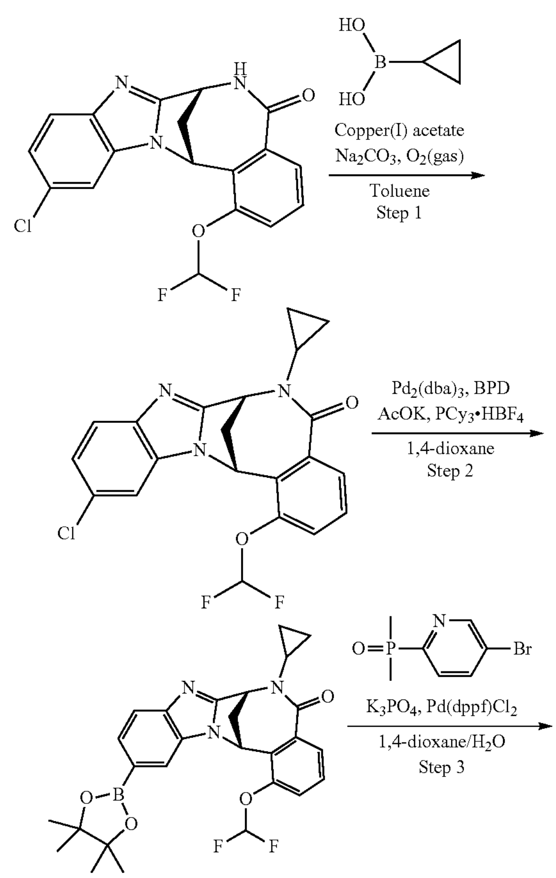

-continued

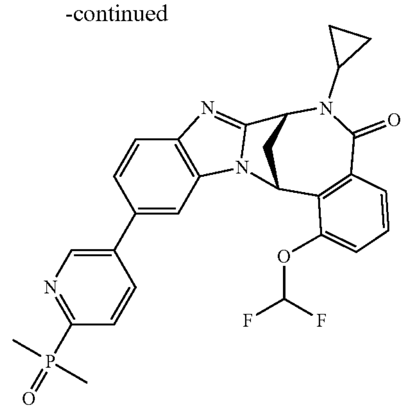

Preparation 47A: (1R,11R)-5-chloro-12-cyclopropyl-18-(difluoromethoxy)-2,9,12-triazapentacyclo[9.8.1.0^{2,10}.0^{3,8}.0^{14,19}]icosa-3(8), 4,6,9, 14(19), 15,17-heptaen-13-one

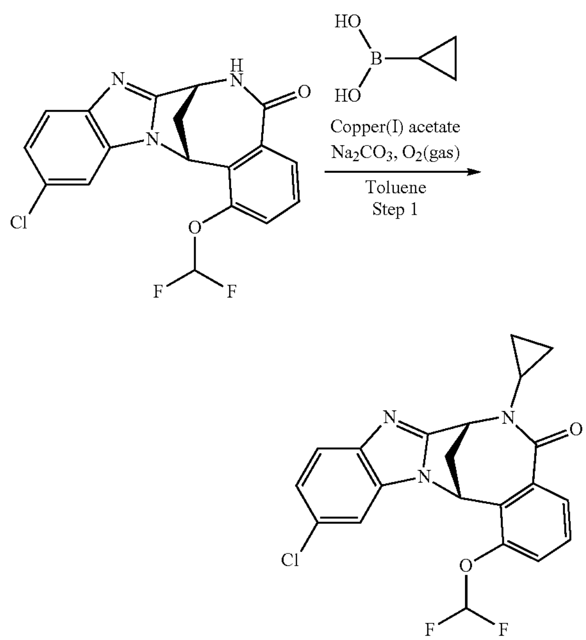

To a solution of (1R,11R)-5-chloro-18-(difluoromethoxy)-2,9,12-triazapentacyclo[9.8.1.0^{2,10}.0^{3,8}.0^{14,19}]icosa-3(8),4,6,9,14(19), 15,17-heptaen-13-one (320 mg, 0.852 mmol) and cyclopropylboronic acid (146 mg, 1.704 mmol) in Toluene (10 mL) were added $Na_2CO_3$ (135 mg, 1.278 mmol) and copper(I) acetate (157 mg, 1.278 mmol) at room temperature. The mixture was purged with nitrogen for 5 min and then was pressurized to 1~2 atoms with oxygen gas at 80° ° C. for 2 days. The reaction mixture was cooled to room temperature and filtered to remove insoluble solids. The resulting mixture was concentrated under reduced pressure. The residue was purified by silica gel column chromatography, eluted with PE/EA (1:1) to afford (1R,11R)-5-chloro-12-cyclopropyl-18-(difluoromethoxy)-2,9,12-triazapentacyclo[9.8.1.0^{2,10}.0^{3,8}.0^{14,19}]icosa-3(8),4,6,9,14(19), 15,17-heptaen-13-one (210 mg, 59%) as a light yellow solid. MS ESI calculated for $C_{21}H_{16}ClF_2N_3O_2$ $[M+H]^+$, 416.09, found 415.90. $^1H$ NMR (400 MHZ, Chloroform-d) δ 8.39-8.33 (m, 1H), 7.66-7.57 (m, 1H), 7.52-7.44 (m, 1H), 7.40 (t, J=8.2 Hz, 1H), 7.34-7.24 (m, 1H), 7.23-7.15 (m, 1H), 6.81 (t, J=72.7 Hz, 1H), 6.22-6.12 (m, 1H), 5.25-5.16 (m, 1H), 3.49-3.36 (m, 1H), 3.29-3.18 (m, 1H), 2.82 (d, J=13.5 Hz, 1H), 1.53-1.41 (m, 1H), 1.14-1.02 (m, 2H), 0.76-0.60 (m, 1H).

Preparation 47B: (1R,11R)-12-cyclopropyl-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one

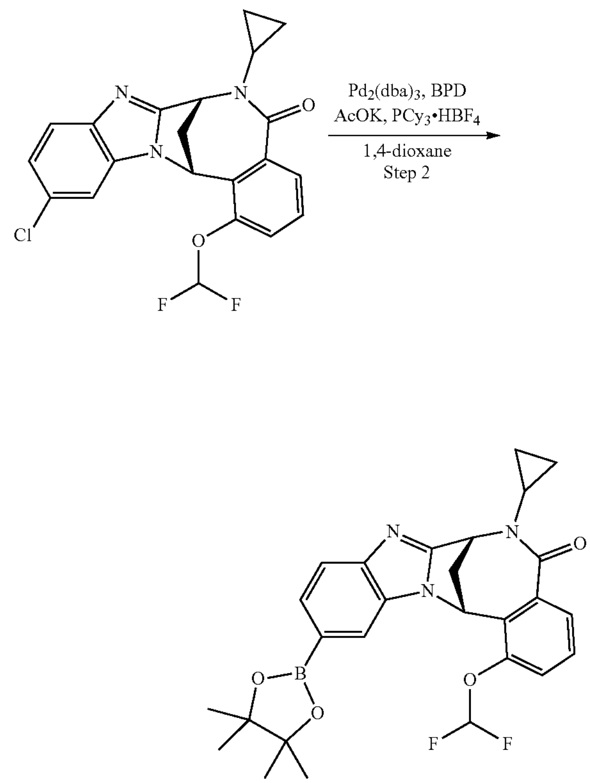

To a solution of (1R,11R)-5-chloro-12-cyclopropyl-18-(difluoromethoxy)-2,9,12-triazapentacyclo[9.8.1.0^{2,10}.0^{3,8}.0^{14,19}]icosa-3(8),4,6,9,14(19),15,17-heptaen-13-one (210 mg, 0.505 mmol) and BPD (192 mg, 0.758 mmol) in 1,4-dioxane (8 mL) were added potassium acetate (149 mg, 1.515 mmol), $PCy_3 \cdot HBF_4$ (28 mg, 0.076 mmol) and $Pd_2(dba)_3$ (46 mg, 0.051 mmol). After stirring for 16 h at 140° C. under a nitrogen atmosphere, the resulting mixture was concentrated under reduced pressure. The residue was purified by Prep-TLC, eluted with PE/EA (1:1) to afford (1R,11R)-12-cyclopropyl-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (250 mg, 97%) as a light yellow oil. MS ESI calculated for $C_{27}H_{28}BF_2N_3O_4$ $[M+H]^+$, 508.21, found 508.15.

Example 47: (1R,11R)-12-cyclopropyl-18-(difluoromethoxy)-5-[6-(dimethylphosphoryl)pyridin-3-yl]-2,9,12-triazapentacyclo[9.8.1.0^{2,10}.0^{3,8}.0^{14,19}]icosa-3(8),4,6,9,14(19),15,17-heptaen-13-one

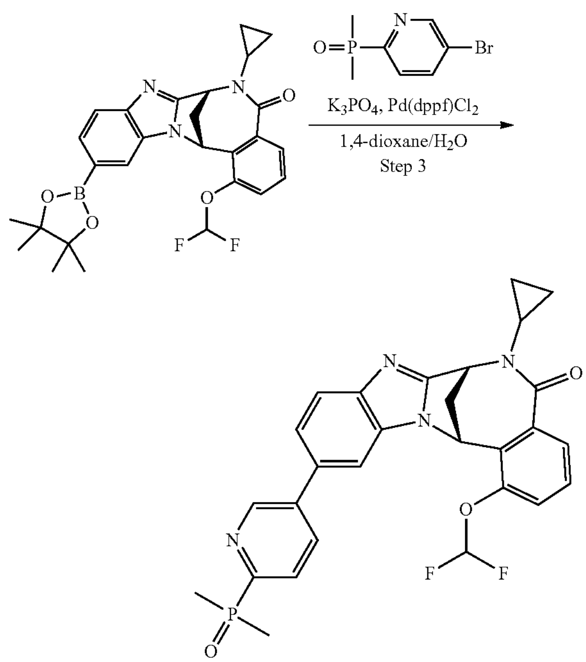

A solution of (1R,11R)-12-cyclopropyl-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (60 mg, 0.118 mmol), 5-bromo-2-(dimethylphosphoryl)pyridine (41 mg, 0.177 mmol), $K_3PO_4$ (75 mg, 0.354 mmol) and Pd(dppf)$Cl_2$·$CH_2Cl_2$ (9 mg, 0.012 mmol) in 1,4-dioxane (2 mL) and $H_2O$ (0.4 mL) was stirred for 2 h at 100° C. under nitrogen atmosphere. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (10 mmol/L $NH_4HCO_3$), Mobile Phase B: $CH_3CN$; Flow rate: 60 mL/min; Gradient: 30% B to 55% B in 20 min; 254/220 nm to afford (1R,11R)-12-cyclopropyl-18-(difluoromethoxy)-5-[6-(dimethylphosphoryl)pyridin-3-yl]-2,9,12-triazapentacyclo[9.8.1.0^{2,10}.0^{3,8}.0^{14,19}]icosa-3(8),4,6,9,14(19),15,17-heptaen-13-one (21 mg, 33%) as a white solid. MS ESI calculated for $C_{28}H_{25}F_2N_4O_3P$ $[M+H]^+$, 535.16, found 535.15. $^1$H NMR (400 MHz, Chloroform-d) δ 8.95 (d, J=2.2 Hz, 1H), 8.40-8.34 (m, 1H), 8.24-8.16 (m, 1H), 8.06-8.00 (m, 1H), 7.85 (d, J=8.4 Hz, 1H), 7.76 (d, J=1.7 Hz, 1H), 7.53-7.47 (m, 1H), 7.41 (t, J=8.2 Hz, 1H), 7.33-7.28 (m, 1H), 6.83 (t, J=72.9 Hz, 1H), 6.28 (d, J=7.0 Hz, 1H), 5.27 (d, J=7.2 Hz, 1H), 3.56-3.44 (m, 1H), 3.31-3.24 (m, 1H), 2.88 (d, J=13.5 Hz, 1H), 1.84 (s, 3H), 1.81 (s, 3H), 1.57-1.48 (m, 1H), 1.16-1.08 (m, 2H), 0.74-0.66 (m, 1H). $^{19}$F NMR (376 MHz, Chloroform-d) δ −80.28, −80.72, −80.81 −81.26. $^{31}$P NMR (162 MHz, Chloroform-d) δ 36.29.

Example 48: (1R,11R)-12-cyclopropyl-18-(difluoromethoxy)-5-[4-(dimethylphosphoryl)-3-fluorophenyl]-2,9,12-triazapentacyclo[9.8.1.0^{2,10}.0^{3,8}.0^{14,19}]icosa-3(8),4,6,9,14(19),15,17-heptaen-13-one

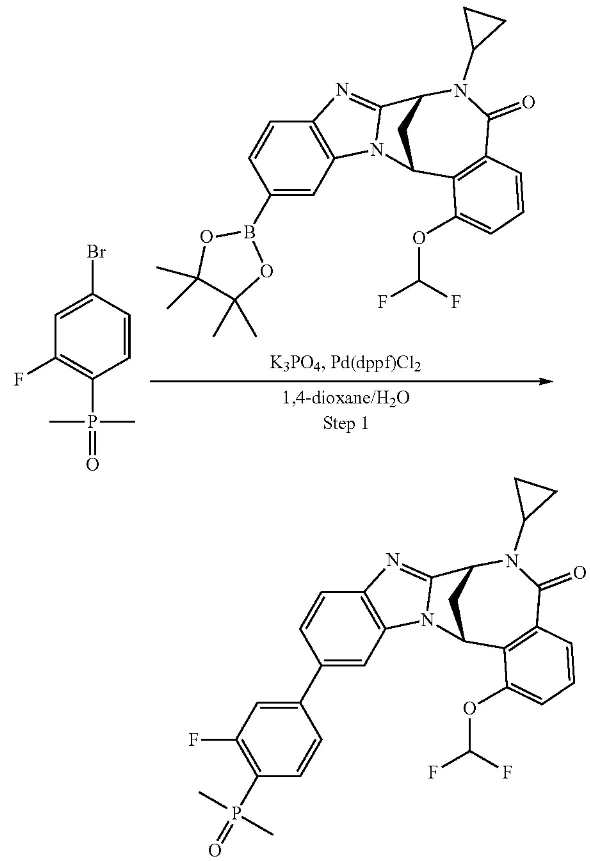

A mixture of (1R,11R)-12-cyclopropyl-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (60 mg, 0.118 mmol), 4-bromo-1-(dimethylphosphoryl)-2-fluorobenzene (44 mg, 0.177 mmol), $K_3PO_4$ (75 mg, 0.354 mmol) and Pd(dppf)$Cl_2$·$CH_2Cl_2$ (9 mg, 0.012 mmol) in 1,4-dioxane (2 mL) and $H_2O$ (0.4 mL) was stirred for 2 h at 100° C. under nitrogen atmosphere. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (10 mmol/L $NH_4HCO_3$), Mobile Phase B: $CH_3CN$; Flow rate: 60 mL/min; Gradient: 30% B to 70% B in 20 min; 254/220 nm to afford (1R,11R)-12-cyclopropyl-18-(difluoromethoxy)-5-[4-(dimethylphosphoryl)-3-fluorophenyl]-2,9,12-triazapentacyclo[9.8.1.0^{2,10}.0^{3,8}.0^{14,19}]icosa-3(8),4,6,9,14(19),15,17-heptaen-13-one (20 mg, 30%) as a white solid. MS ESI calculated for $C_{29}H_{25}F_3N_3O_3P$ $[M+H]^+$, 552.16, found 552.20. $^1$H NMR (400 MHz, Chloroform-d) δ 8.39-8.34 (m, 1H), 8.08-7.98 (m, 1H), 7.80 (d, J=8.5 Hz, 1H), 7.76 (d, J=1.8 Hz, 1H), 7.59-7.52 (m, 1H), 7.56-7.43 (m, 1H), 7.46-7.26 (m, 3H), 6.84 (t, J=72.9 Hz, 1H), 6.27 (d, J=7.0 Hz, 1H), 5.26 (d, J=7.4 Hz, 1H), 3.53-3.42 (m, 1H), 3.31-3.22 (m, 1H), 2.91-2.83 (m, 1H), 1.86 (s, 3H), 1.82 (s, 3H), 1.59-1.43 (m, 1H), 1.16-1.06 (m, 2H), 0.73-0.66 (m, 1H). $^{19}$F NMR (376 MHz, Chloroform-d) δ −80.25, −80.70, −80.87, −81.32, −105.83. $^{31}$P NMR (162 MHz, Chloroform-d) δ 30.34.

Example 49: (1R,11R)-18-(difluoromethoxy)-5-[4-(dimethylphosphoryl)phenyl]-12-ethyl-2,9,12-triazapentacyclo[9.8.1.0^{2,10}.0^{3,8}.0^{14,19}]icosa-3(8),4,6,9,14(19),15,17-heptaen-13-one

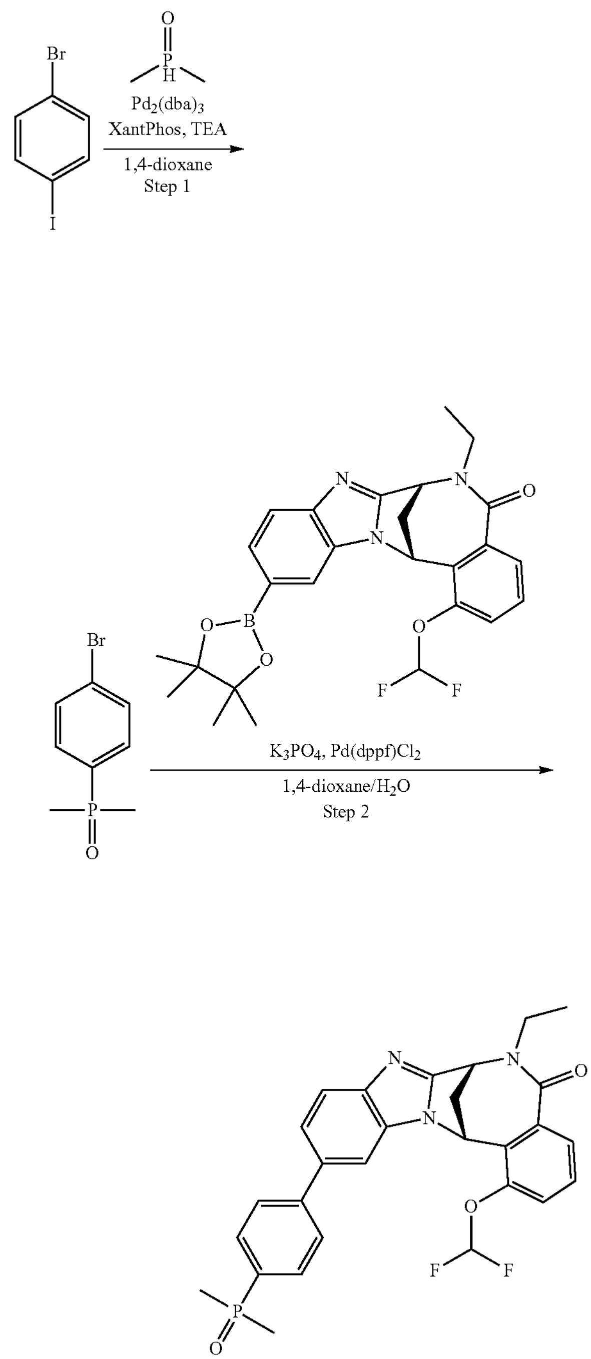

Preparation 49A: 1-bromo-4-(dimethylphosphoryl)benzene

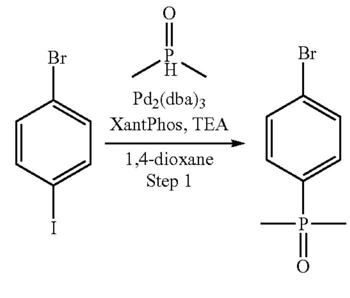

To a stirred solution of 4-bromoiodobenzene (20.00 g, 70.695 mmol) and (methylphosphonoyl)methane (5.52 g, 70.695 mmol) in 1,4-dioxane (500 mL) were added XantPhos (4.09 g, 7.069 mmol), $Et_3N$ (8.58 g, 84.834 mmol) and $Pd_2(dba)_3$ (3.24 g, 3.535 mmol) at room temperature under nitrogen atmosphere. The resulting mixture was stirred for 4 h at 100° C. under nitrogen atmosphere. The resulting mixture was concentrated under vacuum. The residue was purified by silica gel column chromatography, eluted with $CH_2Cl_2$/MeOH (10:1) to afford 1-bromo-4-(dimethylphosphoryl)benzene (14.01 g, 85%) as a yellow solid. $^1$H NMR (300 MHz, Chloroform-d) δ 7.63-7.50 (m, 4H), 1.71 (s, 3H), 1.67 (s, 3H).

Example 49: (1R,11R)-18-(difluoromethoxy)-5-[4-(dimethylphosphoryl)phenyl]-12-ethyl-2,9,12-triazapentacyclo[9.8.1.0^{2,10}.0^{3,8}.0^{14,19}]icosa-3(8),4,6,9,14(19),15,17-heptaen-13-one

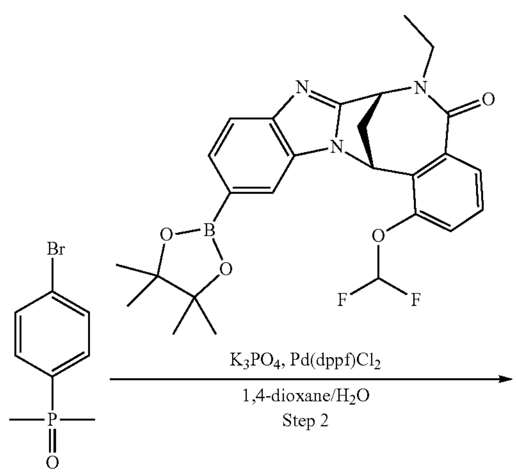

-continued

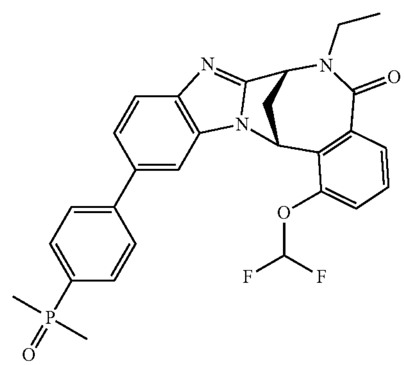

To a stirred solution of (1R,11R)-18-(difluoromethoxy)-12-ethyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.101 mmol) and 1-bromo-4-(dimethylphosphoryl)benzene (23 mg, 0.101 mmol) in 1,4-dioxane (2 mL) and $H_2O$ (0.4 mL) were added $K_3PO_4$ (64 mg, 0.303 mmol) and Pd(dppf)$Cl_2 \cdot CH_2Cl_2$ (8 mg, 0.010 mmol) at room temperature. The resulting mixture was stirred for 2 h at 100° C. under nitrogen atmosphere. The resulting mixture was concentrated under reduced pressure. The residue was purified by silica gel column chromatography, eluted with $CH_2Cl_2$/MeOH (10:1) followed by reversed-phase flash chromatography with the following conditions: column, C18 silica gel, mobile phase, $CH_3CN$ in water (10 mmol/L $NH_4HCO_3$), 20% to 50% gradient in 30 min; detector, 254 nm. This resulted in (1R,11R)-18-(difluoromethoxy)-5-[4-(dimethylphosphoryl)phenyl]-12-ethyl-2,9,12-triazapentacyclo[9.8.1.0^{2,10}.0^{3,8}.0^{14,19}]icosa-3(8),4,6,9,14(19),15,17-heptaen-13-one (27 mg, 51%) as a white solid. MS ESI calculated for $C_{28}H_{26}F_2N_3O_3P$ $[M+H]^+$, 522.17, found 522.10. $^1H$ NMR (400 MHz, DMSO-$d_6$) δ 8.36-8.29 (m, 1H), 7.93-7.63 (m, 7H), 7.59-7.53 (m, 1H), 7.52-7.45 (m, 2H), 6.31 (d, J=7.0 Hz, 1H), 5.30 (d, J=7.2 Hz, 1H), 3.93-3.75 (m, 2H), 3.58-3.47 (m, 1H), 2.80 (d, J=13.7 Hz, 1H), 1.71 (s, 3H), 1.68 (s, 3H), 1.36 (t, J=7.0 Hz, 3H). $^{19}F$ NMR (377 MHz, DMSO-$d_6$) δ −81.68, −82.13, −82.19, −82.64. $^{31}P$ NMR (162 MHz, DMSO-$d_6$) δ 32.30.

Example 50: (1R,11R)-18-(difluoromethoxy)-5-{4-[(dimethylphosphoryl)amino]phenyl}-12-methyl-2,9,12-triazapentacyclo[9.8.1.0^{2,10}.0^{3,8}.0^{14,19}]icosa-3(8),4,6,9,14(19),15,17-heptaen-13-one

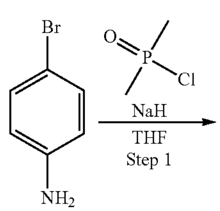

-continued

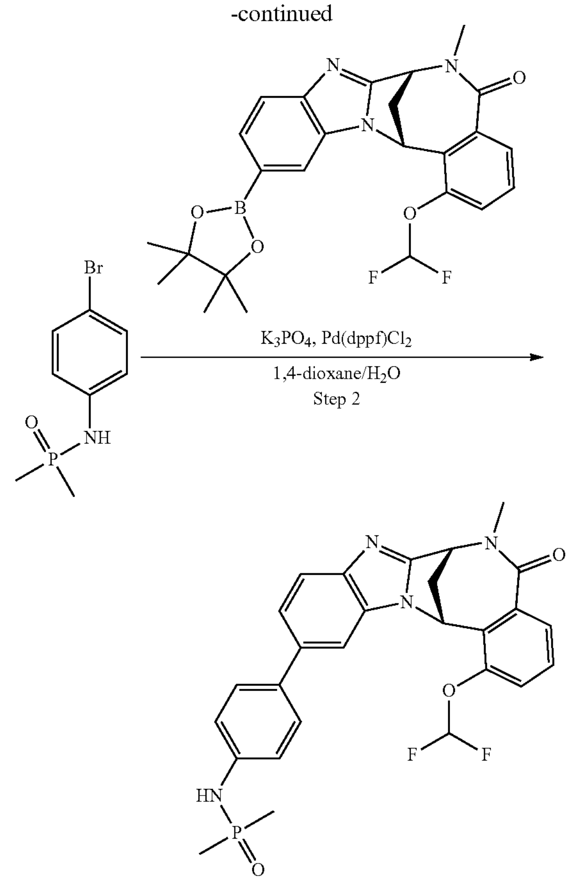

Preparation 50A: 4-bromo-N-(dimethylphosphoryl)aniline

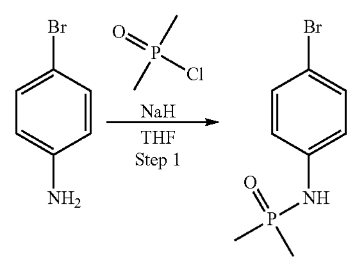

To a solution of 4-bromoaniline (150 mg, 0.872 mmol) in THF (4 mL) was added sodium hydride (60% in oil, 38 mg) at 0 degrees C. The mixture was stirred for 20 min. dimethylphosphinoyl chloride (108 mg, 0.959 mmol) was added and the mixture was allowed to warm to room temperature and stirred for 2 h. The reaction mixture was quenched by water and extracted with DCM (3×10 mL). The resulting mixture was extracted with EtOAc (3×10 mL). The combined organic layers were washed with brine (2×5 mL), dried over anhydrous $Na_2SO_4$. After filtration, the filtrate was concentrated under reduced pressure. The residue was purified by silica gel column chromatography, eluted with $CH_2Cl_2$/MeOH (9/1) to afford 4-bromo-N-(dimethylphosphoryl)aniline (37 mg, 17%) as a yellow solid. MS ESI calculated for $C_8H_{11}BrNOP$ $[M+H]^+$, 247.98 249.98, found 248.00 250.00. $^1$H NMR (400 MHz, Chloroform-d) δ 7.37-7.32 (m, 2H), 6.97 (d, J=8.7 Hz, 2H), 5.17 (s, 1H), 1.70 (s, 3H), 1.66 (s, 3H).

Example 50: (1R,11R)-18-(difluoromethoxy)-5-{4-[(dimethylphosphoryl)amino]phenyl}-12-methyl-2,9,12-triazapentacyclo[9.8.1.0^{2,10}.0^{3,8}.0^{14,19}]icosa-3(8),4,6,9,14(19),15,17-heptaen-13-one

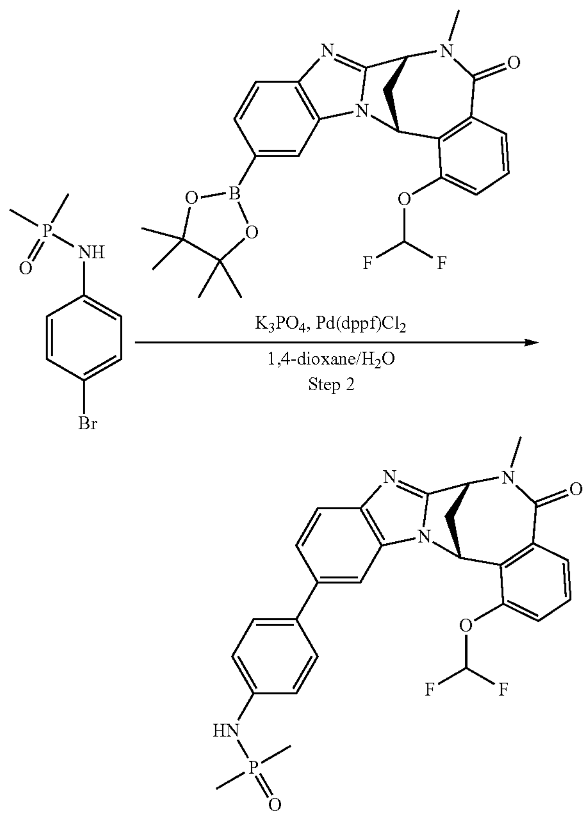

To a solution of 4-bromo-N-(dimethylphosphoryl)aniline (28 mg, 0.114 mmol) and (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.104 mmol) in 1,4-dioxane (0.5 mL) and $H_2O$ (0.1 mL) were added $K_3PO_4$ (66 mg, 0.312 mmol) and $Pd(dppf)Cl_2 \cdot CH_2Cl_2$ (8 mg, 0.010 mmol). After stirring for 2 h at 100° C. under a nitrogen atmosphere, the resulting mixture was concentrated under reduced pressure. The residue was purified by silica gel column chromatography, eluted with $CH_2Cl_2$/MeOH (9/1) followed by reversed-phase flash chromatography with the following conditions: column, C18 silica gel; mobile phase, $CH_3CN$ in water (10 mmol/L $NH_4HCO_3$), 20% to 50% gradient in 30 min; detector, 254 nm. This resulted in (1R,11R)-18-(difluoromethoxy)-5-{4-[(dimethylphosphoryl)amino]phenyl}-12-methyl-2,9,12-triazapentacyclo[9.8.1.0^{2,10}.0^{3,8}.0^{14,19}]icosa-3(8),4,6,9,14(19),15,17-heptaen-13-one (22 mg, 38%) as a white solid. MS ESI calculated for $C_{27}H_{25}F_2N_4O_3P$ $[M+H]^+$, 523.16, found 523.10. $^1$H NMR (400 MHz, Chloroform-d) δ 8.50-8.43 (m, 1H), 7.72 (d, J=8.5 Hz, 1H), 7.59 (d, J=1.7 Hz, 1H), 7.49-7.33 (m, 4H), 7.32-7.25 (m, 1H), 7.17-7.11 (m, 2H), 6.82 (t, J=72.9 Hz, 1H), 6.22 (d, J=7.2 Hz, 1H), 5.26 (d, J=9.4 Hz, 1H), 4.97 (d, J=7.1 Hz, 1H), 3.52 (s, 3H), 3.50-3.42 (m, 1H), 2.86 (d, J=13.5 Hz, 1H), 1.74 (s, 3H), 1.71 (s, 3H). $^{19}$F NMR (377 MHz, Chloroform-d) δ −80.10, −80.55, −80.74, 81.19. $^{31}$P NMR (162 MHz, Chloroform-d) δ 34.53.

Example 51: (1R,11R)-5-[4-(diethylphosphoryl)-3-fluorophenyl]-18-(difluoromethoxy)-2,9,12-triazapentacyclo[9.8.1.0^{2,10}.0^{3,8}.0^{14,19}]icosa-3(8),4,6,9,14(19),15,17-heptaen-13-one

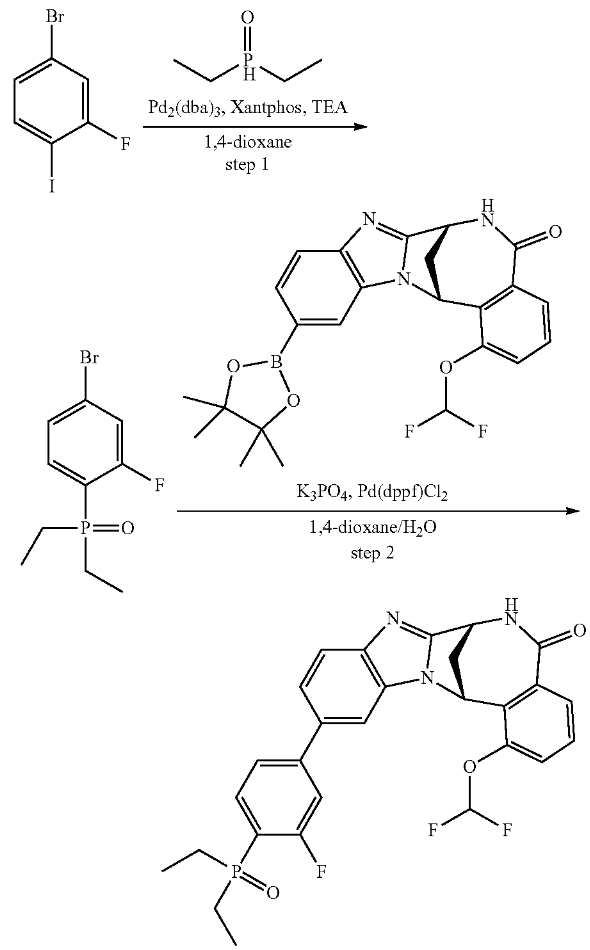

Preparation 51A: 4-bromo-1-(diethylphosphoryl)-2-fluorobenzene

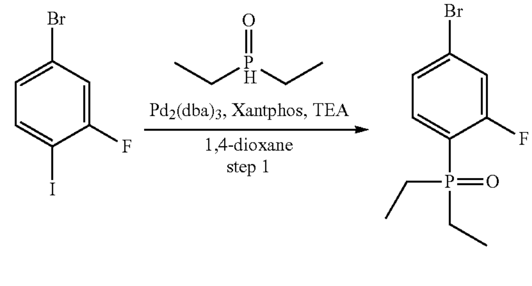

To a stirred mixture of 4-bromo-2-fluoro-1-iodobenzene (1.00 g, 3.323 mmol) and (ethylphosphonoyl)ethane (0.39 g, 3.655 mmol) in 1,4-dioxane (10 mL) were added TEA (0.40 g, 3.988 mmol), XantPhos (0.19 g, 0.332 mmol) and $Pd_2(dba)_3$ (0.15 g, 0.166 mmol) at room temperature under nitrogen atmosphere. The resulting mixture was stirred for 16 h at 80° C. under nitrogen atmosphere. The mixture was basified to pH 8 with saturated $NaHCO_3$ (aq.). The aqueous layer was extracted with $CH_2Cl_2$ (3×100 mL). The combined organic layers were washed with brine (3×50 mL), dried over anhydrous $Na_2SO_4$. After filtration, the filtrate was concentrated under reduced pressure. The residue was purified by silica gel column chromatography, eluted with $CH_2Cl_2$/MeOH (20/1) to afford 4-bromo-1-(diethylphosphoryl)-2-fluorobenzene (778 mg, 83%) as a yellow solid. MS ESI calculated for $C_{10}H_{13}BrFOP$ $[M+H]^+$, 278.99 280.99, found 278.95 280.95. $^1H$ NMR (400 MHz, Chloroform-d) δ 7.90-7.81 (m, 1H), 7.52-7.47 (m, 1H), 7.33-7.28 (m, 1H), 2.15-1.86 (m, 4H), 1.18-1.06 (m, 6H). $^{31}P$ NMR (162 MHz, Chloroform-d) δ 42.44.

Example 51: (1R,11R)-5-[4-(diethylphosphoryl)-3-fluorophenyl]-18-(difluoromethoxy)-2,9,12-triazapentacyclo[9.8.1.0^{2,10}.0^{3,8}.0^{14,19}]icosa-3(8),4,6,9,14(19),15,17-heptaen-13-one

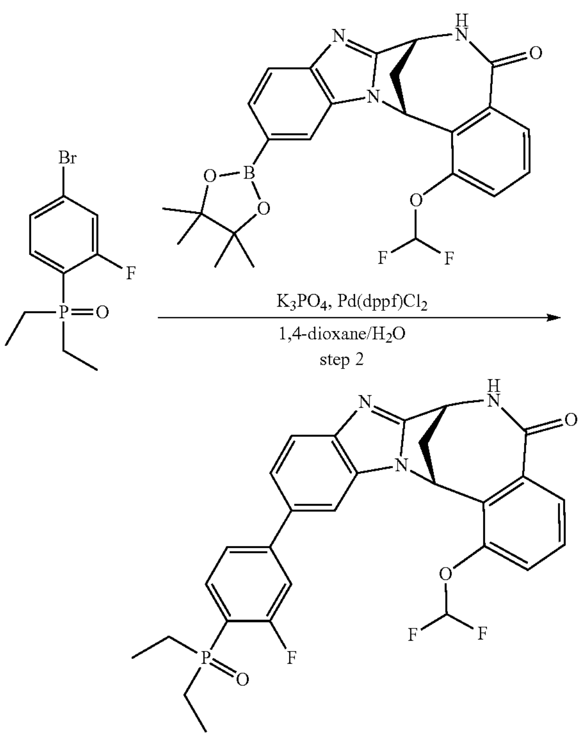

To a stirred solution of (1R,11R)-18-(difluoromethoxy)-5-(4,4,5,5-tetramethyl-1,3,2-dioxaborolan-2-yl)-2,9,12-triazapentacyclo[9.8.1.0^{2,10}.0^{3,8}.0^{14,19}]icosa-3,5,7,9,14,16,18-heptaen-13-one (50 mg, 0.107 mmol) and 4-bromo-1-(diethylphosphoryl)-2-fluorobenzene (36 mg, 0.128 mmol) in 1,4-dioxane (1 mL) and $H_2O$ (0.2 mL) were added $K_2CO_3$ (37 mg, 0.268 mmol) and Pd(dppf)$Cl_2 \cdot CH_2Cl_2$ (9 mg, 0.011 mmol) at room temperature under nitrogen atmosphere. The resulting mixture was stirred for 2 h at 80° C. under nitrogen atmosphere. The resulting mixture was concentrated under reduced pressure. The residue was purified by silica gel column chromatography, eluted with $CH_2Cl_2$/MeOH (15/1) followed by reversed-phase flash chromatography with the following conditions: column, C18 silica gel; mobile phase, $CH_3CN$ in water (10 mmol/L $NH_4HCO_3$), 25% to 40% gradient in 30 min; detector, 254 nm. This resulted in (1R,11R)-5-[4-(diethylphosphoryl)-3-fluorophenyl]-18-(difluoromethoxy)-2,9,12-triazapentacyclo[9.8.1.0^{2,10}.0^{3,8}.0^{14,19}]icosa-3(8),4,6,9,14(19),15,17-heptaen-13-one (31 mg, 54%) as a white solid. MS ESI calculated for $C_{28}H_{25}F_3N_3O_3P$ $[M+H]^+$, 540.16, found 540.05. $^1H$ NMR (400 MHz, Chloroform-d) δ 8.46-8.41 (m, 1H), 8.08-8.00 (m, 1H), 7.82 (d, J=8.5 Hz, 1H), 7.74 (d, J=1.7 Hz, 1H), 7.59-7.50 (m, 2H), 7.46 (t, J=8.1 Hz, 1H), 7.38 (d, J=8.1 Hz, 1H), 7.35-7.28 (m, 1H), 6.88 (t, J=72.7 Hz, 1H), 6.41 (d, J=7.2 Hz, 1H), 5.03 (t, J=6.6 Hz, 1H), 3.58-3.46 (m, 1H), 2.90 (d, J=13.3 Hz, 1H), 2.19-1.98 (m, 4H), 1.22-1.10 (m, 6H). $^{19}F$ NMR (377 MHz, Chloroform-d) δ −80.44, −80.88, −80.94, −81.39, −105.34, −105.36. $^{31}P$ NMR (162 MHz, Chloroform-d) δ 42.11.

Example 52: (7R,14R)-1-(difluoromethoxy)-11-(4-(dimethylphosphoryl)-2,3-difluorophenyl)-6-(methyl-d3)-6,7-dihydro-7,14-methanobenzo[f]benzo[4,5]imidazo[1,2-a][1,4]diazocin-5(14H)-one

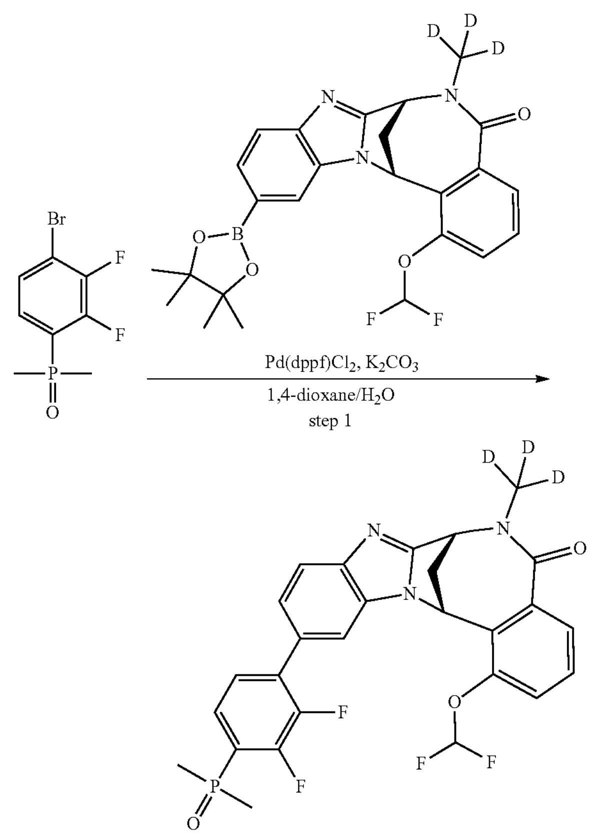

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol) and 1-bromo-4-(dimethylphosphoryl)-2,3-difluorobenzene (42 mg, 0.154 mmol) in 1,4-dioxane (1 mL) and $H_2O$ (0.2 mL)

were added $K_2CO_3$ (36 mg, 0.258 mmol) and Pd(dppf)$Cl_2 \cdot CH_2Cl_2$ (9 mg, 0.010 mmol) at room temperature under nitrogen atmosphere. The resulting mixture was stirred for 3 h at 80° C. under nitrogen atmosphere. The resulting mixture was concentrated under reduced pressure. The residue was purified by silica gel column chromatography, eluted with $CH_2Cl_2$/MeOH (15/1) followed by reversed-phase flash chromatography with the following conditions: column, C18 silica gel; mobile phase, $CH_3CN$ in water (10 mmol/L $NH_4HCO_3$), 25% to 45% gradient in 30 min; detector, 254 nm. This resulted in (7R,14R)-1-(difluoromethoxy)-11-(4-(dimethylphosphoryl)-2,3-difluorophenyl)-6-(methyl-d3)-6,7-dihydro-7,14-methanobenzo[f]benzo[4,5]imidazo[1,2-a][1,4]diazocin-5(14H)-one (21 mg, 37%) as a white solid. MS ESI calculated for $C_{27}H_{19}D_3F_4N_3O_3P$ $[M+H]^+$, 547.15, found 547.15. $^1H$ NMR (400 MHz, Chloroform-d) δ 8.53-8.46 (m, 1H), 7.86-7.71 (m, 3H), 7.49-7.36 (m, 3H), 7.35-7.29 (m, 1H), 7.03-6.62 (m, 1H), 6.31 (d, J=6.9 Hz, 1H), 5.02 (d, J=6.8 Hz, 1H), 3.55-3.44 (m, 1H), 2.91 (d, J=13.4 Hz, 1H), 1.89 (s, 3H), 1.85 (s, 3H). $^{19}F$ NMR (377 MHz, Chloroform-d) δ −80.11, −80.56, −81.00, −81.45, −131.22, −131.23, −131.28, −131.29, −143.47, −143.48, −143.53, −143.54. $^{31}P$ NMR (162 MHz, Chloroform-d) δ 29.78.

Example 53: (7R,14R)-1-(difluoromethoxy)-11-(4-(dimethylphosphoryl)-2-fluorophenyl)-6-(methyl-d3)-6,7-dihydro-7,14-methanobenzo[f]benzo[4,5]imidazo[1,2-a][1,4]diazocin-5(14H)-one

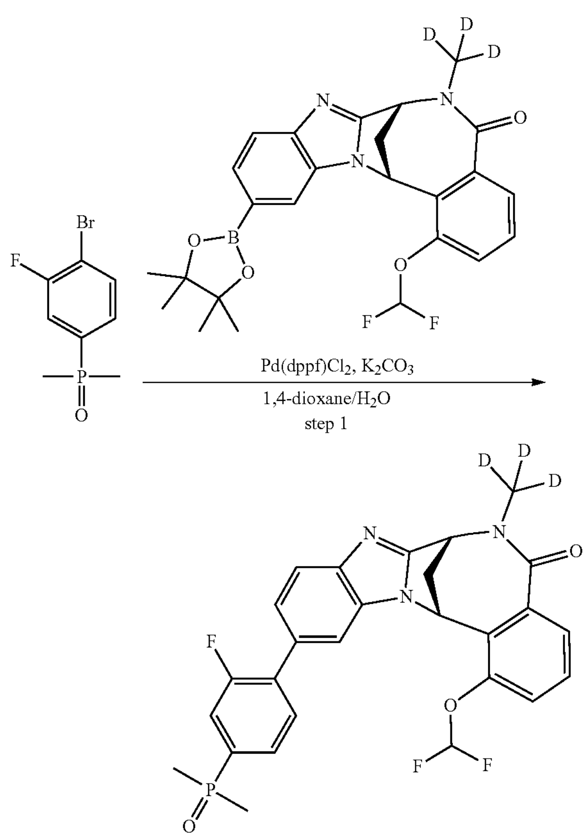

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol) and 1-bromo-4-(dimethylphosphoryl)-2-fluorobenzene (39 mg, 0.154 mmol) in 1,4-dioxane (1 mL) and $H_2O$ (0.2 mL) were added $K_2CO_3$ (36 mg, 0.258 mmol) and Pd(dppf)$Cl_2 \cdot CH_2Cl_2$ (9 mg, 0.010 mmol) at room temperature under nitrogen atmosphere. The resulting mixture was stirred for 3 h at 80° C. under nitrogen atmosphere. The resulting mixture was concentrated under reduced pressure. The residue was purified by silica gel column chromatography, eluted with $CH_2Cl_2$/MeOH (15/1) followed by reversed-phase flash chromatography with the following conditions: column, C18 silica gel; mobile phase, $CH_3CN$ in water (10 mmol/L $NH_4HCO_3$), 25% to 45% gradient in 30 min; detector, 254 nm. This resulted in (7R,14R)-1-(difluoromethoxy)-11-(4-(dimethylphosphoryl)-2-fluorophenyl)-6-(methyl-d3)-6,7-dihydro-7,14-methanobenzo[f]benzo[4,5]imidazo[1,2-a][1,4]diazocin-5(14H)-one (28 mg, 51%) as a white solid. MS ESI calculated for $C_{27}H_{20}D_3F_3N_3O_3P$ $[M+H]^+$, 529.16, found 529.10. $^1H$ NMR (400 MHz, Chloroform-d) δ 8.51-8.47 (m, 1H), 7.84-7.78 (m, 1H), 7.74 (d, J=1.8 Hz, 1H), 7.64-7.50 (m, 3H), 7.49-7.38 (m, 2H), 7.34-7.27 (m, 1H), 6.81 (t, J=73.5 Hz, 1H), 6.30 (d, J=7.2 Hz, 1H), 5.01 (d, J=7.1 Hz, 1H), 3.55-3.48 (m, 1H), 2.90 (d, J=13.5 Hz, 1H), 1.81 (s, 3H), 1.78 (s, 3H). $^{19}F$ NMR (377 MHz, Chloroform-d) δ −79.92, −80.37, −81.12, −81.56, −116.61, −116.62, −116.63. $^{31}P$ NMR (162 MHz, Chloroform-d) δ 32.93.

Example 54: (7R,14R)-1-(difluoromethoxy)-11-(4-(dimethylphosphoryl)-2,5-difluorophenyl)-6-(methyl-d3)-6,7-dihydro-7,14-methanobenzo[f]benzo[4,5]imidazo[1,2-a][1,4]diazocin-5(14H)-one

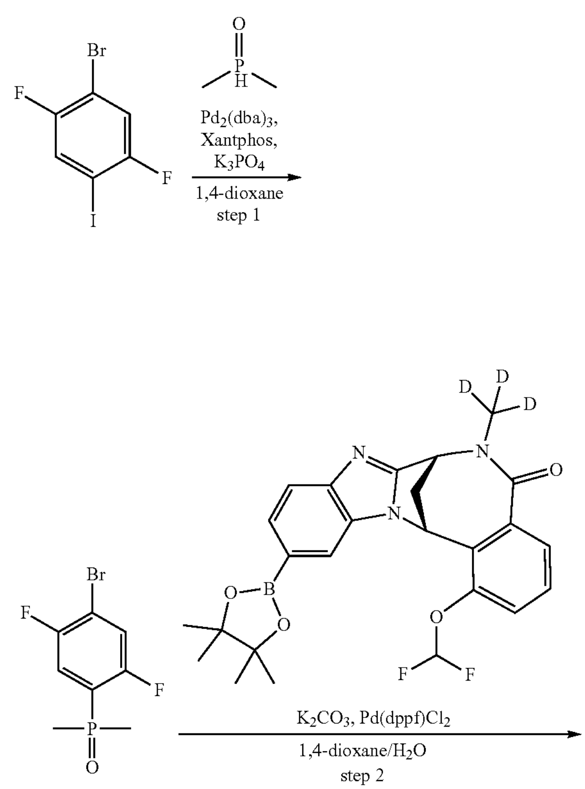

-continued

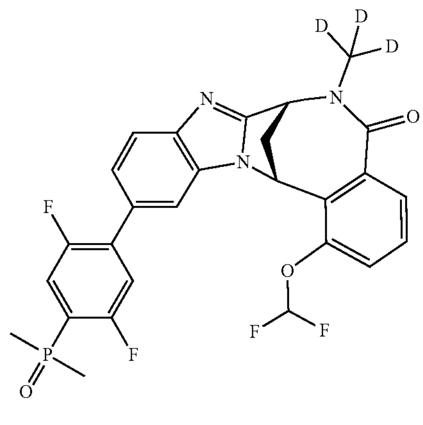

Preparation 54A: 1-bromo-4-(dimethylphosphoryl)-2,5-difluorobenzene

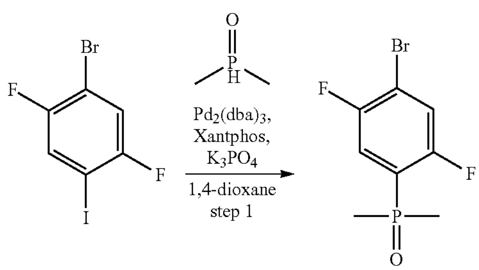

To a stirred mixture of 1-bromo-2,5-difluoro-4-iodobenzene (1.00 g, 3.136 mmol) and (methylphosphonoyl)methane (0.27 g, 3.450 mmol) in 1,4-dioxane (10 mL) were added $K_3PO_4$ (0.80 g, 3.763 mmol), XantPhos (0.18 g, 0.314 mmol) and $Pd_2(dba)_3$ (0.14 g, 0.157 mmol) at room temperature under nitrogen atmosphere. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (15/1) to afford 1-bromo-4-(dimethylphosphoryl)-2,5-difluorobenzene (550 mg, 65%) as a brown solid. MS ESI calculated for $C_8H_8BrF_2OP$ $[M+H]^+$, 268.95 270.94, found 268.90 270.90. $^1$H NMR (300 MHz, Chloroform-d) δ 7.84-7.67 (m, 1H), 7.44-7.33 (m, 1H), 1.84 (d, J=1.2 Hz, 3H), 1.80 (d, J=1.2 Hz, 3H). $^{31}$P NMR (121 MHz, Chloroform-d) δ 29.75.

Example 54: (7R,14R)-1-(difluoromethoxy)-11-(4-(dimethylphosphoryl)-2,5-difluorophenyl)-6-(methyl-d3)-6,7-dihydro-7,14-methanobenzo[f]benzo[4,5]imidazo[1,2-a][1,4]diazocin-5(14H)-one

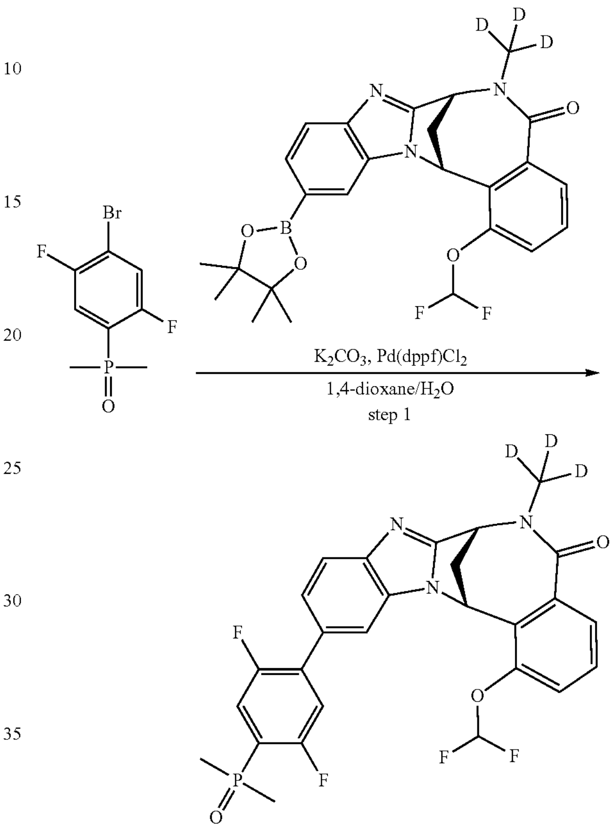

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol) and 1-bromo-4-(dimethylphosphoryl)-2,5-difluorobenzene (42 mg, 0.154 mmol) in 1,4-dioxane (1 mL) and $H_2O$ (0.2 mL) were added $K_2CO_3$ (35.67 mg, 0.258 mmol) and Pd(dppf)$Cl_2 \cdot CH_2Cl_2$ (9 mg, 0.010 mmol) at room temperature under nitrogen atmosphere. The resulting mixture was stirred for 3 h at 80° C. under nitrogen atmosphere. The resulting mixture was concentrated under reduced pressure. The residue was purified by silica gel column chromatography, eluted with $CH_2Cl_2$/MeOH (15/1) followed by reversed-phase flash chromatography with the following conditions: column, C18 silica gel; mobile phase, $CH_3CN$ in water (10 mmol/L $NH_4HCO_3$), 25% to 40% gradient in 30 min; detector, 254 nm. This resulted in (7R,14R)-1-(difluoromethoxy)-11-(4-(dimethylphosphoryl)-2,5-difluorophenyl)-6-(methyl-d3)-6,7-dihydro-7,14-methanobenzo[f]benzo[4,5]imidazo[1,2-a][1,4]diazocin-5(14H)-one (20 mg, 35%) as a white solid. MS ESI calculated for $C_{27}H_{19}D_3F_4N_3O_3P$ $[M+H]^+$, 547.15, found 547.10. $^1$H NMR (400 MHz, Chloroform-d) δ 8.52-8.46 (m, 1H), 7.87-7.69 (m, 3H), 7.48-7.39 (m, 2H), 7.32 (d, J=8.1 Hz, 1H), 7.25-7.18 (m, 1H), 6.83 (t, J=72.1 Hz, 1H), 6.31 (d, J=7.2 Hz, 1H), 5.03 (d, J=7.1 Hz, 1H), 3.55-3.45 (m, 1H), 2.91 (d, J=13.6 Hz, 1H), 1.86 (s, 3H), 1.83 (s, 3H). $^{19}$F NMR (377 MHz, Chloroform-d) δ −80.04, −80.48, −81.26, −81.70, −111.88, −111.89, −111.93, −111.95, −122.27, −122.32. $^{31}$P NMR (162 MHz, Chloroform-d) δ 29.76.
Example 55: (1R,11R)-18-(difluoromethoxy)-5-[4-(dimethylphosphoryl)-2,3-difluorophenyl]-6-fluoro-12-methyl-2,9,12-triazapentacyclo[9.8.1.0^{2,10}.0^{3,8}.0^{14,19}]icosa-3(8),4,6,9,14(19),15,17-heptaen-13-one
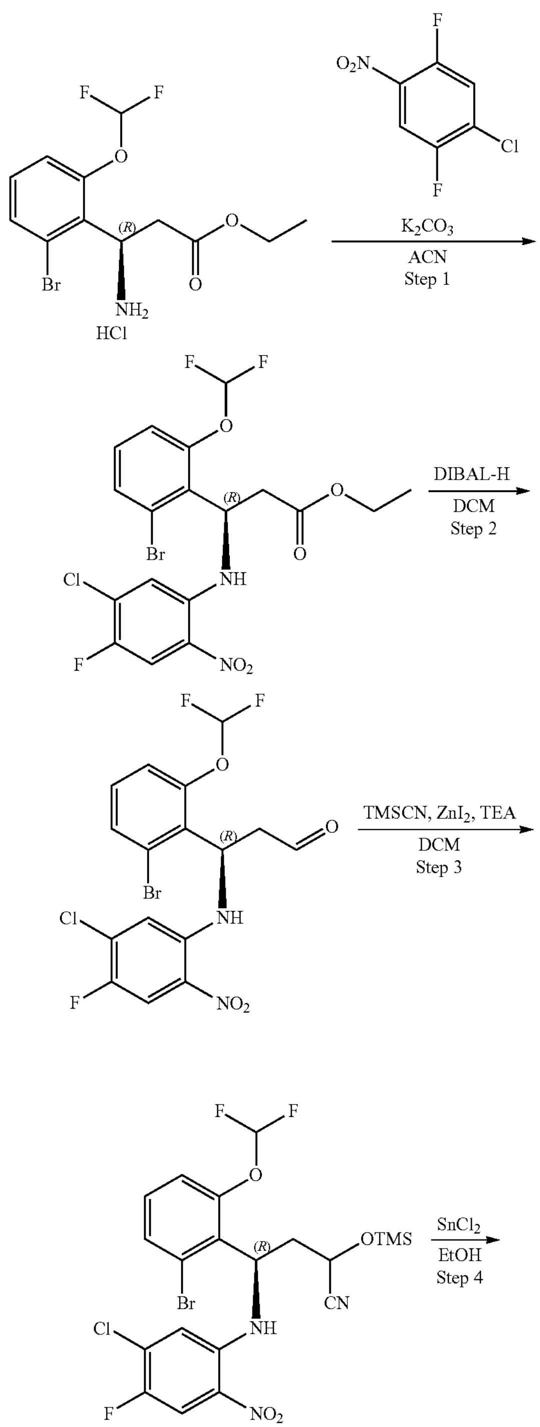
-continued
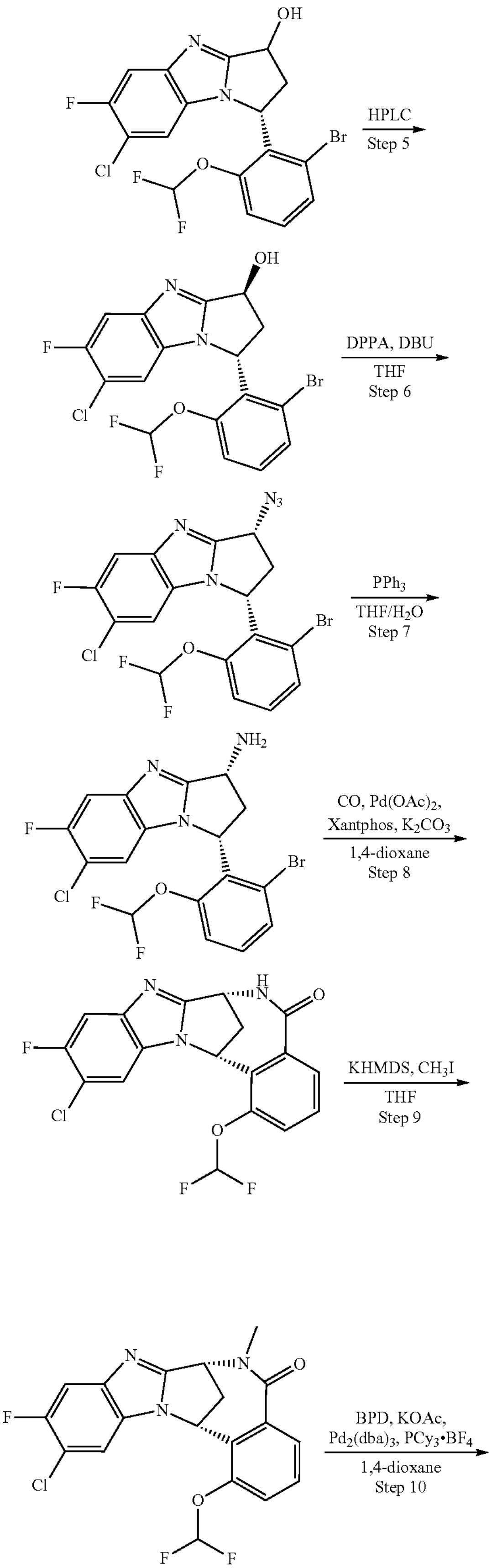

-continued

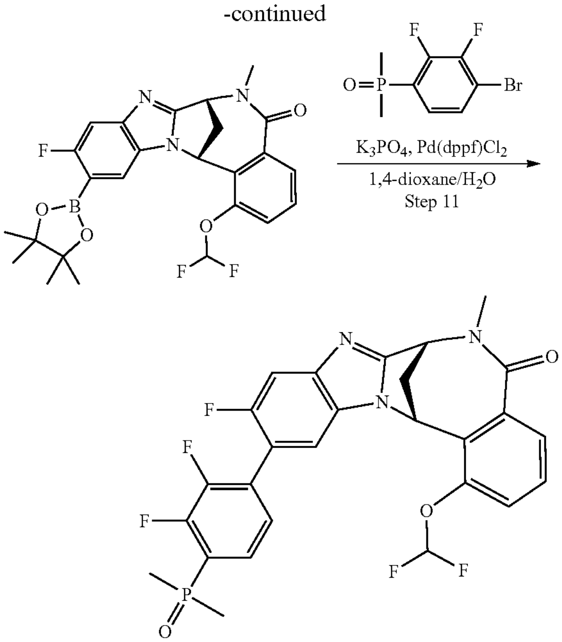

Preparation 55A: Ethyl (3R)-3-[2-bromo-6-(difluoromethoxy)phenyl]-3-[(5-chloro-4-fluoro-2-nitrophenyl)amino]propanoate

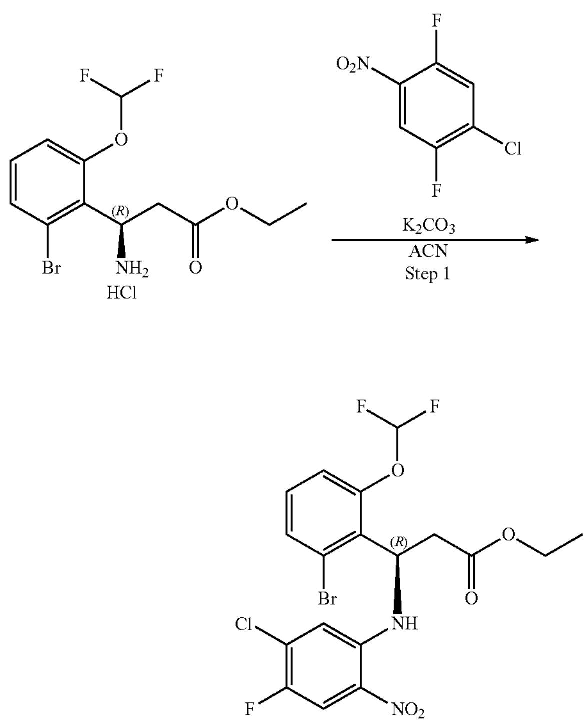

To a stirred solution of ethyl (3R)-3-amino-3-[2-bromo-6-(difluoromethoxy)phenyl]propanoate hydrochloride (30.00 g, 80.084 mmol) and 1-chloro-2,5-difluoro-4-nitrobenzene (15.50 g, 80.084 mmol) in ACN (300 mL) was added $K_2CO_3$ (33.20 g, 240.252 mmol) at room temperature. The resulting mixture was stirred for 16 h at 80° C. The resulting mixture was diluted with water (500 mL). The resulting mixture was extracted with EtOAc (3×800 mL). The combined organic layers were washed with brine (1×800 mL), dried over anhydrous $Na_2SO_4$. After filtration, the filtrate was concentrated under reduced pressure. The residue was purified by silica gel column chromatography, eluted with PE/EA (5:1) to afford ethyl (3R)-3-[2-bromo-6-(difluoromethoxy)phenyl]-3-[(5-chloro-4-fluoro-2-nitrophenyl)amino]propanoate (30.00 g, 73%) as a yellow solid. MS ESI calculated for $C_{18}H_{15}BrClF_3N_2O_5$ $[M+H]^+$, 510.98 512.98, found 511.00 513.00. $^1H$ NMR (400 MHz, Chloroform-d) δ 8.78-8.74 (m, 1H), 7.95 (d, J=9.2 Hz, 1H), 7.48-7.44 (m, 1H), 7.21-7.14 (m, 2H), 6.65 (t, J=72.2 Hz, 1H), 5.83-5.77 (m, 1H), 4.15 (q, J=7.1 Hz, 2H), 3.27-3.20 (m, 1H), 2.94-2.89 (m, 1H), 1.23 (t, J=7.1 Hz, 3H).

Preparation 55B: (3R)-3-[2-bromo-6-(difluoromethoxy)phenyl]-3-[(5-chloro-4-fluoro-2-nitrophenyl)amino]propanal

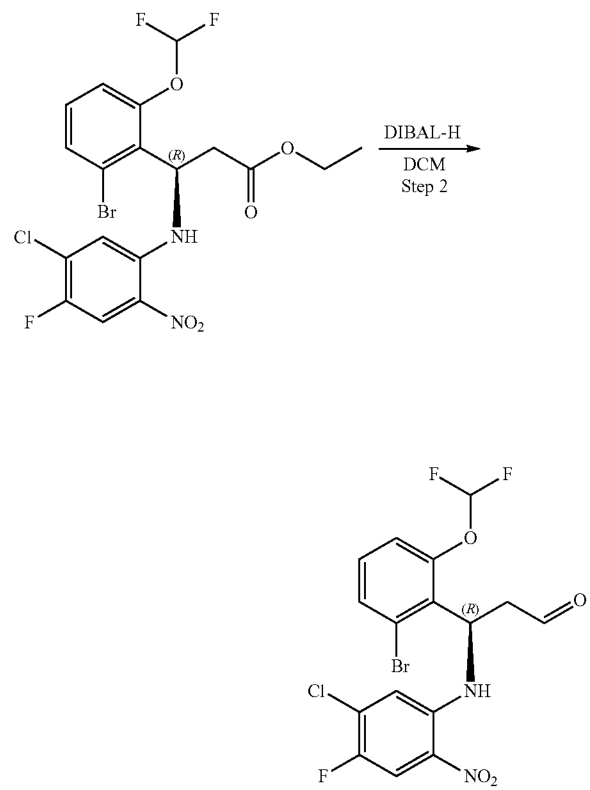

To a stirred solution of ethyl (3R)-3-[2-bromo-6-(difluoromethoxy)phenyl]-3-[(5-chloro-4-fluoro-2-nitrophenyl)amino]propanoate (29.00 g, 56.676 mmol) in DCM (300 mL) was added 1.5N of DIBAL-H (45 mL, 68.011 mmol) in toluene dropwise at −78° C. under nitrogen atmosphere. The resulting mixture was stirred for 2 h at −78° C. under nitrogen atmosphere. The reaction was quenched by the addition of sat. $NH_4Cl$ (aq.) (50 mL) at −78° C. The mixture was allowed to warm up to room temperature. The resulting mixture was filtered, and the filter cake was washed with DCM (3×100 mL). The filtrate was concentrated under reduced pressure. The resulting mixture was extracted with EtOAc (3×500 mL). The combined organic layers were washed with brine (1×500 mL), dried over anhydrous $Na_2SO_4$. After filtration, the filtrate was concentrated under reduced pressure. The residue was purified by silica gel column chromatography, eluted with PE/EA (6:1) to afford (3R)-3-[2-bromo-6-(difluoromethoxy)phenyl]-3-[(5-chloro-4-fluoro-2-nitrophenyl)amino]propanal (16.10 g, 60%) as a yellow solid. MS ESI calculated for $C_{16}H_{11}BrClF_3N_2O_4$ $[M+H]^+$, 466.95 468.95, found 467.00 469.00. $^1H$ NMR (400 MHz, Chloroform-d) δ 9.81 (s, 1H), 8.68 (d, J=9.1 Hz, 1H), 7.95 (d, J=9.2 Hz, 1H), 7.50-7.43 (m, 1H), 7.22-7.15 (m, 3H), 6.67 (t, J=72.2 Hz, 1H), 5.93-5.87 (m, 1H), 3.54-3.47 (m, 1H), 3.09-3.04 (m, 1H).

Preparation 55C: (4R)-4-[2-bromo-6-(difluoromethoxy)phenyl]-4-[(5-chloro-4-fluoro-2-nitrophenyl)amino]-2-[(trimethylsilyl)oxy]butanenitrile

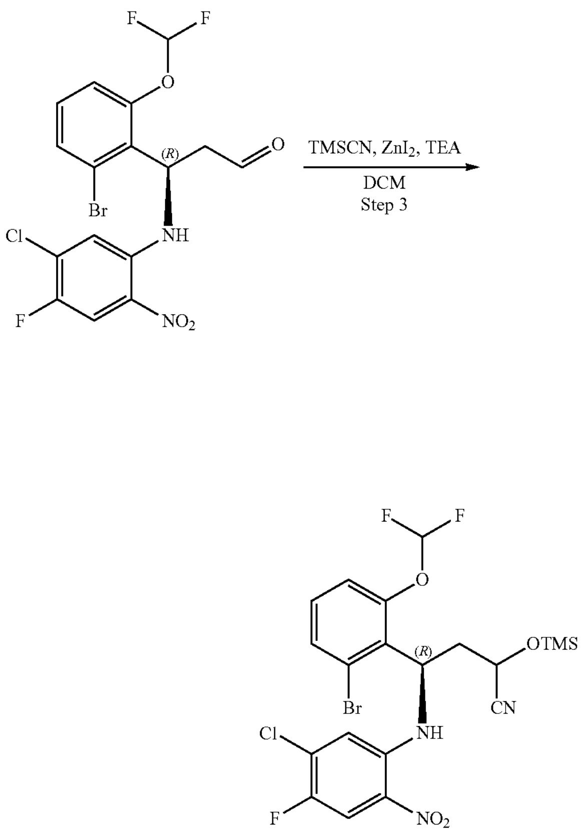

To a stirred solution of (3R)-3-[2-bromo-6-(difluoromethoxy)phenyl]-3-[(5-chloro-4-fluoro-2-nitrophenyl)amino]propanal (15.00 g, 32.077 mmol) in DCM (150 mL) were added $ZnI_2$ (1.02 g, 3.208 mmol), TEA (324 mg, 3.208 mmol) and TMSCN (6.36 g, 64.154 mmol) at room temperature. The resulting mixture was stirred for 16 h at room temperature. The resulting mixture was diluted with water (100 mL) and extracted with EtOAc (3×100 mL). The combined organic layers were washed with brine (1×200 mL), dried over anhydrous $Na_2SO_4$. After filtration, the filtrate was concentrated under reduced pressure. The resulting mixture was used in the next step directly without further purification. MS ESI calculated for $C_{20}H_{20}BrClF_3N_3O_4Si$ $[M+H]^+$, 566.00 568.00, found 566.10 568.10.

Preparation 55D: (3R)-3-[2-bromo-6-(difluoromethoxy)phenyl]-11-chloro-10-fluoro-2,7-diazatricyclo[6.4.0.0^{2,6}]dodeca-1(8),6,9,11-tetraen-5-ol

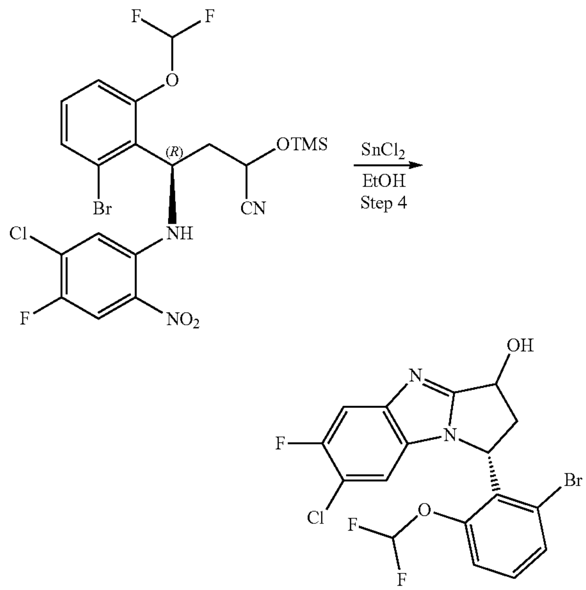

To a stirred solution of (4R)-4-[2-bromo-6-(difluoromethoxy)phenyl]-4-[(5-chloro-4-fluoro-2-nitrophenyl)amino]-2-[(trimethylsilyl)oxy]butanenitrile (19.00 g, 33.520 mmol) in EtOH (150 mL) was added $SnCl_2$ (32.12 g, 167.600 mmol) at room temperature. The resulting mixture was stirred for 16 h at room temperature. The resulting mixture was diluted with water (100 mL). The mixture was basified to pH 8 with KOH (1N). The resulting mixture was diluted with EtOAc (500 mL). The resulting mixture was filtered, and the filter cake was washed with EtOAc (3×100 mL). The filtrate was concentrated under reduced pressure. The residue was purified by silica gel column chromatography, eluted with $CH_2Cl_2$/MeOH (10:1) to afford (3R)-3-[2-bromo-6-(difluoromethoxy)phenyl]-11-chloro-10-fluoro-2,7-diazatricyclo[6.4.0.0^{2,6}]dodeca-1(8),6,9,11-tetraen-5-ol (14.02 g, 93%) as a yellow solid. MS ESI calculated for $C_{17}H_{11}BrClF_3N_2O_2$ $[M+H]^+$ 446.96 448.96, found 447.00 449.00.

Preparation 55E: (3R,5S)-3-[2-bromo-6-(difluoromethoxy)phenyl]-11-chloro-10-fluoro-2,7-diazatricyclo[6.4.0.0^{2,6}]dodeca-1(8),6,9,11-tetraen-5-ol

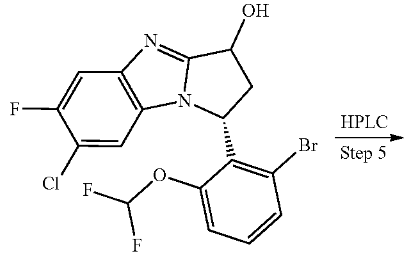

-continued

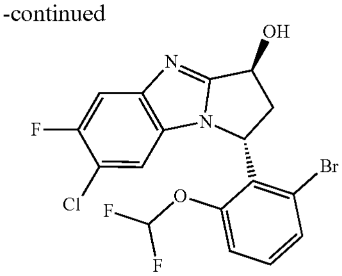

The mixture of (3R)-3-[2-bromo-6-(difluoromethoxy)phenyl]-11-chloro-10-fluoro-2,7-diazatricyclo[6.4.0.0^{2,6}]dodeca-1(8),6,9,11-tetraen-5-ol (14 g, 31.275 mmol) was purified by HPLC with the following conditions: Column: XB-C18 101×650 mm, 10 μm; Mobile Phase A: Water (0.1% TFA), Mobile Phase B: ACN; Flow rate: 350 mL/min; Gradient: 30% B to 50% B in 40 min; 254/220 nm to afford (3R,5S)-3-[2-bromo-6-(difluoromethoxy)phenyl]-11-chloro-10-fluoro-2,7-diazatricyclo[6.4.0.0^{2,6}]dodeca-1(8),6,9,11-tetraen-5-ol (8.10 g, 57%) as a yellow solid. $C_{17}H_{11}BrClF_3N_2O_2$ $[M+H]^+$, 446.96 448.96, found 447.00 449.00. $^1H$ NMR (400 MHz, Chloroform-d) δ 7.66-7.47 (m, 2H), 7.43-7.34 (m, 1H), 7.05-5.99 (m, 4H), 5.85-5.77 (m, 1H), 3.41-3.18 (m, 2H).

Preparation 55F: (3R,5R)-5-azido-3-[2-bromo-6-(difluoromethoxy)phenyl]-11-chloro-10-fluoro-2,7-diazatricyclo[6.4.0.0^{2,6}]dodeca-1(8),6,9,11-tetraene

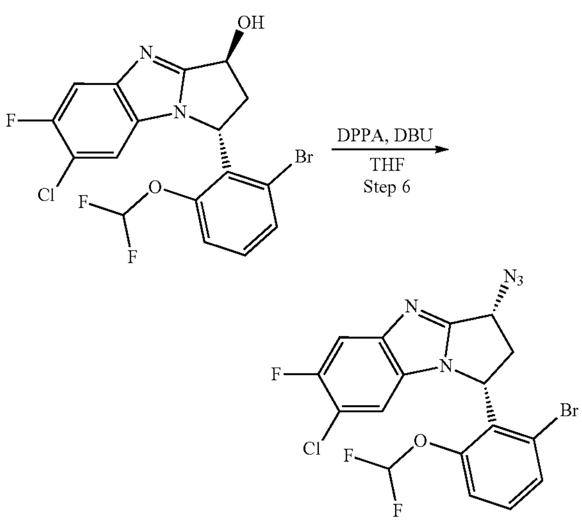

To a stirred solution of (3R,5S)-3-[2-bromo-6-(difluoromethoxy)phenyl]-11-chloro-10-fluoro-2,7-diazatricyclo[6.4.0.0^{2,6}]dodeca-1(8),6,9,11-tetraen-5-ol (6.01 g, 13.404 mmol) and DPPA (4.43 g, 16.085 mmol) in THF (20 mL) was added DBU (10.20 g, 67.020 mmol) at 0° C. The resulting mixture was stirred for 24 h at 30° C. The resulting mixture was diluted with EtOAc (50 mL) and $H_2O$ (100 mL). The resulting mixture was extracted with EtOAc (2×50 mL). The combined organic layers were washed with Sat. $NH_4Cl$ (1×100 mL) and Sat. $NaHCO_3$ (1×100 mL) and dried over anhydrous $Na_2SO_4$. After filtration, the filtrate was concentrated under reduced pressure. The crude product was used in the next step directly without further purification. MS ESI calculated for $C_{17}H_{10}BrClF_3N_5O$ $[M+H]^+$, 471.97 473.97, found 471.95 473.95.

Preparation 55G: (3R,5R)-3-[2-bromo-6-(difluoromethoxy)phenyl]-11-chloro-10-fluoro-2,7-diazatricyclo[6.4.0.0^{2,6}]dodeca-1(8),6,9,11-tetraen-5-amine

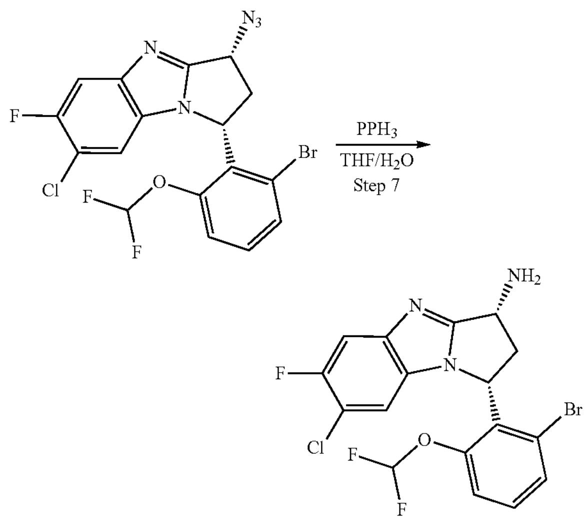

To a stirred solution of (3R,5R)-5-azido-3-[2-bromo-6-(difluoromethoxy)phenyl]-11-chloro-10-fluoro-2,7-diazatricyclo[6.4.0.0^{2,6}]dodeca-1(8),6,9,11-tetraene (10 g, crude) in solution of THF (100 mL) and $H_2O$ (10 mL) was added $PPh_3$ (4.00 g, 15.250 mmol) at room temperature under nitrogen atmosphere. The resulting mixture was stirred for 16 h at room temperature. The resulting mixture was concentrated under reduced pressure. The residue was purified by silica gel column chromatography, eluted with $CH_2Cl_2$/MeOH (10:1) to afford (3R,5R)-3-[2-bromo-6-(difluoromethoxy)phenyl]-11-chloro-10-fluoro-2,7-diazatricyclo[6.4.0.0^{2,6}]dodeca-1(8),6,9,11-tetraen-5-amine (5.02 g) as a black oil. MS ESI calculated for $C_{17}H_{12}BrClF_3N_3O$ $[M+H]^+$, 445.98 447.98, found 446.00 448.00.

Preparation 55H: (1R,11R)-5-chloro-18-(difluoromethoxy)-6-fluoro-2,9,12-triazapentacyclo[9.8.1.0^{2,10}.0^{3,8}.0^{14,19}]icosa-3(8),4,6,9,14(19),15,17-heptaen-13-one

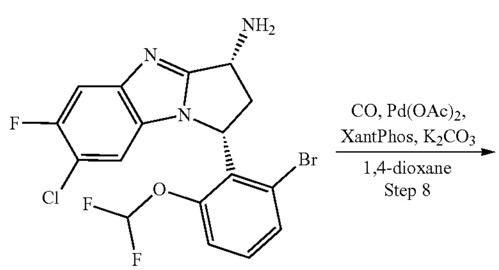

-continued

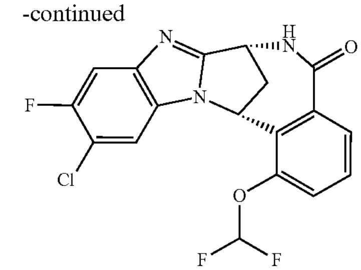

To a solution of (3R,5R)-3-[2-bromo-6-(difluoromethoxy)phenyl]-11-chloro-10-fluoro-2,7-diazatricyclo[6.4.0.0^{2,6}]dodeca-1(8),6,9,11-tetraen-5-amine (2.00 g, 4.478 mmol) in 1,4-dioxane (20 mL) were added $K_2CO_3$ (3.09 g, 22.390 mmol), XantPhos (129 mg, 0.224 mmol) and $Pd(OAc)_2$ (50 mg, 0.224 mmol) in a pressure tank. The mixture was purged with nitrogen for 2 min and then was pressurized to 1 atom with carbon monoxide at 100° C. for 16 h. The reaction mixture was cooled to room temperature and filtered to remove insoluble solids. The resulting mixture was concentrated under reduced pressure. The residue was purified by silica gel column chromatography, eluted with $CH_2Cl_2$/MeOH (10:1) to afford (1R,11R)-5-chloro-18-(difluoromethoxy)-6-fluoro-2,9,12-triazapentacyclo[9.8.1.0^{2,10}.0^{3,8}.0^{14,19}]icosa-3(8),4,6,9,14(19),15,17-heptaen-13-one (0.70 g, 39%) as a brown solid. MS ESI calculated for $C_{18}H_{11}ClF_3N_3O_2$ $[M+H]^+$, 394.05 396.05, found 394.00 396.00. $^1H$ NMR (400 MHz, Chloroform-d) δ 8.44-8.42 (m, 1H), 7.66 (d, J=6.6 Hz, 1H), 7.51-7.38 (m, 4H), 6.85 (t, J=72.6 Hz, 1H), 6.29-6.27 (m, 1H), 4.97-4.93 (m, 1H), 3.50-3.43 (m, 1H), 2.87-2.83 (m, 1H).

Preparation 551: (1R,11R)-5-chloro-18-(difluoromethoxy)-6-fluoro-12-methyl-2,9,12-triazapentacyclo[9.8.1.0^{2,10}.0^{3,8}.0^{14,19}]icosa-3(8),4,6,9,14(19),15,17-heptaen-13-one

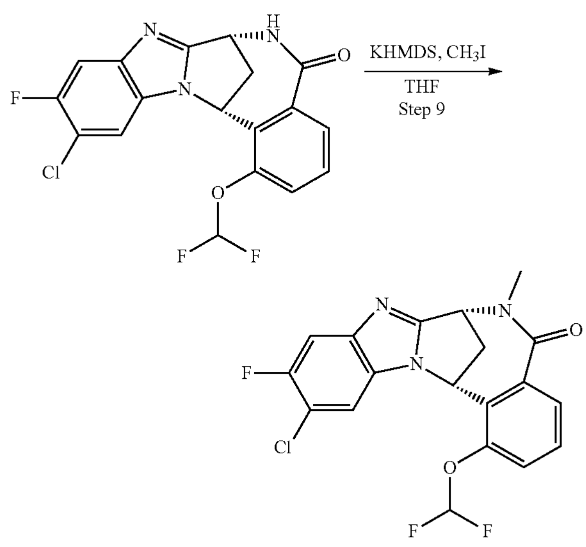

To a stirred solution of (1R,11R)-5-chloro-18-(difluoromethoxy)-6-fluoro-2,9,12-triazapentacyclo[9.8.1.0^{2,10}.0^{3,8}.0^{14,19}]icosa-3(8),4,6,9,14(19),15,17-heptaen-13-one (300 mg, 0.762 mmol) in dry THF (3 mL) was added 1N of KHMDS (0.91 mL, 0.914 mmol) in THF dropwise at −78° C. under nitrogen atmosphere. The resulting mixture was stirred for 1 h at −78° C. under nitrogen atmosphere. To the above mixture was added $CH_3I$ (162 mg, 1.143 mmol) dropwise at −78° C. The resulting mixture was stirred for additional 16 h at room temperature. The resulting mixture was concentrated under reduced pressure. The residue was purified by silica gel column chromatography, eluted with $CH_2Cl_2$/MeOH (10:1) to afford (1R,11R)-5-chloro-18-(difluoromethoxy)-6-fluoro-12-methyl-2,9,12-triazapentacyclo[9.8.1.0^{2,10}.0^{3,8}.0^{14,19}]icosa-3(8),4,6,9,14(19),15,17-heptaen-13-one (220 mg, 70%) as a yellow solid. MS ESI calculated for $C_{11}H_{13}ClF_3N_3O_2$ $[M+H]^+$, 408.06 410.06, found 408.05 410.05. $^1H$ NMR (400 MHz, Chloroform-d) δ 8.52-8.44 (m, 1H), 7.50-7.42 (m, 3H), 7.34 (d, J=8.2 Hz, 1H), 6.84 (t, J=72.7 Hz, 1H), 6.20-6.18 (m, 1H), 4.96-4.94 (m, 1H), 3.50-3.41 (m, 4H), 2.88-2.85 (m, 1H).

Preparation 55J: (1R,11R)-18-(difluoromethoxy)-6-fluoro-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one

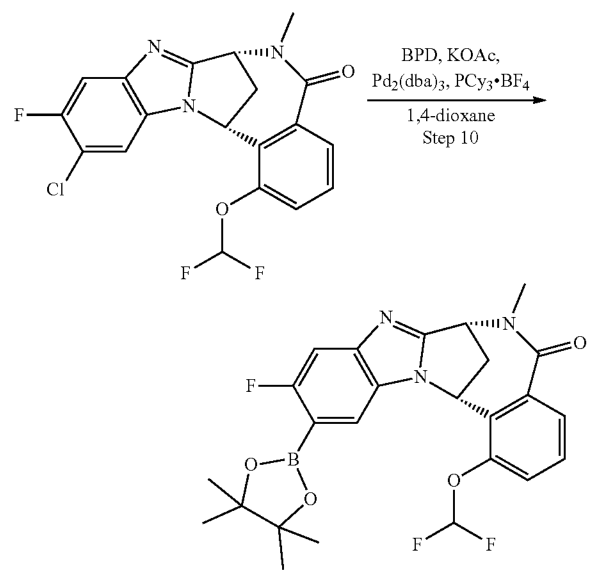

To a stirred solution of (1R,11R)-5-chloro-18-(difluoromethoxy)-6-fluoro-12-methyl-2,9,12-triazapentacyclo[9.8.1.0^{2,10}.0^{3,8}.0^{14,19}]icosa-3(8),4,6,9,14(19),15,17-heptaen-13-one (210 mg, 0.515 mmol), KOAc (152 mg, 1.545 mmol) and BPD (196 mg, 0.772 mmol) in 1,4-dioxane (5 mL) were added $PCy_3{\cdot}HBF_4$ (19 mg, 0.052 mmol) and $Pd_2(dba)_3$ (47 mg, 0.052 mmol) at room temperature under nitrogen atmosphere. The resulting mixture was stirred for 16 h at 140° C. under nitrogen atmosphere. The mixture was allowed to cool down to room temperature. The resulting mixture was concentrated under reduced pressure. The residue was purified by silica gel column chromatography, eluted with $CH_2Cl_2$/MeOH (10:1) to afford (1R,11R)-18-(difluoromethoxy)-6-fluoro-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9, 14(19),15,17-heptaen-13-one (210 mg, 81%) as a yellow solid. MS ESI calculated for $C_{25}H_{25}BF_3N_3O_4$ [M+H]$^+$, 500.19, found 500.30.

Example 55: (1R,11R)-18-(difluoromethoxy)-5-[4-(dimethylphosphoryl)-2,3-difluorophenyl]-6-fluoro-12-methyl-2,9,12-triazapentacyclo[9.8.1.0^{2,10}.0^{3,8}.0^{14,19}]icosa-3(8),4,6,9,14(19),15,17-heptaen-13-one

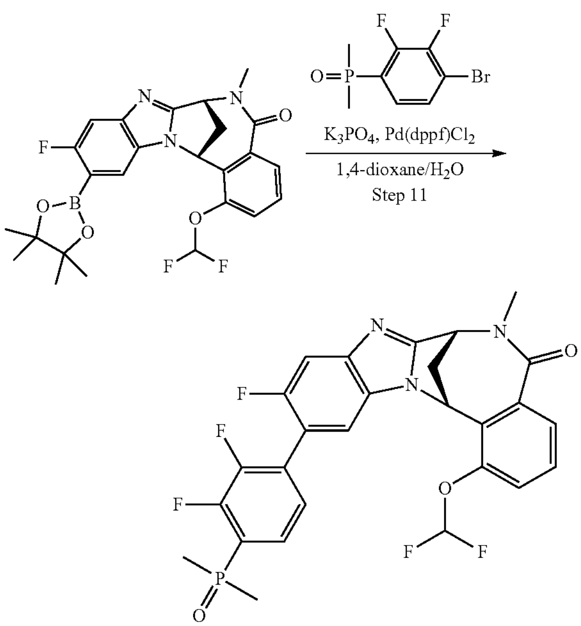

To a stirred solution of (1R,11R)-18-(difluoromethoxy)-6-fluoro-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (70 mg, 0.140 mmol) and 1-bromo-4-(dimethylphosphoryl)-2,3-difluorobenzene (38 mg, 0.140 mmol) in 1,4-dioxane (2 mL) was added solution of $K_3PO_4$ (89 mg, 0.420 mmol) in $H_2O$ (0.5 mL) at room temperature under nitrogen atmosphere. To the above mixture was added Pd(dppf)$Cl_2$·$CH_2Cl_2$ (11 mg, 0.014 mmol) at room temperature. The resulting mixture was stirred for 2 h at 80° C. under nitrogen atmosphere. The resulting mixture was concentrated under vacuum. The residue was purified by silica gel column chromatography, eluted with $CH_2Cl_2$/MeOH (10:1) followed by reversed-phase flash chromatography with the following conditions: Column: C18 Column 120 g; Mobile Phase A: Water (0.1% FA), Mobile Phase B: ACN; Flow rate: 50 mL/min; Gradient: 25% B to 50% B in 25 min; 254/220 nm to afford (1R,11R)-18-(difluoromethoxy)-5-[4-(dimethylphosphoryl)-2,3-difluorophenyl]-6-fluoro-12-methyl-2,9,12-triazapentacyclo[9.8.1.0^{2,10}.0^{3,8}.0^{14,19}]icosa-3(8),4,6,9,14(19),15,17-heptaen-13-one (35 mg, 44%) as a white solid. MS ESI calculated for $C_{27}H_{21}F_5N_3O_3P$ [M+H]$^+$, 562.12, found 562.20. $^1H$ NMR (400 MHz, Chloroform-d) δ 8.50 (d, J=8.2 Hz, 1H), 7.82-7.75 (m, 1H), 7.53 (d, J=10.4 Hz, 1H), 7.48 (d, J=6.3 Hz, 1H), 7.44 (t, J=8.2 Hz, 1H), 7.34-7.30 (m, 2H), 6.79 (t, J=72.8 Hz, 1H), 6.26-6.24 (m, 1H), 4.99-4.97 (m, 1H), 3.52-3.44 (m, 4H), 2.91-2.87 (m, 1H), 1.89 (s, 3H), 1.86 (s, 3H). $^{19}F$ NMR (377 MHz, Chloroform-d) δ −80.33, −80.78, −80.89, −81.34, −120.15, −120.20, −131.22, −131.23, −131.28, −131.29, −139.01, −139.02, −139.06, −139.07, −139.08, −139.12, −139.14. $^{31}P$ NMR (162 MHz, Chloroform-d) δ 29.90.

Example 56: (1R,11R)-18-(difluoromethoxy)-5-[4-(dimethylphosphoryl)-2,5-difluorophenyl]-12-methyl-2,9,12-triazapentacyclo[9.8.1.0^{2,10}.0^{3,8}.0^{14,19}]icosa-3(8),4,6,9,14(19),15,17-heptaen-13-one

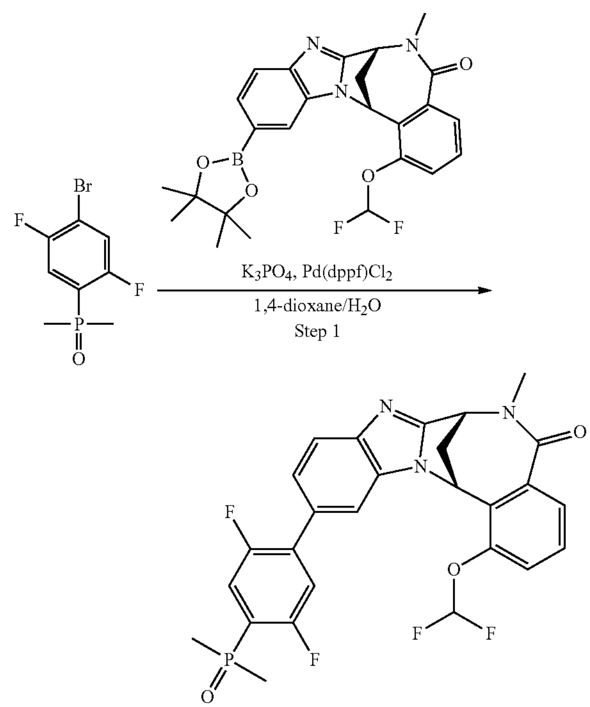

To a solution of (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (50 mg, 0.104 mmol) and 1-bromo-4-(dimethylphosphoryl)-2,5-difluorobenzene (28 mg, 0.104 mmol) in 1,4-dioxane (0.5 mL) and $H_2O$ (0.1 mL) were added $K_3PO_4$ (66 mg, 0.312 mmol) and Pd(dppf)$Cl_2$·$CH_2Cl_2$ (8 mg, 0.010 mmol). After stirring for 2 h at 80° C. under a nitrogen atmosphere, the resulting mixture was concentrated under reduced pressure. The resulting mixture was filtered, and the filter cake was washed with MeOH (3×5 mL). The filtrate was concentrated under reduced pressure. The residue was purified by reversed-phase flash chromatography with the following conditions: column, C18 silica gel; mobile phase, $CH_3CN$ in water (10 mmol/L $NH_4HCO_3$), 20% to 50% gradient in 30 min; detector, 254 nm. This resulted in (1R,11R)-18-(difluoromethoxy)-5-[4-(dimethylphosphoryl)-2,5-difluorophenyl]-12-methyl-2,9,12-triazapentacyclo[9.8.1.0^{2,10}.0^{3,8}.0^{14,19}]icosa-3(8),4,6,9,14(19),15,17-heptaen-13-one (34 mg, 59%) as a white solid. MS ESI calculated for $C_{27}H_{22}F_4N_3O_3P$ [M+H]$^+$, 544.13, found 544.05. $^1H$ NMR (300 MHz, Chloroform-d) δ 8.56-8.47 (m, 1H), 7.90-7.73 (m, 3H), 7.52-7.40 (m, 2H), 7.34 (d, J=8.2 Hz, 1H), 7.26-7.20 (m, 1H), 7.14-6.58 (m, 1H), 6.35 (d, J=6.1 Hz, 1H), 5.13-5.04 (m, 1H), 3.62-3.45 (m, 4H), 2.94

(d, J=13.2 Hz, 1H), 1.89 (s, 3H), 1.85 (s, 3H). $^{19}$F NMR (282 MHz, Chloroform-d) δ −79.97, −80.57, −81.21, −81.81, −111.82, −111.83, −111.88, −111.90, −122.26, −122.33. $^{31}$P NMR (121 MHz, Chloroform-d) δ 29.66.

Example 57: (1R,11R)-18-(difluoromethoxy)-5-[4-(dimethylphosphoryl)-3-fluorophenyl]-6-fluoro-12-methyl-2,9,12-triazapentacyclo[9.8.1.0^{2,10}.0^{3,8}.0^{14,19}]icosa-3(8),4,6,9,14(19),15,17-heptaen-13-one

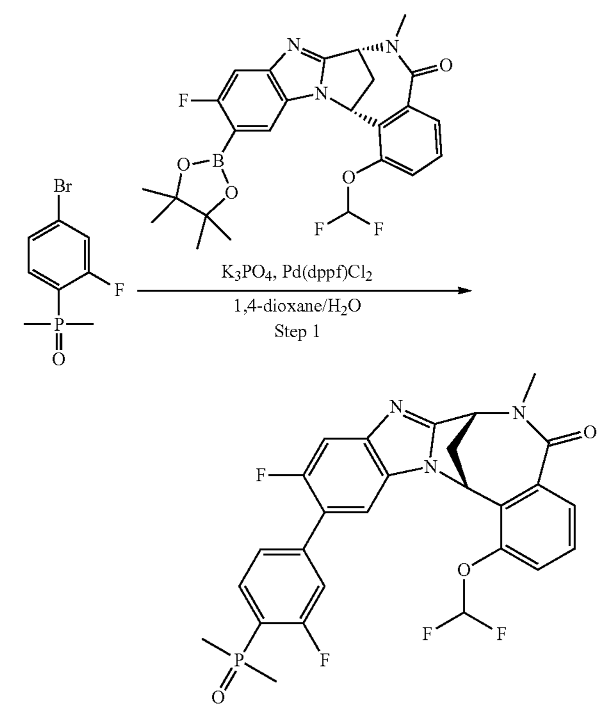

To a stirred solution of (1R,11R)-18-(difluoromethoxy)-6-fluoro-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (70 mg, 0.140 mmol) and 4-bromo-1-(dimethylphosphoryl)-2-fluorobenzene (35 mg, 0.140 mmol) in 1,4-dioxane (2 mL) was added solution of $K_3PO_4$ (89 mg, 0.420 mmol) in $H_2O$ (0.5 mL) at room temperature under nitrogen atmosphere. To the above solution was added $Pd(dppf)Cl_2 \cdot CH_2Cl_2$ (11 mg, 0.014 mmol) at room temperature under nitrogen atmosphere. The resulting mixture was stirred for additional 2 h at 80° C. The mixture was allowed to cool down to room temperature. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (0.1% FA), Mobile Phase B: $CH_3CN$; Flow rate: 50 mL/min; Gradient: 20 B to 40 B in 40 min; 254/220 nm to afford (1R,11R)-18-(difluoromethoxy)-5-[4-(dimethylphosphoryl)-3-fluorophenyl]-6-fluoro-12-methyl-2,9,12-triazapentacyclo[9.8.1.0^{2,10}.0^{3,8}.0^{14,19}]icosa-3(8),4,6,9,14(19),15,17-heptaen-13-one (18 mg, 23%) as a white solid. MS ESI calculated for $C_{27}H_{22}F_4N_3O_3P$ $[M+H]^+$, 544.13, found 544.00. $^1$H NMR (400 MHz, Chloroform-d) δ 8.53-8.47 (m, 1H), 8.07-8.01 (m, 1H), 7.56-7.31 (m, 6H), 6.83 (t, J=73.3 Hz, 1H), 6.29-6.25 (m, 1H), 5.04-4.98 (m, 1H), 3.56-3.47 (m, 4H), 2.93-2.87 (m, 1H), 1.88-1.79 (m, 6H). $^{19}$F NMR (377 MHz, Chloroform-d) δ −80.81, −80.90, −106.04, −122.36. $^{31}$P NMR (162 MHz, Chloroform-d) δ 30.70.

Example 58: (1R,11R)-18-(difluoromethoxy)-5-[4-(dimethylphosphoryl)-2-fluorophenyl]-6-fluoro-12-methyl-2,9,12-triazapentacyclo[9.8.1.0^{2,10}.0^{3,8}.0^{14,19}]icosa-3(8),4,6,9,14(19),15,17-heptaen-13-one

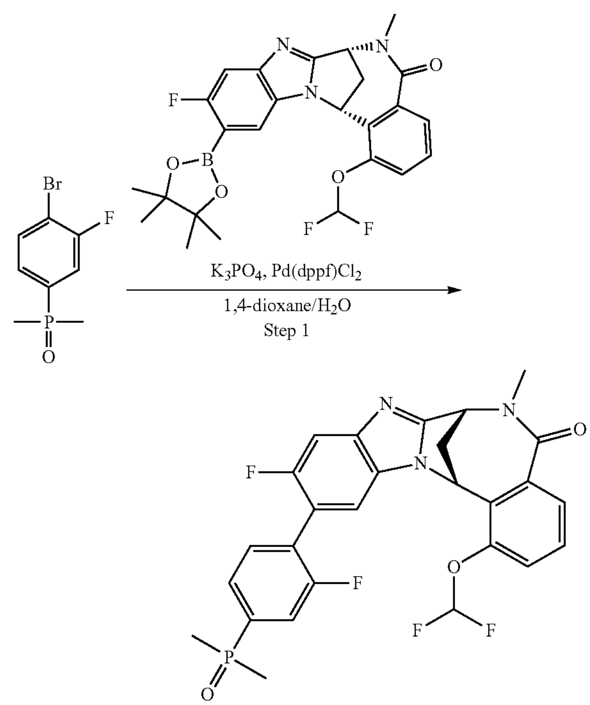

To a stirred solution of (1R,11R)-18-(difluoromethoxy)-6-fluoro-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (70 mg, 0.140 mmol) and 1-bromo-4-(dimethylphosphoryl)-2-fluorobenzene (35 mg, 0.140 mmol) in 1,4-dioxane (2 mL) was added solution of $K_3PO_4$ (89 mg, 0.420 mmol) in $H_2O$ (0.5 mL) at room temperature under nitrogen atmosphere. To the above solution was added $Pd(dppf)Cl_2 \cdot CH_2Cl_2$ (11 mg, 0.014 mmol) at room temperature under nitrogen atmosphere. The resulting mixture was stirred for additional 2 h at 80° C. The mixture was allowed to cool down to room temperature. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (0.1% FA), Mobile Phase B: $CH_3CN$; Flow rate: 50 mL/min; Gradient: 20 B to 40 B in 40 min; 254/220 nm to afford (1R,11R)-18-(difluoromethoxy)-5-[4-(dimethylphosphoryl)-2-fluorophenyl]-6-fluoro-12-methyl-2,9,12-triazapentacyclo[9.8.1.0^{2,10}.0^{3,8}.0^{14,19}]icosa-3(8),4,6,9,14(19),15,17-heptaen-13-one (30 mg, 39%) as a white solid. MS ESI calculated for $C_{27}H_{22}F_4N_3O_3P$ $[M+H]^+$, 544.13, found 544.20. $^1$H NMR (400 MHz, Chloroform-d) δ 8.52-

8.48 (m, 1H), 7.58-7.28 (m, 7H), 6.78 (t, J=73.0 Hz, 1H), 6.27-6.23 (m, 1H), 5.00-4.96 (m, 1H), 3.55-3.44 (m, 4H), 2.91-2.85 (m, 1H), 1.83-1.78 (m, 6H). $^{19}$F NMR (377 MHz, Chloroform-d) δ −80.19, −80.64, −81.04, −81.49, −113.44, −113.48, −120.55, −120.59. $^{31}$P NMR (162 MHz, Chloroform-d) δ 33.69.

Example 59: (7R,14R)-1-(difluoromethoxy)-11-(4-(dimethylphosphoryl)-3-fluorophenyl)-10-fluoro-6-(methyl-d3)-6,7-dihydro-7,14-methanobenzo[f]benzo[4,5]imidazo[1,2-a][1,4]diazocin-5(14H)-one

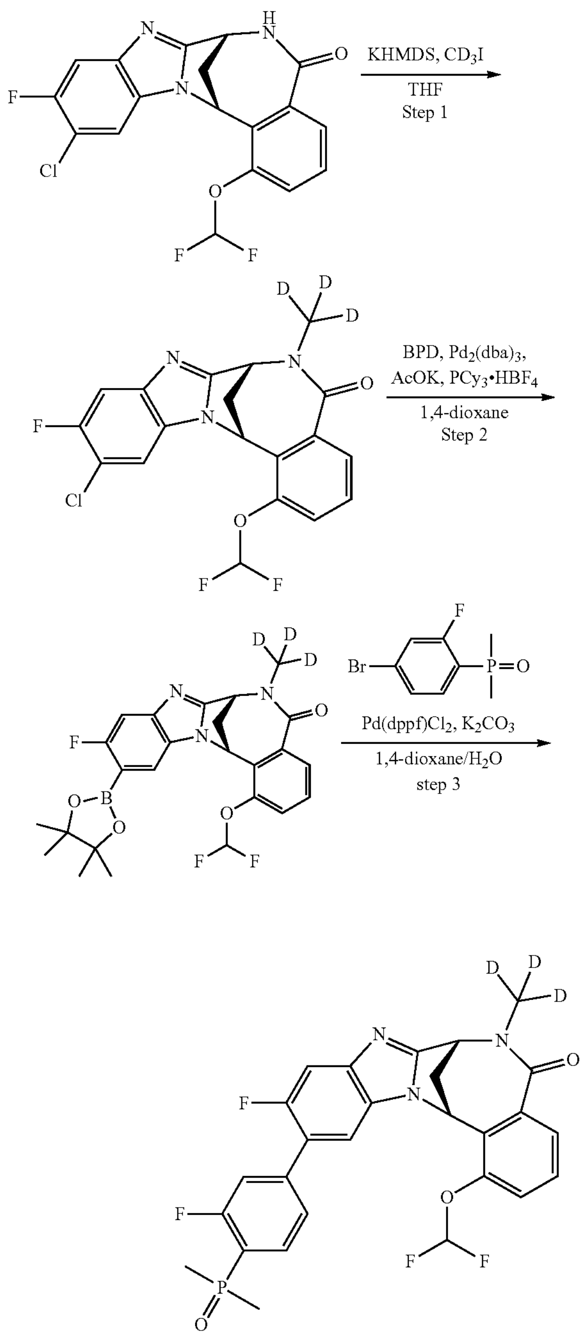

Preparation 59A: (7R,14R)-11-chloro-1-(difluoromethoxy)-10-fluoro-6-(methyl-d3)-6,7-dihydro-7,14-methanobenzo[f]benzo[4,5]imidazo[1,2-a][1,4]diazocin-5(14H)-one

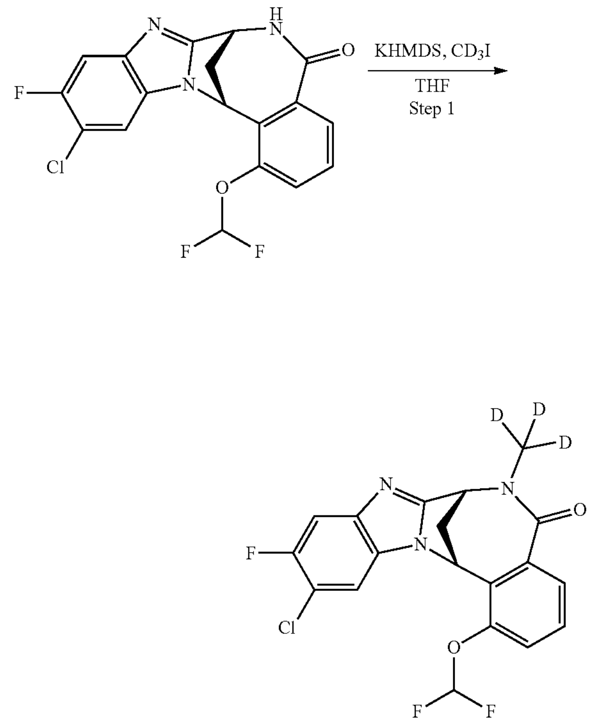

To a stirred solution of (1R,11R)-5-chloro-18-(difluoromethoxy)-6-fluoro-2,9,12-triazapentacyclo[9.8.1.0^{2,10}.0^{3,8}.0^{14,19}]icosa-3(8),4,6,9,14(19),15,17-heptaen-13-one (400 mg, 1.016 mmol) in dry THF (10 mL) was added 1N of KHMDS (1.22 mL, 1.219 mmol) in THF dropwise at −78° C. under nitrogen atmosphere. The resulting solution was stirred for 1 h at −78° C. under nitrogen atmosphere. To the above solution was added $CD_3I$ (295 mg, 2.032 mmol) dropwise over 2 min at −78° C. The resulting mixture was allowed to warm slowly to room temperature. The resulting mixture was stirred for 3 h at room temperature under nitrogen atmosphere. The reaction was quenched by the addition of sat. $NH_4Cl$ (aq.) (5 mL) at room temperature. The resulting mixture was concentrated under reduced pressure. The residue was purified by silica gel column chromatography, eluted with $CH_2Cl_2$/MeOH (10/1) to afford (7R,14R)-11-chloro-1-(difluoromethoxy)-10-fluoro-6-(methyl-d3)-6,7-dihydro-7,14-methanobenzo[f]benzo[4,5]imidazo[1,2-a][1,4]diazocin-5(14H)-one (380 mg, 91%) as an off-white solid. MS ESI calculated for $C_{19}H_{10}D_3ClF_3N_3O_2$ $[M+H]^+$, 411.08, found 410.90. $^1$H NMR (400 MHz, Chloroform-d) δ 8.50 (d, J=8.2 Hz, 1H), 7.53-7.42 (m, 3H), 7.37-7.31 (m, 1H), 6.84 (t, J=72.7 Hz, 1H), 6.21 (d, J=7.2 Hz, 1H), 4.97 (d, J=7.2 Hz, 1H), 3.51-3.41 (m, 1H), 2.87 (d, J=13.6 Hz, 1H). $^{19}$F NMR (376 MHz, Chloroform-d) δ −80.21, −80.65, −80.99, −81.43, −120.18.

Preparation 59B: (7R,14R)-1-(difluoromethoxy)-10-fluoro-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one

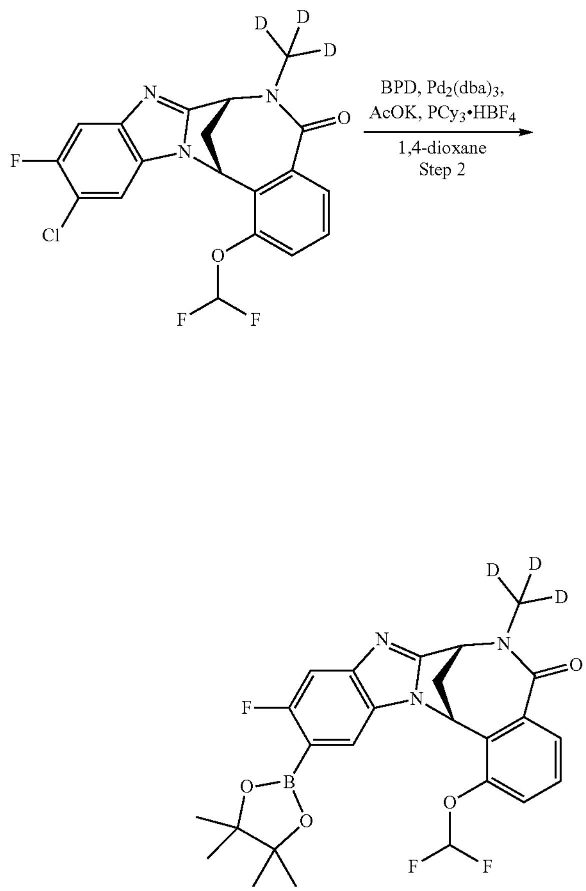

To a stirred mixture of (7R,14R)-11-chloro-1-(difluoromethoxy)-10-fluoro-6-(methyl-d3)-6,7-dihydro-7,14-methanobenzo[f]benzo[4,5]imidazo[1,2-a][1,4]diazocin-5(14H)-one (380 mg, 0.925 mmol), KOAc (272 mg, 2.775 mmol) and BPD (470 mg, 1.850 mmol) in 1,4-dioxane (10 mL) were added $PCy_3$·$HBF_4$ (51 mg, 0.139 mmol) and $Pd_2(dba)_3$ (85 mg, 0.093 mmol) at room temperature under nitrogen atmosphere. The resulting mixture was stirred for 16 h at 140° C. under nitrogen atmosphere. The resulting mixture was concentrated under reduced pressure. The residue was purified by silica gel column chromatography, eluted with EtOAc/EtOH/PE (3/1/6) to afford (7R,14R)-1-(difluoromethoxy)-10-fluoro-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (370 mg, 80%) as an off-white solid. MS ESI calculated for $C_{25}H_{22}D_3BF_3N_3O_4$ $[M+H]^+$, 503.21, found 503.30.

Example 59: (7R,14R)-1-(difluoromethoxy)-11-(4-(dimethylphosphoryl)-3-fluorophenyl)-10-fluoro-6-(methyl-d3)-6,7-dihydro-7,14-methanobenzo[f]benzo[4,5]imidazo[1,2-a][1,4]diazocin-5(14H)-one

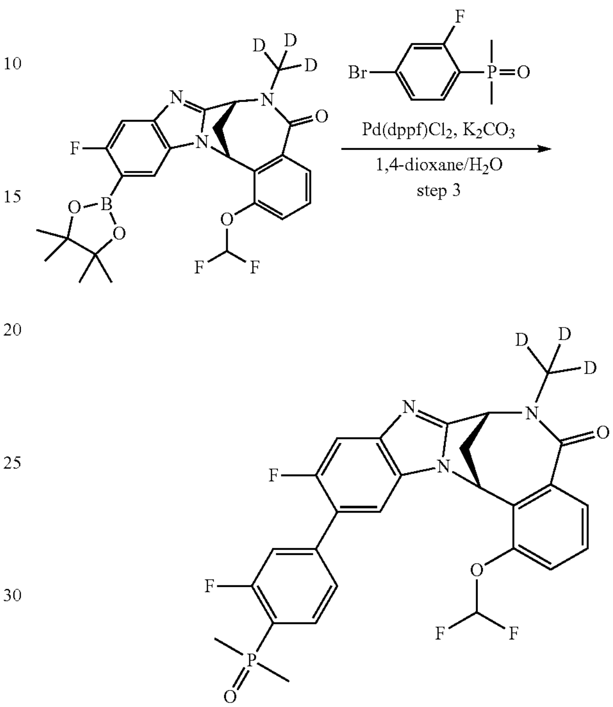

To a stirred solution of (7R,14R)-1-(difluoromethoxy)-10-fluoro-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.119 mmol) and 4-bromo-1-(dimethylphosphoryl)-2-fluorobenzene (45 mg, 0.178 mmol) in 1,4-dioxane (1 mL) and $H_2O$ (0.2 mL) were added $K_2CO_3$ (41 mg, 0.297 mmol) and $Pd(dppf)Cl_2$·$CH_2Cl_2$ (10 mg, 0.012 mmol) at room temperature under nitrogen atmosphere. The resulting mixture was stirred for 3 h at 80° C. under nitrogen atmosphere. The resulting mixture was concentrated under reduced pressure. The residue was purified by silica gel column chromatography, eluted with $CH_2Cl_2$/MeOH (15/1) followed by reversed-phase flash chromatography with the following conditions: column, C18 silica gel; mobile phase, $CH_3CN$ in water (10 mmol/L $NH_4HCO_3$), 25% to 40% gradient in 30 min; detector, 254 nm. This resulted in (7R,14R)-1-(difluoromethoxy)-11-(4-(dimethylphosphoryl)-3-fluorophenyl)-10-fluoro-6-(methyl-d3)-6,7-dihydro-7,14-methanobenzo[f]benzo[4,5]imidazo[1,2-a][1,4]diazocin-5(14H)-one (22 mg, 34%) as a white solid. MS ESI calculated for $C_{27}H_{19}D_3F_4N_3O_3P$ $[M+H]^+$, 547.15, found 547.00. $^1H$ NMR (400 MHz, Chloroform-d) δ 8.53-8.46 (m, 1H), 8.10-8.01 (m, 1H), 7.60-7.50 (m, 2H), 7.50-7.41 (m, 2H), 7.37-7.29 (m, 2H), 6.83 (t, J=72.8 Hz, 1H), 6.29 (d, J=7.0 Hz, 1H), 5.05 (d, J=7.0 Hz, 1H), 3.57-3.45 (m, 1H), 2.91 (d, J=13.6 Hz, 1H), 1.87 (s, 3H), 1.83 (s, 3H). $^{19}F$ NMR (377 MHz, Chloroform-d) δ −80.37, −80.82, −80.95, −81.39, −105.97, −105.98, −121.63. $^{31}P$ NMR (162 MHz, Chloroform-d) δ 30.43.

Example 60: (7R,14R)-1-(difluoromethoxy)-11-(4-(dimethylphosphoryl)-3,5-difluorophenyl)-6-(methyl-d3)-6,7-dihydro-7,14-methanobenzo[f]benzo[4,5]imidazo[1,2-a][1,4]diazocin-5(14H)-one

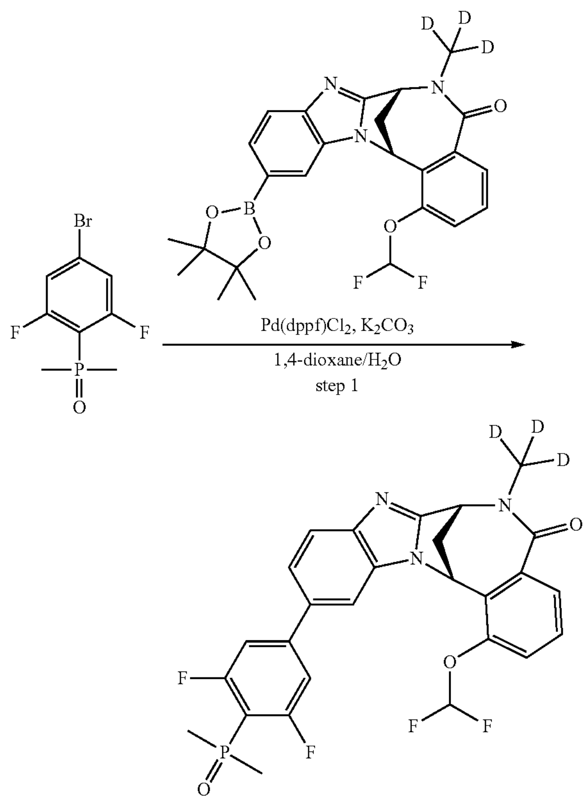

A mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol), 5-bromo-2-(dimethylphosphoryl)-1,3-difluorobenzene (36 mg, 0.134 mmol), $K_2CO_3$ (43 mg, 0.309 mmol) and Pd(dppf)$Cl_2 \cdot CH_2Cl_2$ (8 mg, 0.010 mmol) in 1,4-dioxane (1 mL) and $H_2O$ (0.2 mL) was stirred for 2 h at 80° C. under nitrogen atmosphere. The resulting mixture was concentrated under reduced pressure. The residue was purified by silica gel column chromatography, eluted with $CH_2Cl_2$/MeOH (8:1) followed by reversed-phase flash chromatography with the following conditions: column, C18 silica gel; mobile phase, $CH_3CN$ in water (10 mmol/L $NH_4HCO_3$), 20% to 50% gradient in 30 min; detector, 254 nm. This resulted in (7R,14R)-1-(difluoromethoxy)-11-(4-(dimethylphosphoryl)-3,5-difluorophenyl)-6-(methyl-d3)-6,7-dihydro-7,14-methanobenzo[f]benzo[4,5]imidazo[1,2-a][1,4]diazocin-5(14H)-one (30 mg, 53%) as a white solid. MS ESI calculated for $C_{27}H_{19}D_3F_4N_3O_3P$ $[M+H]^+$, 547.15, found 547.00. $^1$H NMR (400 MHz, Chloroform-d) δ 8.52-8.47 (m, 1H), 7.81 (d, J=8.5 Hz, 1H), 7.72 (d, J=1.8 Hz, 1H), 7.51-7.40 (m, 2H), 7.36-7.29 (m, 1H), 7.24-7.15 (m, 2H), 6.88 (t, J=72.9 Hz, 1H), 6.31 (d, J=7.2 Hz, 1H), 5.02 (d, J=7.1 Hz, 1H), 3.55-3.45 (m, 1H), 2.92 (d, J=13.6 Hz, 1H), 1.98 (s, 3H), 1.94 (s, 3H). $^{19}$F NMR (377 MHz, Chloroform-d) δ −80.37, −80.82, −80.88, −81.32, −101.77. $^{31}$P NMR (162 MHz, Chloroform-d) δ 30.79.

Example 61: (7R,14R)-1-(difluoromethoxy)-11-(4-(dimethylphosphoryl)-2-fluorophenyl)-10-fluoro-6-(methyl-d3)-6,7-dihydro-7,14-methanobenzo[f]benzo[4,5]imidazo[1,2-a][1,4]diazocin-5(14H)-one

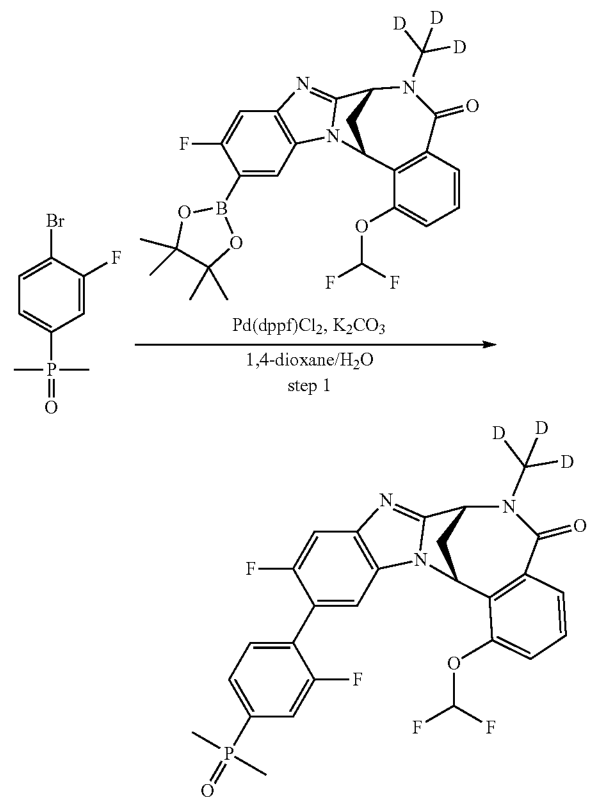

To a stirred solution of (7R,14R)-1-(difluoromethoxy)-10-fluoro-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.119 mmol) and 1-bromo-4-(dimethylphosphoryl)-2-fluorobenzene (45 mg, 0.178 mmol) in 1,4-dioxane (1 mL) and $H_2O$ (0.2 mL) were added $K_2CO_3$ (41 mg, 0.297 mmol) and Pd(dppf)$Cl_2 \cdot CH_2Cl_2$ (10 mg, 0.012 mmol) at room temperature under nitrogen atmosphere. The resulting mixture was stirred for 3 h at 80° C. under nitrogen atmosphere. The resulting mixture was concentrated under reduced pressure. The residue was purified by silica gel column chromatography, eluted with $CH_2Cl_2$/MeOH (15/1) followed by reversed-phase flash chromatography with the following conditions: column, C18 silica gel; mobile phase, $CH_3CN$ in water (10 mmol/L $NH_4HCO_3$), 25% to 40% gradient in 30 min; detector, 254 nm. This resulted in (7R,14R)-1-(difluoromethoxy)-11-(4-(dimethylphosphoryl)-2-fluorophenyl)-10-fluoro-6-(methyl-d3)-6,7-dihydro-7,14-methanobenzo[f]benzo[4,5]imidazo[1,2-a][1,4]diazocin-5(14H)-one (21 mg, 32%) as a white solid. MS ESI calculated for $C_{27}H_{19}D_3F_4N_3O_3P$ $[M+H]^+$, 547.15, found 547.05. $^1$H NMR (400 MHz, Chloroform-d) δ 8.54-8.48 (m, 1H), 7.64-7.49 (m, 5H), 7.45 (t, J=8.2 Hz, 1H), 7.32 (d, J=8.1 Hz, 1H), 6.79 (t, J=72.7 Hz, 1H), 6.30 (d, J=7.1 Hz, 1H), 5.09 (d, J=7.0 Hz, 1H), 3.58-3.47 (m, 1H), 2.91 (d, J=13.5 Hz, 1H), 1.82 (s, 3H), 1.79 (s, 3H). $^{19}$F NMR (377 MHz, Chloroform-d) δ −80.29, −80.73, −81.04, −81.49, −113.52, −113.53, −113.56, −113.57, −118.96. $^{31}$P NMR (162 MHz, Chloroform-d) δ 32.98.

Example 62: (1R,11R)-18-(difluoromethoxy)-5-[4-(dimethylphosphoryl)-2,6-difluorophenyl]-12-methyl-2,9,12-triazapentacyclo[9.8.1.0^{2,10}.0^{3,8}.0^{14,19}]icosa-3(8),4,6,9,14(19),15,17-heptaen-13-one

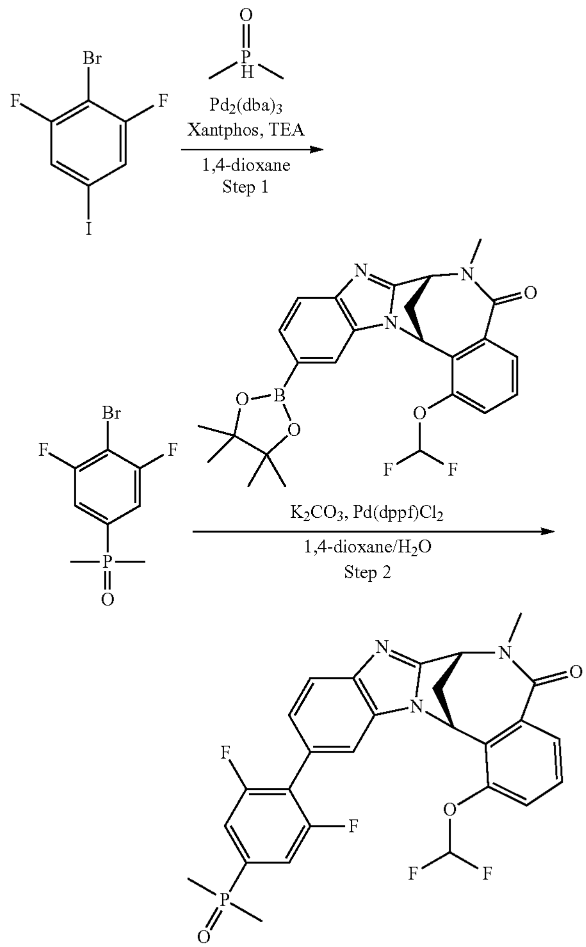

Preparation 62A: 2-bromo-5-(dimethylphosphoryl)-1,3-difluorobenzene

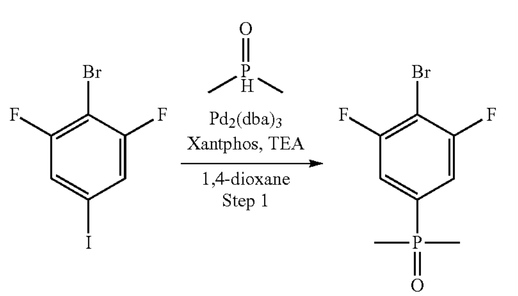

A mixture of 2-bromo-1,3-difluoro-5-iodobenzene (1.00 g, 3.136 mmol), (methylphosphonoyl)methane (367 mg, 4.704 mmol), $Pd_2(dba)_3$ (143 mg, 0.157 mmol), XantPhos (181 mg, 0.314 mmol) and TEA (476 mg, 4.704 mmol) in 1,4-dioxane (10 mL) was stirred for 2 h at 80° C. under nitrogen atmosphere. The mixture was allowed to cool down to room temperature. The resulting mixture was concentrated under vacuum. The residue was purified by silica gel column chromatography, eluted with $CH_2Cl_2$/MeOH (12/1) to afford 2-bromo-5-(dimethylphosphoryl)-1,3-difluorobenzene (500 mg, 59%) as a white solid. MS ESI calculated for $C_8H_8BrF_2OP$ $[M+H]^+$, 268.95, 270.95, found 268.80, 270.80. $^1H$ NMR (300 MHz, DMSO-$d_6$) δ 7.70-7.60 (m, 2H), 1.73 (s, 3H), 1.69 (s, 3H).

Example 62: (1R,11R)-18-(difluoromethoxy)-5-[4-(dimethylphosphoryl)-2,6-difluorophenyl]-12-methyl-2,9,12-triazapentacyclo[9.8.1.0^{2,10}.0^{3,8}.0^{14,19}]icosa-3(8),4,6,9,14(19),15,17-heptaen-13-one

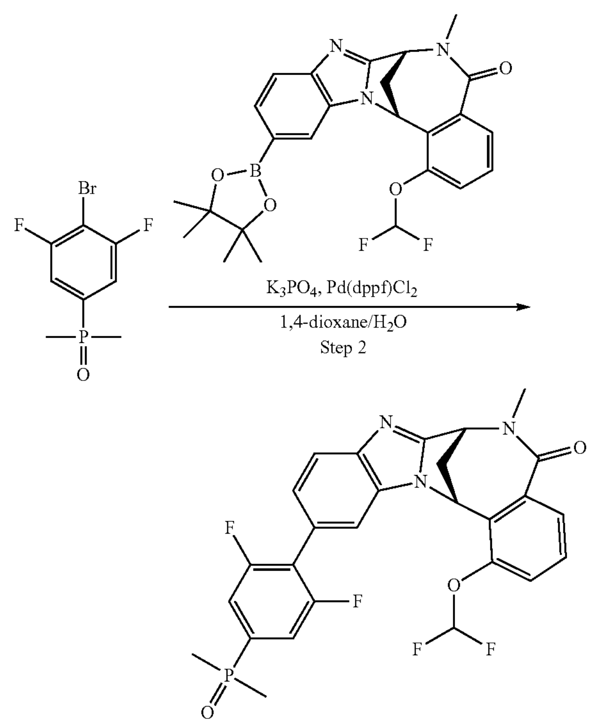

A mixture of 2-bromo-5-(dimethylphosphoryl)-1,3-difluorobenzene (40 mg, 0.150 mmol), (1R,11R)-18-(difluoromethoxy)-12-methyl-5-(4,4,5,5-tetramethyl-1,3,2-dioxaborolan-2-yl)-2,9,12-triazapentacyclo[9.8.1.0^{2,10}.0^{3,8}.0^{14,19}]icosa-3(8),4,6,9,14(19),15,17-heptaen-13-one (60 mg, 0.125 mmol), $K_3PO_4$ (79 mg, 0.375 mmol) and $Pd(dppf)Cl_2 \cdot CH_2Cl_2$ (10 mg, 0.013 mmol) in 1,4-dioxane (1 mL) and $H_2O$ (0.2 mL) was stirred for 16 h at 80° C. under nitrogen atmosphere. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (10 mmol/L $NH_4HCO_3$), Mobile Phase B: $CH_3CN$; Flow rate: 60 mL/min; Gradient: 30% B to 70% B in 20 min;

254/220 nm to afford (1R,11R)-18-(difluoromethoxy)-5-[4-(dimethylphosphoryl)-2,6-difluorophenyl]-12-methyl-2,9,12-triazapentacyclo[9.8.1.0^{2,10}.0^{3,8}.0^{14,19}]icosa-3(8),4,6,9,14(19),15,17-heptaen-13-one (33 mg, 49%) as a white solid. MS ESI calculated for $C_{27}H_{22}F_4N_3O_3P$ $[M+H]^+$, 544.13, found 544.05. $^1H$ NMR (300 MHz, Chloroform-d) δ 8.54-8.51 (m, 1H), 7.85 (d, J=8.6 Hz, 1H), 7.67 (s, 1H), 7.49-7.36 (m, 4H), 7.32 (d, J=7.8 Hz, 1H), 7.05-6.57 (m, 1H), 6.32 (d, J=7.2 Hz, 1H), 5.06 (d, J=7.2 Hz, 1H), 3.57 (s, 3H), 3.54-3.47 (m, 1H), 2.93 (d, J=13.7 Hz, 1H), 1.84 (s, 3H), 1.80 (s, 3H); $^{19}F$ NMR (282 MHz, Chloroform-d) δ −79.50, −80.10, −81.25, −81.85, −111.80, −111.81. $^{31}P$ NMR (121 MHz, Chloroform-d) δ 32.85.

Example 63: (7R,14R)-1-(difluoromethoxy)-11-(4-(dimethylphosphoryl)-2,6-difluorophenyl)-6-(methyl-d3)-6,7-dihydro-7,14-methanobenzo[f]benzo[4,5]imidazo[1,2-a][1,4]diazocin-5(14H)-one

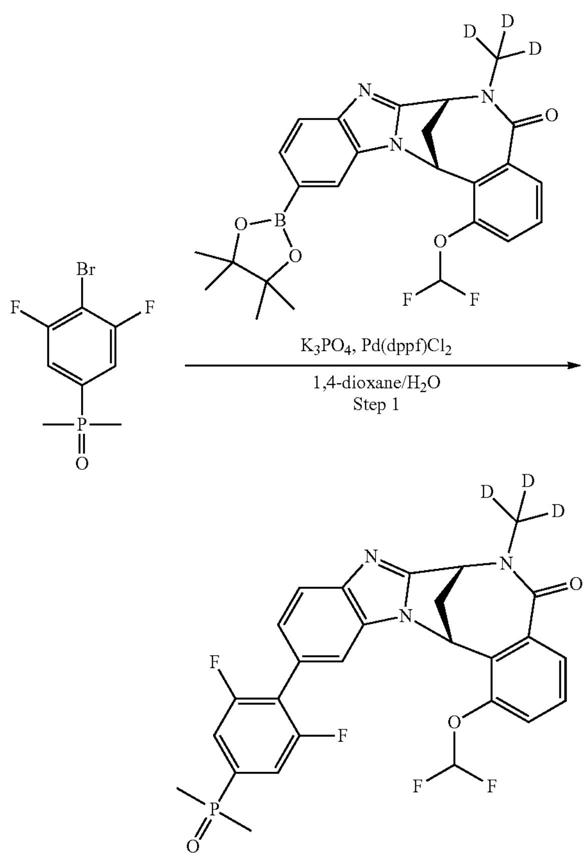

A mixture of 2-bromo-5-(dimethylphosphoryl)-1,3-difluorobenzene (53 mg, 0.198 mmol), (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (80 mg, 0.165 mmol), $K_3PO_4$ (105 mg, 0.495 mmol) and Pd(dppf)$Cl_2 \cdot CH_2Cl_2$ (13 mg, 0.017 mmol) in 1,4-dioxane (1 mL) and $H_2O$ (0.2 mL) was stirred for 16 h at 80° C. under nitrogen atmosphere. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (10 mmol/L $NH_4HCO_3$), Mobile Phase B: $CH_3CN$; Flow rate: 60 mL/min; Gradient: 30% B to 70% B in 20 min; 254/220 nm to afford (7R,14R)-1-(difluoromethoxy)-11-(4-(dimethylphosphoryl)-2,6-difluorophenyl)-6-(methyl-d3)-6,7-dihydro-7,14-methanobenzo[f]benzo[4,5]imidazo[1,2-a][1,4]diazocin-5(14H)-one (22 mg, 23%) as a white solid. MS ESI calculated for $C_{27}H_{19}D_3F_4N_3O_3P$ $[M+H]^+$, 547.15, found 547.00. $^1H$ NMR (300 MHz, Chloroform-d) δ 8.51-8.49 (m, 1H), 7.83 (d, J=8.6 Hz, 1H), 7.65 (s, 1H), 7.45-7.36 (m, 4H), 7.30 (d, J=7.8 Hz, 1H), 6.96-6.60 (m, 1H), 6.30 (d, J=7.2 Hz, 1H), 5.04 (d, J=7.2 Hz, 1H), 3.53-3.45 (m, 1H), 2.91 (d, J=13.7 Hz, 1H), 1.82 (s, 3H), 1.79 (s, 3H); $^{19}F$ NMR (282 MHz, Chloroform-d) δ −79.61, −80.06, −81.31, −81.76, −111.78, −111.79. $^{31}P$ NMR (121 MHz, Chloroform-d) δ 32.82.

Example 64: (7R,14R)-1-(difluoromethoxy)-11-(4-(dimethylphosphoryl)phenyl)-10-fluoro-6-(methyl-d3)-6,7-dihydro-7,14-methanobenzo[f]benzo[4,5]imidazo[1,2-a][1,4]diazocin-5(14H)-one Synthetic Scheme

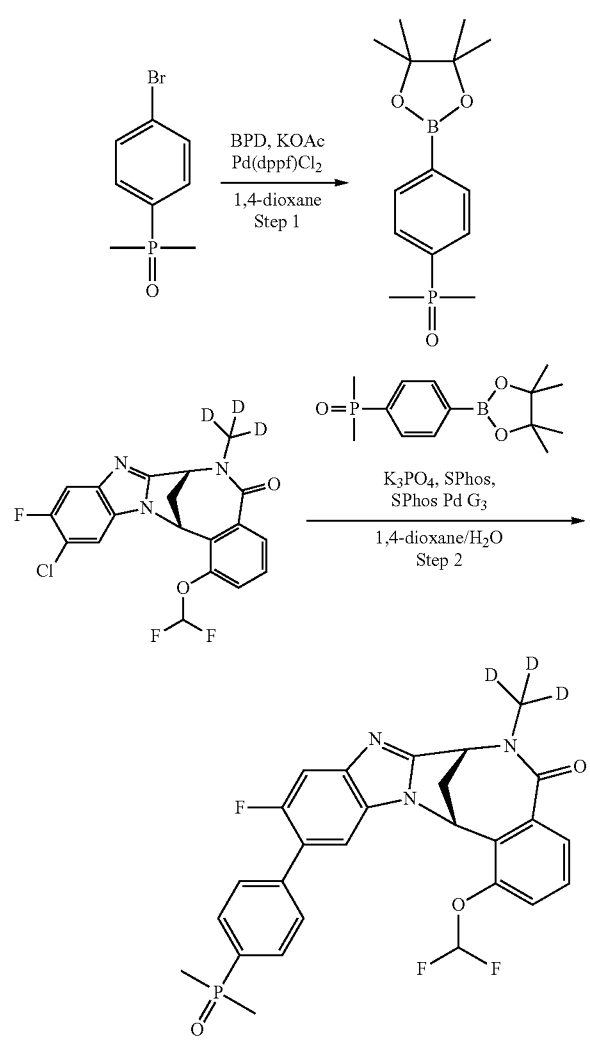

Preparation 64A: 2-[4-(dimethylphosphoryl)phenyl]-4,4,5,5-tetramethyl-1,3,2-dioxaborolane

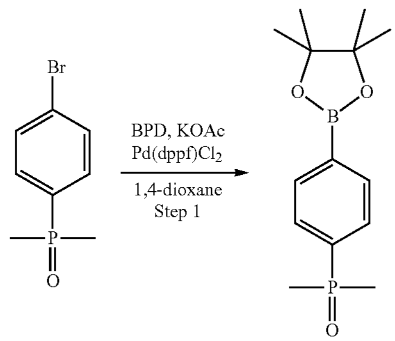

To a stirred mixture of 1-bromo-4-(dimethylphosphoryl)benzene (900 mg, 3.862 mmol), bis(pinacolato)diboron (1.27 g, 5.021 mmol) and KOAc (1.14 g, 11.586 mmol) in 1,4-dioxane (10 mL) was added Pd(dppf)$Cl_2$·$CH_2Cl_2$ (141 mg, 0.193 mmol) at room temperature under nitrogen atmosphere. The resulting mixture was stirred for 12 h at 60° C. under nitrogen atmosphere. The mixture was allowed to cool down to room temperature. The resulting mixture was concentrated under reduced pressure. The residue was purified by silica gel column chromatography, eluted with $CH_2Cl_2$/MeOH (10/1) to afford 2-[4-(dimethylphosphoryl)phenyl]-4,4,5,5-tetramethyl-1,3,2-dioxaborolane (600 mg, 55%) as a yellow solid. MS ESI calculated for $C_{14}H_{22}BO_3P$ $[M+H]^+$, 281.14, found 281.25.

Example 64: (7R,14R)-1-(difluoromethoxy)-11-(4-(dimethylphosphoryl)phenyl)-10-fluoro-6-(methyl-d3)-6,7-dihydro-7,14-methanobenzo[f]benzo[4,5]imidazo[1,2-a][1,4]diazocin-5(14H)-one

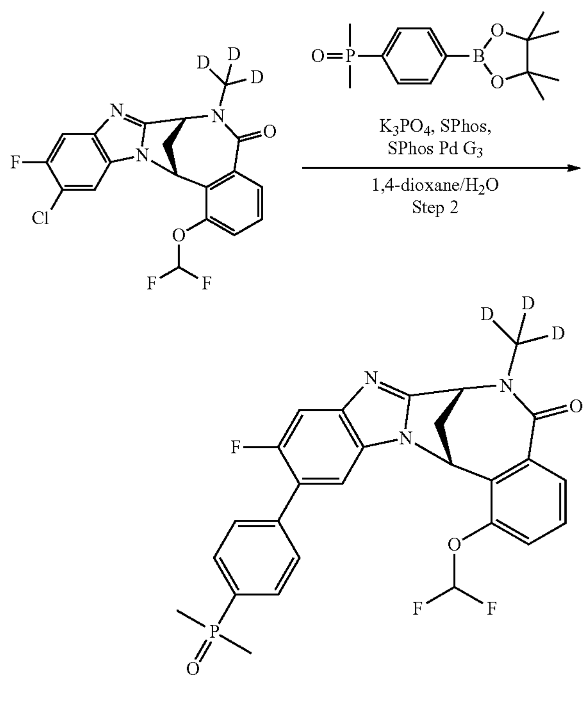

To a stirred solution of (7R,14R)-11-chloro-1-(difluoromethoxy)-10-fluoro-6-(methyl-d3)-6,7-dihydro-7,14-methanobenzo[f]benzo[4,5]imidazo[1,2-a][1,4]diazocin-5(14H)-one (50 mg, 0.122 mmol) and 2-[4-(dimethylphosphoryl)phenyl]-4,4,5,5-tetramethyl-1,3,2-dioxaborolane (68 mg, 0.244 mmol) in 1,4-dioxane (1 mL) and $H_2O$ (0.2 mL) were added $K_3PO_4$ (51 mg, 0.244 mmol), SPhos (5 mg, 0.012 mmol) and SPhos Pd G3 (4 mg, 0.006 mmol) at room temperature under nitrogen atmosphere. The mixture was stirred for 2 h at 80° C. The resulting mixture was concentrated under vacuum. The residue was purified by silica gel column chromatography, eluted with DCM/MeOH (0% to 10%) followed by Prep-HPLC with the following conditions. Column: C18 Column 120 g; Mobile Phase A: water (10 mmol/L $NH_4HCO_3$), Mobile Phase B: $CH_3CN$; Flow rate: 60 mL/min; Gradient: 30% B to 70% B in 20 min; 254/220 nm to afford (7R,14R)-1-(difluoromethoxy)-11-(4-(dimethylphosphoryl)phenyl)-10-fluoro-6-(methyl-d3)-6,7-dihydro-7,14-methanobenzo[f]benzo[4,5]imidazo[1,2-a][1,4]diazocin-5(14H)-one (38 mg, 58%) as a white solid. MS ESI calculated for $C_{27}H_{20}D_3F_3N_3O_3P$ $[M+H]^+$, 529.16, found 529.05. $^1H$ NMR (400 MHz, Chloroform-d) δ 8.50 (d, J=8.2 Hz, 1H), 7.85-7.80 (m, 2H), 7.66 (d, J=8.0 Hz, 2H), 7.57-7.50 (m, 2H), 7.44 (t, J=8.2 Hz, 1H), 7.32 (d, J=8.1 Hz, 1H), 6.81 (t, J=72.8 Hz, 1H), 6.28 (d, J=7.1 Hz, 1H), 5.04 (d, J=7.1 Hz, 1H), 3.55-3.47 (m, 1H), 2.90 (d, J=13.6 Hz, 1H), 1.81 (s, 3H), 1.78 (s, 3H). $^{19}F$ NMR (377 MHz, Chloroform-d) δ −80.84, −80.85, −121.98.

Example 65: (7R,14R)-1-(difluoromethoxy)-11-(4-(dimethylphosphoryl)phenyl)-6-(methyl-d3)-6,7-dihydro-7,14-methanobenzo[f]benzo[4,5]imidazo[1,2-a][1,4]diazocin-5(14H)-one

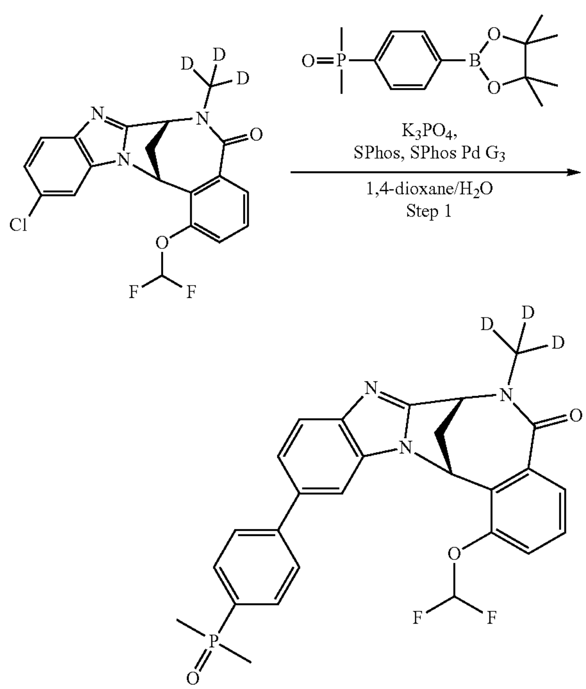

To a stirred solution of (7R,14R)-11-chloro-1-(difluoromethoxy)-6-(methyl-d3)-6,7-dihydro-7,14-methanobenzo[f]benzo[4,5]imidazo[1,2-a][1,4]diazocin-5(14H)-one (50 mg, 0.127 mmol) and 1-[4-(dimethylphosphoryl)phenyl]-3, 3,4,4-tetramethyl-1lambda3,2,5-bromadioxolane (88 mg, 0.254 mmol) in 1,4-dioxane (1 mL) and $H_2O$ (0.2 mL) were added $K_3PO_4$ (54 mg, 0.254 mmol), SPhos (5 mg, 0.013 mmol) and SPhos Pd G3 (4 mg, 0.006 mmol) at room temperature under nitrogen atmosphere. The mixture was stirred for 2 h at 80° C. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (10 mmol/L $NH_4HCO_3$), Mobile Phase B: $CH_3CN$; Flow rate: 60 mL/min; Gradient: 30% B to 70% B in 20 min; 254/220 nm to afford (7R,14R)-1-(difluoromethoxy)-11-(4-(dimethylphosphoryl)phenyl)-6-(methyl-d3)-6,7-dihydro-7,14-methanobenzo[f]benzo[4,5]imidazo[1,2-a][1,4]diazocin-5(14H)-one (40 mg, 61%) as a white solid. MS ESI calculated for $C_{27}H_{21}D_3F_2N_3O_3P$ $[M+H]^+$, 511.17, found 511.10. $^1H$ NMR (400 MHz, Chloroform-d) δ 8.50 (d, J=8.1 Hz, 1H), 7.88-7.68 (m, 6H), 7.55 (d, J=8.4 Hz, 1H), 7.44 (t, J=8.2 Hz, 1H), 7.32 (d, J=8.2 Hz, 1H), 6.85 (t, J=72.9 Hz, 1H), 6.34 (s, 1H), 5.10 (s, 1H), 3.52 (s, 1H), 2.92 (d, J=12.8 Hz, 1H), 1.81 (s, 3H), 1.78 (s, 3H). $^{19}F$ NMR (377 MHz, Chloroform-d) δ −80.73.

Example 66: (7R,14R)-1-(difluoromethoxy)-11-(4-(dimethylphosphoryl)-3-fluorophenyl)-10-fluoro-6,7-dihydro-7,14-methanobenzo[f]benzo[4,5]imidazo[1,2-a][1,4]diazocin-5(14H)-one

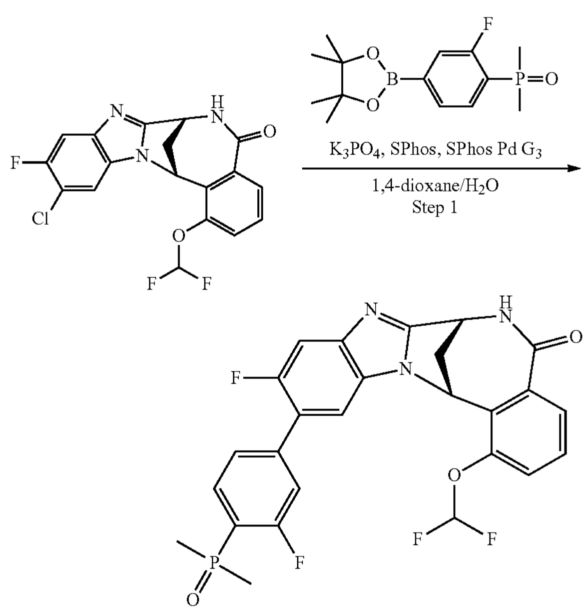

To a stirred solution of (7R,14R)-11-chloro-1-(difluoromethoxy)-10-fluoro-6,7-dihydro-7,14-methanobenzo[f]benzo[4,5]imidazo[1,2-a][1,4]diazocin-5(14H)-one (30 mg, 0.076 mmol) and 2-[4-(dimethylphosphoryl)-3-fluorophenyl]-4,4,5,5-tetramethyl-1,3,2-dioxaborolane (30 mg, 0.099 mmol) in 1,4-dioxane (1 mL) and $H_2O$ (0.2 mL) were added SPhos Pd G3 (6 mg, 0.008 mmol), SPhos (6 mg, 0.015 mmol) and $K_3PO_4$ (48 mg, 0.228 mmol) at room temperature. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (10/1) followed by reversed-phase flash chromatography with the following conditions: column, C18 silica gel; mobile phase, $CH_3CN$ in Water (10 mmol/L $NH_4HCO_3$), 30% to 50% gradient in 20 min. This resulted in (7R,14R)-1-(difluoromethoxy)-11-(4-(dimethylphosphoryl)-3-fluorophenyl)-10-fluoro-6,7-dihydro-7,14-methanobenzo[f]benzo[4,5]imidazo[1,2-a][1,4]diazocin-5(14H)-one (17 mg, 41%) as a white solid. MS ESI calculated for $C_{26}H_{20}F_4N_3O_3P$ $[M+H]^+$, 530.12, found 530.05. $^1H$ NMR (400 MHz, Chloroform-d) δ 8.48-8.42 (m, 1H), 8.11-8.02 (m, 1H), 7.67 (d, J=6.5 Hz, 1H), 7.63-7.55 (m, 2H), 7.52-7.28 (m, 4H), 6.85 (t, J=72.6 Hz, 1H), 6.44 (d, J=6.8 Hz, 1H), 5.31-5.20 (m, 1H), 3.67-3.54 (m, 1H), 2.93 (d, J=13.3 Hz, 1H), 1.87 (s, 3H), 1.84 (s, 3H). $^{19}F$ NMR (377 MHz, Chloroform-d) δ −80.41, −80.86, −81.21, −81.64, −105.78, −105.79, −119.77.

Example 67: (7R,14R)-1-(difluoromethoxy)-11-(4-((dimethylphosphoryl)methyl)-2-fluorophenyl)-6-(methyl-d3)-6,7-dihydro-7,14-methanobenzo[f]benzo[4,5]imidazo[1,2-a][1,4]diazocin-5(14H)-one Synthetic Scheme

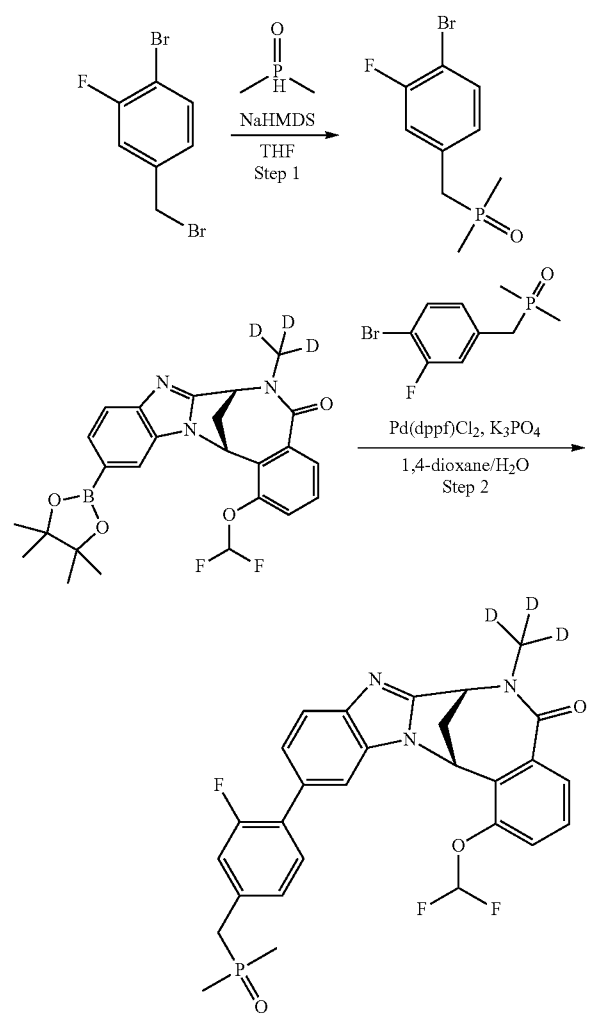

Preparation 67A: 1-bromo-4-[(dimethylphosphoryl) methyl]-2-fluorobenzene

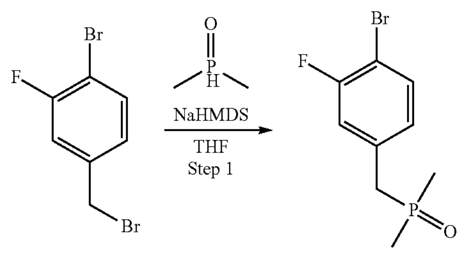

A solution of (methylphosphonoyl)methane (160 mg, 2.053 mmol) in THF (4 mL) was treated with 2 M NaHMDS (0.93 mL, 1.866 mmol) for 15 min at 0° C. under nitrogen atmosphere followed by the addition of 1-bromo-4-(bromomethyl)-2-fluorobenzene (500 mg, 1.866 mmol) in THF (1 mL) dropwise at 0° C. The resulting mixture was stirred for 16 h at room temperature under nitrogen atmosphere. This reaction was quenched with water at room temperature. The resulting mixture was concentrated under reduced pressure. The residue was purified by silica gel column chromatography, eluted with $CH_2Cl_2$/MeOH (10/1) to afford 1-bromo-4-[(dimethylphosphoryl)methyl]-2-fluorobenzene (96 mg, 19%) as a white solid. MS ESI calculated for $C_9H_{11}BrFOP$ $[M+H]^+$, 264.97 266.97, found 264.80 266.80. $^1H$ NMR (400 MHz, Chloroform-d) δ 7.55-7.48 (m, 1H), 7.08-7.05 (m, 1H), 6.97-6.94 (m, 1H), 3.12 (d, J=14.6 Hz, 2H), 1.50 (s, 3H), 1.47 (s, 3H).

Example 67: (7R,14R)-1-(difluoromethoxy)-11-(4-((dimethylphosphoryl)methyl)-2-fluorophenyl)-6-(methyl-d3)-6,7-dihydro-7,14-methanobenzo[f]benzo[4,5]imidazo[1,2-a][1,4]diazocin-5(14H)-one

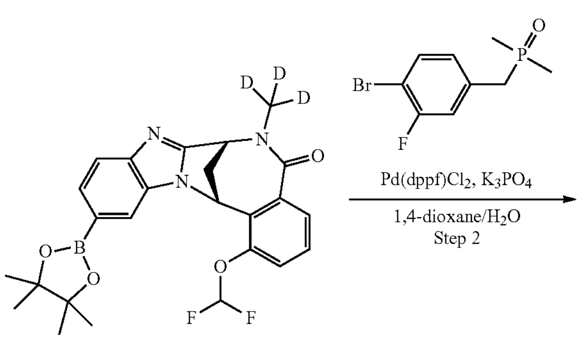

-continued

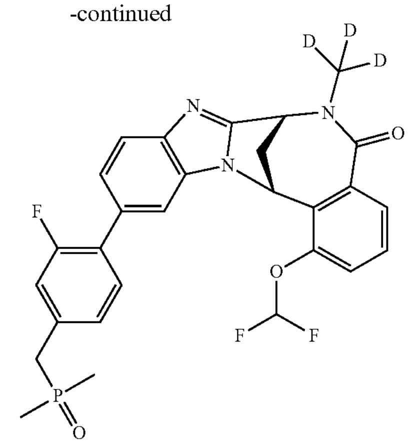

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (40 mg, 0.083 mmol) and 1-bromo-4-[(dimethylphosphoryl)methyl]-2-fluorobenzene (26 mg, 0.100 mmol) in 1,4-dioxane (1 mL) and water (0.2 mL) were added $Pd(dppf)Cl_2 \cdot CH_2Cl_2$ (7 mg, 0.008 mmol) and $K_3PO_4$ (53 mg, 0.249 mmol) at room temperature. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (10/1) followed by reversed-phase flash chromatography with the following conditions: column, C18 silica gel; mobile phase, $CH_3CN$ in Water (10 mmol/L $NH_4HCO_3$), 30% to 50% gradient in 20 min. This resulted in (7R,14R)-1-(difluoromethoxy)-11-(4-((dimethylphosphoryl)methyl)-2-fluorophenyl)-6-(methyl-d3)-6,7-dihydro-7,14-methanobenzo[f]benzo[4,5]imidazo[1,2-a][1,4]diazocin-5(14H)-one (17 mg, 37%) as a white solid. MS ESI calculated for $C_{28}H_{22}D_3F_3N_3O_3P$ $[M+H]^+$, 543.18, found 543.15. $^1H$ NMR (400 MHz, Chloroform-d) δ 8.49 (d, J=8.2 Hz, 1H), 7.79 (d, J=8.5 Hz, 1H), 7.71 (s, 1H), 7.47-7.39 (m, 3H), 7.36-7.30 (m, 1H), 7.16-7.06 (m, 2H), 7.02-6.63 (m, 1H), 6.31 (d, J=7.0 Hz, 1H), 5.07 (d, J=7.0 Hz, 1H), 3.55-3.44 (m, 1H), 3.19 (d, J=14.8 Hz, 2H), 2.90 (d, J=13.5 Hz, 1H), 1.54 (s, 3H), 1.51 (s, 3H). $^{19}F$ NMR (377 MHz, Chloroform-d) δ −79.96, −80.41, −81.41, −81.86, −117.54. $^{31}P$ NMR ((162 MHz, Chloroform-d) δ 40.12.

Example 68: (7R,14R)-1-(difluoromethoxy)-11-(4-((dimethylphosphoryl)methyl)-3-fluorophenyl)-6-(methyl-d3)-6,7-dihydro-7,14-methanobenzo[f]benzo[4,5]imidazo[1,2-a][1,4]diazocin-5(14H)-one Synthetic Scheme

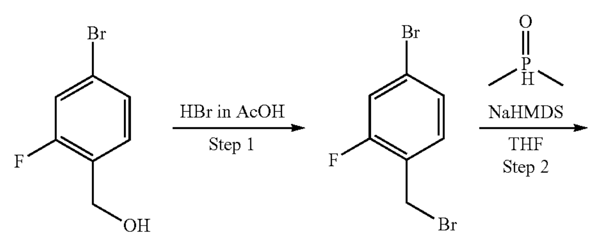

-continued

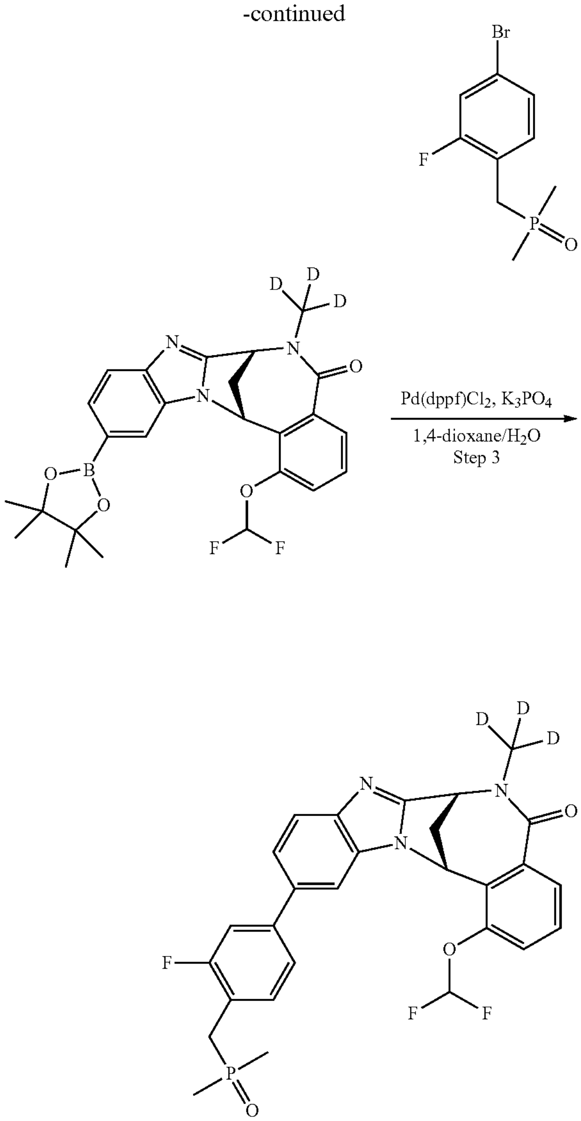

Preparation 68A:
4-bromo-1-(bromomethyl)-2-fluorobenzene

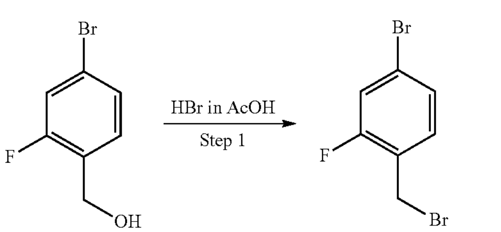 [SMILES: OCc1ccc(Br)cc1F ; "HBr in AcOH" ; "Step 1" ; Fc1cc(Br)ccc1CBr]

A solution of (4-bromo-2-fluorophenyl)methanol (1.00 g, 4.877 mmol) in HBr in AcOH (5 mL) was stirred for 15 min at 100° C. The mixture was allowed to cool down to room temperature. The residue was basified to pH 7 with 2N NaOH (aq.). The resulting mixture was extracted with $CH_2Cl_2$ (2×50 mL). The combined organic layers were dried over anhydrous $Na_2SO_4$. After filtration, the filtrate was concentrated under reduced pressure. The residue was purified by silica gel column chromatography, eluted with PE/EA (10/1) to afford 4-bromo-1-(bromomethyl)-2-fluorobenzene (1.27 g, 97%) as a colorless oil. MS ESI calculated for $C_7H_5Br_2F$ $[M+H]^+$, 266.87 268.87 270.87, found N/A. $^1H$ NMR (400 MHz, Chloroform-d) δ 7.28-7.23 (m, 3H), 4.48-4.44 (m, 2H).

Preparation 68B: 4-bromo-1-[(dimethylphosphoryl) methyl]-2-fluorobenzene

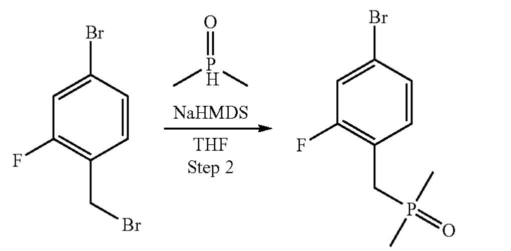

A solution of (methylphosphonoyl)methane (192.27 mg, 2.463 mmol) in THF (10 mL) was treated with NaHDMS (1.12 mL, 2.239 mmol) for 15 min at 0° C. under nitrogen atmosphere followed by the addition of 4-bromo-1-(bromomethyl)-2-fluorobenzene (600 mg, 2.239 mmol) in portions at 0° C. The resulting mixture was stirred for 16 h at room temperature under nitrogen atmosphere. The reaction was quenched with Water at room temperature. The resulting mixture was concentrated under reduced pressure. The residue was purified by silica gel column chromatography, eluted with $CH_2Cl_2$/MeOH (10:1) to afford 4-bromo-1-[(dimethylphosphoryl)methyl]-2-fluorobenzene (188 mg, 31%) as a white solid. MS ESI calculated for $C_9H_{11}BrFOP$ $[M+H]^+$, 264.97 266.97, found 264.80 266.80. $^1H$ NMR (400 MHz, Chloroform-d) δ 7.30-7.23 (m, 3H), 3.17 (d, J=14.9 Hz, 2H), 1.51 (s, 3H), 1.48 (s, 3H).

Example 68: (7R,14R)-1-(difluoromethoxy)-11-(4-((dimethylphosphoryl)methyl)-3-fluorophenyl)-6-(methyl-d3)-6,7-dihydro-7,14-methanobenzo[f]benzo[4,5]imidazo[1,2-a][1,4]diazocin-5(14H)-one

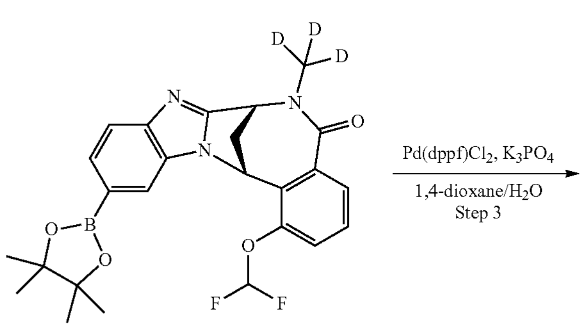

-continued

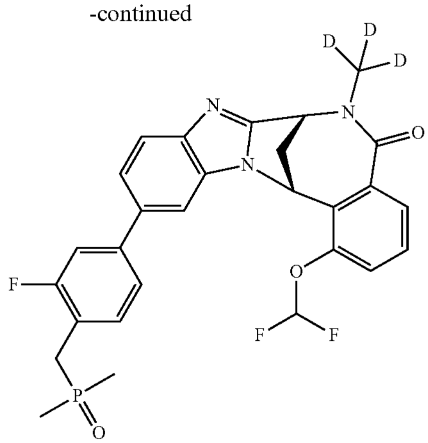

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (140 mg, 0.289 mmol) and 4-bromo-1-[(dimethylphosphoryl)methyl]-2-fluorobenzene (92 mg, 0.347 mmol) in 1,4-dioxane (3 mL) and water (0.6 mL) were added Pd(dppf)$Cl_2$ (24 mg, 0.029 mmol) and $K_3PO_4$ (184 mg, 0.867 mmol) at room temperature. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (10/1) followed by reversed-phase flash chromatography with the following conditions: column, C18 silica gel; mobile phase, $CH_3CN$ in Water (10 mmol/L $NH_4HCO_3$), 35% to 50% gradient in 20 min. This resulted in (7R,14R)-1-(difluoromethoxy)-11-(4-((dimethylphosphoryl)methyl)-3-fluorophenyl)-6-(methyl-d3)-6,7-dihydro-7,14-methanobenzo[f]benzo[4,5]imidazo[1,2-a][1,4]diazocin-5(14H)-one (75 mg, 47%) as a white solid. MS ESI calculated for $C_{28}H_{22}D_3F_3N_3O_3P$ $[M+H]^+$, 543.18, found 543.15. $^1H$ NMR (400 MHz, Chloroform-d) δ 8.52-8.47 (m, 1H), 7.79 (d, J=8.5 Hz, 1H), 7.72-7.68 (m, 1H), 7.51-7.29 (m, 6H), 6.87 (t, J=72.8 Hz, 1H), 6.31 (d, J=7.1 Hz, 1H), 5.05 (d, J=7.0 Hz, 1H), 3.56-3.45 (m, 1H), 3.25 (d, J=15.2 Hz, 2H), 2.91 (d, J=13.6 Hz, 1H), 1.55 (s, 3H), 1.52 (s, 3H). $^{19}F$ NMR (377 MHz, Chloroform-d) δ −80.38, −80.83, −80.97, −81.34, −116.69, −116.70. $^{31}P$ NMR (122 MHz, Chloroform-d) δ 41.27.

Example 69: (7R,14R)-1-(difluoromethoxy)-11-(4-((dimethylphosphoryl)methyl)-3,5-difluorophenyl)-6-(methyl-d3)-6,7-dihydro-7,14-methanobenzo[f]benzo[4,5]imidazo[1,2-a][1,4]diazocin-5(14H)-one Synthetic Scheme

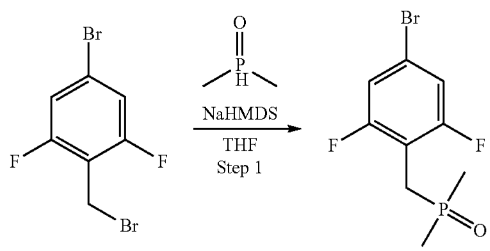

-continued

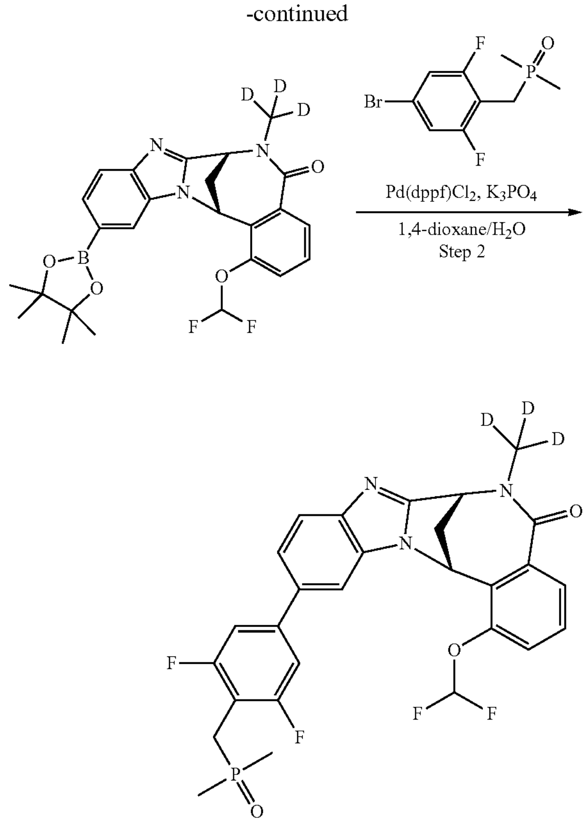

Preparation 69A: 5-bromo-2-[(dimethylphosphoryl)methyl]-1,3-difluorobenzene

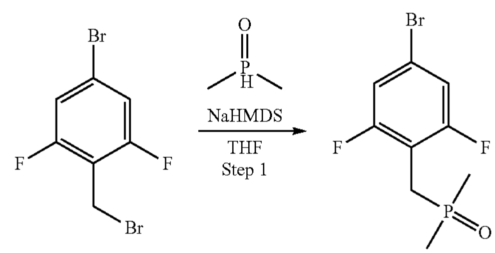

A solution of (methylphosphonoyl)methane (0.55 g, 6.996 mmol) in THF (10 mL) was treated with 2M NaHMDS (2.62 mL, 5.247 mmol) for 15 min at 0° C. under nitrogen atmosphere followed by the addition of 5-bromo-2-(bromomethyl)-1,3-difluorobenzene (1.00 g, 3.498 mmol) in portions at 0° C. The resulting mixture was stirred for 16 h at room temperature under nitrogen atmosphere. The reaction was quenched with water at room temperature. The resulting mixture was concentrated under reduced pressure. The residue was purified by silica gel column chromatography, eluted with $CH_2Cl_2$/MeOH (10/1) to afford 5-bromo-2-[(dimethylphosphoryl)methyl]-1,3-difluorobenzene (240 mg, 24%) as a white solid. MS ESI calculated for $C_9H_{10}BrF_2OP$ $[M+H]^+$, 282.96 284.96, found 282.80 284.80. $^1H$ NMR (400 MHz, Chloroform-d) δ 7.19-7.11 (m, 2H), 3.23 (d, J=15.8 Hz, 2H), 1.54 (s, 3H), 1.50 (s, 3H).

Example 69: (7R,14R)-1-(difluoromethoxy)-11-(4-((dimethylphosphoryl)methyl)-3,5-difluorophenyl)-6-(methyl-d3)-6,7-dihydro-7,14-methanobenzo[f]benzo[4,5]imidazo[1,2-a][1,4]diazocin-5(14H)-one

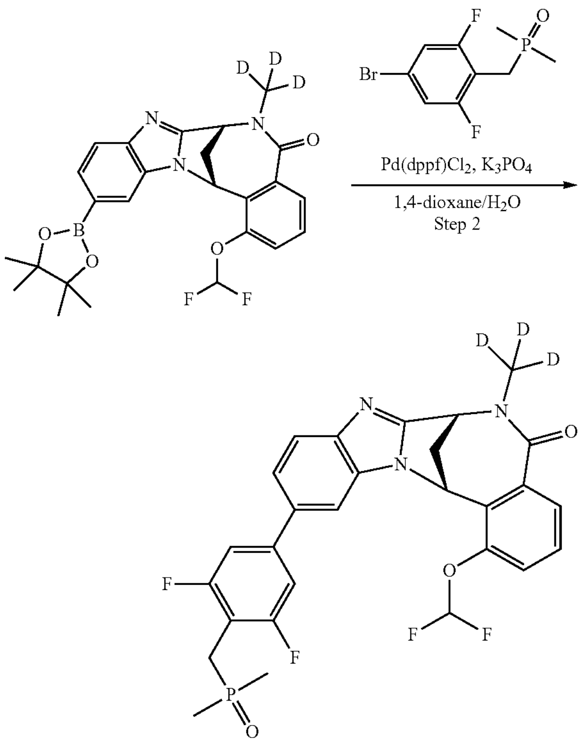

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (200 mg, 0.413 mmol) and 5-bromo-2-[(dimethylphosphoryl)methyl]-1,3-difluorobenzene (234 mg, 0.826 mmol) in 1,4-dioxane (4 mL) and $H_2O$ (0.8 mL) were added $Pd(dppf)Cl_2$ (34 mg, 0.041 mmol) and $K_3PO_4$ (263 mg, 1.239 mmol) in portions at room temperature. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (10/1) followed by reversed-phase flash chromatography with the following conditions: column, C18 silica gel; mobile phase, $CH_3CN$ in Water (10 mmol/L $NH_4HCO_3$), 35% to 50% gradient in 20 min; detector, 254 nm. This resulted in (7R,14R)-1-(difluoromethoxy)-11-(4-((dimethylphosphoryl)methyl)-3,5-difluorophenyl)-6-(methyl-d3)-6,7-dihydro-7,14-methanobenzo[f]benzo[4,5]imidazo[1,2-a][1,4]diazocin-5(14H)-one (85 mg, 36%) as a white solid. MS ESI calculated for $C_{29}H_{21}D_3F_4N_3O_3P$ $[M+H]^+$, 561.17, found 561.10. $^1H$ NMR (400 MHz, Chloroform-d) δ 8.53-8.48 (m, 1H), 7.81 (d, J=8.5 Hz, 1H), 7.72-7.68 (m, 1H), 7.50-7.41 (m, 2H), 7.34 (d, J=8.1 Hz, 1H), 7.17 (d, J=8.3 Hz, 2H), 6.89 (t, J=72.8 Hz, 1H), 6.34 (d, J=7.1 Hz, 1H), 5.11 (d, J=7.1 Hz, 1H), 3.58-3.49 (m, 1H), 3.31 (d, J=16.0 Hz, 2H), 2.93 (d, J=13.6 Hz, 1H), 1.58 (s, 3H), 1.54 (s, 3H). $^{19}F$ NMR (377 MHz, Chloroform-d) δ −80.96, −112.27. $^{31}P$ NMR (162 MHz, Chloroform-d) δ 41.93.

Example 70: (7R,14R)-1-(difluoromethoxy)-11-(4-((dimethylphosphoryl)methyl)phenyl)-6-(methyl-d3)-6,7-dihydro-7,14-methanobenzo[f]benzo[4,5]imidazo[1,2-a][1,4]diazocin-5(14H)-one

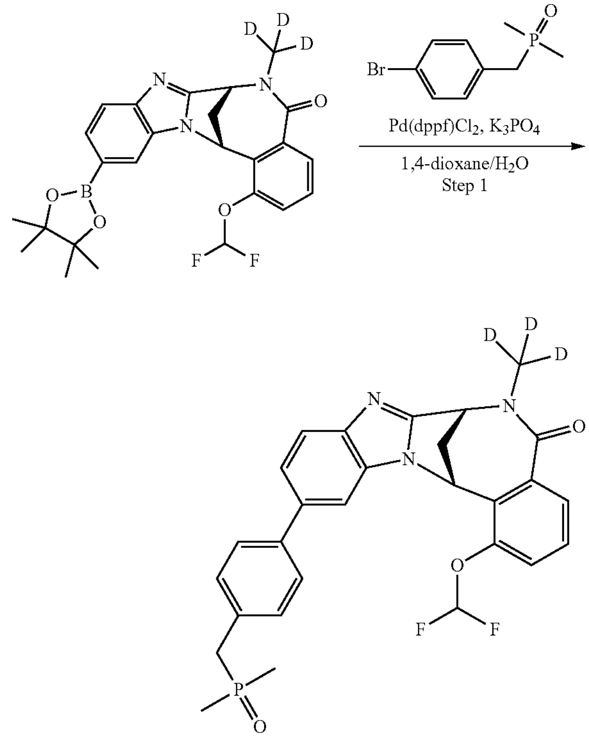

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (200 mg, 0.413 mmol) and 5-bromo-2-[(dimethylphosphoryl)methyl]-1,3-difluorobenzene (234 mg, 0.826 mmol) in 1,4-dioxane (4 mL) and $H_2O$ (0.8 mL) were added $Pd(dppf)Cl_2$ (34 mg, 0.041 mmol) and $K_3PO_4$ (263 mg, 1.239 mmol) at room temperature. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (10/1) followed by reversed-phase flash chromatography with the following conditions: column, C18 silica gel; mobile phase, $CH_3CN$ in Water (10 mmol/L $NH_4HCO_3$), 35% to 50% gradient in 20 min. This resulted in (7R,14R)-1-(difluoromethoxy)-11-(4-((dimethylphosphoryl)methyl)phenyl)-6-(methyl-d3)-6,7-dihydro-7,14-methanobenzo[f]benzo[4,5]imidazo[1,2-a][1,4]diazocin-5(14H)-one (85 mg, 36%) as a white solid. MS ESI calculated for $C_{28}H_{23}D_3F_2N_3O_3P$ $[M+H]^+$, 525.19, found 525.20. $^1H$ NMR (400 MHz, Chloroform-d) δ 8.50 (d, J=8.2 Hz, 1H), 7.78 (d, J=8.5 Hz, 1H), 7.71 (s, 1H), 7.60-7.49 (m, 3H), 7.43 (t, J=8.2 Hz, 1H), 7.37-7.29 (m, 3H), 6.85 (t, J=72.8 Hz, 1H), 6.32 (d, J=7.1 Hz, 1H), 5.06 (d, J=7.0 Hz, 1H), 3.56-3.45 (m, 1H), 3.21 (d, J=15.1 Hz, 2H), 2.91 (d, J=13.5 Hz, 1H), 1.52 (s, 3H), 1.48 (s, 3H). $^{19}F$ NMR (377 MHz, Chloroform-d) δ −80.27, −80.72, −80.88, −81.33. $^{31}P$ NMR (162 MHz, Chloroform-d) δ 40.79.

Example 71: (7R,14R)-11-(4-(dimethylphosphoryl)-2,5-difluorophenyl)-1-hydroxy-6-(methyl-d3)-6,7-dihydro-7,14-methanobenzo[f]benzo[4,5]imidazo[1,2-a][1,4]diazocin-5(14H)-one

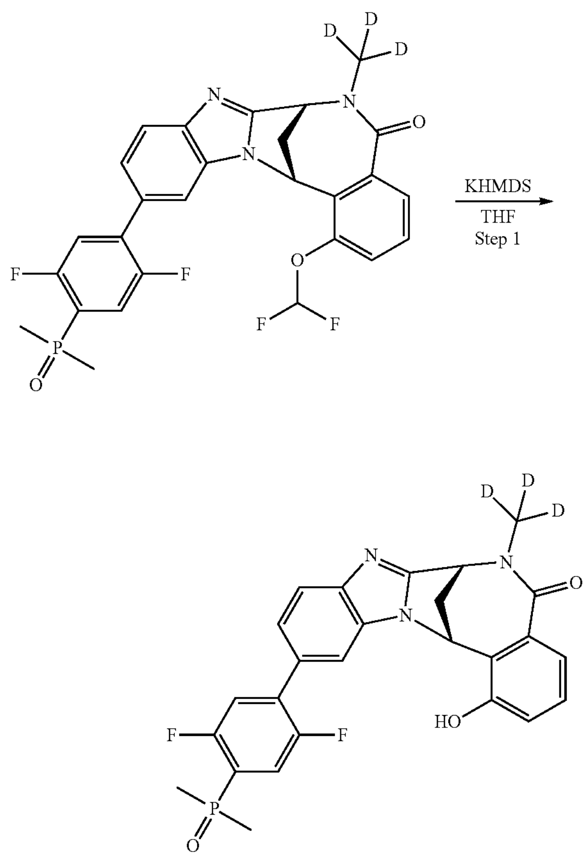

To a stirred solution of (7R,14R)-1-(difluoromethoxy)-11-(4-(dimethylphosphoryl)-2,5-difluorophenyl)-6-(methyl-d3)-6,7-dihydro-7,14-methanobenzo[f]benzo[4,5]imidazo[1,2-a][1,4]diazocin-5(14H)-one (100 mg, 0.183 mmol) in THF (1.5 mL) was added KHMDS (0.91 mL, 0.915 mmol) dropwise at 0° C. under nitrogen atmosphere. The mixture was stirred for 2 h at room temperature. The reaction was quenched with sat. $NH_4Cl$ (aq.) at 0° C. The resulting mixture was concentrated under vacuum. The residue was purified by reversed-phase flash chromatography with the following conditions: column, C18 silica gel; mobile phase, $CH_3CN$ in Water (0.1% FA), 10% to 50% gradient in 30 min; detector, 254 nm. This resulted in (7R,14R)-11-(4-(dimethylphosphoryl)-2,5-difluorophenyl)-1-hydroxy-6-(methyl-d3)-6,7-dihydro-7,14-methanobenzo[f]benzo[4,5]imidazo[1,2-a][1,4]diazocin-5(14H)-one (60 mg, 66%) as a white solid. MS ESI calculated for $C_{26}H_{19}D_3F_2N_3O_3P$ $[M+H]^+$, 497.16, found 497.05. $^1H$ NMR (400 MHz, DMSO-$d_6$) δ 10.57 (s, 1H), 7.88-7.80 (m, 2H), 7.73 (d, J=8.5 Hz, 1H), 7.64-7.50 (m, 2H), 7.45-7.37 (m, 1H), 7.18 (t, J=8.0 Hz, 1H), 7.12-7.05 (m, 1H), 6.34 (d, J=7.0 Hz, 1H), 5.20 (d, J=7.1 Hz, 1H), 3.51-3.39 (m, 1H), 2.75 (d, J=13.6 Hz, 1H), 1.79 (s, 3H), 1.75 (s, 3H). $^{19}F$ NMR (376 MHz, DMSO-$d_6$) δ −111.02, −111.03, −111.08, −111.09, −122.66, −122.71.

Example 72: (7R,14R)-1-(difluoromethoxy)-11-(4-((dimethylphosphoryl)methyl)-3-fluorophenyl)-6,7-dihydro-7,14-methanobenzo[f]benzo[4,5]imidazo[1,2-a][1,4]diazocin-5(14H)-one

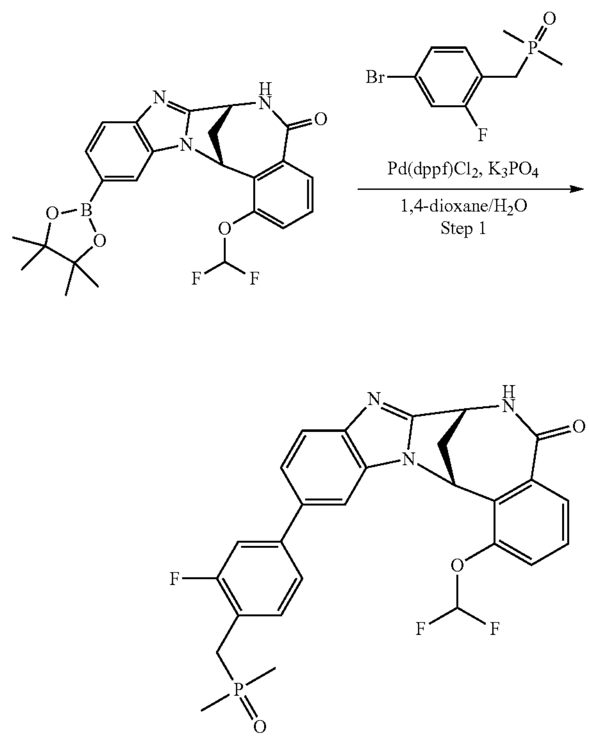

To a stirred solution of (7R,14R)-1-(difluoromethoxy)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (80 mg, 0.171 mmol) and 4-bromo-1-[(dimethylphosphoryl)methyl]-2-fluorobenzene (90 mg, 0.342 mmol) in 1,4-dioxane (1 mL) and $H_2O$ (0.2 mL) were added $Pd(dppf)Cl_2$ (13 mg, 0.017 mmol) and $K_3PO_4$ (109 mg, 0.513 mmol) at room temperature under nitrogen atmosphere. The resulting mixture was stirred for 2 h at 80° C. under nitrogen atmosphere. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (10 mmol/L $NH_4HCO_3$), Mobile Phase B: $CH_3CN$; Flow rate: 60 mL/min; Gradient: 30% B to 70% B in 20 min; 254/220 nm to afford (7R,14R)-1-(difluoromethoxy)-11-(4-((dimethylphosphoryl)methyl)-3-fluorophenyl)-6,7-dihydro-7,14-methanobenzo[f]benzo[4,5]imidazo[1,2-a][1,4]diazocin-5(14H)-one (45 mg, 50%) as a white solid. MS ESI calculated for $C_{27}H_{23}F_3N_3O_3P$ $[M+H]^+$, 526.14, found 526.10. $^1H$ NMR (400 MHz, Chloroform-d) δ 8.47-8.43 (m, 1H), 7.82 (d, J=8.6 Hz, 1H), 7.69 (s, 1H), 7.55-7.48 (m, 2H), 7.48-7.39 (m, 3H), 7.39-7.34 (m, 1H), 7.30 (d, J=11.3 Hz, 1H), 6.89 (t, J=72.6 Hz, 1H), 6.45 (d, J=7.2 Hz, 1H), 5.21 (d, J=6.7 Hz, 1H), 3.60-3.50 (m, 1H), 3.25 (d, J=15.0 Hz, 2H), 2.92 (d, J=13.4 Hz, 1H), 1.59-1.54 (m, 3H), 1.54-1.49 (m, 3H). $^{19}F$ NMR (377 MHz, Chloroform-d) δ −81.04, −116.56. $^{31}P$ NMR (162 MHz, Chloroform-d) δ 41.14.

Example 73: (7R,14R)-1-(difluoromethoxy)-11-(4-((dimethylphosphoryl)methyl)-2,5-difluorophenyl)-6-methyl-6,7-dihydro-7,14-methanobenzo[f]benzo[4,5]imidazo[1,2-a][1,4]diazocin-5(14H)-one

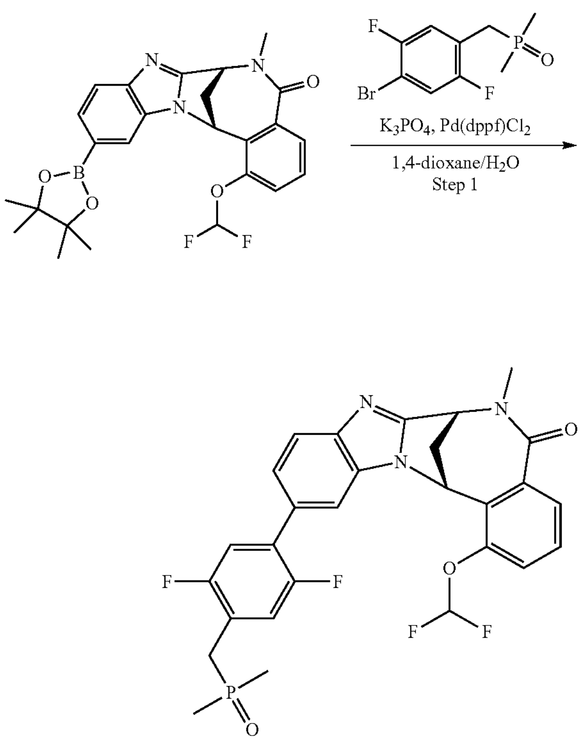

To a stirred mixture of (7R,14R)-1-(difluoromethoxy)-6-methyl-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (100 mg, 0.166 mmol) and 1-bromo-4-[(dimethylphosphoryl)methyl]-2,5-difluorobenzene (56 mg, 0.199 mmol) in 1,4-dioxane (1.5 mL) and $H_2O$ (0.3 mL) were added $K_3PO_4$ (105 mg, 0.498 mmol) and Pd(dppf)$Cl_2 \cdot CH_2Cl_2$ (13 mg, 0.017 mmol) at room temperature under nitrogen atmosphere. The resulting mixture was stirred for 4 h at 80° C. under nitrogen atmosphere. The resulting mixture was concentrated under vacuum. The residue was purified by silica gel column chromatography, eluted with $CH_2Cl_2$/MeOH (10:1) followed by reversed-phase flash chromatography with the following conditions: column, C18 silica gel; mobile phase, $CH_3CN$ in Water (10 mmol/L $NH_4HCO_3$), 25% to 55% gradient in 25 min; detector, 254 nm. This resulted in (7R,14R)-1-(difluoromethoxy)-11-(4-((dimethylphosphoryl)methyl)-2,5-difluorophenyl)-6-methyl-6,7-dihydro-7,14-methanobenzo[f]benzo[4,5]imidazo[1,2-a][1,4]diazocin-5(14H)-one (15 mg, 16%) as a white solid. MS ESI calculated for $C_{28}H_{24}F_4N_3O_3P$ $[M+H]^+$, 558.15, found 558.05. $^1H$ NMR (400 MHz, DMSO-d) δ 8.28-8.25 (m, 1H), 7.79-7.43 (m, 5H), 7.43-7.29 (m, 3H), 6.27 (d, J=7.1 Hz, 1H), 5.25 (d, J=7.1 Hz, 1H), 3.60-3.47 (m, 1H), 3.36 (s, 3H), 3.23 (d, J=14.7 Hz, 2H), 2.82 (d, J=13.8 Hz, 1H), 1.45 (s, 3H), 1.42 (s, 3H). $^{19}F$ NMR (376 MHz, DMSO-$d_6$) δ −81.58, −82.03, −82.43, −82.86, −121.74, −121.79, −124.19, −124.24. $^{31}P$ NMR (162 MHz, DMSO-$d_6$) δ 38.79.

Example 74: (7R,14R)-11-(4-(dimethylphosphoryl)-2,5-difluorophenyl)-1-methoxy-6-(methyl-d3)-6,7-dihydro-7,14-methanobenzo[f]benzo[4,5]imidazo[1,2-a][1,4]diazocin-5(14H)-one

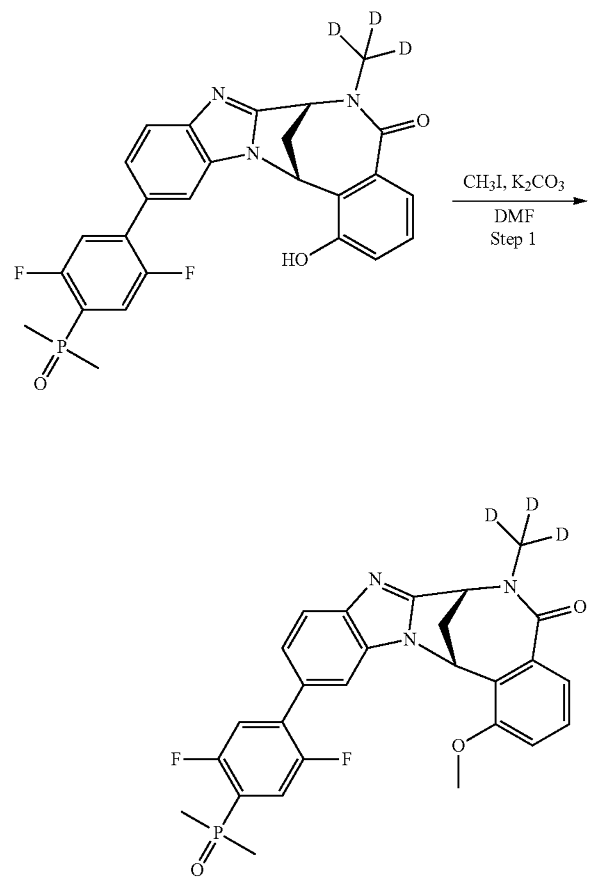

To a stirred solution of (7R,14R)-11-(4-(dimethylphosphoryl)-2,5-difluorophenyl)-1-hydroxy-6-(methyl-d3)-6,7-dihydro-7,14-methanobenzo[f]benzo[4,5]imidazo[1,2-a][1,4]diazocin-5(14H)-one (50 mg, 0.101 mmol) and $K_2CO_3$ (42 mg, 0.303 mmol) in DMF (1 mL) was added $CH_3I$ (17 mg, 0.121 mmol) dropwise at room temperature. The mixture was stirred for 16 h at room temperature. The resulting mixture was concentrated under reduce pressure. The residue was purified by reversed-phase flash chromatography with the following conditions: column, C18 silica gel; mobile phase, $CH_3CN$ in Water (0.1% FA), 20% to 50% gradient in 30 min; detector, 254 nm. This resulted in (7R,14R)-11-(4-(dimethylphosphoryl)-2,5-difluorophenyl)-1-methoxy-6-(methyl-d3)-6,7-dihydro-7,14-methanobenzo[f]benzo[4,5]imidazo[1,2-a][1,4]diazocin-5(14H)-one (29 mg, 56%) as a light yellow solid. MS ESI calculated for $C_{27}H_{21}D_3F_2N_3O_3P$ $[M+H]^+$, 511.17, found 511.05. $^1H$ NMR (400 MHz, Chloroform-d) δ 8.25-8.18 (m, 1H), 7.87-7.73 (m, 3H), 7.46-7.31 (m, 2H), 7.27-7.20 (m, 1H), 7.16-7.09 (m, 1H), 6.49-6.43 (m, 1H), 5.07 (s, 1H), 4.10 (s, 3H), 3.45 (s, 1H), 2.90 (d, J=12.0 Hz, 1H), 1.86 (s, 3H), 1.83 (s, 3H). $^{19}F$ NMR (376 MHz, Chloroform-d) δ −111.71, −111.73, −111.77, −111.78, −122.22, −122.27. $^{31}P$ NMR (162 MHz, Chloroform-d) δ 29.97.

Example 75: (7R,14R)-11-(4-(dimethylphosphoryl)-2,5-difluorophenyl)-1-ethoxy-6-(methyl-d3)-6,7-dihydro-7,14-methanobenzo[f]benzo[4,5]imidazo[1,2-a][1,4]diazocin-5(14H)-one

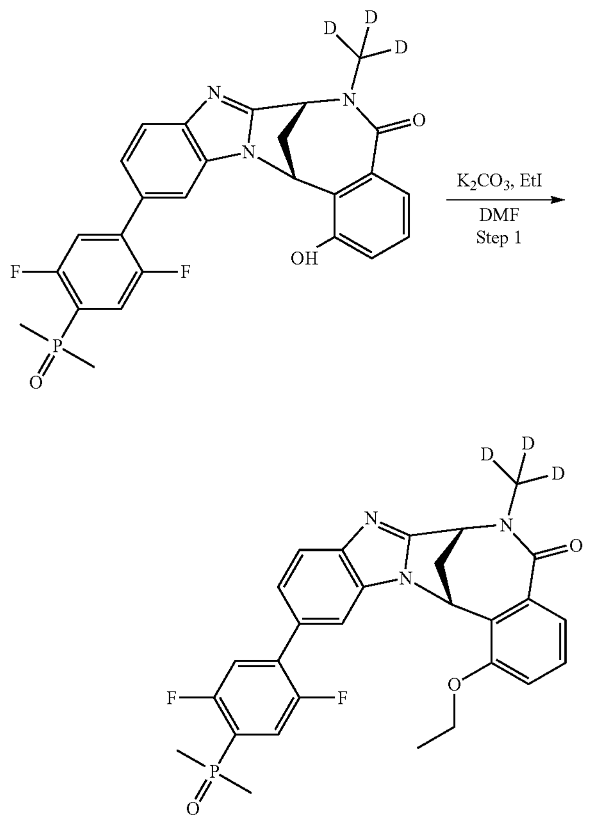

To a stirred solution of ((7R,14R)-11-(4-(dimethylphosphoryl)-2,5-difluorophenyl)-1-hydroxy-6-(methyl-d3)-6,7-dihydro-7,14-methanobenzo[f]benzo[4,5]imidazo[1,2-a][1,4]diazocin-5(14H)-one (50 mg, 0.101 mmol) and $K_2CO_3$ (42 mg, 0.303 mmol) in DMF (1 mL) was added iodoethane (19 mg, 0.121 mmol) dropwise at room temperature under nitrogen atmosphere. The mixture was stirred for 16 h at room temperature. The resulting mixture was concentrated under reduce pressure. The residue was purified by reversed-phase flash chromatography with the following conditions: column, C18 silica gel; mobile phase, $CH_3CN$ in Water (10 mmol/L $NH_4HCO_3$), 20% to 50% gradient in 30 min; detector, 254 nm. This resulted in (7R,14R)-11-(4-(dimethylphosphoryl)-2,5-difluorophenyl)-1-ethoxy-6-(methyl-d3)-6,7-dihydro-7,14-methanobenzo[f]benzo[4,5]imidazo[1,2-a][1,4]diazocin-5(14H)-one (36 mg, 67%) as a white solid. MS ESI calculated for $C_{28}H_{23}D_3F_2N_3O_3P$ $[M+H]^+$, 525.19, found 525.20. $^1H$ NMR (400 MHz, Chloroform-d) δ 8.24-8.17 (m, 1H), 7.90-7.73 (m, 3H), 7.43-7.37 (m, 1H), 7.33 (t, J=8.2 Hz, 1H), 7.28-7.19 (m, 1H), 7.13-7.06 (m, 1H), 6.48 (d, J=7.1 Hz, 1H), 5.01 (d, J=6.9 Hz, 1H), 4.39-4.28 (m, 1H), 4.25-4.13 (m, 1H), 3.50-3.38 (m, 1H), 2.88 (d, J=13.4 Hz, 1H), 1.86 (s, 3H), 1.83 (s, 3H), 1.66 (t, J=6.9 Hz, 3H). $^{19}F$ NMR (376 MHz, Chloroform-d) δ −111.82, −111.84, −111.88, −111.89, −122.36, −122.41. $^{31}P$ NMR (162 MHz, Chloroform-A) 30.04.

Example 76: (7R,14R)-1-(difluoromethoxy)-11-(4-((dimethylphosphoryl)methyl)-2,3-difluorophenyl)-6-(methyl-d3)-6,7-dihydro-7,14-methanobenzo[f]benzo[4,5]imidazo[1,2-a][1,4]diazocin-5(14H)-one Synthetic Scheme

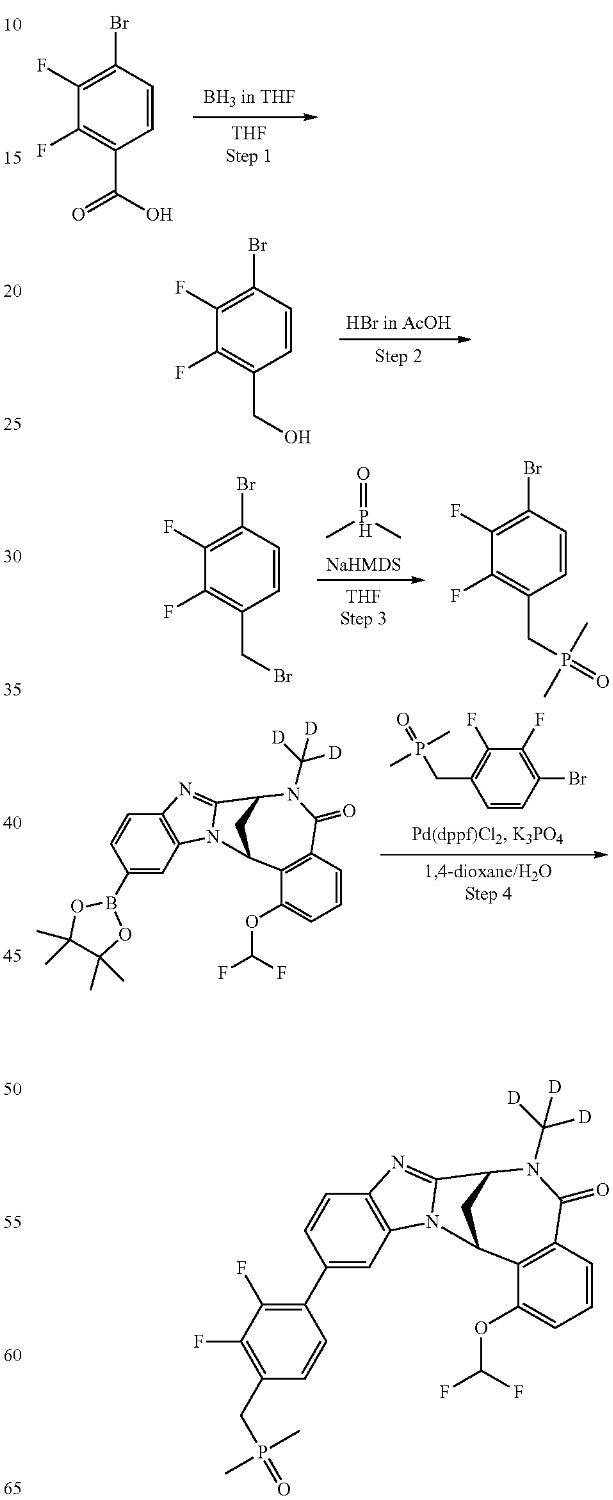

Preparation 76A: (4-bromo-2,3-difluorophenyl)methanol

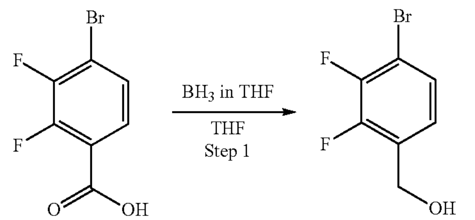 [SMILES: O=C(O)c1ccc(Br)c(F)c1F ; "BH3 in THF" ; "THFStep 1" ; OCc1ccc(Br)c(F)c1F]

To a stirred solution of 4-bromo-2,3-difluorobenzoic acid (5.00 g, 21.097 mmol) in THF (50 mL) was added borane (74 mL, 73.840 mmol, 1M in THF) dropwise at room temperature. The resulting mixture was stirred for 4 h at 60° C. The reaction was quenched with water at 0° C. The resulting mixture was extracted with EtOAc (3×50 mL). The combined organic layers were washed with brine (50 mL), dried over anhydrous $Na_2SO_4$. After filtration, the filtrate was concentrated under reduced pressure. The residue was purified by silica gel column chromatography, eluted with $CH_2Cl_2MeOH$ (10/1) to afford (4-bromo-2,3-difluorophenyl)methanol (4.60 g, 98%) as a white solid. MS ESI calculated for $C_7H_5BrF_2O$ $[M+H]^+$, 222.95 224.95, found N/A. $^1H$ NMR (400 MHz, Chloroform-d) δ 7.35-7.31 (m, 1H), 7.17-7.10 (m, 1H), 4.76 (s, 2H). $^{19}F$ NMR (377 MHz, Chloroform-d) δ −130.76, −130.81, −140.40, −140.46.

Preparation 76B: 1-bromo-4-(bromomethyl)-2,3-difluorobenzene

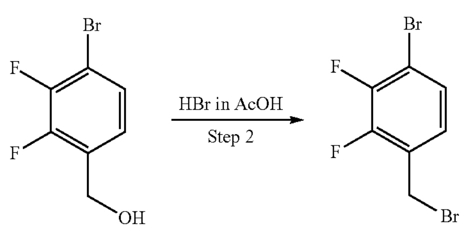 [SMILES: OCc1ccc(Br)c(F)c1F ; "HBr in AcOH" ; "Step 2" ; Fc1c(Br)ccc(CBr)c1F]

A solution of (4-bromo-2,3-difluorophenyl)methanol (4.60 g, 21.075 mmol) in HBr in AcOH (10 mL) was stirred for 30 min at 100° C. The mixture was allowed to cool down to room temperature. The mixture was basified to pH 8 with NaOH (1M). The resulting mixture was extracted with EtOAc (3×100 mL). The combined organic layers were washed with brine (100 mL), dried over anhydrous $Na_2SO_4$. After filtration, the filtrate was concentrated under reduced pressure. The residue was purified by silica gel column chromatography, eluted with PE/EA (7/1) to afford 1-bromo-4-(bromomethyl)-2,3-difluorobenzene (5.29 g, 87%) as a colorless liquid. MS ESI calculated for $C_7H_4Br_2F_2$ $[M+H]^+$, 284.86 286.86 288.86, found N/A. $^1H$ NMR (400 MHz, Chloroform-d) δ 7.33-7.29 (m, 1H), 7.10-7.04 (m, 1H), 4.47 (s, 2H). $^{19}F$ NMR (377 MHz, Chloroform-d) δ −129.14, −129.19, −137.16, −137.22.

Preparation 76C: 1-bromo-4-[(dimethylphosphoryl)methyl]-2,3-difluorobenzene

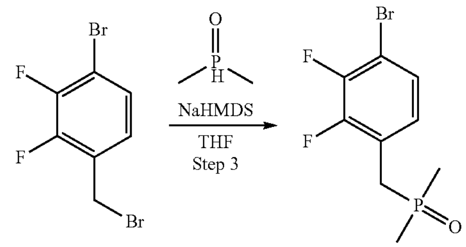

To a stirred solution of (methylphosphonoyl)methane (1.50 g, 19.237 mmol) in THF (50 mL) was added NaHMDS (19 mL, 19.237 mmol, 1 M in THF) dropwise at 0° C. under nitrogen atmosphere. The resulting mixture was stirred for 30 min at room temperature under nitrogen atmosphere. To the above mixture was added 1-bromo-4-(bromomethyl)-2,3-difluorobenzene (5.00 g, 17.488 mmol) at 0° C. The resulting mixture was stirred for additional 16 h at room temperature. The reaction was quenched with sat. $NH_4Cl$ (aq.) at 0° C. The resulting mixture was extracted with EtOAc (3×100 mL). The combined organic layers were washed with brine (100 mL), dried over anhydrous $Na_2SO_4$. After filtration, the filtrate was concentrated under reduced pressure. The residue was purified by silica gel column chromatography, eluted with $CH_2Cl_2$/MeOH (8/1) followed by reversed-phase flash chromatography with the following conditions: column, C18 silica gel; mobile phase, $CH_3CN$ in water (10 mmol/L $NH_4HCO_3$), 30% to 70% gradient in 20 min; detector, 254 nm to afford 1-bromo-4-[(dimethylphosphoryl)methyl]-2,3-difluorobenzene (340 mg, 6%) as a white solid. MS ESI calculated for $C_9H_{10}BrF_2OP$ $[M+H]^+$, 282.96 284.96, found 282.85 284.85. $^1H$ NMR (400 MHz, Chloroform-d) δ 7.16-7.05 (m, 2H), 3.27-3.18 (m, 2H), 1.54 (s, 3H), 1.51 (s, 3H).

Example 76: (7R,14R)-1-(difluoromethoxy)-11-(4-((dimethylphosphoryl)methyl)-2,3-difluorophenyl)-6-(methyl-d3)-6,7-dihydro-7,14-methanobenzo[f]benzo[4,5]imidazo[1,2-a][1,4]diazocin-5(14H)-one

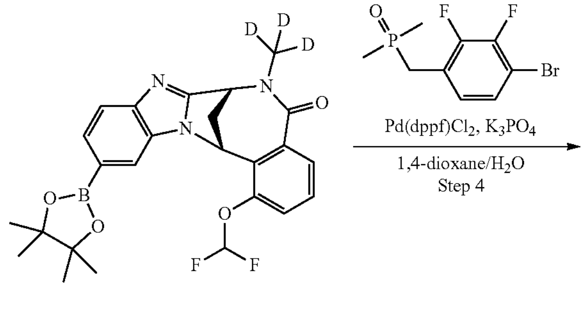

-continued

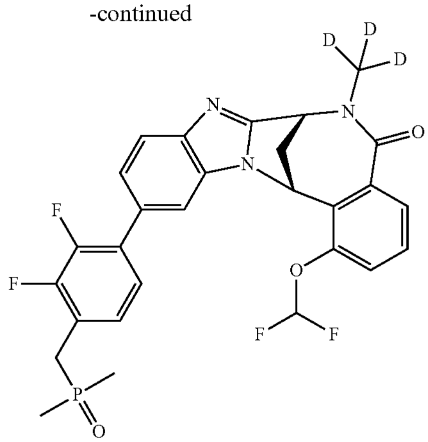

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.124 mmol) and 1-bromo-4-[(dimethylphosphoryl)methyl]-2,3-difluorobenzene (53 mg, 0.186 mmol) in 1,4-dioxane (1 mL) and $H_2O$ (0.2 mL) were added Pd(dppf)$Cl_2$ (10 mg, 0.012 mmol) and $K_3PO_4$ (79 mg, 0.372 mmol) at room temperature under nitrogen atmosphere. The resulting mixture was stirred for 2 h at 80° C. under nitrogen atmosphere. The mixture was allowed to cool down to room temperature. The resulting mixture was concentrated under reduced pressure. The residue was purified by silica gel column chromatography, eluted with $CH_2Cl_2$/MeOH (10/1) to afford (7R,14R)-1-(difluoromethoxy)-11-(4-((dimethylphosphoryl)methyl)-2,3-difluorophenyl)-6-(methyl-d3)-6,7-dihydro-7,14-methanobenzo[f]benzo[4,5]imidazo[1,2-a][1,4]diazocin-5(14H)-one (38 mg, 55%) as a white solid. MS ESI calculated for $C_{28}H_{21}D_3F_4N_3O_3P$ $[M+H]^+$, 561.17, found 561.05. $^1H$ NMR (400 MHz, Chloroform-d) δ 8.51-8.46 (m, 1H), 7.79 (d, J=8.5 Hz, 1H), 7.68 (s, 1H), 7.42 (t, J=8.2 Hz, 2H), 7.32 (d, J=8.1 Hz, 1H), 7.20 (d, J=3.8 Hz, 2H), 7.03-6.63 (m, 1H), 6.29 (d, J=7.0 Hz, 1H), 5.01 (d, J=6.8 Hz, 1H), 3.53-3.42 (m, 1H), 3.27 (d, J=14.7 Hz, 2H), 2.89 (d, J=13.4 Hz, 1H), 1.58 (s, 3H), 1.55 (s, 3H). $^{19}F$ NMR (376 MHz, Chloroform-d) δ −80.01, −80.46, −81.40, −81.85, −141.15, −141.21, −143.04, −143.09. $^{31}P$ NMR (162 MHz, Chloroform-d) δ 40.70.

Example 77: (7R,14R)-1-(difluoromethoxy)-11-(4-((dimethylphosphoryl)methyl)-3,5-difluorophenyl)-6-methyl-6,7-dihydro-7,14-methanobenzo[f]benzo[4,5]imidazo[1,2-a][1,4]diazocin-5(14H)-one

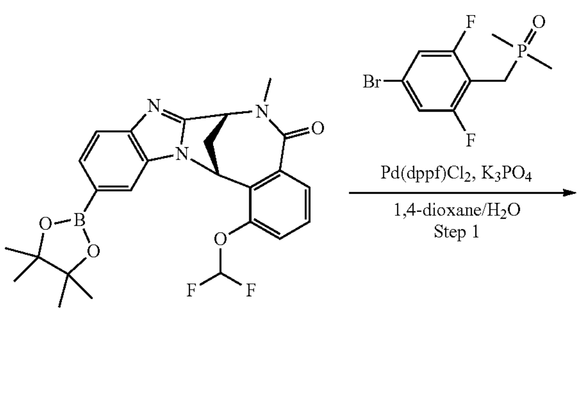

-continued

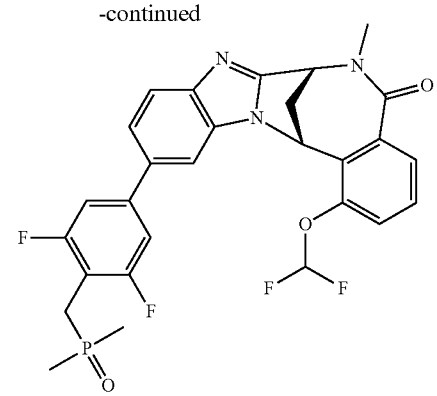

To a stirred solution of (7R,14R)-1-(difluoromethoxy)-6-methyl-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (80 mg, 0.166 mmol) and 5-bromo-2-[(dimethylphosphoryl)methyl]-1,3-difluorobenzene (94 mg, 0.332 mmol) in 1,4-dioxane (1 mL) and $H_2O$ (0.2 mL) were added Pd(dppf)$Cl_2$ (14 mg, 0.017 mmol) and $K_3PO_4$ (106 mg, 0.498 mmol) at room temperature under nitrogen atmosphere. The resulting mixture was stirred for 2 h at 80° C. under nitrogen atmosphere. The mixture was allowed to cool down to room temperature. The residue was purified by silica gel column chromatography, eluted with $CH_2Cl_2$/MeOH (10/1) followed by reversed-phase flash chromatography with the following conditions: column, C18 silica gel; mobile phase, $CH_3CN$ in water (10 mmol/L $NH_4HCO_3$), 30% to 70% gradient in 20 min; detector, 254 nm. This resulted in (7R,14R)-1-(difluoromethoxy)-11-(4-((dimethylphosphoryl)methyl)-3,5-difluorophenyl)-6-methyl-6,7-dihydro-7,14-methanobenzo[f]benzo[4,5]imidazo[1,2-a][1,4]diazocin-5(14H)-one (28 mg, 30%) as a white solid. MS ESI calculated for $C_{28}H_{24}F_4N_3O_3P$ $[M+H]^+$, 558.15, found 558.05. $^1H$ NMR (400 MHz, Chloroform-d) δ 8.53-8.47 (m, 1H), 7.79 (d, J=8.5 Hz, 1H), 7.68 (s, 1H), 7.49-7.40 (m, 2H), 7.33 (d, J=8.1 Hz, 1H), 7.18 (d, J=8.4 Hz, 2H), 6.88 (t, J=72.8 Hz, 1H), 6.31 (d, J=6.6 Hz, 1H), 5.05 (d, J=6.6 Hz, 1H), 3.55 (s, 3H), 3.53-3.46 (m, 1H), 3.31 (d, J=16.1 Hz, 2H), 2.91 (d, J=13.4 Hz, 1H), 1.57 (s, 3H), 1.54 (s, 3H). $^{19}F$ NMR (377 MHz, Chloroform-d) δ −80.92, −112.41. $^{31}P$ NMR (162 MHz, Chloroform-d) δ 42.10.

Example 78: (7R,14R)-1-(difluoromethoxy)-11-(4-((dimethylphosphoryl)methyl)-3-fluorophenyl)-10-fluoro-6-(methyl-d3)-6,7-dihydro-7,14-methanobenzo[f]benzo[4,5]imidazo[1,2-a][1,4]diazocin-5(14H)-one

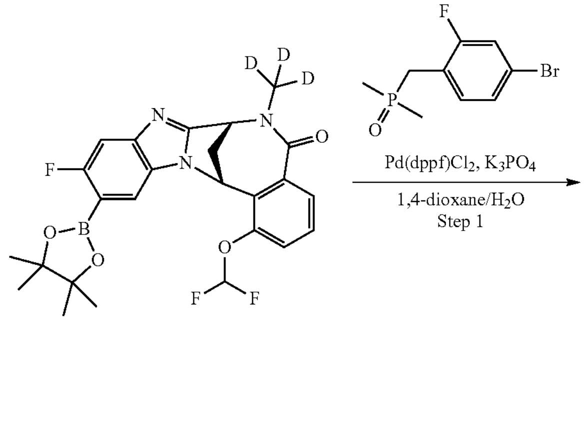

-continued

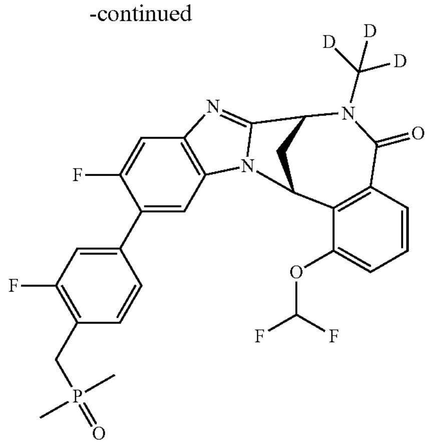

To a stirred solution of (7R,14R)-1-(difluoromethoxy)-10-fluoro-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (80 mg, 0.159 mmol) and 4-bromo-1-[(dimethylphosphoryl)methyl]-2-fluorobenzene (84 mg, 0.318 mmol) in 1,4-dioxane (1 mL) and $H_2O$ (0.2 mL) were added Pd(dppf)$Cl_2$·$CH_2Cl_2$ (13 mg, 0.016 mmol) and $K_3PO_4$ (101 mg, 0.477 mmol) at room temperature under nitrogen atmosphere. The resulting mixture was stirred for 2 h at 80° C. under nitrogen atmosphere. The mixture was allowed to cool down to room temperature. The residue was purified by silica gel column chromatography, eluted with $CH_2Cl_2$/MeOH (10/1) followed by reversed-phase flash chromatography with the following conditions: column, C18 silica gel; mobile phase, $CH_3CN$ in water (10 mmol/L $NH_4HCO_3$), 30% to 70% gradient in 20 min; detector, 254 nm. This resulted in (7R,14R)-1-(difluoromethoxy)-11-(4-((dimethylphosphoryl)methyl)-3-fluorophenyl)-10-fluoro-6-(methyl-d3)-6,7-dihydro-7,14-methanobenzo[f]benzo[4,5]imidazo[1,2-a][1,4]diazocin-5(14H)-one (35 mg, 38%) as a white solid. MS ESI calculated for $C_{28}H_{21}D_3F_4N_3O_3P$ $[M+H]^+$, 561.17, found 561.00. $^1H$ NMR (400 MHz, Chloroform-d) δ 8.52-8.47 (m, 1H), 7.52-7.47 (m, 2H), 7.47-7.39 (m, 2H), 7.36-7.28 (m, 3H), 6.83 (t, J=72.7 Hz, 1H), 6.26 (d, J=7.1 Hz, 1H), 5.00 (d, J=7.0 Hz, 1H), 3.54-3.43 (m, 1H), 3.26 (d, J=15.1 Hz, 2H), 2.89 (d, J=13.5 Hz, 1H), 1.55 (s, 3H), 1.52 (s, 3H). $^{19}F$ NMR (377 MHz, Chloroform-d) δ −80.54, −80.99, −81.05, −81.49, −116.93, −122.18. $^{31}P$ NMR (162 MHz, Chloroform-d) δ 41.22.

Example 79: (7R,14R)-1-(difluoromethoxy)-11-(4-((dimethylphosphoryl)methyl)-3-fluorophenyl)-6-methyl-6,7-dihydro-7,14-methanobenzo[f]benzo[4,5]imidazo[1,2-a][1,4]diazocin-5(14H)-one

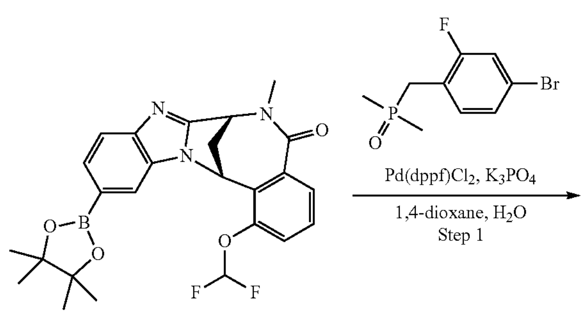

-continued

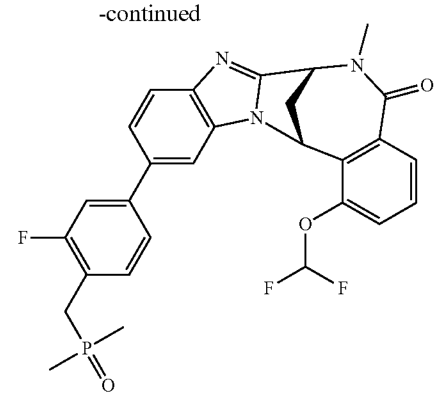

To a stirred solution of (7R,14R)-1-(difluoromethoxy)-6-methyl-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (80 mg, 0.166 mmol) and 4-bromo-1-[(dimethylphosphoryl)methyl]-2-fluorobenzene (88 mg, 0.332 mmol) in 1,4-dioxane (0.8 mL) and $H_2O$ (0.2 mL) was added $K_3PO_4$ (106 mg, 0.498 mmol) and Pd(dppf)$Cl_2$·$CH_2Cl_2$ (14 mg, 0.017 mmol) at room temperature. The resulting mixture was stirred for 2 h at 80° C. under nitrogen atmosphere. The mixture was allowed to cool down to room temperature. The resulting mixture was concentrated under reduced pressure. The residue was purified by silica gel column chromatography, eluted with $CH_2Cl_2$/MeOH (0% to 10%) followed by Prep-HPLC with the following conditions: Column: XBridge Shield RP18 OBD Column 30*150 mm, 5 m; Mobile Phase A: Water (10 mmol/L $NH_4HCO_3$), Mobile Phase B: ACN; Flow rate: 60 mL/min; Gradient: 16% B to 36% B in 10 min; Wave Length: 254/220 nm to afford (7R,14R)-1-(difluoromethoxy)-11-(4-((dimethylphosphoryl)methyl)-3-fluorophenyl)-6-methyl-6,7-dihydro-7,14-methanobenzo[f]benzo[4,5]imidazo[1,2-a][1,4]diazocin-5(14H)-one (16 mg, 17%) as a white solid. MS ESI calculated for $C_{28}H_{25}F_3N_3O_3P$ $[M+H]^+$, 540.16, found 540.15. $^1H$ NMR (400 MHz, Chloroform-d) δ 8.52-8.46 (m, 1H), 7.78 (d, J=8.5 Hz, 1H), 7.69 (d, J=1.7 Hz, 1H), 7.51-7.28 (m, 6H), 6.77 (d, J=72.8 Hz, 1H), 6.30 (d, J=7.1 Hz, 1H), 5.03 (d, J=7.0 Hz, 1H), 3.54 (s, 3H), 3.53-3.43 (m, 1H), 3.25 (d, J=15.1 Hz, 2H), 2.90 (d, J=13.5 Hz, 1H), 1.55 (s, 3H), 1.51 (s, 3H). $^{19}F$ NMR (377 MHz, Chloroform-d) δ −80.36, −80.81, −80.89, −80.34, −116.73. $^{31}P$ NMR (162 MHz, Chloroform-d) δ 41.40.

Example 80: (7R,14R)-1-(difluoromethoxy)-11-(4-((dimethylphosphoryl)methyl)-2-fluorophenyl)-6-methyl-6,7-dihydro-7,14-methanobenzo[f]benzo[4,5]imidazo[1,2-a][1,4]diazocin-5(14H)-one

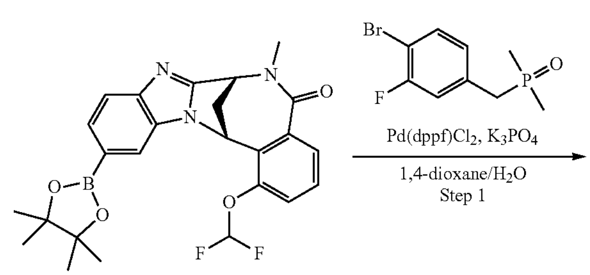

-continued

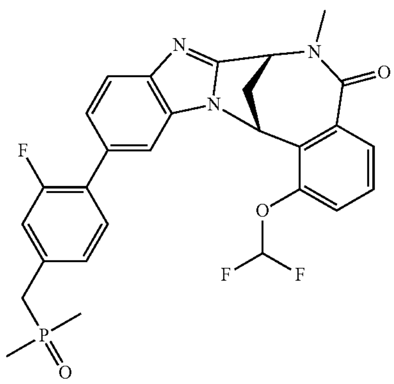

To a stirred solution of (7R,14R)-1-(difluoromethoxy)-6-methyl-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (80 mg, 0.166 mmol) and 1-bromo-4-[(dimethylphosphoryl)methyl]-2-fluorobenzene (88 mg, 0.332 mmol) in 1,4-dioxane (0.8 mL) and $H_2O$ (0.2 mL) was added $K_3PO_4$ (106 mg, 0.498 mmol) and Pd(dppf)$Cl_2 \cdot CH_2Cl_2$ (13 mg, 0.017 mmol) in portions at room temperature under nitrogen atmosphere. The resulting mixture was stirred for 2 h at 80° C. under nitrogen atmosphere. The mixture was allowed to cool down to room temperature. The resulting mixture was concentrated under reduced pressure. The residue was purified by silica gel column chromatography, eluted with $CH_2Cl_2$/MeOH (10/1) followed by Prep-HPLC with the following conditions: Column: XBridge Prep Phenyl OBD Column 19*250 mm, 5 m; Mobile Phase A: Water (10 mmol/L $NH_4HCO_3$+0.1% $NH_3H_2O$), Mobile Phase B: ACN; Flow rate: 60 mL/min; Gradient: 18% B to 33% B in 10 min; Wave Length: 254/220 nm; RT1 (min): 11.92 to afford (7R,14R)-1-(difluoromethoxy)-11-(4-((dimethylphosphoryl)methyl)-3-fluorophenyl)-6-methyl-6,7-dihydro-7,14-methanobenzo[f]benzo[4,5]imidazo[1,2-a][1,4]diazocin-5(14H)-one (22 mg, 24%) as a white solid. MS ESI calculated for $C_{28}H_{25}F_3N_3O_3P$ $[M+H]^+$, 540.16, found 540.15. $^1H$ NMR (400 MHz, Chloroform-d) δ 8.51-8.46 (m, 1H), 7.78 (d, J=8.5 Hz, 1H), 7.69 (s, 1H), 7.45-7.38 (m, 3H), 7.34-7.30 (m, 1H), 7.15-7.05 (m, 2H), 6.82 (t, J=73.6 Hz, 1H), 6.29 (d, J=7.1 Hz, 1H), 5.03-4.97 (m, 1H), 3.53 (s, 3H), 3.51-3.41 (m, 1H), 3.19 (d, J=14.8 Hz, 2H), 2.89 (d, J=13.5 Hz, 1H), 1.54 (s, 3H), 1.51 (s, 3H). $^{19}F$ NMR (377 MHz, Chloroform-d) δ −79.88, −80.32, −81.40, −81.85, −117.54. $^{31}P$ NMR (162 MHz, Chloroform-d) δ 40.20.

Example 81: (7R,14R)-1-(difluoromethoxy)-11-(4-((dimethylphosphoryl)methyl)-3,5-difluorophenyl)-6,7-dihydro-7,14-methanobenzo[f]benzo[4,5]imidazo[1,2-a][1,4]diazocin-5(14H)-one

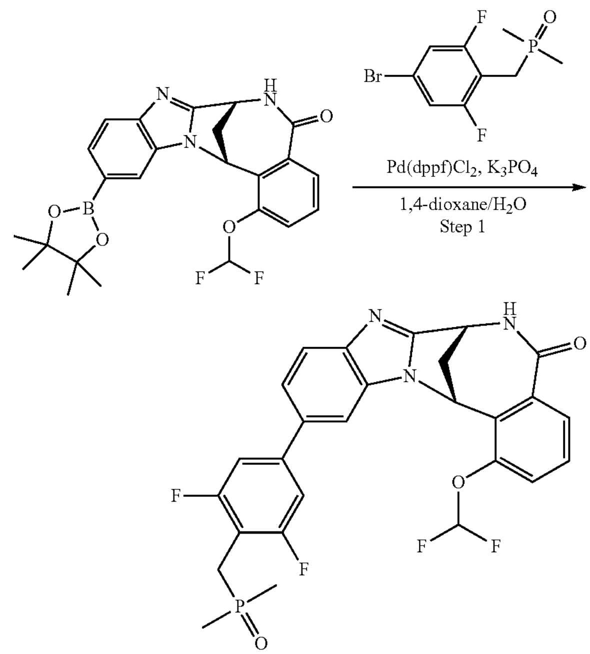

To a stirred solution of (7R,14R)-1-(difluoromethoxy)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (70 mg, 0.150 mmol) and 5-bromo-2-[(dimethylphosphoryl)methyl]-1,3-difluorobenzene (64 mg, 0.225 mmol) in 1,4-dioxane (0.8 mL) and $H_2O$ (0.2 mL) was added $K_3PO_4$ (96 mg, 0.450 mmol) and Pd(dppf)$Cl_2$—$CH_2Cl_2$ (12 mg, 0.015 mmol) in portions at room temperature under nitrogen atmosphere. The resulting mixture was stirred for 2 h at 80° C. under nitrogen atmosphere. The mixture was allowed to cool down to room temperature. The resulting mixture was concentrated under reduced pressure. The residue was purified by silica gel column chromatography, eluted with $CH_2Cl_2$/MeOH (0% to 10%) followed by Prep-HPLC with the following conditions: Column: XBridge Prep Phenyl OBD Column 19*250 mm, 5 m; Mobile Phase A: Water (10 mmol/L $NH_4HCO_3$+0.1% NH—$H_2O$), Mobile Phase B: ACN; Flow rate: 60 mL/min; Gradient: 17% B to 33% B in 10 min; Wave Length: 254/220 nm; RT1 (min): 11.68 to afford (7R,14R)-1-(difluoromethoxy)-11-(4-((dimethylphosphoryl)methyl)-3,5-difluorophenyl)-6,7-dihydro-7,14-methanobenzo[f]benzo[4,5]imidazo[1,2-a][1,4]diazocin-5(14H)-one (28 mg, 33%) as a white solid. MS ESI calculated for $C_{27}H_{22}F_4N_3O_3P$ $[M+H]^+$, 544.13, found 544.10. $^1H$ NMR (400 MHz, Chloroform-d) δ 8.46-8.42 (m, 1H), 7.79 (d, J=8.5 Hz, 1H), 7.64 (d, J=1.7 Hz, 1H), 7.49-7.35 (m, 4H), 7.17 (d, J=8.4 Hz, 2H), 6.89 (t, J=72.7 Hz, 1H), 6.39 (d, J=7.2 Hz, 1H), 5.03-4.96 (m, 1H), 3.55-3.45 (m, 1H), 3.31 (d, J=16.1 Hz, 2H), 2.89 (d, J=13.3 Hz, 1H), 1.58 (s, 3H), 1.54 (s, 3H). $^{19}F$ NMR (377 MHz, Chloroform-d) δ −81.01, −112.49. $^{31}P$ NMR (162 MHz, Chloroform-d) δ 42.20.

Example 82: (7R,14R)-1-(difluoromethoxy)-11-(4-((dimethylphosphoryl)methyl)-2,5-difluorophenyl)-6,7-dihydro-7,14-methanobenzo[f]benzo[4,5]imidazo[1,2-a][1,4]diazocin-5(14H)-one

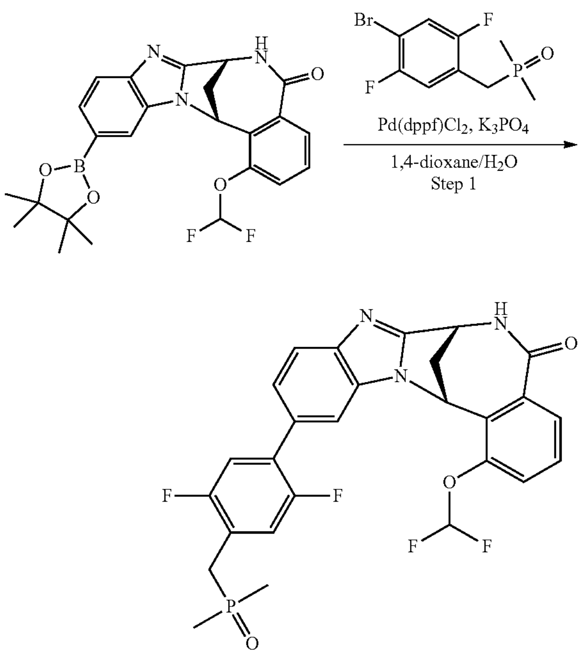

To a stirred solution of (7R,14R)-1-(difluoromethoxy)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.128 mmol) and 1-bromo-4-[(dimethylphosphoryl)methyl]-2,5-difluorobenzene (73 mg, 0.256 mmol) in 1,4-dioxane (0.8 mL) and $H_2O$ (0.2 mL) were added $K_3PO_4$ (82 mg, 0.384 mmol and Pd(dppf)$Cl_2CH_2Cl_2$ (10 mg, 0.013 mmol) in portions at room temperature under nitrogen atmosphere. The resulting mixture was stirred for 2 h at 80° C. under nitrogen atmosphere. The resulting mixture was concentrated under reduced pressure. The residue was purified by silica gel column chromatography, eluted with $CH_2Cl_2$/MeOH (0% to 10%) followed by Prep-HPLC with the following conditions: Column: XBridge Shield RP18 OBD Column 30*150 mm, 5 m; Mobile Phase A: Water (10 mmol/L $NH_4HCO_3$), Mobile Phase B: ACN; Flow rate: 60 mL/min; Gradient: 13% B to 33% B in 12 min; Wave Length: 254 nm; RT1 (min): 13.3 to afford (7R,14R)-1-(difluoromethoxy)-11-(4-((dimethylphosphoryl)methyl)-2,5-difluorophenyl)-6,7-dihydro-7,14-methanobenzo[f]benzo[4,5]imidazo[1,2-a][1,4]diazocin-5(14H)-one (14 mg, 19%) as a white solid. MS ESI calculated for $C_{27}H_{22}F_4N_3O_3P$ $[M+H]^+$, 544.13, found 544.05. $^1H$ NMR (400 MHz, Chloroform-d) δ 8.48-8.42 (m, 1H), 7.84 (d, J=8.6 Hz, 1H), 7.73 (t, J=1.5 Hz, 1H), 7.53-7.37 (m, 4H), 7.25-7.14 (m, 2H), 6.86 (t, J=73.0 Hz, 1H), 6.45 (d, J=7.3 Hz, 1H), 5.25 (t, J=6.7 Hz, 1H), 3.61-3.50 (m, 1H), 3.22 (d, J=14.5 Hz, 2H), 2.93 (d, J=13.4 Hz, 1H), 1.58 (d, J=2.9 Hz, 3H), 1.55 (d, J=2.9 Hz, 3H). $^{19}F$ NMR (377 MHz, Chloroform-d) δ −80.39, −80.84, −81.48, −81.93, −122.46, −122.47, −122.51, −122.51, −122.79, −122.83. $^{31}P$ NMR (162 MHz, Chloroform-d) δ 40.36.

Example 83: dimethyl (4-((7R,14R)-1-(difluoromethoxy)-6-(methyl-d3)-5-oxo-5,6,7,14-tetrahydro-7,14-methanobenzo[f]benzo[4,5]imidazo[1,2-a][1,4]diazocin-11-yl)benzyl)phosphonate Synthetic Scheme

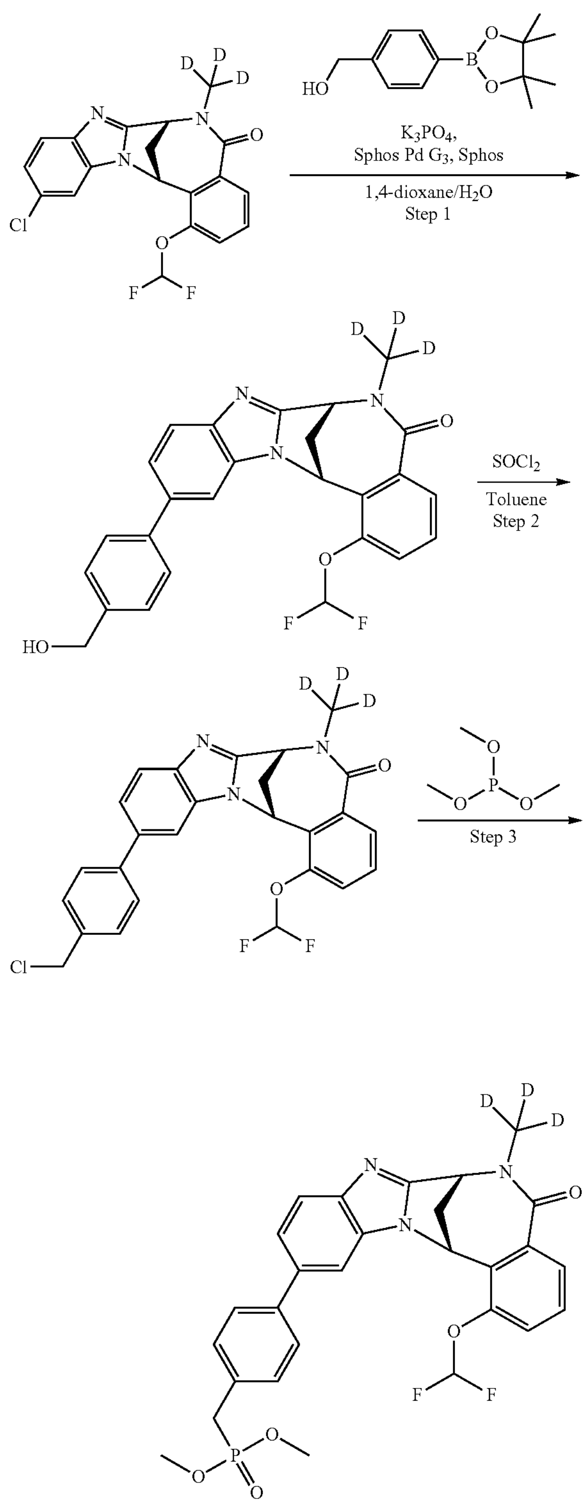

Preparation 83A: (7R,14R)-1-(difluoromethoxy)-11-(4-(hydroxymethyl)phenyl)-6-(methyl-d3)-6,7-dihydro-7,14-methanobenzo[f]benzo[4,5]imidazo[1,2-a][1,4]diazocin-5(14H)-one

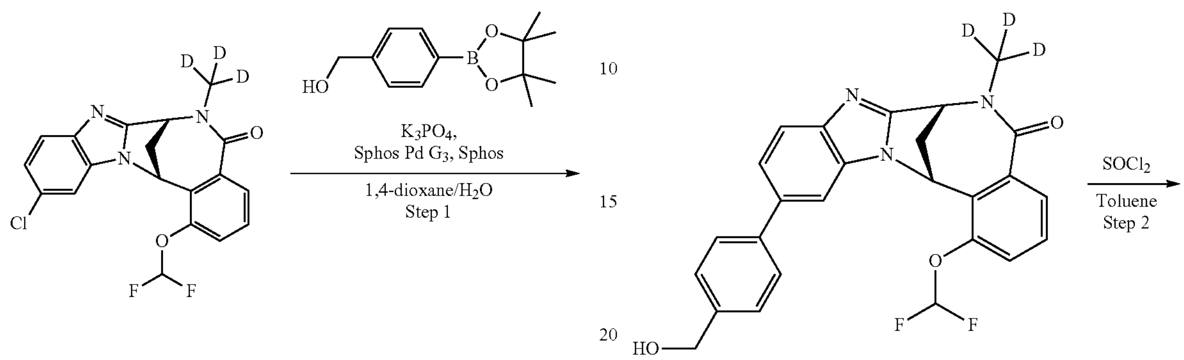

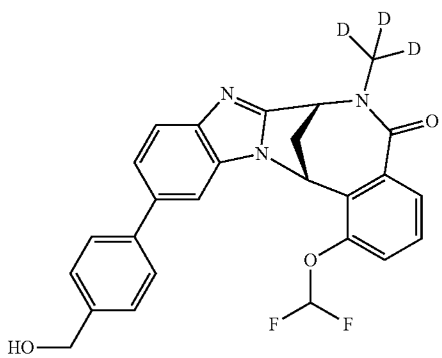

Into a 8 mL vial were added (7R,14R)-11-chloro-1-(difluoromethoxy)-6-(methyl-d3)-6,7-dihydro-7,14-methanobenzo[f]benzo[4,5]imidazo[1,2-a][1,4]diazocin-5(14H)-one (100 mg, 0.255 mmol), [4-(4,4,5,5-tetramethyl-1,3,2-dioxaborolan-2-yl)phenyl]methanol (71 mg, 0.306 mmol), $K_3PO_4$ (162 mg, 0.765 mmol), SPhos (10 mg, 0.026 mmol), SPhos Pd G3 (19 mg, 0.026 mmol), 1,4-dioxane (2.5 mL) and $H_2O$ (0.5 mL) at room temperature. The mixture was purged with nitrogen for 3 min and then was stirred for overnight at 80° C. under nitrogen atmosphere. The mixture was allowed to cool down to room temperature. The resulting mixture was concentrated under vacuum. The residue was purified by silica gel column chromatography, eluted with $CH_2Cl_2$/MeOH (10/1) to afford (7R,14R)-1-(difluoromethoxy)-11-(hydroxymethyl)phenyl)-6-(methyl-d3)-6,7-dihydro-7,4-methanobenzo[f]benzo[4,5]imidazo[1,2-a][1,4]diazocin-5(14H)-one (95 mg, 80%) as a pink solid. MS ESI calculated for $C_{26}H_{18}D_3F_2N_3O_3$ $[M+H]^+$, 465.17, found 465.30. $^1H$ NMR (400 MHz, Chloroform-d) δ −8.51-8.46 (m, 1H), 7.77 (d, J=8.5 Hz, 1H), 7.72-7.67 (m, 1H), 7.60-7.54 (m, 2H), 7.53-7.38 (m, 4H), 7.35-7.27 (m, 1H), 6.83 (t, J=72.9 Hz, 12), 6.30 (d, J=7.2 Hz, 1H), 5.04 (d, J=7.1 Hz, 1), 4.75 (s, 2H), 3.53-3.44 (m, 1H), 2.89 (d, J=13.6 Hz, 1H).

Preparation 83B: (7R,14R)-11-(4-(chloromethyl)phenyl)-1-(difluoromethoxy)-6-(methyl-d3)-6,7-dihydro-7,14-methanobenzo[f]benzo[4,5]imidazo[1,2-a][1,4]diazocin-5(14H)-one

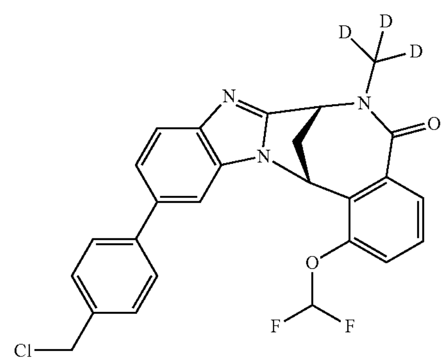

To a solution of (7R,14R)-1-(difluoromethoxy)-11-(4-(hydroxymethyl)phenyl)-6-(methyl-d3)-6,7-dihydro-7,14-methanobenzo[f]benzo[4,5]imidazo[1,2-a][1,4]diazocin-5(14H)-one (85 mg, 0.183 mmol) in Toluene (2 mL) was added thionyl chloride (1 mL) dropwise at 0° C. The resulting mixture was stirred for 2 h at 60° C. The mixture was allowed to cool down to room temperature. The resulting mixture was concentrated under vacuum to afford (7R,14R)-11-(4-(chloromethyl)phenyl)-1-(difluoromethoxy)-6-(methyl-d3)-6,7-dihydro-7,14-methanobenzo[f]benzo[4,5]imidazo[1,2-a][1,4]diazocin-5(14H)-one (90 mg) as a yellow solid. The crude product was used in the next step without further purification. MS ESI calculated for $C_{26}H_{17}D_3ClF_2N_3O_2$ $[M+H]^+$, 483.14, found 483.30.

Example 83: dimethyl (4-((7R,14R)-1-(difluoromethoxy)-6-(methyl-d3)-5-oxo-5,6,7,14-tetrahydro-7,14-methanobenzo[f]benzo[4,5]imidazo[1,2-a][1,4]diazocin-11-yl)benzyl)phosphonate

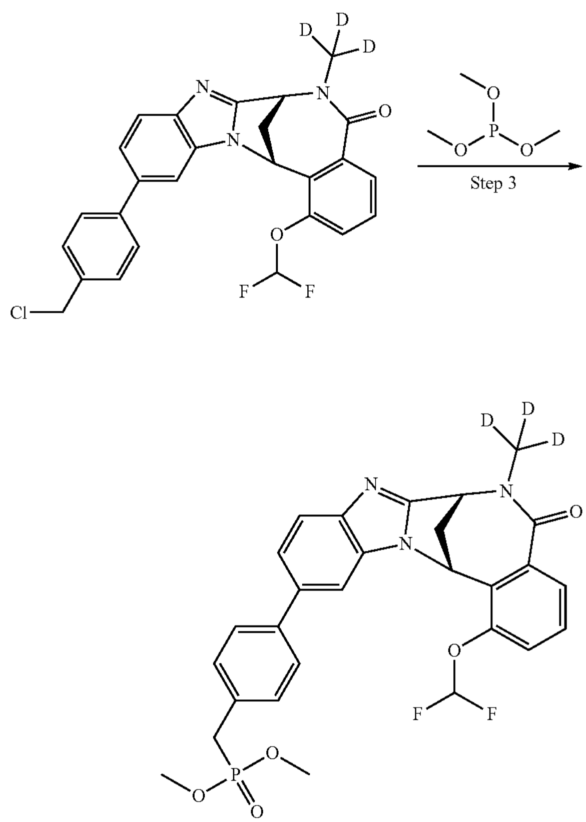

Into a 40 mL vial were added (7R,14R)-11-(4-(chloromethyl)phenyl)-1-(difluoromethoxy)-6-(methyl-d3)-6,7-dihydro-7,14-methanobenzo[f]benzo[4,5]imidazo[1,2-a][1,4]diazocin-5(14H)-one (90 mg, 0.186 mmol) and trimethyl phosphite (5 mL) at room temperature. The resulting mixture was stirred overnight at 115° C. The mixture was allowed to cool down to room temperature. The resulting mixture was concentrated under vacuum. The crude product was purified by Prep-HPLC with the following conditions (Column: Xselect CSH $C_{18}$ OBD Column 30*150 mm 5 μm; Mobile Phase A: Water (0.1% FA), Mobile Phase B: ACN; Flow rate: 60 mL/min; Gradient: 20% B to 40% B in 8 min; Wave Length: 254 nm/220 nm) to afford dimethyl (4-((7R,14R)-1-(difluoromethoxy)-6-(methyl-d3)-5-oxo-5,6,7,14-tetrahydro-7,14-methanobenzo[f]benzo[4,5]imidazo[1,2-a][1,4]diazocin-11-yl)benzyl)phosphonate (18 mg, 17%) as a white solid. MS ESI calculated for $C_{28}H_{23}D_3F_2N_3O_5P$ $[M+H]^+$, 557.18, found 557.35. $^1H$ NMR (400 MHz, Chloroform-d) δ 8.51-8.46 (m, 1H), 7.75 (d, J=8.5 Hz, 1H), 7.71-7.66 (m, 1H), 7.56 (d, J=7.9 Hz, 2H), 7.51-7.46 (m, 1H), 7.45-7.35 (m, 3H), 7.31 (d, J=8.2 Hz, 1H), 6.84 (t, J=72.9 Hz, 1H), 6.28 (d, J=7.0 Hz, 1H), 4.97 (d, J=6.9 Hz, 1H), 3.73 (s, 3H), 3.70 (s, 3H), 3.50-3.41 (m, 1H), 3.22 (d, J=21.7 Hz, 2H), 2.87 (d, J=13.4 Hz, 1H). $^{19}F$ NMR (377 MHz, Chloroform-d) δ −80.16, −80.61, −80.91, −81.36. $^{31}P$ NMR (162 MHz, Chloroform-d) δ 28.83.

Example 84: (7R,14R)-1-(difluoromethoxy)-11-(4-((dimethylphosphoryl)(hydroxy)methyl)phenyl)-6-(methyl-d3)-6,7-dihydro-7,14-methanobenzo[f]benzo[4,5]imidazo[1,2-a][1,4]diazocin-5(14H)-one Synthetic Scheme

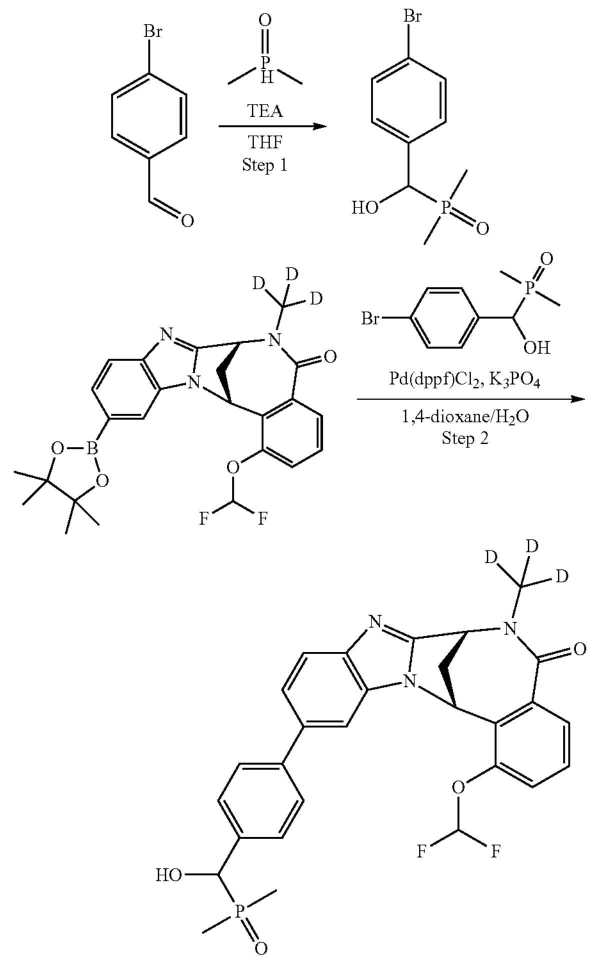

Preparation 84A: (4-bromophenyl)(dimethylphosphoryl)methanol

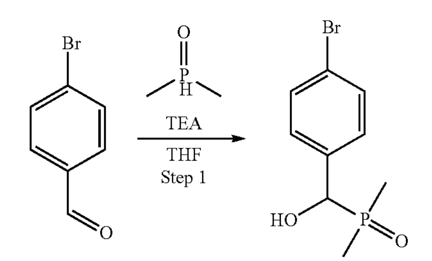

To a stirred mixture of 4-bromobenzaldehyde (20.00 g, 108.096 mmol) and (methylphosphonoyl)methane (12.66 g, 162.144 mmol) in THF (200 mL) was added TEA (30 mL, 216.192 mmol) at room temperature. The resulting mixture was stirred for 4 h at 55° C. The resulting mixture was concentrated under vacuum. The residue was purified by trituration with $Et_2O$/EtOH (100/1) (3×100 mL). The precipitated solids were collected by filtration. The resulting mixture was concentrated under reduced pressure. This resulted in (4-bromophenyl)(dimethylphosphoryl)methanol (20.10 g, 70%) as a white solid. MS ESI calculated for $C_9H_{12}BrO_2P$ $[M+H]^+$, 262.98 264.98, found 263.05 265.05. $^1H$ NMR (400 MHz, Chloroform-d) δ 7.48-7.46 (m, 2H), 7.27-7.25 (m, 2H), 5.29 (s, 1H), 4.94-4.91 (m, 1H), 1.47-1.38 (m, 3H), 1.31-1.27 (m, 3H). $^{31}P$ NMR (162 MHz, Chloroform-d) δ 48.53.

Example 84: (7R,14R)-1-(difluoromethoxy)-11-(4-((dimethylphosphoryl)(hydroxy)methyl)phenyl)-6-(methyl-d3)-6,7-dihydro-7,14-methanobenzo[f]benzo[4,5]imidazo[1,2-a][1,4]diazocin-5(14H)-one

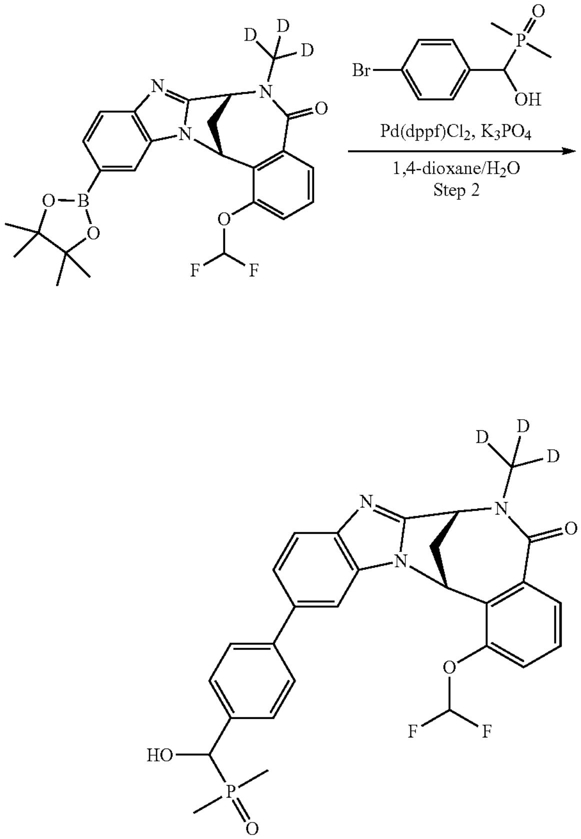

To a stirred mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (70 mg, 0.145 mmol) and (4-bromophenyl)(dimethylphosphoryl)methanol (45 mg, 0.174 mmol) in 1,4-dioxane (1 mL) and $H_2O$ (0.2 mL) were added $K_3PO_4$ (92 mg, 0.435 mmol) and $Pd(dppf)Cl_2 \cdot CH_2Cl_2$ (12 mg, 0.014 mmol) at room temperature under nitrogen atmosphere. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (10:1) followed by reversed-phase flash chromatography with the following conditions: column, C18 silica gel; mobile phase, $CH_3CN$ in Water (10 mmol/L $NH_4HCO_3$), 25% to 55% gradient in 25 min; detector, 254 nm. This resulted in (7R,14R)-1-(difluoromethoxy)-11-(4-((dimethylphosphoryl)(hydroxy)methyl)phenyl)-6-(methyl-d3)-6,7-dihydro-7,14-methanobenzo[f]benzo[4,5]imidazo[1,2-a][1,4]diazocin-5(14H)-one (31 mg, 39%) as a white solid. MS ESI calculated for $C_{28}H_{23}D_3F_2N_3O_4P$ $[M+H]^+$, 541.18, found 541.15. $^1H$ NMR (400 MHz, Chloroform-d) δ 8.51-8.46 (m, 1H), 7.80-7.63 (m, 2H), 7.61-7.56 (m, 2H), 7.53-7.45 (m, 3H), 7.44-7.37 (m, 1H), 7.33-7.27 (m, 1H), 6.83 (t, J=72.8 Hz, 1H), 6.28-6.16 (m, 1H), 5.04 (d, J=6.9 Hz, 1H), 5.01-4.95 (m, 1H), 3.92 (s, 1H), 3.53-3.42 (m, 1H), 2.87 (d, J=13.4 Hz, 1H), 1.54-1.40 (m, 6H). $^{19}F$ NMR (376 MHz, DMSO-$d_6$) δ −81.62, −81.64, −82.07, −82.09, −82.20, −82.23, −82.65, −82.67. $^{31}P$ NMR (162 MHz, DMSO-$d_6$) δ 43.95.

Example 85 and 86: (7R,14R)-1-(difluoromethoxy)-11-(4-((S or R)-1-(dimethylphosphoryl)ethyl)phenyl)-6-(methyl-d3)-6,7-dihydro-7,14-methanobenzo[f]benzo[4,5]imidazo[1,2-a][1,4]diazocin-5(14H)-one and (7R,14R)-1-(difluoromethoxy)-11-(4-((R or S)-1-(dimethylphosphoryl)ethyl)phenyl)-6-(methyl-d3)-6,7-dihydro-7,14-methanobenzo[f]benzo[4,5]imidazo[1,2-a][1,4]diazocin-5(14H)-one Synthetic Scheme

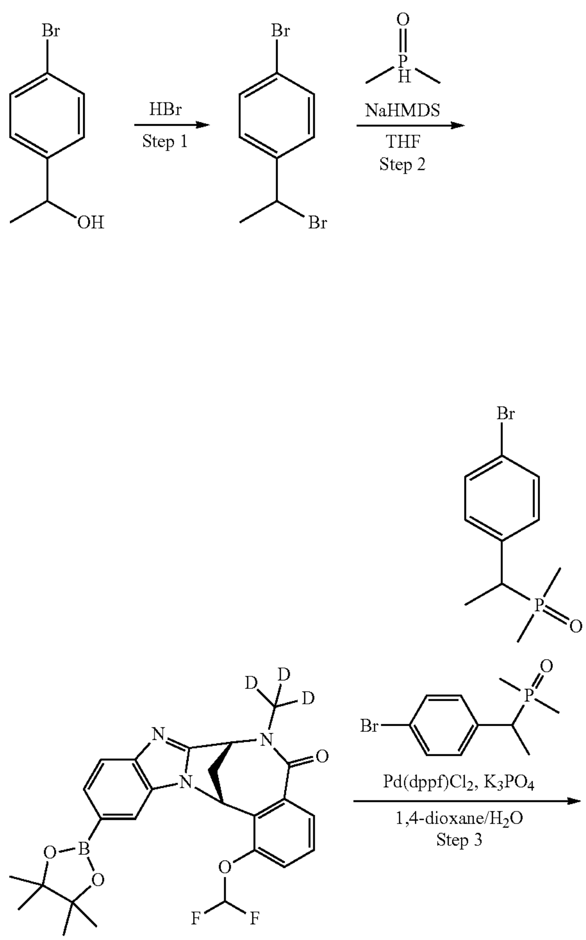

-continued

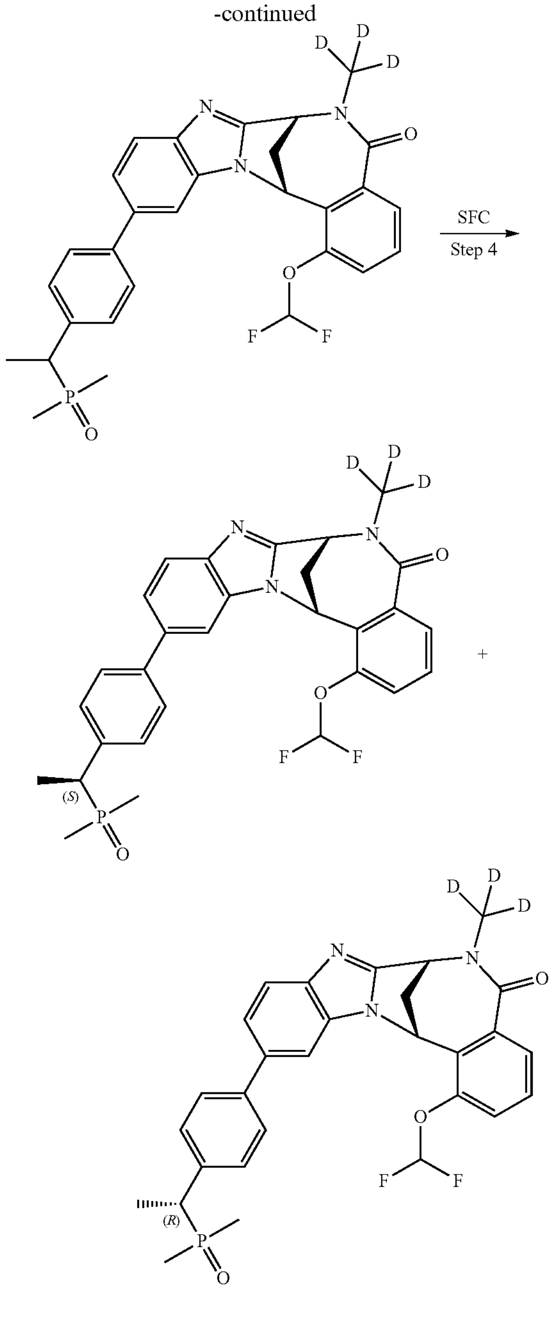

Preparation 85A: 1-bromo-4-(1-bromoethyl)benzene

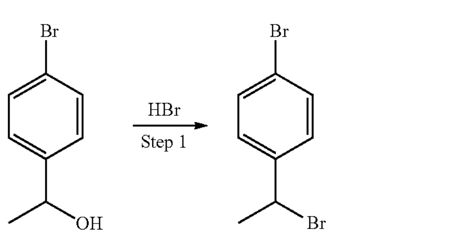

A mixture of 1-(4-bromophenyl)ethanol (5.00 g, 24.868 mmol) and HBr (25 mL) was stirred for 15 min at 100° C.

The mixture was basified to pH 8 with 1M NaOH(aq). The aqueous layer was extracted with EtOAc (3×100 mL). The resulting mixture was concentrated under vacuum. The residue was purified by silica gel column chromatography, eluted with PE to afford 1-bromo-4-(1-bromoethyl)benzene (5.10 g, 76%) as a yellow oil. $^{1}H$ NMR (400 MHz, Chloroform-d) δ 7.49-7.44 (m, 2H), 7.33-7.29 (m, 2H), 5.15 (q, J=6.9 Hz, 1H), 2.01 (d, J=6.9 Hz, 3H).

Preparation 85B: 1-bromo-4-[1-(dimethylphosphoryl)ethyl]benzene

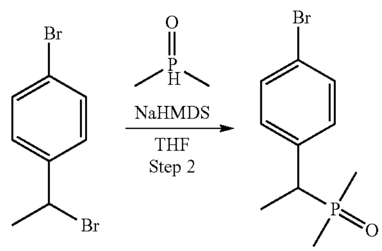

To a stirred solution of (methylphosphonoyl)methane (2.96 g, 37.884 mmol) in THF (50 mL) was added NaHMDS (18.2 mL, 164.509 mmol, 1M in THF) at 0° C. under nitrogen atmosphere. The mixture was stirred for 15 min at 0° C. To the above mixture was added 1-bromo-4-(1-bromoethyl)benzene (5.00 g, 18.942 mmol) at 0° C. The resulting mixture was stirred for additional 16 h at 20° C. The reaction was quenched by the addition of water (2 mL) at room temperature. The resulting mixture was concentrated under vacuum. The residue was purified by silica gel column chromatography, eluted with $CH_2Cl_2$/MeOH (10:1) to afford 1-bromo-4-[1-(dimethylphosphoryl)ethyl]benzene (1.00 g, 20%) as a white solid. MS ESI calculated for $C_{10}H_{14}BrOP$ $[M+H]^+$, 261.00 263.00, found 261.05 263.05. $^{1}H$ NMR (400 MHz, Chloroform-d) δ 7.51-7.44 (m, 2H), 7.21-7.16 (m, 2H), 3.06-2.97 (m, 1H), 1.65-1.57 (m, 3H), 1.49-1.44 (m, 3H), 1.34-1.29 (m, 3H). $^{31}P$ NMR (162 MHz, Chloroform-d) δ 45.95.

Preparation 85C: (7R,14R)-1-(difluoromethoxy)-11-(4-(1-(dimethylphosphoryl)ethyl)phenyl)-6-(methyl-d3)-6,7-dihydro-7,14-methanobenzo[f]benzo[4,5]imidazo[1,2-a][1,4]diazocin-5(14H)-one

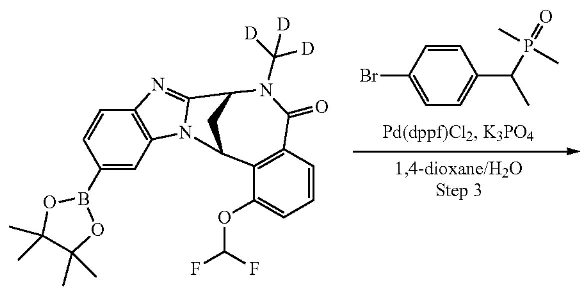

-continued

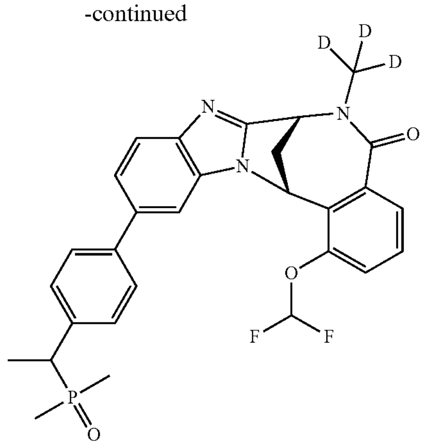

To a stirred mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (97 mg, 0.372 mmol) in 1,4-dioxane (1.5 mL) and $H_2O$ (0.3 mL) were added $K_3PO_4$ (197 mg, 0.930 mmol) and Pd(dppf)$Cl_2$—$CH_2Cl_2$ (25 mg, 0.031 mmol) at room temperature under nitrogen atmosphere. The resulting mixture was stirred for 16 h at 80° C. under nitrogen atmosphere. The resulting mixture was concentrated under vacuum. The residue was purified by silica gel column chromatography, eluted with $CH_2Cl_2$/MeOH (10:1) followed by reversed-phase flash chromatography with the following conditions: column, C18 silica gel; mobile phase, $CH_3CN$ in Water (10 mmol/L $NH_4HCO_3$), 25% to 55% gradient in 25 min; detector, 254 nm. This resulted in (7R,14R)-1-(difluoromethoxy)-11-(4-(1-(dimethylphosphoryl)ethyl)phenyl)-6-(methyl-d3)-6,7-dihydro-7,14-methanobenzo[f]benzo[4,5]imidazo[1,2-a][1,4]diazocin-5(14H)-one (100 mg, 59%). MS ESI calculated for $C_{29}H_{25}D_3F_2N_3O_3P$ [M+H]$^+$, 539.20, found 539.20.

Example 85 and 86: (7R,14R)-1-(difluoromethoxy)-11-(4-((S or R)-1-(dimethylphosphoryl)ethyl)phenyl)-6-(methyl-d3)-6,7-dihydro-7,14-methanobenzo[f]benzo[4,5]imidazo[1,2-a][1,4]diazocin-5(14H)-one and (7R,14R)-1-(difluoromethoxy)-11-(4-((R or S)-1-(dimethylphosphoryl)ethyl)phenyl)-6-(methyl-d3)-6,7-dihydro-7,14-methanobenzo[f]benzo[4,5]imidazo[1,2-a][1,4]diazocin-5(14H)-one

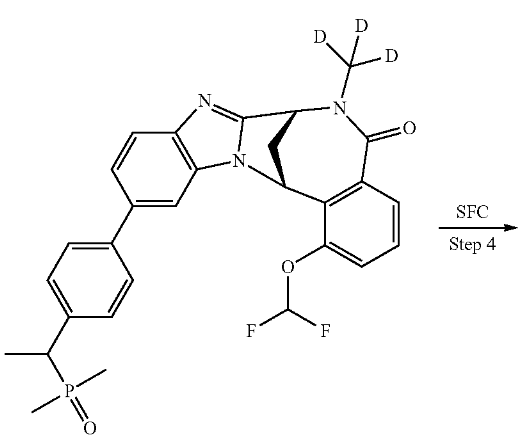

-continued

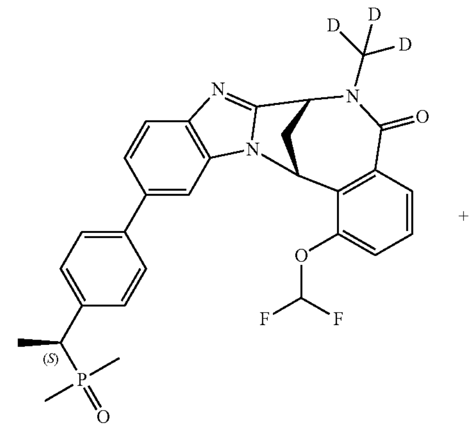

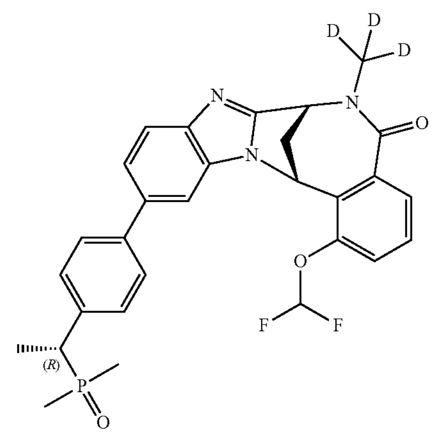

The (7R,14R)-1-(difluoromethoxy)-11-(4-(1-(dimethylphosphoryl)ethyl)phenyl)-6-(methyl-d3)-6,7-dihydro-7,14-methanobenzo[f]benzo[4,5]imidazo[1,2-a][1,4]diazocin-5(14H)-one (165 mg) was resolved by SFC with the following conditions: Column: CHIRALPAK IH 3*25 cm, 5 μm; Mobile Phase A: $CO_2$, Mobile Phase B: MeOH (20 mM $NH_3$); Flow rate: 100 mL/min; Gradient: isocratic 30% B; Wave Length: 276/208 nm; RT1 (min): 6.75; RT2 (min): 8.32. The first peak afforded 32 mg (19%) as a white solid. MS ESI calculated for $C_{29}H_{25}D_3F_2N_3O_3P$ [M+H]$^+$, 539.20, found 539.30. $^1$H NMR (400 MHz, DMSO-$d_6$) δ 8.32-8.24 (m, 1H), 7.87-7.66 (m, 3H), 7.62-7.56 (m, 2H), 7.54-7.47 (m, 3H), 7.42-7.37 (m, 2H), 6.29 (d, J=7.1 Hz, 1H), 5.23 (d, J=7.1 Hz, 1H), 3.58-3.47 (m, 1H), 3.23-3.11 (m, 1H), 2.82 (d, J=13.8 Hz, 1H), 1.53-1.44 (m, 3H), 1.43-1.37 (m, 3H), 1.25-1.16 (m, 3H). $^{19}$F NMR (377 MHz, DMSO-$d_6$) δ −81.62, −82.07, −82.15, −82.60. $^{31}$P NMR (162 MHz, DMSO-$d_6$) δ 43.32.

The second peak afforded 33 mg (20%) as a white solid. MS ESI calculated for $C_{29}H_{25}D_3F_2N_3O_3P$ [M+H]$^+$, 539.20, found 539.35. $^1$H NMR (400 MHz, DMSO-$d_6$) δ 8.30-8.25 (m, 1H), 7.87-7.65 (m, 3H), 7.59 (d, J=8.2 Hz, 2H), 7.53-7.47 (m, 3H), 7.41-7.36 (m, 2H), 6.29 (d, J=7.1 Hz, 1H), 5.23 (d, J=7.1 Hz, 1H), 3.58-3.48 (m, 1H), 3.24-3.13 (m, 1H), 2.82 (d, J=13.7 Hz, 1H), 1.53-1.45 (m, 3H), 1.42-1.37 (m, 3H), 1.24-1.17 (m, 3H). $^{19}$F NMR (377 MHz, DMSO-$d_6$) δ −81.60, −82.05, −82.16, −82.61. $^{31}$P NMR (162 MHz, DMSO-$d_6$) δ 43.33.

Example 87: (7R,14R)-1-(difluoromethoxy)-11-(6-(dimethylphosphoryl)-4-methylpyridin-3-yl)-6-(methyl-d3)-6,7-dihydro-7,14-methanobenzo[f]benzo[4,5]imidazo[1,2-a][1,4]diazocin-5(14H)-one

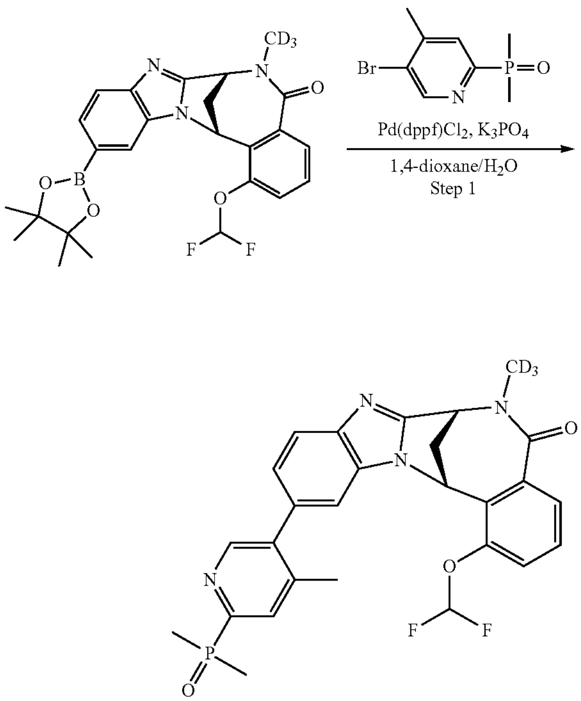

Into a 8 mL vial were added (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (70 mg, 0.145 mmol), 5-bromo-2-(dimethylphosphoryl)-4-methylpyridine (47 mg, 0.189 mmol), Pd(dppf)$Cl_2$·$CH_2Cl_2$ (12 mg, 0.014 mmol), $K_3PO_4$ (92 mg, 0.435 mmol), $H_2O$ (0.2 mL) and 1,4-dioxane (1 mL) at room temperature. The mixture was purged with nitrogen for 3 min and then was stirred 2 h at 80° C. under nitrogen atmosphere. The mixture was allowed to cool down to room temperature. The residue was purified by silica gel column chromatography, eluted with $CH_2Cl_2$/MeOH (7/1) followed by Prep-HPLC with the following conditions (Column: XBridge Shield RP18 OBD Column 30*150 mm, 5 m; Mobile Phase A: Water (10 mmol/L $NH_4HCO_3$+0.1% $NH_3$·$H_2O$), Mobile Phase B: ACN; Flow rate: 60 mL/min; Gradient: 33% B to 53% B in 10 min; Wave Length: 254 nm/220 nm; RT1 (min): 10.5) to afford (7R,14R)-1-(difluoromethoxy)-11-(6-(dimethylphosphoryl)-4-methylpyridin-3-yl)-6-(methyl-d3)-6,7-dihydro-7,14-methanobenzo[f]benzo[4,5]imidazo[1,2-a][1,4]diazocin-5(14H)-one (28 mg, 37%) as white solid. MS ESI calculated for $C_{27}H_{22}D_3F_2N_4O_3P$ $[M+H]^+$, 526.18, found 526.35. $^1H$ NMR (400 MHz, DMSO-$d_6$) δ 8.55 (s, 1H), 8.31-8.27 (m, 1H), 7.92 (d, J=5.6 Hz, 1H), 7.79-7.67 (m, 1H), 7.57-7.33 (m, 4H), 7.27 (m, 1H), 6.26 (d, J=7.1 Hz, 1H), 5.26 (d, J=7.1 Hz, 1H), 3.53 (m, 1H), 2.83 (d, J=13.9 Hz, 1H), 2.32 (s, 3H), 1.71 (s, 3H), 1.68 (s, 3H). $^{19}F$ NMR (377 MHz, DMSO-$d_6$) δ −81.49, −81.94, −82.01, −82.45. $^{31}P$ NMR (162 MHz, DMSO-d) δ 33.87.

Example 88: (7R,14R)-1-(difluoromethoxy)-11-(4-(dimethylphosphoryl)-5-fluoro-2-methylphenyl)-6-(methyl-d3)-6,7-dihydro-7,14-methanobenzo[f]benzo[4,5]imidazo[1,2-a][1,4]diazocin-5(14H)-one Synthetic Scheme

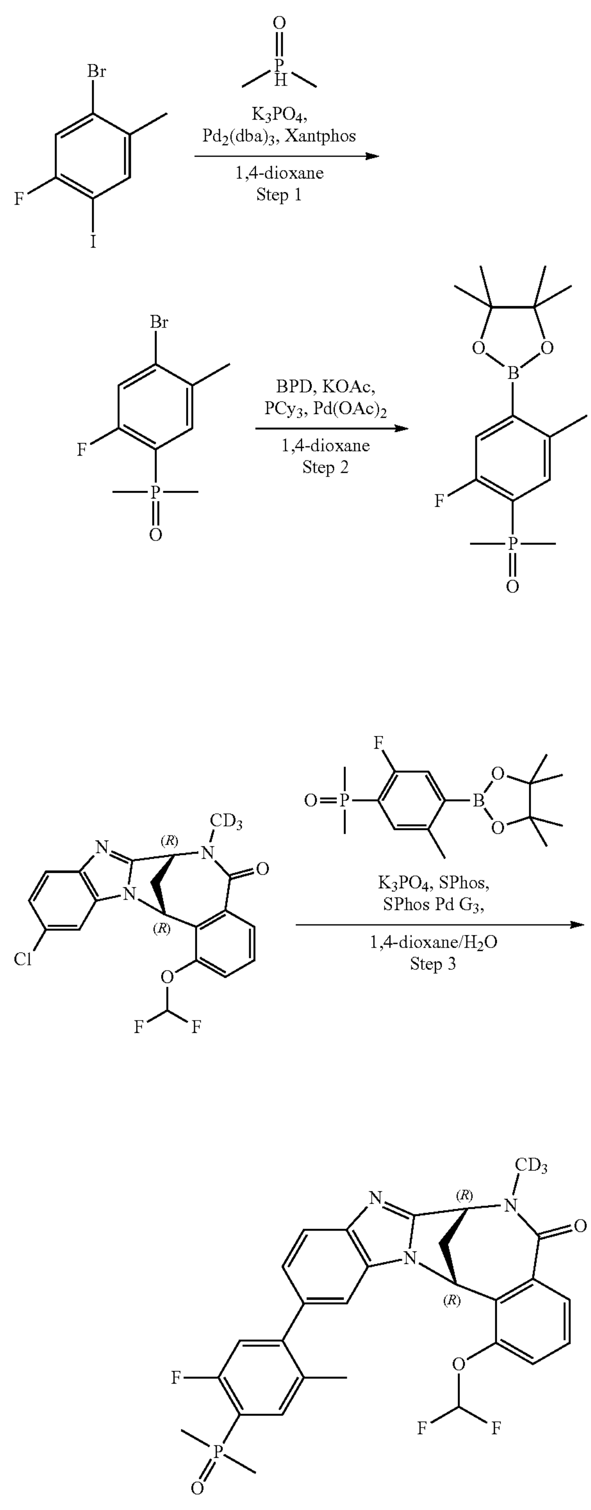

Preparation 88A: 1-bromo-4-(dimethylphosphoryl)-5-fluoro-2-methylbenzene

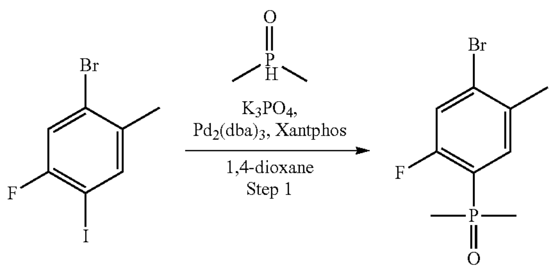

To a stirred mixture of 1-bromo-5-fluoro-4-iodo-2-methylbenzene (2.00 g, 6.351 mmol) and (methylphosphonoyl) methane (545 mg, 6.986 mmol) in 1,4-dioxane (20 mL) were added $K_3PO_4$ (4.01 g, 19.053 mmol), Xantphos (367 mg, 0.635 mmol) and $Pd_2(dba)_3$ (291 mg, 0.318 mmol) at room temperature under nitrogen atmosphere. The resulting mixture was stirred for 16 h at 90° C. under nitrogen atmosphere. The resulting mixture was concentrated under vacuum. The residue was purified by silica gel column chromatography, eluted with $CH_2Cl_2$/MeOH (20:1) to afford 1-bromo-4-(dimethylphosphoryl)-5-fluoro-2-methylbenzene (1.40 g, 83%) as a yellow solid. MS ESI calculated for $C_9H_{11}BrFOP$ $[M+H]^+$, 264.97 266.97, found 264.90 266.85. $^1H$ NMR (400 MHz, Chloroform-d) δ 7.86-7.77 (m, 1H), 7.37-7.31 (m, 1H), 2.42 (s, 3H), 1.80 (s, 3H), 1.77 (s, 3H). $^{31}P$ NMR (162 MHz, Chloroform-d) δ 30.84.

Preparation 88B: 2-[4-(dimethylphosphoryl)-5-fluoro-2-methylphenyl]-4,4,5,5-tetramethyl-1,3,2-dioxaborolane

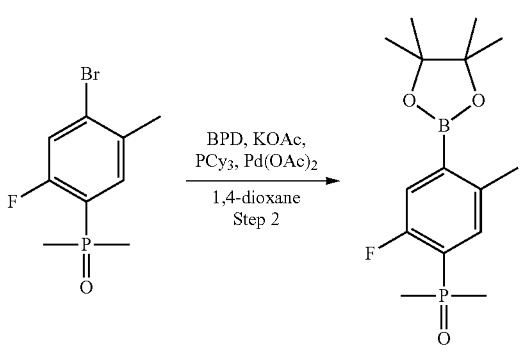

To a stirred mixture of 1-bromo-4-(dimethylphosphoryl)-5-fluoro-2-methylbenzene (1.60 g, 6.036 mmol) and BPD (1.84 g, 7.243 mmol) in 1,4-dioxane (24 mL) were added KOAc (1.18 g, 12.072 mmol), $PCy_3$ (169 mg, 0.604 mmol) and $Pd(OAc)_2$ (136 mg, 0.604 mmol) at room temperature under nitrogen atmosphere. The resulting mixture was stirred for 4 h at 80° C. under nitrogen atmosphere. The residue was basified to pH 8 with 10% NaOH (aq). The resulting mixture was washed with 3×20 mL of DCM. The residue was acidified to pH 4 with 1M HCl (aq). The aqueous layer was extracted with EtOAc (3×40 mL). The resulting mixture was concentrated under reduced pressure. This resulted in 2-[4-(dimethylphosphoryl)-5-fluoro-2-methylphenyl]-4,4,5,5-tetramethyl-1,3,2-dioxaborolane (1.70 g, 90%) as a colorless oil. MS ESI calculated for $C_{15}H_{23}BF\ O_3P$ $[M+H]^+$, 313.15, found 313.00.

Example 88: (7R,14R)-1-(difluoromethoxy)-11-(4-(dimethylphosphoryl)-5-fluoro-2-methylphenyl)-6-(methyl-d3)-6,7-dihydro-7,14-methanobenzo[f]benzo[4,5]imidazo[1,2-a][1,4]diazocin-5(14H)-one

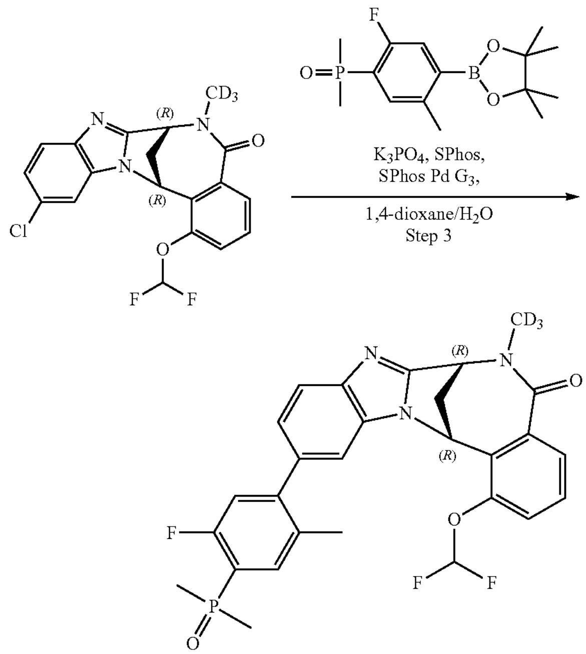

To a stirred mixture of (7R,14R)-11-chloro-1-(difluoromethoxy)-6-(methyl-d3)-6,7-dihydro-7,14-methanobenzo[f]benzo[4,5]imidazo[1,2-a][1,4]diazocin-5(14H)-one (600 mg, 1.527 mmol) and 2-[4-(dimethylphosphoryl)-5-fluoro-2-methylphenyl]-4,4,5,5-tetramethyl-1,3,2-dioxaborolane (953 mg, 3.054 mmol) in 1,4-dioxane (12 mL) and $H_2O$ (2.4 mL) were added $K_3PO_4$ (973 mg, 4.581 mmol), SPhos (63 mg, 0.153 mmol) and SPhos Pd G3 (119 mg, 0.153 mmol) at room temperature under nitrogen atmosphere. The resulting mixture was stirred for 4 h at 80° C. under nitrogen atmosphere. The resulting mixture was concentrated under reduced pressure. The residue was purified by silica gel column chromatography, eluted with $CH_2Cl_2$/MeOH (10:1) followed by reversed-phase flash chromatography with the following conditions: column, C18 silica gel; mobile phase, $CH_3CN$ in Water (10 mmol/L $NH_4HCO_3$), 30% to 55% gradient in 25 min; detector, 254 nm. This resulted in (7R,14R)-1-(difluoromethoxy)-11-(4-(dimethylphosphoryl)-5-fluoro-2-methylphenyl)-6-(methyl-d3)-6,7-dihydro-7,14-methanobenzo[f]benzo[4,5]imidazo[1,2-a][1,4]diazocin-5(14H)-one (548 mg, 66%) as a white solid. MS ESI calculated for $C_{28}H_{22}D_3F_3N_3O_3P$ $[M+H]^+$, 543.18, found 543.15. $^1H$ NMR (400 MHz, DMSO-$d_6$) δ 8.34-8.26 (m, 1H), 7.74-7.70 (m, 1H), 7.69-7.65 (m, 1H), 7.56-7.35 (m, 4H), 7.25-7.20 (m, 1H), 7.20-7.14 (m, 1H), 6.25 (d, J=7.1 Hz, 1H), 5.25 (d, J=7.1 Hz, 1H), 3.60-3.48 (m, 1H), 2.83 (d, J=13.8 Hz, 1H), 2.23 (s, 3H), 1.76 (s, 3H), 1.72 (s, 3H). $^{19}F$ NMR (377 MHz, DMSO-$d_6$) δ −81.94, −110.80. $^{31}P$ NMR (162 MHz, DMSO-$d_6$) δ 28.26.

Example 89: (7R,14R)-1-(difluoromethoxy)-11-(6-(dimethylphosphoryl)-4-methylpyridin-3-yl)-10-fluoro-6-(methyl-d3)-6,7-dihydro-7,14-methanobenzo[f]benzo[4,5]imidazo[1,2-a][1,4]diazocin-5(14H)-one

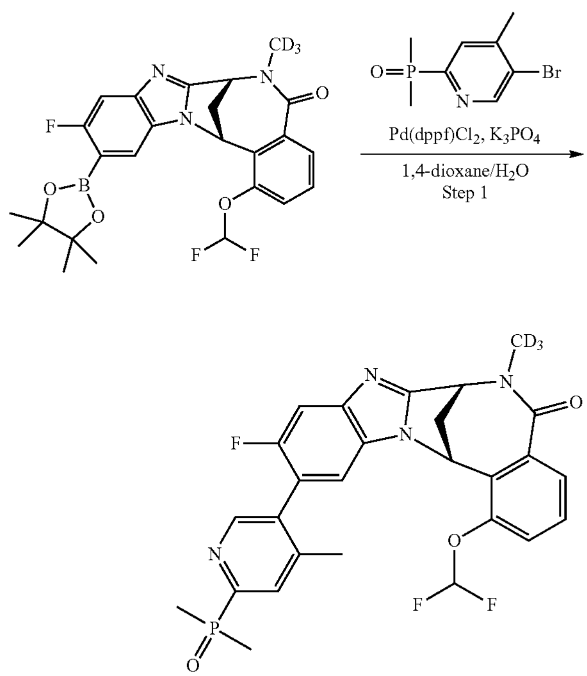

Into a 8 mL vial were added (7R,14R)-1-(difluoromethoxy)-10-fluoro-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (80 mg, 0.159 mmol), 5-bromo-2-(dimethylphosphoryl)-4-methylpyridine (51 mg, 0.207 mmol), Pd(dppf)$Cl_2$ (13 mg, 0.016 mmol), $K_3PO_4$ (101 mg, 0.477 mmol), $H_2O$ (0.2 mL) and 1,4-dioxane (1 mL) at room temperature. The mixture was purged with nitrogen for 3 min and then was stirred 2 h at 80° C. under nitrogen atmosphere. The mixture was allowed to cool down to room temperature. The residue was purified by silica gel column chromatography, eluted with $CH_2Cl_2$/MeOH (7/1) followed by Prep-HPLC with the following conditions (Column: XBridge Shield RP18 OBD Column 30*150 mm, 5 m; Mobile Phase A: Water (10 mmol/L $NH_4HCO_3$), Mobile Phase B: ACN; Flow rate: 60 mL/min; Gradient: 35% B to 55% B in 10 min; Wave Length: 254 nm/220 nm; RT1 (min): 10.7) to afford (7R,14R)-1-(difluoromethoxy)-11-(6-(dimethylphosphoryl)-4-methylpyridin-3-yl)-10-fluoro-6-(methyl-d3)-6,7-dihydro-7,14-methanobenzo[f]benzo[4,5]imidazo[1,2-a][1,4]diazocin-5(14H)-one (19 mg, 22%) as white solid. MS ESI calculated for $C_{27}H_{21}D_3F_3N_4O_3P$ $[M+H]^+$, 544.17, found 544.30. $^1H$ NMR (400 MHz, DMSO-$d_6$) δ 8.56 (s, 1H), 8.33-8.25 (m, 1H), 7.95 (d, J=5.7 Hz, 1H), 7.73-7.61 (m, 1H), 7.55-7.30 (m, 4H), 6.26 (d, J=7.1 Hz, 1H), 5.27 (d, J=7.2 Hz, 1H), 3.58-3.48 (m, 1H), 2.83 (d, J=13.8 Hz, 1H), 2.22 (s, 3H), 1.72 (s, 3H), 1.69 (s, 3H). $^{19}F$ NMR (377 MHz, DMSO-$d_6$) δ −81.58, −82.03, −82.17, −82.62, −121.56. $^{31}P$ NMR (162 MHz, DMSO-$d_6$) δ 34.03.

Example 90: (7R,14R)-1-(difluoromethoxy)-11-(4-(dimethylphosphoryl)-3-fluoro-2-methylphenyl)-6-(methyl-d3)-6,7-dihydro-7,14-methanobenzo[f]benzo[4,5]imidazo[1,2-a][1,4]diazocin-5(14H)-one Synthetic Scheme

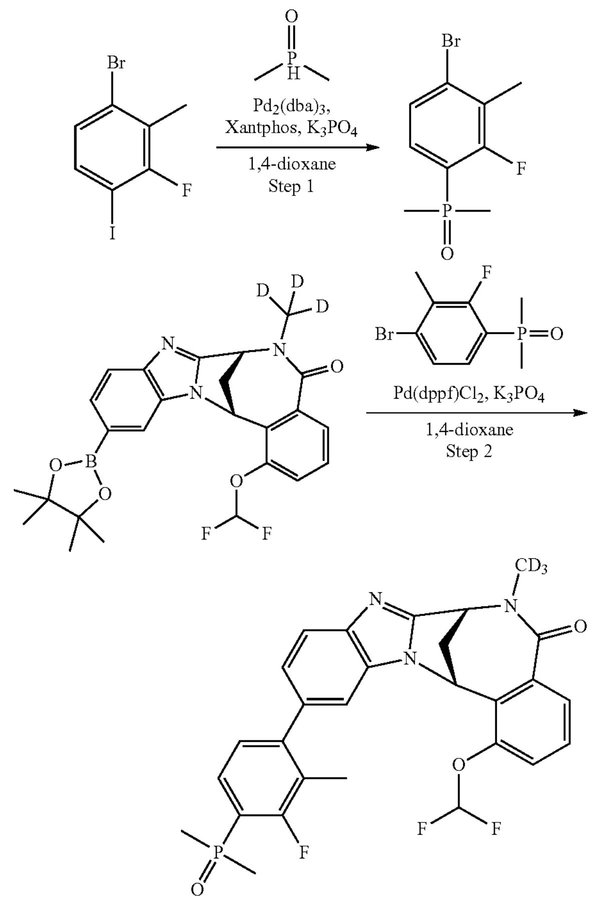

Preparation 90A: 1-bromo-4-(dimethylphosphoryl)-3-fluoro-2-methylbenzene

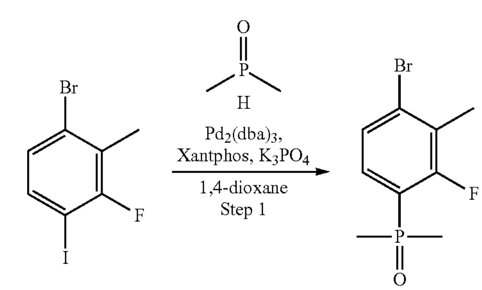

Into a 40 mL vial were added 1-bromo-3-fluoro-4-iodo-2-methylbenzene (500 mg, 1.588 mmol), (methylphosphonoyl)methane (136 mg, 1.747 mmol), $Pd_2(dba)_3$ (36 mg, 0.040 mmol), XantPhos (45 mg, 0.079 mmol), $K_3PO_4$ (404 mg, 1.906 mmol) and 1,4-dioxane (8 mL) at room temperature. The mixture was purged with nitrogen for 3 min and then was stirred for 1 h at 80° C. under nitrogen atmosphere. The mixture was allowed to cool down to room temperature. The residue was purified by silica gel column chromatography, eluted with $CH_2Cl_2$/MeOH (8/1) to afford 1-bromo-4-(dimethylphosphoryl)-3-fluoro-2-methylbenzene (320 mg, 76%) as reddish brown oil. MS ESI calculated for $C_9H_{11}BrFOP$ $[M+H]^+$, 264.97 266.97, found 264.95 266.95. $^1H$ NMR (400 MHz, Methanol-$d_4$) δ 7.69-7.47 (m, 2H), 2.39 (d, J=2.5 Hz, 3H), 1.85 (d, J=1.3 Hz, 3H), 1.81 (d, J=1.3 Hz, 3H).

Example 90: (7R,14R)-1-(difluoromethoxy)-11-(4-(dimethylphosphoryl)-3-fluoro-2-methylphenyl)-6-(methyl-d3)-6,7-dihydro-7,14-methanobenzo[f]benzo[4,5]imidazo[1,2-a][1,4]diazocin-5(14H)-one

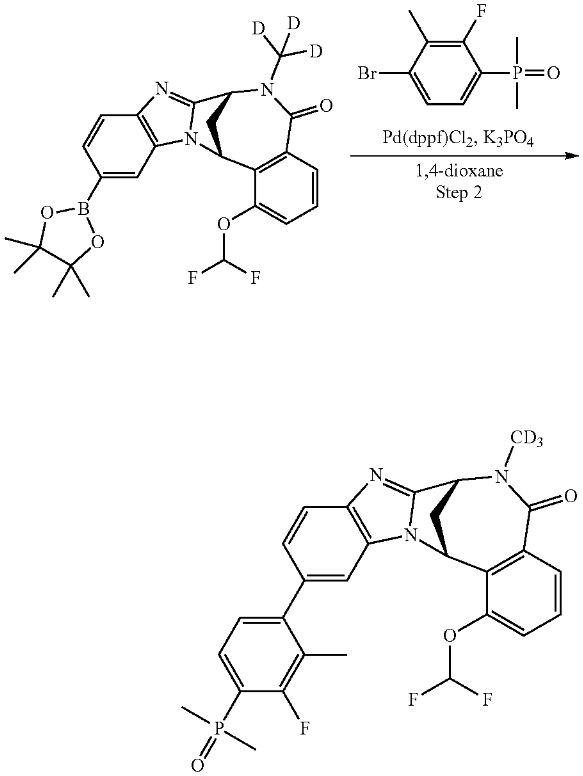

Into a 8 mL vial were added (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (70 mg, 0.145 mmol), 1-bromo-4-(dimethylphosphoryl)-3-fluoro-2-methylbenzene (57 mg, 0.217 mmol), $Pd(dppf)Cl_2$ (11 mg, 0.014 mmol), $K_3PO_4$ (92 mg, 0.435 mmol), 1,4-dioxane (2 mL) and $H_2O$ (0.5 mL) at room temperature. The mixture was purged with nitrogen for 3 min and then was stirred for 1 h at 80° C. under nitrogen atmosphere. The mixture was allowed to cool down to room temperature. The residue was purified by silica gel column chromatography, eluted with $CH_2Cl_2$/MeOH (8/1) followed by Prep-HPLC with the following conditions (Column: Spherical CSH C18 OBD Column 20-35 um 100 A, 40 g; Mobile Phase A: Water (0.1% FA), Mobile Phase B: ACN; Flow rate: 40 mL/min; Gradient: 25% B to 50% B in 15 min; Wave Length: 254 nm/220 nm; RT1 (min): 5.4) to afford (7R,14R)-1-(difluoromethoxy)-11-(4-(dimethylphosphoryl)-3-fluoro-2-methylphenyl)-6-(methyl-d3)-6,7-dihydro-7,14-methanobenzo[f]benzo[4,5]imidazo[1,2-a][1,4]diazocin-5(14H)-one (41 mg, 53%) as white solid. MS ESI calculated for $C_{28}H_{22}D_3F_3N_3O_3P$ $[M+H]^+$, 543.18 found 543.30. $^1H$ NMR (400 MHz, Chloroform-d) δ 8.56-8.48 (m, 1H), 7.88-7.79 (m, 2H), 7.53-7.43 (m, 2H), 7.36-7.28 (m, 2H), 7.20 (d, J=7.6 Hz, 1H), 6.78 (t, J=72.6 Hz, 1H), 6.38-6.31 (m, 1H), 5.29-5.19 (m, 1H), 3.64-3.48 (m, 1H), 2.96 (d, J=11.1 Hz, 1H), 2.17 (d, J=2.6 Hz, 3H), 1.88 (s, 3H), 1.84 (s, 3H). $^{19}F$ NMR (377 MHz, Chloroform-d) δ −80.78, −107.55. $^{31}P$ NMR (162 MHz, Chloroform-d) δ 31.17.

Example 91: (7R,14R)-1-(difluoromethoxy)-11-(6-(dimethylphosphoryl)-2-methylpyridin-3-yl)-6-(methyl-d3)-6,7-dihydro-7,14-methanobenzo[f]benzo[4,5]imidazo[1,2-a][1,4]diazocin-5(14H)-one Synthetic Scheme

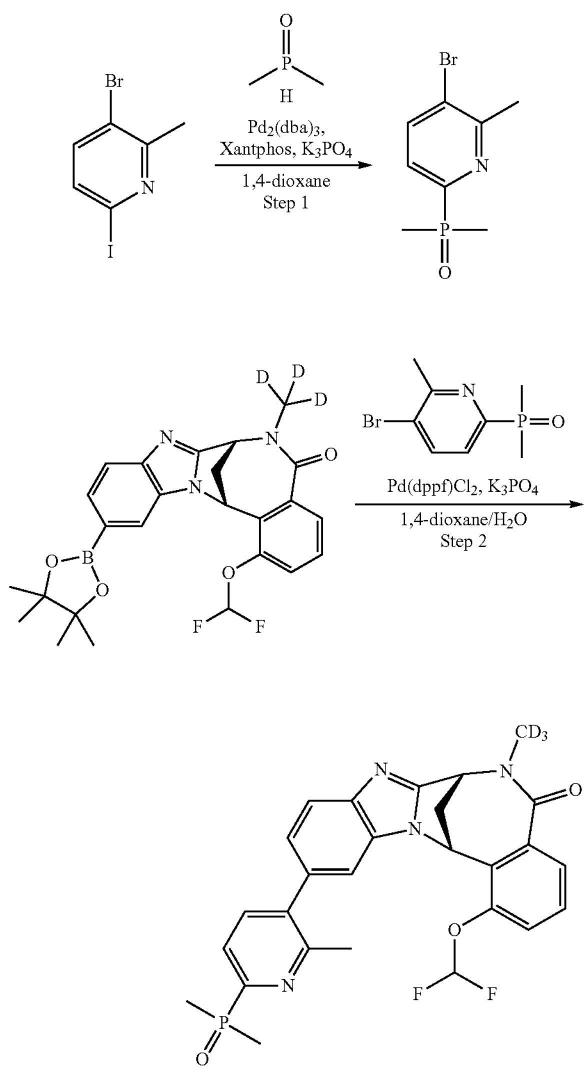

Preparation 91A: 3-bromo-6-(dimethylphosphoryl)-2-methylpyridine

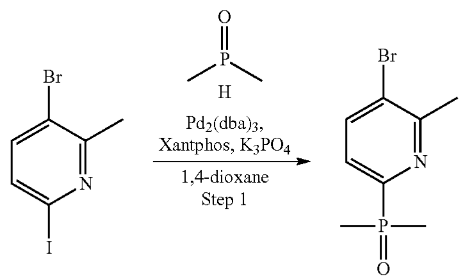

Into a 40 mL vial were added 3-bromo-6-iodo-2-methylpyridine (1.00 g, 3.357 mmol), (methylphosphonoyl) methane (288 mg, 3.693 mmol), $Pd_2(dba)_3$ (76 mg, 0.084 mmol), XantPhos (97 mg, 0.168 mmol), $K_3PO_4$ (854 mg, 4.028 mmol) and 1,4-dioxane (15 mL) at room temperature. The mixture was purged with nitrogen for 3 min and then was stirred for 1 h at 80° C. under nitrogen atmosphere. The mixture was allowed to cool down to room temperature. The residue was purified by silica gel column chromatography, eluted with $CH_2Cl_2$/MeOH (8:1) to afford 3-bromo-6-(dimethylphosphoryl)-2-methylpyridine (780 mg, 93%) as yellow solid. MS ESI calculated for $C_8H_{11}BrNOP$ $[M+H]^+$, 247.98 249.98 found 248.00, 250.00. $^1H$ NMR (400 MHz, Methanol-$d_4$) δ 8.14 (m, 1H), 7.71 (m, 1H), 2.70 (s, 3H), 1.80 (s, 3H), 1.77 (s, 3H).

Example 91: (7R,14R)-1-(difluoromethoxy)-11-(6-(dimethylphosphoryl)-2-methylpyridin-3-yl)-6-(methyl-d3)-6,7-dihydro-7,14-methanobenzo[f]benzo[4,5]imidazo[1,2-a][1,4]diazocin-5(14H)-one

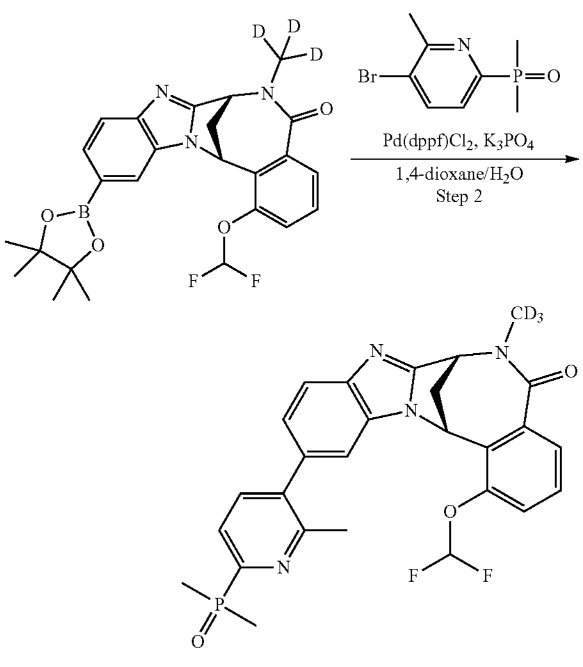

Into a 8 mL vial were added (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (70 mg, 0.145 mmol), 3-bromo-6-(dimethylphosphoryl)-2-methylpyridine (54 mg, 0.217 mmol), $Pd(dppf)Cl_2$ (11 mg, 0.014 mmol), $K_3PO_4$ (92 mg, 0.435 mmol), 1,4-dioxane (2 mL) and $H_2O$ (0.5 mL) at room temperature. The mixture was purged with nitrogen for 3 min and then was stirred for 1 h at 80° C. under nitrogen atmosphere. The mixture was allowed to cool down to room temperature. The residue was purified by silica gel column chromatography, eluted with $CH_2Cl_2$/MeOH (12/1) followed by Prep-HPLC with the following conditions (Column: XBridge Prep Phenyl OBD Column 19*250 mm, 5 um; Mobile Phase A: Water (0.1% FA), Mobile Phase B: ACN; Flow rate: 60 mL/min; Gradient: 25% B to 50% B in 10 min; Wave Length: 254 nm/220 nm; RT1 (min): 12.43) to afford (7R,14R)-1-(difluoromethoxy)-11-(6-(dimethylphosphoryl)-2-methylpyridin-3-yl)-6-(methyl-d3)-6,7-dihydro-7,14-methanobenzo[f]benzo[4,5]imidazo[1,2-a][1,4]diazocin-5(14H)-one (39 mg, 51%) as white solid. MS ESI calculated for $C_{27}H_{22}D_3F_2N_4O_3P$ $[M+H]^+$, 526.18, found 526.30. $^1H$ NMR (400 MHz, Chloroform-d) δ 8.54-8.48 (m, 1H), 8.03-7.98 (m, 1H), 7.80 (d, J=8.4 Hz, 1H), 7.68-7.63 (m, 1H), 7.48-7.40 (m, 2H), 7.32 (d, J=8.2 Hz, 1H), 7.25-7.21 (m, 1H), 6.77 (t, J=72.8 Hz, 1H), 6.27 (d, J=7.2 Hz, 1H), 5.04 (d, J=7.1 Hz, 1H), 3.56-3.44 (m, 1H), 2.91 (d, J=13.6 Hz, 1H), 2.52 (s, 3H), 1.85 (s, 3H), 1.82 (s, 3H). $^{19}F$ NMR (377 MHz, Chloroform-d) δ −80.71. $^{31}P$ NMR (162 MHz, Chloroform-d) δ 36.54.

Example 92: (7R,14R)-1-(difluoromethoxy)-11-(6-(dimethylphosphoryl)-2-fluoropyridin-3-yl)-6-(methyl-d3)-6,7-dihydro-7,14-methanobenzo[f]benzo[4,5]imidazo[1,2-a][1,4]diazocin-5(14H)-one Synthetic Scheme

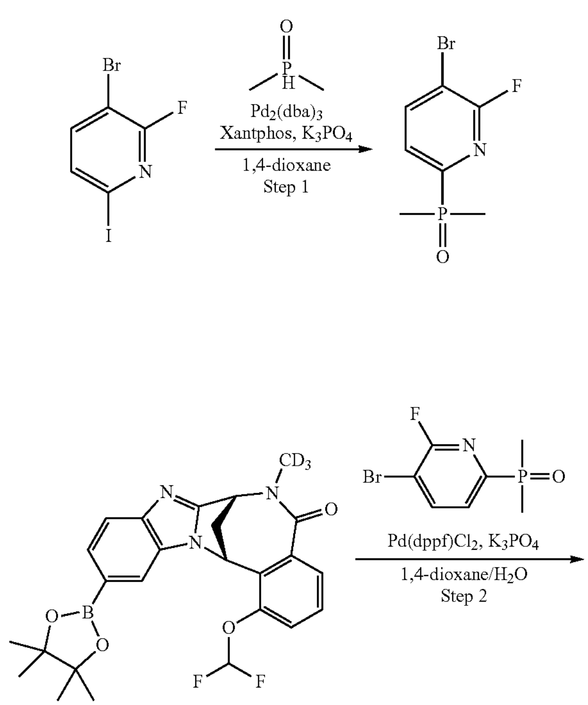

-continued

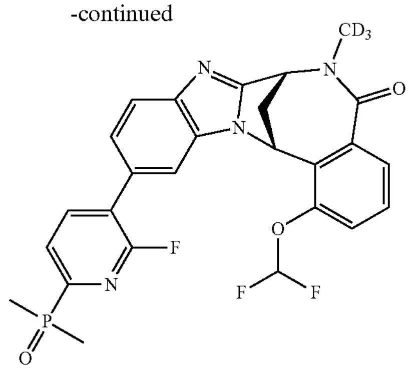

Preparation 92A: 3-bromo-6-(dimethylphosphoryl)-2-fluoropyridine

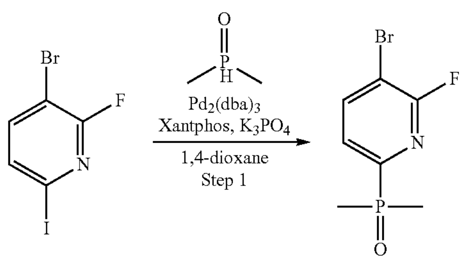

To a stirred solution of 3-bromo-2-fluoro-6-iodopyridine (1.00 g, 3.313 mmol) and (methylphosphonoyl)methane (310 mg, 3.976 mmol) in 1,4-dioxane (10 mL) were added $Pd_2(dba)_3$ (76 mg, 0.083 mmol), XantPhos (96 mg, 0.166 mmol) and $K_3PO_4$ (843 mg, 3.976 mmol) at room temperature under nitrogen atmosphere. The resulting mixture was stirred for 16 h at 80° C. under nitrogen atmosphere. The mixture was allowed to cool down to room temperature. The resulting mixture was concentrated under reduced pressure. The residue was purified by silica gel column chromatography, eluted with $CH_2Cl_2$/MeOH (10/1) to afford 3-bromo-6-(dimethylphosphoryl)-2-fluoropyridine (428 mg, 51%) as a yellow solid. MS ESI calculated for $C_7H_8BrFNOP$ $[M+H]^+$, 251.95 253.95, found 252.00 254.00. $^1H$ NMR (400 MHz, Chloroform-d) δ 8.17-8.13 (m, 1H), 7.93-7.87 (m, 1H), 1.80 (s, 3H), 1.76 (s, 3H).

Example 92: (7R,14R)-1-(difluoromethoxy)-11-(6-(dimethylphosphoryl)-2-fluoropyridin-3-yl)-6-(methyl-d3)-6,7-dihydro-7,14-methanobenzo[f]benzo[4,5]imidazo[1,2-a][1,4]diazocin-5(14H)-one

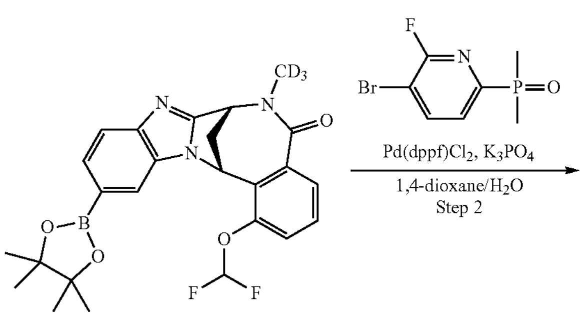

-continued

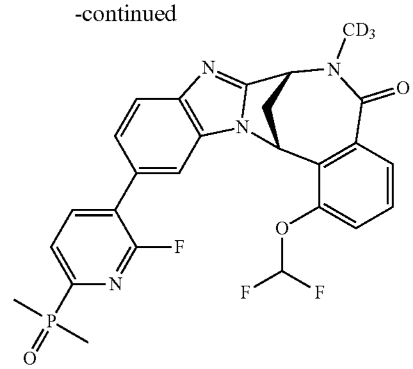

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.124 mmol) and 3-bromo-6-(dimethylphosphoryl)-2-fluoropyridine (47 mg, 0.186 mmol) in 1,4-dioxane (1 mL, 0.011 mmol) and $H_2O$ (0.2 mL) were added Pd(dppf)$Cl_2$ (10 mg, 0.012 mmol) and $K_3PO_4$ (79 mg, 0.372 mmol) at room temperature under nitrogen atmosphere. The resulting mixture was stirred for 1 h at 80° C. under hydrogen atmosphere. The mixture was allowed to cool down to room temperature. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (10 mmol/L $NH_4HCO_3$), Mobile Phase B: $CH_3CN$; Flow rate: 60 mL/min; Gradient: 30% B to 70% B in 20 min; 254/220 nm to afford (7R,14R)-1-(difluoromethoxy)-11-(6-(dimethylphosphoryl)-2-fluoropyridin-3-yl)-6-(methyl-d3)-6,7-dihydro-7,14-methanobenzo[f]benzo[4,5]imidazo[1,2-a][1,4]diazocin-5(14H)-one (41 mg, 62%) as a white solid. MS ESI calculated for $C_{26}H_{19}D_3F_3N_4O_3P$ $[M+H]^+$, 530.16, found 530.05. $^1H$ NMR (400 MHz, Chloroform-d) δ 8.50 (d, J=8.2 Hz, 1H), 8.11 (t, J=5.5 Hz, 1H), 8.08-7.99 (m, 1H), 7.85 (d, J=8.5 Hz, 1H), 7.80 (s, 1H), 7.51 (d, J=8.6 Hz, 1H), 7.45 (t, J=8.2 Hz, 1H), 7.32 (d, J=8.2 Hz, 1H), 6.84 (t, J=72.7 Hz, 1H), 6.34 (d, J=6.6 Hz, 1H), 5.10 (d, J=6.5 Hz, 1H), 3.60-3.46 (m, 1H), 2.93 (d, J=13.4 Hz, 1H), 1.84 (s, 3H), 1.80 (s, 3H). $^{19}F$ NMR (377 MHz, Chloroform-d) δ −69.77, −80.22, −80.67, −81.00, −81.44. $^{31}P$ NMR (162 MHz, Chloroform-d) δ 35.74.

Example 93: (7R,14R)-11-(4-chloro-6-(dimethylphosphoryl)pyridin-3-yl)-1-(difluoromethoxy)-6-(methyl-d3)-6,7-dihydro-7,14-methanobenzo[f]benzo[4,5]imidazo[1,2-a][1,4]diazocin-5(14H)-one Synthetic Scheme

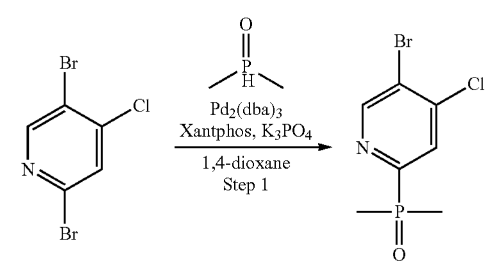

-continued

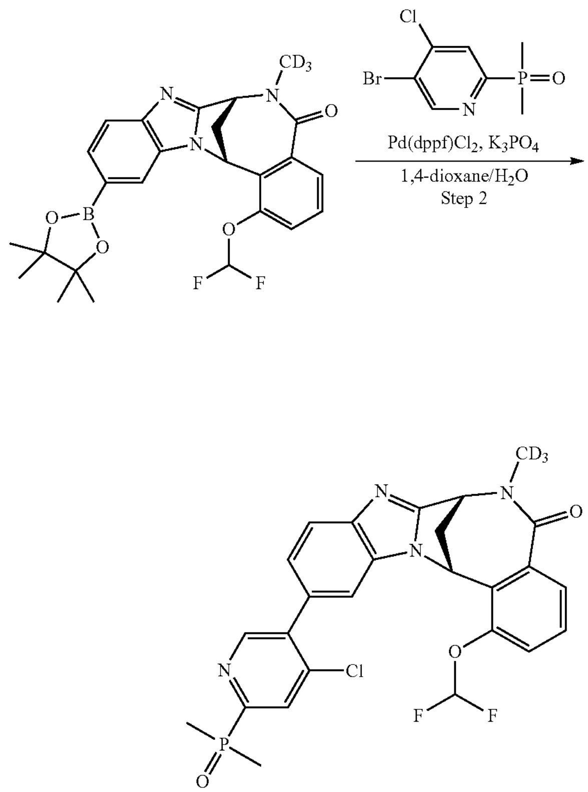

Preparation 93A: 5-bromo-4-chloro-2-(dimethylphosphoryl)pyridine

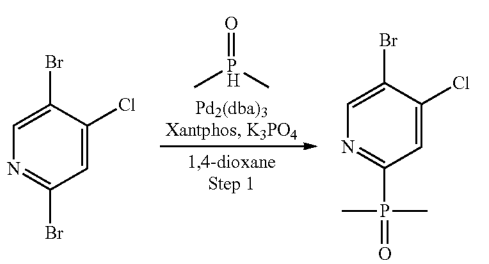

To a stirred solution of 2,5-dibromo-4-chloropyridine (1.00 g, 3.685 mmol) and (methylphosphonoyl)methane (345 mg, 4.422 mmol) in 1,4-dioxane (10 mL) were added $Pd_2(dba)_3$ (84 mg, 0.092 mmol), XantPhos (106 mg, 0.184 mmol) and $K_3PO_4$ (938 mg, 4.422 mmol) at room temperature under nitrogen atmosphere. The resulting mixture was stirred for 16 h at 80° C. under nitrogen atmosphere. The mixture was allowed to cool down to room temperature. The resulting mixture was concentrated under reduced pressure. The residue was purified by silica gel column chromatography, eluted with $CH_2Cl_2$/MeOH (10/1) to afford 5-bromo-4-chloro-2-(dimethylphosphoryl)pyridine (240 mg, 24%) as an orange solid. MS ESI calculated for $C_7H_8BrClNOP$ $[M+H]^+$, 267.92 269.92, found 267.80 269.80. $^1H$ NMR (400 MHz, Chloroform-d) δ 8.83 (s, 1H), 8.21 (d, J=5.3 Hz, 1H), 1.79 (s, 3H), 1.76 (s, 3H).

Example 93: (7R,14R)-11-(4-chloro-6-(dimethylphosphoryl)pyridin-3-yl)-1-(difluoromethoxy)-6-(methyl-d3)-6,7-dihydro-7,14-methanobenzo[f]benzo[4,5]imidazo[1,2-a][1,4]diazocin-5(14H)-one

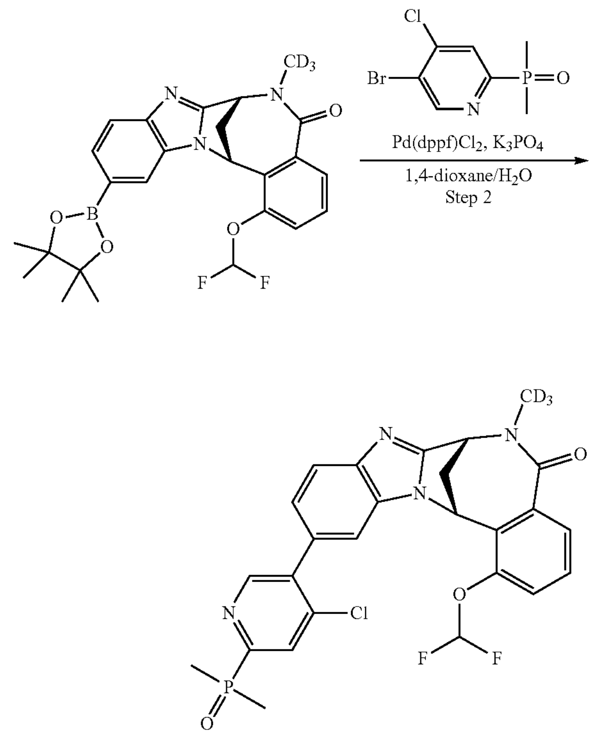

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.124 mmol) and 5-bromo-4-chloro-2-(dimethylphosphoryl)pyridine (49 mg, 0.186 mmol) in 1,4-dioxane (1 mL, 0.011 mmol) and $H_2O$ (0.2 mL) were added $Pd(dppf)Cl_2$ (10 mg, 0.012 mmol) and $K_3PO_4$ (79 mg, 0.372 mmol) at room temperature under nitrogen atmosphere. The resulting mixture was stirred for 1 h at 80° C. under hydrogen atmosphere. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (10 mmol/L $NH_4HCO_3$), Mobile Phase B: $CH_3CN$; Flow rate: 60 mL/min; Gradient: 30% B to 70% B in 20 min; 254/220 nm to afford (7R,14R)-11-(4-chloro-6-(dimethylphosphoryl)pyridin-3-yl)-1-(difluoromethoxy)-6-(methyl-d3)-6,7-dihydro-7,14-methanobenzo[f]benzo[4,5]imidazo[1,2-a][1,4]diazocin-5(14H)-one (32 mg, 46%) as a white solid. MS ESI calculated for $C_{26}H_{19}D_3ClF_2N_4O_3P$ $[M+H]^+$, 546.13, found 546.05. $^1H$ NMR (400 MHz, Chloroform-d) δ 8.63 (s, 1H), 8.51 (d, J=8.2 Hz, 1H), 8.25 (d, J=5.7 Hz, 1H), 7.86 (d, J=8.4 Hz, 1H), 7.66 (s, 1H), 7.44 (t, J=8.2 Hz, 1H), 7.39-7.30 (m, 2H), 6.79 (t, J=72.7 Hz, 1H), 6.31 (d, J=7.1 Hz, 1H), 5.08 (d, J=7.0 Hz, 1H), 3.65-3.44 (m, 1H), 2.92 (d, J=13.5 Hz, 1H), 1.85 (s, 3H), 1.81 (s, 3H). $^{19}F$ NMR (377 MHz, Chloroform-d) δ −80.17, −80.61, −80.84, −81.28. $^{31}P$ NMR (162 MHz, Chloroform-d) δ 36.24.

Example 94: (7R,14R)-11-(2-chloro-6-(dimethylphosphoryl)pyridin-3-yl)-1-(difluoromethoxy)-6-(methyl-d3)-6,7-dihydro-7,14-methanobenzo[f]benzo[4,5]imidazo[1,2-a][1,4]diazocin-5(14H)-one Synthetic Scheme

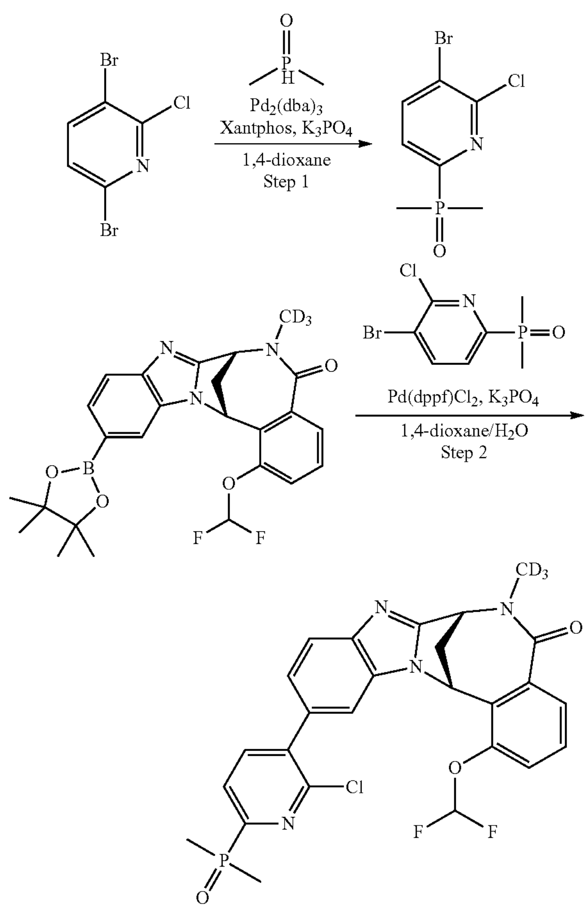

Preparation 94A: 3-bromo-2-chloro-6-(dimethylphosphoryl)pyridine

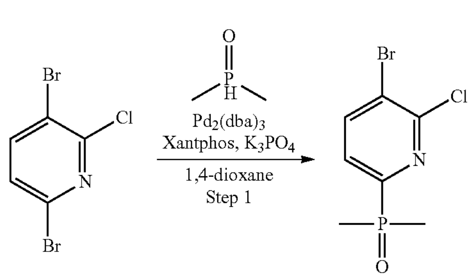

To a stirred solution of 3,6-dibromo-2-chloropyridine (1.00 g, 3.685 mmol) and (methylphosphonoyl)methane (345 mg, 4.422 mmol) in 1,4-dioxane (10 mL) were added $Pd_2(dba)_3$ (84 mg, 0.092 mmol), XantPhos (107 mg, 0.184 mmol) and $K_3PO_4$ (938 mg, 4.422 mmol) at room temperature under nitrogen atmosphere. The resulting mixture was stirred for 16 h at 80° C. under nitrogen atmosphere. The mixture was allowed to cool down to room temperature. The residue was purified by silica gel column chromatography, eluted with $CH_2Cl_2$/MeOH (10/1) to afford 3-bromo-2-chloro-6-(dimethylphosphoryl)pyridine (950 mg, 96%) as an orange solid. MS ESI calculated for $C_7H_8BrClNOP$ $[M+H]^+$, 267.92 269.92, found 267.85 269.85. $^1H$ NMR (400 MHz, Chloroform-d) δ 8.12-8.09 (m, 1H), 7.93-7.90 (m, 1H), 1.80 (s, 3H), 1.76 (s, 3H).

Example 94: (7R,14R)-11-(2-chloro-6-(dimethylphosphoryl)pyridin-3-yl)-1-(difluoromethoxy)-6-(methyl-d3)-6,7-dihydro-7,14-methanobenzo[f]benzo[4,5]imidazo[1,2-a][1,4]diazocin-5(14H)-one

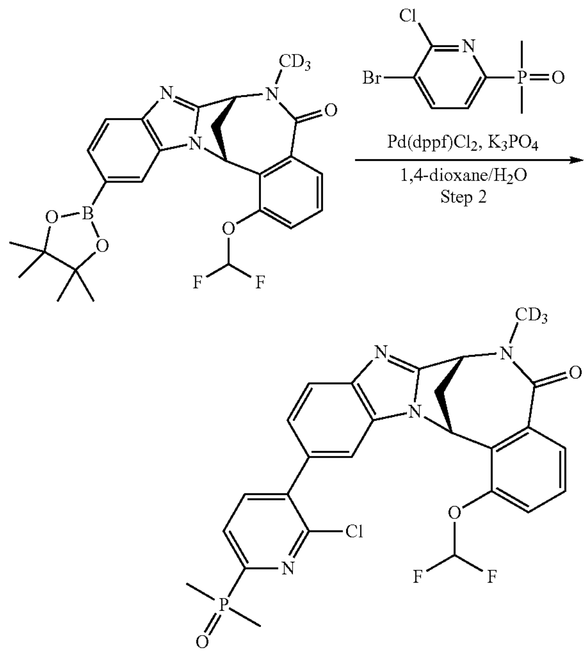

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.124 mmol) and 3-bromo-2-chloro-6-(dimethylphosphoryl)pyridine (49 mg, 0.186 mmol) in 1,4-dioxane (1 mL, 0.011 mmol) and $H_2O$ (0.2 mL) were added $Pd(dppf)Cl_2$ (10 mg, 0.012 mmol) and $K_3PO_4$ (79 mg, 0.372 mmol) at room temperature under nitrogen atmosphere. The resulting mixture was stirred for 1 h at 80° C. under hydrogen atmosphere. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (10 mmol/L $NH_4HCO_3$), Mobile Phase B: $CH_3CN$; Flow rate: 60 mL/min; Gradient: 30% B to 70% B in 20 min; 254/220 nm to afford (7R,14R)-11-(2-chloro-6-(dimethylphosphoryl)pyridin-3-yl)-1-(difluoromethoxy)-6-(methyl-d3)-6,7-dihydro-7,14-methanobenzo[f]benzo[4,5]imidazo[1,2-a][1,4]diazocin-5(14H)-one (31 mg, 45%) as a white solid. MS ESI calculated for $C_{26}H_{19}D_3ClF_2N_4O_3P$ $[M+H]^+$, 546.13, found 546.05. $^1H$ NMR (400 MHz, Chloroform-d) δ 8.54-8.48 (m, 1H), 8.16-8.08 (m, 1H), 7.86-7.77 (m, 2H), 7.64 (s, 1H), 7.44 (t, J=8.2 Hz, 1H), 7.40-7.34 (m, 1H), 7.32 (d, J=8.1 Hz, 1H), 6.80 (t, J=72.7 Hz, 1H), 6.30 (d, J=7.2 Hz, 1H), 5.07 (d, J=7.0 Hz, 1H), 3.55-3.47 (m, 11H), 2.92 (d, J=13.6 Hz, 1H), 1.86 (s, 3H), 1.83 (s, 3H). $^{19}F$ NMR (377 MHz, Chloroform-d) δ −80.27, −80.72, −80.80, −81.25. $^{31}P$ NMR (162 MHz, Chloroform-d) δ 36.21.

Example 95: (7R,14R)-1-(difluoromethoxy)-11-(4-((dimethylphosphoryl)difluoromethyl)phenyl)-6-(methyl-d3)-6,7-dihydro-7,14-methanobenzo[f]benzo[4,5]imidazo[1,2-a][1,4]diazocin-5(14H)-one Synthetic Scheme

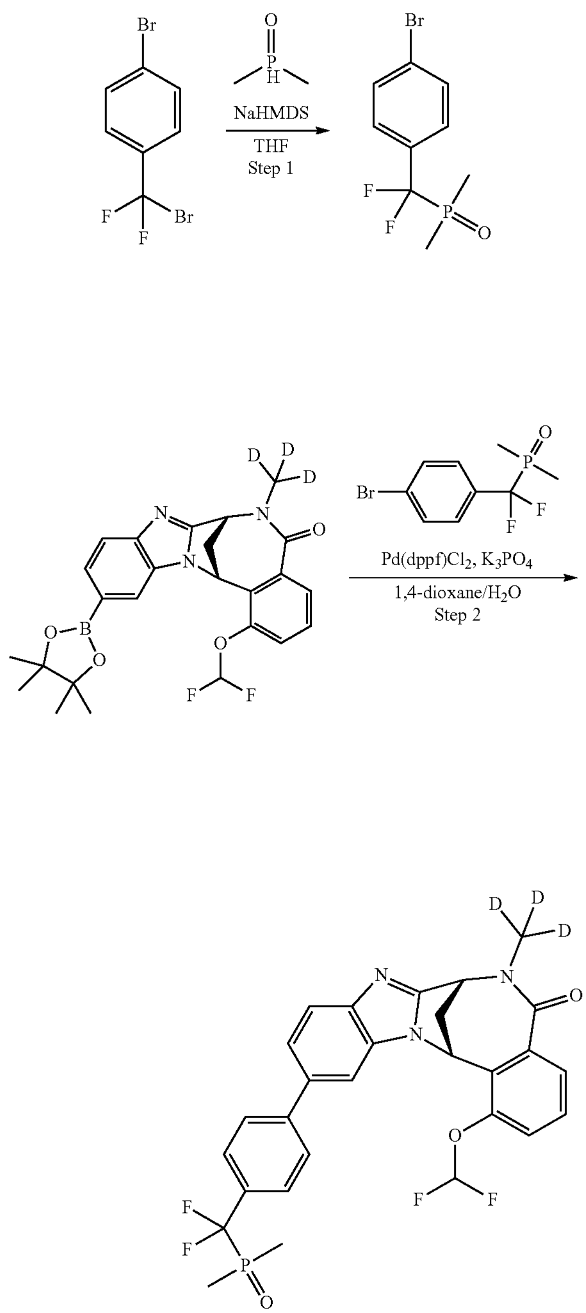

Preparation 95A: 1-bromo-4-[(dimethylphosphoryl)difluoromethyl]benzene

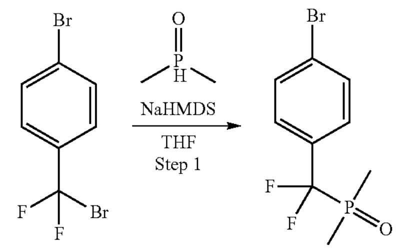

A mixture of (methylphosphonoyl)methane (109 mg, 1.400 mmol) and NaHMDS (1.0 mL, 1.050 mmol, 1 M in THF) in THF (4 mL) was stirred for 30 min at 0° C. under nitrogen atmosphere. To the above mixture was added 1-bromo-4-(bromodifluoromethyl)benzene (200 mg, 0.700 mmol) at 0° C. The resulting mixture was stirred for additional 16 h at 20° C. The reaction was quenched with water at room temperature. The resulting mixture was concentrated under reduced pressure. The residue was purified by silica gel column chromatography, eluted with $CH_2Cl_2$/MeOH (10:1) to afford 1-bromo-4-[(dimethylphosphoryl)difluoromethyl]benzene (47 mg, 24%) as a yellow oil. MS ESI calculated for $C_9H_{10}BrF_2OP$ [M+H]$^+$, 282.96 284.96, found N/A. $^1H$ NMR (400 MHz, Chloroform-d) δ 7.64 (d, J=8.2 Hz, 2H), 7.49 (d, J=8.2 Hz, 2H), 1.63 (s, 3H), 1.60 (s, 3H). $^{19}F$ NMR (377 MHz, Chloroform-d) δ −111.51, −111.77. $^{31}P$ NMR (162 MHz, Chloroform-d) δ 43.82, 43.21, 42.62.

Example 95: (7R,14R)-1-(difluoromethoxy)-11-(4-((dimethylphosphoryl)difluoromethyl)phenyl)-6-(methyl-d3)-6,7-dihydro-7,14-methanobenzo[f]benzo[4,5]imidazo[1,2-a][1,4]diazocin-5(14H)-one

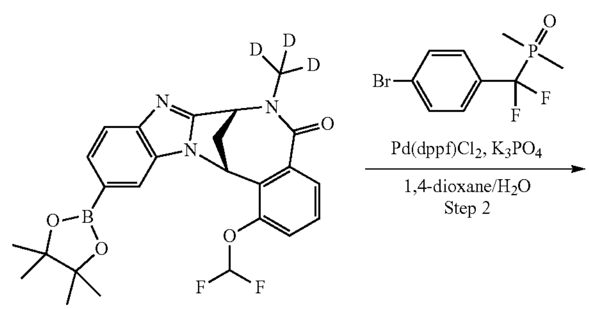

-continued

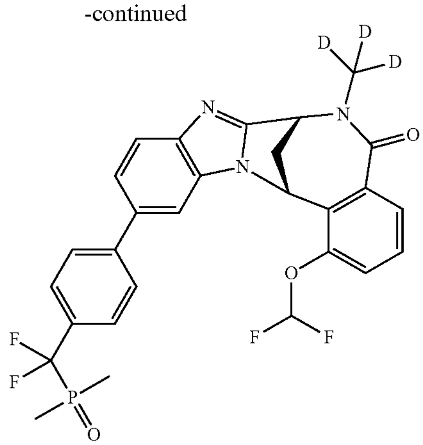

To a stirred mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.124 mmol) and 1-bromo-4-[(dimethylphosphoryl)difluoromethyl]benzene (44 mg, 0.124 mmol) in 1,4-dioxane (1 mL) and $H_2O$ (0.2 mL) were added $Pd(dppf)Cl_2{\cdot}CH_2Cl_2$ (10 mg, 0.012 mmol) and $K_3PO_4$ (79 mg, 0.372 mmol) at room temperature under nitrogen atmosphere. The resulting mixture was stirred for 16 h at 80° C. under nitrogen atmosphere. The resulting mixture was concentrated under vacuum. The residue was purified by silica gel column chromatography, eluted with $CH_2Cl_2$/MeOH (10:1) followed by reversed-phase flash chromatography with the following conditions: column, C18 silica gel; mobile phase, $CH_3CN$ in Water (10 mmol/L $NH_4HCO_3$), 25% to 55% gradient in 25 min; detector, 254 nm. This resulted in (7R,14R)-1-(difluoromethoxy)-11-(4-((dimethylphosphoryl)difluoromethyl)phenyl)-6-(methyl-d3)-6,7-dihydro-7,14-methanobenzo[f]benzo[4,5]imidazo[1,2-a][1,4]diazocin-5(14H)-one (21 mg, 31%) as a white solid. MS ESI calculated for $C_{28}H_{21}D_3F_4N_3O_3P$ $[M+H]^+$, 561.17, found 561.15. $^1H$ NMR (400 MHz, DMSO-$d_6$) δ 8.31-8.25 (m, 1H), 7.87-7.63 (m, 7H), 7.59-7.55 (m, 1H), 7.51-7.48 (m, 2H), 6.31 (d, J=7.1 Hz, 1H), 5.24 (d, J=7.1 Hz, 1H), 3.62-3.49 (m, 1H), 2.83 (d, J=13.7 Hz, 1H), 1.62 (s, 3H), 1.59 (s, 3H). $^{19}F$ NMR (377 MHz, DMSO-$d_6$) δ −81.51, −81.96, −82.25, −82.70, −110.01, −110.02, −110.26, −110.27. $^{31}P$ NMR (162 MHz, DMSO-$d_6$) δ 43.76, 43.18, 42.60.

Example 96: (7R,14R)-1-(difluoromethoxy)-11-(4-((dimethylphosphoryl)methyl)-2-fluorophenyl)-6,7-dihydro-7,14-methanobenzo[f]benzo[4,5]imidazo[1,2-a][1,4]diazocin-5(14H)-one

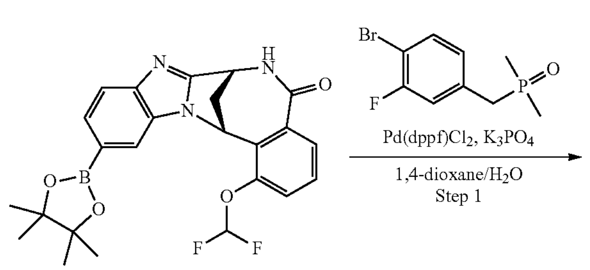

-continued

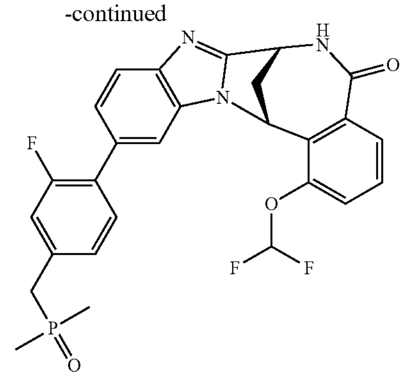

To a stirred solution of (7R,14R)-1-(difluoromethoxy)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.128 mmol) and 1-bromo-4-[(dimethylphosphoryl)methyl]-2-fluorobenzene (68 mg, 0.256 mmol) in 1,4-dioxane (0.8 mL) and $H_2O$ (0.2 mL) were added $K_3PO_4$ (82 mg, 0.384 mmol) and $Pd(dppf)Cl_2$ (10 mg, 0.013 mmol) in portions at room temperature under nitrogen atmosphere. The resulting mixture was stirred for 2 h at 80° C. under nitrogen atmosphere. The resulting mixture was concentrated under reduced pressure. The residue was purified by silica gel column chromatography, eluted with $CH_2Cl_2$/MeOH (0% to 10%) followed by Prep-HPLC with the following conditions: Column: XBridge Prep Phenyl OBD Column 19*250 mm, 5 m; Mobile Phase A: Water (10 mmol/L $NH_4HCO_3$+0.1% $NH_3{\cdot}H_2O$), Mobile Phase B: ACN; Flow rate: 60 mL/min; Gradient: 18% B to 33% B in 10 min; Wave Length: 254/220 nm; RT1 (min): 11.92 to afford (7R,14R)-1-(difluoromethoxy)-11-(4-((dimethylphosphoryl)methyl)-2-fluorophenyl)-6,7-dihydro-7,14-methanobenzo[f]benzo[4,5]imidazo[1,2-a][1,4]diazocin-5(14H)-one (23 mg, 34%) as a white solid. MS ESI calculated for $C_{27}H_{23}F_3N_3O_3P$ $[M+H]^+$, 526.14, found 526.15. $^1H$ NMR (400 MHz, Chloroform-d) δ 8.46-8.40 (m, 1H), 7.78 (d, J=8.5 Hz, 1H), 7.66 (s, 1H), 7.46-7.35 (m, 4H), 7.25-7.21 (m, 1H), 7.15-7.06 (m, 2H), 6.83 (t, J=73.4 Hz, 1H), 6.37 (d, J=7.2 Hz, 1H), 4.95 (t, J=6.6 Hz, 1H), 3.52-3.43 (m, 1H), 3.19 (d, J=14.8 Hz, 2H), 2.87 (d, J=13.2 Hz, 1H), 1.55 (s, 3H), 1.51 (s, 3H). $^{19}F$ NMR (377 MHz, Chloroform-d) δ −79.97, −80.42, −81.44, −81.88, −117.54. $^{31}P$ NMR (162 MHz, Chloroform-d) δ 40.27.

Example 97: (7R,14R)-1-(difluoromethoxy)-11-(6-(dimethylphosphoryl)-2-methylpyridin-3-yl)-10-fluoro-6-(methyl-d3)-6,7-dihydro-7,14-methanobenzo[f]benzo[4,5]imidazo[1,2-a][1,4]diazocin-5(14H)-one

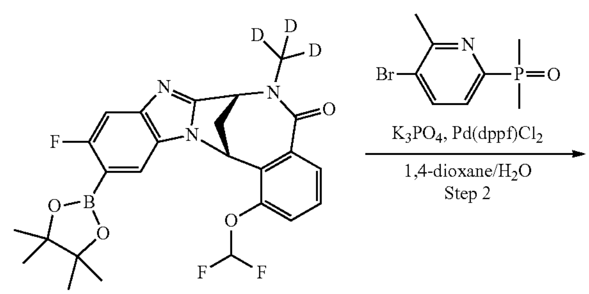

-continued

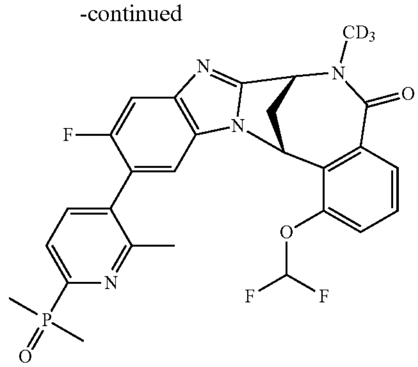

To a stirred solution of (7R,14R)-1-(difluoromethoxy)-10-fluoro-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.119 mmol) and 3-bromo-6-(dimethylphosphoryl)-2-methylpyridine (44 mg, 0.178 mmol) in 1,4-dioxane (1 mL) and $H_2O$ (0.2 mL) were added Pd(dppf)$Cl_2$ (10 mg, 0.012 mmol) and $K_3PO_4$ (76 mg, 0.357 mmol) at room temperature under nitrogen atmosphere. The resulting mixture was stirred for 2 h at 80° C. under nitrogen atmosphere. The mixture was allowed to cool down to room temperature. The residue was purified by silica gel column chromatography, eluted with $CH_2Cl_2$/MeOH (10/1) followed by reversed-phase flash chromatography with the following conditions: column, C18 silica gel; mobile phase, $CH_3CN$ in water (10 mmol/L $NH_4HCO_3$), 30% to 70% gradient in 20 min; detector, 254 nm. This resulted in (7R,14R)-1-(difluoromethoxy)-11-(6-(dimethylphosphoryl)-2-methylpyridin-3-yl)-10-fluoro-6-(methyl-d3)-6,7-dihydro-7,14-methanobenzo[f]benzo[4,5]imidazo[1,2-a][1,4]diazocin-5(14H)-one (37 mg, 55%) as a white solid. MS ESI calculated for $C_{27}H_{21}D_3F_3N_4O_3P$ $[M+H]^+$, 544.17, found 544.35. $^1H$ NMR (400 MHz, Chloroform-d) δ 8.54-8.50 (m, 1H), 8.06 (t, J=6.5 Hz, 1H), 7.69 (d, J=6.8 Hz, 1H), 7.54 (d, J=10.1 Hz, 1H), 7.46 (t, J=8.2 Hz, 1H), 7.36-7.30 (m, 2H), 6.76 (t, J=72.7 Hz, 1H), 6.26 (d, J=6.8 Hz, 1H), 5.05 (d, J=6.7 Hz, 1H), 3.56-3.45 (m, 1H), 2.91 (d, J=13.5 Hz, 1H), 2.49 (s, 3H), 1.90 (s, 3H), 1.86 (s, 3H). $^{19}F$ NMR (377 MHz, Chloroform-d) δ −80.41, −80.86, −80.90, −81.35, −119.11. $^{31}P$ NMR (162 MHz, Chloroform-d) δ 36.38.

Example 98: (7R,14R)-1-(difluoromethoxy)-11-(6-(((dimethylphosphoryl)methyl)amino)pyridin-3-yl)-6-(methyl-d3)-6,7-dihydro-7,14-methanobenzo[f]benzo[4,5]imidazo[1,2-a][1,4]diazocin-5(14H)-one Synthetic Scheme

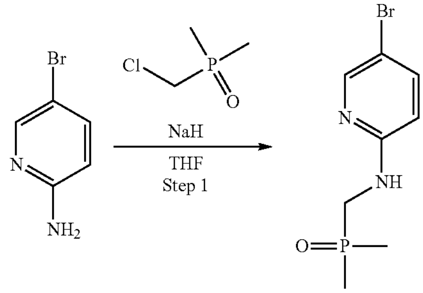

-continued

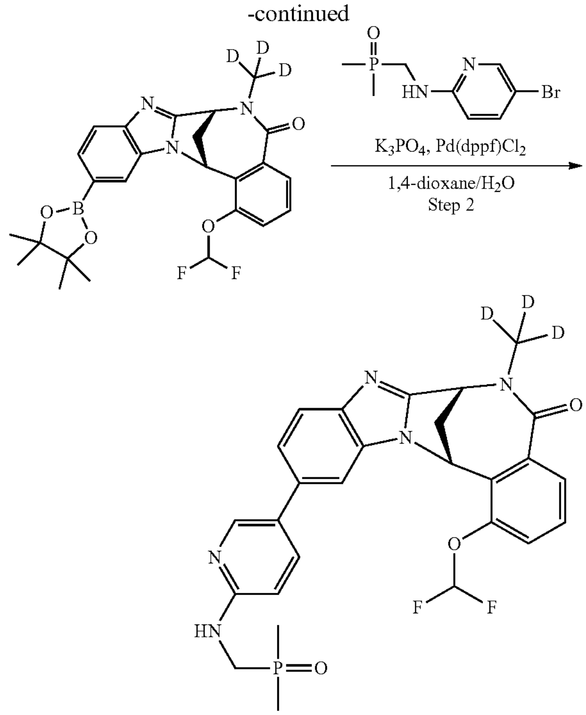

Preparation 98A: (((5-bromopyridin-2-yl)amino)methyl)dimethylphosphine Oxide

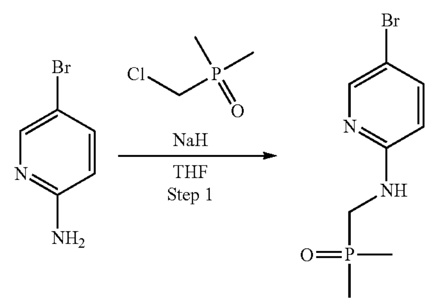

To a stirred solution of 5-bromopyridin-2-amine (410 mg, 2.372 mmol) in THF (3 mL) was added NaH (158 mg, 3.952 mmol, 60%) in portions at 0° C. under nitrogen atmosphere. The resulting mixture was stirred for 30 min at 50° C. under nitrogen atmosphere. To the above mixture was added chloro(dimethylphosphoryl)methane (200 mg, 1.581 mmol) in THF (1 mL) dropwise at 0° C. The resulting mixture was stirred for additional 3 h at room temperature. The reaction was quenched with Water/Ice at 0° C. and extract with $CH_2Cl_2$ (3×30 mL). The combined organic layer was concentrated under reduce pressure. The residue was purified by reversed-phase flash chromatography with the following conditions: column, C18 silica gel; mobile phase, $CH_3CN$ in Water (10 mmol/L $NH_4HCO_3$), 10% to 50% gradient in 20 min; detector, 254/220 nm to afford (((5-bromopyridin-2-yl)amino)methyl)dimethylphosphine oxide (50 mg, 12%) as a light yellow oil. MS ESI calculated for $C_8H_{12}BrN_2OP$ $[M+H]^+$, 262.99 264.99, found 262.75 264.75. $^1H$ NMR (400 MHz, Chloroform-d) δ 8.06 (d, J=2.3 Hz, 1H), 7.64-

7.40 (m, 1H), 6.63 (d, J=8.9 Hz, 1H), 6.43 (s, 1H), 3.97 (s, 2H), 1.61 (s, 3H), 1.59 (s, 3H). $^{31}$P NMR (162 MHz, Chloroform-d) δ 45.42.

Example 98: (7R,14R)-1-(difluoromethoxy)-11-(6-(((dimethylphosphoryl)methyl)amino)pyridin-3-yl)-6-(methyl-d3)-6,7-dihydro-7,14-methanobenzo[f]benzo[4,5]imidazo[1,2-a][1,4]diazocin-5(14H)-one

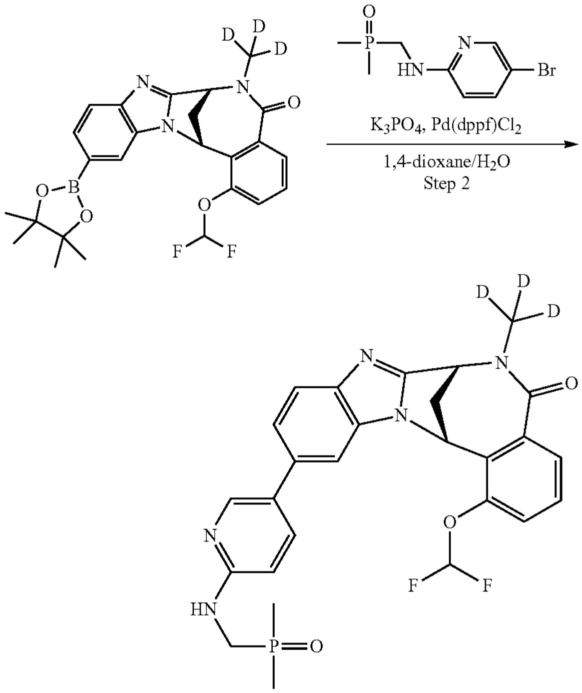

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (70 mg, 0.145 mmol) and (((5-bromopyridin-2-yl)amino)methyl)dimethylphosphine oxide (50 mg, 0.189 mmol) in 1,4-dioxane (1 mL) and $H_2O$ (0.2 mL) were added $K_3PO_4$ (92 mg, 0.435 mmol) and $Pd(dppf)Cl_2$ (12 mg, 0.014 mmol) in portions at 80° C. under nitrogen atmosphere. The mixture was allowed to cool down to room temperature. The resulting mixture was concentrated under reduced pressure. The residue was purified by silica gel column chromatography, eluted with $CH_2Cl_2$/MeOH (0% to 10%) followed by Prep-HPLC with the following conditions (Column: XBridge Prep Phenyl OBD Column 19*250 mm, 5 m; Mobile Phase A: Water (10 mmol/L $NH_4HCO_3$+0.1% $NH_3H_2O$), Mobile Phase B: ACN; Flow rate: 60 mL/min; Gradient: 14% B to 30% B in 10 min; Wave Length: 254/220 nm; RT1 (min): 11.93) to afford (7R,14R)-1-(difluoromethoxy)-11-(6-(((dimethylphosphoryl)methyl)amino)pyridin-3-yl)-6-(methyl-d3)-6,7-dihydro-7,14-methanobenzo[f]benzo[4,5]imidazo[1,2-a][1,4]diazocin-5(14H)-one (29 mg, 36%) as a white solid. MS ESI calculated for $C_{27}H_{23}D_3F_2N_5O_3P$ $[M+H]^+$, 541.19, found 541.15. $^1$H NMR (400 MHz, Chloroform-d) δ 8.52-8.44 (m, 1H), 8.20 (d, J=2.4 Hz, 1H), 7.81-7.72 (m, 2H), 7.54 (d, J=1.8 Hz, 1H), 7.42 (t, J=8.2 Hz, 1H), 7.36-7.29 (m, 2H), 7.06-6.68 (m, 2H), 6.24 (d, J=7.2 Hz, 1H), 4.95 (d, J=7.1 Hz, 1H), 3.98 (t, J=5.8 Hz, 2H), 3.52-3.42 (m, 1H), 2.87 (d, J=13.5 Hz, 1H), 1.66 (s, 3H), 1.63 (s, 3H). $^{19}$F NMR (376 MHz, Chloroform-d) δ −80.25, −80.69, −80.79, −81.24. $^{31}$P NMR (162 MHz, Chloroform-d) δ 42.98.

Example 99 and 100: (7R,14R)-1-(difluoromethoxy)-11-(4-((S or R)-1-(dimethylphosphoryl)ethyl)-3-fluorophenyl)-6-(methyl-d3)-6,7-dihydro-7,14-methanobenzo[f]benzo[4,5]imidazo[1,2-a][1,4]diazocin-5(14H)-one and (7R,14R)-1-(difluoromethoxy)-11-(4-((R or S)-1-(dimethylphosphoryl)ethyl)-3-fluorophenyl)-6-(methyl-d3)-6,7-dihydro-7,14-methanobenzo[f]benzo[4,5]imidazo[1,2-a][1,4]diazocin-5(14H)-one Synthetic Scheme

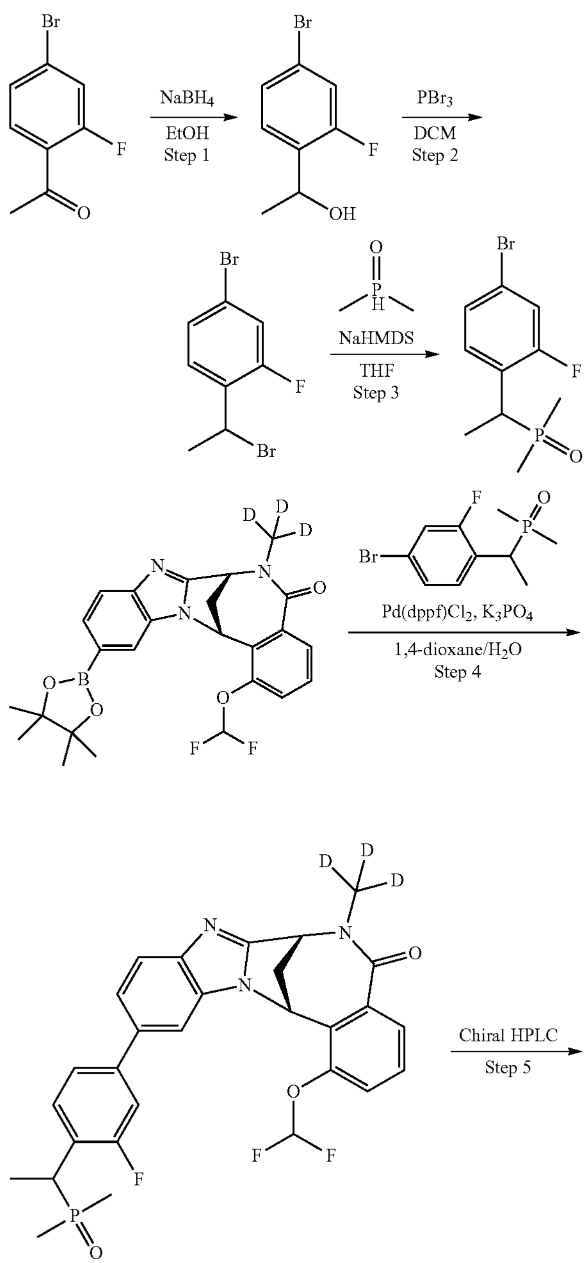

-continued

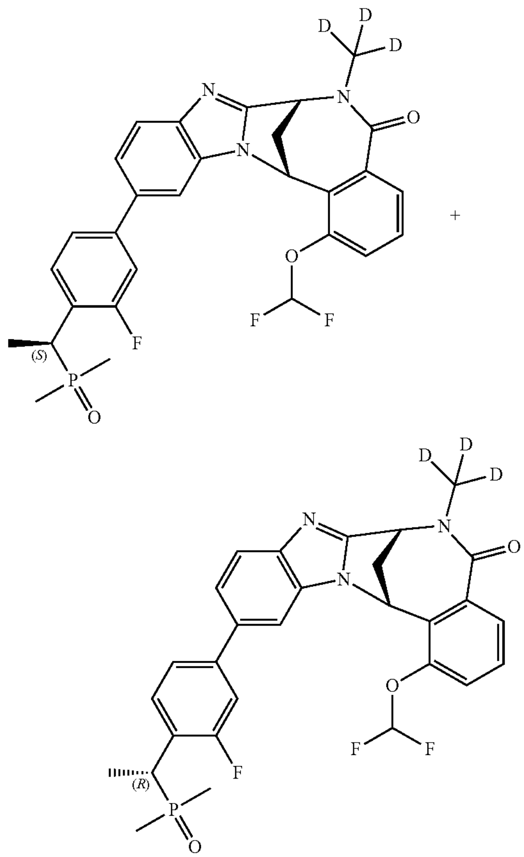

Preparation 99A: 1-(4-bromo-2-fluorophenyl)ethanol

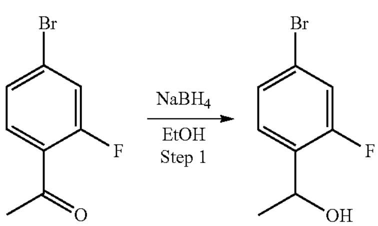

To a stirred solution of 1-(4-bromo-2-fluorophenyl)ethanone (5.00 g, 23.038 mmol) in EtOH (50 mL) was added $NaBH_4$ (1.74 g, 46.076 mmol) at 0° C. under nitrogen atmosphere. The mixture was stirred for 2 h at 0° C. under nitrogen atmosphere. The reaction was quenched with sat. $NH_4Cl$ (aq.) at 0° C. The aqueous layer was extracted with $CH_2Cl_2$ (3×100 mL). The resulting mixture was concentrated under vacuum. The residue was purified by silica gel column chromatography, eluted with PE/EA (4:1) to afford 1-(4-bromo-2-fluorophenyl)ethanol (5.01 g, 98%) as a yellow oil. MS ESI calculated for $C_8H_8BrFO$ $[M+H]^+$, 218.97 220.97, found N/A. $^1H$ NMR (400 MHz, Chloroform-d) δ 7.38-7.34 (m, 1H), 7.29-7.27 (m, 1H), 7.20-7.17 (m, 1H), 5.12 (q, J=6.6 Hz, 1H), 1.47 (d, J=6.6 Hz, 3H). $^{19}F$ NMR (377 MHz, Chloroform-d) δ −117.28.

Preparation 99B: 4-bromo-1-(1-bromoethyl)-2-fluorobenzene

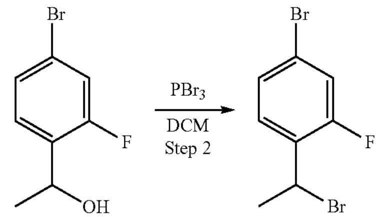

To a stirred solution of 1-(4-bromo-2-fluorophenyl)ethanol (2.00 g, 9.130 mmol) in DCM (30 mL) was added $PBr_3$ (2.97 g, 10.956 mmol) at 0° C. under nitrogen atmosphere. The mixture was stirred for 2 h at room temperature under nitrogen atmosphere. The reaction was quenched with water at room temperature. The aqueous layer was extracted with $CH_2Cl_2$ (3×100 mL). The resulting mixture was concentrated under reduced pressure. The residue was purified by silica gel column chromatography, eluted with PE to afford 4-bromo-1-(1-bromoethyl)-2-fluorobenzene (2.00 g, 78%) as a colorless oil. MS ESI calculated for $C_8H_7Br_2F$ $[M+H]^+$, 280.89 282.89, found N/A. $^1H$ NMR (400 MHz, Chloroform-d) δ 7.42-7.37 (m, 1H), 7.32-7.28 (m, 1H), 7.24-7.21 (m, 1H), 5.40 (q, J=7.0 Hz, 1H), 2.02 (d, J=7.0 Hz, 3H).

Preparation 99C: 4-bromo-1-[1-(dimethylphosphoryl)ethyl]-2-fluorobenzene

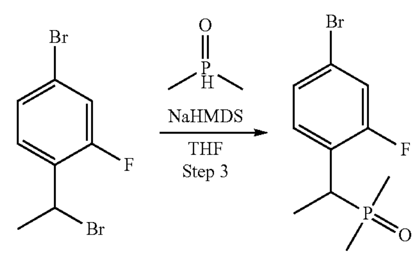

To a stirred solution of (methylphosphonoyl)methane (0.55 g, 7.094 mmol) in THF (30 mL) was added NaHMDS (5.3 mL, 5.321 mmol, 1M in THF) at 0° C. under nitrogen atmosphere. The mixture was stirred for 15 min at 0° C. To the above mixture was added 4-bromo-1-(1-bromoethyl)-2-fluorobenzene (1.00 g, 3.547 mmol) at 0° C. The resulting mixture was stirred for additional 16 h at 20° C. The reaction was quenched with water at room temperature. The resulting mixture was concentrated under vacuum. The residue was purified by silica gel column chromatography, eluted with $CH_2Cl_2$/MeOH (10/1) to afford 4-bromo-1-[1-(dimethylphosphoryl)ethyl]-2-fluorobenzene (165 mg, 17%) as a yellow oil. MS ESI calculated for $C_{10}H_{13}BrFOP$ $[M+H]^+$, 278.99 280.99, found 279.05 281.05.

Preparation 99D: (7R,14R)-1-(difluoromethoxy)-11-(4-(1-(dimethylphosphoryl)ethyl)-3-fluorophenyl)-6-(methyl-d3)-6,7-dihydro-7,14-methanobenzo[f]benzo[4,5]imidazo[1,2-a][1,4]diazocin-5(14H)-one

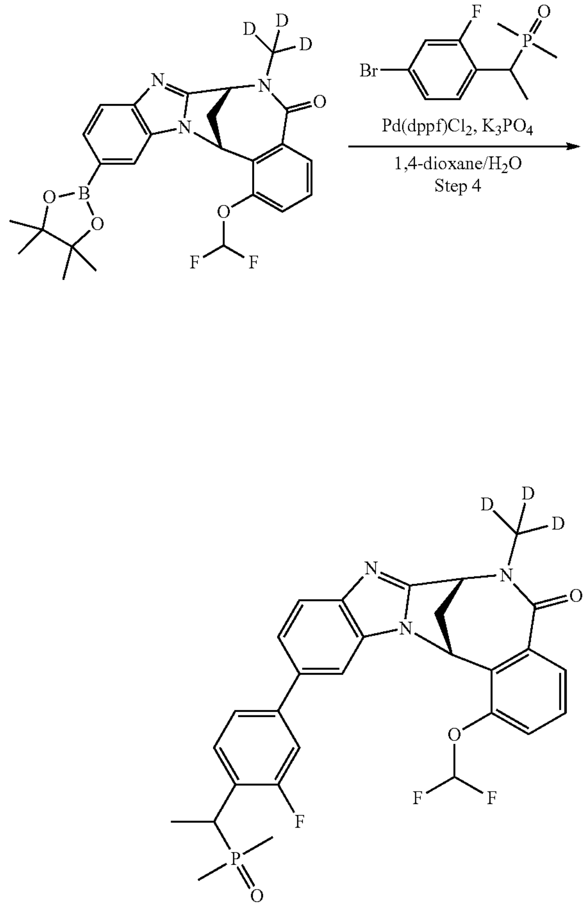

To a stirred mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (150 mg, 0.310 mmol) and 4-bromo-1-[1-(dimethylphosphoryl)ethyl]-2-fluorobenzene (86 mg, 0.310 mmol) in 1,4-dioxane (2 mL) and $H_2O$ (0.4 mL) were added $K_3PO_4$ (197 mg, 0.930 mmol) and Pd(dppf)$Cl_2$ (25 mg, 0.031 mmol) at room temperature under nitrogen atmosphere. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (10:1) to afford (7R,14R)-1-(difluoromethoxy)-11-(4-(1-(dimethylphosphoryl)ethyl)-3-fluorophenyl)-6-(methyl-d3)-6,7-dihydro-7,14-methanobenzo[f]benzo[4,5]imidazo[1,2-a][1,4]diazocin-5(14H)-one (120 mg, 67%). MS ESI calculated for $C_{29}H_{24}D_3F_3N_3O_3P$ $[M+H]^+$, 557.19, found 557.20.

Example 99 and 100: (7R,14R)-1-(difluoromethoxy)-11-(4-((S or R)-1-(dimethylphosphoryl)ethyl)-3-fluorophenyl)-6-(methyl-d3)-6,7-dihydro-7,14-methanobenzo[f]benzo[4,5]imidazo[1,2-a][1,4]diazocin-5(14H)-one and (7R,14R)-1-(difluoromethoxy)-11-(4-((R or S)-1-(dimethylphosphoryl)ethyl)-3-fluorophenyl)-6-(methyl-d3)-6,7-dihydro-7,14-methanobenzo[f]benzo[4,5]imidazo[1,2-a][1,4]diazocin-5(14H)-one

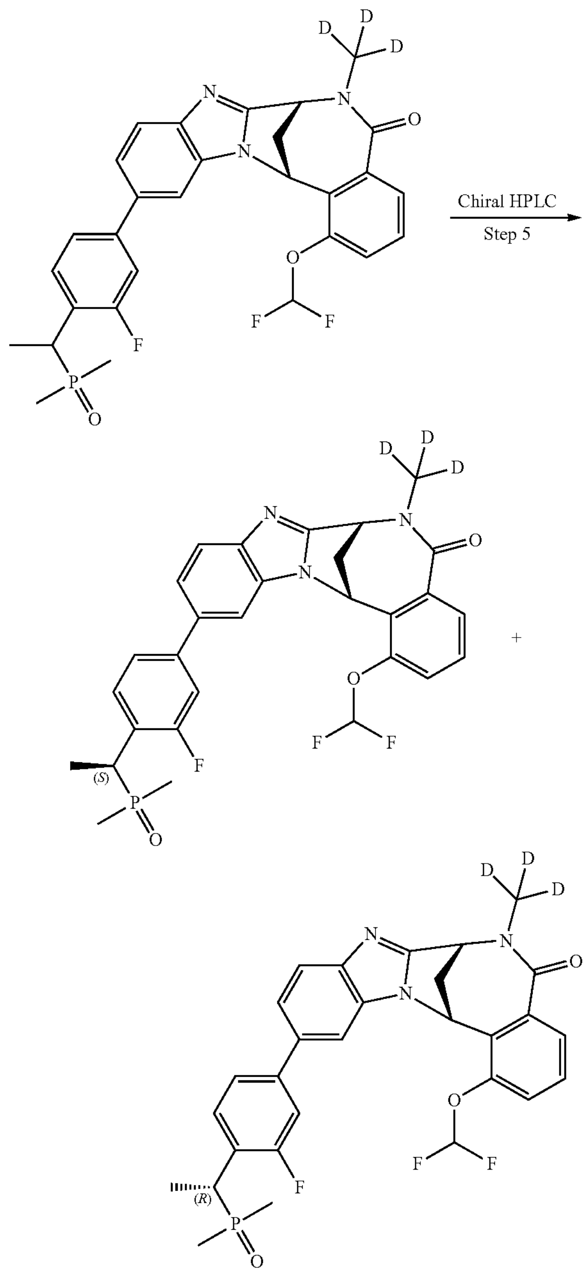

(7R,14R)-1-(difluoromethoxy)-11-(4-(1-(dimethylphosphoryl)ethyl)-3-fluorophenyl)-6-(methyl-d3)-6,7-dihydro-7,14-methanobenzo[f]benzo[4,5]imidazo[1,2-a][1,4]diazocin-5(14H)-one (120 mg) was resolved by Chiral HPLC with the following conditions: Column: CHIRALPAK IH 3*25 cm, 5 μm; Mobile Phase A: Hex (0.1% 2M $NH_3$-

MeOH), Mobile Phase B: EtOH/ACN=5:1; Flow rate: 45 mL/min; Gradient: isocratic 25; Wave Length: 212/288 nm; RT1 (min): 11.5; RT2 (min): 14.5. The first peak afforded 41 mg (23%) as a white solid. MS ESI calculated for $C_{29}H_{24}D_3F_3N_3O_3P$ $[M+H]^+$, 557.19, found 557.20. $^1H$ NMR (400 MHz, DMSO-$d_6$) δ 8.30-8.25 (m, 1H), 7.87-7.54 (m, 3H), 7.54-7.42 (m, 6H), 6.29 (d, J=7.1 Hz, 1H), 5.23 (d, J=7.1 Hz, 1H), 3.53-3.50 (m, 1H), 3.45-3.40 (m, 1H) 2.82 (d, J=13.8 Hz, 1H), 1.55-1.40 (m, 6H), 1.28-1.19 (m, 3H). $^{19}F$ NMR (377 MHz, DMSO-$d_6$) δ −81.67, −82.13, −82.25, −82.69, −116.59. $^{31}P$ NMR (162 MHz, DMSO-$d_6$) δ 43.57.

The second peak afforded 36 mg (21%) as a white solid. MS ESI calculated for $C_{29}H_{24}D_3F_3N_3O_3P$ $[M+H]^+$, 557.19, found 557.25. $^1H$ NMR (400 MHz, DMSO-$d_6$) δ 8.30-8.24 (m, 1H), 7.88-7.66 (m, 3H), 7.58-7.42 (m, 6H), 6.29 (d, J=7.1 Hz, 1H), 5.23 (d, J=7.1 Hz, 1H), 3.58-3.48 (m, 1H), 3.46-3.41 (m, 1H), 2.83 (d, J=13.8 Hz, 1H), 1.55-1.43 (m, 6H), 1.28-1.20 (m, 3H). $^{19}F$ NMR (377 MHz, DMSO-$d_6$) δ −81.62, −82.07, −82.25, −82.71, −116.62. $^{31}P$ NMR (162 MHz, DMSO-$d_6$) δ 43.65.

Example 101: (7R,14R)-11-(4-((diethylphosphoryl)(hydroxy)methyl)phenyl)-1-(difluoromethoxy)-6-(methyl-d3)-6,7-dihydro-7,14-methanobenzo[f]benzo[4,5]imidazo[1,2-a][1,4]diazocin-5(14H)-one Synthetic Scheme

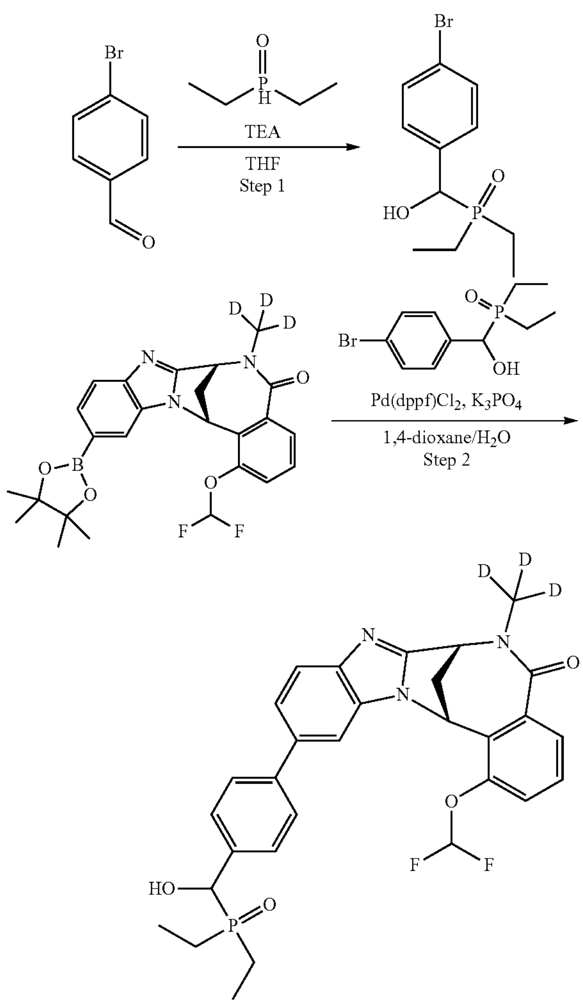

Preparation 101A: ((4-bromophenyl)(hydroxy)methyl)diethylphosphine Oxide

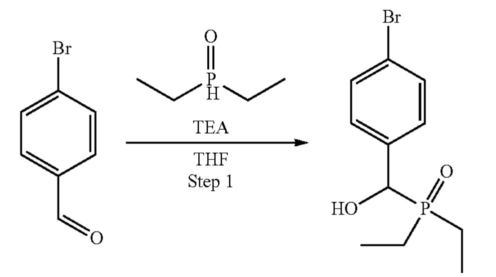

To a stirred solution of 4-bromobenzaldehyde (3.00 g, 16.214 mmol) and (ethylphosphonoyl)ethane (1.89 g, 17.835 mmol) in THF (30 mL) was added TEA (4.5 mL, 32.428 mmol) dropwise at room temperature. The resulting mixture was stirred for overnight at 55° C. The mixture was allowed to cool down to room temperature. The resulting mixture was stirred for 5 min at 0° C. The precipitated solids were collected by filtration and washed with EtOAc (3×5 mL). The resulting mixture was concentrated under vacuum to afford ((4-bromophenyl)(hydroxy)methyl)diethylphosphine oxide (4.10 g, 86%) as a white solid. MS ESI calculated for $C_{11}H_{16}BrO_2P$ $[M+H]^+$, 291.01 293.01, found 290.80 292.80. $^1H$ NMR (400 MHz, Chloroform-d) δ 7.48 (d, J=8.2 Hz, 2H), 7.35-7.29 (m, 2H), 5.05 (d, J=7.3 Hz, 1H), 4.33 (s, 1H), 1.87-1.50 (m, 4H), 1.18-1.02 (m, 6H). $^{31}P$ NMR (162 MHz, Chloroform-d) δ 54.24.

Example 101: (7R,14R)-11-(4-((diethylphosphoryl)(hydroxy)methyl)phenyl)-1-(difluoromethoxy)-6-(methyl-d3)-6,7-dihydro-7,14-methanobenzo[f]benzo[4,5]imidazo[1,2-a][1,4]diazocin-5(14H)-one

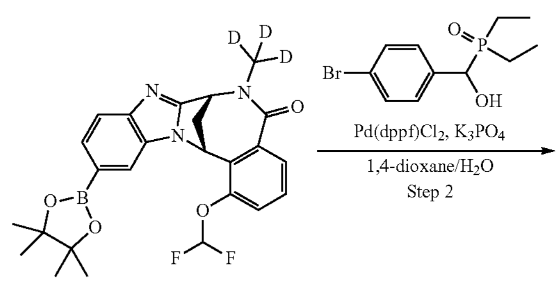

-continued

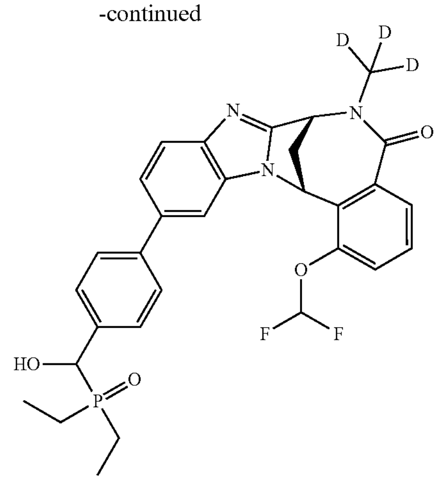

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol) and (4-bromophenyl)(diethylphosphoryl)methanol (39 mg, 0.134 mmol) in 1,4-dioxane (0.8 mL) and $H_2O$ (0.2 mL) were added $K_3PO_4$ (66 mg, 0.309 mmol) and Pd(dppf)$Cl_2$ (8 mg, 0.010 mmol) in portions at room temperature under nitrogen atmosphere. The resulting mixture was stirred for 2 h at 80° C. under nitrogen atmosphere. The resulting mixture was concentrated under vacuum. The residue was purified by silica gel column chromatography, eluted with DCM/MeOH (0% to 10%) followed by reversed-phase flash chromatography with the following conditions: column, C18 silica gel; mobile phase, $CH_3CN$ in water (10 mmol/L $NH_4HCO_3$), 40% to 70% gradient in 20 min; detector, 254/220 nm to afford (7R,14R)-11-(4-((diethylphosphoryl)(hydroxy)methyl)phenyl)-1-(difluoromethoxy)-6-(methyl-d3)-6,7-dihydro-7,14-methanobenzo[f]benzo[4,5]imidazo[1,2-a][1,4]diazocin-5(14H)-one (24 mg, 40%) as a white solid. MS ESI calculated for $C_{30}H_{27}D_3F_2N_3O_4P$ $[M+H]^+$, 569.21, found 569.45. $^1H$ NMR (400 MHz, Methanol-$d_4$) δ 8.43-8.30 (m, 1H), 7.83-7.78 (m, 1H), 7.70-7.62 (m, 3H), 7.59-7.52 (m, 3H), 7.50-7.43 (m, 2H), 7.29-7.08 (m, 1H), 6.45-6.39 (m, 1H), 5.23-5.10 (m, 2H), 3.65-3.50 (m, 1H), 2.95-2.84 (m, 1H), 2.02-1.86 (m, 2H), 1.83-1.61 (m, 2H), 1.30-1.19 (m, 3H), 1.10-0.99 (m, 3H). $^{19}F$ NMR (377 MHz, Methanol-$d_4$) δ −80.27, −80.35, −80.72, −80.79, −80.83, −80.92, −81.28, −81.37. $^{31}P$ NMR (162 MHz, Methanol-$d_4$) δ 57.13.

Example 102: (7R,14R)-1-(difluoromethoxy)-11-(2-(difluoromethyl)-4-(dimethylphosphoryl)phenyl)-6-(methyl-d3)-6,7-dihydro-7,14-methanobenzo[f]benzo[4,5]imidazo[1,2-a][1,4]diazocin-5(14H)-one Synthetic Scheme

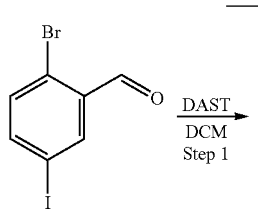

-continued

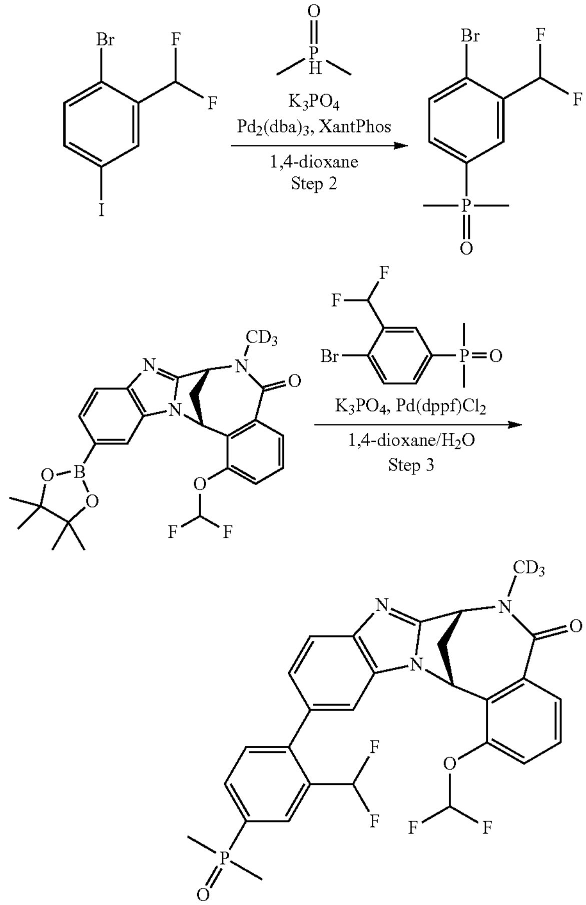

Preparation 102A: 1-bromo-2-(difluoromethyl)-4-iodobenzene

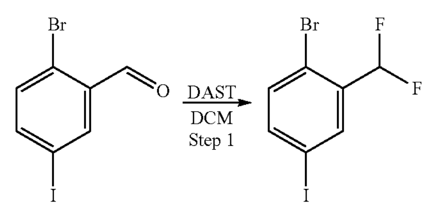

To a stirred mixture of 2-bromo-5-iodobenzaldehyde (2.00 g, 6.433 mmol) in DCM (40 mL) was added DAST (1.56 g, 9.649 mmol) dropwise at 0° C. under nitrogen atmosphere. The resulting mixture was stirred for 2 h at 0° C. under nitrogen atmosphere. The reaction was quenched with Water/Ice at 0° C. The aqueous layer was extracted with $CH_2Cl_2$ (2×100 mL). The resulting mixture was concentrated under vacuum. This resulted in 1-bromo-2-(difluoromethyl)-4-iodobenzene (2.00 g, 93%) as a colorless oil. MS ESI calculated for $C_7H_4BrF_2I$ $[M+H]^+$, 322.85 324.85, found N/A. $^1H$ NMR (400 MHz, Chloroform-d) δ 7.96-7.93 (m, 1H), 7.66-7.63 (m, 1H), 7.34-7.31 (m, 1H), 6.82 (t, J=54.6 Hz, 1H). $^{19}F$ NMR (377 MHz, Chloroform-d) δ −115.14.

Preparation 102B: 1-bromo-2-(difluoromethyl)-4-(dimethylphosphoryl)benzene

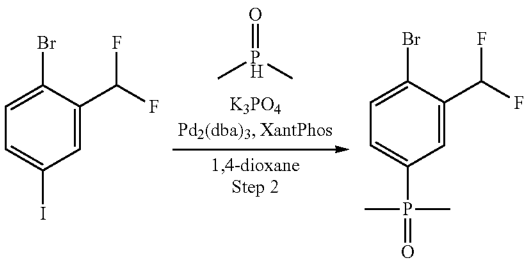

To a stirred mixture of 1-bromo-2-(difluoromethyl)-4-iodobenzene (600 mg, 1.802 mmol) and (methylphosphonoyl)methane (155 mg, 1.982 mmol) in 1,4-dioxane (12 mL) were added $K_3PO_4$ (1.15 g, 5.406 mmol), XantPhos (104 mg, 0.180 mmol) and $Pd_2(dba)_3$ (83 mg, 0.090 mmol) at room temperature under nitrogen atmosphere. The resulting mixture was stirred for 16 h at 80° C. under nitrogen atmosphere. The resulting mixture was concentrated under vacuum. The residue was purified by silica gel column chromatography, eluted with $CH_2Cl_2$/MeOH (10:1) to afford 1-bromo-2-(difluoromethyl)-4-(dimethylphosphoryl)benzene (380 mg, 74%) as a colorless oil. MS ESI calculated for $C_9H_{10}BrF_2OP$ $[M+H]^+$, 282.96 284.96, found 283.05 285.10. $^1H$ NMR (400 MHz, Chloroform-d) δ 7.93 (d, J=11.4 Hz, 1H), 7.80-7.75 (m, 2H), 6.94 (t, J=54.6 Hz, 1H), 1.79 (s, 3H), 1.76 (s, 3H). $^{19}F$ NMR (377 MHz, Chloroform-d) δ −115.14. $^{31}P$ NMR (162 MHz, Chloroform-d) δ 33.73.

Example 102: (7R,14R)-1-(difluoromethoxy)-11-(2-(difluoromethyl)-4-(dimethylphosphoryl)phenyl)-6-(methyl-d3)-6,7-dihydro-7,14-methanobenzo[f]benzo[4,5]imidazo[1,2-a][1,4]diazocin-5(14H)-one

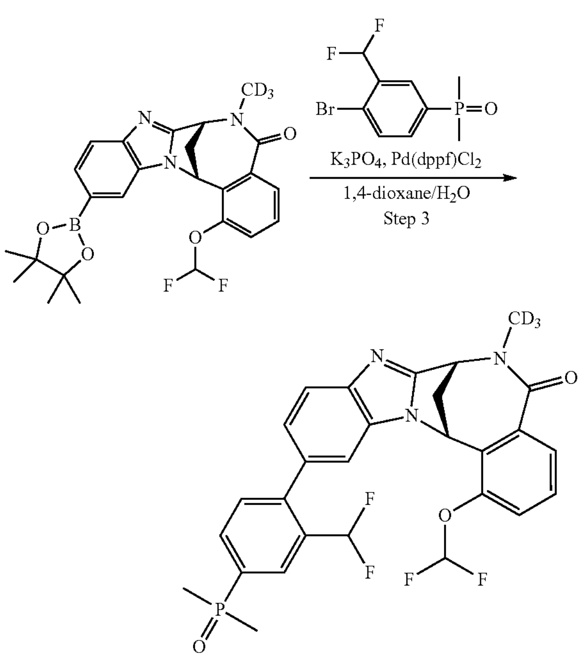

To a stirred mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol) and 1-bromo-2-(difluoromethyl)-4-(dimethylphosphoryl)benzene (38 mg, 0.134 mmol) in 1,4-dioxane (1.5 mL) and $H_2O$ (0.3 mL) were added $K_3PO_4$ (66 mg, 0.309 mmol) and $Pd(dppf)Cl_2$ (8 mg, 0.010 mmol) at room temperature under nitrogen atmosphere. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (10:1) followed by reversed-phase flash chromatography with the following conditions: column, C18 silica gel; mobile phase, $CH_3CN$ in Water (10 mmol/L $NH_4HCO_3$), 25% to 55% gradient in 25 min; detector, 254 nm. This resulted in (7R,14R)-1-(difluoromethoxy)-11-(2-(difluoromethyl)-4-(dimethylphosphoryl)phenyl)-6-(methyl-d3)-6,7-dihydro-7,14-methanobenzo[f]benzo[4,5]imidazo[1,2-a][1,4]diazocin-5(14H)-one (21 mg, 37%) as a white solid. MS ESI calculated for $C_{28}H_{21}D_3F_4N_3O_3P$ $[M+H]^+$, 561.17, found 561.15. $^1H$ NMR (400 MHz, DMSO-$d_6$) δ 8.31-8.25 (m, 1H), 8.24-7.95 (m, 2H), 7.93-7.88 (m, 1H), 7.89-7.51 (m, 5H), 7.51-7.46 (m, 2H), 6.33 (d, J=7.1 Hz, 1H), 5.25 (d, J=7.1 Hz, 1H), 3.58-3.43 (m, 1H), 2.84 (d, J=13.8 Hz, 1H), 1.83 (s, 3H), 1.79 (s, 3H). $^{19}F$ NMR (377 MHz, $DMSO_6$) δ −81.50, −81.95, −82.08, −82.53, −105.45, −106.25, −107.20, −108.00. $^{31}P$ NMR (162 MHz, DMSO-$d_6$) δ 32.5.

Example 103: (7R,14R)-1-(difluoromethoxy)-11-(3-(difluoromethyl)-4-(dimethylphosphoryl)phenyl)-6-(methyl-d3)-6,7-dihydro-7,14-methanobenzo[f]benzo[4,5]imidazo[1,2-a][1,4]diazocin-5(14H)-one Synthetic Scheme

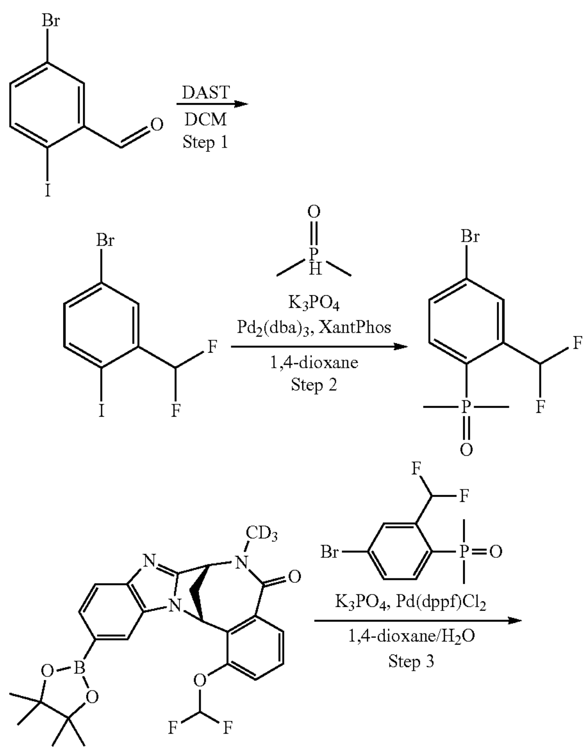

-continued

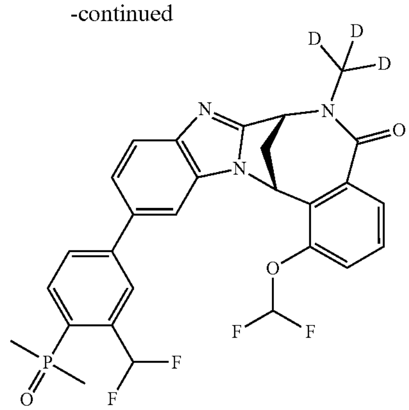

Preparation 103A: 4-bromo-2-(difluoromethyl)-1-iodobenzene

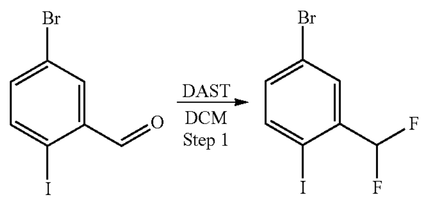

To a stirred mixture of 5-bromo-2-iodobenzaldehyde (2.00 g, 6.433 mmol) in DCM (40 mL) was added DAST (1.56 g, 9.678 mmol) dropwise at 0° C. under nitrogen atmosphere. The resulting mixture was stirred for 2 h at 0° C. under nitrogen atmosphere. The reaction was quenched with sat. $NH_4Cl$ (aq.) at 0° C. The aqueous layer was extracted with $CH_2Cl_2$ (2×100 mL). The resulting mixture was concentrated under reduced pressure. The residue was purified by silica gel column chromatography, eluted with PE to afford 4-bromo-2-(difluoromethyl)-1-iodobenzene (1.87 g, 87%) as a colorless oil. MS ESI calculated for $C_7H_4BrF_2I$ $[M+H]^+$, 332.85 334.85, found N/A. $^1H$ NMR (400 MHz, Chloroform-d) δ 7.75-7.71 (m, 2H), 7.31 (m, 1H), 6.69 (t, J=54.6 Hz, 1H). $^{19}F$ NMR (377 MHz, Chloroform-d) δ −114.19.

Preparation 103B: 4-bromo-2-(difluoromethyl)-1-(dimethylphosphoryl)benzene

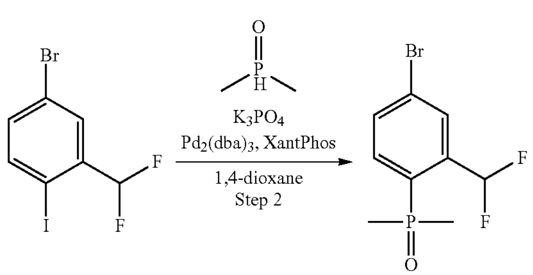

To a stirred mixture of 4-bromo-2-(difluoromethyl)-1-iodobenzene (600 mg, 1.802 mmol) and (methylphosphonoyl)methane (155 mg, 1.982 mmol) in 1,4-dioxane (12 mL) were added $K_3PO_4$ (1.15 g, 5.406 mmol), XantPhos (104 mg, 0.180 mmol) and $Pd_2(dba)_3$ (83 mg, 0.090 mmol) at room temperature under nitrogen atmosphere. The resulting mixture was stirred for 16 h at 80° C. under nitrogen atmosphere. The resulting mixture was concentrated under vacuum. The residue was purified by silica gel column chromatography, eluted with $CH_2Cl_2$/MeOH (10:1) to afford 4-bromo-2-(difluoromethyl)-1-(dimethylphosphoryl)benzene (300 mg, 59%) as a colorless oil. MS ESI calculated for $C_9H_{10}BrF_2OP$ $[M+H]^+$, 282.96 284.96, found 283.05 285.05. $^1H$ NMR (400 MHz, Chloroform-d) δ 8.02-8.00 (m, 1H), 7.98-7.40 (m, 2H), 7.40-7.34 (m, 1H), 1.84 (s, 3H), 1.81 (s, 3H). $^{19}F$ NMR (377 MHz, Chloroform-d) δ −115.14. $^{31}P$ NMR (162 MHz, Chloroform-d) δ 38.40.

Example 103: (7R,14R)-1-(difluoromethoxy)-11-(3-(difluoromethyl)-4-(dimethylphosphoryl)phenyl)-6-(methyl-d3)-6,7-dihydro-7,14-methanobenzo[f]benzo[4,5]imidazo[1,2-a][1,4]diazocin-5(14H)-one

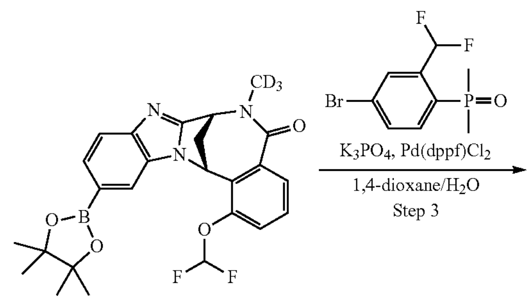

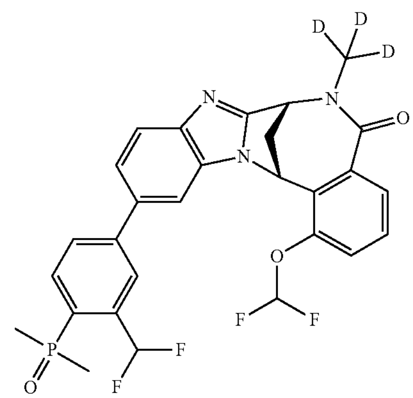

To a stirred mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol) and 4-bromo-2-(difluoromethyl)-1-(dimethylphosphoryl)benzene (38 mg, 0.134 mmol) in 1,4-dioxane (1.5 mL) and $H_2O$ (0.3 mL) were added $K_3PO_4$ (66 mg, 0.309 mmol) and $Pd(dppf)Cl_2$ (8 mg, 0.010 mmol) at room temperature under nitrogen atmosphere. The resulting mixture was stirred for 16 h at 80° C. under nitrogen atmosphere. The resulting mixture was concentrated under vacuum. The residue was purified by silica gel column chromatography, eluted with $CH_2Cl_2$/MeOH (10:1) followed by reversed-phase flash chromatography with the following conditions: column, C18 silica gel; mobile phase, $CH_3CN$ in Water (10 mmol/L $NH_4HCO_3$), 25% to 55% gradient in 25 min; detector, 254 nm. The resulting mixture was concentrated under vacuum. This resulted in (7R,14R)-1-(difluoromethoxy)-11-(3-(difluoromethyl)-4-(dimethylphosphoryl)phenyl)-6-(methyl-d3)-6,7-dihydro-7,14-methanobenzo[f]benzo[4,5]imidazo[1,2-a][1,4]diazocin-5(14H)-one (23 mg, 40%) as a white solid. MS ESI calculated for $C_{28}H_{21}D_3F_4N_3O_3P$ $[M+H]^+$, 561.17, found 561.15. $^1H$ NMR (400 MHz, DMSO-$d_6$) δ 8.31-8.25 (m, 1H), 8.25-7.86 (m, 4H), 7.85-7.58 (m, 4H), 7.52-7.46 (m, 2H), 6.33 (d, J=7.1 Hz, 1H), 5.25 (d, J=7.1 Hz, 1H), 3.59-3.48 (m, 1H), 2.84 (d, J=13.8 Hz, 1H), 1.83 (s, 3H), 1.79 (s, 3H). $^{19}F$ NMR (377 MHz, DMSO-$d_6$) δ −82.14, −109.94. $^{31}P$ NMR (162 MHz, DMSO-$d_6$) δ 38.61.

Example 104: (7R,14R)-1-(difluoromethoxy)-11-(4-(dimethylphosphoryl)-2-(trifluoromethyl)phenyl)-6-(methyl-d3)-6,7-dihydro-7,14-methanobenzo[f]benzo[4,5]imidazo[1,2-a][1,4]diazocin-5(14H)-one Synthetic Scheme

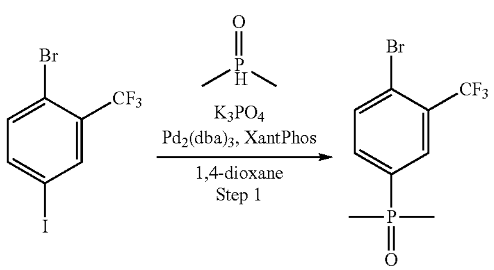

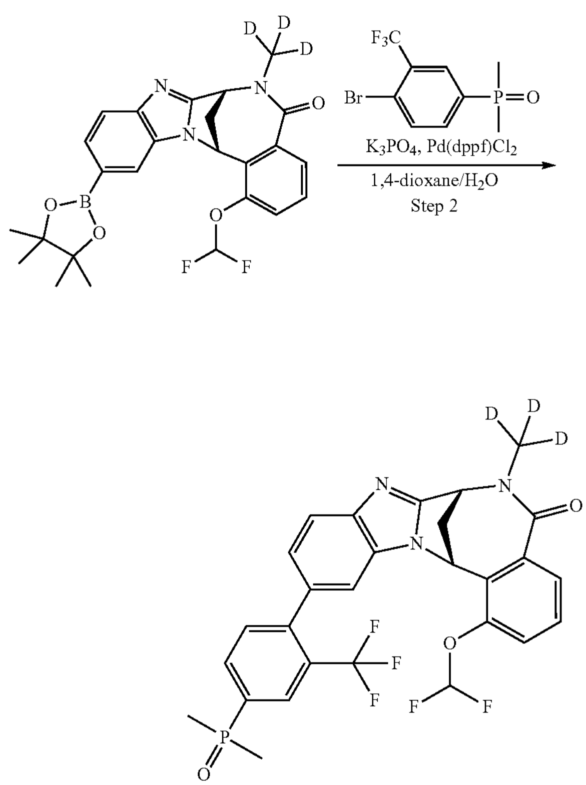

Preparation 104A: 1-bromo-4-(dimethylphosphoryl)-2-(trifluoromethyl)benzene

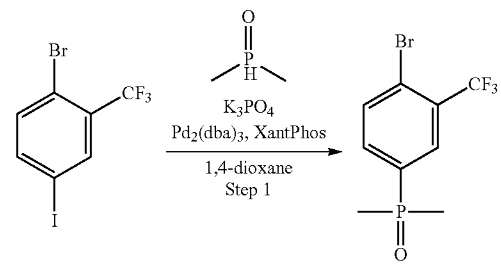

To a stirred mixture of 1-bromo-4-iodo-2-(trifluoromethyl)benzene (500 mg, 1.425 mmol), $K_3PO_4$ (907 mg, 4.275 mmol), XantPhos (82 mg, 0.143 mmol) and (methylphosphonoyl)methane (111 mg, 1.425 mmol) in 1,4-dioxane (5 mL) was added $Pd_2(dba)_3$ (65 mg, 0.071 mmol) at room temperature under nitrogen atmosphere. The mixture was stirred for 16 h at 90° C. The mixture was allowed to cool down to room temperature. The resulting mixture was concentrated under vacuum. The residue was purified by silica gel column chromatography, eluted with $CH_2Cl_2$/MeOH (0~10%) to afford 1-bromo-4-(dimethylphosphoryl)-2-(trifluoromethyl)benzene (340 mg, 79%) as a black gray solid. MS ESI calculated for $C_9H_9BrF_3OP$ $[M+H]^+$, 300.95 302.95, found 301.05 303.05. $^1H$ NMR (400 MHz, Chloroform-d) δ 8.04-7.96 (m, 1H), 7.90-7.83 (m, 1H), 7.80-7.70 (m, 1H), 1.78 (s, 3H), 1.75 (s, 3H). $^{31}P$ NMR (162 MHz, Chloroform-d) δ 33.21. $^{19}F$ NMR (377 MHz, Chloroform-d) δ −62.83.

Example 104: (7R,14R)-1-(difluoromethoxy)-11-(4-(dimethylphosphoryl)-2-(trifluoromethyl)phenyl)-6-(methyl-d3)-6,7-dihydro-7,14-methanobenzo[f]benzo[4,5]imidazo[1,2-a][1,4]diazocin-5(14H)-one

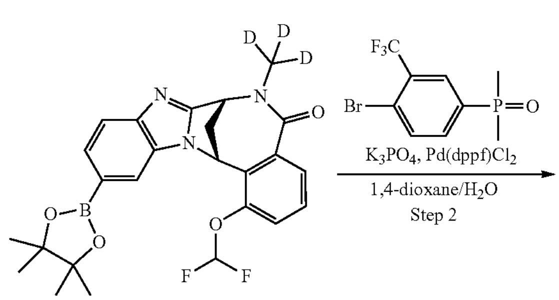

-continued

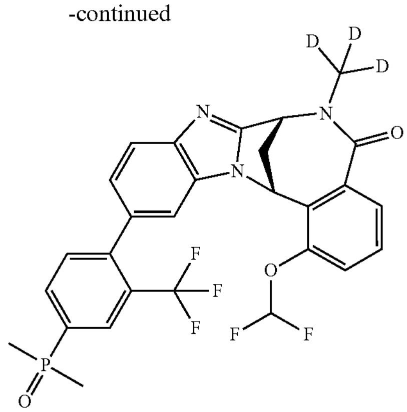

To a stirred mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol) and 1-bromo-4-(dimethylphosphoryl)-2-(trifluoromethyl)benzene (37 mg, 0.124 mmol) in 1,4-dioxane (0.9 mL) and $H_2O$ (0.1 mL) were added $K_3PO_4$ (65 mg, 0.309 mmol) and $Pd(dppf)Cl_2$ (9 mg, 0.010 mmol) in portions at room temperature under nitrogen atmosphere. The mixture was stirred for 16 h at 80° C. The mixture was allowed to cool down to room temperature. The resulting mixture was concentrated under vacuum. The residue was purified by silica gel column chromatography, eluted with $CH_2Cl_2$/MeOH (0~10%) followed purified by reversed-phase flash chromatography with the following conditions: column, C18 silica gel; mobile phase, $CH_3CN$ in Water (10 mmol/L $NH_4HCO_3$), 20% to 50% gradient in 30 min; detector, 254 nm. to afford (7R,14R)-1-(difluoromethoxy)-11-(4-(dimethylphosphoryl)-2-(trifluoromethyl)phenyl)-6-(methyl-d3)-6,7-dihydro-7,14-methanobenzo[f]benzo[4,5]imidazo[1,2-a][1,4]diazocin-5(14H)-one (24 mg, 41%) as a white solid. MS ESI calculated for $C_{29}H_{20}D_3F_5N_3O_3P$ $[M+H]^+$, 579.16, found 579.05. $^1H$ NMR (400 MHz, Chloroform-d) δ 8.54-8.47 (m, 1H), 8.15-8.07 (m, 1H), 7.99-7.89 (m, 1H), 7.79 (d, J=8.4 Hz, 1H), 7.52-7.50 (m, 1H), 7.50-7.46 (m, 1H), 7.46-7.40 (m, 1H), 7.34-7.27 (m, 1H), 7.27-7.20 (m, 1H), 6.73 (t, J=72.7 Hz, 1H), 6.28 (d, J=7.1 Hz, 1H), 5.08 (d, J=6.9 Hz, 1H), 3.57-3.46 (m, 1H), 2.91 (d, J=13.5 Hz, 1H), 1.85 (s, 3H), 1.82 (s, 3H). $^{19}F$ NMR (377 MHz, Chloroform-d) δ −56.67, −80.33, −80.77, −81.21, −81.65. $^{31}P$ NMR (162 MHz, Chloroform-d) δ 33.30.

Example 105: (7R,14R)-1-(difluoromethoxy)-11-(4-(dimethylphosphoryl)-3-methylphenyl)-6-(methyl-d3)-6,7-dihydro-7,14-methanobenzo[f]benzo[4,5]imidazo[1,2-a][1,4]diazocin-5(14H)-one Synthetic Scheme

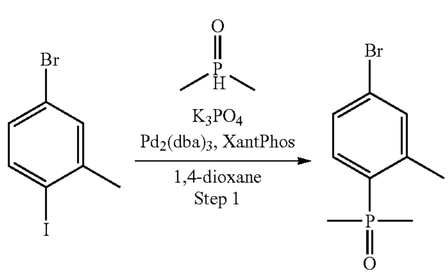

-continued

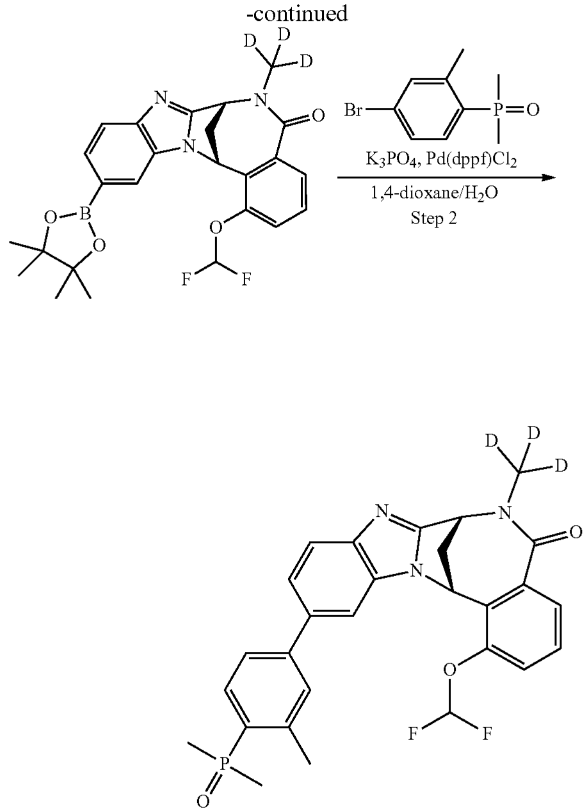

Preparation 105A: 4-bromo-1-(dimethylphosphoryl)-2-methylbenzene

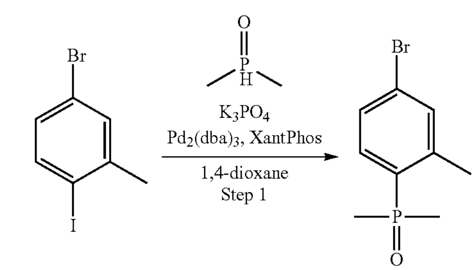

To a stirred mixture of 4-bromo-1-iodo-2-methylbenzene (500 mg, 1.684 mmol), $K_3PO_4$ (1072 mg, 5.052 mmol), XantPhos (97 mg, 0.168 mmol) and (methylphosphonoyl)methane (131 mg, 1.684 mmol) in 1,4-dioxane (5 mL) was added $Pd_2(dba)_3$ (77 mg, 0.084 mmol) at room temperature under nitrogen atmosphere. The mixture was stirred for 16 h at 90° C. The mixture was allowed to cool down to room temperature. The resulting mixture was concentrated under vacuum. The residue was purified by silica gel column chromatography, eluted with $CH_2Cl_2$/MeOH (0~10%) to afford 4-bromo-1-(dimethylphosphoryl)-2-methylbenzene (198 mg, 47%) as a yellow oil. MS ESI calculated for $C_9H_{12}BrOP$ $[M+H]^+$, 246.96 248.96, found 247.05 249.05. $^1H$ NMR (400 MHz, Chloroform-d) δ 7.58-7.48 (m, 1H), 7.47-7.40 (m, 2H), 2.64 (s, 3H), 1.82 (s, 3H), 1.79 (s, 3H). $^{31}P$ NMR (162 MHz, Chloroform-d) δ 35.50.

Example 105: (7R,14R)-1-(difluoromethoxy)-11-(4-(dimethylphosphoryl)-3-methylphenyl)-6-(methyl-d3)-6,7-dihydro-7,14-methanobenzo[f]benzo[4,5]imidazo[1,2-a][1,4]diazocin-5(14H)-one

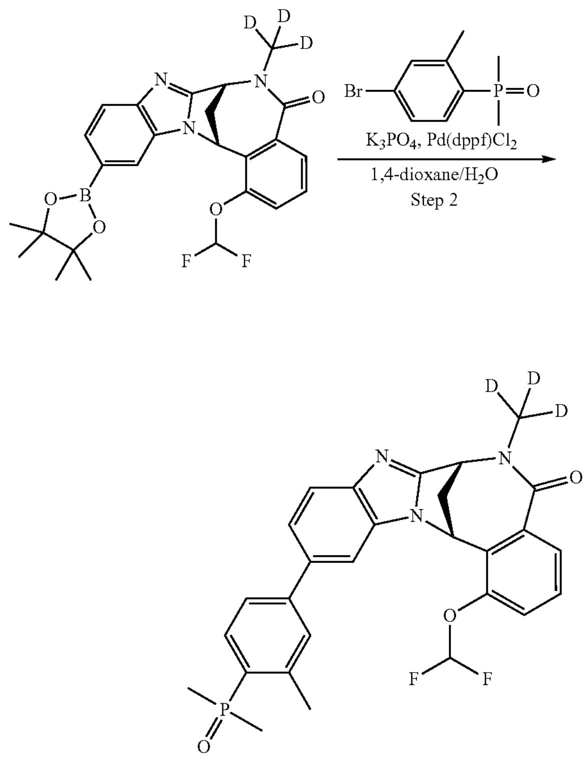

To a stirred mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol) and 4-bromo-1-(dimethylphosphoryl)-2-methylbenzene (31 mg, 0.124 mmol) in 1,4-dioxane (0.9 mL) and $H_2O$ (0.1 mL) were added $K_3PO_4$ (66 mg, 0.309 mmol) and $Pd(dppf)Cl_2$ (9 mg, 0.010 mmol) at room temperature under nitrogen atmosphere. The mixture was stirred for 16 h at 80° C. The resulting mixture was concentrated under vacuum. The residue was purified by silica gel column chromatography, eluted with $CH_2Cl_2$/MeOH (0~10%) followed purified by reversed-phase flash chromatography with the following conditions: column, C18 silica gel; mobile phase, $CH_3CN$ in Water (10 mmol/L $NH_4HCO_3$), 20% to 50% gradient in 30 min; detector, 254 nm. to afford (7R,14R)-1-(difluoromethoxy)-11-(4-(dimethylphosphoryl)-3-methylphenyl)-6-(methyl-d3)-6,7-dihydro-7,14-methanobenzo[f]benzo[4,5]imidazo[1,2-a][1,4]diazocin-5(14H)-one (34 mg, 64%) as a white solid. MS ESI calculated for $C_{28}H_{23}D_3F_2N_3O_3P$ $[M+H]^+$, 525.19, found 525.20. $^1H$ NMR (400 MHz, Chloroform-d) δ 8.53-8.46 (m, 1H), 7.84-7.71 (m, 3H), 7.58-7.53 (m, 1H), 7.53-7.48 (m, 2H), 7.44 (t, J=8.3 Hz, 1H), 7.35-7.28 (m, 1H), 6.86 (t, J=72.8 Hz, 1H), 6.34 (d, J=7.1 Hz, 1H), 5.09 (d, J=7.0 Hz, 1H), 3.58-3.46 (m, 1H), 2.92 (d, J=13.6 Hz, 1H), 2.74 (s, 3H), 1.87 (s, 3H), 1.83 (s, 3H). $^{19}F$ NMR (377 MHz, Chloroform-d) δ −80.30, −80.75, −80.77, −81.22. $^{31}P$ NMR (162 MHz, Chloroform-d) δ 35.18.

Example 106: (7R,14R)-1-(difluoromethoxy)-11-(4-(dimethylphosphoryl)-3-fluoro-5-methylphenyl)-6-(methyl-d3)-6,7-dihydro-7,14-methanobenzo[f]benzo[4,5]imidazo[1,2-a][1,4]diazocin-5(14H)-one Synthetic Scheme

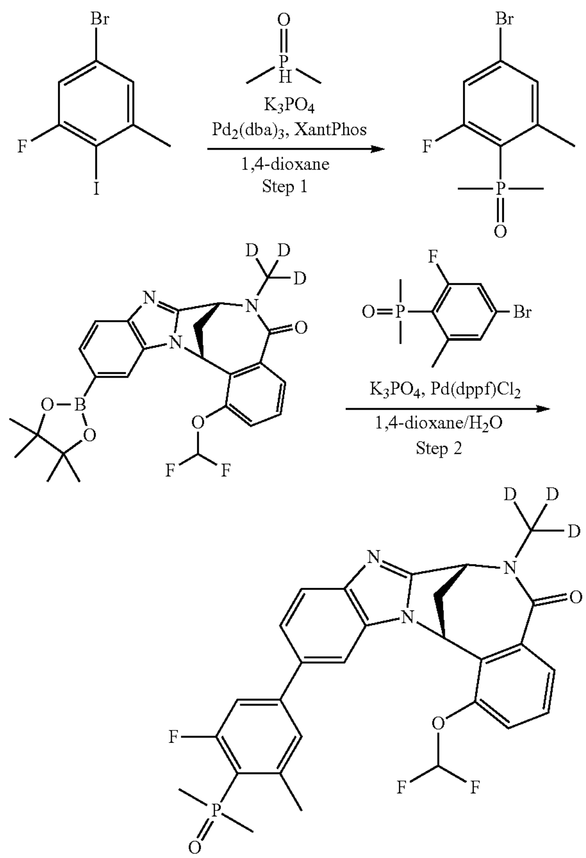

Preparation 106A: 5-bromo-2-(dimethylphosphoryl)-1-fluoro-3-methylbenzene

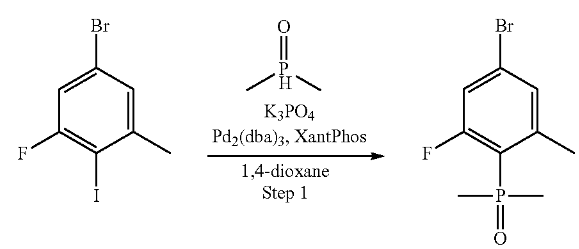

To a stirred mixture of 5-bromo-1-fluoro-2-iodo-3-methylbenzene (500 mg, 1.588 mmol), $K_3PO_4$ (1011 mg, 4.764 mmol), XantPhos (92 mg, 0.159 mmol) and (methylphosphonoyl)methane (124 mg, 1.588 mmol) in 1,4-dioxane (5 mL) was added $Pd_2(dba)_3$ (73 mg, 0.079 mmol) at room temperature under nitrogen atmosphere. The mixture was stirred for 16 h at 90° C. The mixture was allowed to cool down to room temperature. The resulting mixture was concentrated under vacuum. The residue was purified by silica gel column chromatography, eluted with $CH_2Cl_2$/MeOH (0~10%) to afford 5-bromo-2-(dimethylphosphoryl)-1-fluoro-3-methylbenzene (98 mg, 23%) as a yellow oil. MS ESI calculated for $C_9H_{11}BrFOP$ $[M+H]^+$, 264.97 266.97, found 264.95 267.00. $^1H$ NMR (300 MHz, Chloroform-d) δ 7.25 (s, 1H), 7.19-7.08 (m, 1H), 2.77 (s, 3H), 1.86 (d, J=2.7 Hz, 3H), 1.82 (d, J=2.7 Hz, 3H). $^{19}F$ NMR (282 MHz, Chloroform-d) δ −99.94. $^{31}P$ NMR (162 MHz, Chloroform-d) δ 35.89.

Example 106: (7R,14R)-1-(difluoromethoxy)-11-(4-(dimethylphosphoryl)-3-fluoro-5-methylphenyl)-6-(methyl-d3)-6,7-dihydro-7,14-methanobenzo[f]benzo[4,5]imidazo[1,2-a][1,4]diazocin-5(14H)-one

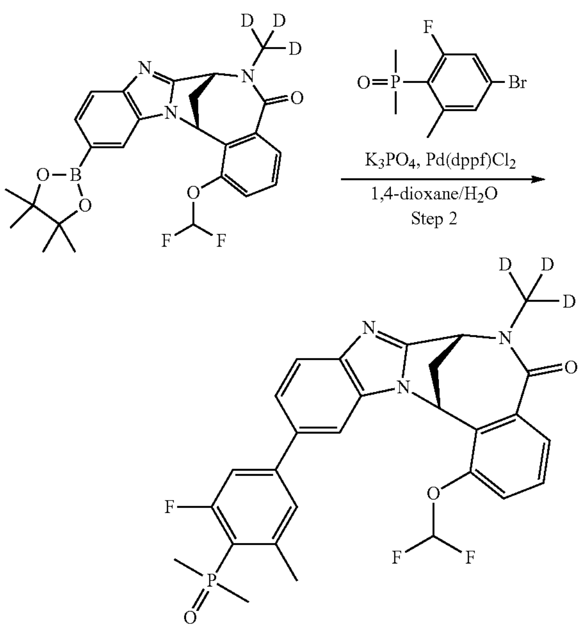

To a stirred mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol) and 5-bromo-2-(dimethylphosphoryl)-1-fluoro-3-methylbenzene (33 mg, 0.124 mmol) in 1,4-dioxane (0.9 mL) and $H_2O$ (0.1 mL) were added $K_3PO_4$ (66 mg, 0.309 mmol) and $Pd(dppf)Cl_2$ (9 mg, 0.010 mmol) in portions at room temperature under nitrogen atmosphere. The mixture was stirred for 16 h at 80° C. The mixture was allowed to cool down to room temperature. The resulting mixture was concentrated under vacuum. The residue was purified by silica gel column chromatography, eluted with $CH_2Cl_2$/MeOH (0~10%) followed purified by reversed-phase flash chromatography with the following conditions: column, C18 silica gel; mobile phase, $CH_3CN$ in Water (10 mmol/L $NH_4HCO_3$), 20% to 50% gradient in 30 min; detector, 254 nm to afford (7R,14R)-1-(difluoromethoxy)-11-(4-(dimethylphosphoryl)-3-fluoro-5-methylphenyl)-6-(methyl-d3)-6,7-dihydro-7,14-methanobenzo[f]benzo[4,5]imidazo[1,2-a][1,4]diazocin-5(14H)-one (19 mg, 34%) as a white solid. MS ESI calculated for $C_{28}H_{22}D_3F_3N_3O_3P$ $[M+H]^+$, 543.18, found 543.20. $^1H$ NMR (400 MHz, Chloroform-d) δ 8.54-8.47 (m, 1H), 7.83 (d, J=8.5 Hz, 1H), 7.78 (d, J=1.7 Hz, 1H), 7.57-7.50 (m, 1H), 7.46 (t, J=8.3 Hz, 1H), 7.34-7.29 (m, 2H), 7.19-7.11 (m, 1H), 6.89 (t, J=72.8 Hz, 1H), 6.36 (d, J=6.8 Hz, 1H), 5.14 (d, J=6.6 Hz, 1H), 3.58-3.50 (m, 1H), 2.94 (d, J=13.5 Hz, 1H), 2.86 (s, 3H), 1.90 (d, J=2.6 Hz, 3H), 1.86 (d, J=2.6 Hz, 3H). $^{19}F$ NMR (376 MHz, Chloroform-d) δ −80.33, −80.78, −80.93, −81.38, −101.57. $^{31}P$ NMR (162 MHz, Chloroform-d) δ 35.60.

Example 107: (7R,14R)-1-(difluoromethoxy)-11-(4-(dimethylphosphoryl)-2-fluoro-3-methylphenyl)-6-(methyl-d3)-6,7-dihydro-7,14-methanobenzo[f]benzo[4,5]imidazo[1,2-a][1,4]diazocin-5(14H)-one Synthetic Scheme

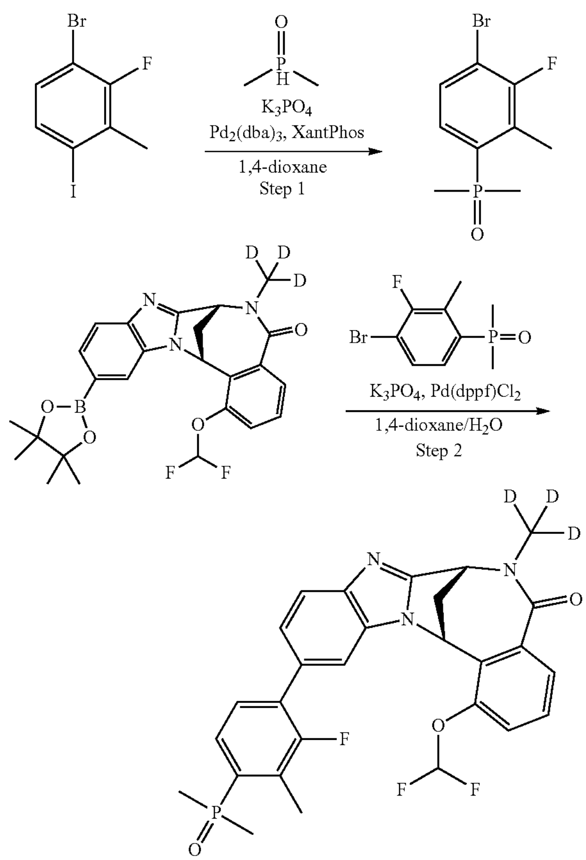

Preparation 107A: 1-bromo-4-(dimethylphosphoryl)-2-fluoro-3-methylbenzene

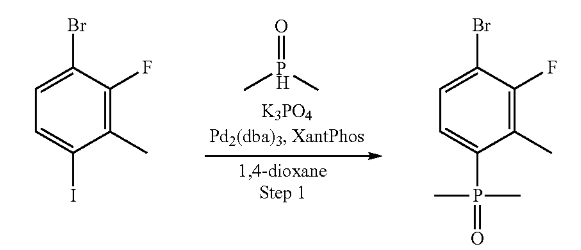

To a stirred mixture of 1-bromo-2-fluoro-4-iodo-3-methylbenzene (500 mg, 1.588 mmol) and (methylphosphonoyl)

methane (124 mg, 1.588 mmol) in 1,4-dioxane (5 mL) were added $K_3PO_4$ (1.01 g, 4.764 mmol), XantPhos (92 mg, 0.159 mmol) and $Pd_2(dba)_3$ (73 mg, 0.079 mmol) at room temperature under nitrogen atmosphere. The mixture was stirred for 16 h at 90° C. The mixture was allowed to cool down to room temperature. The resulting mixture was concentrated under vacuum. The residue was purified by silica gel column chromatography, eluted with $CH_2Cl_2$/MeOH (0~10%) to afford 1-bromo-4-(dimethylphosphoryl)-2-fluoro-3-methylbenzene (350 mg, 83%) as a yellow solid. MS ESI calculated for $C_9H_{11}BrFOP$ $[M+H]^+$, 264.97 266.97, found 265.05 267.10. $^1H$ NMR (400 MHz, Chloroform-d) δ 7.55-7.46 (m, 1H), 7.38-7.28 (m, 1H), 2.63-2.58 (m, 3H), 1.84 (s, 3H), 1.81 (s, 3H). $^{19}F$ NMR (377 MHz, Chloroform-d) δ −107.18, −107.20. $^{31}P$ NMR (162 MHz, Chloroform-d) δ 35.15.

Example 107: (7R,14R)-1-(difluoromethoxy)-11-(4-(dimethylphosphoryl)-2-fluoro-3-methylphenyl)-6-(methyl-d3)-6,7-dihydro-7,14-methanobenzo[f]benzo[4,5]imidazo[1,2-a][1,4]diazocin-5(14H)-one

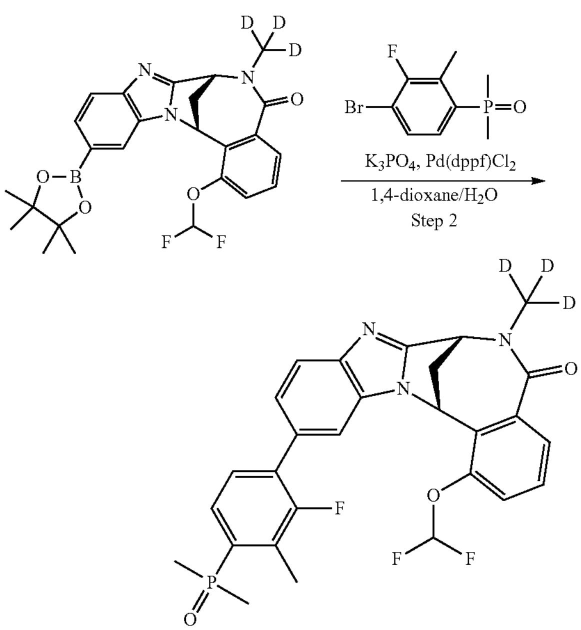

To a stirred mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol) and 1-bromo-4-(dimethylphosphoryl)-2-fluoro-3-methylbenzene (33 mg, 0.124 mmol) in 1,4-dioxane (0.9 mL) and $H_2O$ (0.1 mL) were added $K_3PO_4$ (66 mg, 0.309 mmol) and Pd(dppf)$Cl_2$ (9 mg, 0.010 mmol) at room temperature under nitrogen atmosphere. The mixture was stirred for 16 h at 80° C. The resulting mixture was concentrated under vacuum. The residue was purified by silica gel column chromatography, eluted with $CH_2Cl_2$/MeOH (0~10%) followed purified by reversed-phase flash chromatography with the following conditions: column, C18 silica gel; mobile phase, $CH_3CN$ in Water (10 mmol/L $NH_4HCO_3$), 20% to 50% gradient in 30 min; detector, 254 nm. to afford (7R,14R)-1-(difluoromethoxy)-11-(4-(dimethylphosphoryl)-2-fluoro-3-methylphenyl)-6-(methyl-d3)-6,7-dihydro-7,14-methanobenzo[f]benzo[4,5]imidazo[1,2-a][1,4]diazocin-5(14H)-one (23 mg, 40%) as a white solid. MS ESI calculated for $C_{29}H_{22}D_3F_3N_3O_3P$ $[M+H]^+$, 543.18, found 543.20. $^1H$ NMR (400 MHz, Chloroform-d) δ 8.52-8.46 (m, 1H), 7.80 (d, J=8.5 Hz, 1H), 7.75-7.69 (m, 1H), 7.56-7.47 (m, 1H), 7.47-7.38 (m, 2H), 7.41-7.33 (m, 1H), 7.33-7.27 (m, 1H), 6.81 (t, J=73.5 Hz, 1H), 6.30 (d, J=7.1 Hz, 1H), 5.03 (d, J=7.1 Hz, 1H), 3.54-3.43 (m, 1H), 2.90 (d, J=13.6 Hz, 1H), 2.67-2.62 (m, 3H), 1.88 (s, 3H), 1.84 (s, 3H). $^{19}F$ NMR (377 MHz, Chloroform-d) δ −79.92, −80.37, −81.14, −81.15, −81.59, −81.60, −119.67, −119.68, −119.69, −119.70. $^{31}P$ NMR (162 MHz, Chloroform-d) δ 34.78, 34.73.

Example 108: (7R,14R)-1-(difluoromethoxy)-11-(4-((dimethylphosphoryl)methyl)-5-fluoro-2-methylphenyl)-6-(methyl-d3)-6,7-dihydro-7,14-methanobenzo[f]benzo[4,5]imidazo[1,2-a][1,4]diazocin-5(14H)-one Synthetic Scheme

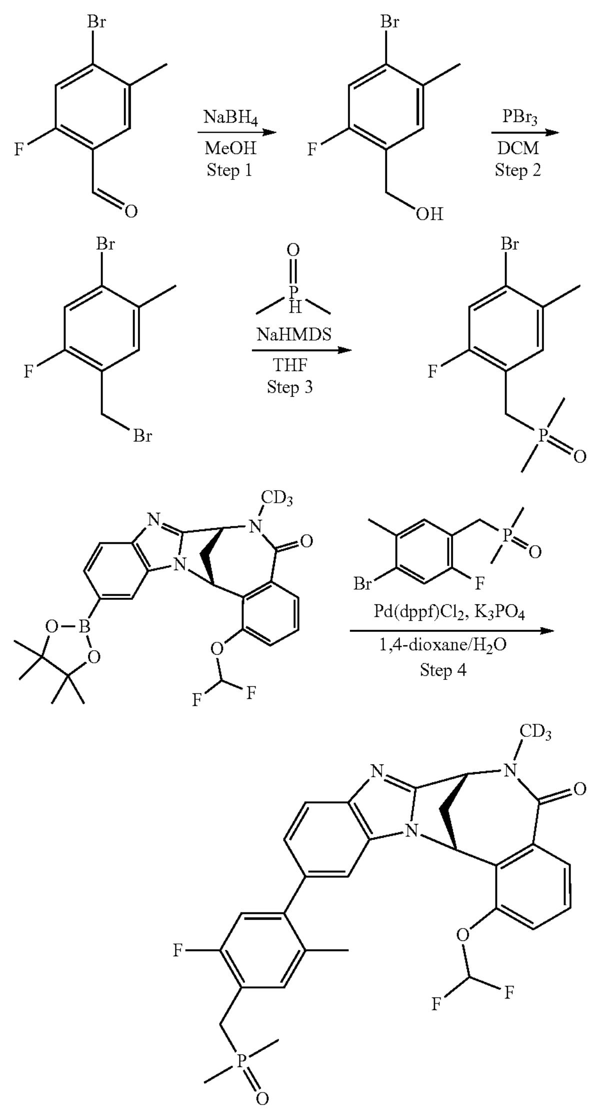

Preparation 108A: (4-bromo-2-fluoro-5-methylphenyl)methanol

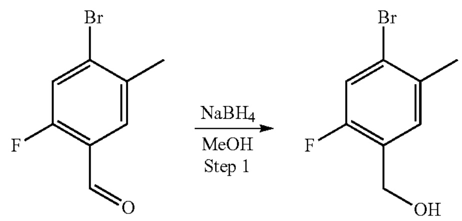

To a stirred solution of 4-bromo-2-fluoro-5-methylbenzaldehyde (2.00 g, 9.215 mmol) in MeOH (30 mL) was added $NaBH_4$ (0.38 g, 10.136 mmol) in portions at 0° C. The resulting mixture was stirred for 2 h at room temperature. The reaction was quenched with water at 0° C. The resulting mixture was concentrated under reduced pressure. The residue was purified by silica gel column chromatography, eluted with PE/EA (5:1) to afford (4-bromo-2-fluoro-5-methylphenyl)methanol (1.95 g, 96%) as colorless oil. MS ESI calculated for $C_8H_8BrFO$ $[M+H]^+$, 218.97 220.97, found N/A. $^1H$ NMR (300 MHz, Chloroform-d) δ 7.33 (s, 1H), 7.31-7.29 (m, 1H), 7.26 (s, 1H), 4.71 (s, 2H), 2.38 (s, 3H). $^{19}F$ NMR (282 MHz, Chloroform-d) δ −122.27.

Preparation 108B: 1-bromo 4-(bromomethyl)-5-fluoro-2-methylbenzene

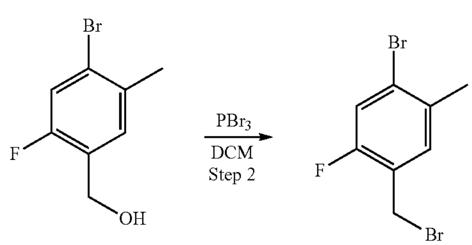

To a stirred solution of (4-bromo-2-fluoro-5-methylphenyl)methanol (1.95 g, 8.902 mmol) in DCM (40 mL) was added $PBr_3$ (1.3 mL, 13.353 mmol) dropwise at 0° C. The resulting mixture was stirred for 3 h at room temperature. The reaction was quenched by the addition of Water/Ice (30 mL) at 0° C. The aqueous layer was extracted with $CH_2Cl_2$ (2×40 mL). The resulting mixture was concentrated under reduced pressure. The residue was purified by silica gel column chromatography, eluted with PE/EA (0% to 20%) to afford 1-bromo-4-(bromomethyl)-5-fluoro-2-methylbenzene (2.40 g, 95%) as a yellow oil. MS ESI calculated for $C_8H_7Br_2F$ $[M+H]^+$, 280.89 282.89, found N/A.

Preparation 108C: (4-bromo-2-fluoro-5-methylbenzyl)dimethylphosphine Oxide

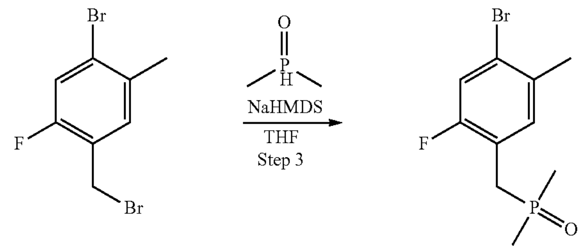

To a stirred solution of dimethylphosphine oxide (0.61 g, 7.803 mmol) in THF (35 mL) at room temperature under nitrogen atmosphere. The mixture was allowed to cool down to 0° C. To the above mixture was added NaHMDS (3.90 mL, 7.803 mmol, 2 M in THF) dropwise at 0° C. The resulting mixture was stirred for additional 30 min at room temperature. To the above mixture was added 1-bromo-4-(bromomethyl)-5-fluoro-2-methylbenzene (2.20 g, 7.803 mmol) in THF (5.0 mL) dropwise at 0° C. The resulting mixture was stirred for additional overnight at room temperature. The reaction was quenched with sat. $NH_4Cl$ (aq.) at 0° C. The aqueous layer was extracted with EtOAc (3×50 mL). The residue was purified by silica gel column chromatography, eluted with $CH_2Cl_2$/MeOH (0% to 10%) to afford (4-bromo-2-fluoro-5-methylbenzyl)dimethylphosphine oxide (380 mg, 17%) as a white solid. MS ESI calculated for $C_{10}H_{13}BrFOP$ $[M+H]^+$, 278.99 280.99, found 278.85 280.75. $^1H$ NMR (400 MHz, Chloroform-d) δ 7.30 (d, J=9.1 Hz, 1H), 7.23 (d, J=7.7 Hz, 1H), 3.15 (d, J=14.9 Hz, 2H), 2.35 (s, 3H), 1.53 (s, 3H), 1.50 (s, 3H). $^{19}F$ NMR (377 MHz, Chloroform-d) δ −119.56, −119.56. $^{31}P$ NMR (162 MHz, Chloroform-d) δ 42.28.

Example 108: (7R,14R)-1-(difluoromethoxy)-11-(4-((dimethylphosphoryl)methyl)-5-fluoro-2-methylphenyl)-6-(methyl-d3)-6,7-dihydro-7,14-methanobenzo[f]benzo[4,5]imidazo[1,2-a][1,4]diazocin-5(14H)-one

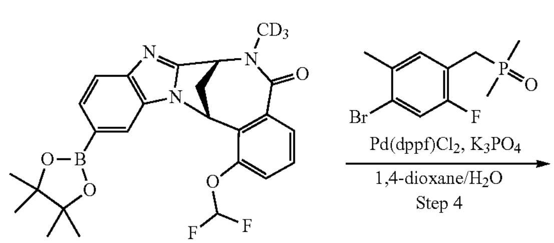

-continued

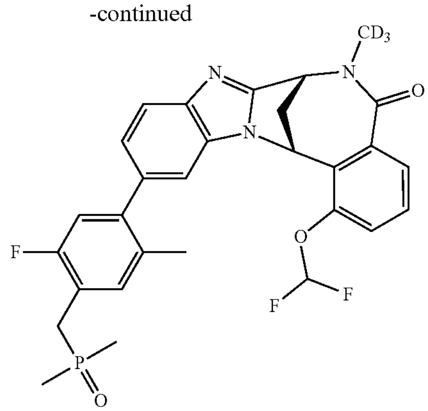

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.124 mmol) and (4-bromo-2-fluoro-5-methylbenzyl)dimethylphosphine oxide (42 mg, 0.149 mmol) in 1,4-dioxane (0.8 mL) and $H_2O$ (0.2 mL) were added $K_3PO_4$ (79 mg, 0.372 mmol) and $Pd(dppf)Cl_2$ (10 mg, 0.012 mmol) at room temperature under nitrogen atmosphere. The resulting mixture was stirred for 2 h at 80° C. under nitrogen atmosphere. The resulting mixture was concentrated under reduced pressure. The residue was purified by silica gel column chromatography, eluted with $CH_2Cl_2$/MeOH (0% to 10%) followed by Prep-HPLC with the following conditions (Column: XBridge Prep Phenyl OBD Column 19*250 mm, 5 m; Mobile Phase A: Water (10 mmol/L $NH_4HCO_3$), Mobile Phase B: ACN; Flow rate: 60 mL/min; Gradient: 20% B to 35% B in 10 min; Wave Length: 254/220 nm; RT1 (min): 12.82) to afford (7R,14R)-1-(difluoromethoxy)-11-(4-((dimethylphosphoryl)methyl)-5-fluoro-2-methylphenyl)-6-(methyl-d3)-6,7-dihydro-7,14-methanobenzo[f]benzo[4,5]imidazo[1,2-a][1,4]diazocin-5(14H)-one (19 mg, 27%) as a white solid. MS ESI calculated for $C_{29}H_{24}D_3F_3N_3O_3P$ $[M+H]^+$, 557.19, found 557.15. $^1H$ NMR (400 MHz, Chloroform-d) δ 8.54-8.46 (m, 1H), 7.74 (d, J=8.4 Hz, 1H), 7.46-7.37 (m, 2H), 7.34-7.30 (m, 1H), 7.24-7.20 (m, 1H), 7.19-7.14 (m, 1H), 6.99-6.57 (m, 2H), 6.24 (d, J=7.2 Hz, 1H), 4.97 (d, J=7.0 Hz, 1H), 3.53-3.41 (m, 1H), 3.21 (d, J=14.9 Hz, 2H), 2.88 (d, J=13.6 Hz, 1H), 2.18 (s, 3H), 1.56 (s, 3H), 1.53 (s, 3H). $^{19}F$ NMR (377 MHz, Chloroform-d) δ −80.22, −80.66, −81.00, −81.44, −122.04, −122.04. $^{31}P$ NMR (162 MHz, Chloroform-d) δ 41.20.

Example 109: (7R,14R)-1-(difluoromethoxy)-11-(4-((R or S)-1-(dimethylphosphoryl)ethyl)-3,5-difluorophenyl)-6-(methyl-d3)-6,7-dihydro-7,14-methanobenzo[f]benzo[4,5]imidazo[1,2-a][1,4]diazocin-5(14H)-one Synthetic Scheme

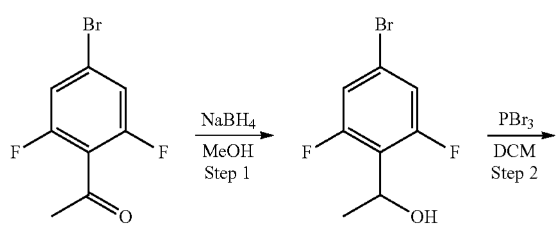

-continued

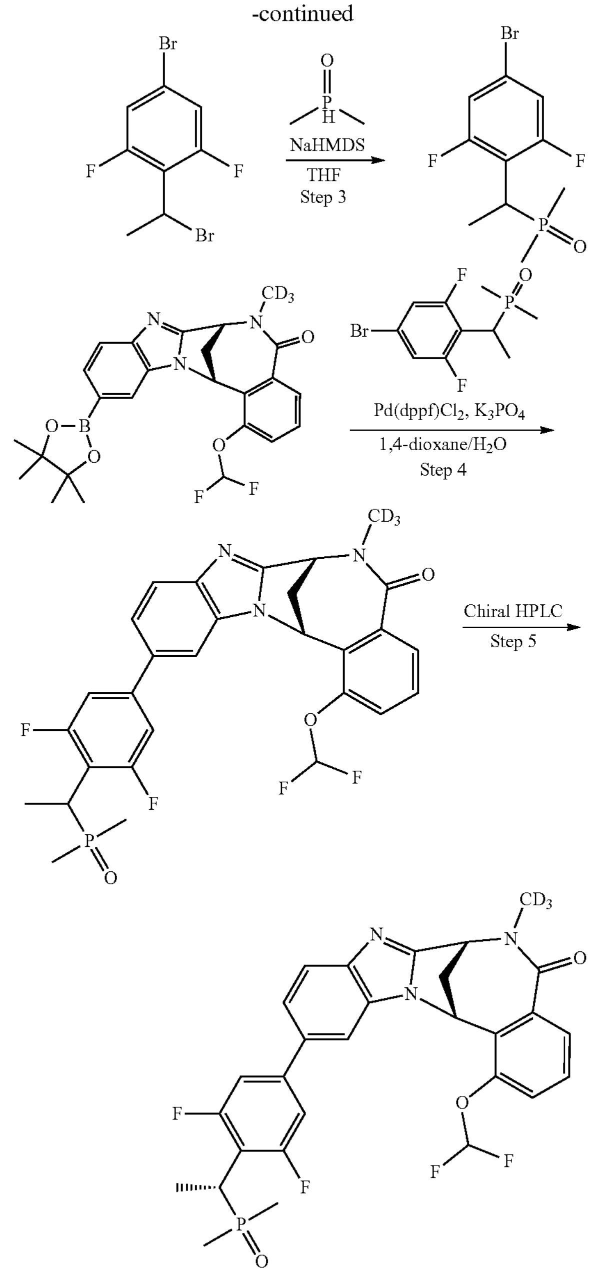

Preparation 109A: 1-(4-bromo-2,6-difluorophenyl)ethanol

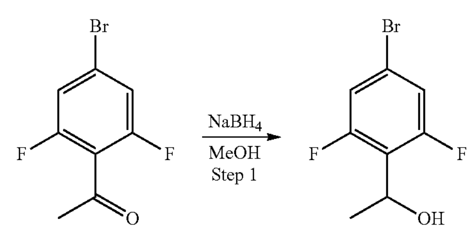

To a stirred solution of 1-(4-bromo-2,6-difluorophenyl)ethanone (2.00 g, 8.510 mmol) in MeOH (20 mL) was added $NaBH_4$ (354 mg, 9.361 mmol) in portions at 0° C. The resulting mixture was stirred for 1 h at room temperature. The reaction was quenched with Water at 0° C. The resulting mixture was extracted with $CH_2Cl_2$ (3×50 mL). The combined organic layers were washed with brine (100 mL), dried over anhydrous $Na_2SO_4$. After filtration, the filtrate was concentrated under reduced pressure. The residue was purified by silica gel column chromatography, eluted with $CH_2Cl_2$/MeOH (12/1) to afford 1-(4-bromo-2,6-difluorophenyl)ethanol (1.91 g, 94%) as a colorless liquid. MS ESI calculated for $C_8H_7BrF_2O$ $[M+H]^+$, 236.96 238.96, found N/A. $^1H$ NMR (400 MHz, Chloroform-d) δ 7.11-7.04 (m, 2H), 5.24-5.16 (m, 1H), 1.61 (d, J=6.7 Hz, 3H).

Preparation 109B: 5-bromo-2-(1-bromoethyl)-1,3-difluorobenzene

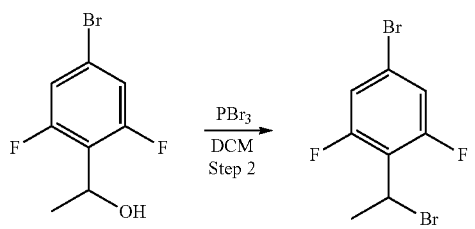

To a stirred solution of 1-(4-bromo-2,6-difluorophenyl) ethanol (1.00 g, 4.219 mmol) in DCM (10 mL) was added $PBr_3$ (1.71 g, 6.329 mmol) dropwise at 0° C. The resulting mixture was stirred for 3 h at room temperature. The resulting mixture was concentrated under reduced pressure. The residue was purified by silica gel column chromatography, eluted with PE/EA (10/1) to afford 5-bromo-2-(1-bromoethyl)-1,3-difluorobenzene (960 mg, 75%) as a colorless oil. MS ESI calculated for $C_8H_6Br_2F_2$ $[M+H]^+$, 298.88 300.88 302.88, found N/A. $^1H$ NMR (400 MHz, Chloroform-d) δ 7.09 (d, J=8.7 Hz, 2H), 5.47-5.38 (m, 1H), 2.08 (d, J=7.1 Hz, 3H). $^{19}F$ NMR (377 MHz, Chloroform-d) δ −110.32.

Preparation 109C: 5-bromo-2-[1-(dimethylphosphoryl)ethyl]-1,3-difluorobenzene

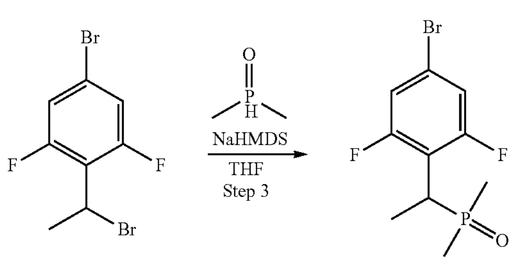

To a stirred solution of (methylphosphonoyl)methane (100 mg, 1.284 mmol) in THF (5 mL, 61.714 mmol) was added 2M NaHDMS (0.64 mL, 1.284 mmol) dropwise at 0° C. under nitrogen atmosphere. The resulting mixture was stirred for 30 min at 0° C. under nitrogen atmosphere. To the above mixture was added 5-bromo-2-(1-bromoethyl)-1,3-difluorobenzene (350 mg, 1.167 mmol) at 0° C. The resulting mixture was stirred for additional 16 h at room temperature. The reaction was quenched with sat. $NH_4Cl$ (aq.)

at 0° C. The resulting mixture was extracted with EtOAc (3×50 mL). The combined organic layers were washed with brine (100 mL), dried over anhydrous $Na_2SO_4$. After filtration, the filtrate was concentrated under reduced pressure. The residue was purified by silica gel column chromatography, eluted with $CH_2Cl_2$/MeOH (10:1) to afford 5-bromo-2-[1-(dimethylphosphoryl)ethyl]-1,3-difluorobenzene (130 mg, 37%) as a colorless oil. MS ESI calculated for $C_{10}H_{12}BrF_2OP$ $[M+H]^+$, 296.98 298.98, found 296.90 298.90.

Preparation 109D: (7R,14R)-1-(difluoromethoxy)-11-(4-(1-(dimethylphosphoryl)ethyl)-3,5-difluorophenyl)-6-(methyl-d3)-6,7-dihydro-7,14-methanobenzo[f]benzo[4,5]imidazo[1,2-a][1,4]diazocin-5(14H)-one

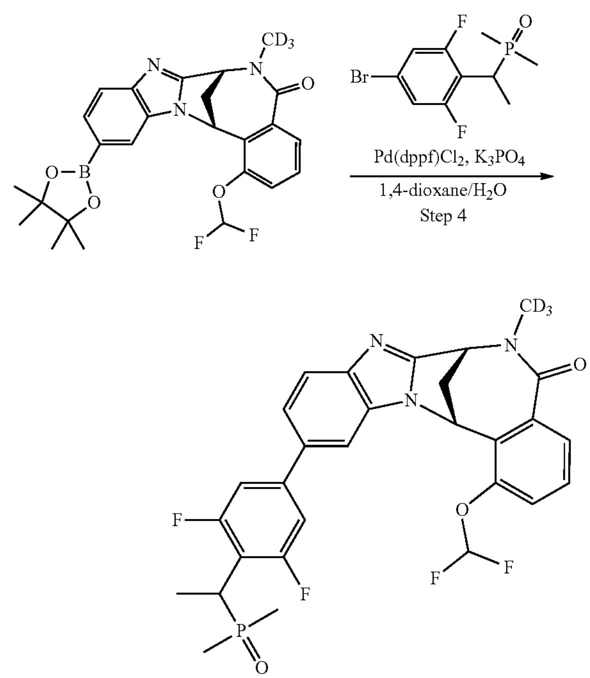

To a stirred solution of 5-bromo-2-[1-(dimethylphosphoryl)ethyl]-1,3-difluorobenzene (92 mg, 0.309 mmol) and (7R,14R)-1-(fluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (100 mg, 0.206 mmol) in 1,4-dioxane (2 mL) and $H_2O$ (0.4 mL) were added $Pd(dppf)Cl_2 \cdot CH_2Cl_2$ (17 mg, 0.021 mmol) and $K_3PO_4$ (131 mg, 0.618 mmol) at room temperature under nitrogen atmosphere. The resulting mixture was stirred for 2 h at 80° C. under nitrogen atmosphere. The resulting mixture was concentrated under reduced pressure. The residue was purified by silica gel column chromatography, eluted with $CH_2Cl_2$/MeOH (10/1) to afford (7R,14R)-1-(difluoromethoxy)-11-(4-(1-(dimethylphosphoryl)ethyl)-3,5-difluorophenyl)-6-(methyl-d3)-6,7-dihydro-7,14-methanobenzo[f]benzo[4,5]imidazo[1,2-a][1,4]diazocin-5(14H)-one (70 mg, 59%) as a white solid. MS ESI calculated for $C_{29}H_{23}D_3F_4N_3O_3P$ $[M+H]^+$, 575.18, found 575.30.

Example 109: (7R,14R)-1-(difluoromethoxy)-11-(4-((R or S)-1-(dimethylphosphoryl)ethyl)-3,5-difluorophenyl)-6-(methyl-d3)-6,7-dihydro-7,14-methanobenzo[f]benzo[4,5]imidazo[1,2-a][1,4]diazocin-5(14H)-one

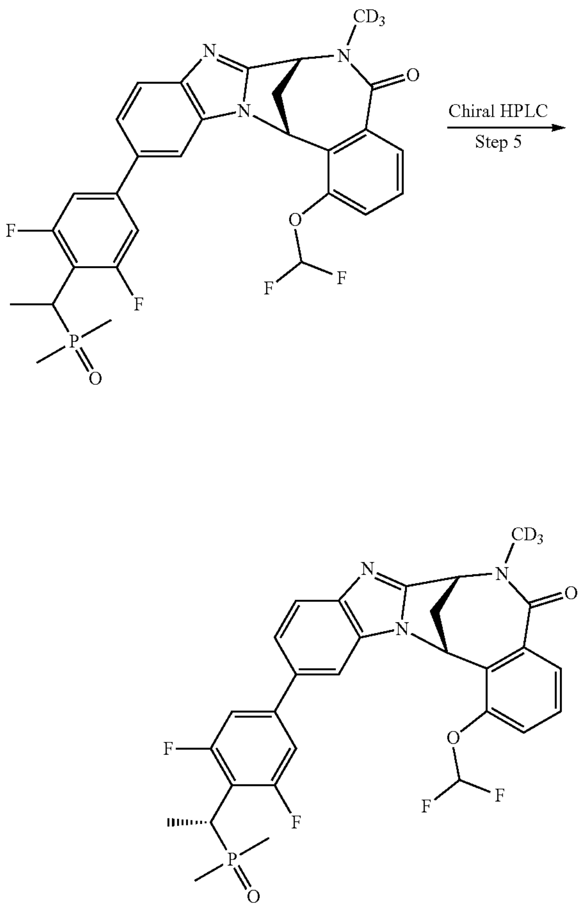 [SMILES: [2H]C([2H])([2H])N1C(=O)c2cccc(OC(F)F)c2[C@H]2C[C@@H]1c1nc3ccc(-c4cc(F)c(C(C)P(C)(C)=O)c(F)c4)cc3n12 ; [2H]C([2H])([2H])N1C(=O)c2cccc(OC(F)F)c2[C@H]2C[C@@H]1c1nc3ccc(-c4cc(F)c([C@@H](C)P(C)(C)=O)c(F)c4)cc3n12]

(7R,14R)-1-(difluoromethoxy)-11-(4-(1-(dimethylphosphoryl)ethyl)-3,5-difluorophenyl)-6-(methyl-d3)-6,7-dihydro-7,14-methanobenzo[f]benzo[4,5]imidazo[1,2-a][1,4]diazocin-5(14H)-one (70 mg) was resolved by Chiral-HPLC with the following conditions (Column: JW-CHIRAL ART Cellulose-SZ, 3.0*50 mm, 3 um; Mobile Phase A: Hex (0.1% 2M $NH_3$-MeOH), Mobile Phase B: EtOH; Flow rate: 40 mL/min; Gradient: isocratic 30; Wave Length: 202/306 nm; RT1 (min): 14; RT2 (min): 6.5). The first peak afforded 24 mg (32%) as a white solid. MS ESI calculated for $C_{29}H_{23}D_3F_4N_3O_3P$ $[M+H]^+$, 575.18, found 575.15. $^1H$ NMR (400 MHz, Chloroform-d) δ 8.50 (d, J=8.2 Hz, 1H), 7.82 (d, J=8.4 Hz, 1H), 7.71 (s, 1H), 7.55-7.41 (m, 2H), 7.34 (d, J=8.0 Hz, 1H), 7.16 (d, J=10.8 Hz, 2H), 6.89 (t, J=71.9 Hz, 1H), 6.35 (s, 1H), 5.22-5.05 (m, 1H), 3.72-3.60 (m, 1H), 3.61-3.45 (m, 1H), 2.99-2.87 (m, 1H), 1.80-1.66 (m, 3H), 1.59-1.45 (m, 6H). $^{19}F$ NMR (377 MHz, Chloroform-d) δ −80.48, −80.93, −80.94, −81.39, −109.45. $^{31}P$ NMR (162 MHz, Chloroform-d) δ 46.72.

Example 110 and 111: (7R,14R)-1-(difluoromethoxy)-11-(4-((S or R)-1-(dimethylphosphoryl)-1-hydroxyethyl)phenyl)-6-(methyl-d3)-6,7-dihydro-7,14-methanobenzo[f]benzo[4,5]imidazo[1,2-a][1,4]diazocin-5(14H)-one and (7R,14R)-1-(difluoromethoxy)-11-(4-((R or S)-1-(dimethylphosphoryl)-1-hydroxyethyl)phenyl)-6-(methyl-d3)-6,7-dihydro-7,14-methanobenzo[f]benzo[4,5]imidazo[1,2-a][1,4]diazocin-5(14H)-one Synthetic Scheme

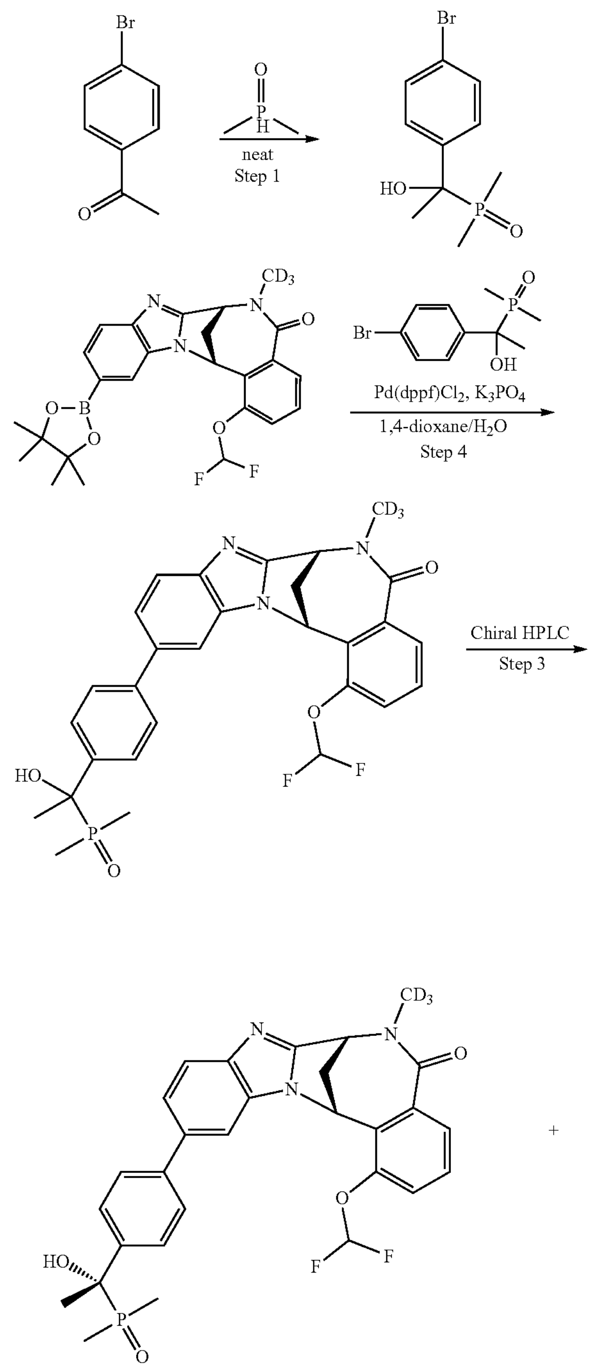

-continued

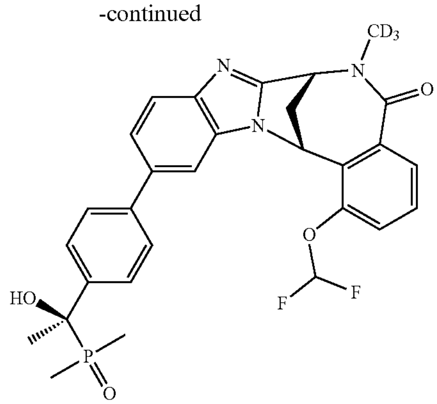

-continued

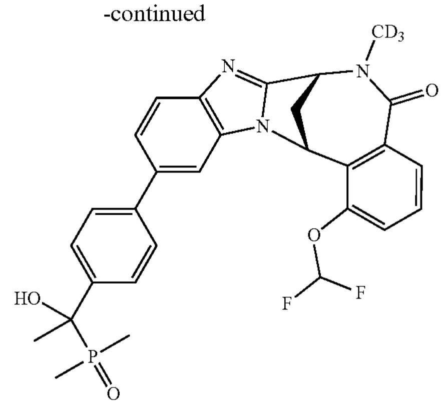

Preparation 110A: (1-(4-bromophenyl)-1-hydroxyethyl)dimethylphosphine Oxide

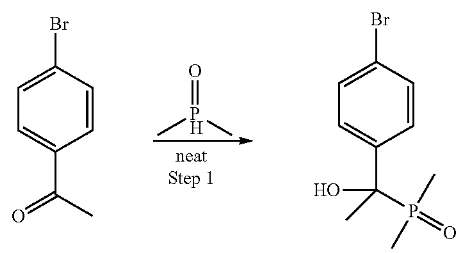

Into a 8-mL vial were added 1-(4-bromophenyl)ethan-1-one (200 mg, 1.005 mmol) and dimethylphosphine oxide (227 mg, 2.914 mmol) at room temperature. The resulting mixture was stirred for 5 h at 80° C. The mixture was allowed to cool down to room temperature. The resulting mixture was purified by trituration with EtOAc (10 mL). This result in (1-(4-bromophenyl)-1-hydroxyethyl)dimethylphosphine oxide (110 mg, 39%) as a white solid. MS ESI calculated for $C_{10}H_{14}BrO_2P$ $[M+H]^+$, 276.99 278.99, found 277.05 279.05. $^1H$ NMR (400 MHz, Chloroform-d) δ 7.54-7.49 (m, 2H), 7.42 (d, J=8.2 Hz, 2H), 1.87 (d, J=12.5 Hz, 3H), 1.47 (d, J=12.2 Hz, 3H), 1.35 (d, J=12.2 Hz, 3H). $^{31}P$ NMR (162 MHz, Chloroform-d) δ 53.72.

Preparation 110B: (7R,14R)-1-(difluoromethoxy)-11-(4-(1-(dimethylphosphoryl)-1-hydroxyethyl)phenyl)-6-(methyl-d3)-6,7-dihydro-7,14-methanobenzo[f]benzo[4,5]imidazo[1,2-a][1,4]diazocin-5(14H)-one

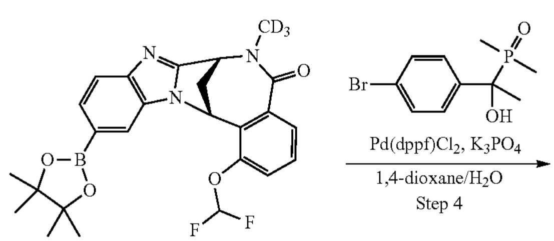

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (80 mg, 0.165 mmol) and (1-(4-bromophenyl)-1-hydroxyethyl)dimethylphosphine oxide (60 mg, 0.215 mmol) in 1,4-dioxane (0.8 mL) and $H_2O$ (0.2 mL) were added $K_3PO_4$ (105 mg, 0.495 mmol) and $Pd(dppf)Cl_2$ (13 mg, 0.017 mmol) at room temperature under nitrogen atmosphere. The resulting mixture was stirred for 2 h at 80° C. under nitrogen atmosphere. The resulting mixture was concentrated under reduced pressure. The residue was purified by silica gel column chromatography, eluted with $CH_2Cl_2$/MeOH (0% to 10%) followed by reversed-phase flash chromatography with the following conditions: column, C18 silica gel; mobile phase, $CH_3CN$ in Water (10 mmol/L $NH_4HCO_3$), 20% to 60% gradient in 20 min; detector, 254/220 nm to afford (7R,14R)-1-(difluoromethoxy)-11-(4-(1-(dimethylphosphoryl)-1-hydroxyethyl)phenyl)-6-(methyl-d3)-6,7-dihydro-7,14-methanobenzo[f]benzo[4,5]imidazo[1,2-a][1,4]diazocin-5(14H)-one (45 mg, 49%) as a white solid. MS ESI calculated for $C_{29}H_{25}D_3F_2N_3O_4P$ $[M+H]^+$, 555.20, found 555.05.

Example 110 and 111: (7R,14R)-1-(difluoromethoxy)-1-(4-((S or R)-1-(dimethylphosphoryl)-1-hydroxyethyl)phenyl)-6-(methyl-d3)-6,7-dihydro-7,14-methanobenzo[f]benzo[4,5]imidazo[1,2-a][1,4]diazocin-5(14H)-one and (7R,14R)-1-(difluoromethoxy)-11-(4-((R or S)-1-(dimethylphosphoryl)-1-hydroxyethyl)phenyl)-6-(methyl-d3)-6,7-dihydro-7,14-methanobenzo[f]benzo[4,5]imidazo[1,2-a][1,4]diazocin-5(14H)-one

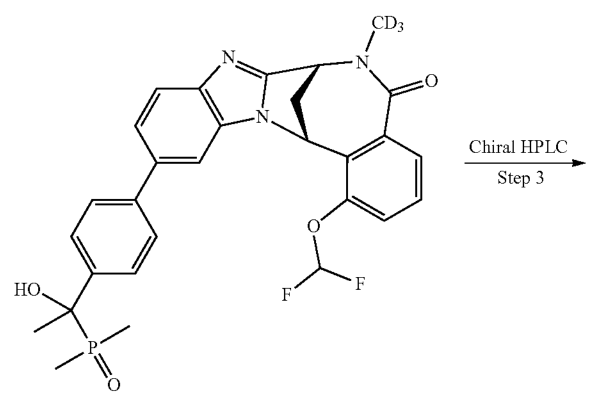

-continued

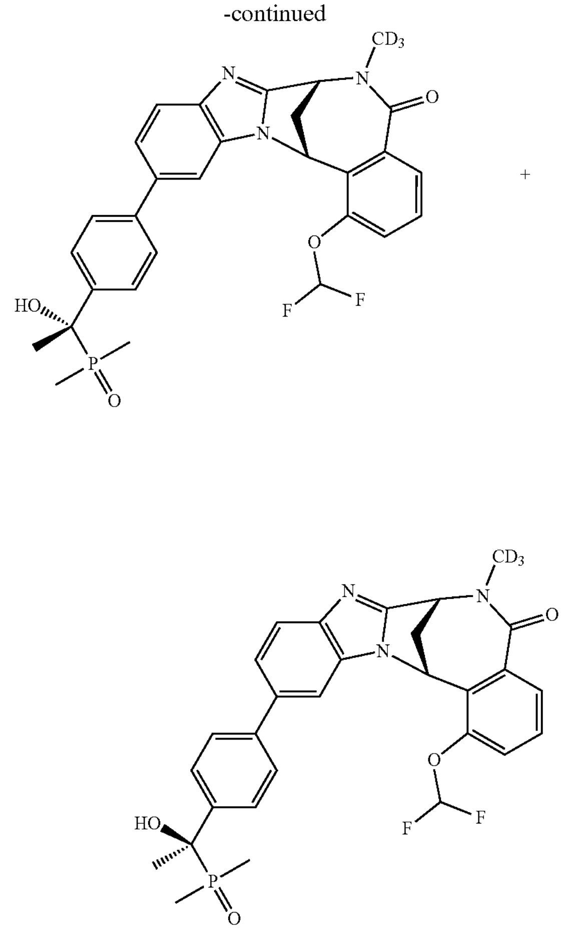

(7R,14R)-1-(difluoromethoxy)-11-(4-(1-(dimethylphosphoryl)-1-hydroxyethyl)phenyl)-6-(methyl-d3)-6,7-dihydro-7,14-methanobenzo[f]benzo[4,5]imidazo[1,2-a][1,4]diazocin-5(14H)-one (45 mg) was separated by Chiral Prep-HPLC with the following conditions (Column: Lux 5 um Cellulose-2 3*15 cm, 5 μm; Mobile Phase A: Hex (10 mM $NH_3$-MeOH), Mobile Phase B: EtOH; Flow rate: 40 mL/min; Gradient: isocratic 50; Wave Length: 208/236 nm; RT1 (min): 11.73; RT2 (min): 13.41). The first peak afforded 14 mg (30%) as a white solid. MS ESI calculated for $C_{29}H_{25}D_3F_2N_3O_4P$ $[M+H]^+$, 555.20, found 555.30. $^1H$ NMR (400 MHz, Methanol-$d_4$) δ 8.41-8.28 (m, 1H), 7.85-7.74 (m, 1H), 7.71-7.59 (m, 5H), 7.58-7.05 (m, 4H), 6.44-6.33 (m, 1H), 5.21-5.10 (m, 1H), 3.64-3.44 (m, 1H), 2.93-2.77 (m, 1H), 1.89-1.79 (m, 3H), 1.66-1.55 (m, 3H), 1.32-1.18 (m, 3H). $^{19}F$ NMR (376 MHz, Methanol-$d_4$) δ −82.85, −82.91, −83.30, −83.36, −83.57, −83.64, −84.02, −84.10. $^{31}P$ NMR (162 MHz, Methanol-$d_4$) δ 57.32. The last peak afforded 13 mg (29%) as a white solid. MS ESI calculated for $C_{29}H_{25}D_3F_2N_3O_4P$ $[M+H]^+$, 555.20, found 555.40. $^1H$ NMR (400 MHz, Methanol-$d_4$) δ 8.40-8.29 (m, 1H), 7.83-7.75 (m, 1H), 7.72-7.59 (m, 5H), 7.57-7.06 (m, 4H), 6.48-6.32 (m, 1H), 5.24-5.08 (m, 1H), 3.62-3.47 (m, 1H), 2.94-2.77 (m, 1H), 1.93-1.79 (m, 3H), 1.69-1.56 (m, 3H), 1.34-1.16 (m, 3H). $^{19}F$ NMR (376 MHz, Methanol-$d_4$) δ −82.78, −82.85, −83.23, −83.30, −83.64, −83.71, −84.09, −84.16. $^{31}P$ NMR (162 MHz, Methanol-$d_4$) δ 57.31.

Example 112: (7R,14R)-1-(difluoromethoxy)-11-(4-((S or R)-1-(dimethylphosphoryl)ethyl)-3,5-difluorophenyl)-6-(methyl-d3)-6,7-dihydro-7,14-methanobenzo[f]benzo[4,5]imidazo[1,2-a][1,4]diazocin-5(14H)-one

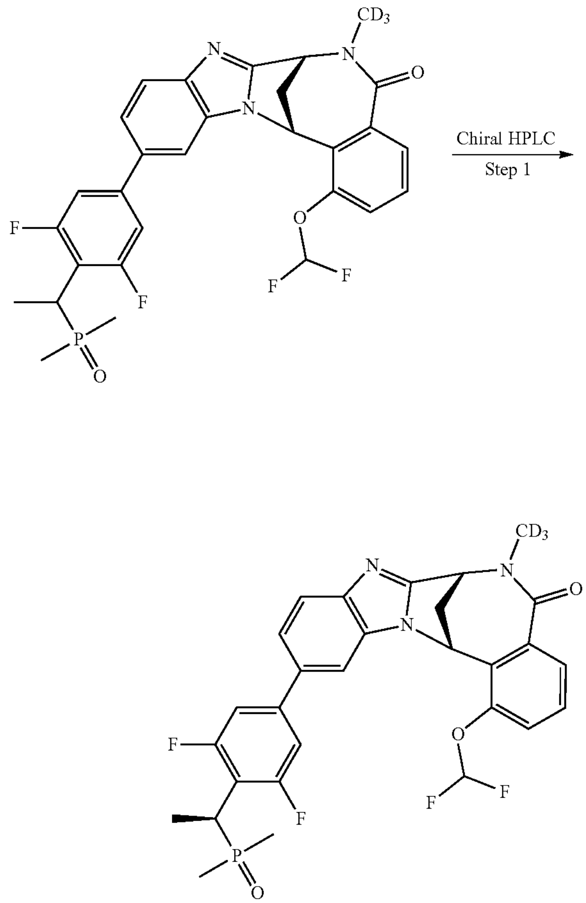

(7R,14R)-1-(difluoromethoxy)-11-(4-(1-(dimethylphosphoryl)ethyl)-3,5-difluorophenyl)-6-(methyl-d3)-6,7-dihydro-7,14-methanobenzo[f]benzo[4,5]imidazo[1,2-a][1,4]diazocin-5(14H)-one (70 mg) was resolved by Chiral-HPLC with the following conditions (Column: JW-CHIRAL ART Cellulose-SZ, 3.0*50 mm; 3 um; Mobile Phase A: Hex (0.1% 2M $NH_3$-MeOH), Mobile Phase B: EtOH; Flow rate: 40 mL/min; Gradient: isocratic 30; Wave Length: 202/306 nm; RT1 (min): 14; RT2 (min): 6.5). The second peak afforded 17 mg (25%) as a white solid. MS ESI calculated for $C_{29}H_{23}D_3F_4N_3O_3P$ [M+H]+, 575.18, found 575.15. $^1H$ NMR (400 MHz, Chloroform-d) δ 8.50 (d, J=8.1 Hz, 1H), 7.79 (d, J=8.5 Hz, 1H), 7.68 (s, 1H), 7.44 (t, J=8.3 Hz, 2H), 7.33 (d, J=8.0 Hz, 1H), 7.16 (d, J=10.6 Hz, 2H), 6.89 (t, J=72.8 Hz, 1H), 6.31 (d, J=6.4 Hz, 1H), 5.08-4.97 (m, 1H), 3.74-3.59 (m, 1H), 3.55-3.42 (m, 1H), 2.91 (d, J=13.4 Hz, 1H), 1.76-1.71 (m, 3H), 1.53 (d, J=4.5 Hz, 3H), 1.50 (d, J=4.5 Hz, 3H). $^{19}F$ NMR (377 MHz, Chloroform-d) δ −80.88, −110.27. $^{31}P$ NMR (162 MHz, Chloroform-d) δ 46.97.

Example 113 and 114: (7R,14R)-1-(difluoromethoxy)-11-(4-((R or S)-1-(dimethylphosphoryl)ethyl)-3-fluoro-2-methylphenyl)-6-(methyl-d3)-6,7-dihydro-7,14-methanobenzo[f]benzo[4,5]imidazo[1,2-a][1,4]diazocin-5(14H)-one and (7R,14R)-1-(difluoromethoxy)-11-(4-((S or R)-1-(dimethylphosphoryl)ethyl)-3-fluoro-2-methylphenyl)-6-(methyl-d3)-6,7-dihydro-7,14-methanobenzo[f]benzo[4,5]imidazo[1,2-a][1,4]diazocin-5(14H)-one Synthetic Scheme

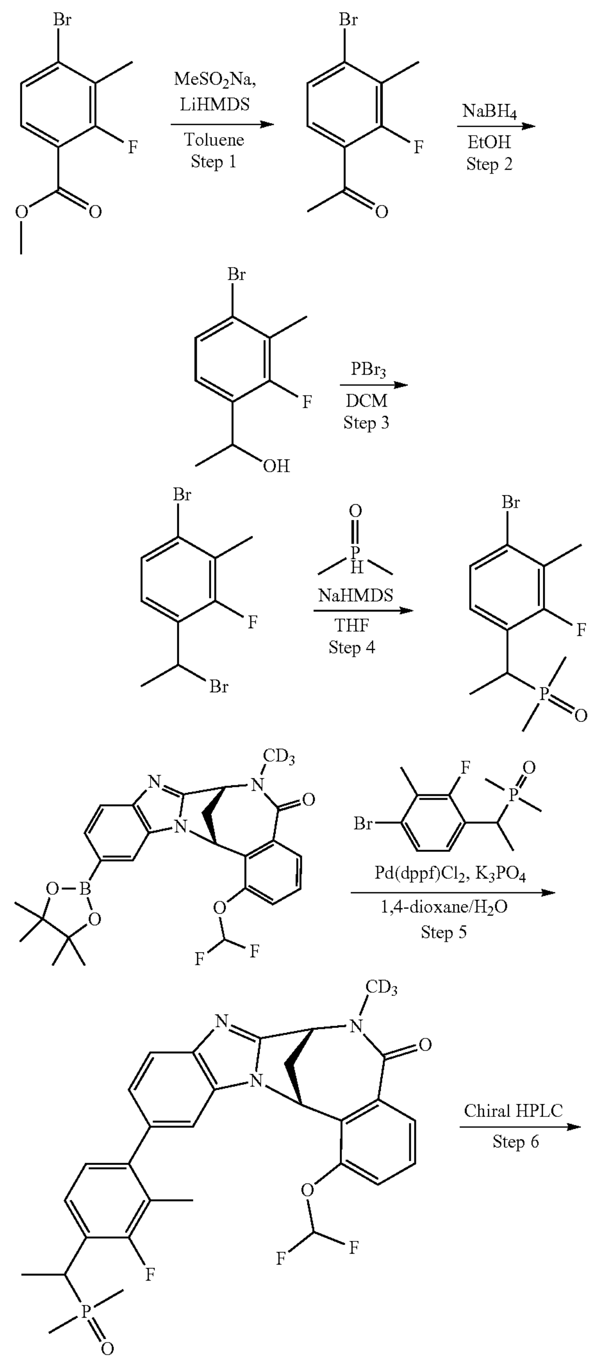

-continued

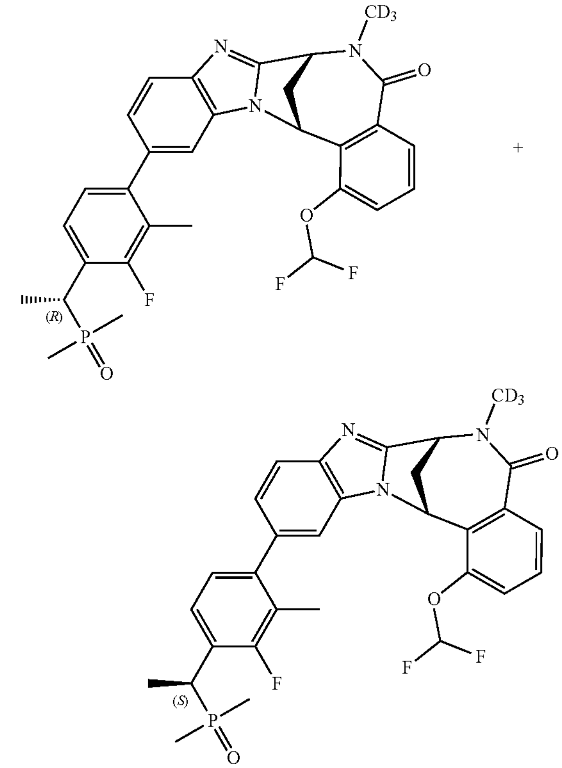

Preparation 113A: 1-(4-bromo-2-fluoro-3-methylphenyl)ethanone

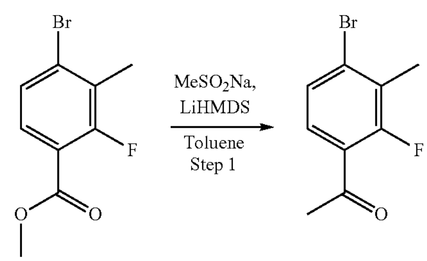

To a stirred mixture of methyl 4-bromo-2-fluoro-3-methylbenzoate (2.00 g, 8.095 mmol) and sodium methanesulfinate (2.48 g, 24.285 mmol) in Toluene (20 mL) was added sodium LIHMDS (24.3 mL, 24.285 mmol, 1M in THF) at room temperature under nitrogen atmosphere. The resulting mixture was stirred for 2 h at 75° C. under nitrogen atmosphere. The reaction was quenched with Water at room temperature. The aqueous layer was extracted with $CH_2Cl_2$ (3×50 mL). The resulting mixture was concentrated under vacuum. The residue was purified by silica gel column chromatography, eluted with PE/EA (20:1) to afford 1-(4-bromo-2-fluoro-3-methylphenyl)ethanone (650 mg, 35%) as a colorless oil. MS ESI calculated for $C_9H_8BrFO$ $[M+H]^+$, 230.97 232.97, found N/A. $^1H$ NMR (300 MHz, Chloroform-d) δ 7.63-7.56 (m, 1H), 7.47-7.42 (m, 1H), 2.79-2.55 (m, 3H), 2.53-2.35 (m, 3H). $^{19}F$ NMR (282 MHz, Chloroform-d) δ −107.77.

Preparation 113B: 1-(4-bromo-2-fluoro-3-methylphenyl)ethanol

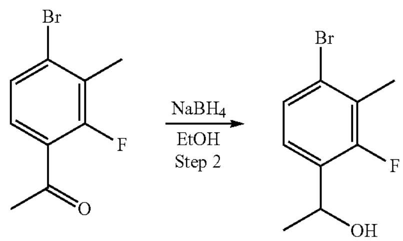

A mixture of 1-(4-bromo-2-fluoro-3-methylphenyl)ethanone (600 mg, 2.597 mmol) and $NaBH_4$ (196 mg, 5.194 mmol) in EtOH (6 mL) was stirred for 2 h at 0° C. under nitrogen atmosphere. The reaction was quenched with sat. $NH_4Cl$ (aq.) at 0° C. The aqueous layer was extracted with $CH_2Cl_2$ (3×50 mL). The resulting mixture was concentrated under vacuum. The residue was purified by silica gel column chromatography, eluted with PE/EA (10:1) to afford 1-(4-bromo-2-fluoro-3-methylphenyl)ethanol (380 mg, 62%) as a colorless oil. MS ESI calculated for $C_9H_{10}BrFO$ $[M+H]^+$, 232.99 234.99, found N/A. $^1H$ NMR (400 MHz, Chloroform-d) δ 7.36-7.32 (m, 1H), 7.23-7.18 (m, 1H), 5.14 (q, J=6.5 Hz, 1H), 2.34-2.32 (m, 3H), 1.51-1.47 (m, 3H).

Preparation 113C: 1-bromo-4-(1-bromoethyl)-3-fluoro-2-methylbenzene

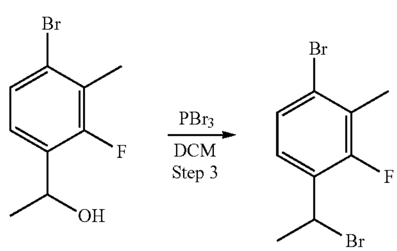

To a stirred solution of 1-(4-bromo-2-fluoro-3-methylphenyl)ethanol (380 mg, 1.630 mmol) in DCM (7 mL) was added $PBr_3$ (529 mg, 1.956 mmol) at 0° C. under nitrogen atmosphere. The mixture was stirred for 2 h at room temperature. The reaction was quenched with water at 0° C. The aqueous layer was extracted with $CH_2Cl_2$ (3×50 mL). The resulting mixture was concentrated under vacuum. The residue was purified by silica gel column chromatography, eluted with PE to afford 1-bromo-4-(1-bromoethyl)-3-fluoro-2-methylbenzene (270 mg, 56%) as a colorless oil. MS ESI calculated for $C_9H_9Br_2F$ [M+H]+, 294.91 296.91 298.91, found N/A. $^1H$ NMR (400 MHz, Chloroform-d) δ 7.37-7.33 (m, 1H), 7.25-7.20 (m, 1H), 5.43 (q, J=7.0 Hz, 1H), 2.34 (d, J=2.6 Hz, 3H), 2.02 (d, J=7.0 Hz, 3H).

Preparation 113D: 1-bromo-4-[1-(dimethylphosphoryl)ethyl]-3-fluoro-2-methylbenzene

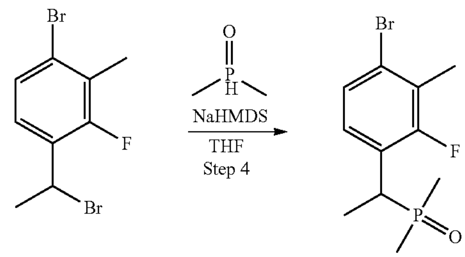

To a stirred solution of (methylphosphonoyl)methane (82 mg, 1.054 mmol) in THF (5 mL) was added 1M NaHMDS (1.0 mL, 0.966 mmol) at 0° C. under nitrogen atmosphere. The mixture was stirred for 15 min at 0° C. To the above mixture was added 1-bromo-4-(1-bromoethyl)-3-fluoro-2-methylbenzene (260 mg, 0.878 mmol) at 0° C. The resulting mixture was stirred for additional 16 h at 20° C. under nitrogen atmosphere. The reaction was quenched with water at room temperature. The residue was purified by silica gel column chromatography, eluted with $CH_2Cl_2$/MeOH (10:1) to afford 1-bromo-4-[1-(dimethylphosphoryl)ethyl]-3-fluoro-2-methylbenzene (60 mg, 23%) as a yellow oil. MS ESI calculated for $C_{11}H_{15}BrFOP$ $[M+H]^+$, 293.00 295.00, found 293.15 295.10. $^1H$ NMR (400 MHz, Chloroform-d) δ 7.84-7.74 (m, 1H), 6.66-6.59 (m, 1H), 3.11-3.05 (m, 1H), 1.66-1.64 (m, 3H), 1.64-1.62 (m, 3H), 1.61 (s, 3H), 1.60 (s, 3H). $^{19}F$ NMR (376 MHz, Chloroform-d) δ −115.42. $^{31}P$ NMR (162 MHz, Chloroform-d) δ 47.83.

Preparation 113E: (7R,14R)-1-(difluoromethoxy)-11-(4-(1-(dimethylphosphoryl)ethyl)-3-fluoro-2-methylphenyl)-6-(methyl-d3)-6,7-dihydro-7,14-methanobenzo[f]benzo[4,5]imidazo[1,2-a][1,4]diazocin-5(14H)-one

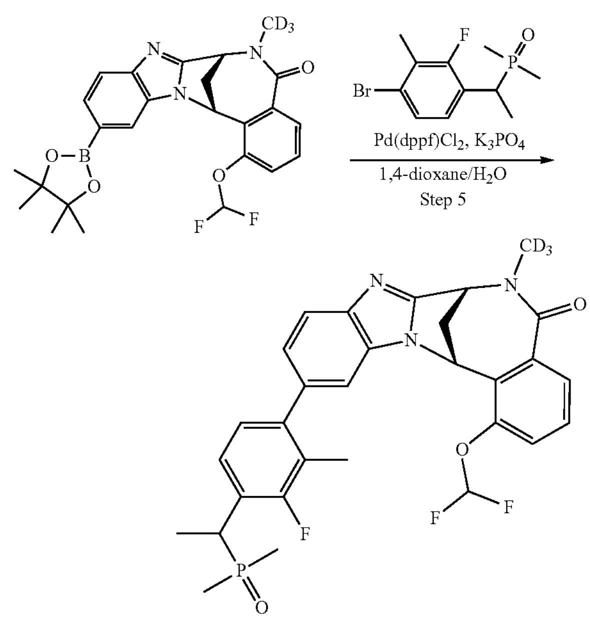

To a stirred mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (80 mg, 0.165 mmol) and 1-bromo-4-[1-(dimethylphosphoryl)ethyl]-3-fluoro-2-methylbenzene (62 mg, 0.215 mmol) in 1,4-dioxane (1.5 mL) and $H_2O$ (0.3 mL) were added $K_3PO_4$ (105 mg, 0.495 mmol) and $Pd(dppf)Cl_2$ (13 mg, 0.017 mmol) at room temperature. The resulting mixture was stirred for 2 h at 80° C. under nitrogen atmosphere. The resulting mixture was concentrated under reduced pressure. The residue was purified by silica gel column chromatography, eluted with $CH_2Cl_2$/MeOH (10:1) followed by reversed-phase flash chromatography with the following conditions: column, C18 silica gel; mobile phase, $CH_3CN$ in water (10 mmol/L $NH_4HCO_3$), 30% to 60% gradient in 25 min; detector, 254 nm. This resulted in (7R,14R)-1-(difluoromethoxy)-11-(4-(1-(dimethylphosphoryl)ethyl)-3-fluoro-2-methylphenyl)-6-(methyl-d3)-6,7-dihydro-7,14-methanobenzo[f]benzo[4,5]imidazo[1,2-a][1,4]diazocin-5(14H)-one (60 mg, 63%) as a white solid. MS ESI calculated for $C_{30}H_{26}D_3F_3N_3O_3P$ [M+H]$^+$, 571.21, found 571.30.

Example 113 and 114: (7R,14R)-1-(difluoromethoxy)-11-(4-((R or S)-1-(dimethylphosphoryl)ethyl)-3-fluoro-2-methylphenyl)-6-(methyl-d3)-6,7-dihydro-7,14-methanobenzo[f]benzo[4,5]imidazo[1,2-a][1,4]diazocin-5(14H)-one and (7R,14R)-1-(difluoromethoxy)-11-(4-((S or R)-1-(dimethylphosphoryl)ethyl)-3-fluoro-2-methylphenyl)-6-(methyl-d3)-6,7-dihydro-7,14-methanobenzo[f]benzo[4,5]imidazo[1,2-a][1,4]diazocin-5(14H)-one

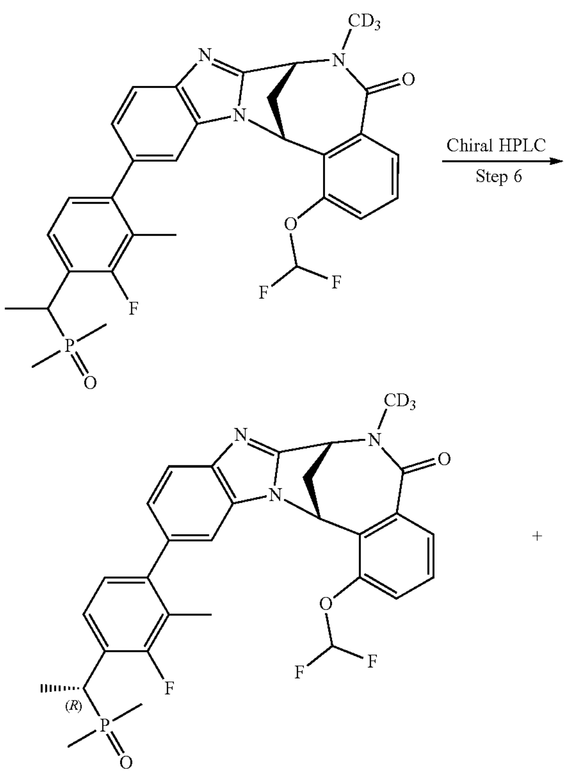

-continued

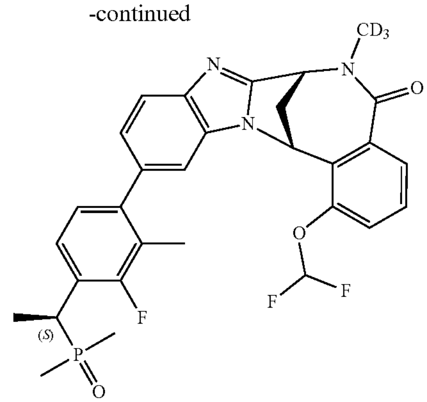

(7R,14R)-1-(difluoromethoxy)-11-(4-(1-(dimethylphosphoryl)ethyl)-3-fluoro-2-methylphenyl)-6-(methyl-d3)-6,7-dihydro-7,14-methanobenzo[f]benzo[4,5]imidazo[1,2-a][1,4]diazocin-5(14H)-one (60 mg) was resolved by Chiral HPLC with the following conditions: Column: CHIRALPAK IE-3, 3.0*50 mm, 3 μm; Mobile Phase A: Hex (10 mM $NH_3$-MeOH), Mobile Phase B: EtOH; Flow rate: 40 mL/min; Gradient: isocratic 50; Wave Length: 206/268 nm; RT1 (min): 16.34; RT2 (min): 23.43. The first peak afforded 18 mg (19%) as a white solid. MS ESI calculated for $C_{30}H_{26}D_3F_3N_3O_3P$ [M+H]$^+$, 571.21, found 571.25. $^1H$ NMR (400 MHz, DMSO-$d_6$) δ 8.35-8.20 (m, 1H), 7.74-7.30 (m, 6H), 7.25-7.17 (m, 1H), 7.13-7.02 (m, 1H), 6.25 (d, J=7.0 Hz, 1H), 5.24 (d, J=7.0 Hz, 1H), 3.58-3.45 (m, 2H), 2.82 (d, J=13.8 Hz, 1H), 2.12 (s, 3H), 1.59-1.40 (m, 6H), 1.32-1.22 (m, 3H). $^{19}F$ NMR (376 MHz, DMSO-$d_6$) δ −81.60, −82.05, −82.10, −82.55, −118.70. $^{31}P$ NMR (162 MHz, DMSO-$d_6$) δ 43.90.

The second peak afforded 16 mg (17%) as a white solid. MS ESI calculated for $C_{30}H_{26}D_3F_3N_3O_3P$ [M+H]$^+$, 571.21, found 571.30. $^1H$ NMR (400 MHz, DMSO-$d_6$) δ 8.37-8.24 (m, 1H), 7.76-7.67 (m, 1H), 7.60-7.29 (m, 5H), 7.26-7.18 (m, 1H), 7.14-7.04 (m, 1H), 6.26 (d, J=7.1 Hz, 1H), 5.25 (d, J=7.1 Hz, 1H), 3.56-3.51 (m, 2H), 2.83 (d, J=13.7 Hz, 1H), 2.13 (s, 3H), 1.58-1.41 (m, 6H), 1.33-1.20 (m, 3H). $^{19}F$ NMR (376 MHz, DMSO-$d_6$) δ −81.59, −82.04, −82.07, −82.52, −118.72, −118.74. $^{31}P$ NMR (162 MHz, DMSO-$d_6$¶) δ 43.99.

Example 115: (7R,14R)-1-(difluoromethoxy)-11-(5-(dimethylphosphoryl)-6-fluoropyridin-2-yl)-6-(methyl-d3)-6,7-dihydro-7,14-methanobenzo[f]benzo[4,5]imidazo[1,2-a][1,4]diazocin-5(14H)-one Synthetic Scheme

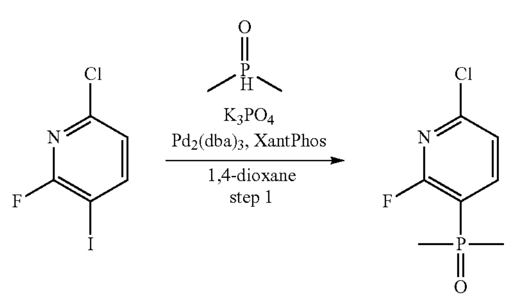

-continued

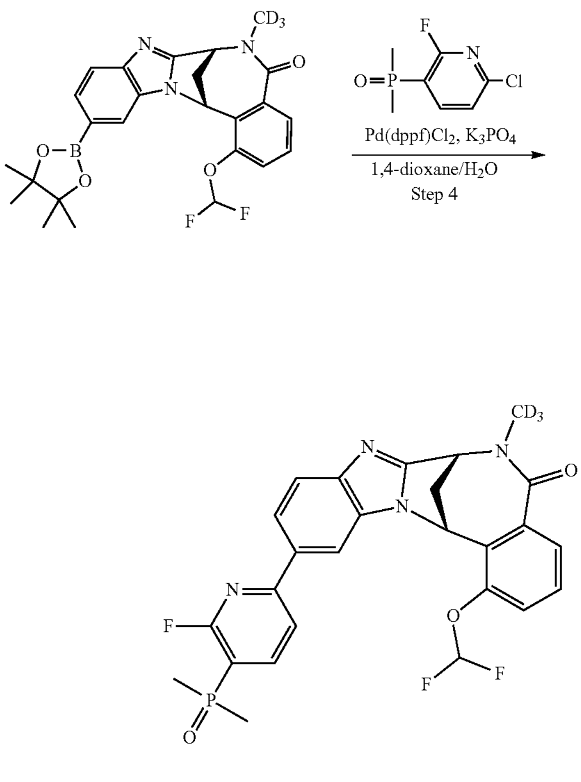

Preparation 115A: 6-chloro-3-(dimethylphosphoryl)-2-fluoropyridine

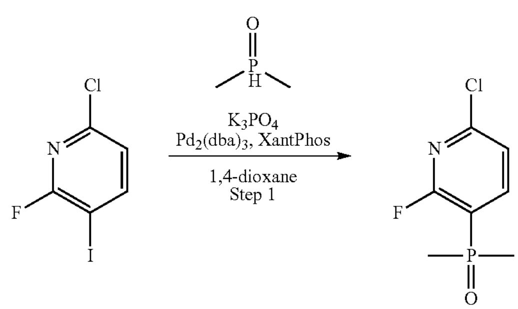

To a stirred solution of 6-chloro-2-fluoro-3-iodopyridine (1.00 g, 3.885 mmol) and (methylphosphonoyl)methane (303 mg, 3.885 mmol) in 1,4-dioxane (25 mL) were added $K_3PO_4$ (2.47 g, 11.655 mmol), $Pd_2(dba)_3$ (178 mg, 0.194 mmol) and XantPhos (225 mg, 0.389 mmol) at room temperature under nitrogen atmosphere. The resulting mixture was stirred for 16 h at 90° C. under nitrogen atmosphere. The resulting mixture was concentrated under reduce pressure. The residue was purified by silica gel column chromatography, eluted with $CH_2Cl_2$/MeOH (8/1) to afford 6-chloro-3-(dimethylphosphoryl)-2-fluoropyridine (387 mg, 48%) as yellow solid. MS ESI calculated for $C_7H_8ClFNOP$ $[M+H]^+$, 208.00, found 208.15. $^1H$ NMR (400 MHz, Methanol-$d_4$) δ 8.36-8.23 (m, 1H), 7.65-7.53 (m, 1H), 1.88 (s, 3H), 1.85 (s, 3H). $^{19}F$ NMR (376 MHz, Methanol-$d_4$) δ −59.03, −59.07. $^{31}P$ NMR (162 MHz, Methanol-$d_4$) δ 35.94, 35.85.

Example 115: (7R,14R)-1-(difluoromethoxy)-11-(5-(dimethylphosphoryl)-6-fluoropyridin-2-yl)-6-(methyl-d3)-6,7-dihydro-7,14-methanobenzo[f]benzo[4,5]imidazo[1,2-a][1,4]diazocin-5(14H)-one

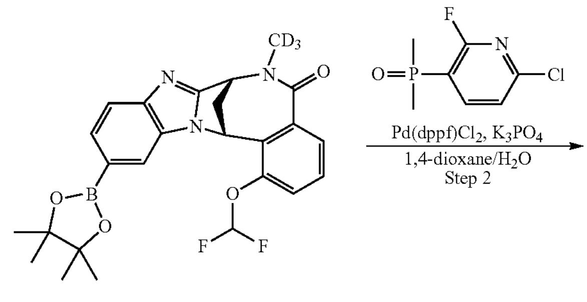

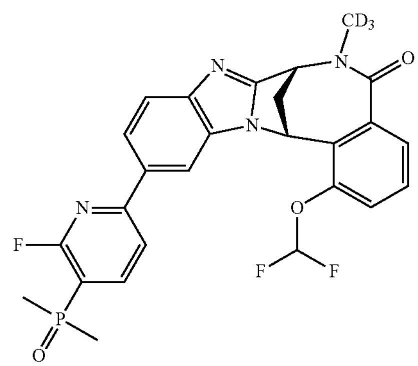

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.124 mmol) and 6-chloro-3-(dimethylphosphoryl)-2-fluoropyridine (31 mg, 0.149 mmol) in 1,4-dioxane (1 mL) and $H_2O$ (0.2 mL) were added $K_3PO_4$ (79 mg, 0.372 mmol) and $Pd(dppf)Cl_2$ (10 mg, 0.012 mmol) at room temperature. The resulting mixture was stirred for 2 h at 80° C. under nitrogen atmosphere. The mixture was concentrated under reduce pressure. The residue was purified by silica gel column chromatography, eluted with $CH_2Cl_2$/MeOH (9/1) followed by Prep-HPLC with the following conditions (Column: YMC-Actus Triart C18 ExRS 30*150 mm, 5 μm; Mobile Phase A: Water (10 mmol/L $NH_4HCO_3$), Mobile Phase B: ACN; Flow rate: 60 mL/min; Gradient: 18% B to 35.3% B in 10 min; Wave Length: 254 nm/220 nm; RT1 (min): 11) to afford (7R,14R)-1-(difluoromethoxy)-11-(5-(dimethylphosphoryl)-6-fluoropyridin-2-yl)-6-(methyl-d3)-6,7-dihydro-7,14-methanobenzo[f]benzo[4,5]imidazo[1,2-a][1,4]diazocin-5(14H)-one (34 mg, 52%) as white solid. MS ESI calculated for $C_{26}H_{19}D_3F_3N_4O_3P$ $[M+H]^+$, 530.16, found 530.15. $^1H$ NMR (400 MHz, Chloroform-d) δ 8.55-8.42 (m, 2H), 8.32 (d, J=1.7 Hz, 1H), 8.04-7.98 (m, 1H), 7.87-7.78 (m, 2H), 7.45 (t, J=8.2 Hz, 1H), 7.35 (d, J=8.2 Hz, 1H), 7.19-6.72 (m, 1H), 6.40 (d, J=7.1 Hz, 1H), 5.16 (d, J=7.1 Hz, 1H), 3.61-3.51 (m, 1H), 2.95 (d, J=13.6 Hz, 1H), 1.88 (s, 3H), 1.85 (s, 3H). $^{19}F$ NMR (377 MHz, Chloroform-d) δ −58.26, −58.30, −80.22, −80.67, −81.06, −81 0.50. $^{31}P$ NMR (162 MHz, Chloroform-d) δ 30.27, 30.17.

Example 116: (7R,14R)-1-(difluoromethoxy)-11-(6-(1-(dimethylphosphoryl)ethyl)pyridin-3-yl)-6-(methyl-d3)-6,7-dihydro-7,14-methanobenzo[f]benzo[4,5]imidazo[1,2-a][1,4]diazocin-5(14H)-one Synthetic Scheme

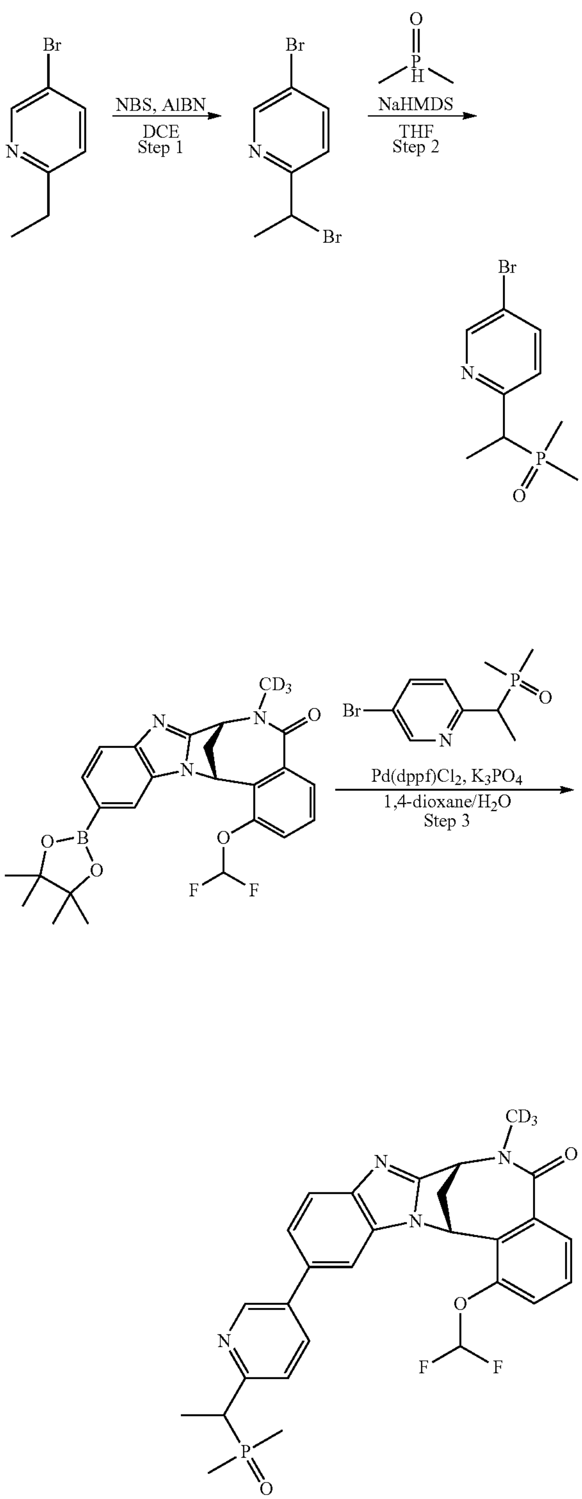

Preparation 116A: 5-bromo-2-(1-bromoethyl)pyridine

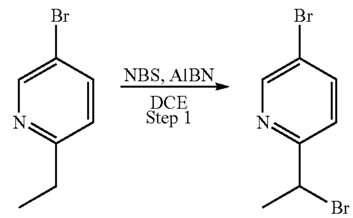

To a stirred solution of 5-bromo-2-ethylpyridine (2.50 g, 13.437 mmol) and NBS (2.39 g, 13.437 mmol) in DCE (25 mL) was added AIBN (26 mg, 0.161 mmol) in portions at room temperature. The resulting mixture was stirred for 3 h at 85° C. The mixture was allowed to cool down to room temperature. The resulting mixture was concentrated under reduced pressure. The residue was purified by silica gel column chromatography, eluted with PE/EA (5/1) to afford 5-bromo-24(1-bromoethyl)pyridine (3.10 g, 87%) as yellow oil. MS ESI calculated for $C_7H_7Br_2N$. $[M+H]^+$, 263.89 265.89 267.89 found 264.05 266.10 268.05. $^1H$ NMR (400 MHz, Chloroform-d) δ 8.62 (d, J=2.4 Hz, 1H), 7.84-7.82 (m, 1H), 7.36 (d, J=8.4 Hz, 1H), 5.19 (q, J=6.9 Hz, 1H), 2.09-2.02 (m, 3H).

Preparation 116B: 5-bromo-2-[1-(dimethylphosphoryl)ethyl]pyridine

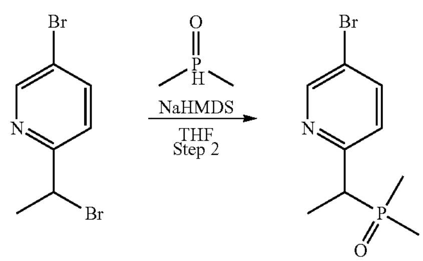

A solution of (methylphosphonoyl)methane (972 mg, 12.455 mmol) and NaHMDS (12.5 mL, 12.455 mmol) in THF (10 mL) was stirred for 30 min at 0° C. under nitrogen atmosphere. To the above mixture was added 5-bromo-2-(1-bromoethyl)pyridine (3.00 g, 11.323 mmol) in THF (10 mL) dropwise over 5 min at 0° C. The resulting mixture was stirred for additional overnight at room temperature. The resulting mixture was extracted with EtOAc (3×50 mL). The aqueous layer was concentrated under reduced pressure. The residue was purified by reversed-phase flash chromatography with the following conditions: column, C18 silica gel, mobile phase, $CH_3CN$ in Water (10 mmol/L $NH_4HCO_3$), 40% to 50% gradient in 10 min; detector, 254 nm to afford 5-bromo-2-[1-(dimethylphosphoryl)ethyl]pyridine (81 mg, 3%) as yellow oil. MS ESI calculated for $C_9H_{13}BrNOP$ $[M+H]^+$, 261.99, 263.99 found 262.15, 264.15. $^1H$ NMR (400 MHz, Chloroform-d) δ 8.61 (d, J=2.3 Hz, 1H), 7.91-7.74 (m, 1H), 7.30 (d, J=8.5 Hz, 1H), 3.50-3.29 (m, 1H), 1.70-1.56 (m, 3H), 1.52-1.40 (m, 6H). $^{31}P$ NMR (162 MHz, Chloroform-d) δ 46.21.

Example 116: (7R,14R)-1-(difluoromethoxy)-11-(6-(1-(dimethylphosphoryl)ethyl)pyridin-3-yl)-6-(methyl-d3)-6,7-dihydro-7,14-methanobenzo[f]benzo[4,5]imidazo[1,2-a][1,4]diazocin-5(14H)-one

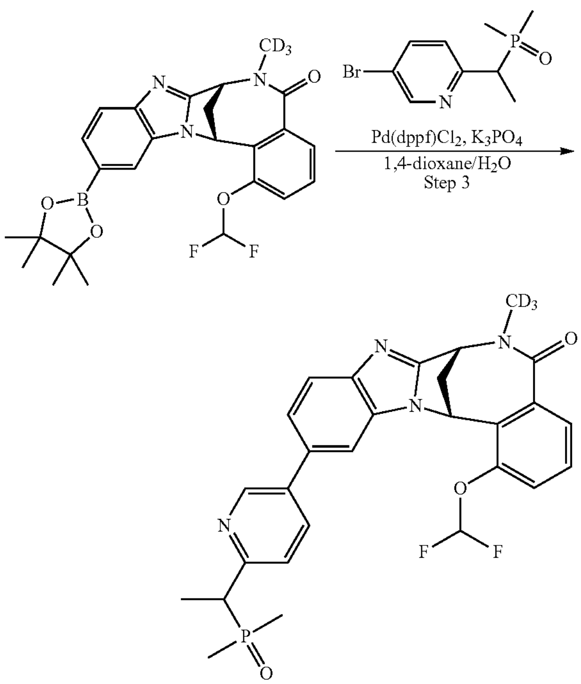

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (70 mg, 0.145 mmol) and 5-bromo-2-[1-(dimethylphosphoryl)ethyl]pyridine (45 mg, 0.174 mmol) in 1,4-dioxane (1 mL) and $H_2O$ (0.2 mL) were added $K_3PO_4$ (92 mg, 0.435 mmol) and $Pd(dppf)Cl_2 \cdot CH_2Cl_2$ (12 mg, 0.014 mmol) at room temperature. The resulting mixture was stirred for 2 h at 80° C. under nitrogen atmosphere. The mixture was concentrated under reduces pressure. The residue was purified by silica gel column chromatography, eluted with $CH_2Cl_2$/MeOH (9/1) followed by Prep-HPLC with the following conditions (Column: XBridge Shield RP18 OBD Column 30*150 mm, 5 m; Mobile Phase A: Water (10 mmol/L $NH_4HCO_3$), Mobile Phase B: ACN; Flow rate: 60 mL/min; Gradient: 12% B to 32% B in 10 min; Wave Length: 254 nm/220 nm; RT1 (min): 10.97) to afford (7R,14R)-1-(difluoromethoxy)-11-(6-(1-(dimethylphosphoryl)ethyl)pyridin-3-yl)-6-(methyl-d3)-6,7-dihydro-7,14-methanobenzo[f]benzo[4,5]imidazo[1,2-a][1,4]diazocin-5(14H)-one (38 mg, 49%) as white solid. MS ESI calculated for $C_{28}H_{24}D_3F_2N_4O_3P$ $[M+H]^+$, 540.20, found 540.35. $^1H$ NMR (400 MHz, Chloroform-d) δ 8.78 (s, 1H), 8.50 (d, J=8.3 Hz, 1H), 8.10-8.00 (m, 1H), 7.83 (d, J=8.4 Hz, 1H), 7.70 (s, 1H), 7.66-7.57 (m, 1H), 7.49-7.42 (m, 2H), 7.33 (d, J=8.4 Hz, 1H), 6.88 (t, J=72.8 Hz, 1H), 6.30 (d, J=7.2 Hz, 1H), 5.00 (d, J=7.0 Hz, 1H), 3.73-3.59 (m, 1H), 3.56-3.42 (m, 1H), 2.91 (d, J=13.5 Hz, 1H), 1.79-1.67 (m, 3H), 1.61-1.45 (m, 6H). $^{19}F$ NMR (377 MHz, Chloroform-d) δ −80.37, −80.81, −80.83, −80.86, −81.29. $^{31}P$ NMR (162 MHz, Chloroform-d) δ 46.13.

Example 117: (7R,14R)-11-(3-chloro-4-(dimethylphosphoryl)phenyl)-1-(difluoromethoxy)-6-(methyl-d3)-6,7-dihydro-7,14-methanobenzo[f]benzo[4,5]imidazo[1,2-a][1,4]diazocin-5(14H)-one Synthetic Scheme

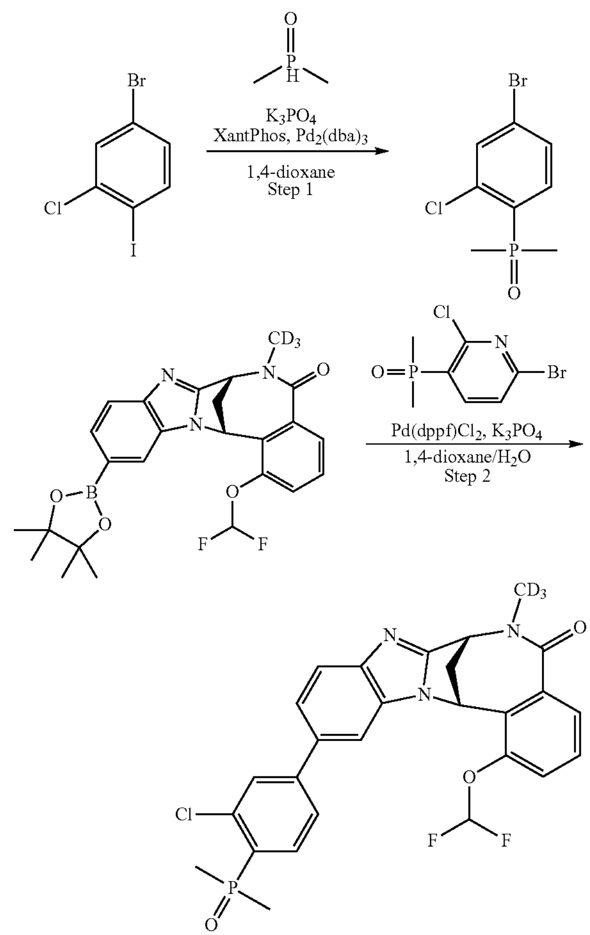

Preparation 117A: 4-bromo-2-chloro-1-(dimethylphosphoryl)benzene

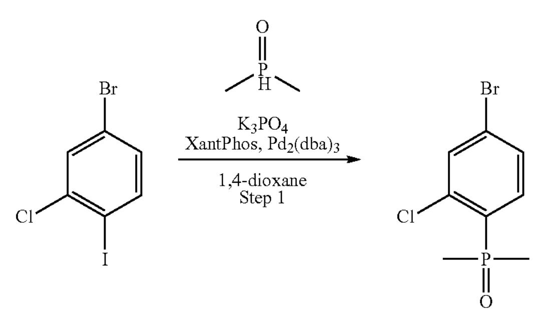

To a stirred mixture of 4-bromo-2-chloro-1-iodobenzene (1.00 g, 3.151 mmol) and (methylphosphonoyl)methane (246 mg, 3.151 mmol) in 1,4-dioxane (20 mL) were added $K_3PO_4$ (2.0 g, 9.453 mmol), XantPhos (182 mg, 0.315 mmol) and $Pd_2(dba)_3$ (144 mg, 0.158 mmol) at room temperature under nitrogen atmosphere. The resulting mixture was stirred for 16 h at 70° C. under nitrogen atmosphere. The resulting mixture was concentrated under reduced pressure. The residue was purified by silica gel column chromatography, eluted with $CH_2Cl_2$/MeOH (10:1) to afford 4-bromo-2-chloro-1-(dimethylphosphoryl)benzene (500 mg, 59%) as a white solid. MS ESI calculated for $C_8H_9BrClOP$ $[M+H]^+$, 266.93 268.93, found 267.05 269.05. $^1H$ NMR (400 MHz, Chloroform-d) δ 8.07-7.99 (m, 1H), 7.65-7.59 (m, 2H), 1.92 (s, 3H), 1.88 (s, 3H). $^{31}P$ NMR (162 MHz, Chloroform-d) δ 34.20.

Example 117: (7R,14R)-11-(3-chloro-4-(dimethylphosphoryl)phenyl)-1-(difluoromethoxy)-6-(methyl-d3)-6,7-dihydro-7,14-methanobenzo[f]benzo[4,5]imidazo[1,2-a][1,4]diazocin-5(14H)-one

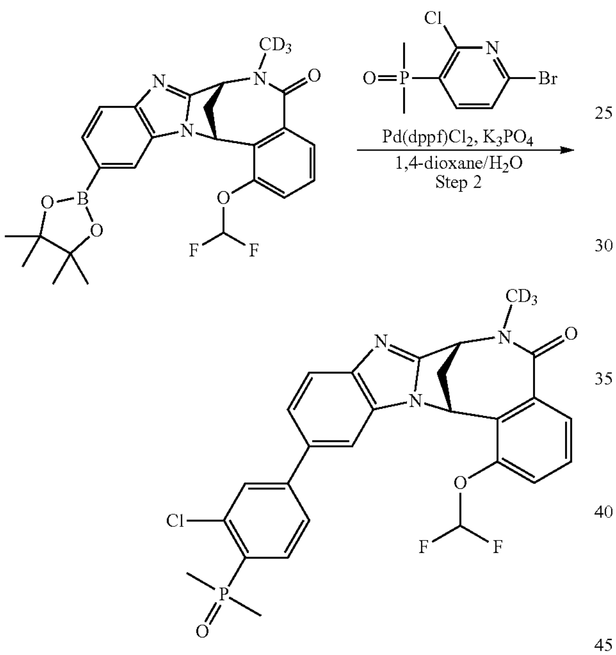

To a stirred mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (70 mg, 0.145 mmol) and 4-bromo-2-chloro-1-(dimethylphosphoryl)benzene (58 mg, 0.217 mmol) in 1,4-dioxane (1.5 mL) and $H_2O$ (0.3 mL) were added $K_3PO_4$ (92 mg, 0.435 mmol) and Pd(dppf)$Cl_2 \cdot CH_2Cl_2$ (12 mg, 0.014 mmol) at room temperature. The resulting mixture was stirred for 2 h at 80° C. under nitrogen atmosphere. The resulting mixture was concentrated under reduced pressure. The residue was purified by silica gel column chromatography, eluted with $CH_2Cl_2$/MeOH (10:1) followed by reversed-phase flash chromatography with the following conditions: column, C18 silica gel; mobile phase, $CH_3CN$ in Water (10 mmol/L $NH_4HCO_3$), 25% to 55% gradient in 25 min; detector, 254 nm. This resulted in (7R,14R)-11-(3-chloro-4-(dimethylphosphoryl)phenyl)-1-(difluoromethoxy)-6-(methyl-d3)-6,7-dihydro-7,14-methanobenzo[f]benzo[4,5]imidazo[1,2-a][1,4]diazocin-5(14H)-one (64 mg, 81%) as a white solid. MS ESI calculated for $C_{27}H_{20}D_3ClF_2N_3O_3P$ $[M+H]^+$, 545.13, found 545.15. $^1H$ NMR (400 MHz, DMSO-$d_6$) δ 8.34-8.21 (m, 1H), 8.06-7.95 (m, 1H), 7.90-7.56 (m, 6H), 7.54-7.47 (m, 2H), 6.31 (d, J=7.1 Hz, 1H), 5.24 (d, J=7.1 Hz, 1H), 3.59-3.47 (m, 1H), 2.84 (d, J=13.8 Hz, 1H), 1.85 (s, 3H), 1.81 (s, 3H). $^{19}F$ NMR (377 MHz, DMSO-$d_6$) δ −81.65, −82.10, −82.23, −82.68. $^{31}P$ NMR (162 MHz, DMSO-$d_6$) δ 31.72.

Example 118 and 119: (7R,14R)-1-(difluoromethoxy)-11-(4-((R or S)-1-(dimethylphosphoryl)ethyl)-5-fluoro-2-methylphenyl)-6-(methyl-d3)-6,7-dihydro-7,14-methanobenzo[f]benzo[4,5]imidazo[1,2-a][1,4]diazocin-5(14H)-one and (7R,14R)-1-(difluoromethoxy)-11-(4-((S or R)-1-(dimethylphosphoryl)ethyl)-5-fluoro-2-methylphenyl)-6-(methyl-d3)-6,7-dihydro-7,14-methanobenzo[f]benzo[4,5]imidazo[1,2-a][1,4]diazocin-5(14H)-one Synthetic Scheme

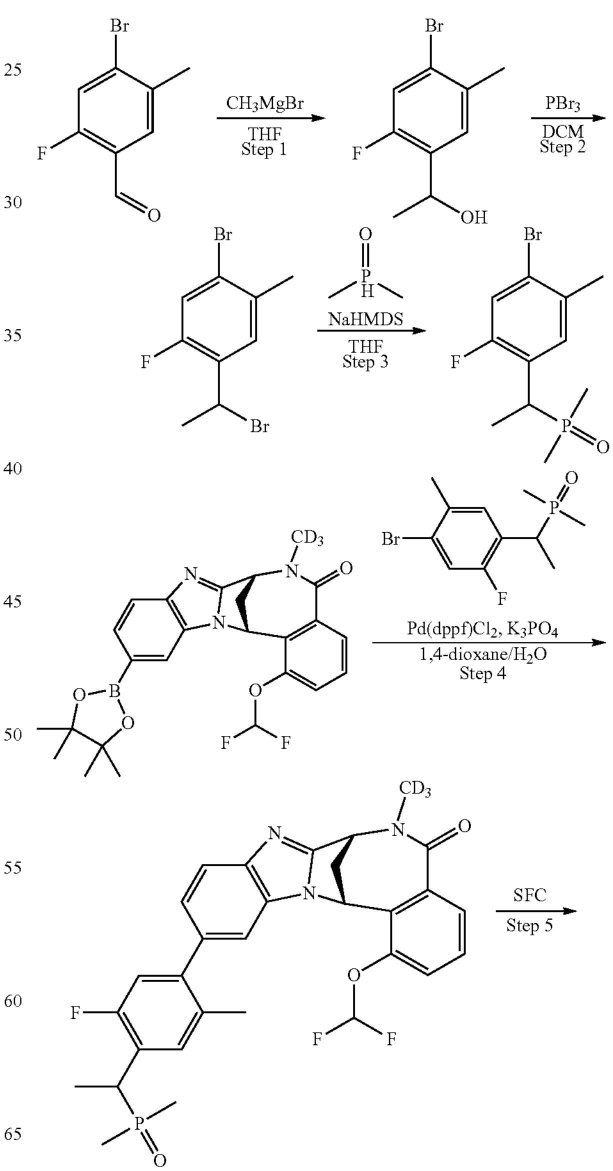

-continued

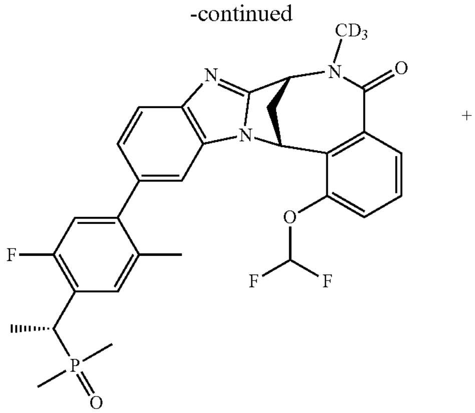

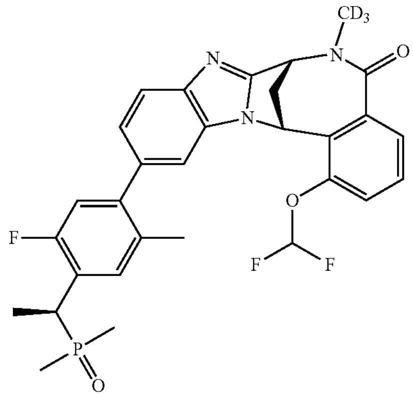

Preparation 118A: 1-(4-bromo-2-fluoro-5-methylphenyl)ethan-1-ol

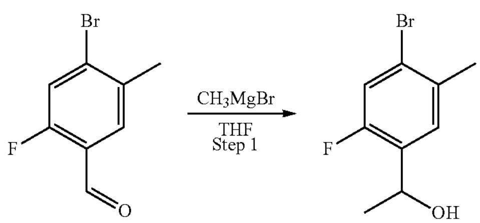

Into a 250 mL round-bottom flask were added 4-bromo-2-fluoro-5-methylbenzaldehyde (3.00 g, 13.823 mmol) and THF (100 mL) at room temperature under nitrogen atmosphere. The mixture was allowed to cool down to 0° C. To the above mixture was added $CH_3MgBr$ (15.2 mL, 15.205 mmol) dropwise at 0° C. The resulting mixture was stirred for additional 5 h at room temperature. The reaction was quenched with sat. $NH_4Cl$ (aq.) at 0° C. The aqueous layer was extracted with EtOAc (3×100 mL). The resulting mixture was concentrated under reduced pressure. The residue was purified by silica gel column chromatography, eluted with PE/EA (10:1) to afford 1-(4-bromo-2-fluoro-5-methylphenyl)ethan-1-ol (580 mg, 18%) as a light yellow oil. MS ESI calculated for $C_9H_{10}BrFO$ $[M+H]^+$, 232.99 234.99, found N/A. $^1H$ NMR (400 MHz, Chloroform-d) δ 7.35 (d, J=7.8 Hz, 1H), 7.22 (d, J=9.7 Hz, 1H), 5.13 (q, J=6.5 Hz, 1H), 2.36 (s, 3H), 1.49 (d, J=6.5 Hz, 3H). $^{19}F$ NMR (377 MHz, Chloroform-d) δ −122.57.

Preparation 118B: 1-bromo-4-(1-bromoethyl)-5-fluoro-2-methylbenzene

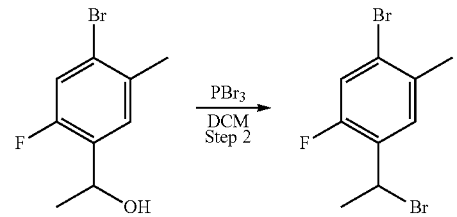

To a stirred solution of 1-(4-bromo-2-fluoro-5-methylphenyl)ethanol (500 mg, 2.145 mmol) in DCM (8 mL) was added $PBr_3$ (0.3 mL, 3.218 mmol) dropwise at 0° C. The resulting mixture was stirred for 3 h at room temperature. The reaction was quenched with Water/Ice at 0° C. The aqueous layer was extracted with $CH_2Cl_2$ (3×30 mL), dried over anhydrous $Na_2SO_4$. After filtration, the filtrate was concentrated under reduced pressure. The residue was purified by silica gel column chromatography, eluted with PE/EA (12:1) to afford 1-bromo-4-(1-bromoethyl)-5-fluoro-2-methylbenzene (270 mg, 42%) as a colorless oil. MS ESI calculated for $C_9H_9Br_2F$ $[M+H]^+$, 294.91 296.91 298.91, found N/A. $^1H$ NMR (300 MHz, Chloroform-d) δ 7.37 (d, J=7.7 Hz, 1H), 7.23 (s, 1H), 5.45-5.32 (q, J=7.0 Hz, 1H), 2.37 (s, 3H), 2.02 (d, J=7.0 Hz, 3H). $^{19}F$ NMR (282 MHz, Chloroform-d) δ −119.67.

Preparation 118C: (1-(4-bromo-2-fluoro-5-methylphenyl)ethyl)dimethylphosphine Oxide

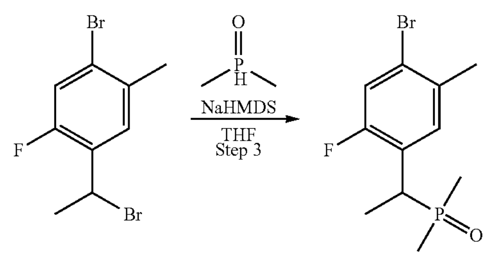

To a stirred solution of (methylphosphonoyl)methane (71 mg, 0.912 mmol) in THF (6 mL) was added NaHMDS (0.91 mL, 0.912 mmol, 1M in THF) dropwise at 0° C. under nitrogen atmosphere. The resulting mixture was stirred for 30 min at room temperature under nitrogen atmosphere. To the above mixture was added 1-bromo-4-(1-bromoethyl)-5-fluoro-2-methylbenzene (270 mg, 0.912 mmol) dropwise at 0° C. The resulting mixture was stirred for additional overnight at room temperature. The reaction was quenched with sat. $NH_4Cl$ (aq.) at 0° C. The aqueous layer was extracted with EtOAc (3×20 mL). The organic layers were dried over anhydrous $Na_2SO_4$. After filtration, the filtrate was concentrated under reduced pressure. The residue was purified by silica gel column chromatography, eluted with $CH_2Cl_2$/MeOH (0% to 10%) to afford (1-(4-bromo-2-fluoro-5-methylphenyl)ethyl)dimethylphosphine oxide (58 mg, 21%) as a yellow oil. MS ESI calculated for $C_{11}H_{15}BrFOP$ $[M+H]^+$, 293.00 295.00, found 292.90 294.90. $^1H$ NMR (400 MHz, Chloroform-d) δ 7.32 (d, J=7.7 Hz, 1H), 7.29 (s, 1H), 2.37 (s, 3H), 1.93-1.86 (m, 6H), 1.34

(d, J=11.6 Hz, 3H). $^{19}$F NMR (377 MHz, Chloroform-d) δ −120.07. $^{31}$P NMR (162 MHz, Chloroform-d) δ 46.63.

Preparation 118D: (7R,14R)-1-(difluoromethoxy)-11-(4-(1-(dimethylphosphoryl)ethyl)-5-fluoro-2-methylphenyl)-6-(methyl-d3)-6,7-dihydro-7,14-methanobenzo[f]benzo[4,5]imidazo[1,2-a][1,4]diazocin-5(14H)-one Example 118 and 119: (7R,14R)-1-(difluoromethoxy)-11-(4-((R or S)-1-(dimethylphosphoryl)ethyl)-5-fluoro-2-methylphenyl)-6-(methyl-d3)-6,7-dihydro-7,14-methanobenzo[f]benzo[4,5]imidazo[1,2-a][1,4]diazocin-5(14H)-one and (7R,14R)-1-(difluoromethoxy)-11-(4-((S or R)-1-(dimethylphosphoryl)ethyl)-5-fluoro-2-methylphenyl)-6-(methyl-d3)-6,7-dihydro-7,14-methanobenzo[f]benzo[4,5]imidazo[1,2-a][1,4]diazocin-5(14H)-one

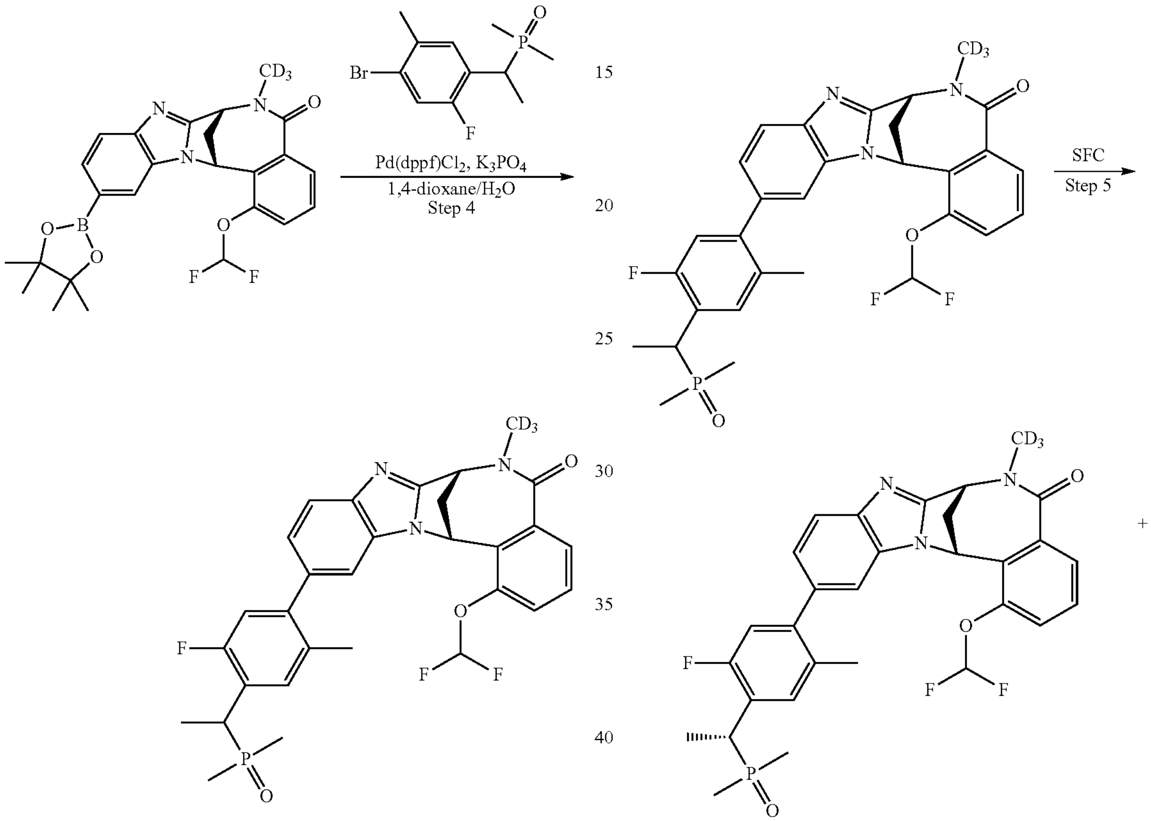

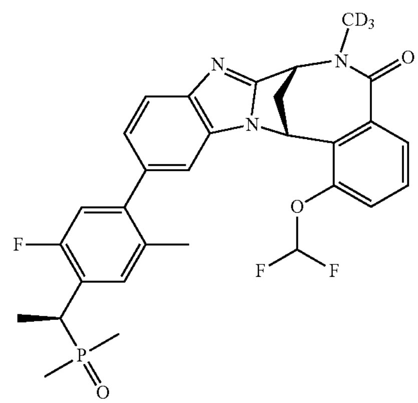

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (80 mg, 0.165 mmol) and 1-bromo-4-[1-(dimethylphosphoryl)ethyl]-5-fluoro-2-methylbenzene (58 mg, 0.198 mmol) in 1,4-dioxane (0.8 mL) and $H_2O$ (0.2 mL) were added $K_3PO_4$ (105 mg, 0.495 mmol) and $Pd(dppf)Cl_2$ (14 mg, 0.017 mmol) at room temperature. The resulting mixture was stirred for 2 h at 80° C. under nitrogen atmosphere. The resulting mixture was concentrated under reduced pressure. The residue was purified by silica gel column chromatography, eluted with $CH_2Cl_2$/MeOH (0% to 10%) to afford followed by reversed-phase flash chromatography with the following conditions: column, C18 silica gel; mobile phase, $CH_3CN$ in Water (10 mmol/L $NH_4HCO_3$), 20% to 60% gradient in 30 min; detector, 254/220 nm to afford (7R,14R)-1-(difluoromethoxy)-11-(4-(1-(dimethylphosphoryl)ethyl)-5-fluoro-2-methylphenyl)-6-(methyl-d3)-6,7-dihydro-7,14-methanobenzo[f]benzo[4,5]imidazo[1,2-a][1,4]diazocin-5(14H)-one (65 mg, 68%) as a white solid. MS ESI calculated for $C_{30}H_{26}D_3F_3N_3O_3P$ $[M+H]^+$, 571.21, found 571.20.

(7R,14R)-1-(difluoromethoxy)-11-(4-(1-(dimethylphosphoryl)ethyl)-5-fluoro-2-methylphenyl)-6-(methyl-d3)-6,7-dihydro-7,14-methanobenzo[f]benzo[4,5]imidazo[1,2-a][1,4]diazocin-5(14H)-one (65 mg) was separated by SFC with the following conditions (Column: CHIRALPAK IH 3*25 cm, 5 μm; Mobile Phase A: $CO_2$, Mobile Phase B: MeOH (20 mM $NH_3$); Flow rate: 100 mL/min; Gradient: isocratic 20% B; Wave Length: 230/210 nm; RT1 (min): 10.1; RT2

(min): 11.82). The first peak afforded 22 mg (34%) as a white solid. MS ESI calculated for $C_{30}H_{26}D_3F_3N_3O_3P$ $[M+H]^+$, 571.21, found 571.20. $^1$H NMR (400 MHz, Chloroform-d) δ 8.54-8.46 (m, 1H), 7.74 (d, J=8.4 Hz, 1H), 7.46-7.39 (m, 2H), 7.36-7.28 (m, 2H), 7.20-7.15 (m, 1H), 6.97-6.59 (m, 2H), 6.24 (d, J=7.2 Hz, 1H), 4.98 (d, J=7.1 Hz, 1H), 3.55-3.36 (m, 2H), 2.88 (d, J=13.5 Hz, 1H), 2.20 (s, 3H), 1.70-1.64 (m, 3H), 1.57 (d, J=12.3 Hz, 3H), 1.39 (d, J=12.3 Hz, 3H). $^{19}$F NMR (377 MHz, Chloroform-d) δ −80.21, −80.65, −81.00, −81.44, −122.35, −122.36. $^{31}$P NMR (162 MHz, Chloroform-d) δ 45.79.

The second peak afforded 19 mg (29%) as a white solid. MS ESI calculated for $C_{30}H_{26}D_3F_3N_3O_3P$ $[M+H]^+$, 571.21, found 571.20. $^1$H NMR (400 MHz, Chloroform-d) δ 8.54-8.45 (m, 1H), 7.81-7.72 (m, 1H), 7.46-7.39 (m, 2H), 7.35-7.28 (m, 2H), 7.24-7.17 (m, 1H), 6.98-6.60 (m, 2H), 6.31-6.22 (m, 1H), 5.15-4.95 (m, 1H), 3.57-3.36 (m, 2H), 2.96-2.84 (m, 1H), 2.20 (s, 3H), 1.71-1.63 (m, 3H), 1.57 (d, J=12.2 Hz, 3H), 1.39 (d, J=12.3 Hz, 3H). $^{19}$F NMR (377 MHz, Chloroform-d) δ −80.29, −80.74, −80.97, −81.41, −122.20, −122.26. $^{31}$P NMR (162 MHz, Chloroform-d) δ 45.60.

Example 120: (7R,14R)-1-(difluoromethoxy)-11-(6-(2-(dimethylphosphoryl)propan-2-yl)pyridin-3-yl)-6-(methyl-d3)-6,7-dihydro-7,14-methanobenzo[f]benzo[4,5]imidazo[1,2-a][1,4]diazocin-5(14H)-one Synthetic Scheme

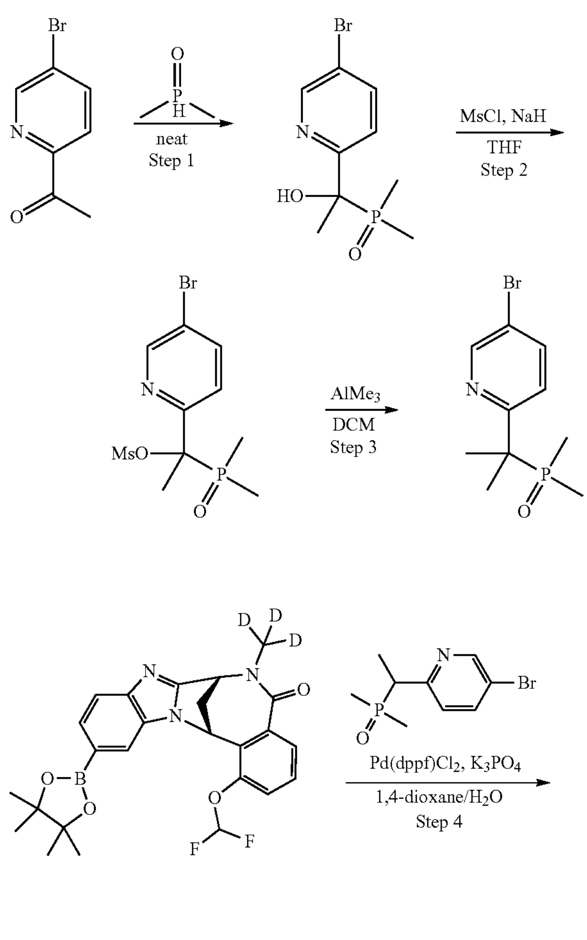

-continued

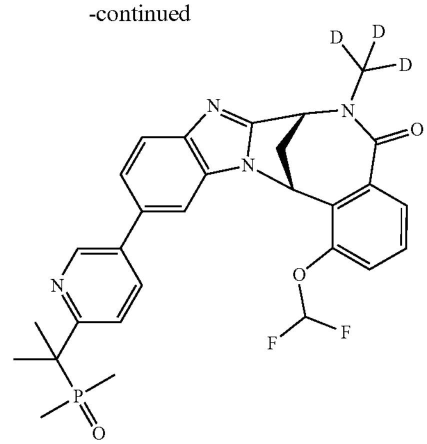

Preparation 120A: 1-(5-bromopyridin-2-yl)-1-(dimethylphosphoryl)ethanol

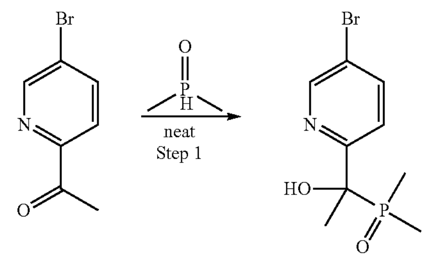

A mixture of 1-(5-bromopyridin-2-yl)ethanone (2.00 g, 9.998 mmol) and (methylphosphonoyl)methane (0.94 g, 11.998 mmol) was stirred for overnight at 80° C. under nitrogen atmosphere. The mixture was purified by silica gel column chromatography, eluted with $CH_2Cl_2$/MeOH (9/1) to afford 1-(5-bromopyridin-2-yl)-1-(dimethylphosphoryl)ethanol (2.10 g, 75%) as a white solid. MS ESI calculated for $C_9H_{13}BrNO_2P$ $[M+H]^+$, 277.99 279.99, found 278.05 280.05. $^1$H NMR (400 MHz, Chloroform-d) δ 8.61 (d, J=2.4 Hz, 1H), 7.94-7.88 (m, 1H), 7.70-7.64 (m, 1H), 5.31 (s, 1H), 1.79 (d, J=12.4 Hz, 3H), 1.62 (d, J=12.8 Hz, 3H), 1.15 (d, J=12.4 Hz, 3H).

Preparation 120B: 1-(5-bromopyridin-2-yl)-1-(dimethylphosphoryl)ethyl Methanesulfonate

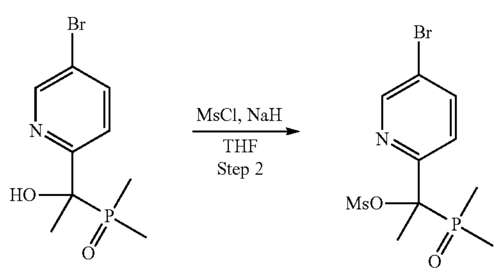 [SMILES: CC(O)(c1ccc(Br)cn1)P(C)(C)=O ; CC(OS(C)(=O)=O)(c1ccc(Br)cn1)P(C)(C)=O]

To a solution of 1-(5-bromopyridin-2-yl)-1-(dimethylphosphoryl)ethanol (600 mg, 2.158 mmol) in THF (10 mL) was added NaH (104 mg, 2.590 mmol, 60%) at 0 degrees C. The mixture was stirred for 15 min. MsCl (0.20 mL, 2.590 mmol) was added and the mixture was allowed to warm to room temperature and stirred for overnight. The reaction was quenched with water (20 mL) at 0° C. and was extracted with DCM (2×20 mL). The combined organic layers were washed with brine (20 mL), dried over anhydrous $Na_2SO_4$. After filtration, the filtrate was concentrated under reduced pressure. The residue was purified by silica gel column chromatography, eluted with $CH_2Cl_2$/MeOH (12/1) to afford 1-(5-bromopyridin-2-yl)-1-(dimethylphosphoryl)ethyl methanesulfonate (150 mg, 19%) as a light yellow solid. MS ESI calculated for $C_{10}H_{15}BrNO_4PS$ $[M+H]^+$, 355.96 357.96, found 356.05 358.05. $^1H$ NMR (400 MHz, Chloroform-d) δ 8.68 (d, J=2.3 Hz, 1H), 7.96-7.89 (m, 1H), 7.48 (d, J=8.6 Hz, 1H), 3.29 (s, 3H), 2.40-2.33 (m, 3H), 1.63 (d, J=12.6 Hz, 3H), 1.48 (d, J=12.9 Hz, 3H). $^{31}P$ NMR (162 MHz, Chloroform-d)) δ 50.19.

Preparation 120C: 5-bromo-2-[2-(dimethylphosphoryl)propan-2-yl]pyridine

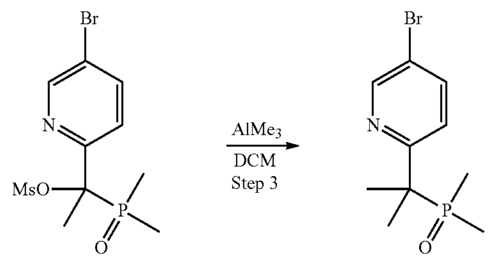 [SMILES: CC(OS(C)(=O)=O)(c1ccc(Br)cn1)P(C)(C)=O ; CC(C)(c1ccc(Br)cn1)P(C)(C)=O ; "AlMe3"]

To a stirred solution of 1-(5-bromopyridin-2-yl)-1-(dimethylphosphoryl)ethyl methanesulfonate (150 mg, 0.421 mmol) in DCM (3 mL) was added $AlMe_3$ (1.7 mL, 3.368 mmol, 2M in Toluene) dropwise at 0° C. under nitrogen atmosphere. The resulting mixture was stirred for overnight at room temperature. The reaction was quenched with sat. $NaHCO_3$ (aq.) at 0° C. and extracted with DCM (2×20 mL). The combined organic layers were washed with brine (20 mL), dried over anhydrous $Na_2SO_4$. After filtration, the filtrate was concentrated under reduced pressure. The residue was purified by silica gel column chromatography, eluted with $CH_2Cl_2$/MeOH (12/1) to afford 5-bromo-2-[2-(dimethylphosphoryl)propan-2-yl]pyridine (60 mg, 51%) as a light yellow solid. MS ESI calculated for $C_{10}H_{15}BrNOP$ $[M+H]^+$, 276.01 278.01, found 275.85 277.85. $^1H$-NMR (400 MHz, Chloroform-d) δ 8.67-8.56 (m, 1H), 7.85-7.73 (m, 1H), 7.43 (d, J=8.5 Hz, 1H), 1.67 (s, 3H), 1.63 (s, 3H), 1.40 (s, 3H), 1.37 (s, 3H). $^{31}P$ NMR (162 MHz, Chloroform-d) δ 51.91.

Example 120: (7R,14R)-1-(difluoromethoxy)-11-(6-(2-(dimethylphosphoryl)propan-2-yl)pyridin-3-yl)-6-(methyl-d3)-6,7-dihydro-7,14-methanobenzo[f]benzo[4,5]imidazo[1,2-a][1,4]diazocin-5(14H)-one

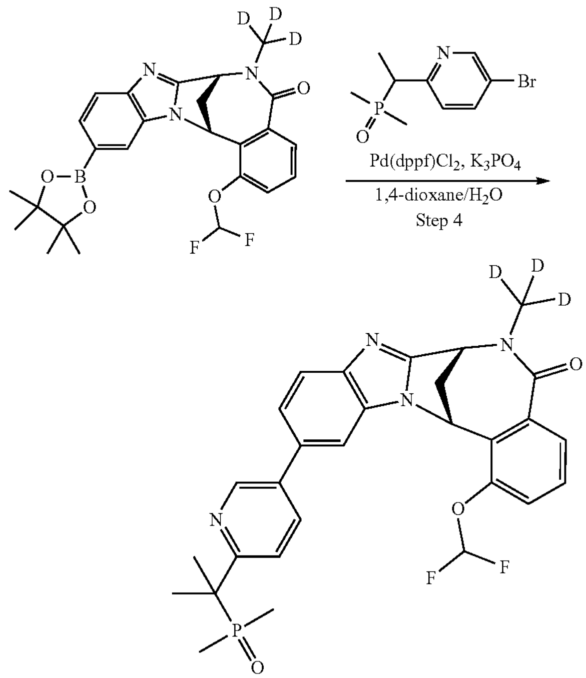

To a solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (70 mg, 0.145 mmol) and 5-bromo-2-[2-(dimethylphosphoryl)propan-2-yl]pyridine (48 mg, 0.174 mmol) in 1,4-dioxane (1 mL) and $H_2O$ (0.2 mL) were added $K_3PO_4$ (92 mg, 0.434 mmol) and Pd(dppf)$Cl_2$ (12 mg, 0.014 mmol). After stirring for 3 h at 80° C. under a nitrogen atmosphere, the mixture was allowed to cool down to room temperature. The resulting mixture was concentrated under reduced pressure. The residue was purified by silica gel column chromatography, eluted with DCM/MeOH (0% to 10%) followed by Prep-HPLC with the following conditions: Column: XBridge Prep Phenyl OBD Column 19*250 mm, 5 m; Mobile Phase A: Water (10 mmol/L $NH_4HCO_3$+0.1% $NH_3 \cdot H_2O$), Mobile Phase B: ACN; Flow rate: 60 mL/min mL/min; Gradient: 17% B to 32% B in 10 min; Wave Length: 254 nm/220 nm to afford (7R,14R)-1-(difluoromethoxy)-11-(6-(2-(dimethylphosphoryl)propan-2-yl)pyridin-3-yl)-6-(methyl-d3)-6,7-dihydro-7,14-methanobenzo[f]benzo[4,5]imidazo[1,2-a][1,4]diazocin-5(14H)-one (51 mg, 63%) as a white solid. MS ESI calculated for $C_{29}H_{26}D_3F_2N_4O_3P$ $[M+H]^+$, 554.21, found 554.15. $^1H$ NMR (400 MHz, Chloroform-d) δ 8.81 (d, J=2.4 Hz, 1H), 8.52-8.44 (m, 1H), 7.93-7.87 (m, 1H), 7.81 (d, J=8.5 Hz, 1H), 7.70 (d, J=1.7 Hz, 1H), 7.64-7.58 (m, 1H), 7.51-7.47 (m, 1H), 7.43 (t, J=8.2 Hz, 1H), 7.36-7.31 (m, 1H), 6.86 (t, J=72.8 Hz, 1H), 6.30 (d, J=7.2 Hz, 1H), 5.01 (d, J=7.1 Hz, 1H), 3.55-3.42 (m, 1H), 2.90 (d, J=13.6 Hz, 1H), 1.75 (s, 3H), 1.72 (s, 3H), 1.46 (s, 3H), 1.43 (s, 3H). $^{19}F$ NMR (377 MHz, Chloroform-d) δ −80.30, −80.74, −80.91, −81.36. $^{31}P$ NMR (162 MHz, Chloroform-d) δ 52.68.

Example 121: (7R,14R)-11-(6-chloro-5-(dimethylphosphoryl)pyridin-2-yl)-1-(difluoromethoxy)-6-(methyl-d3)-6,7-dihydro-7,14-methanobenzo[f]benzo[4,5]imidazo[1,2-a][1,4]diazocin-5(14H)-one Synthetic Scheme

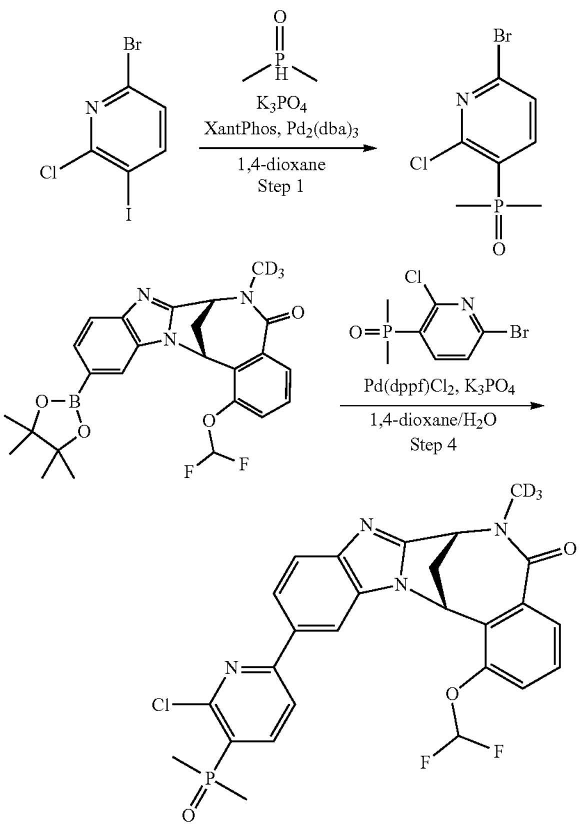

Preparation 121A: 6-bromo-2-chloro-3-(dimethylphosphoryl)pyridine

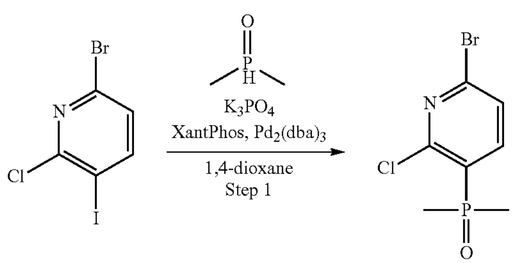

To a stirred solution of 6-bromo-2-chloro-3-iodopyridine (2.00 g, 6.283 mmol) and (methylphosphonoyl)methane (441 mg, 5.655 mmol) in 1,4-dioxane (20 mL) were added $K_3PO_4$ (4.00 g, 18.849 mmol), XantPhos (364 mg, 0.628 mmol) and $Pd_2(dba)_3$ (288 mg, 0.314 mmol) at room temperature. The resulting mixture was stirred for 2 h at 70° C. under nitrogen atmosphere. The resulting mixture was concentrated under reduced pressure. The residue was purified by silica gel column chromatography, eluted with $CH_2Cl_2$/MeOH (10:1) to afford 6-bromo-2-chloro-3-(dimethylphosphoryl)pyridine (150 mg, 9%) as a brown solid. MS ESI calculated for $C_7H_8BrClNOP$ $[M+H]^+$, 267.92 269.92, found 267.95 269.95. $^1H$ NMR (400 MHz, Chloroform-d) δ 8.38-8.30 (m, 1H), 7.67-7.61 (m, 1H), 1.95 (s, 3H), 1.91 (s, 3H). $^{31}P$ NMR (162 MHz, Chloroform-d) δ 33.10.

Example 121: (7R,14R)-11-(6-chloro-5-(dimethylphosphoryl)pyridin-2-yl)-1-(difluoromethoxy)-6-(methyl-d3)-6,7-dihydro-7,14-methanobenzo[f]benzo[4,5]imidazo[1,2-a][1,4]diazocin-5(14H)-one

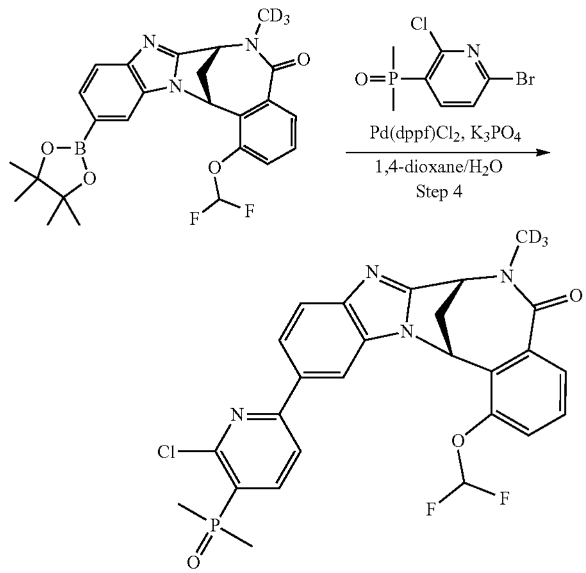

To a stirred mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.124 mmol) and 6-bromo-2-chloro-3-(dimethylphosphoryl)pyridine (53 mg, 0.198 mmol) in 1,4-dioxane (1.5 mL) and $H_2O$ (0.3 mL) were added $Pd(dppf)Cl_2$ (10 mg, 0.012 mmol) and $K_3PO_4$ (79 mg, 0.372 mmol) at room temperature under nitrogen atmosphere. The resulting mixture was stirred for 2 h at 80° C. under nitrogen atmosphere. The resulting mixture was concentrated under vacuum. The residue was purified by silica gel column chromatography, eluted with $CH_2Cl_2$/MeOH (10:1) followed by reversed-phase flash chromatography with the following conditions: column, C18 silica gel; mobile phase, $CH_3CN$ in Water (10 mmol/L $NH_4HCO_3$), 25% to 55% gradient in 25 min; detector, 254 nm. This resulted in (7R,14R)-11-(6-chloro-5-(dimethylphosphoryl)pyridin-2-yl)-1-(difluoromethoxy)-6-(methyl-d3)-6,7-dihydro-7,14-methanobenzo[f]benzo[4,5]imidazo[1,2-a][1,4]diazocin-5(14H)-one (42 mg, 62%) as a white solid. MS ESI calculated for $C_{26}H_{19}D_3ClF_2N_4O_3P$ $[M+H]^+$, 546.13, found 546.10. $^1H$ NMR (400 MHz, DMSO-$d_6$) δ 8.37-8.31 (m, 1H), 8.30-8.21 (m, 2H), 8.12-8.04 (m, 1H), 7.99-7.89 (m, 1H), 7.83-7.42 (m, 4H), 6.42-6.28 (m, 1H), 5.35-5.16 (m, 1H), 3.55-3.51 (m, 1H), 2.84 (d, J=13.7 Hz, 1H), 1.88 (s, 3H), 1.85 (s, 3H). $^{19}F$ NMR (377 MHz, DMSO-$d_6$) δ −81.44, −81.89, −81.96, −82.41. $^{31}P$ NMR (162 MHz, DMSO-$d_6$) δ 31.52.

Example 122: (7R,14R)-1-(difluoromethoxy)-11-(4-(dimethylphosphoryl)-3-(trifluoromethyl)phenyl)-6-(methyl-d3)-6,7-dihydro-7,14-methanobenzo[f]benzo[4,5]imidazo[1,2-a][1,4]diazocin-5(14H)-one Synthetic Scheme

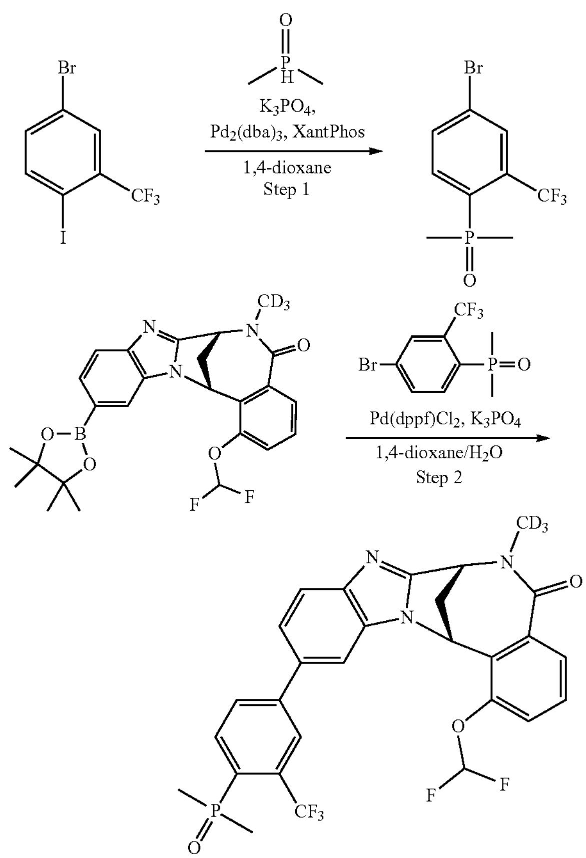

Preparation 122A: (4-bromo-2-(trifluoromethyl)phenyl)dimethylphosphine Oxide

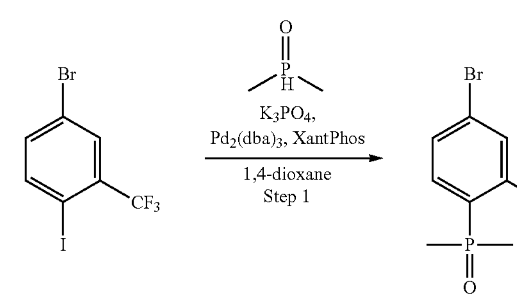

To a stirred solution of dimethylphosphine oxide (667 mg, 8.549 mmol) and 4-bromo-1-iodo-2-(trifluoromethyl)benzene (3.00 g, 8.549 mmol) in 1,4-dioxane (15 mL) were added $K_3PO_4$ (2.72 g, 12.823 mmol) and $Pd_2(dba)_3$ (391 mg, 0.427 mmol) at room temperature under nitrogen atmosphere. The resulting mixture was stirred for 2 h at 80° C. under nitrogen atmosphere. The mixture was allowed to cool down to room temperature. The resulting mixture was filtered, the filter cake was washed with $CH_2Cl_2$ (3×10 mL). The filtrate was concentrated under reduced pressure. The residue was purified by silica gel column chromatography, eluted with $CH_2Cl_2$/MeOH (0%~10%) to afford 4-bromo-1-(dimethylphosphoryl)-2-(trifluoromethyl)benzene (500 mg, 19%) as a yellow solid. MS ESI calculated for $C_9H_9BrF_3OP$ $[M+H]^+$, 300.95, found 300.80. $^1H$ NMR (400 MHz, Chloroform-d) δ 8.42-8.32 (m, 1H), 7.99-7.83 (m, 2H), 1.88 (s, 3H), 1.84 (s, 3H). $^{19}F$ NMR (377 MHz, Chloroform-d) δ −56.61. $^{31}P$ NMR (162 MHz, Chloroform-d) δ 34.82.

Example 122: (7R,14R)-1-(difluoromethoxy)-11-(4-(dimethylphosphoryl)-3-(trifluoromethyl)phenyl)-6-(methyl-d3)-6,7-dihydro-7,14-methanobenzo[f]benzo[4,5]imidazo[1,2-a][1,4]diazocin-5(14H)-one

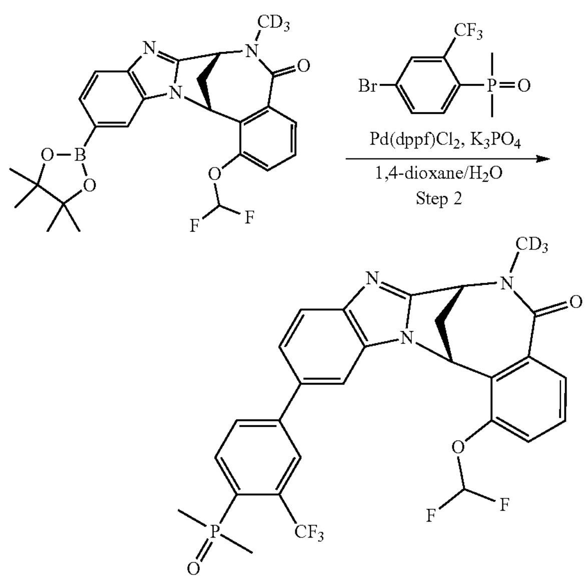

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (80 mg, 0.124 mmol) and 4-bromo-1-(dimethylphosphoryl)-2-(trifluoromethyl)benzene (60 mg, 0.149 mmol) in 1,4-dioxane (0.8 mL) and $H_2O$ (0.2 mL) were added $K_3PO_4$ (105 mg, 0.372 mmol) and $Pd(dppf)Cl_2$ (14 mg, 0.012 mmol) at room temperature. The resulting mixture was stirred for 1 h at 80° C. under nitrogen atmosphere. The resulting mixture was concentrated under vacuum. The residue was purified by silica gel column chromatography, eluted with $CH_2Cl_2$/MeOH (0% to 10%) to afford followed by Prep-HPLC with the following conditions (Column. YMC-Actus Triart C18 ExRS 30*150 mm, 5 μm; Mobile Phase A: Water (10 mmol/L $NH_4HCO_3$), Mobile Phase B: ACN; Flow rate: 60 mL/min; Gradient: 20% B to 38% B in 10 min; Wave Length: 254/220 nm; RT1 (min): 12) to afford (7R,14R)-1-(difluoromethoxy)-11-(4-(dimethylphosphoryl)-3-(trifluoromethyl)phenyl)-6-(methyl-d3)-6,7-dihydro-7,14-methanobenzo[f]benzo[4,5]imidazo[1,2-a][1,4]diazocin-5(14H)-one (57 mg, 79%) as a white solid. MS ESI calculated for $C_{28}H_{20}D_3F_5N_3O_3P$ $[M+H]^+$, 579.16, found 579.15. $^1H$ NMR (400 MHz, Chloroform-d) δ 8.66-8.46 (m, 2H), 8.12-7.82 (m, 4H), 7.62 (d, J=8.5 Hz, 1H), 7.46 (t, J=8.3 Hz, 1H), 7.32 (d, J=8.3 Hz, 1H), 6.88 (t, J=72.8 Hz, 1H), 6.38 (d, J=6.7 Hz, 1H), 5.17 (d, J=6.7 Hz, 1H), 3.62-3.47 (m, 1H), 2.96 (d, J=13.4 Hz, 1H), 1.92 (s, 3H), 1.88 (s, 3H). $^{19}$F NMR (377 MHz, Chloroform-d) δ −56.40, −80.41, −80.86, −81.07, −81.52. $^{31}$P NMR (162 MHz, Chloroform-d) δ 34.42.

Example 123: (7R,14R)-1-(difluoromethoxy)-11-(5-(dimethylphosphoryl)-4-fluoro-6-methylpyridin-2-yl)-6-(methyl-d3)-6,7-dihydro-7,14-methanobenzo[f]benzo[4,5]imidazo[1,2-a][1,4]diazocin-5(14H)-one Synthetic Scheme

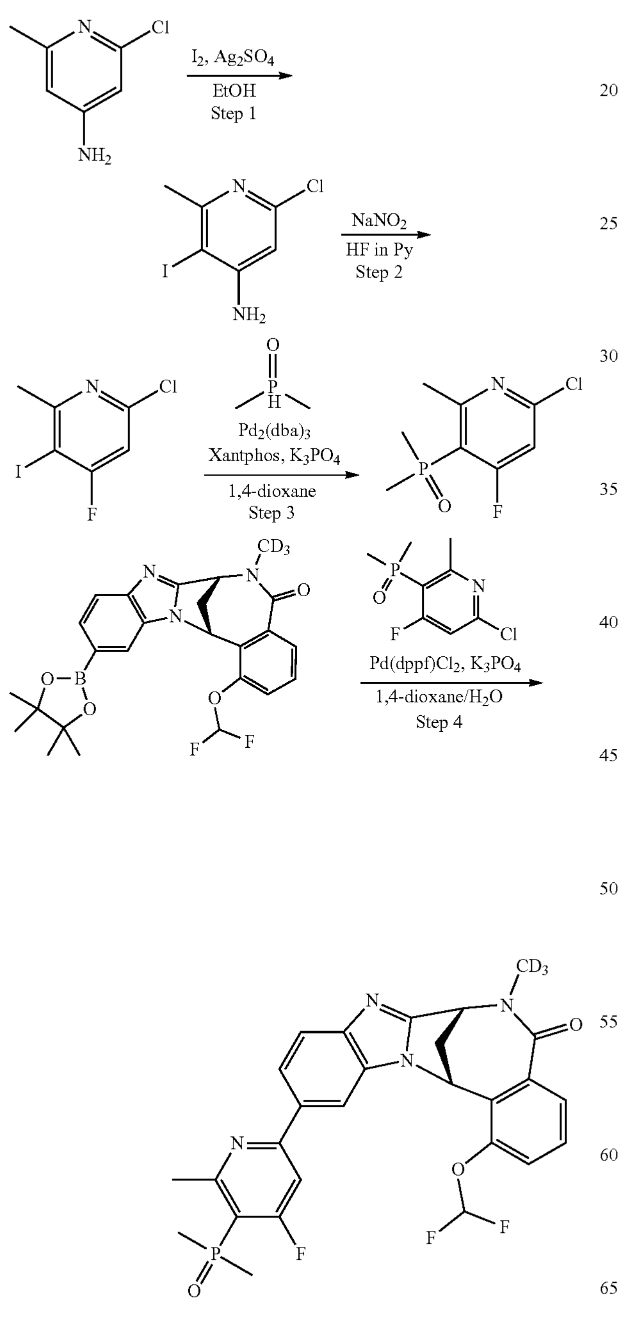

Preparation 123A: 6-chloro-3-iodo-2-methylpyridin-4-amine

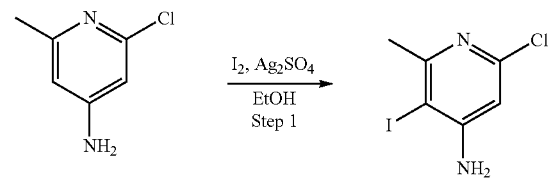

To a stirred solution of 2-chloro-6-methylpyridin-4-amine (9.50 g, 66.625 mmol) in EtOH (280 mL) were added $Ag_2SO_4$ (20.77 g, 66.625 mmol) and $I_2$ (16.91 g, 66.625 mmol) at room temperature. The resulting mixture was stirred for overnight at room temperature. To the above mixture were added EtOAc (100 mL) and TEA (9.26 mL, 66.625 mmol). The resulting mixture was stirred for additional 10 min at room temperature. The resulting mixture was filtered, the filter cake was washed with EtOAc (3×50 mL). The filtrate was concentrated under reduced pressure. The residue was purified by silica gel column chromatography, eluted with PE/EA (4/1) to afford 6-chloro-3-iodo-2-methylpyridin-4-amine (5.10 g, 28%) as a white solid. MS ESI calculated for $C_6H_6ClIN_2$ $[M+H]^+$, 268.93, found 268.90. $^1$H NMR (400 MHz, Chloroform-d) δ 6.43 (s, 1H), 4.80 (s, 2H), 2.65 (s, 3H).

Preparation 123B: 6-chloro-4-fluoro-3-iodo-2-methylpyridine

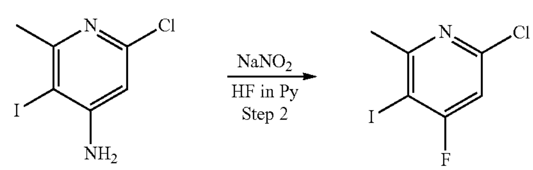

To a cold solution (0° C.) of 6-chloro-3-iodo-2-methylpyridin-4-amine (2.00 g, 7.449 mmol) in anhydrous hydrogen fluoride-pyridine solution (70%, w/w, 12 mL) in a Teflon round-bottom flask, was added $NaNO_2$ (0.77 g, 11.174 mmol) in port. The reaction mixture was stirred at 0° C. for 1 h. After warming to room temperature, the flask was equipped with a Teflon water-cooled condenser and the reaction mixture was heated at 70° C. until no gas evolution was observed. After cooling to room temperature, crushed ice (100 g) and dichloromethane (100 mL) were added. After decantation, the aqueous layer was extracted with dichloromethane (3×100 mL). The combined organic layers were dried over $Na_2SO_4$, filtered and evaporated under reduced pressure. The residue was purified by silica gel column chromatography, eluted with PE/EA (3:1) to afford 6-chloro-4-fluoro-3-iodo-2-methylpyridine (1.60 g, 79%) as a yellow oil. MS ESI calculated for $C_6H_4ClFIN$ $[M+H]^+$, 271.91, found 272.20. $^1$H NMR (400 MHz, Chloroform-d) δ 6.90 (d, J=6.7 Hz, 1H), 2.77 (s, 3H). $^{19}$F NMR (377 MHz, Chloroform-d) δ −78.18.

Preparation 123C: (6-chloro-4-fluoro-2-methylpyridin-3-yl)dimethylphosphine Oxide

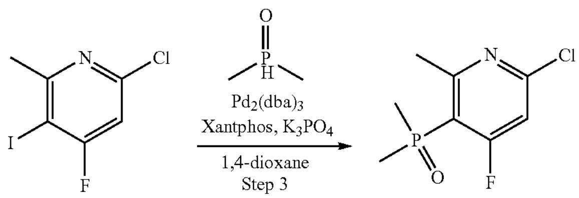

To a stirred solution of 6-chloro-4-fluoro-3-iodo-2-methylpyridine (1.60 g, 5.894 mmol) and (methylphosphonoyl) methane (0.51 g, 6.483 mmol) in 1,4-dioxane (10 mL) were added $K_3PO_4$ (1.88 g, 8.841 mmol) and $Pd_2(dba)_3$ (0.27 g, 0.295 mmol) at room temperature. The resulting mixture was stirred for 2 h at 90° C. under nitrogen atmosphere. The mixture was allowed to cool down to room temperature. The resulting mixture was filtered, the filter cake was washed with DCM (3×5 mL). The filtrate was concentrated under reduced pressure. The residue was purified by silica gel column chromatography, eluted with $CH_2Cl_2$/MeOH (0% to 10%) to afford (6-chloro-4-fluoro-2-methylpyridin-3-yl)dimethylphosphine oxide (280 mg, 21%) as a yellow solid. MS ESI calculated for $C_8H_{10}ClFNOP$ $[M+H]^+$, 222.02, found 221.85. $^1H$ NMR (400 MHz, Chloroform-d) δ 7.02-6.95 (m, 1H), 2.97 (s, 3H), 1.87 (d, J=2.5 Hz, 3H), 1.84 (d, J=2.5 Hz, 3H). $^{19}F$ NMR (377 MHz, Chloroform-d) δ −90.81. $^{31}P$ NMR (162 MHz, Chloroform-d) δ 32.60.

Example 123: (7R,14R)-1-(difluoromethoxy)-11-(5-(dimethylphosphoryl)-4-fluoro-6-methylpyridin-2-yl)-6-(methyl-d3)-6,7-dihydro-7,14-methanobenzo[f]benzo[4,5]imidazo[1,2-a][1,4]diazocin-5(14H)-one

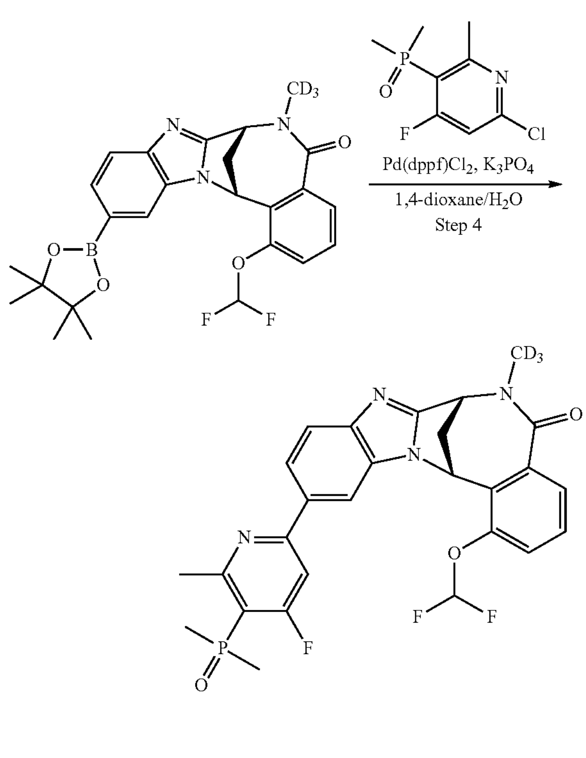

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.124 mmol) and (6-chloro-4-fluoro-2-methylpyridin-3-yl)dimethylphosphine oxide (28 mg, 0.124 mmol) in 1,4-dioxane (0.8 mL) and $H_2O$ (0.2 mL) were added $Pd(dppf)Cl_2$ (10 mg, 0.012 mmol) and $K_3PO_4$ (79 mg, 0.372 mmol) at room temperature. The resulting mixture was stirred for 1 h at 80° C. under nitrogen atmosphere. The resulting mixture was concentrated under vacuum. The residue was purified by silica gel column chromatography, eluted with $CH_2Cl_2$/MeOH (0% to 10%) followed by reversed-phase flash chromatography with the following conditions: column, C18 silica gel; mobile phase, $CH_3CN$ in Water (10 mmol/L $NH_4HCO_3$), 30% to 50% gradient in 20 min; detector, 254/220 nm to afford (7R,14R)-1-(difluoromethoxy)-11-(5-(dimethylphosphoryl)-4-fluoro-6-methylpyridin-2-yl)-6-(methyl-d3)-6,7-dihydro-7,14-methanobenzo[f]benzo[4,5]imidazo[1,2-a][1,4]diazocin-5(14H)-on (48 mg, 71%) as a white solid. MS ESI calculated for $C_{27}H_{21}D_3F_3N_4O_3P$ $[M+H]^+$, 544.17, found 544.05. $^1H$ NMR (400 MHz, Chloroform-d) δ 8.53-8.44 (m, 2H), 7.97-7.82 (m, 2H), 7.46 (t, J=8.2 Hz, 1H), 7.38-7.31 (m, 2H), 6.96 (t, J=72.7 Hz, 1H), 6.47-6.39 (m, 1H), 5.28-5.11 (m, 1H), 3.65-3.49 (m, 1H), 3.09 (s, 3H), 2.96 (d, J=12.0 Hz, 1H), 1.91 (s, 3H), 1.88 (s, 3H). $^{19}F$ NMR (377 MHz, Chloroform-d) δ −80.23, −80.68, −80.78, −81.23, −92.66. $^{31}P$ NMR (162 MHz, Chloroform-d) δ 32.94.

Example 124: (7R,14R)-1-(difluoromethoxy)-11-(6-(dimethylphosphoryl)-5-fluoropyridin-3-yl)-6-(methyl-d3)-6,7-dihydro-7,14-methanobenzo[f]benzo[4,5]imidazo[1,2-a][1,4]diazocin-5(14H)-one

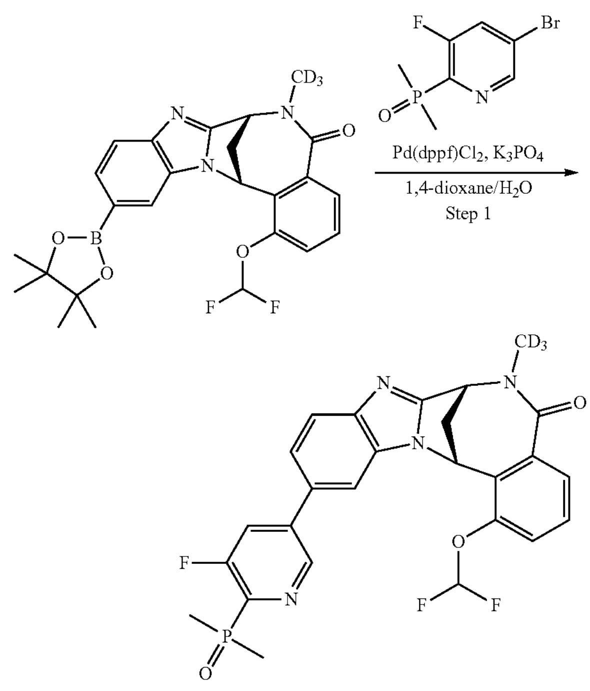

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1, 2-a][1,4]diazocin-5(14H)-one (60 mg, 0.124 mmol) and (5-bromo-3-fluoropyridin-2-yl)dimethylphosphine oxide (31 mg, 0.124 mmol) in 1,4-dioxane (0.8 mL) and $H_2O$ (0.2 mL) were added $K_3PO_4$ (79 mg, 0.372 mmol) and Pd(dppf)$Cl_2$ (10 mg, 0.012 mmol) at room temperature. The resulting mixture was stirred for 1 h at 80° C. under nitrogen atmosphere. The resulting mixture was concentrated under reduced pressure. The residue was purified by silica gel column chromatography, eluted with $CH_2Cl_2$/MeOH (0% to 10%) followed by reversed-phase flash chromatography with the following conditions: column, C18 silica gel; mobile phase, $CH_3CN$ in Water (10 mmol/L $NH_4HCO_3$), 30% to 50% gradient in 20 min; detector, 254/220 nm to afford (7R,14R)-1-(difluoromethoxy)-11-(6-(dimethylphosphoryl)-5-fluoropyridin-3-yl)-6-(methyl-d3)-6,7-dihydro-7,14-methanobenzo[f]benzo[4,5]imidazo[1,2-a][1,4]diazocin-5(14H)-one (7 mg, 10%) as a white solid. MS ESI calculated for $C_{26}H_{19}D_3F_3N_4O_3P$ $[M+H]^+$, 530.16, found 530.05. $^1H$ NMR (400 MHz, Chloroform-d) δ 8.81 (s, 1H), 8.50 (d, J=8.2 Hz, 1H), 7.85 (d, J=8.5 Hz, 1H), 7.75 (s, 1H), 7.69-7.63 (m, 1H), 7.53-7.39 (m, 2H), 7.33 (d, J=8.1 Hz, 1H), 6.87 (t, J=72.8 Hz, 1H), 6.32 (d, J=6.9 Hz, 1H), 5.06-4.98 (m, 1H), 3.55-3.43 (m, 1H), 2.92 (d, J=13.5 Hz, 1H), 1.96 (s, 3H), 1.93 (s, 3H). $^{19}F$ NMR (377 MHz, Chloroform-d) δ −80.33, −80.78, −80.80, −81.25, −116.89. $^{31}P$ NMR (162 MHz, Chloroform-d) δ 35.22.

Example 125: (7R,14R)-11-(4-(diethylphosphoryl)-3-fluorophenyl)-1-(difluoromethoxy)-6-(methyl-d3)-6,7-dihydro-7,14-methanobenzo[f]benzo[4,5]imidazo[1,2-a][1,4]diazocin-5(14H)-one

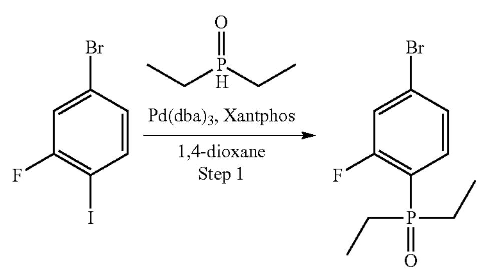

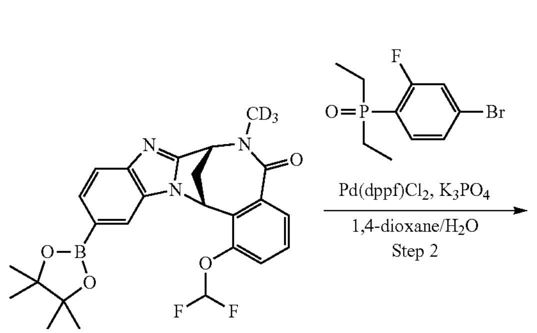

-continued

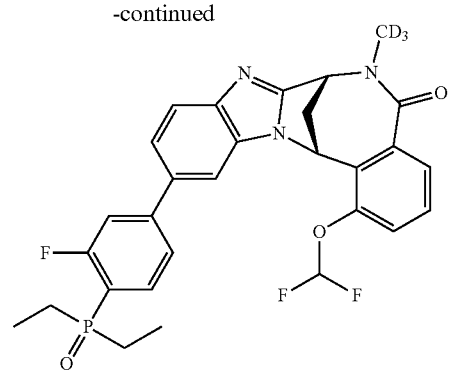

Preparation 125A: (4-bromo-2-fluorophenyl)diethylphosphine Oxide

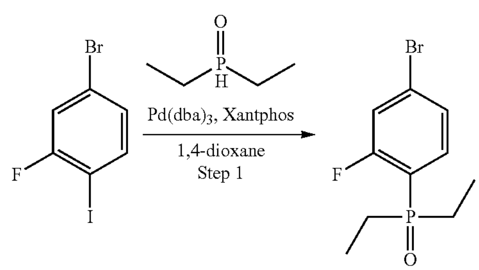

A mixture of 4-bromo-2-fluoro-1-iodobenzene (200 mg, 0.665 mmol), (ethylphosphonoyl)ethane (74 mg, 0.698 mmol), $Pd_2(dba)_3$ (30 mg, 0.033 mmol), XantPhos (39 mg, 0.067 mmol) and $K_3PO_4$ (423 mg, 1.995 mmol) in 1,4-dioxane (2 mL) was stirred for 2 h at 90° C. under nitrogen atmosphere. The resulting mixture was concentrated under vacuum. The residue was purified by silica gel column chromatography, eluted with $CH_2Cl_2$/MeOH (0~10%) to afford (4-bromo-2-fluorophenyl)diethylphosphine oxide (167 mg, 90%) as brown oil. MS ESI calculated for $C_{10}H_{13}BrFOP$ $[M+H]^+$, 278.99 280.99, found 279.10 281.10. $^1H$ NMR (400 MHz, Chloroform-d) δ 7.90-7.78 (m, 1H), 7.53-7.46 (m, 1H), 7.34-7.28 (m, 1H), 2.13-1.89 (m, 4H), 1.20-1.04 (m, 6H). $^{19}F$ NMR (377 MHz, Chloroform-d) δ −103.28, −103.31. $^{31}P$ NMR (162 MHz, Chloroform-d) δ 42.53, 42.47.

Example 125: (7R,14R)-11-(4-(diethylphosphoryl)-3-fluorophenyl)-1-(difluoromethoxy)-6-(methyl-d3)-6,7-dihydro-7,14-methanobenzo[f]benzo[4,5]imidazo[1,2-a][1,4]diazocin-5(14H)-one

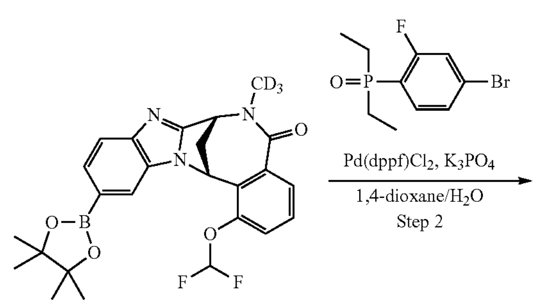

-continued

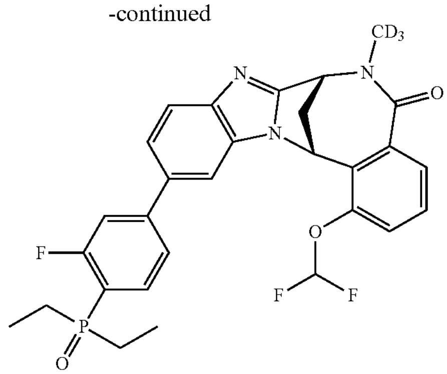

A mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol), 4-bromo-1-(diethylphosphoryl)-2-fluorobenzene (35 mg, 0.124 mmol), $K_3PO_4$ (44 mg, 0.206 mmol) and $Pd(dppf)Cl_2$ (8 mg, 0.010 mmol) in 1,4-dioxane (1 mL) and $H_2O$ (0.1 mL) was stirred for 2 h at 80° C. under nitrogen atmosphere. The resulting mixture was concentrated under vacuum. The residue was purified by silica gel column chromatography, eluted with $CH_2Cl_2$/MeOH (0~10%) followed purified by Prep-HPLC with the following conditions (Column: YMC-Actus Triart C18 ExRS 30*150 mm, 5 μm; Mobile Phase A: Water (10 mmol/L $NH_4HCO_3$+0.05% $NH_3H_2O$), Mobile Phase B: ACN; Flow rate: 60 mL/min mL/min; Gradient: 27% B to 44.2% B in 10 min; Wave Length: 254 nm/220 nm; RT1 (min): 9.85) to afford (7R,14R)-11-(4-(diethylphosphoryl)-3-fluorophenyl)-1-(difluoromethoxy)-6-(methyl-d3)-6,7-dihydro-7,14-methanobenzo[f]benzo[4,5]imidazo[1,2-a][1,4]diazocin-5(14H)-one (13 mg, 22%) as a white solid. MS ESI calculated for $C_{29}H_{24}D_3F_3N_3O_3P$ $[M+H]^+$, 557.19, found 557.25. $^1H$ NMR (400 MHz, Chloroform-d) δ 8.49 (d, J=8.2 Hz, 1H), 8.08-7.97 (m, 1H), 7.81 (d, J=8.5 Hz, 1H), 7.79-7.73 (m, 1H), 7.59-7.50 (m, 2H), 7.47-7.39 (m, 1H), 7.37-7.28 (m, 2H), 6.87 (t, J=72.8 Hz, 1H), 6.32 (d, J=7.1 Hz, 1H), 5.06 (d, J=7.0 Hz, 1H), 3.56-3.45 (m, 1H), 2.91 (d, J=13.5 Hz, 1H), 2.21-1.96 (m, 4H), 1.22-1.09 (m, 6H). $^{19}F$ NMR (376 MHz, Chloroform-d) δ −80.38, −80.83, −80.85, −81.30, −105.29, −105.31. $^{31}P$ NMR (162 MHz, Chloroform-d) δ 42.52, 42.47.

Example 126: (7R,14R)-11-(6-(diethylphosphoryl)pyridin-3-yl)-1-(difluoromethoxy)-6-(methyl-d3)-6,7-dihydro-7,14-methanobenzo[f]benzo[4,5]imidazo[1,2-a][1,4]diazocin-5(14H)-one Synthetic Scheme

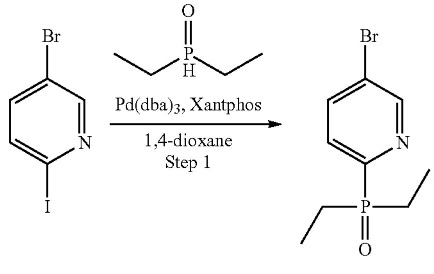

-continued

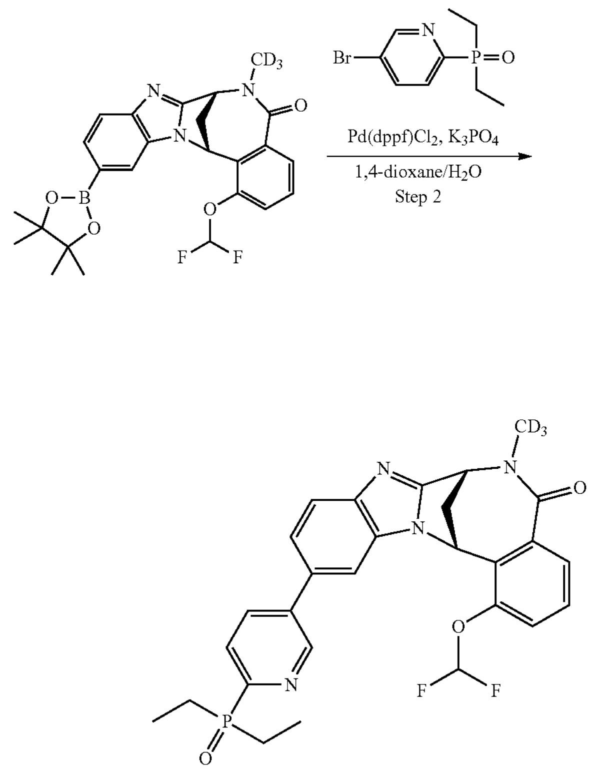

Preparation 126A: (5-bromopyridin-2-yl)diethylphosphine Oxide

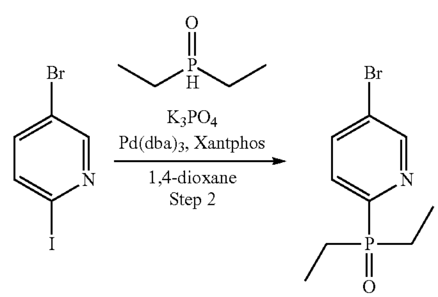

A mixture of 5-bromo-2-iodopyridine (200 mg, 0.704 mmol), (ethylphosphonoyl)ethane (78 mg, 0.739 mmol), $Pd_2(dba)_3$ (65 mg, 0.070 mmol), XantPhos (41 mg, 0.070 mmol) and $K_3PO_4$ (299 mg, 1.408 mmol) in 1,4-dioxane (2 mL) was stirred for 2 h at 90° C. under nitrogen atmosphere. The resulting mixture was concentrated under vacuum. The residue was purified by silica gel column chromatography, eluted with $CH_2Cl_2$/MeOH (0~10%) to afford (5-bromopyridin-2-yl)diethylphosphine oxide (140 mg, 76%) as brown oil. MS ESI calculated for $C_9H_{13}BrNOP$ $[M+H]^+$, 261.99 263.99, found 262.10 264.10. $^1H$ NMR (400 MHz, Chloroform-d) δ 8.76-8.70 (m, 1H), 7.99-7.90 (m, 2H), 2.04-1.93 (m, 4H), 1.11-0.97 (m, 6H). $^{31}P$ NMR (162 MHz, Chloroform-d) δ 46.00.

Example 126: (7R,14R)-11-(6-(diethylphosphoryl)pyridin-3-yl)-1-(difluoromethoxy)-6-(methyl-d3)-6,7-dihydro-7,14-methanobenzo[f]benzo[4,5]imidazo[1,2-a][1,4]diazocin-5(14H)-one

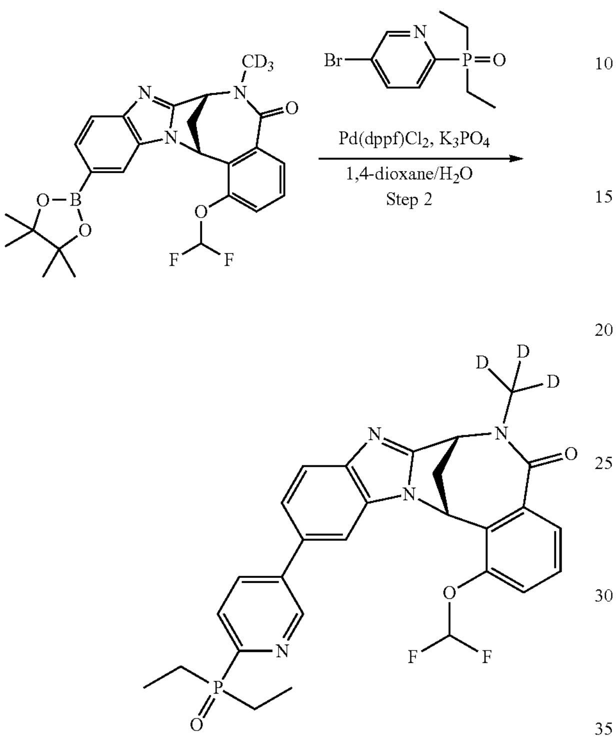

A mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol), 5-bromo-2-(diethylphosphoryl)pyridine (33 mg, 0.124 mmol), Pd(dppf)$Cl_2$ (8 mg, 0.010 mmol) and $K_3PO_4$ (44 mg, 0.206 mmol) in 1,4-dioxane (1 mL) and $H_2O$ (0.1 mL) was stirred for 2 h at 80° C. under nitrogen atmosphere. The resulting mixture was concentrated under vacuum. The residue was purified by silica gel column chromatography, eluted with $CH_2Cl_2$/MeOH (0~10%) followed purified by Prep-HPLC with the following conditions (Column: YMC-Actus Triart C18 ExRS 30*150 mm, 5 μm; Mobile Phase A: Water (10 mmol/L $NH_4HCO_3$+0.05% $NH_3H_2O$), Mobile Phase B: ACN; Flow rate: 60 mL/min mL/min; Gradient: 20% B to 37.5% B in 10 min; Wave Length: 254 nm/220 nm; RT1 (min): 10.38) to afford (7R,14R)-11-(6-(diethylphosphoryl)pyridin-3-yl)-1-(difluoromethoxy)-6-(methyl-d3)-6,7-dihydro-7,14-methanobenzo[f]benzo[4,5]imidazo[1,2-a][1,4]diazocin-5(14H)-one (28 mg, 50%) as a white solid. MS ESI calculated for $C_{28}H_{24}D_3F_2N_4O_3P$ $[M+H]^+$, 540.20, found 540.20. $^1H$ NMR (400 MHz, Chloroform-d) δ 8.98-8.93 (m, 1H), 8.55-8.48 (m, 1H), 8.23-8.17 (m, 1H), 8.05-8.01 (m, 1H), 7.91-7.83 (m, 1H), 7.80-7.73 (m, 1H), 7.58-7.53 (m, 1H), 7.48-7.39 (m, 1H), 7.38-7.31 (m, 1H), 6.87 (t, J=72.8 Hz, 1H), 6.35 (d, J=7.0 Hz, 1H), 5.14-5.07 (m, 1H), 3.61-3.46 (m, 1H), 2.97-2.87 (m, 1H), 2.17-2.01 (m, 4H), 1.22-1.07 (m, 6H). $^{19}F$ NMR (376 MHz, Chloroform-d) δ −80.83, −80.84. $^{31}P$ NMR (162 MHz, Chloroform-d) δ 45.54.

Example 127: (7R,14R)-11-(6-(diethylphosphoryl)-5-fluoropyridin-3-yl)-1-(difluoromethoxy)-6-(methyl-d3)-6,7-dihydro-7,14-methanobenzo[f]benzo[4,5]imidazo[1,2-a][1,4]diazocin-5(14H)-one Synthetic Scheme

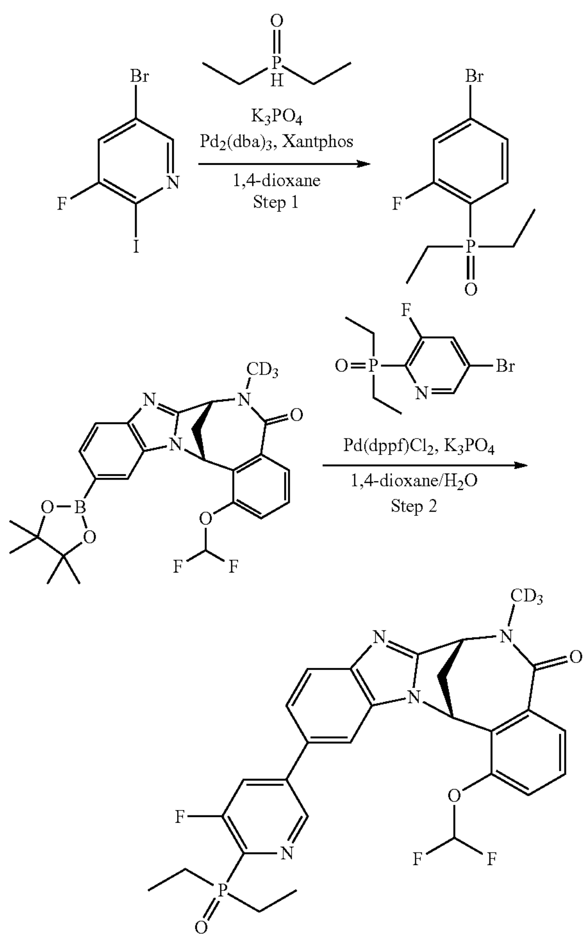

Preparation 127A: (5-bromo-3-fluoropyridin-2-yl)diethylphosphine Oxide

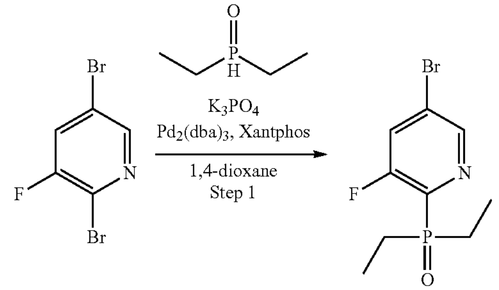

A mixture of 2,5-dibromo-3-fluoropyridine (200 mg, 0.785 mmol), (ethylphosphonoyl)ethane (87 mg, 0.824 mmol), XantPhos (45 mg, 0.079 mmol), $K_3PO_4$ (499 mg, 2.355 mmol) and $Pd_2(dba)_3$ (72 mg, 0.079 mmol) in 1,4-dioxane (2 mL) was stirred for 2 h at 90° C. under nitrogen atmosphere. The resulting mixture was concentrated under vacuum. The residue was purified by silica gel column chromatography, eluted with $CH_2Cl_2$/MeOH (0~10%) to afford (5-bromo-3-fluoropyridin-2-yl)diethylphosphine oxide (143 mg, 65%) as brown oil. MS ESI calculated for $C_9H_{12}BrFNOP$ $[M+H]^+$, 279.98 281.98, found 280.05 282.05. $^1H$ NMR (400 MHz, Chloroform-d) δ 8.61 (s, 1H), 7.71-7.63 (m, 1H), 2.23-1.92 (m, 4H), 1.24-1.06 (m, 6H). $^{19}F$ NMR (377 MHz, Chloroform-d) δ −113.07, −113.10. $^{31}P$ NMR (162 MHz, Chloroform-d) δ 46.42, 46.34.

Example 127: (7R,14R)-11-(6-(diethylphosphoryl)-5-fluoropyridin-3-yl)-1-(difluoromethoxy)-6-(methyl-d3)-6,7-dihydro-7,14-methanobenzo[f]benzo[4,5]imidazo[1,2-a][1,4]diazocin-5(14H)-one

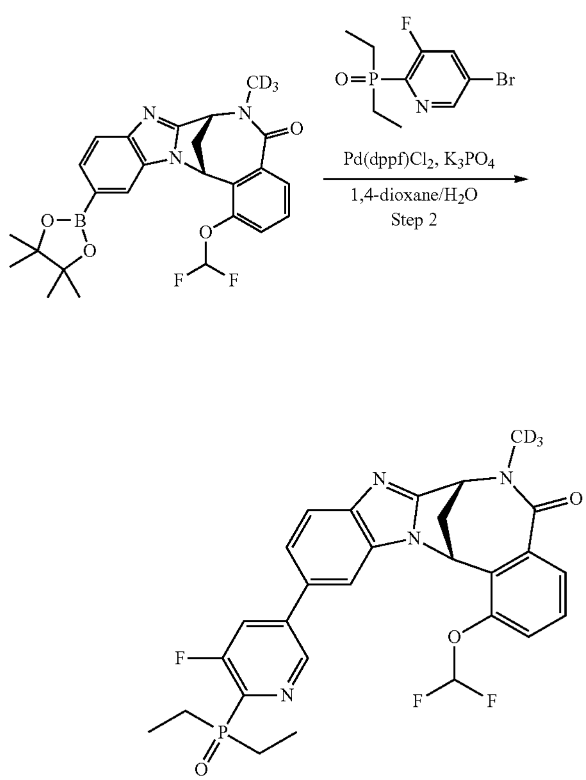

A mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol), (5-bromo-3-fluoropyridin-2-yl)diethylphosphine oxide (35 mg, 0.124 mmol), $Pd(dppf)Cl_2$ (8 mg, 0.010 mmol) and $K_3PO_4$ (44 mg, 0.206 mmol) in 1,4-dioxane (0.9 mL) and $H_2O$ (0.1 mL) was stirred for 2 h at 80° C. under nitrogen atmosphere. The resulting mixture was concentrated under vacuum. The residue was purified by silica gel column chromatography, eluted with $CH_2Cl_2$/MeOH (0~10%) followed by reversed-phase flash chromatography with the following conditions: column, C18 silica gel, mobile phase, $CH_3CN$ in Water (10 mmol/L $NH_4HCO_3$), 30% to 50% gradient in 20 min; detector, 254 nm. This resulted in (7R,14R)-11-(6-(diethylphosphoryl)-5-fluoropyridin-3-yl)-1-(difluoromethoxy)-6-(methyl-d3)-6,7-dihydro-7,14-methanobenzo[f]benzo[4,5]imidazo[1,2-a][1,4]diazocin-5(14H)-one (26 mg, 45%) as a white solid. MS ESI calculated for $C_{28}H_{23}D_3F_3N_4O_3P$ $[M+H]^+$, 558.19, found 558.15. $^1H$ NMR (400 MHz, Chloroform-d) δ 8.88-8.76 (m, 1H), 8.58-8.46 (m, 1H), 7.93-7.85 (m, 1H), 7.80-7.77 (m, 1H), 7.68-7.62 (m, 1H), 7.56-7.51 (m, 1H), 7.49-7.42 (m, 1H), 7.37-7.32 (m, 1H), 6.89 (t, J=72.8 Hz, 1H), 6.36 (d, J=7.1 Hz, 1H), 5.12 (d, J=7.1 Hz, 1H), 3.60-3.46 (m, 1H), 2.99-2.92 (m, 1H), 2.34-2.09 (m, 4H), 1.30-1.16 (m, 6H). $^{19}F$ NMR (376 MHz, Chloroform) δ −80.41, −80.86, −80.90, −81.35, −116.46, −116.49. $^{31}P$ NMR (162 MHz, Chloroform-d) δ 45.69, 45.62.

Example 128: (7R,14R)-11-(4-(dimethylphosphoryl)-3-fluorophenyl)-6-(methyl-d3)-1-(trifluoromethoxy)-6,7-dihydro-7,14-methanobenzo[f]benzo[4,5]imidazo[1,2-a][1,4]diazocin-5(14H)-one Synthetic Scheme

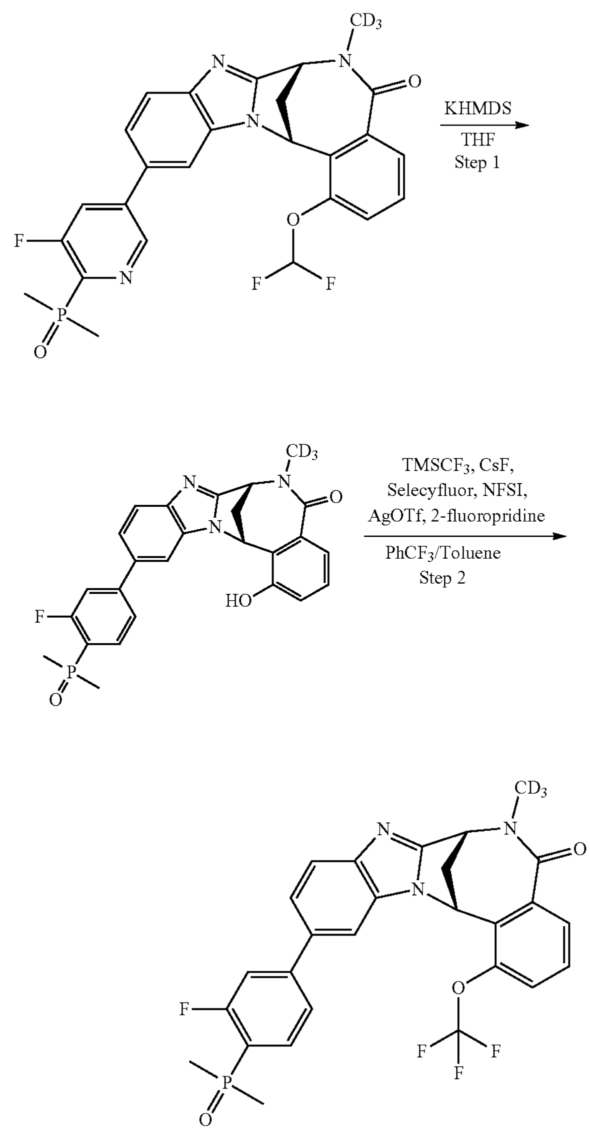

Preparation 128A: (7R,14R)-11-(4-(dimethylphosphoryl)-3-fluorophenyl)-1-hydroxy-6-(methyl-d3)-6,7-dihydro-7,14-methanobenzo[f]benzo[4,5]imidazo[1,2-a][1,4]diazocin-5(14H)-one

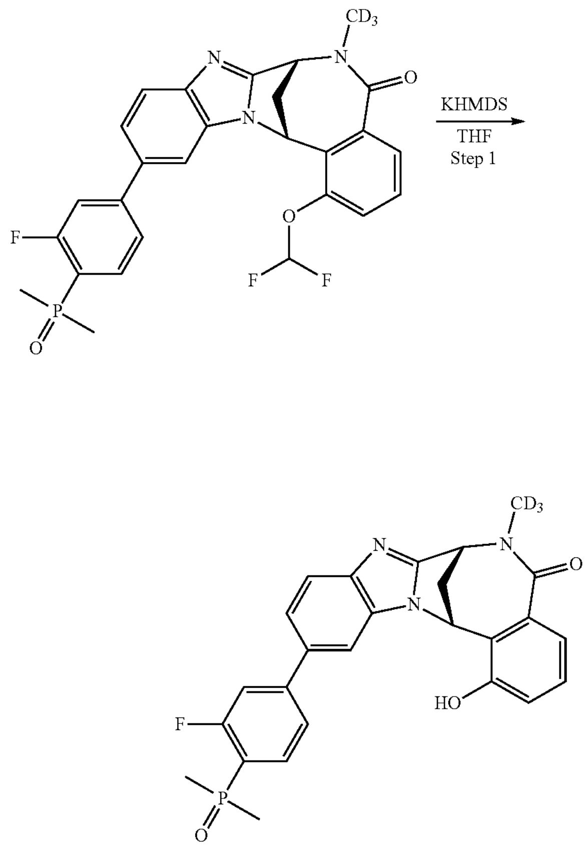

To a stirred solution of (7R,14R)-1-(difluoromethoxy)-11-(4-(dimethylphosphoryl)-3-fluorophenyl)-6-(methyl-d3)-6,7-dihydro-7,14-methanobenzo[f]benzo[4,5]imidazo[1,2-a][1,4]diazocin-5(14H)-one (140 mg, 0.265 mmol) in THF (2 mL) was added KHMDS (1.32 mL, 1.325 mmol, 1 M in THF) dropwise at 0° C. under nitrogen atmosphere. The mixture was stirred for 2 h at room temperature. The reaction was quenched by the addition of sat. $NH_4Cl$ (aq.) (50 mL) at 0° C. and extracted with $CH_2Cl_2$ (3×50 mL). The combined organic layers were washed with brine (3×80 mL), dried over anhydrous $Na_2SO_4$. After filtration, the filtrate was concentrated under reduced pressure. The residue was purified by silica gel column chromatography, eluted with $CH_2Cl_2$/MeOH (0~10%) to afford (7R,14R)-11-(4-(dimethylphosphoryl)-3-fluorophenyl)-1-hydroxy-6-(methyl-d3)-6,7-dihydro-7,14-methanobenzo[f]benzo[4,5]imidazo[1,2-a][1,4]diazocin-5(14H)-one (60 mg, 47%) as a white solid. MS ESI calculated for $C_{26}H_{20}D_3FN_3O_3P$ $[M+H]^+$, 479.16, found 479.20. $^1H$ NMR (400 MHz, Methanol-da) δ 8.07-8.02 (m, 1H), 7.96 (d, J=8.2 Hz, 1H), 7.93-7.82 (m, 1H), 7.75-7.50 (m, 4H), 7.25-7.16 (m, 1H), 7.12-7.06 (m, 1H), 6.56 (d, J=6.9 Hz, 1H), 5.22 (d, J=7.0 Hz, 1H), 3.58-3.46 (m, 1H), 2.86 (d, J=13.7 Hz, 1H), 1.89 (s, 3H), 1.86 (s, 3H). $^{19}F$ NMR (377 MHz, Methanol-$d_4$) δ −106.70. $^{31}P$ NMR (162 MHz, Methanol-$d_4$) δ 36.70.

Example 128: (7R,14R)-11-(4-(dimethylphosphoryl)-3-fluorophenyl)-6-(methyl-d3)-1-(trifluoromethoxy)-6,7-dihydro-7,14-methanobenzo[f]benzo[4,5]imidazo[1,2-a][1,4]diazocin-5(14H)-one

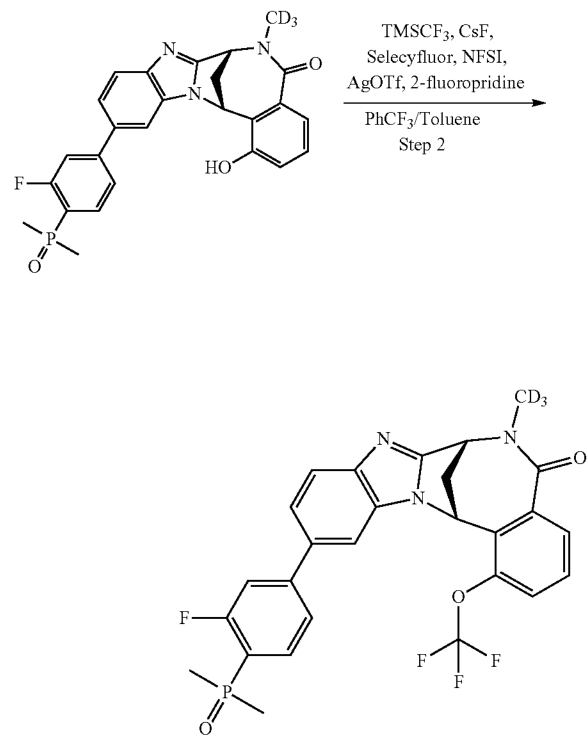

To a stirred solution of (7R,14R)-11-(4-(dimethylphosphoryl)-3-fluorophenyl)-1-hydroxy-6-(methyl-d3)-6,7-dihydro-7,14-methanobenzo[f]benzo[4,5]imidazo[1,2-a][1,4]diazocin-5(14H)-one (100 mg, 0.209 mmol) and trimethyl(trifluoromethyl)silane (297 mg, 2.090 mmol) in Toluene (2 mL) and (trifluoromethyl)benzene (2 mL) were added Selectfluor (370 mg, 1.045 mmol), CsF (317 mg, 2.090 mmol), NFSI (329 mg, 1.045 mmol), silver trifluoromethanesulfonate (537 mg, 2.090 mmol) and 2-fluoropyridine (203 mg, 2.090 mmol) at room temperature. The resulting mixture was stirred for 36 h at 50° C. under nitrogen atmosphere. The resulting mixture was concentrated under reduced pressure. The residue was purified by silica gel column chromatography, eluted with $CH_2Cl_2$/MeOH (10/1) followed by reversed-phase flash chromatography with the following conditions: column, C18 silica gel; mobile phase, $CH_3CN$ in Water (10 mmol/L $NH_4HCO_3$), 30% to 50% gradient in 20 min. This resulted in (7R,14R)-11-(4-(dimethylphosphoryl)-3-fluorophenyl)-6-(methyl-d3)-1-(trifluoromethoxy)-6,7-dihydro-7,14-methanobenzo[f]benzo[4,5]imidazo[1,2-a][1,4]diazocin-5(14H)-one (5 mg, 4%) as a white solid. MS ESI calculated for $C_{22}H_{19}D_3F_4N_3O_3P$ $[M+H]^+$, 547.15, found 547.15. $^1H$ NMR (400 MHz, Chloroform-d) δ 8.62-8.56 (m, 1H), 8.09-7.99 (m, 1H), 7.84 (d, J=8.5 Hz, 1H), 7.67 (s, 1H), 7.58-7.43 (m, 4H), 7.35-7.28 (m, 1H), 6.24 (d, J=6.8 Hz, 1H), 5.13 (d, J=6.5 Hz, 1H), 3.63-3.51 (m, 1H), 2.96 (d, J=13.4 Hz, 1H), 1.86 (s, 3H), 1.83 (s, 3H). $^{19}F$ NMR (377 MHz, Chloroform-d) δ −56.87, −105.58. $^{31}P$ NMR (162 MHz, Chloroform-d) δ 30.54.

Example 129: (7R,14R)-1-(difluoromethoxy)-11-(4-(dimethylphosphoryl)-3-fluoro-5-methoxyphenyl)-6-(methyl-d3)-6,7-dihydro-7,14-methanobenzo[f]benzo[4,5]imidazo[1,2-a][1,4]diazocin-5(14H)-one Synthetic Scheme

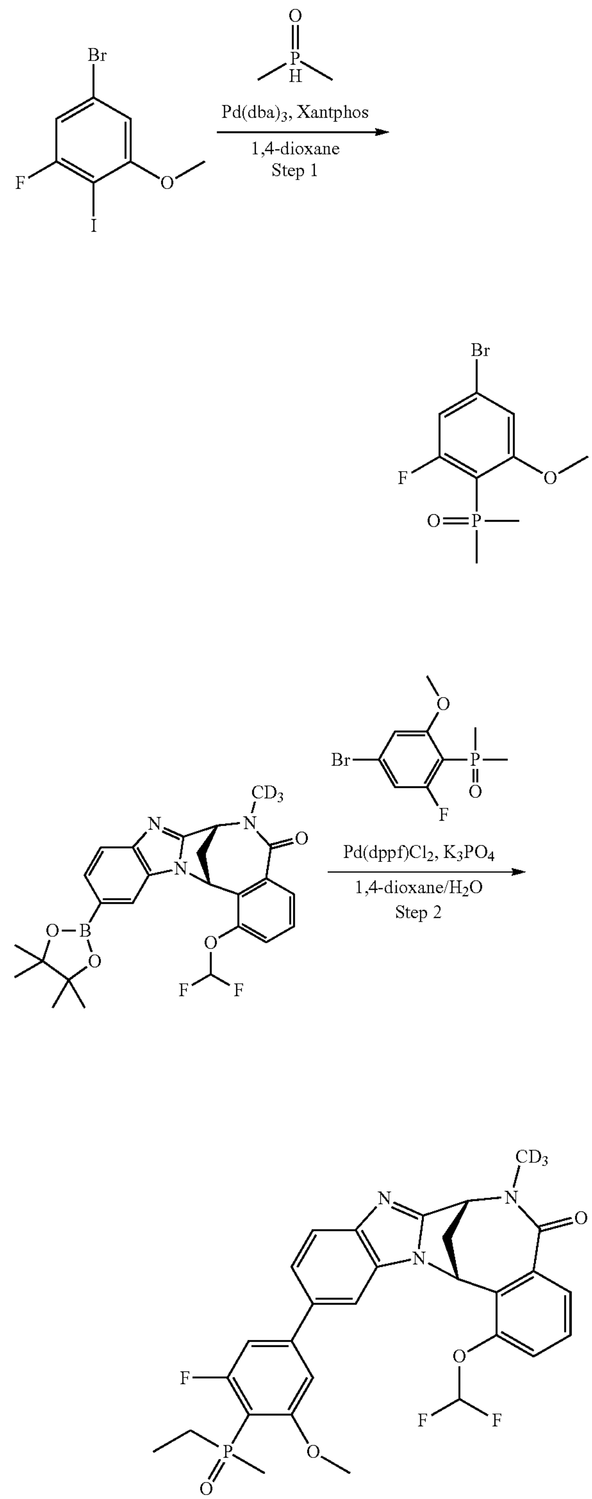

Preparation 129A: (4-bromo-2-fluoro-6-methoxyphenyl)dimethylphosphine Oxide

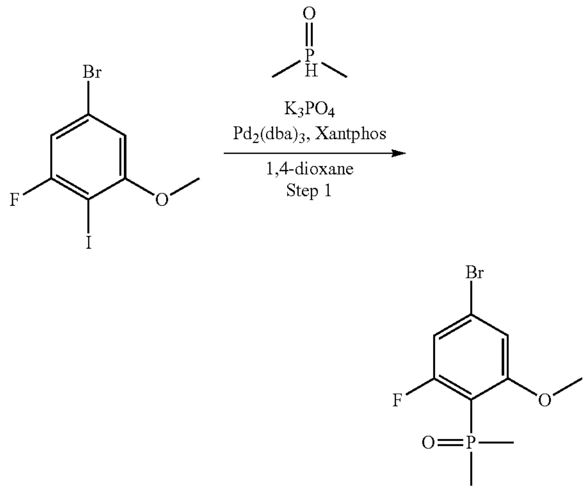

To a stirred solution of 5-bromo-1-fluoro-2-iodo-3-methoxybenzene (450 mg, 1.360 mmol) and (methylphosphonoyl)methane (106 mg, 1.360 mmol) in 1,4-dioxane (10 mL) were added $K_3PO_4$ (866 mg, 4.080 mmol), $Pd_2(dba)_3$ (62 mg, 0.068 mmol) and XantPhos (79 mg, 0.136 mmol) at room temperature. The resulting mixture was stirred for overnight at 90° C. under nitrogen atmosphere. The resulting mixture was concentrated under reduce pressure. The residue was purified by silica gel column chromatography, eluted with $CH_2Cl_2$/MeOH (9/1) to afford (4-bromo-2-fluoro-6-methoxyphenyl)dimethylphosphine oxide (75 mg, 19%) as yellow oil. MS ESI calculated for $C_9H_{11}BrFO_2P$ $[M+H]^+$, 280.97 282.97 found 281.00 282.85. $^1H$ NMR (400 MHz, Chloroform-d) δ 7.00-6.86 (m, 2H), 3.93 (d, J=1.5 Hz, 3H), 1.89 (s, 3H), 1.86 (s, 3H). $^{19}F$ NMR (377 MHz, Chloroform-d) δ −101.28, −109.46, −109.48. $^{31}P$ NMR (162 MHz, Chloroform-d) δ 33.19.

Example 129: (7R,14R)-1-(difluoromethoxy)-11-(4-(dimethylphosphoryl)-3-fluoro-5-methoxyphenyl)-6-(methyl-d3)-6,7-dihydro-7,14-methanobenzo[f]benzo[4,5]imidazo[1,2-a][1,4]diazocin-5(14H)-one

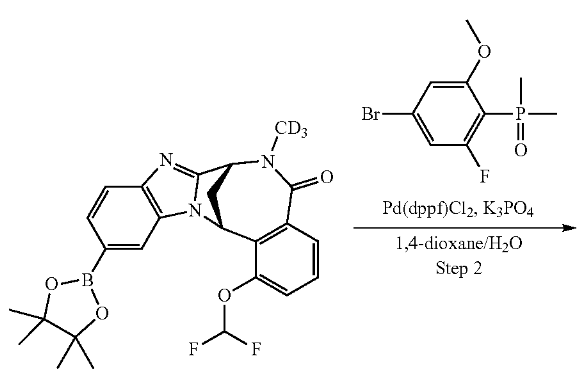

-continued

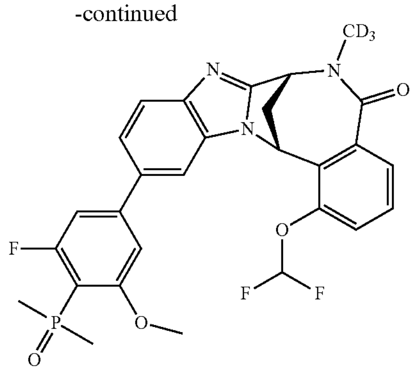

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.124 mmol) and (4-bromo-2-fluoro-6-methoxyphenyl)dimethylphosphine oxide (42 mg, 0.149 mmol) in 1,4-dioxane (1 mL) and $H_2O$ (0.1 mL) were added $K_3PO_4$ (79 mg, 0.372 mmol) and Pd(dppf)$Cl_2$ (10 mg, 0.012 mmol) at room temperature. The resulting mixture was stirred for 2 h at 80° C. under nitrogen atmosphere. The mixture was concentrated under reduce pressure. The residue was purified by silica gel column chromatography, eluted with $CH_2Cl_2$/MeOH (9/1) followed by Prep-HPLC with the following conditions (Column: XBridge Shield RP18 OBD Column 30*150 mm, 5 m; Mobile Phase A: Water (10 mmol/L $NH_4HCO_3$+0.05% $NH_3 \cdot H_2O$), Mobile Phase B: ACN; Flow rate: 60 mL/min; Gradient: 15% B to 35% B in 10 min; Wave Length: 254 nm/220 nm; RT1 (min): 11.33) to afford (7R,14R)-1-(difluoromethoxy)-11-(4-(dimethylphosphoryl)-3-fluoro-5-methoxyphenyl)-6-(methyl-d3)-6,7-dihydro-7,14-methanobenzo[f]benzo[4,5]imidazo[1,2-a][1,4]diazocin-5(14H)-one (35 mg, 51%) as white solid. MS ESI calculated for $C_{28}H_{22}D_3F_3N_3O_4P$ $[M+H]^+$, 559.17 found 559.15. $^1H$ NMR (400 MHz, Chloroform-d) δ 8.53-8.43 (m, 1H), 7.83 (d, J=8.5 Hz, 1H), 7.76 (d, J=1.7 Hz, 1H), 7.54-7.50 (m, 1H), 7.45 (t, J=8.2 Hz, 1H), 7.31 (d, J=8.2 Hz, 1H), 7.08-6.67 (m, 3H), 6.35 (d, J=7.1 Hz, 1H), 5.11 (d, J=7.1 Hz, 1H), 4.00 (s, 3H), 3.57-3.47 (m, 1H), 2.93 (d, J=13.6 Hz, 1H), 1.94 (d, J=2.4 Hz, 3H), 1.90 (d, J=2.4 Hz, 3H). $^{19}F$ NMR (377 MHz, Chloroform-d) δ −79.84, −80.29, −80.81, −81.26, −102.40. $^{31}P$ NMR (162 MHz, Chloroform-d) δ 32.38.

Example 130: (7R,14R)-1-(difluoromethoxy)-11-(4-(dimethylphosphoryl)-5-fluoro-2-methoxyphenyl)-6-(methyl-d3)-6,7-dihydro-7,14-methanobenzo[f]benzo[4,5]imidazo[1,2-a][1,4]diazocin-5(14H)-one Synthetic Scheme

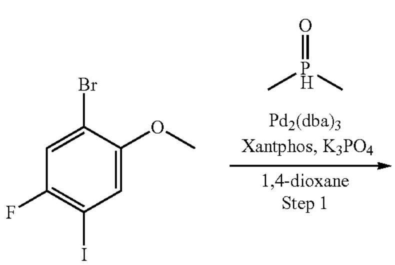

-continued

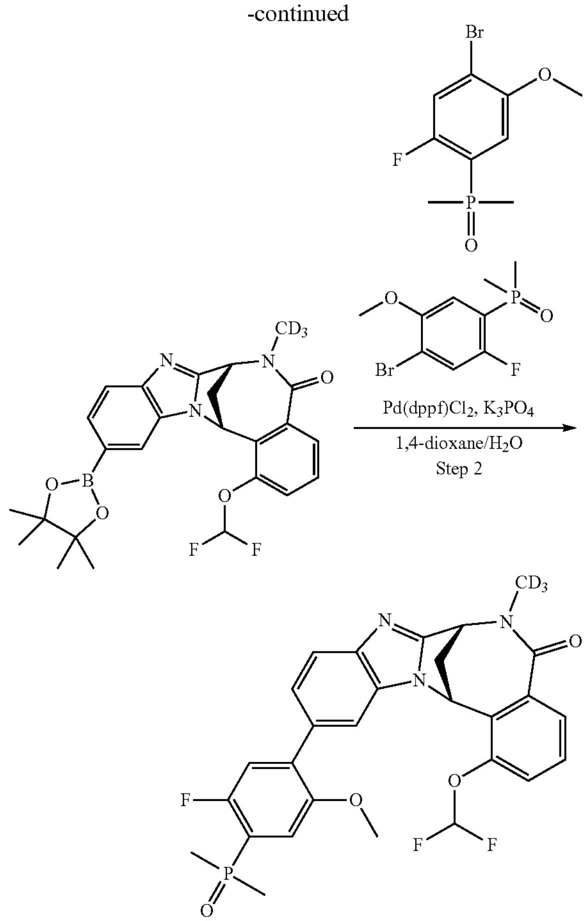

Preparation 130A: (4-bromo-2-fluoro-5-methoxyphenyl)dimethylphosphine Oxide

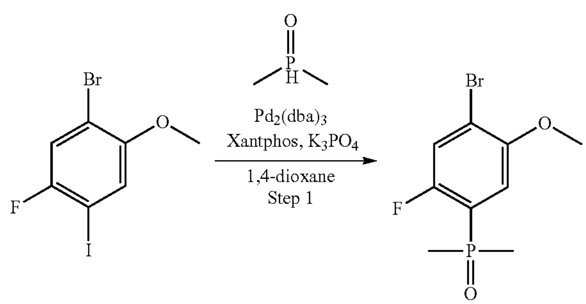

To a stirred solution of dimethylphosphine oxide (117 mg, 1.496 mmol) and 1-bromo-5-fluoro-4-iodo-2-methoxybenzene (450 mg, 1.360 mmol) in 1,4-dioxane (1 mL) were added XantPhos (79 mg, 0.136 mmol), $Pd_2(dba)_3$ (62 mg, 0.068 mmol) and $K_3PO_4$ (433 mg, 2.040 mmol) at room temperature under nitrogen atmosphere. The resulting mixture was stirred for 1 h at 80° C. under nitrogen atmosphere. The mixture was concentrated under reduced pressure. The residue was purified by silica gel column chromatography, eluted with $CH_2Cl_2$/MeOH (0% to 10%) to afford (4-bromo-2-fluoro-5-methoxyphenyl)dimethylphosphine oxide (110 mg, 37%) as a white solid. MS ESI calculated for $C_9H_{11}BrFO_2P$ [M+H]+, 280.97 282.97, found 281.00 283.00. $^1$H NMR (400 MHz, Chloroform-d) δ 7.49-7.41 (m, 1H), 7.40-7.34 (m, 1H), 3.96 (s, 3H), 1.83 (s, 3H), 1.80 (s, 3H). $^{19}$F NMR (377 MHz, Chloroform-d) δ −115.46. $^{31}$P NMR (162 MHz, Chloroform-d) δ 32.07.

Example 130: (7R,14R)-1-(difluoromethoxy)-11-(4-(dimethylphosphoryl)-5-fluoro-2-methoxyphenyl)-6-(methyl-d3)-6,7-dihydro-7,14-methanobenzo[f]benzo[4,5]imidazo[1,2-a][1,4]diazocin-5(14H)-one

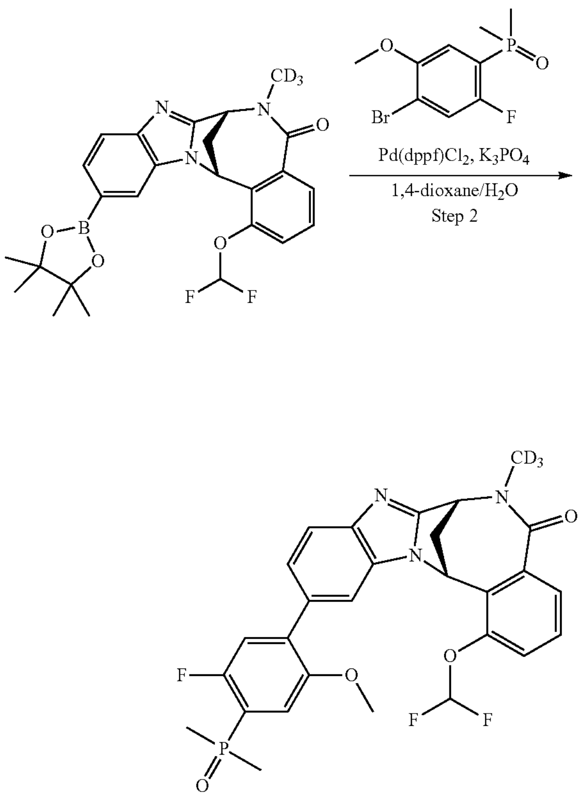

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.124 mmol) and (4-bromo-2-fluoro-5-methoxyphenyl)dimethylphosphine oxide (35 mg, 0.124 mmol) in 1,4-dioxane (0.8 mL) and $H_2O$ (0.2 mL) were added Pd(dppf)$Cl_2$ (10 mg, 0.012 mmol) and $K_3PO_4$ (79 mg, 0.372 mmol) at room temperature. The resulting mixture was stirred for 1 h at 80° C. under nitrogen atmosphere. The resulting mixture was concentrated under vacuum. The residue was purified by silica gel column chromatography, eluted with $CH_2Cl_2$/MeOH (0% to 10%) to afford followed by Prep-HPLC with the following conditions (Column: XBridge Prep Phenyl OBD Column 19*250 mm, 5 m; Mobile Phase A: Water (10 mmol/L $NH_4HCO_3$), Mobile Phase B: ACN; Flow rate: 60 mL/min; Gradient: 21% B to 36% B in 10 min; Wave Length: 254/220 nm) to afford (7R,14R)-1-(difluoromethoxy)-11-(4-(dimethylphosphoryl)-5-fluoro-2-methoxyphenyl)-6-(methyl-d3)-6,7-dihydro-7,14-methanobenzo[f]benzo[4,5]imidazo[1,2-a][1,4]diazocin-5(14H)-one (54 mg, 77%) as a white solid. MS ESI calculated for $C_{29}H_{22}D_3F_3N_3O_4P$ [M+H]+, 559.17, found 559.05. $^1$H NMR (400 MHz, Chloroform-d) δ 8.50 (d, J=8.3, 1.3 Hz, 1H), 7.83-7.75 (m, 2H), 7.57-7.49 (m, 1H), 7.46-7.38 (m, 2H), 7.30 (d, J=8.2 Hz, 1H), 7.14-7.07 (m, 1H), 6.79 (t, J=72.9 Hz, 1H), 6.30 (d, J=7.1 Hz, 1H), 5.04 (d, J=7.0 Hz, 1H), 3.87 (s, 3H), 3.55-3.43 (m, 1H), 2.90 (d, J=13.5 Hz, 1H), 1.86 (s, 3H), 1.83 (s, 3H). $^{19}$F NMR (377 MHz, Chloroform-d) δ −80.05, −80.50, −80.62, −81.07, −116.71, −116.72. $^{31}$P NMR (162 MHz, Chloroform-d) δ 30.91, 30.88.

Example 131: (7R,14R)-11-(3-amino-4-(dimethylphosphoryl)-5-fluorophenyl)-1-(difluoromethoxy)-6-(methyl-d3)-6,7-dihydro-7,14-methanobenzo[f]benzo[4,5]imidazo[1,2-a][1,4]diazocin-5(14H)-one Synthetic Scheme

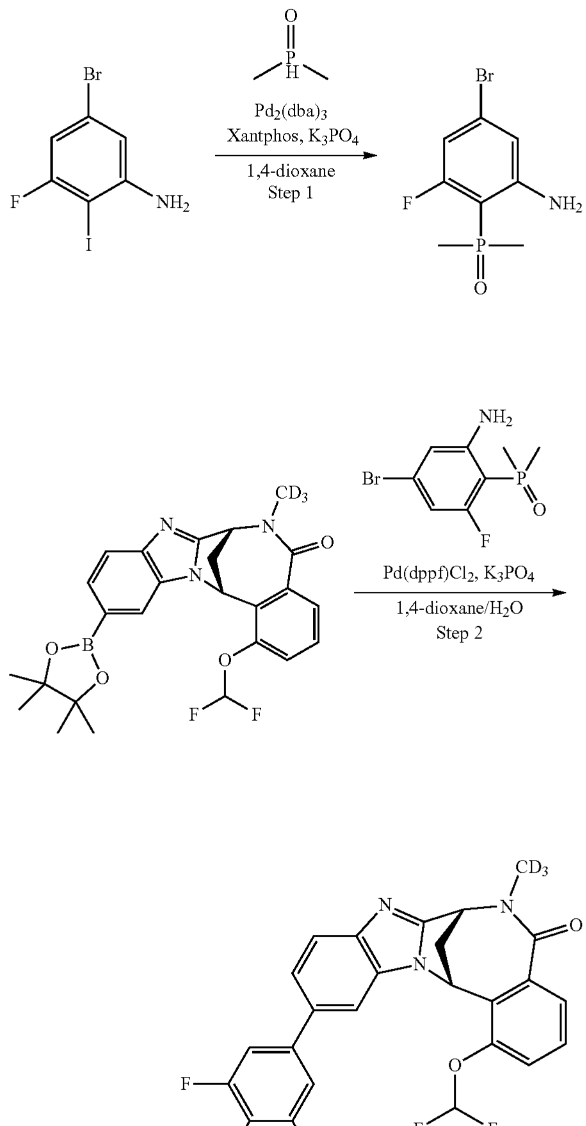

Preparation 131A: (2-amino-4-bromo-6-fluorophenyl)dimethylphosphine Oxide

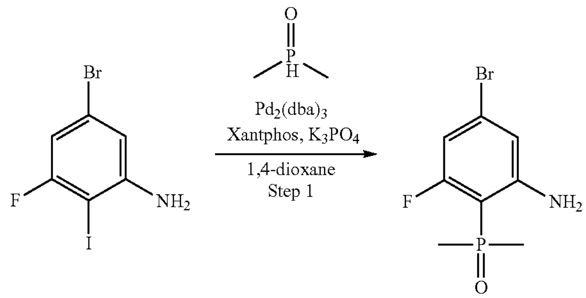

To a stirred solution of dimethylphosphine oxide (272 mg, 3.482 mmol) and 5-bromo-3-fluoro-2-iodoaniline (1.00 g, 3.165 mmol) in 1,4-dioxane (10 mL) were added XantPhos (183 mg, 0.317 mmol), $Pd_2(dba)_3$ (145 mg, 0.158 mmol) and $K_3PO_4$ (1.01 g, 4.748 mmol) at room temperature. The resulting mixture was stirred for 2 h at 80° C. under nitrogen atmosphere. The mixture was concentrated under reduced pressure. The residue was purified by silica gel column chromatography, eluted with $CH_2Cl_2$/MeOH (0% to 10%) to afford (2-amino-4-bromo-6-fluorophenyl)dimethylphosphine oxide (250 mg, 29%) as a yellow solid. MS ESI calculated for $C_8H_{10}BrFNOP$ $[M+H]^+$, 265.97 267.97, found 266.00 268.00. $^1H$ NMR (400 MHz, Chloroform-d) δ 6.80 (d, J=2.2 Hz, 1H), 6.35-6.26 (m, 1H), 3.62 (s, 2H), 1.90 (d, J=3.6 Hz, 3H), 1.87 (d, J=3.6 Hz, 3H). $^{19}F$ NMR (377 MHz, Chloroform-d) δ −98.61. $^{31}P$ NMR (162 MHz, Chloroform-d) δ 34.88.

Example 131: (7R,14R)-11-(3-amino-4-(dimethylphosphoryl)-5-fluorophenyl)-1-(difluoromethoxy)-6-(methyl-d3)-6,7-dihydro-7,14-methanobenzo[f]benzo[4,5]imidazo[1,2-a][1,4]diazocin-5(14H)-one

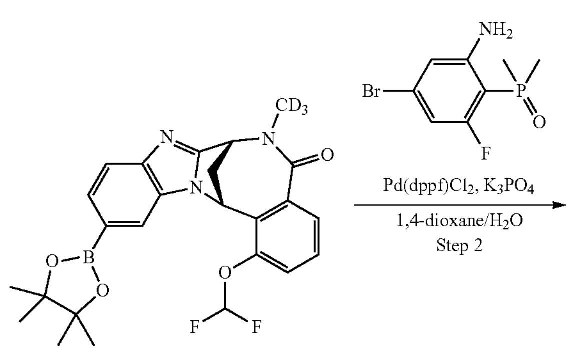

-continued

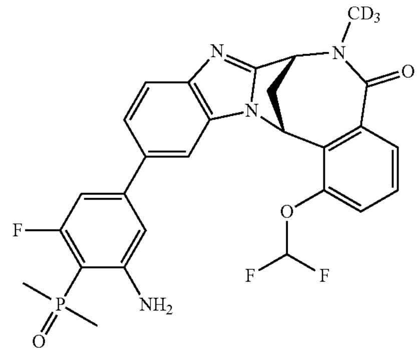

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.124 mmol) and (2-amino-4-bromo-6-fluorophenyl)dimethylphosphine oxide (40 mg, 0.149 mmol) in 1,4-dioxane (0.8 mL) and $H_2O$ (0.2 mL) were added $Pd(dppf)Cl_2$ (10 mg, 0.012 mmol) and $K_3PO_4$ (79 mg, 0.372 mmol) at room temperature. The resulting mixture was stirred for 1 h at 80° C. under nitrogen atmosphere. The resulting mixture was concentrated under vacuum. The residue was purified by silica gel column chromatography, eluted with $CH_2Cl_2$/MeOH (0% to 10%) followed by Prep-HPLC with the following conditions (Column: XBridge Prep Phenyl OBD Column 19*250 mm, 5 m; Mobile Phase A: Water (10 mmol/L $NH_4HCO_3$), Mobile Phase B: ACN; Flow rate: 60 mL/min; Gradient: 15% B to 20% B in 10 min; Wave Length: 254/220 nm) to afford (7R,14R)-11-(3-amino-4-(dimethylphosphoryl)-5-fluorophenyl)-1-(difluoromethoxy)-6-(methyl-d3)-6,7-dihydro-7,14-methanobenzo[f]benzo[4,5]imidazo[1,2-a][1,4]diazocin-5(14H)-one (35 mg, 52%) as a white solid. MS ESI calculated for $C_{27}H_{21}D_3F_3N_4O_3P$ $[M+H]^+$, 544.17, found 544.05. $^1H$ NMR (400 MHz, DMSO-$d_6$) δ 8.27 (d, J=7.9 Hz, 1H), 7.78-7.55 (m, 2H), 7.51-7.36 (m, 3H), 7.16 (d, J=8.4 Hz, 1H), 6.38-6.30 (m, 1H), 6.21 (d, J=7.2 Hz, 2H), 6.04 (s, 2H), 5.22 (d, J=7.1 Hz, 1H), 3.60-3.47 (m, 1H), 2.80 (d, J=13.8 Hz, 1H), 1.37-0.76 (m, 6H). $^{19}F$ NMR (377 MHz, DMSO-$d_6$) δ −79.39, −79.85, −81.81, −83.43, −83.88, −102.07. $^{31}P$ NMR (162 MHz, DMSO-$d_6$) δ 28.63.

Example 132: (7R,14R)-1-(difluoromethoxy)-11-(5-(dimethylphosphoryl)-6-fluoro-4-methylpyridin-2-yl)-6-(methyl-d3)-6,7-dihydro-7,14-methanobenzo[f]benzo[4,5]imidazo[1,2-a][1,4]diazocin-5(14H)-one Synthetic Scheme

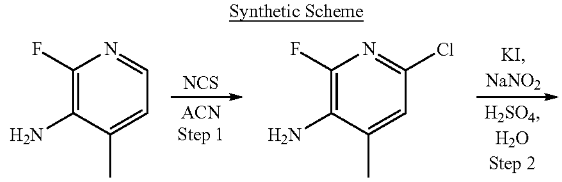

-continued

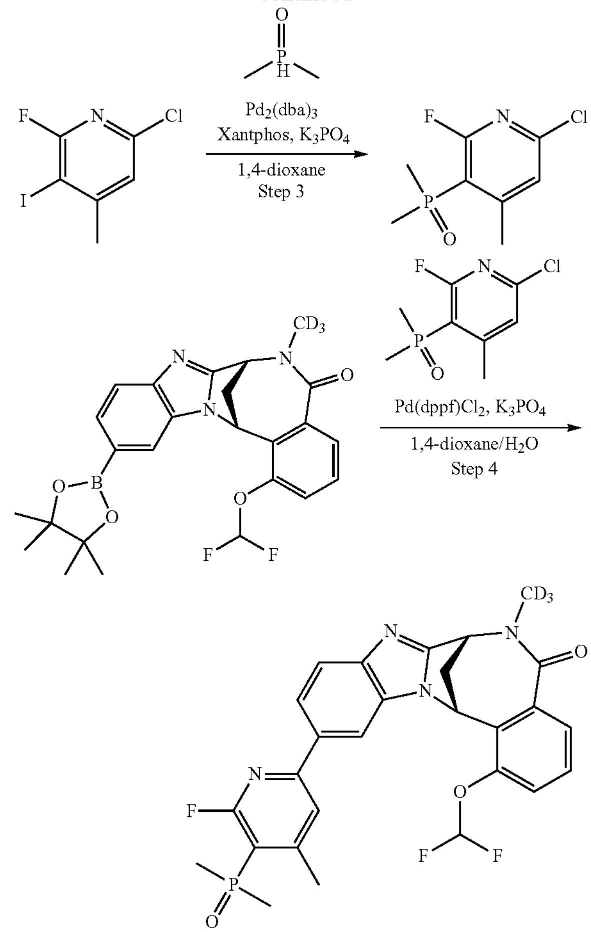

Preparation 132A:
6-chloro-2-fluoro-4-methylpyridin-3-amine

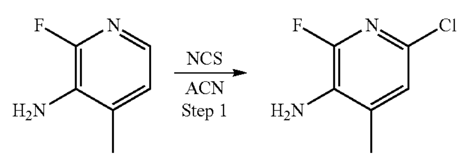

A solution of 2-fluoro-4-methylpyridin-3-amine (10.00 g, 79.281 mmol) and NCS (11.64 g, 87.209 mmol) in ACN (200 mL) was stirred for 3 h at room temperature. The reaction was quenched by the addition of water (50 mL) at room temperature. The resulting mixture was extracted with $CH_2Cl_2$ (3×300 mL). The combined organic layers were washed with brine (3×300 mL), dried over anhydrous $Na_2SO_4$. After filtration, the filtrate was concentrated under reduced pressure. The residue was purified by silica gel column chromatography, eluted with PE/EA (4/1) to afford 6-chloro-2-fluoro-4-methylpyridin-3-amine (10.91 g, 86%) as an orange solid. MS ESI calculated for $C_6H_6ClFN_2$ $[M+H]^+$, 161.02, found 160.95. $^1H$ NMR (400 MHz, Chloroform-d) δ 6.92 (s, 1H), 3.61 (s, 2H), 2.21 (s, 3H). $^{19}F$ NMR (377 MHz, Chloroform-d) δ −87.75.

Preparation 132B:
6-chloro-2-fluoro-3-iodo-4-methylpyridine

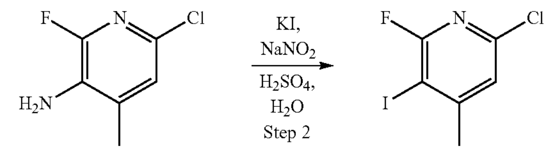

A solution of 6-chloro-2-fluoro-4-methylpyridin-3-amine (8.00 g, 49.819 mmol) in conc. $H_2SO_4$ (132 mL) was stirred for 10 min at room temperature. To the above mixture was added $NaNO_2$ (3.61 g, 52.310 mmol) at 0° C. The resulting mixture was stirred for additional 1 h at room temperature. To a stirred solution of KI (8.7 g, 52.310 mmol) in $H_2O$ (103 mL) was added above solution dropwise at 0° C. The resulting mixture was stirred for 2 h at room temperature. The resulting mixture was extracted with EtOAc (3×200 mL). The combined organic layers were washed with brine (3×300 mL), dried over anhydrous $Na_2SO_4$. After filtration, the filtrate was concentrated under reduced pressure. The residue was purified by silica gel column chromatography, eluted with PE/EA (5/1) to afford 6-chloro-2-fluoro-3-iodo-4-methylpyridine (5.13 g, 38%) as a light yellow liquid. MS ESI calculated for $C_6H_4ClFIN$ $[M+H]^+$, 271.91, found 271.95. $^1H$ NMR (400 MHz, Chloroform-d) δ 7.11 (s, 1H), 2.48 (s, 3H). $^{19}F$ NMR (377 MHz, Chloroform-d) δ −52.37.

Preparation 132C:
3-(1-aminoethyl)-1-methylpyridin-2-one

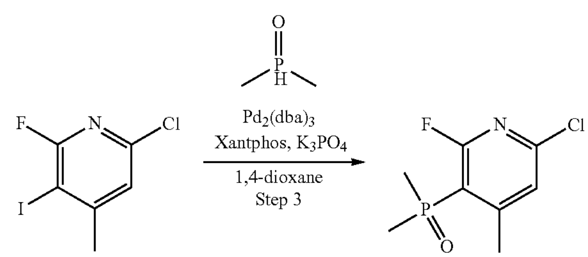

To a stirred solution of 6-chloro-2-fluoro-3-iodo-4-methylpyridine (1.00 g, 3.684 mmol) and (methylphosphonoyl)methane (316 mg, 4.052 mmol) in 1,4-dioxane (10 mL) were added $Pd_2(dba)_3$ (337 mg, 0.368 mmol), XantPhos (426 mg, 0.737 mmol) and $K_3PO_4$ (1.6 g, 7.368 mmol) at room temperature under nitrogen atmosphere. The resulting mixture was stirred for 2 h at 100° C. under nitrogen atmosphere. The resulting mixture was concentrated under vacuum. The residue was purified by silica gel column chromatography, eluted with $CH_2Cl_2$/MeOH (10/1) to afford 6-chloro-3-(dimethylphosphoryl)-2-fluoro-4-methylpyridine (450 mg, 55%) as a red solid. MS ESI calculated for $C_8H_{10}ClFNOP$ $[M+H]^+$, 222.02, found 221.95. $^1H$ NMR (400 MHz, Chloroform-d) δ 7.16 (s, 1H), 2.83 (s, 3H), 1.89 (s, 3H), 1.85 (s, 3H).

Example 132: (7R,14R)-1-(difluoromethoxy)-11-(5-(dimethylphosphoryl)-6-fluoro-4-methylpyridin-2-yl)-6-(methyl-d3)-6,7-dihydro-7,14-methanobenzo[f]benzo[4,5]imidazo[1,2-a][1,4]diazocin-5(14H)-one

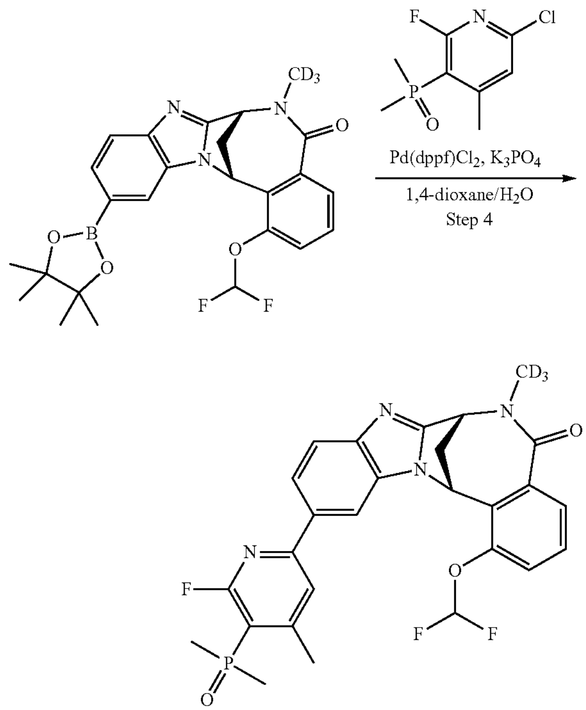

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (80 mg, 0.165 mmol) and 6-chloro-3-(dimethylphosphoryl)-2-fluoro-4-methylpyridine (55 mg, 0.247 mmol) in 1,4-dioxane (1 mL) and $H_2O$ (0.2 mL) were added Pd(dppf)$Cl_2$ (13 mg, 0.017 mmol) and $K_3PO_4$ (105 mg, 0.495 mmol) at room temperature under nitrogen atmosphere. The resulting mixture was stirred for 1 h at 80° C. under nitrogen atmosphere. The resulting mixture was concentrated under vacuum. The residue was purified by silica gel column chromatography, eluted with DCM/MeOH (0% to 10%) followed by Prep-HPLC with the following conditions: Column: C18 Column 120 g; Mobile Phase A: water (10 mmol/L $NH_4HCO_3$), Mobile Phase B: $CH_3CN$; Flow rate: 60 mL/min; Gradient: 30% B to 70% B in 20 min; 254/220 nm to afford (7R,14R)-1-(difluoromethoxy)-11-(5-(dimethylphosphoryl)-6-fluoro-4-methylpyridin-2-yl)-6-(methyl-d3)-6,7-dihydro-7,14-methanobenzo[f]benzo[4,5]imidazo[1,2-a][1,4]diazocin-5(14H)-one (58 mg, 64%) as a white solid. MS ESI calculated for $C_{27}H_{21}D_3F_3N_4O_3P$ $[M+H]^+$, 544.17, found 544.05. $^1H$ NMR (400 MHz, Chloroform-d) δ 8.48 (d, J=8.2 Hz, 1H), 8.22 (s, 1H), 7.93 (d, J=8.6 Hz, 1H), 7.78 (d, J=8.6 Hz, 1H), 7.54 (s, 1H), 7.42 (t, J=8.2 Hz, 1H), 7.32 (d, J=8.1 Hz, 1H), 6.96 (t, J=72.8 Hz, 1H), 6.33 (d, J=7.1 Hz, 1H), 4.99 (d, J=7.0 Hz, 1H), 3.54-3.42 (m, 1H), 2.91 (d, J=8.8 Hz, 4H), 1.92 (s, 3H), 1.88 (s, 3H). $^{19}F$ NMR (377 MHz, Chloroform-d) δ −55.75, −55.79, −80.07, −80.52, −80.97, −81.42. $^{31}P$ NMR (162 MHz, Chloroform-d) δ 36.01.

Example 133: 5-((7R,14R)-1-(difluoromethoxy)-6-(methyl-d3)-5-oxo-5,6,7,14-tetrahydro-7,14-methanobenzo[f]benzo[4,5]imidazo[1,2-a][1,4]diazocin-11-yl)-2-(dimethylphosphoryl)-3-fluorobenzonitrile Synthetic Scheme

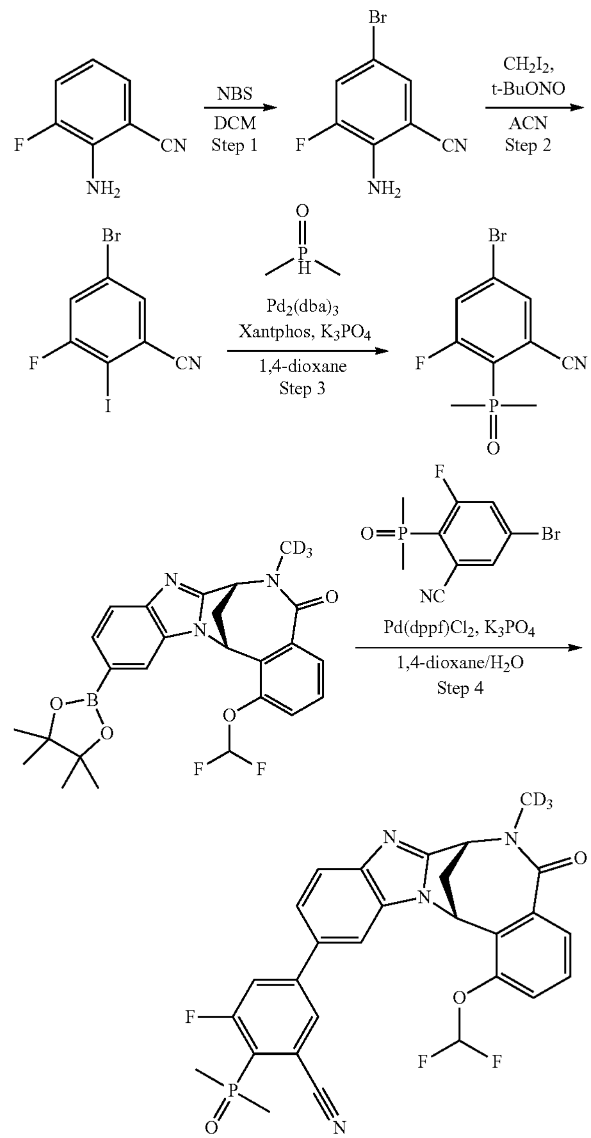

Preparation 133A: 2-amino-5-bromo-3-fluorobenzonitrile

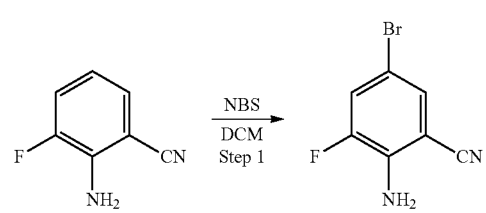 [SMILES: N#Cc1cccc(F)c1N ; "NBS" ; N#Cc1cc(Br)cc(F)c1N]

A solution of 2-amino-3-fluorobenzonitrile (3.00 g, 22.038 mmol) and NBS (3.92 g, 22.038 mmol) in DCM (60 mL) was stirred for 3 h at room temperature. The reaction was quenched by the addition of sat. sodium thiosulfate (aq.) (50 mL) at 0° C. The resulting mixture was extracted with $CH_2Cl_2$ (3×150 mL). The combined organic layers were washed with brine (2×100 mL), dried over anhydrous $Na_2SO_4$. After filtration, the filtrate was concentrated under reduced pressure to afford 2-amino-5-bromo-3-fluorobenzonitrile (4.60 g, 98%) as purple solid. MS ESI calculated for $C_7H_4BrFN_2$ $[M-H]^-$, 212.95 214.95, found 212.75 214.75. $^1H$ NMR (400 MHz, Chloroform-d) δ 7.35-7.29 (m, 2H), 4.53 (s, 2H). $^{19}F$ NMR (377 MHz, Chloroform-d) δ −129.90.

Preparation 133B: 5-bromo-3-fluoro-2-iodobenzonitrile

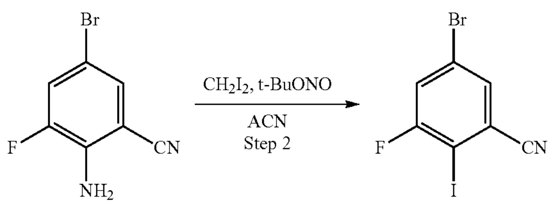 [SMILES: N#Cc1cc(Br)cc(F)c1N ; N#Cc1cc(Br)cc(F)c1I]

To a stirred solution of 2-amino-5-bromo-3-fluorobenzonitrile (4.77 g, 22.183 mmol) and $CH_2I_2$ (29.71 g, 110.915 mmol) in ACN (100 mL) was added tert-butyl nitrite (4.58 g, 44.366 mmol) dropwise at 0° C. under nitrogen atmosphere. The resulting mixture was stirred for 30 min at 0° C. and then for 2 h at 50° C. The mixture was allowed to cool down to room temperature and concentrated under reduce pressure. The residue was purified by silica gel column chromatography, eluted with PE/EA (3:1) to afford 5-bromo-3-fluoro-2-iodobenzonitrile (410 mg, 6%) as pink solid. MS ESI calculated for $C_7H_2BrFIN$ $[M+H]^+$, 325.84 327.84, found N/A. $^1H$ NMR (400 MHz, Chloroform-d) δ 7.58 (s, 1H), 7.47-7.40 (m, 1H). $^{19}F$ NMR (377 MHz, Chloroform-d) δ −85.09.

Preparation 133C: 5-bromo-2-(dimethylphosphoryl)-3-fluorobenzonitrile

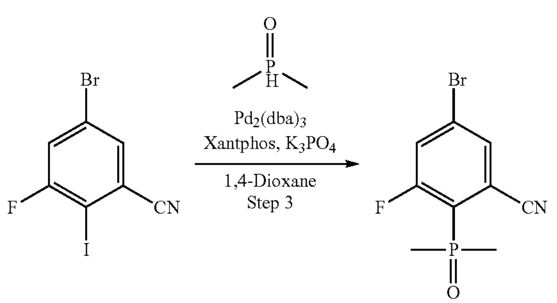

To a stirred solution of 5-bromo-3-fluoro-2-iodobenzonitrile (280 mg, 0.859 mmol) and dimethylphosphine oxide (81 mg, 1.031 mmol) in 1,4-dioxane (3 mL) were added $K_3PO_4$ (219 mg, 1.031 mmol), XantPhos (50 mg, 0.086 mmol) and $Pd_2(dba)_3$ (39 mg, 0.043 mmol) at room temperature under nitrogen atmosphere. The resulting mixture was stirred for 16 h at 60° C. under nitrogen atmosphere. The resulting mixture was concentrated under reduced pressure. The residue was purified by silica gel column chromatography, eluted with $CH_2Cl_2$/MeOH (10/1) to afford 5-bromo-2-(dimethylphosphoryl)-3-fluorobenzonitrile (35 mg, 15%) as a white solid. MS ESI calculated for $C_9H_8BrFNOP$ $[M+H]^+$, 275.95 277.95, found 275.85 277.85. $^1H$ NMR (400 MHz, Chloroform-d) δ 7.85 (s, 1H), 7.63-7.52 (m, 1H), 1.93 (d, J=2.1 Hz, 3H), 1.90 (d, J=2.1 Hz, 3H). $^{19}F$ NMR (377 MHz, Chloroform-d) δ −98.56. $^{31}P$ NMR (162 MHz, Chloroform-d) δ 31.63.

Example 133: 5-((7R,14R)-1-(difluoromethoxy)-6-(methyl-d3)-5-oxo-5,6,7,14-tetrahydro-7,14-methanobenzo[f]benzo[4,5]imidazo[1,2-a][1,4]diazocin-11-yl)-2-(dimethylphosphoryl)-3-fluorobenzonitrile

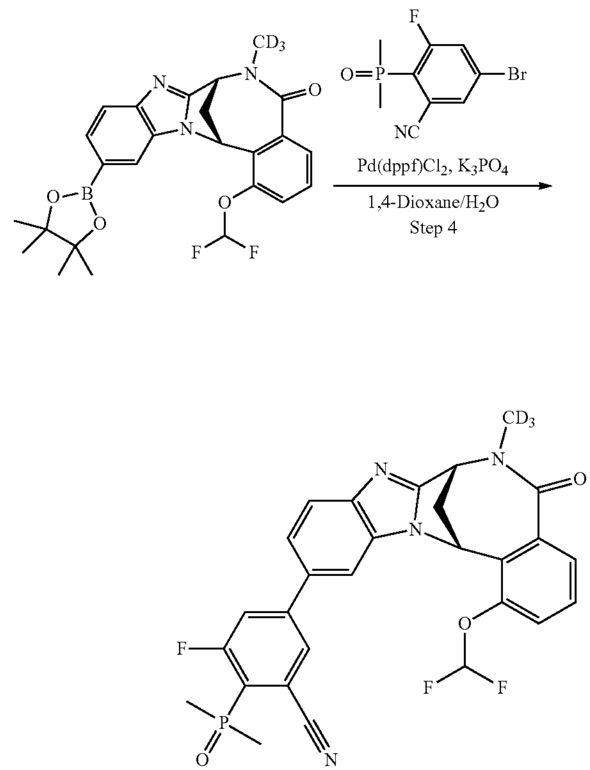

To a stirred solution of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (61 mg, 0.127 mmol) and 5-bromo-2-(dimethylphosphoryl)-3-fluorobenzonitrile (35 mg, 0.127 mmol) in 1,4-dioxane (0.8 mL) and $H_2O$ (0.2 mL) were added $K_3PO_4$ (81 mg, 0.381 mmol) and Pd(dppf) $Cl_2 \cdot CH_2Cl_2$ (21 mg, 0.025 mmol) at room temperature. The resulting mixture was stirred for 2 h at 80° C. under nitrogen atmosphere. The resulting mixture was concentrated under vacuum. The residue was purified by silica gel column chromatography, eluted with $CH_2Cl_2$/MeOH (0% to 10%) to afford followed by Prep-HPLC with the following conditions (Column: XBridge Prep Phenyl OBD Column 19*250 mm, 5 m; Mobile Phase A: Water (10 mmol/L $NH_4HCO_3$), Mobile Phase B: ACN; Flow rate: 60 mL/min; Gradient: 18% B to 33% B in 10 min; Wave Length: 254/220 nm) to afford 5-((7R,14R)-1-(difluoromethoxy)-6-(methyl-d3)-5-oxo-5,6,7,14-tetrahydro-7,14-methanobenzo[f]benzo[4,5]

imidazo[1,2-a][1,4]diazocin-11-yl)-2-(dimethylphosphoryl)-3-fluorobenzonitrile (34 mg, 45%) as a white solid. MS ESI calculated for $C_{28}H_{19}D_3F_3N_4O_3P$ $[M+H]^+$, 554.16, found 554.05. $^1H$ NMR (400 MHz, Chloroform-d) δ 8.50 (d, J=8.2 Hz, 1H), 7.90 (d, J=1.8 Hz, 1H), 7.86 (d, J=8.6 Hz, 1H), 7.76 (s, 1H), 7.59-7.43 (m, 3H), 7.34 (d, J=8.2 Hz, 1H), 6.92 (t, J=72.9 Hz, 1H), 6.34 (d, J=7.1 Hz, 1H), 5.08 (d, J=7.0 Hz, 1H), 3.59-3.47 (m, 1H), 2.94 (d, J=13.6 Hz, 1H), 1.98 (s, 3H), 1.94 (s, 3H). $^{19}F$ NMR (377 MHz, Chloroform-d) δ −80.38, −80.83, −81.18, −81.63, −100.05. $^{31}P$ NMR (162 MHz, Chloroform-d) δ 31.63.

Example 134: (7R,14R)-1-(difluoromethoxy)-11-(6-(dimethylphosphoryl)-5-methylpyridin-3-yl)-6-(methyl-d3)-6,7-dihydro-7,14-methanobenzo[f]benzo[4,5]imidazo[1,2-a][1,4]diazocin-5(14H)-one Synthetic Scheme

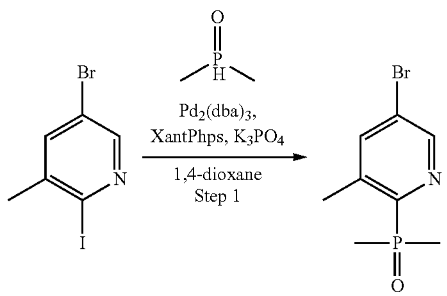

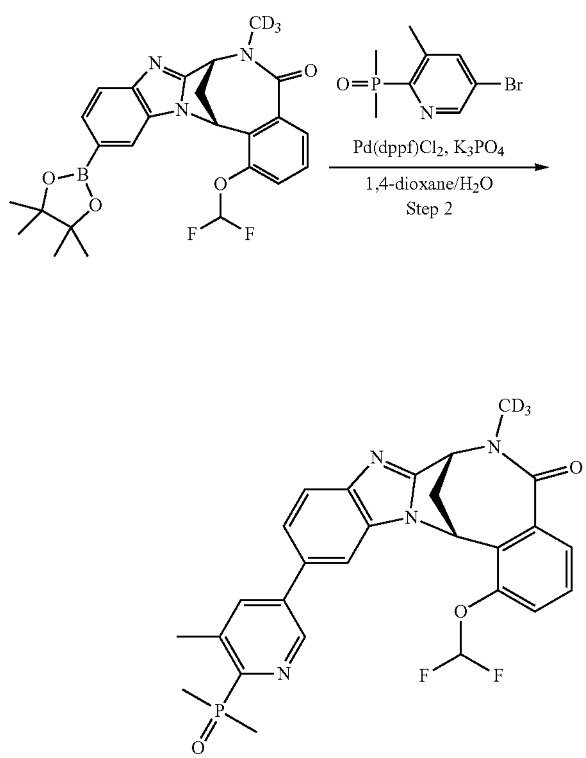

Preparation 134: (5-bromo-3-methylpyridin-2-yl)dimethylphosphine Oxide

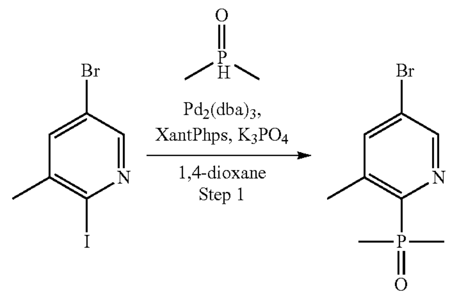

A mixture of 5-bromo-2-iodo-3-methylpyridine (500 mg, 1.678 mmol), (methylphosphonoyl)methane (137 mg, 1.762 mmol), XantPhos (97 mg, 0.168 mmol), $Pd_2(dba)_3$ (154 mg, 0.168 mmol) and $K_3PO_4$ (1.10 g, 5.034 mmol) in 1,4-dioxane (5 mL) was stirred for overnight at 90° C. under nitrogen atmosphere. The resulting mixture was concentrated under vacuum. The residue was purified by silica gel column chromatography, eluted with $CH_2Cl_2$/MeOH (0~10%) followed by reversed-phase flash chromatography with the following conditions: column, C18 silica gel; mobile phase, $CH_3CN$ in Water (0.1% FA), 5% to 35% gradient in 20 min; detector, 254 nm. This resulted in (5-bromo-3-methylpyridin-2-yl)dimethylphosphine oxide (280 mg, 67%) as a colorless oil. MS ESI calculated for $C_8H_{11}BrNOP$ $[M+H]^+$, 247.98 249.98, found 247.80 249.75. $^1H$ NMR (400 MHz, Chloroform-d) δ 8.56 (s, 1H), 7.74-7.68 (m, 1H), 2.73 (s, 3H), 1.81 (s, 3H), 1.78 (s, 3H). $^{31}P$ NMR (162 MHz, Chloroform-d) δ 42.57.

Example 134: (7R,14R)-1-(difluoromethoxy)-11-(6-(dimethylphosphoryl)-5-methylpyridin-3-yl)-6-(methyl-d3)-6,7-dihydro-7,14-methanobenzo[f]benzo[4,5]imidazo[1,2-a][1,4]diazocin-5(14H)-one

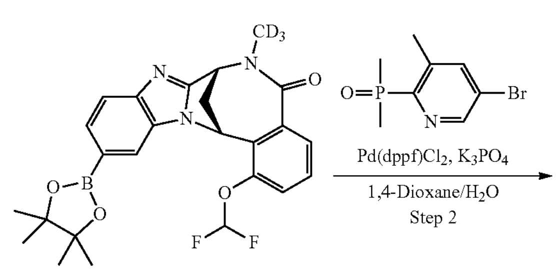

-continued

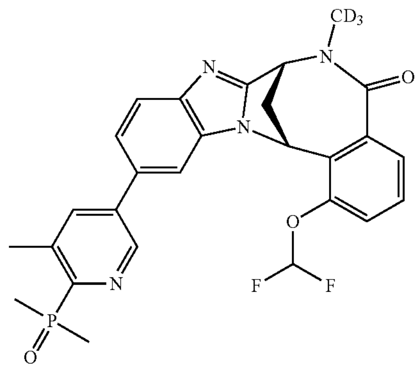

A mixture of (7R,14R)-1-(difluoromethoxy)-6-(methyl-d3)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (50 mg, 0.103 mmol), (5-bromo-3-methylpyridin-2-yl)dimethylphosphine oxide (31 mg, 0.124 mmol), $K_2CO_3$ (28 mg, 0.206 mmol) and Pd(dppf)$Cl_2 \cdot CH_2Cl_2$ (8 mg, 0.010 mmol) in 1,4-dioxane (0.9 mL) and $H_2O$ (0.1 mL) was stirred for 16 h at 80° C. under nitrogen atmosphere. The resulting mixture was concentrated under vacuum. The residue was purified by silica gel column chromatography, eluted with $CH_2Cl_2$/MeOH (0~10%) followed by reversed-phase flash chromatography with the following conditions, column, C18 silica gel, mobile phase, $CH_3CN$ in Water (10 mmol/L $NH_4HCO_3$), 20% to 45% gradient in 20 min; detector, 254 nm to afford (7R,14R)-1-(difluoromethoxy)-11-(6-(dimethylphosphoryl)-5-methylpyridin-3-yl)-6-(methyl-d3)-6,7-dihydro-7,14-methanobenzo[f]benzo[4,5]imidazo[1,2-a][1,4]diazocin-5(14H)-one (38 mg, 69%) as a white solid. MS ESI calculated for $C_{27}H_{22}D_3F_2N_4O_3P$ $[M+H]^+$, 526.18, found 526.15. $^1H$ NMR (400 MHz, Chloroform-d) δ 8.73 (d, J=2.1 Hz, 1H), 8.57-8.45 (m, 1H), 7.85 (d, J=8.5 Hz, 1H), 7.76 (d, J=1.7 Hz, 1H), 7.74-7.69 (m, 1H), 7.56-7.52 (m, 1H), 7.45 (t, J=8.2 Hz, 1H), 7.37-7.29 (m, 1H), 6.87 (t, J=72.8 Hz, 1H), 6.35 (d, J=7.1 Hz, 1H), 5.10 (d, J=7.1 Hz, 1H), 3.57-3.47 (m, 1H), 2.93 (d, J=13.7 Hz, 1H), 2.84 (s, 3H), 1.88 (s, 3H), 1.85 (s, 3H). $^{19}F$ NMR (377 MHz, Chloroform-d) δ −80.34, −80.78, −80.84, −81.28. $^{31}P$ NMR (162 MHz, Chloroform-d) δ 41.63.

Example 135: (7R,14R)-1-(difluoromethoxy)-11-(4-(dimethylphosphoryl)-3-fluorophenyl)-9-fluoro-6-(methyl-d3)-6,7-dihydro-7,14-methanobenzo[f]benzo[4,5]imidazo[1,2-a][1,4]diazocin-5(14H)-one

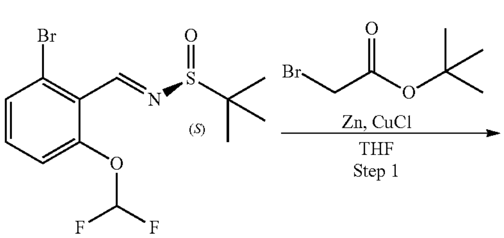

-continued

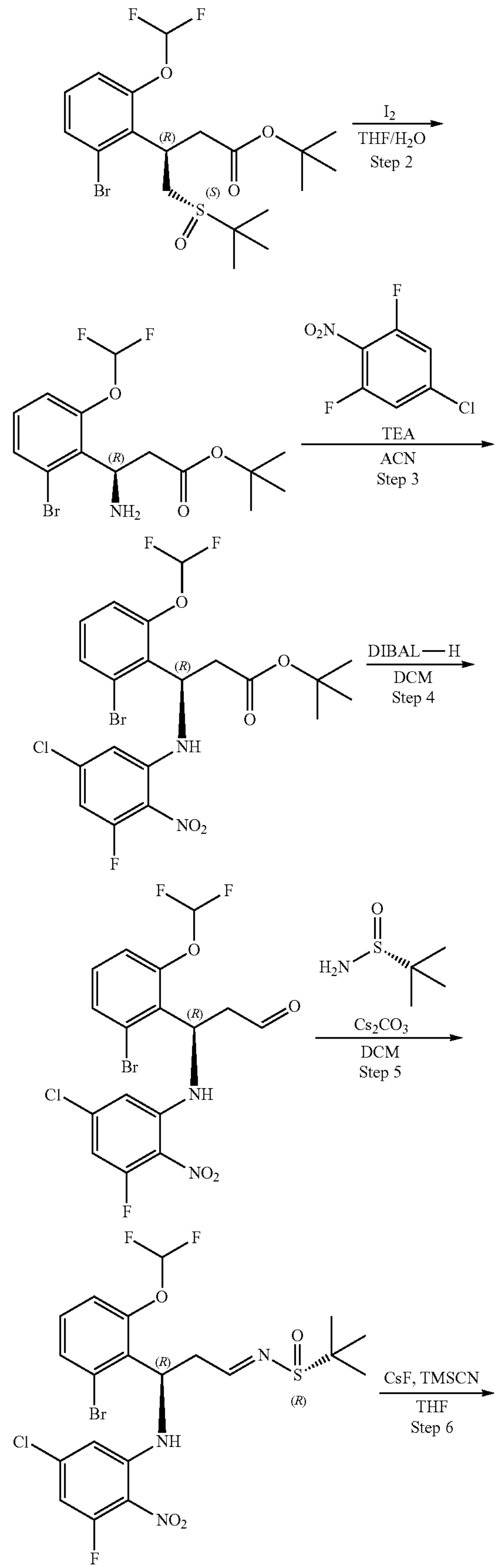

-continued

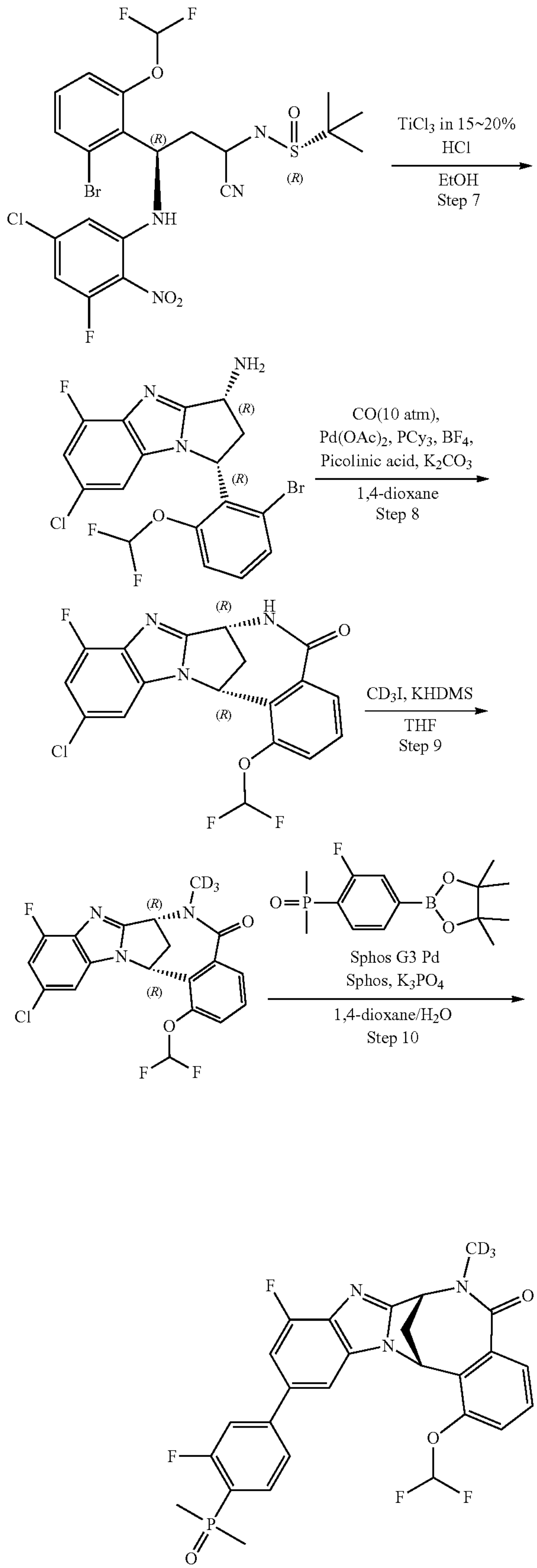

Preparation 135A: tert-butyl (3R)-3-[2-bromo-6-(difluoromethoxy)phenyl]-3-{[(S)-2-methylpropane-2-sulfinyl]amino}propanoate

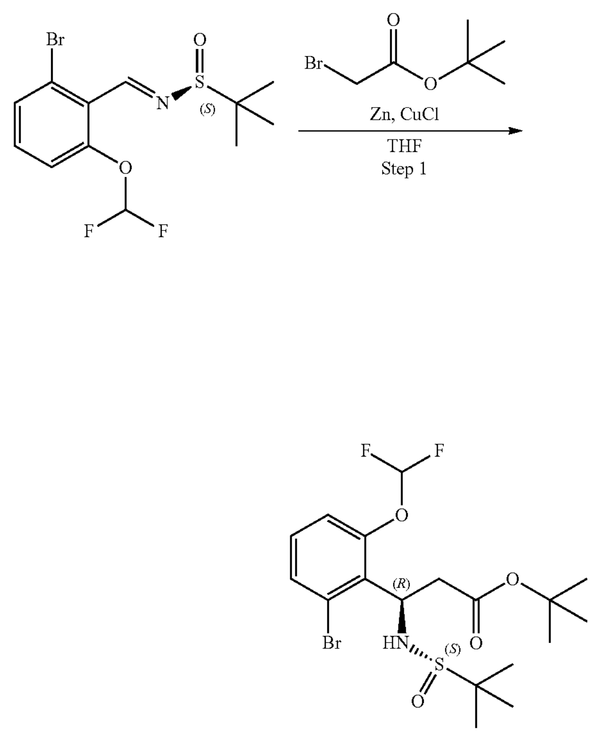

A mixture of Zn powder (36.92 g, 564.635 mmol) and CuCl (11.18 g, 112.927 mmol) in THF (400 mL) was stirred for 2 h at 60° C. under nitrogen atmosphere. The mixture was allowed to cool down to room temperature. To the above mixture was added tert-butyl 2-bromoacetate (55.07 g, 282.317 mmol) dropwise over 15 min at 25° C. The resulting mixture was stirred for additional 2 h at 60° C. The mixture was allowed to cool down to room temperature again. To the above mixture was added a solution of (S)—N-{[2-bromo-6-(difluoromethoxy)phenyl]methylidene}-2-methylpropane-2-sulfinamide (40.00 g, 112.927 mmol) in THF (40 mL) dropwise over 15 min at 10° C. The resulting mixture was stirred for additional 3 h at room temperature. The resulting mixture was filtered, the filter cake was washed with MTBE (3×100 mL). To the above filtrate were added MTBE (200 mL) and saturated citric acid solution (500 mL). The aqueous layer was extracted with MTBE (2×500 mL) and the combined organic layers were washed with saturated $NaHCO_3$ solution (500 mL), dried over anhydrous $Na_2SO_4$. After filtration, the filtrate was concentrated under reduced pressure. This resulted in tert-butyl (3R)-3-[2-bromo-6-(difluoromethoxy)phenyl]-3-{[(S)-2-methylpropane-2-sulfinyl]amino}propanoate (51.00 g, 96%) as a yellow oil. MS ESI calculated for $C_{18}H_{26}BrF_2NO_4S$ $[M+H]^+$, 470.07 472.07, found 470.05 472.05. $^1H$ NMR (400 MHz, Chloroform-d) δ 7.50-7.38 (m, 1H), 7.15 (t, J=8.1 Hz, 1H), 7.10-6.98 (m, 1H), 6.81-6.39 (m, 1H), 5.62-5.49 (m, 1H), 4.34-4.11 (m, 1H), 3.29-3.07 (m, 1H), 3.06-2.82 (m, 1H), 1.33 (s, 9H), 1.12 (s, 9H).

Preparation 135B: tert-butyl (3R)-3-amino-3-[2-bromo-6-(difluoromethoxy)phenyl]propanoate

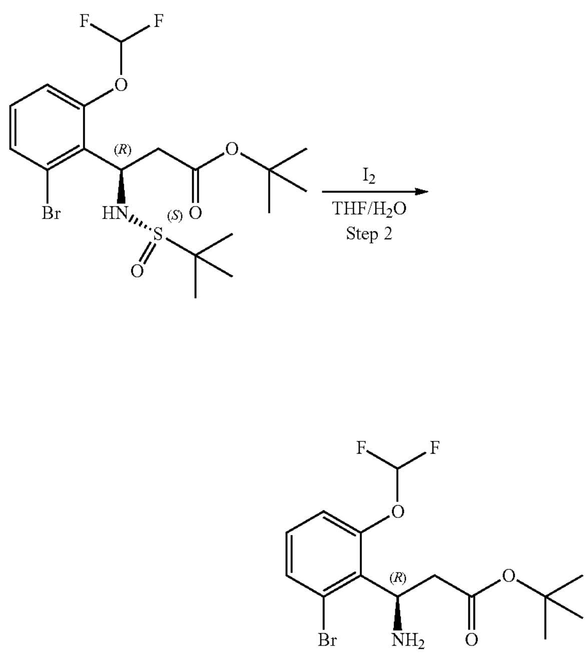

To a stirred solution of tert-butyl (3R)-3-[2-bromo-6-(difluoromethoxy)phenyl]-3-{[(S)-2-methylpropane-2-sulfinyl]amino}propanoate (51.00 g, 108.425 mmol) in THF (500 mL) and $H_2O$ (100 mL) was added $I_2$ (5.50 g, 21.685 mmol) at room temperature under nitrogen atmosphere. The resulting mixture was stirred for overnight at 50° C. The reaction was quenched by the addition of sat. $NaHCO_3$ (aq.) (1 L) at 0° C. The resulting mixture was extracted with EtOAc (3×800 mL). The combined organic layers were washed with brine (1 L), dried over anhydrous $Na_2SO_4$. After filtration, the filtrate was concentrated under reduced pressure to afford the crude product. The crude product (48 g) was dissolved in ACN (320 mL), (2S)-2-hydroxy-2-phenylacetic acid (16.50 g, 108.425 mmol) in ACN (80 mL) was added to above solution at room temperature. The resulting mixture was stirred for additional 15 min at room temperature. The precipitated solids were collected by filtration and washed with ACN (50 mL). To the above solids was added $CH_2Cl_2$ (500 mL) and sat. $NaHCO_3$ (aq.) (500 mL). The mixture was stirred for additional 15 min at room temperature and extracted with $CH_2Cl_2$ (3×300 mL). The combined organic layers were washed with brine (400 mL), dried over anhydrous $Na_2SO_4$. After filtration, the filtrate was concentrated under reduced pressure to afford tert-butyl (3R)-3-amino-3-[2-bromo-6-(difluoromethoxy)phenyl]propanoate (29.00 g, 73%, ee>98%) as a colorless oil. MS ESI calculated for $C_{14}H_{18}BrF_2NO_3$ $[M+H]^+$, 366.04 368.04, found 366.05 368.05. $^1H$ NMR (400 MHz, Chloroform-d) δ 7.46-7.38 (m, 1H), 7.16-7.01 (m, 2H), 6.83-6.42 (m, 1H), 5.06-4.97 (m, 1H), 2.98-2.86 (m, 1H), 2.82-2.70 (m, 1H), 1.38 (d, J=1.9 Hz, 9H).

Preparation 135C: tert-butyl (3R)-3-[2-bromo-6-(difluoromethoxy)phenyl]-3-[(5-chloro-3-fluoro-2-nitrophenyl)amino]propanoate

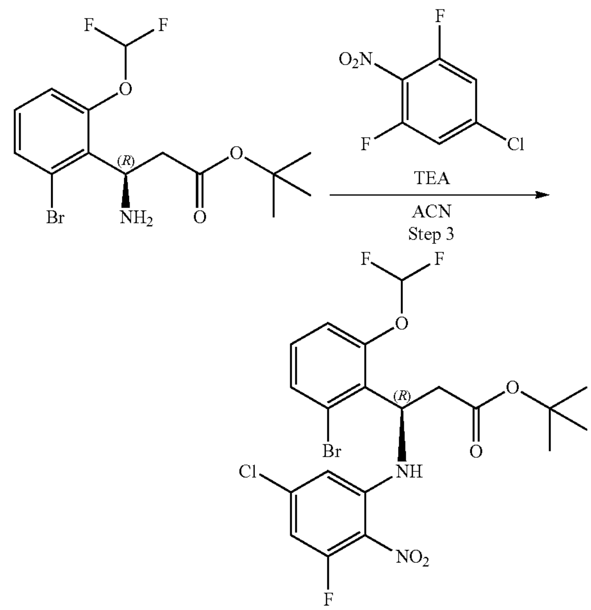

A solution of tert-butyl (3R)-3-amino-3-[2-bromo-6-(difluoromethoxy)phenyl]propanoate (17.00 g, 46.422 mmol), TEA (9.7 mL, 69.633 mmol) and 5-chloro-1,3-difluoro-2-nitrobenzene (11.14 g, 57.563 mmol) in ACN (300 mL) was stirred for overnight at room temperature. The resulting mixture was concentrated under vacuum. The residue was purified by silica gel column chromatography, eluted with PE/EA (5/1) to afford tert-butyl (3R)-3-[2-bromo-6-(difluoromethoxy)phenyl]-3-[(5-chloro-3-fluoro-2-nitrophenyl)amino]propanoate (25 g, 99%) as a dark yellow oil. MS ESI calculated for $C_{20}H_{19}BrClF_3N_2O_5$ $[M+H]^+$ 539.01 541.01, found 538.90 540.90. $^1H$ NMR (400 MHz, Chloroform-d) δ 8.06 (d, J=8.9 Hz, 1H), 7.49-7.34 (m, 1H), 7.23-7.17 (m, 1H), 7.16-7.13 (m, 1H), 6.83 (d, J=6.2 Hz, 1H), 6.65 (t, J=73.2 Hz, 1H), 6.50-6.32 (m, 1H), 5.78-5.56 (m, 1H), 3.25-2.92 (m, 1H), 2.87-2.64 (m, 1H), 1.40 (s, 9H).

Preparation 135D: (3R)-3-[2-bromo-6-(difluoromethoxy)phenyl]-3-[(5-chloro-3-fluoro-2-nitrophenyl)amino]propanal

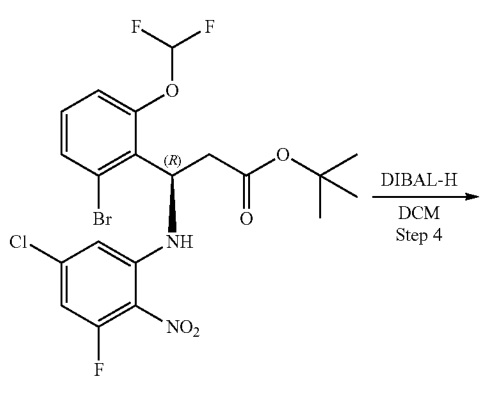

-continued

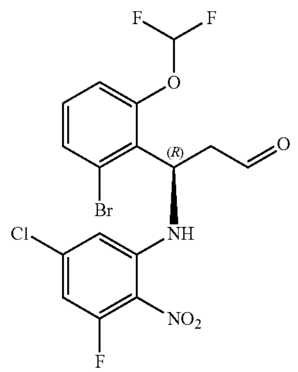

To a stirred solution of tert-butyl (3R)-3-[2-bromo-6-(difluoromethoxy)phenyl]-3-[(5-chloro-3-fluoro-2-nitrophenyl)amino]propanoate (26.00 g, 48.172 mmol) in DCM (350 mL) was added DIBAL-H (53 mL, 52.989 mmol, 1M in THF) dropwise at −78° C. under nitrogen atmosphere. The resulting mixture was stirred for 3 h at −78° C. under nitrogen atmosphere. The reaction was quenched with 1M HCl (aq.) at −78° C. The resulting mixture was extracted with DCM (3×300 mL). The combined organic layers were washed with brine (3×500 mL), dried over anhydrous $Na_2SO_4$. After filtration, the filtrate was concentrated under reduced pressure to afford the crude (3R)-3-[2-bromo-6-(difluoromethoxy)phenyl]-3-[(5-chloro-3-fluoro-2-nitrophenyl)amino]propanal (23.00 g) as a yellow oil. MS ESI calculated for $C_{16}H_{11}BrClF_3N_2O_4$ $[M+H]^+$ 466.95 468.95, found 466.90 468.90. $^1H$ NMR (400 MHz, Chloroform-d) δ 9.79 (s, 1H), 8.03 (d, J=9.1 Hz, 1H), 7.50-7.42 (m, 1H), 7.21-7.18 (m, 1H), 7.16-7.14 (m, 1H), 6.89-6.83 (m, 1H), 6.69 (t, J=76.0 Hz, 1H), 6.51-6.45 (m, 1H), 5.89-5.78 (m, 1H), 3.50-3.37 (m, 1H), 3.15-2.90 (m, 1H).

Preparation 135E: (R)—N-[(1E,3R)-3-[2-bromo-6-(difluoromethoxy)phenyl]-3-[(5-chloro-3-fluoro-2-nitrophenyl)amino]propylidene]-2-methylpropane-2-sulfinamide

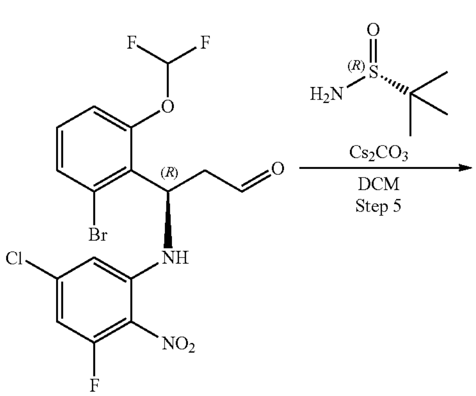

-continued

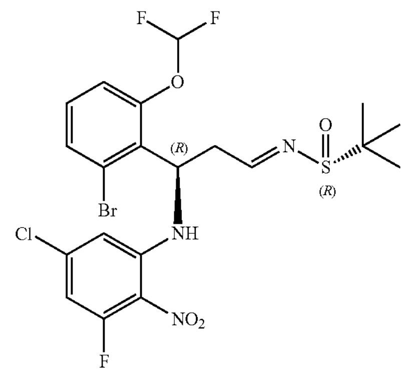

To a stirred solution of (3R)-3-[2-bromo-6-(difluoromethoxy)phenyl]-3-[(5-chloro-3-fluoro-2-nitrophenyl)amino]propanal (23.00 g, 49.185 mmol) and (R)-2-methylpropane-2-sulfinamide (6.56 g, 54.104 mmol) in DCM (230 mL) was added $Cs_2CO_3$ (16.03 g, 49.185 mmol) at room temperature. The resulting mixture was stirred for 6 h at room temperature under nitrogen atmosphere. The resulting mixture was diluted with $H_2O$ (300 mL) and extracted with DCM (3×300 mL). The combined organic layers were washed with brine (3×200 mL), dried over anhydrous $Na_2SO_4$. After filtration, the filtrate was concentrated under reduced pressure to afford the crude (R)—N-[(1E,3R)-3-[2-bromo-6-(difluoromethoxy)phenyl]-3-[(5-chloro-3-fluoro-2-nitrophenyl)amino]propylidene]-2-methylpropane-2-sulfinamide (26.00 g, 92%) as an orange red oil. MS ESI calculated for $C_{20}H_{20}BrClF_3N_3O_4S$ $[M+Na]^+$, 592.00 594.00, found 591.95 573.90.

Preparation 135F: (R)—N-[(3R)-3-[2-bromo-6-(difluoromethoxy)phenyl]-3-[(5-chloro-3-fluoro-2-nitrophenyl)amino]-1-cyanopropyl]-2-methylpropane-2-sulfinamide

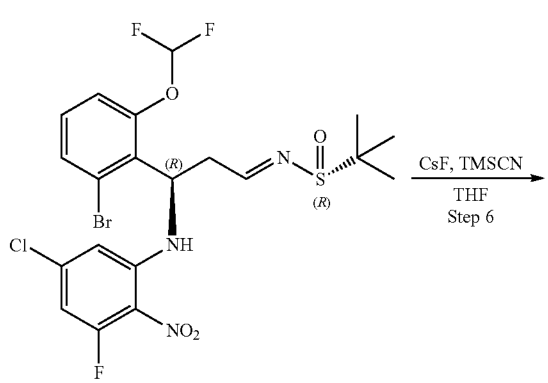

-continued

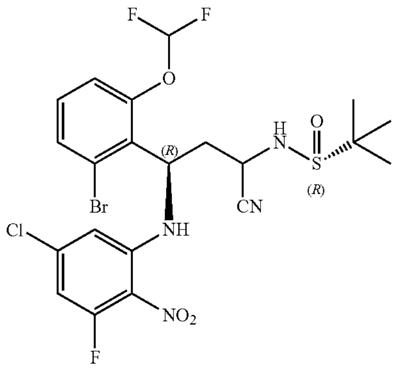

To a stirred solution of (R)—N-[(1E,3R)-3-[2-bromo-6-(difluoromethoxy)phenyl]-3-[(5-chloro-3-fluoro-2-nitrophenyl)amino]propylidene]-2-methylpropane-2-sulfinamide (26.00 g, 45.549 mmol) and CsF (13.84 g, 91.110 mmol) in THF (260 mL) was added TMSCN (9.04 g, 91.098 mmol) at 0° C. under nitrogen atmosphere. The resulting mixture was stirred for overnight at room temperature under nitrogen atmosphere. The reaction was quenched with sat. $NaHCO_3$ (aq.) at room temperature and extracted with EtOAc (3×300 mL). The combined organic layers were washed with brine (3×200 mL), dried over anhydrous $Na_2SO_4$. After filtration, the filtrate was concentrated under reduced pressure. The residue was purified by silica gel column chromatography, eluted with PE/EA (1/1) to afford (R)—N-[(3R)-3-[2-bromo-6-(difluoromethoxy)phenyl]-3-[(5-chloro-3-fluoro-2-nitrophenyl)amino]-1-cyanopropyl]-2-methylpropane-2-sulfinamide (5.40 g, 19%) as a yellow solid. MS ESI calculated for $C_{21}H_{21}BrClF_3N_4O_4S$ $[M+H]^+$, 597.01 599.01 found 597.00 599.00. $^1H$ NMR (400 MHz, Chloroform-d) δ 8.13-7.79 (m, 1H), 7.47 (d, J=7.9 Hz, 1H), 7.25-7.07 (m, 2H), 6.94-6.58 (m, 2H), 6.58-6.40 (m, 1H), 5.66-5.40 (m, 1H), 4.38-4.25 (m, 1H), 4.12-4.05 (m, 1H), 2.91-2.65 (m, 1H), 2.53-2.27 (m, 1H), 1.32-1.11 (m, 9H).

Preparation 135G: (3R,5R)-3-[2-bromo-6-(difluoromethoxy)phenyl]-11-chloro-9-fluoro-2,7-diazatricyclo[6.4.0.0^{2,6}]dodeca-1(8),6,9,11-tetraen-5-amine

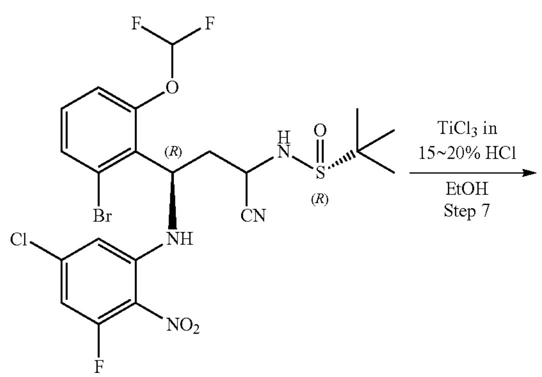

-continued

A mixture of $TiCl_3$ (65.55 g, 72.264 mmol, 17% in HCl) and EtOH (40 mL) was stirred for 5 min at 75° C. under nitrogen atmosphere. To the above mixture was added a solution of (R)—N-[(3R)-3-[2-bromo-6-(difluoromethoxy)phenyl]-3-[(5-chloro-3-fluoro-2-nitrophenyl)amino]-1-cyanopropyl]-2-methylpropane-2-sulfinamide (5.40 g, 9.033 mmol) in EtOH (20 mL) dropwise over 10 min at −78° C. The resulting mixture was stirred for additional 5 h at 80° C. The mixture was allowed to cool down to room temperature and concentrated under vacuum and then basified to pH~9 with saturated $Na_2CO_3$ (aq.). The mixture was extracted with EtOAc (3×150 mL). The combined organic layers were washed with brine (300 mL), dried over anhydrous $Na_2SO_4$. After filtration, the filtrate was concentrated under reduced pressure. The residue was purified by silica gel column chromatography, eluted with $CH_2Cl_2$/MeOH (19/1) to afford (3R,5R)-3-[2-bromo-6-(difluoromethoxy)phenyl]-11-chloro-9-fluoro-2,7-diazatricyclo[6.4.0.0^{2,6}]dodeca-1(8),6,9,11-tetraen-5-amine (3.10 g, 74%) as a brown solid. MS ESI calculated for $C_{17}H_{12}BrClF_3N_3O$ $[M+H]^+$ 445.98 447.98, found 445.95 447.95.

Preparation 135H: (7R,14R)-11-chloro-1-(difluoromethoxy)-9-fluoro-6,7-dihydro-7,14-methanobenzo[f]benzo[4,5]imidazo[1,2-a][1,4]diazocin-5(14H)-one

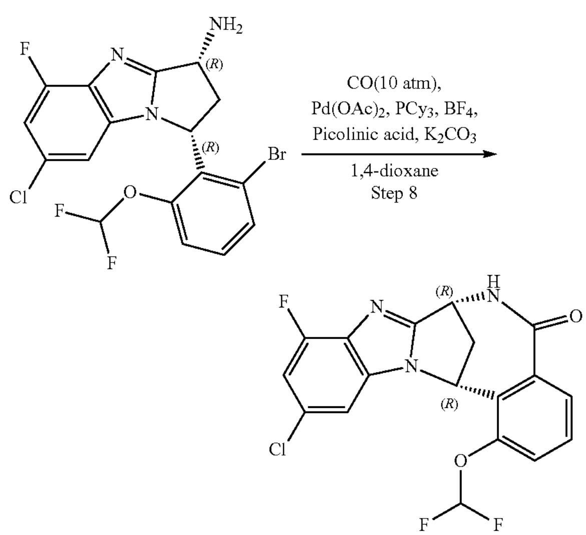

To a solution of (3R,5R)-3-[2-bromo-6-(difluoromethoxy)phenyl]-11-chloro-9-fluoro-2,7-diazatricyclo[6.4.0.0^{2,6}]dodeca-1(8),6,9,11-tetraen-5-amine (2.80 g, 6.269 mmol), $PCy_3·HBF_4$ (461 mg, 1.254 mmol), pyridine- 2-carboxylic acid (385 mg, 3.135 mmol), $K_2CO_3$ (4.33 g, 31.345 mmol) in 1,4-dioxane (100 mL) was added $Pd(OAc)_2$ (211 mg, 0.940 mmol) in a pressure tank. The mixture was purged with nitrogen for 3 min and then was pressurized to 10 atm. with carbon monoxide at 120° C. for overnight. The reaction mixture was cooled to room temperature and filtered to remove insoluble solids. The resulting mixture was concentrated under reduced pressure. The residue was purified by silica gel column chromatography, eluted with $CH_2Cl_2$/EA (1/5) to afford (7R,14R)-11-chloro-1-(difluoromethoxy)-9-fluoro-6,7-dihydro-7,14-methanobenzo[f]benzo[4,5]imidazo[1,2-a][1,4]diazocin-5(14H)-one (1.30 g, 52%) as a light grey solid. MS ESI calculated for $C_{18}H_{11}ClF_3N_3O_2$ $[M+H]^+$ 394.05, found 393.95. $^1H$ NMR (400 MHz, Chloroform-d) δ 8.48-8.40 (m, 1H), 7.58 (d, J=6.5 Hz, 1H), 7.48 (t, J=8.2 Hz, 1H), 7.44-7.38 (m, 1H), 7.29 (d, J=1.7 Hz, 1H), 7.06-7.00 (m, 1H), 6.76 (t, J=72.5 Hz, 1H), 6.35 (d, J=7.1 Hz, 1H), 5.18 (t, J=6.5 Hz, 1H), 3.63-3.48 (m, 1H), 2.89 (d, J=13.4 Hz, 1H). $^{19}F$ NMR (377 MHz, Chloroform-d) δ −80.42, −80.86, −81.06, −81.50, −123.85.

Preparation 135I: (7R,14R)-11-chloro-1-(difluoromethoxy)-9-fluoro-6-(methyl-d3)-6,7-dihydro-7,14-methanobenzo[f]benzo[4,5]imidazo[1,2-a][1,4]diazocin-5(14H)-one

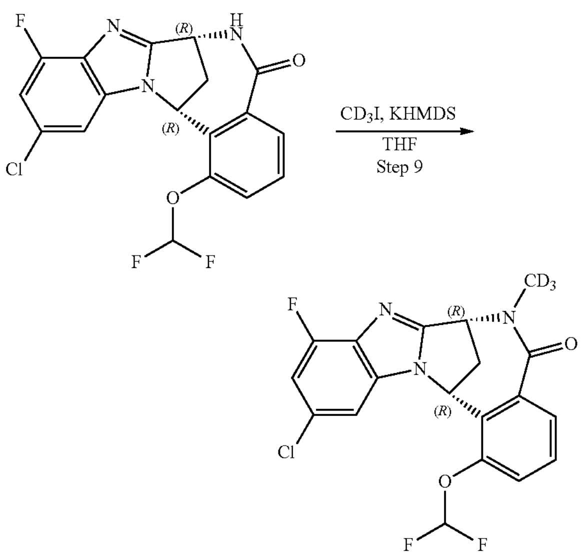

To a stirred solution of (7R,14R)-11-chloro-1-(difluoromethoxy)-9-fluoro-6,7-dihydro-7,14-methanobenzo[f]benzo[4,5]imidazo[1,2-a][1,4]diazocin-5(14H)-one (150 mg, 0.381 mmol) in THF (4 mL) was added KHMDS (0.5 mL, 0.457 mmol, 1 M in THF) dropwise at −78° C. under nitrogen atmosphere. The resulting mixture was stirred for 30 min at −78° C. under nitrogen atmosphere. To the above mixture was added a solution of iodomethane-$d_3$ (72 mg, 0.495 mmol) in THF (0.5 mL) dropwise at −78° C. The resulting mixture was stirred for additional overnight at room temperature. The reaction was quenched with 0.5 mL sat. $NH_4Cl$ (aq.) at room temperature. The resulting mixture was concentrated under vacuum. The residue was purified by silica gel column chromatography, eluted with $CH_2Cl_2$/MeOH (12/1) to afford (7R,14R)-11-chloro-1-(difluoromethoxy)-9-fluoro-6-(methyl-d3)-6,7-dihydro-7,14-methanobenzo[f]benzo[4,5]imidazo[1,2-a][1,4]diazocin-5(14H)-one (150 mg, 95%) as a light brown solid. MS ESI calculated for $C_{19}H_{10}D_3ClF_3N_3O_2$ $[M+H]^+$, 411.08, found 410.95. $^1H$ NMR (400 MHz, Chloroform-d) δ 8.54-8.44 (m, 1H), 7.45 (t, J=8.2 Hz, 1H), 7.37-7.31 (m, 1H), 7.27 (d, J=1.8 Hz, 1H), 7.01-6.94 (m, 1H), 6.74 (t, J=72.6 Hz, 1H), 6.21 (d, J=7.2 Hz, 1H), 4.97 (d, J=7.1 Hz, 1H), 3.56-3.40 (m, 1H), 2.88 (d, J=13.6 Hz, 1H). $^{19}F$ NMR (377 MHz, Chloroform-d) δ −80.19, −80.64, −81.07, −81.51, −124.37.

Example 135: (7R,14R)-1-(difluoromethoxy)-11-(4-(dimethylphosphoryl)-3-fluorophenyl)-9-fluoro-6-(methyl-d3)-6,7-dihydro-7,14-methanobenzo[f]benzo[4,5]imidazo[1,2-a][1,4]diazocin-5(14H)-one

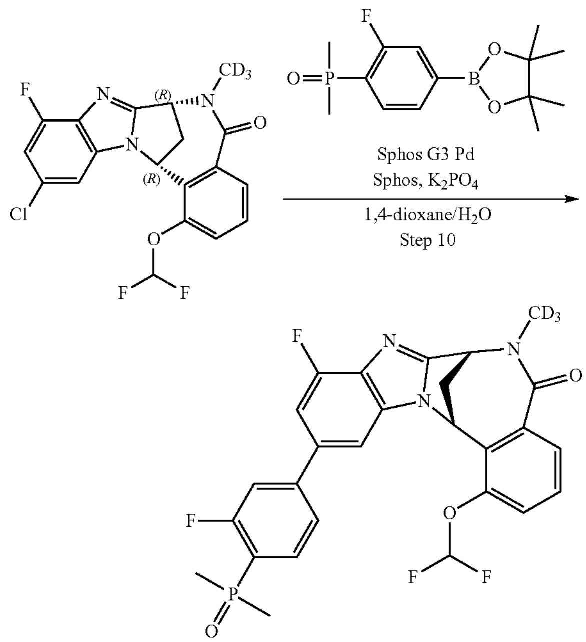

To a solution of (7R,14R)-11-chloro-1-(difluoromethoxy)-9-fluoro-6-(methyl-d3)-6,7-dihydro-7,14-methanobenzo[f]benzo[4,5]imidazo[1,2-a][1,4]diazocin-5(14H)-one (130 mg, 0.316 mmol) and 2-[4-(dimethylphosphoryl)-3-fluorophenyl]-4,4,5,5-tetramethyl-1,3,2-dioxaborolane (122 mg, 0.411 mmol) in 1,4-dioxane (5 mL) and $H_2O$ (1 mL) were added SPhos (12 mg, 0.032 mmol), SPhos Pd Gen.3 (24 mg, 0.032 mmol) and $K_3PO_4$ (201 mg, 0.948 mmol). After stirring for 3 h at 80° C. under a nitrogen atmosphere. The resulting mixture was concentrated under reduced pressure and purified by silica gel column chromatography, eluted with $CH_2Cl_2$/MeOH (12/1) followed by reversed-phase flash chromatography with the following conditions: column, C18 silica gel; mobile phase, $CH_3CN$ in water (10 mmol/L $NH_4HCO_3$), 35% to 80% gradient in 25 min; detector, 254 nm to afford ((7R,14R)-1-(difluoromethoxy)-11-(4-(dimethylphosphoryl)-3-fluorophenyl)-9-fluoro-6-(methyl-d3)-6,7-dihydro-7,14-methanobenzo[f]benzo[4,5]imidazo[1,2-a][1,4]diazocin-5(14H)-one (113 mg, 64%) as a white solid. MS ESI calculated for $C_{27}H_{19}D_3F_4N_3O_3P$ $[M+H]^+$, 547.15, found 547.05. $^1H$ NMR (400 MHz, Chloroform-d) δ 8.50 (d, J=8.1 Hz, 1H), 8.08-7.95 (m, 1H), 7.58-7.48 (m, 2H), 7.47-7.39 (m, 1H), 7.34-7.27 (m, 2H), 7.21 (d, J=11.5 Hz, 1H), 7.05-6.64 (m, 1H), 6.30 (d, J=7.0 Hz, 1H), 5.02 (d, J=6.9 Hz, 1H), 3.63-3.41 (m, 1H), 2.91 (d, J=13.5 Hz, 1H), 1.85 (s, 3H), 1.82 (s, 3H). $^{19}$F NMR (377 MHz, Chloroform-d) δ −80.37, −80.82, −80.89, −81.34, −105.50, −125.70. $^{31}$P NMR (162 MHz, Chloroform-d) δ 30.73.

Example 136: Dimethyl (4-((7R,14R)-1-(difluoromethoxy)-6-(methyl-d3)-5-oxo-5,6,7,14-tetrahydro-7,14-methanobenzo[f]benzo[4,5]imidazo[1,2-a][1,4]diazocin-11-yl)-2-fluorobenzyl)phosphonate Synthetic Scheme

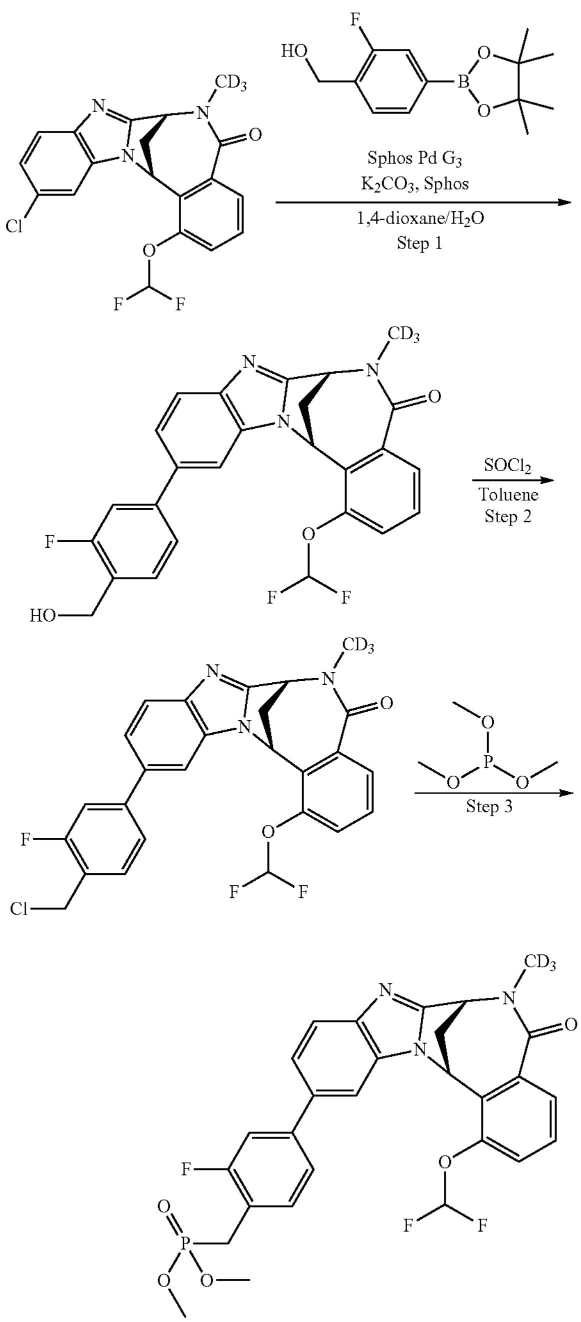

Preparation 136A: (7R,14R)-1-(difluoromethoxy)-11-(3-fluoro-4-(hydroxymethyl)phenyl)-6-(methyl-d3)-6,7-dihydro-7,14-methanobenzo[f]benzo[4,5]imidazo[1,2-a][1,4]diazocin-5(14H)-one

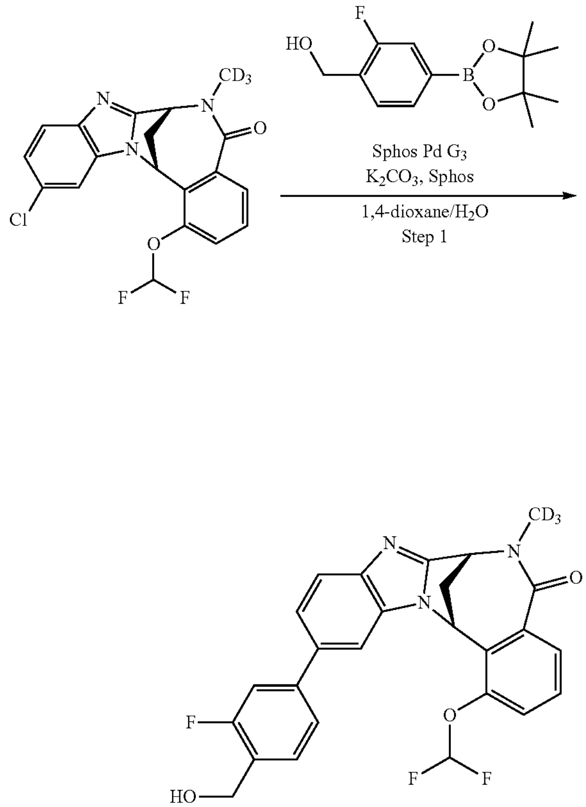

To a stirred solution of (7R,14R)-11-chloro-1-(difluoromethoxy)-6-(methyl-d3)-6,7-dihydro-7,14-methanobenzo[f]benzo[4,5]imidazo[1,2-a][1,4]diazocin-5(14H)-one (150 mg, 0.382 mmol) and (2-fluoro-4-(4,4,5,5-tetramethyl-1,3,2-dioxaborolan-2-yl)phenyl)methanol (144 mg, 0.573 mmol) in 1,4-dioxane (1.6 mL) and $H_2O$ (0.4 mL) were added SPhos (31 mg, 0.076 mmol), SPhos Pd Gen.3 (60 mg, 0.076 mmol) and $K_2CO_3$ (158 mg, 1.146 mmol) at room temperature under nitrogen atmosphere. The resulting mixture was stirred for 2 h at 80° C. under nitrogen atmosphere. The resulting mixture was concentrated under vacuum. The residue was purified by silica gel column chromatography, eluted with $CH_2Cl_2$/MeOH (0% to 10%) to afford (7R,14R)-1-(difluoromethoxy)-11-(3-fluoro-4-(hydroxymethyl)phenyl)-6-(methyl-d3)-6,7-dihydro-7,14-methanobenzo[f]benzo[4,5]imidazo[1,2-a][1,4]diazocin-5(14H)-one (180 mg, 97%) as a brown solid. MS ESI calculated for $C_{26}H_{17}D_3F_3N_3O_3$ $[M+H]^+$, 483.16, found 483.10. $^1$H NMR (400 MHz, Chloroform-d) δ 8.51-8.46 (m, 1H), 7.76 (d, J=8.5 Hz, 1H), 7.68 (d, J=1.8 Hz, 1H), 7.53-7.35 (m, 4H), 7.33-7.28 (m, 2H), 6.84 (t, J=72.9 Hz, 1H), 6.28 (d, J=7.2 Hz, 1H), 4.96 (d, J=7.1 Hz, 1H), 4.81 (s, 2H), 3.48-3.43 (m, 1H), 2.88 (d, J=13.6 Hz, 1H). $^{19}$F NMR (377 MHz, Chloroform-d) δ −80.22, −80.66, −80.80, −81.25, −119.53.

Preparation 136B: (7R,14R)-11-(4-(chloromethyl)-3-fluorophenyl)-1-(difluoromethoxy)-6-(methyl-d3)-6,7-dihydro-7,14-methanobenzo[f]benzo[4,5]imidazo[1,2-a][1,4]diazocin-5(14H)-one

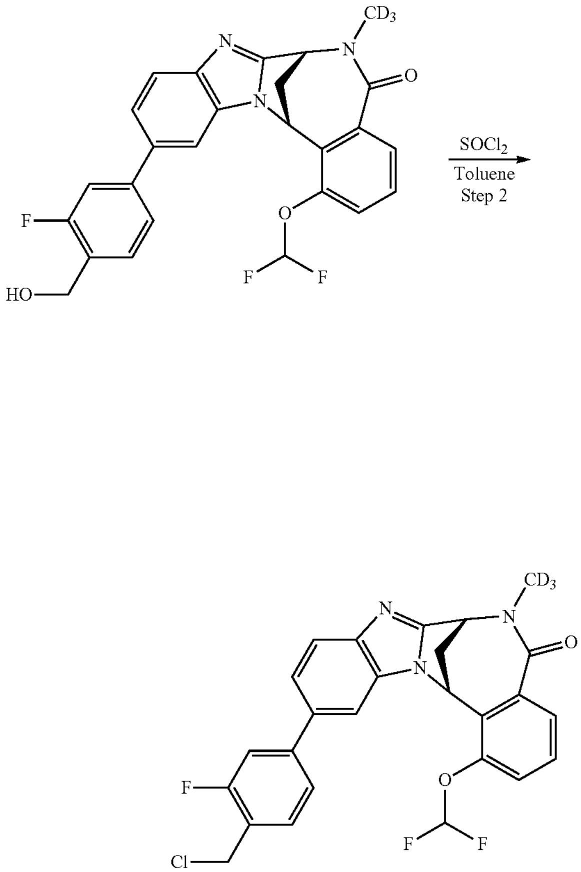

To a stirred solution of (7R,14R)-1-(difluoromethoxy)-11-(3-fluoro-4-(hydroxymethyl)phenyl)-6-(methyl-d3)-6,7-dihydro-7,14-methanobenzo[f]benzo[4,5]imidazo[1,2-a][1,4]diazocin-5(14H)-one (180 mg, 0.373 mmol) in Toluene (2 mL) was added $SOCl_2$ (0.3 mL, 3.730 mmol) dropwise at 0° C. under nitrogen atmosphere. The resulting mixture was stirred for 3 h at 80° C. The resulting mixture was concentrated under vacuum. This result in (7R,14R)-11-(4-(chloromethyl)-3-fluorophenyl)-1-(difluoromethoxy)-6-(methyl-d3)-6,7-dihydro-7,14-methanobenzo[f]benzo[4,5]imidazo[1,2-a][1,4]diazocin-5(14H)-one (180 mg, 96%) as a yellow solid. MS ESI calculated for $C_{26}H_{16}D_3ClF_3N_3O_2$ $[M+H]^+$, 501.13, found 501.15. $^1H$ NMR (400 MHz, Chloroform-d) δ 8.53 (d, J=8.2 Hz, 1H), 7.84-7.81 (m, 1H), 7.61 (d, J=8.2 Hz, 1H), 7.57-7.50 (m, 2H), 7.44-7.30 (m, 2H), 7.24 (s, 1H), 7.17 (d, J=8.0 Hz, 1H), 6.91 (t, J=72.4 Hz, 1H), 6.58-6.50 (m, 1H), 5.82-5.65 (m, 1H), 4.69 (s, 2H), 3.96-3.78 (m, 1H), 3.09-2.96 (m, 1H). $^{19}F$ NMR (377 MHz, Chloroform-d) δ −80.55, −81.00, −81.30, −81.75, −116.31.

Example 136: dimethyl (4-((7R,14R)-1-(difluoromethoxy)-6-(methyl-d3)-5-oxo-5,6,7,14-tetrahydro-7,14-methanobenzo[f]benzo[4,5]imidazo[1,2-a][1,4]diazocin-11-yl)-2-fluorobenzyl)phosphonate

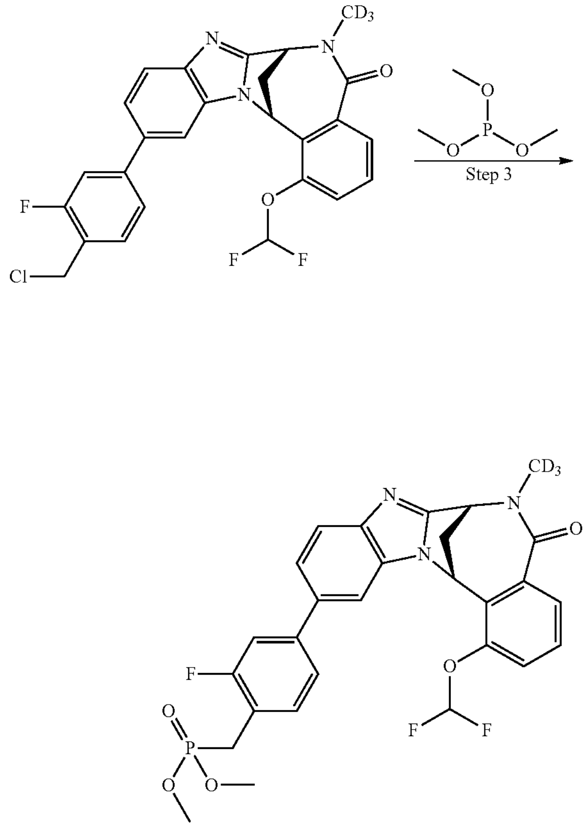

A mixture of (7R,14R)-11-(4-(chloromethyl)-3-fluorophenyl)-1-(difluoromethoxy)-6-(methyl-d3)-6,7-dihydro-7,14-methanobenzo[f]benzo[4,5]imidazo[1,2-a][1,4]diazocin-5(14H)-one (60 mg, 0.120 mmol) in trimethyl phosphite (1 mL) was stirred for 16 h at 110° C. The resulting mixture was concentrated under vacuum. The residue was purified by silica gel column chromatography, eluted with $CH_2Cl_2$/MeOH (10:1) followed by reversed-phase flash chromatography with the following conditions: column, C18 silica gel; mobile phase, $CH_3CN$ in Water (0.1% FA), 30% to 60% gradient in 20 min; detector, 254/220 nm to afford dimethyl (4-((7R,14R)-1-(difluoromethoxy)-6-(methyl-d3)-5-oxo-5,6,7,14-tetrahydro-7,14-methanobenzo[f]benzo[4,5]imidazo[1,2-a][1,4]diazocin-11-yl)-2-fluorobenzyl)phosphonate (21 mg, 31%) as a white solid. MS ESI calculated for $C_{28}H_{22}D_3F_3N_3O_5P$ $[M+H]^+$, 575.17, found 575.30. $^1H$ NMR (400 MHz, Chloroform-d) δ 8.50 (d, J=8.3 Hz, 1H), 7.79 (d, J=8.5 Hz, 1H), 7.70 (s, 1H), 7.53-7.48 (m, 1H), 7.47-7.40 (m, 2H), 7.37-7.30 (m, 2H), 7.28 (s, 1H), 6.86 (t, J=72.8 Hz, 1H), 6.32 (d, J=6.7 Hz, 1H), 5.09 (d, J=6.5 Hz, 1H), 3.77 (s, 3H), 3.74 (s, 3H), 3.57-3.45 (m, 1H), 3.26 (d, J=21.6 Hz, 2H), 2.91 (d, J=13.3 Hz, 1H). $^{19}F$ NMR (377 MHz, Chloroform-d) δ −80.39, −80.83, −80.93, −81.38, −116.99. $^{31}P$ NMR (162 MHz, Chloroform-d) δ 27.72.

Example 137: (7R,14R)-11-(6-(diethylphosphoryl)pyridin-3-yl)-1-(difluoromethoxy)-6,7-dihydro-7,14-methanobenzo[f]benzo[4,5]imidazo[1,2-a][1,4]diazocin-5(14H)-one

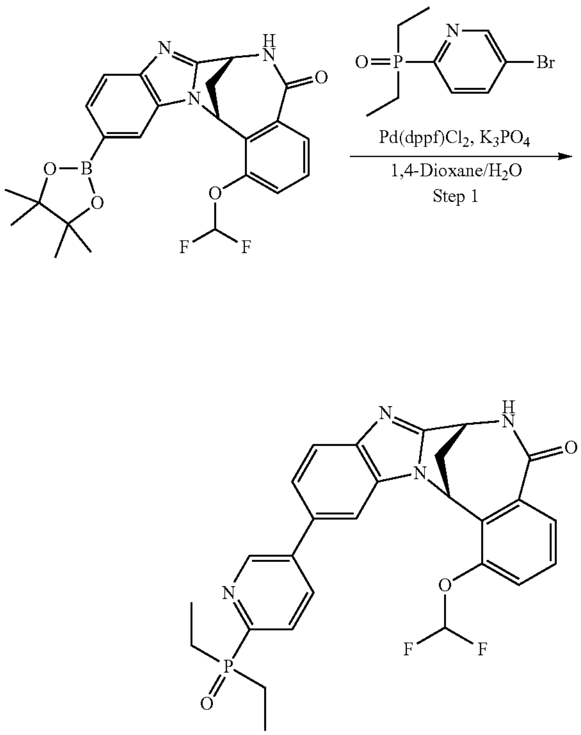

To a stirred solution of (7R,14R)-1-(difluoromethoxy)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.128 mmol) and (5-bromopyridin-2-yl)diethylphosphine oxide (41 mg, 0.154 mmol) in 1,4-dioxane (0.8 mL) and $H_2O$ (0.2 mL) were added $Pd(dppf)Cl_2 \cdot CH_2Cl_2$ (11 mg, 0.013 mmol) and $K_3PO_4$ (82 mg, 0.384 mmol) at room temperature. The resulting mixture was stirred for 2 h at 80° C. under nitrogen atmosphere. The resulting mixture was concentrated under vacuum and purified by silica gel column chromatography, eluted with $CH_2Cl_2$/MeOH (10/1) followed by Prep-HPLC with the following conditions (Column: XBridge Prep Phenyl OBD Column 19*250 mm, 5 m; Mobile Phase A: Water (10 mmol/L $NH_4HCO_3$), Mobile Phase B: ACN; Flow rate: 60 mL/min; Gradient: 16% B to 31% B in 10 min; Wave Length: 254/220 nm) to afford (7R,14R)-11-(6-(diethylphosphoryl)pyridin-3-yl)-1-(difluoromethoxy)-6,7-dihydro-7,14-methanobenzo[f]benzo[4,5]imidazo[1,2-a][1,4]diazocin-5(14H)-one (16 mg, 23%) as a white solid. MS ESI calculated for $C_{27}H_{25}F_2N_4O_3P$ $[M+H]^+$, 523.16, found 523.20. $^1H$ NMR (400 MHz, Chloroform-d) δ 9.01-8.90 (m, 1H), 8.49-8.39 (m, 1H), 8.26-8.17 (m, 1H), 8.05-7.95 (m, 1H), 7.93-7.79 (m, 2H), 7.73 (d, J=1.7 Hz, 1H), 7.58-7.36 (m, 3H), 6.88 (t, J=72.7 Hz, 1H), 6.41 (d, J=7.2 Hz, 1H), 5.07 (t, J=6.9 Hz, 1H), 3.60-3.46 (m, 1H), 2.91 (d, J=13.4 Hz, 1H), 2.14-2.02 (m, 4H), 1.25-1.06 (m, 6H). $^{19}F$ NMR (377 MHz, Chloroform-d) δ −80.43, −80.67, −80.88, −81.34. $^{31}P$ NMR (162 MHz, Chloroform-d) δ 45.75.

Example 138: (7R,14R)-11-(4-(diethylphosphoryl)-2-fluorophenyl)-1-(difluoromethoxy)-6,7-dihydro-7,14-methanobenzo[f]benzo[4,5]imidazo[1,2-a][1,4]diazocin-5(14H)-one Synthetic Scheme

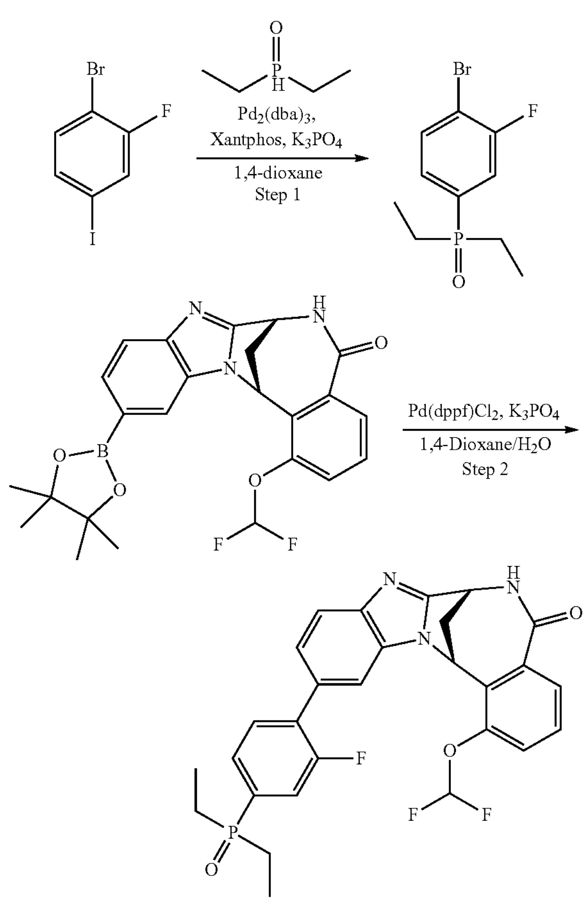

Preparation 138A: (4-bromo-3-fluorophenyl)diethylphosphine Oxide

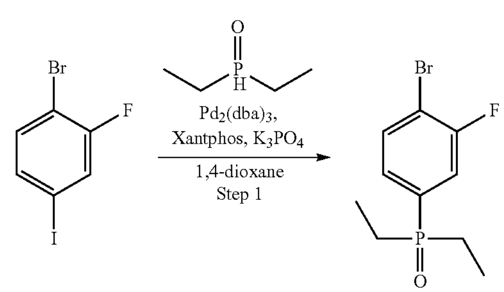

To a stirred solution of 1-bromo-2-fluoro-4-iodobenzene (300 mg, 0.997 mmol) and diethylphosphine oxide (116 mg, 1.097 mmol) in 1,4-dioxane (4 mL) were added $Pd_2(dba)_3$ (91 mg, 0.100 mmol), XantPhos (58 mg, 0.100 mmol) and $K_3PO_4$ (423 mg, 1.994 mmol) at room temperature. The resulting mixture was stirred for overnight at 90° C. under nitrogen atmosphere. The resulting mixture was concentrated under vacuum. The residue was purified by silica gel column chromatography, eluted with $CH_2Cl_2$/MeOH (0% to 10%) to afford (4-bromo-3-fluorophenyl)diethylphosphine oxide (230 mg, 82%) as a yellow solid. MS ESI calculated for $C_{10}H_{13}BrFOP$ $[M+H]^+$, 278.99 280.99, found 279.05 281.05. $^1H$ NMR (400 MHz, Chloroform-d) δ 7.70 (t, 1H), 7.47 (t, J=9.5 Hz, 1H), 7.35 (t, J=9.0 Hz, 1H), 2.11-1.96 (m, 2H), 1.95-1.81 (m, 2H), 1.20-1.07 (m, 6H). $^{19}F$ NMR (377 MHz, Chloroform-d) δ −105.16. $^{31}P$ NMR (162 MHz, Chloroform-d) δ 43.71.

Example 138: (7R,14R)-11-(4-(diethylphosphoryl)-2-fluorophenyl)-1-(difluoromethoxy)-6,7-dihydro-7,14-methanobenzo[f]benzo[4,5]imidazo[1,2-a][1,4]diazocin-5(14H)-one

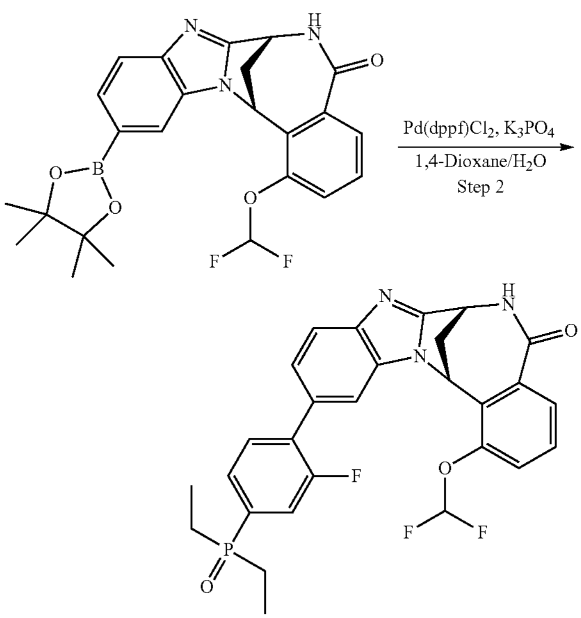

To a stirred solution of (7R,14R)-1-(difluoromethoxy)-11-(4,4,5,5-tetramethyl-1,3,2-dioxaborolan-2-yl)-6,7-dihydro-7,14-methanobenzo[f]benzo[4,5]imidazo[1,2-a][1,4]diazocin-5(14H)-one (60 mg, 0.128 mmol) and (4-bromo-3-fluorophenyl)diethylphosphine oxide (43 mg, 0.154 mmol) in 1,4-dioxane (0.8 mL) and $H_2O$ (0.2 mL) were added $Pd(dppf)Cl_2 \cdot CH_2Cl_2$ (11 mg, 0.013 mmol) and $K_3PO_4$ (82 mg, 0.384 mmol) at room temperature. The resulting mixture was stirred for 2 h at 80° C. under nitrogen atmosphere. The resulting mixture was concentrated under vacuum and purified by silica gel column chromatography, eluted with $CH_2Cl_2$/MeOH (0% to 10%) followed by Prep-HPLC with the following conditions (Column: XBridge Prep Phenyl OBD Column 19*250 mm, 5 m; Mobile Phase A: Water (10 mmol/L $NH_4HCO_3$), Mobile Phase B: ACN; Flow rate: 60 mL/min; Gradient: 20% B to 35% B in 10 min; Wave Length: 254/220 nm) to afford (7R,14R)-11-(4-(diethylphosphoryl)-2-fluorophenyl)-1-(difluoromethoxy)-6,7-dihydro-7,14-methanobenzo[f]benzo[4,5]imidazo[1,2-a][1,4]diazocin-5(14H)-one (35 mg, 51%) as a white solid. MS ESI calculated for $C_{28}H_{25}F_3N_3O_3P$ $[M+H]^+$, 540.16, found 540.20. $^1H$ NMR (400 MHz, Chloroform-d) δ 8.48-8.39 (m, 1H), 7.83 (d, J=8.5 Hz, 1H), 7.75 (s, 1H), 7.63-7.34 (m, 7H), 6.83 (t, J=72.6 Hz, 1H), 6.41 (d, J=7.1 Hz, 1H), 5.10 (t, J=6.6 Hz, 1H), 3.58-3.44 (m, 1H), 2.90 (d, J=13.3 Hz, 1H), 2.16-1.94 (m, 4H), 1.24-1.06 (m, 6H). $^{19}F$ NMR (377 MHz, Chloroform-d) δ −80.17, −80.61, −81.24, −81.68, −116.89. $^{31}P$ NMR (162 MHz, Chloroform-d) δ 43.01.

Example 139: (7R,14R)-1-(difluoromethoxy)-11-(4-(dimethylphosphoryl)-3-fluorophenyl)-12-fluoro-6-(methyl-d3)-6,7-dihydro-7,14-methanobenzo[f]benzo[4,5]imidazo[1,2-a][1,4]diazocin-5(14H)-one Synthetic Scheme

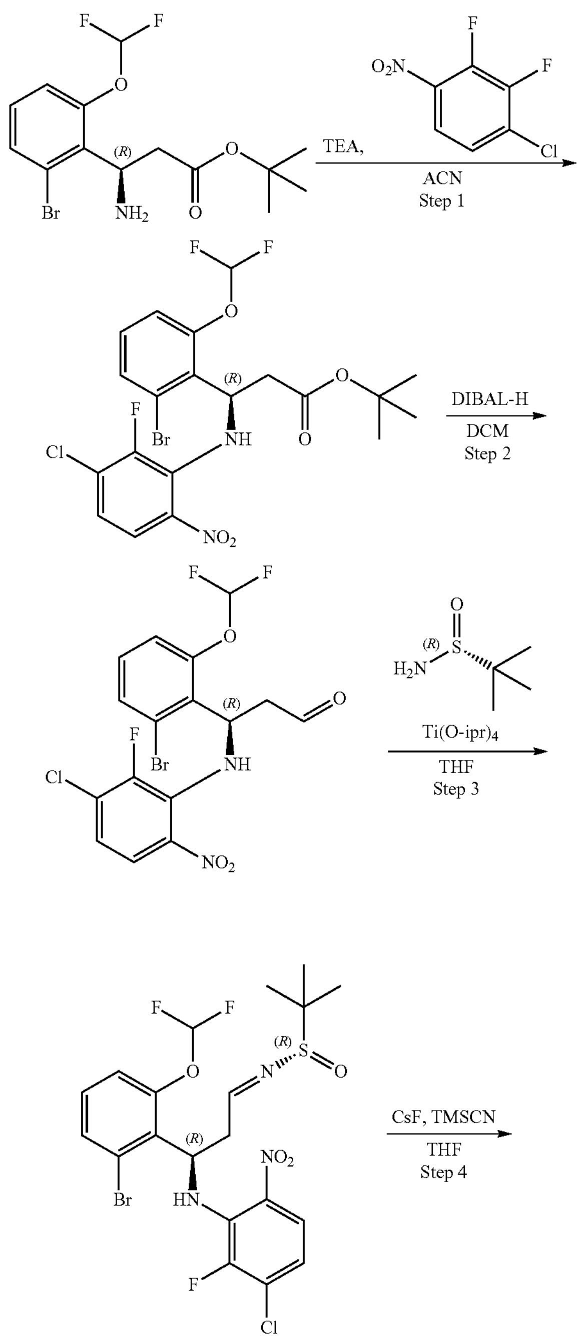

-continued

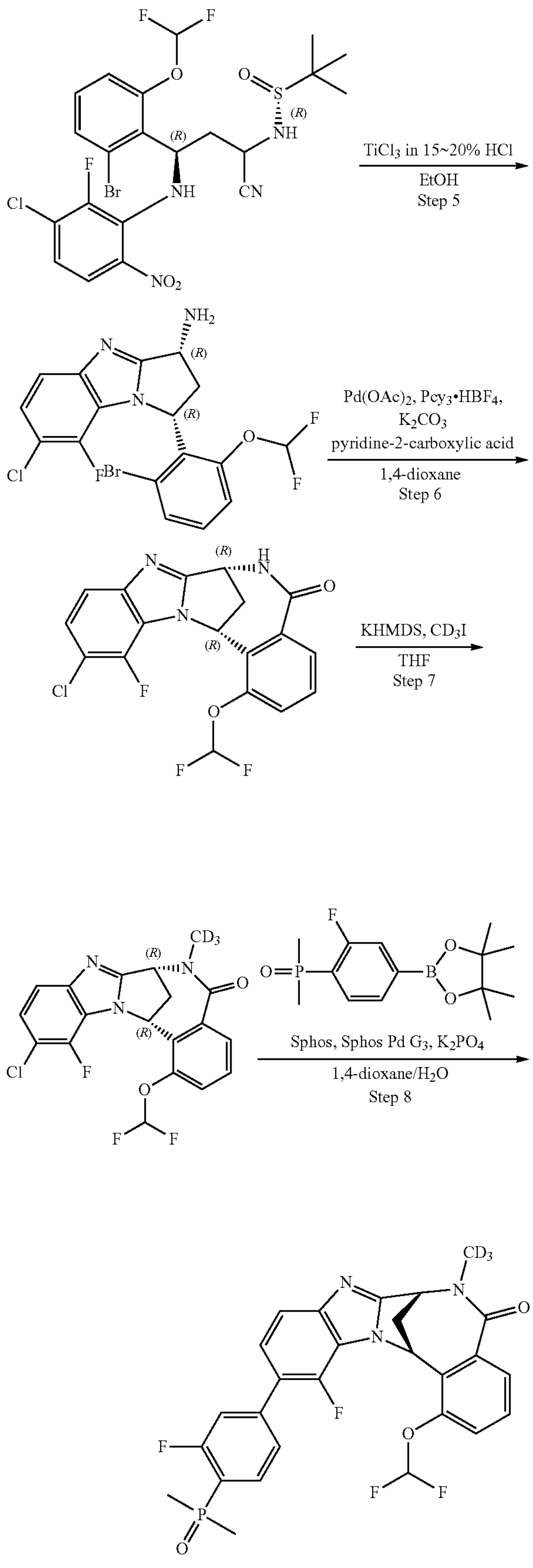

Preparation 139A: tert-butyl (3R)-3-[2-bromo-6-(difluoromethoxy)phenyl]-3-[(3-chloro-2-fluoro-6-nitrophenyl)amino]propanoate

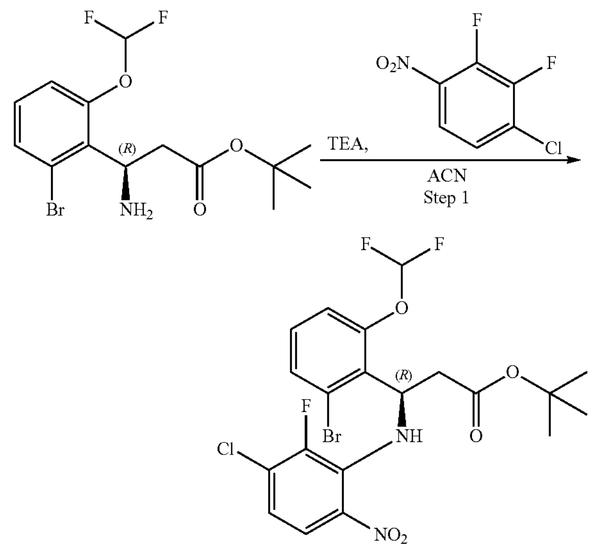

A solution of tert-butyl (3R)-3-amino-3-[2-bromo-6-(difluoromethoxy)phenyl]propanoate (35.00 g, 95.575 mmol), 1-chloro-2,3-difluoro-4-nitrobenzene (22.20 g, 114.690 mmol) and TEA (14.51 g, 143.363 mmol) in ACN (350 mL) was stirred for 3 h at 50° C. The resulting mixture was concentrated under reduced pressure and purified by silica gel column chromatography, eluted with $CH_2Cl_2$/PE (10/1) to afford tert-butyl (3R)-3-[2-bromo-6-(difluoromethoxy) phenyl]-3-[(3-chloro-2-fluoro-6-nitrophenyl)amino]propanoate (48.20 g, 93%) as a yellow oil. MS ESI calculated for $C_{20}H_{19}BrClF_3N_2O_5$ $[M+H]^+$, 539.01 541.01, found 539.05 541.05. $^1$H NMR (400 MHz, Chloroform-d) δ 8.51-8.37 (m, 1H), 7.89 (d, J=9.3 Hz, 1H), 7.44 (d, J=7.0 Hz, 1H), 7.19-7.09 (m, 2H), 6.84-6.45 (m, 2H), 6.17-6.07 (m, 1H), 3.12-2.97 (m, 1H), 2.87-2.76 (m, 1H), 1.34 (s, 9H). $^{19}$F NMR (377 MHz, Chloroform-d) δ −80.14, −80.60, −80.94, −81.38, −123.07.

Preparation 139B: (3R)-3-[2-bromo-6-(difluoromethoxy)phenyl]-3-[(3-chloro-2-fluoro-6-nitrophenyl)amino]propanal

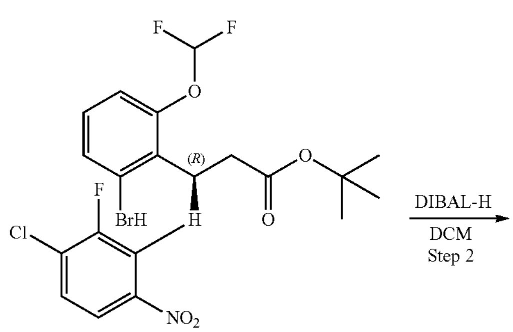

-continued

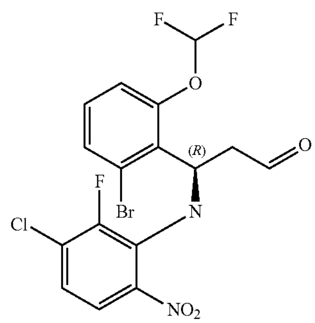

To a stirred solution of tert-butyl (3R)-3-[2-bromo-6-(difluoromethoxy)phenyl]-3-[(3-chloro-2-fluoro-6-nitrophenyl)amino]propanoate (31.00 g, 57.436 mmol) in DCM (465 mL) was added DIBAL-H (63.0 mL, 63.180 mmol) dropwise at −78° C. The resulting mixture was stirred for 3 h at −78° C. under nitrogen atmosphere. The reaction was quenched with HCl (1N) at −78° C. The resulting mixture was extracted with $CH_2Cl_2$ (3×500 mL). The combined organic layers were washed with brine (3×500 mL), dried over anhydrous $Na_2SO_4$. After filtration, the filtrate was concentrated under reduced pressure. The residue was purified by silica gel column chromatography, eluted with $CH_2Cl_2$/PE (1/1) to afford (3R)-3-[2-bromo-6-(difluoromethoxy)phenyl]-3-[(3-chloro-2-fluoro-6-nitrophenyl)amino]propanal (23.80 g, 88%) as a yellow oil. MS ESI calculated for $C_{16}H_{11}BrClF_3N_2O_4$ $[M+H]^+$, 466.95 468.95, found 466.80 468.80. $^1H$ NMR (400 MHz, Chloroform-d) δ 9.82 (s, 1H), 8.39 (d, J=9.0 Hz, 1H), 7.93-7.84 (m, 1H), 7.46-7.40 (m, 1H), 7.19-7.09 (m, 2H), 6.88-6.47 (m, 2H), 6.34-6.24 (m, 1H), 3.44-3.30 (m, 1H), 3.10-2.98 (m, 1H).

Preparation 139C: (R)—N-[(3R)-3-[2-bromo-6-(difluoromethoxy)phenyl]-3-[(3-chloro-2-fluoro-6-nitrophenyl)amino]propylidene]-2-methylpropane-2-sulfinamide

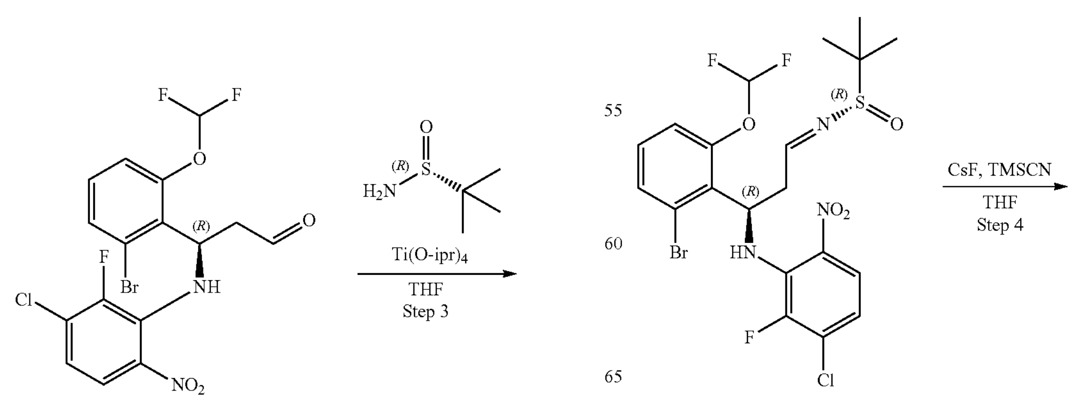

-continued

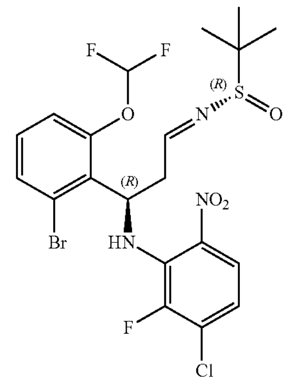

A solution of (3R)-3-[2-bromo-6-(difluoromethoxy)phenyl]-3-[(3-chloro-2-fluoro-6-nitrophenyl)amino]propanal (23.80 g, 50.896 mmol), (R)-2-methylpropane-2-sulfinamide (12.34 g, 101.792 mmol) and Ti(Oi-Pr)$_4$ (28.93 g, 101.792 mmol) in DCM (240 mL) was stirred for 2 h at room temperature. The resulting mixture was diluted with water (200 mL). The resulting mixture was extracted with $CH_2Cl_2$ (3×300 mL). The combined organic layers were washed with brine (3×500 mL), dried over anhydrous $Na_2SO_4$. After filtration, the filtrate was concentrated under reduced pressure. The residue was purified by silica gel column chromatography, eluted with $CH_2Cl_2$/PE (1/1) to afford (R)—N-[(3R)-3-[2-bromo-6-(difluoromethoxy)phenyl]-3-[(3-chloro-2-fluoro-6-nitrophenyl)amino]propylidene]-2-methylpropane-2-sulfinamide (24.10 g, 82%) as a yellow oil. MS ESI calculated for $C_{20}H_{20}BrClF_3N_3O_4S$ $[M-H]^-$, 568.00 570.00, found 567.80 569.80. $^1H$ NMR (400 MHz, Chloroform-d) δ 8.47 (d, J=8.0 Hz, 1H), 8.12 (t, J=3.9 Hz, 1H), 7.89 (d, J=9.3 Hz, 1H), 7.44 (d, J=7.5 Hz, 1H), 7.21-7.09 (m, 2H), 6.85-6.44 (m, 2H), 6.30-6.15 (m, 1H), 3.54-3.29 (m, 1H), 3.17-3.03 (m, 1H), 1.11 (s, 9H).

Preparation 139D: (R)—N-[(3R)-3-[2-bromo-6-(difluoromethoxy)phenyl]-3-[(3-chloro-2-fluoro-6-nitrophenyl)amino]-1-cyanopropyl]-2-methylpropane-2-sulfinamide -continued

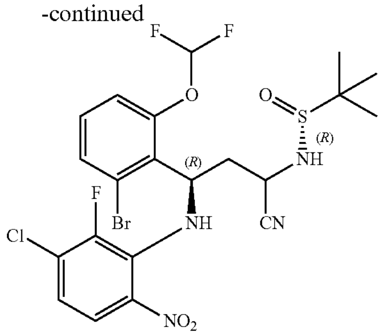

A solution of (R)—N-[(3R)-3-[2-bromo-6-(difluoromethoxy)phenyl]-3-[(3-chloro-2-fluoro-6-nitrophenyl) amino]propylidene]-2-methylpropane-2-sulfinamide (24.00 g, 42.046 mmol), CsF (12.77 g, 84.092 mmol) and TMSCN (8.34 g, 84.092 mmol) in THF (240 mL) was stirred for 16 h at room temperature. The reaction was quenched with sat. $NaHCO_3$ (aq.) at room temperature. The resulting mixture was extracted with EtOAc (3×300 mL). The combined organic layers were washed with brine (3×500 mL), dried over anhydrous $Na_2SO_4$. After filtration, the filtrate was concentrated under reduced pressure. The residue was purified by silica gel column chromatography, eluted with PE/EA (1/1) to afford (R)—N-[(3R)-3-[2-bromo-6-(difluoromethoxy)phenyl]-3-[(3-chloro-2-fluoro-6-nitrophenyl) amino]-1-cyanopropyl]-2-methylpropane-2-sulfinamide (21.10 g, 84%) as a yellow solid. MS ESI calculated for $C_{21}H_{21}BrClF_3N_4O_4S$ $[M+H]^+$, 597.01 599.01, found 597.05 599.05.

Preparation 139E: (3R,5R)-3-[2-bromo-6-(difluoromethoxy)phenyl]-11-chloro-12-fluoro-2,7-diazatricyclo[6.4.0.0^{2,6}]dodeca-1(8),6,9,11-tetraen-5-amine

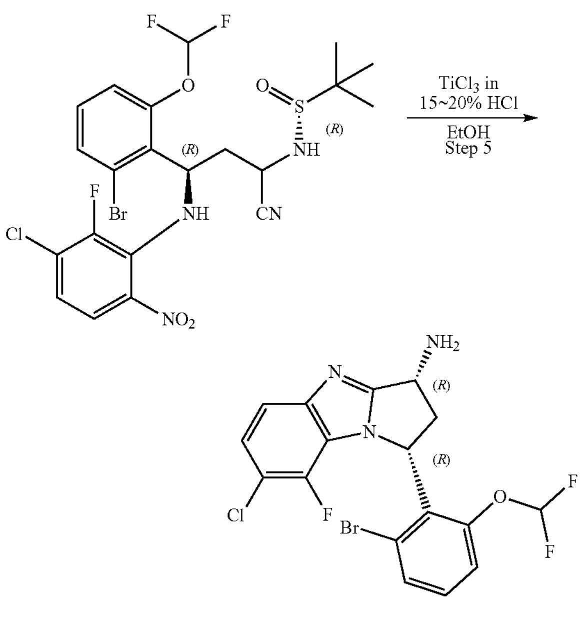

To a stirred solution of $TiCl_3$ (58.96 g, 66.912 mmol, 17% in HCl) in EtOH (65 mL) was added (R)—N-[(3R)-3-[2-bromo-6-(difluoromethoxy)phenyl]-3-[(3-chloro-2-fluoro-6-nitrophenyl)amino]-1-cyanopropyl]-2-methylpropane-2-sulfinamide (5.00 g, 8.364 mmol) in EtOH (35 mL) dropwise at 75° C. The resulting mixture was stirred for 2 h at 75° C. The resulting mixture was concentrated under vacuum. The residue was basified to pH 9 with $Na_2CO_3$. The resulting mixture was extracted with EtOAc (3×100 mL). The combined organic layers were washed with brine (3×200 mL), dried over anhydrous $Na_2SO_4$. After filtration, the filtrate was concentrated under reduced pressure. The residue was purified by silica gel column chromatography, eluted with $CH_2Cl_2$/MeOH (15/1) to afford (3R,5R)-3-[2-bromo-6-(difluoromethoxy)phenyl]-11-chloro-12-fluoro-2,7-diazatricyclo[6.4.0.0^{2,6}]dodeca-1(8),6,9,11-tetraen-5-amine (3.08 g, 82%) as a yellow solid. MS ESI calculated for $C_{17}H_{12}BrClF_3N_3O$ $[M+H]^+$, 445.98 447.98, found 446.05 448.05.

Preparation 139F: (7R,14R)-11-chloro-1-(difluoromethoxy)-12-fluoro-6,7-dihydro-7,14-methanobenzo[f]benzo[4,5]imidazo[1,2-a][1,4]diazocin-5(14H)-one

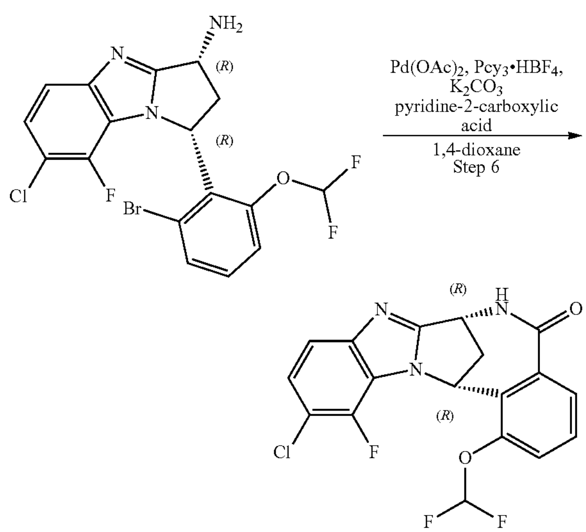

To a solution of (3R,5R)-3-[2-bromo-6-(difluoromethoxy)phenyl]-11-chloro-12-fluoro-2,7-diazatricyclo [6.4.0.0^{2,6}]dodeca-1(8),6,9,11-tetraen-5-amine (2.80 g, 6.269 mmol) in 1,4-dioxane (100 mL) was added $PCy_3·HBF_4$ (461 mg, 1.254 mmol), pyridine-2-carboxylic acid (386 mg, 3.135 mmol), $Pd(OAc)_2$ (141 mg, 0.627 mmol) and $K_2CO_3$ (4.33 g, 31.345 mmol) in a pressure tank. The mixture was purged with nitrogen for 2 min and then was pressurized to 10 atm. with carbon monoxide at 110° C. for 16 h. The reaction mixture was cooled to room temperature. The resulting mixture was concentrated under vacuum. The residue was purified by silica gel column chromatography, eluted with $CH_2Cl_2$/MeOH (10/1) to afford ((7R, 14R)-11-chloro-1-(difluoromethoxy)-12-fluoro-6,7-dihydro-7,14-methanobenzo[f]benzo[4,5]imidazo[1,2-a][1,4] diazocin-5(14H)-one (850 mg, 34%) as a yellow solid. MS ESI calculated for $C_{18}H_{11}ClF_3N_3O_2$ $[M+H]^+$, 394.05, found 394.05. $^1H$ NMR (400 MHz, Chloroform-d) δ 8.47-8.36 (m, 1H), 7.97 (d, J=6.2 Hz, 1H), 7.48-7.36 (m, 3H), 7.23-7.14 (m, 1H), 6.96-6.52 (m, 2H), 4.95 (t, J=6.4 Hz, 1H), 3.57-

3.34 (m, 1H), 2.84 (d, J=13.3 Hz, 1H). $^{19}$F NMR (377 MHz, Chloroform-d) δ −78.59, −79.03, −82.55, −82.58, −83.00, −83.02, −134.02.

Preparation 139G: (7R,14R)-11-chloro-1-(difluoromethoxy)-12-fluoro-6-(methyl-d3)-6,7-dihydro-7,14-methanobenzo[f]benzo[4,5]imidazo[1,2-a][1,4]diazocin-5(14H)-one

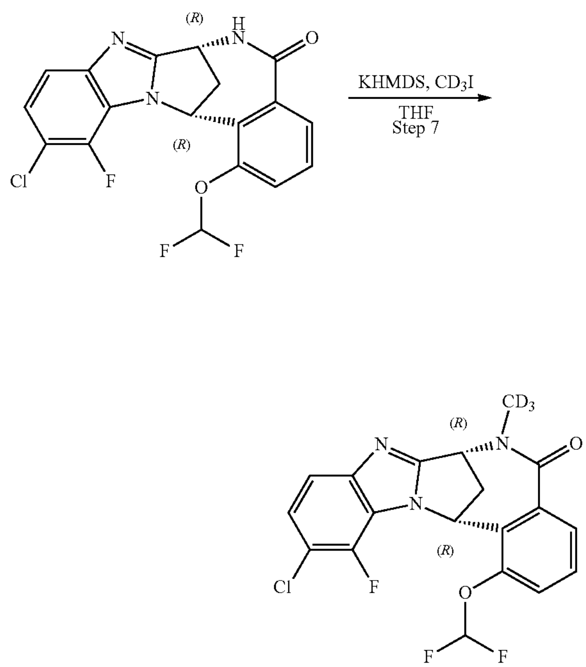

To a stirred solution of (7R,14R)-11-chloro-1-(difluoromethoxy)-12-fluoro-6,7-dihydro-7,14-methanobenzo[f]benzo[4,5]imidazo[1,2-a][1,4]diazocin-5(14H)-one (550 mg, 1.397 mmol) in THF (15 mL) was added KHMDS (2.0 mL, 1.676 mmol, 1 M in THF) dropwise at 0° C. The resulting mixture was stirred for 1 h at 0° C. under nitrogen atmosphere. To the above mixture was added iodomethane-$d_3$ (263 mg, 1.816 mmol) at room temperature. The resulting mixture was stirred for additional 2 h at room temperature. The reaction was quenched with sat. $NH_4Cl$ (aq.) at room temperature. The resulting mixture was extracted with EtOAc (3×50 mL). The combined organic layers were washed with brine (3×100 mL), dried over anhydrous $Na_2SO_4$. After filtration, the filtrate was concentrated under reduced pressure. The residue was purified by silica gel column chromatography, eluted with $CH_2Cl_2$/MeOH (10/1) to afford (7R,14R)-11-chloro-1-(difluoromethoxy)-12-fluoro-6-(methyl-d3)-6,7-dihydro-7,14-methanobenzo[f]benzo[4,5]imidazo[1,2-a][1,4]diazocin-5(14H)-one (460 mg, 80%) as a light yellow solid. MS ESI calculated for $C_{19}H_{10}D_3ClF_3N_3O_2$ $[M+H]^+$, 411.08, found 411.20. $^1$H NMR (400 MHz, Chloroform-d) δ 8.43 (d, J=8.0 Hz, 1H), 7.51-7.34 (m, 3H), 7.23-7.13 (m, 1H), 6.96-6.54 (m, 1H), 6.47 (d, J=7.4 Hz, 1H), 4.92 (d, J=7.0 Hz, 1H), 3.51-3.36 (m, 1H), 2.85 (d, J=13.7 Hz, 1H).

Example 139: (7R,14R)-1-(difluoromethoxy)-11-(4-(dimethylphosphoryl)-3-fluorophenyl)-12-fluoro-6-(methyl-d3)-6,7-dihydro-7,14-methanobenzo[f]benzo[4,5]imidazo[1,2-a][1,4]diazocin-5(14H)-one

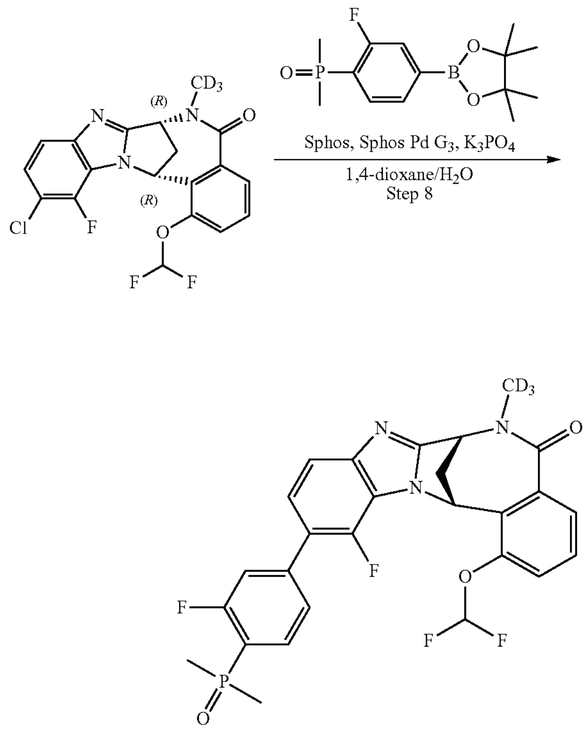

To a stirred solution of (7R,14R)-11-chloro-1-(difluoromethoxy)-12-fluoro-6-(methyl-d3)-6,7-dihydro-7,14-methanobenzo[f]benzo[4,5]imidazo[1,2-a][1,4]diazocin-5(14H)-one (80 mg, 0.195 mmol) and 2-[4-(dimethylphosphoryl)-3-fluorophenyl]-4,4,5,5-tetramethyl-1,3,2-dioxaborolane (87 mg, 0.292 mmol) in 1,4-dioxane (1 mL) and $H_2O$ (0.2 mL) were added SPhos (8 mg, 0.020 mmol 8), SPhos Pd Gen.3 (8 mg, 0.010 mmol) and $K_3PO_4$ (83 mg, 0.390 mmol) at room temperature under nitrogen atmosphere. The resulting mixture was stirred for 1 h at 80° C. under nitrogen atmosphere. The resulting mixture was concentrated under reduced pressure and purified by silica gel column chromatography, eluted with $CH_2Cl_2$/MeOH (10/1) followed by reversed-phase flash chromatography with the following conditions: column, C18 silica gel; mobile phase, $CH_3CN$ in water (10 mmol/L $NH_4HCO_3$), 30% to 70% gradient in 20 min; detector, 254 nm. This resulted in (7R,14R)-1-(difluoromethoxy)-11-(4-(dimethylphosphoryl)-3-fluorophenyl)-12-fluoro-6-(methyl-d3)-6,7-dihydro-7,14-methanobenzo[f]benzo[4,5]imidazo[1,2-a][1,4]diazocin-5(14H)-one (61 mg, 57%) as a white solid. MS ESI calculated for $C_{27}H_{19}D_3F_4N_3O_3P$ $[M+H]^+$, 547.15, found 547.20. $^1$H NMR (400 MHz, Chloroform-d) δ 8.48-8.39 (m, 1H), 8.09-7.98 (m, 1H), 7.61 (d, J=8.5 Hz, 1H), 7.52-7.41 (m, 2H), 7.39-7.27 (m, 3H), 6.92-6.49 (m, 2H), 5.05 (d, J=6.7 Hz, 1H), 3.57-3.44 (m, 1H), 2.90 (d, J=13.5 Hz, 1H), 1.86 (s, 3H), 1.82 (s, 3H). $^{19}$F NMR (377 MHz, Chloroform-d) δ −79.15, −79.60, −82.36, −82.78, −105.78, −136.56. $^{31}$P NMR (162 MHz, Chloroform-d) δ 30.43.

Example 140: (7R,14R)-1-(difluoromethoxy)-11-(4-(dimethylphosphoryl)-3-fluorophenyl)-12-fluoro-6,7-dihydro-7,14-methanobenzo[f]benzo[4,5]imidazo[1,2-a][1,4]diazocin-5(14H)-one

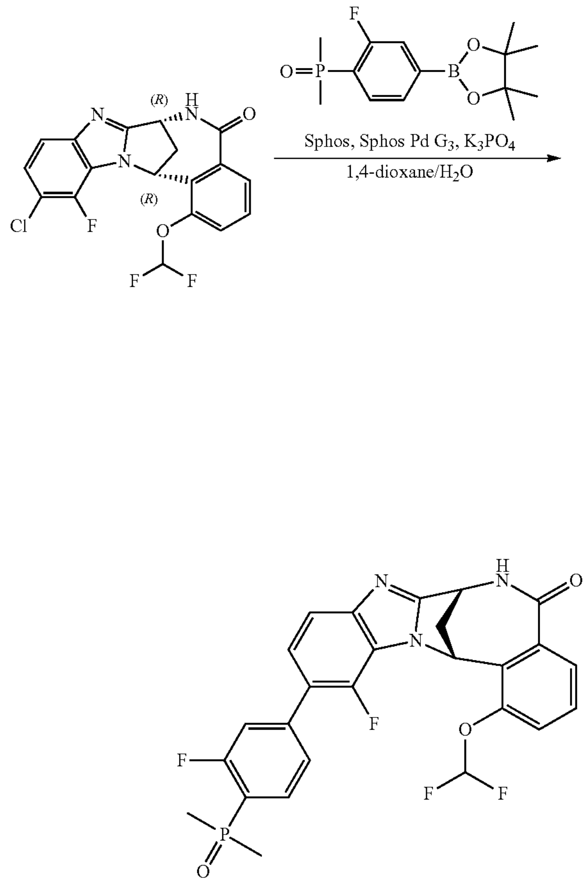

To a stirred solution of (7R,14R)-11-chloro-1-(difluoromethoxy)-12-fluoro-6,7-dihydro-7,14-methanobenzo[f]benzo[4,5]imidazo[1,2-a][1,4]diazocin-5(14H)-one (60 mg, 0.20 mmol) in 1,4-dioxane (2 mL) and $H_2O$ (0.4 mL) were added SPhos Pd G3 (12 mg, 0.0016 mmol), SPhos (12 mg, 0.030 mmol) and $K_3PO_4$ (96 mg, 0.46 mmol) at room temperature. The resulting mixture was stirred for 16 h at 80° C. under nitrogen atmosphere. The resulting mixture was concentrated under reduced pressure. The residue was purified by silica gel column chromatography, eluted with $CH_2Cl_2$/MeOH (10/1) followed by reversed-phase flash chromatography with the following conditions: column, C18 silica gel; mobile phase, $CH_3CN$ in Water (20 mmol/L $NH_4HCO_3$), 30% to 50% gradient in 20 min. This resulted in ((7R,14R)-1-(difluoromethoxy)-1144-(dimethylphosphoryl)-3-fluorophenyl)-12-fluoro-6,7-dihydro-7,14-methanobenzo[f]benzo[4,5]imidazo[1,2-a][1,4]diazocin-5(14H)-one (30 mg, 35%) as a white solid. MS ESI calculated for $C_{26}H_{20}F_4N_3O_3P$ $[M+H]^+$, 530.12, found 530.05.

Example 141: (7R,14R)-1-(difluoromethoxy)-11-(4-(dimethylphosphoryl)-3-fluorophenyl)-6-(methyl-d3)-6,7-dihydro-7,14-methanobenzo[f]pyrido[3',2':4,5]imidazo[1,2-a][1,4]diazocin-5(14H)-one Synthetic Scheme

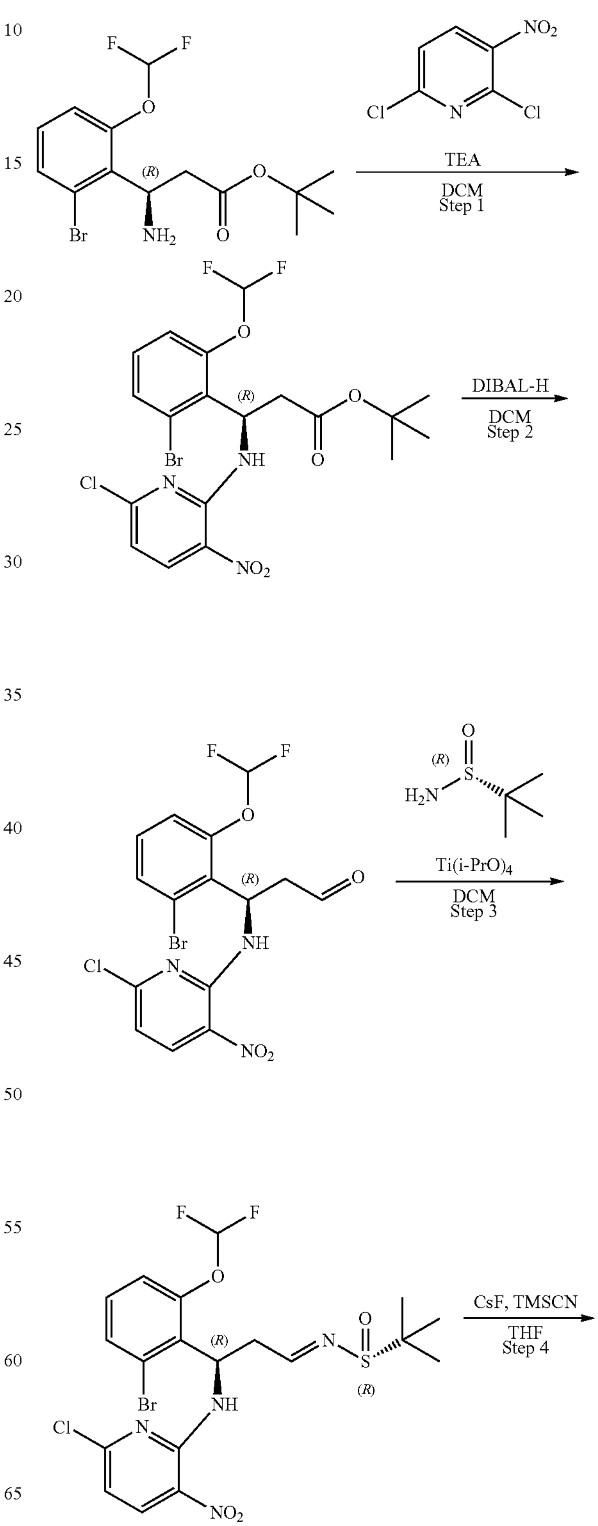

-continued

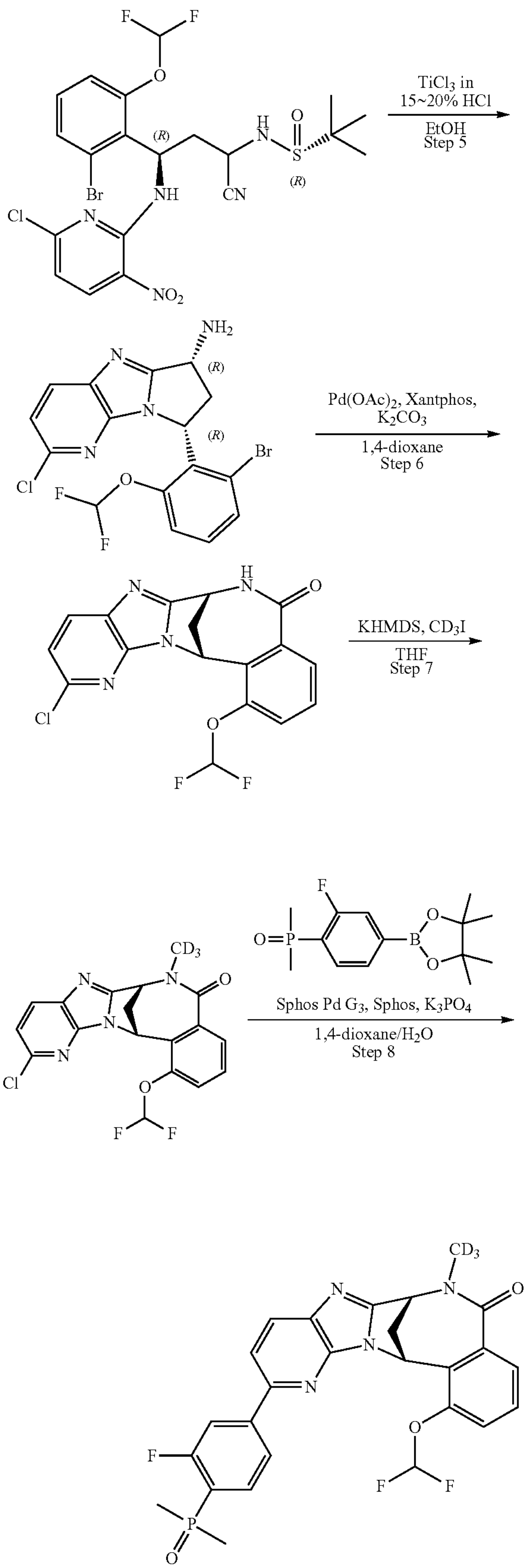

Preparation 141A: tert-butyl (R)-3-(2-bromo-6-(difluoromethoxy)phenyl)-3-((6-chloro-3-nitropyridin-2-yl)amino)propanoate

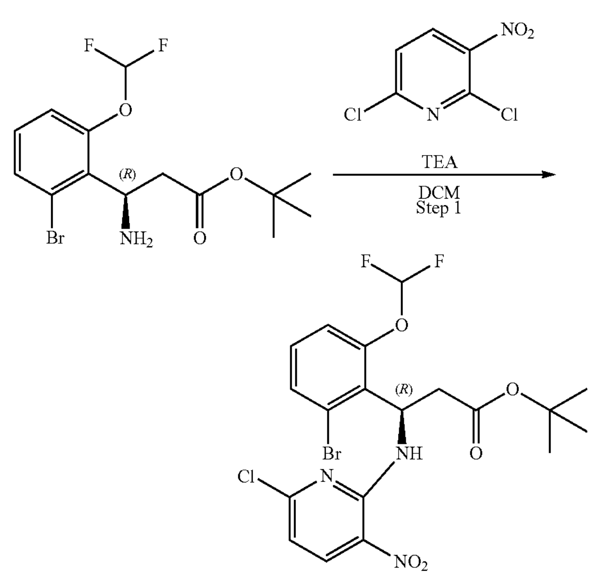

To a stirred mixture of tert-butyl (3R)-3-amino-3-[2-bromo-6-(difluoromethoxy)phenyl]propanoate (5.00 g, 13.654 mmol) and 2,6-dichloro-3-nitropyridine (3.43 g, 17.750 mmol) in DCM (50 mL) was added TEA (2.85 mL, 20.481 mmol) at room temperature. The resulting mixture was stirred for 16 h at room temperature. The resulting mixture was concentrated under reduced pressure and purified by silica gel column chromatography, eluted with PE/DCM (1:1) to afford tert-butyl (R)-3-(2-bromo-6-(difluoromethoxy)phenyl)-3-((6-chloro-3-nitropyridin-2-yl)amino)propanoate (6.50 g, 91%) as a yellow oil. MS ESI calculated for $C_{19}H_{19}BrClF_2N_3O_5$ $[M+H]^+$, 522.02 524.02, found 522.05 524.05. $^1$H NMR (400 MHz, Chloroform-d) δ 9.16 (d, J=8.5 Hz, 1H), 8.31 (d, J=8.6 Hz, 1H), 7.46-7.38 (m, 1H), 7.18-7.10 (m, 2H), 6.91-6.68 (m, 1H), 6.61 (d, J=8.6 Hz, 1H), 6.59-6.51 (m, 1H), 3.17-3.05 (m, 1H), 2.90-2.79 (m, 1H), 1.36 (s, 9H).

Preparation 141B: (R)-3-(2-bromo-6-(difluoromethoxy)phenyl)-3-((6-chloro-3-nitropyridin-2-yl)amino)propanal

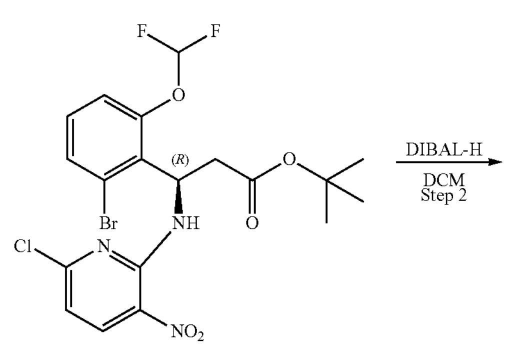

-continued

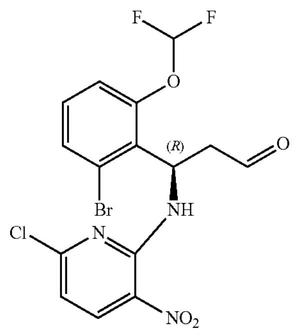

-continued

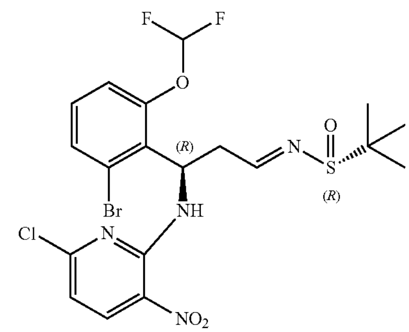

To a stirred mixture of tert-butyl (R)-3-(2-bromo-6-(difluoromethoxy)phenyl)-3-((6-chloro-3-nitropyridin-2-yl)amino)propanoate (6.50 g, 12.435 mmol) in DCM (97 mL) was added 1 M of DIBAL-H in THF (13.68 mL, 13.679 mmol) at −78° C. under nitrogen atmosphere. The resulting mixture was stirred for 3 h at −78° C. under nitrogen atmosphere. The reaction was quenched with water at −78° C. The resulting mixture was filtered, the filter cake was washed with DCM (3×100 mL). The filtrate was extracted with $CH_2Cl_2$ (3×200 mL). The resulting mixture was concentrated under vacuum. The residue was purified by silica gel column chromatography, eluted with PE/EA (5:1) to afford (R)-3-(2-bromo-6-(difluoromethoxy)phenyl)-3-((6-chloro-3-nitropyridin-2-yl)amino)propanal (5.00 g, 89%) as a yellow oil. MS ESI calculated for $C_{15}H_{11}BrClF_2N_3O_4$ $[M+H]^+$, 449.96 451.96, found 449.90 451.90. $^1H$ NMR (400 MHz, Chloroform-d) δ 9.82 (s, 1H), 9.17 (d, J=8.7 Hz, 1H), 8.33 (d, J=8.5 Hz, 1H), 7.52-7.44 (m, 1H), 7.23-7.07 (m, 2H), 6.95-6.54 (m, 3H), 3.43-3.28 (m, 1H), 3.16-2.98 (m, 1H).

Preparation 141C: (R)—N—((R,E)-3-(2-bromo-6-(difluoromethoxy)phenyl)-3-((6-chloro-3-nitropyridin-2-yl)amino)propylidene)-2-methylpropane-2-sulfinamide To a stirred mixture of (R)-3-(2-bromo-6-(difluoromethoxy)phenyl)-3-((6-chloro-3-nitropyridin-2-yl)amino)propanal (5.80 g, 12.871 mmol) and (R)-2-methylpropane-2-sulfinamide (1.87 g, 15.445 mmol) in DCM (59 mL) was added $Ti(Oi-Pr)_4$ (5.49 g, 19.306 mmol) at room temperature. The resulting mixture was stirred for 16 h at room temperature. The reaction was quenched with water at room temperature. The resulting mixture was filtered, the filter cake was washed with DCM (3×50 mL). The filtrate was extracted with $CH_2Cl_2$ (3×200 mL). The resulting mixture was concentrated under vacuum. The residue was purified by silica gel column chromatography, eluted with PE/EA (5:1) to afford (R)—N—((R,E)-3-(2-bromo-6-(difluoromethoxy)phenyl)-3-((6-chloro-3-nitropyridin-2-yl)amino)propylidene)-2-methylpropane-2-sulfinamide (5.00 g, 70%) as a yellow oil. MS ESI calculated for $C_{19}H_{20}BrClF_2N_4O_4S$ $[M+H]^+$, 553.00 555.00, found 552.95 554.95. $^1H$ NMR (400 MHz, Chloroform-d) δ 9.18 (d, J=8.6 Hz, 1H), 8.33-8.28 (m, 1H), 8.12-8.06 (m, 1H), 7.47-7.41 (m, 1H), 7.19-7.05 (m, 2H), 6.93-6.50 (m, 3H), 3.55-3.39 (m, 1H), 3.14-3.05 (m, 1H), 1.12 (s, 9H).

Preparation 141D: (R)—N-((3R)-3-(2-bromo-6-(difluoromethoxy)phenyl)-3-((6-chloro-3-nitropyridin-2-yl)amino)-1-cyanopropyl)-2-methylpropane-2-sulfinamide

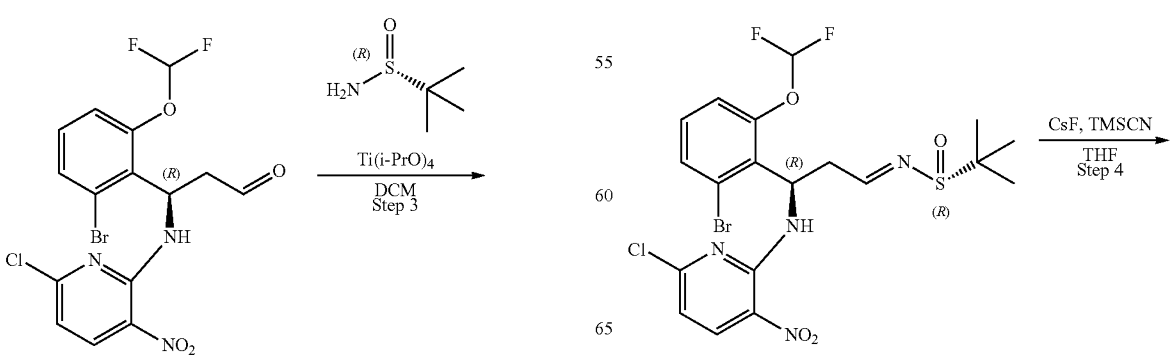

-continued

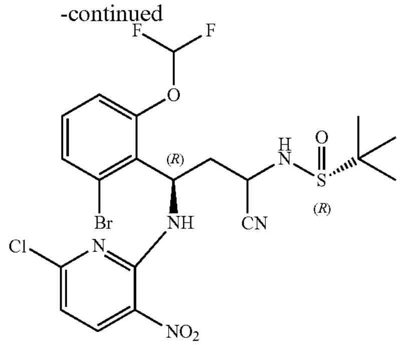

To a stirred mixture of (R)—N—((R,E)-3-(2-bromo-6-(difluoromethoxy)phenyl)-3-((6-chloro-3-nitropyridin-2-yl)amino)propylidene)-2-methylpropane-2-sulfinamide (4.50 g, 8.126 mmol) and CsF (2.47 g, 16.252 mmol) in THF (45 mL) was added TMSCN (1.61 g, 16.252 mmol) at 0° C. The resulting mixture was stirred for 2 h at room temperature under nitrogen atmosphere. The reaction was quenched with water at room temperature. The aqueous layer was extracted with $CH_2Cl_2$ (3×100 mL). The combined organic layer was concentrated under vacuum. The residue was purified by silica gel column chromatography, eluted with PE/EA (1:1) to afford (R)—N-((3R)-3-(2-bromo-6-(difluoromethoxy)phenyl)-3-((6-chloro-3-nitropyridin-2-yl)amino)-1-cyanopropyl)-2-methylpropane-2-sulfinamide (4.50 g, 95%) as a yellow oil. MS ESI calculated for $C_{20}H_{21}BrClF_2N_5O_4S$ $[M+H]^+$, 580.02 582.01, found 580.00 582.00. $^1H$ NMR (400 MHz, Chloroform-d) δ 9.46-9.05 (m, 1H), 8.40-8.31 (m, 1H), 7.48-7.41 (m, 1H), 7.22-7.11 (m, 2H), 6.83-6.74 (m, 1H), 6.71-6.65 (m, 1H), 6.56-6.44 (m, 1H), 4.35-4.25 (m, 1H), 4.18 (d, J=9.2 Hz, 1H), 2.91-2.72 (m, 1H), 2.48-2.37 (m, 1H), 1.27 (s, 9H).

Preparation 141E: (6R,8R)-8-(2-bromo-6-(difluoromethoxy)phenyl)-2-chloro-7,8-dihydro-6H-pyrrolo[2',1':2,3]imidazo[4,5-b]pyridin-6-amine

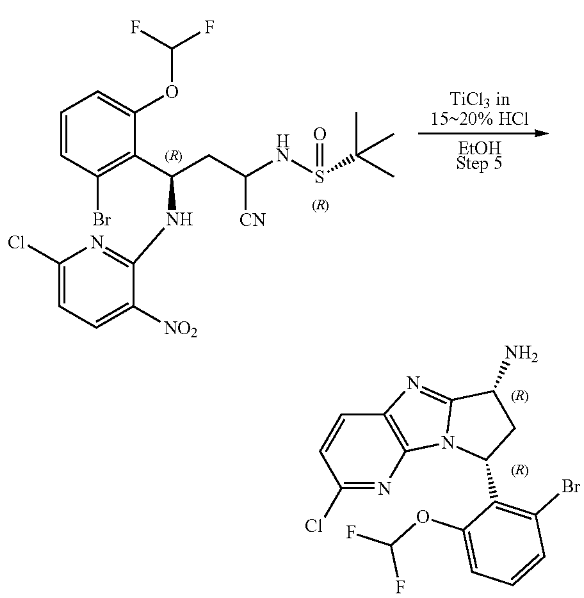

To a stirred mixture of (R)—N-((3R)-3-(2-bromo-6-(difluoromethoxy)phenyl)-3-((6-chloro-3-nitropyridin-2-yl)amino)-1-cyanopropyl)-2-methylpropane-2-sulfinamide (4.50 g, 7.748 mmol) in EtOH (45 mL) was added $TiCl_3$ in 15~20% HCl (47.79 g, 6.888 mmol) at room temperature. The resulting mixture was stirred for 16 h at 80° C. The resulting mixture was diluted with EtOAc (100 mL). The residue was basified to pH 7 with saturated $NaHCO_3$ (aq.). The resulting mixture was filtered, the filter cake was washed with EtOAc (3×100 mL). The filtrate was washed with 2×100 mL of water. The organic layer was concentrated under vacuum. The residue was purified by silica gel column chromatography, eluted with $CH_2Cl_2$/MeOH (10:1) to afford (6R,8R)-8-(2-bromo-6-(difluoromethoxy)phenyl)-2-chloro-7,8-dihydro-6H-pyrrolo[2',1':2,3]imidazo[4,5-b]pyridin-6-amine (2.00 g, 60%) as a colorless oil. MS ESI calculated for $C_{16}H_{12}BrClF_2N_4O$ $[M+H]^+$, 428.99 430.99, found 428.90 430.90.

Preparation 141F: (7R,14R)-11-chloro-1-(difluoromethoxy)-6,7-dihydro-7,14-methanobenzo[f]pyrido[3',2':4,5]imidazo[1,2-a][1,4]diazocin-5(14H)-one

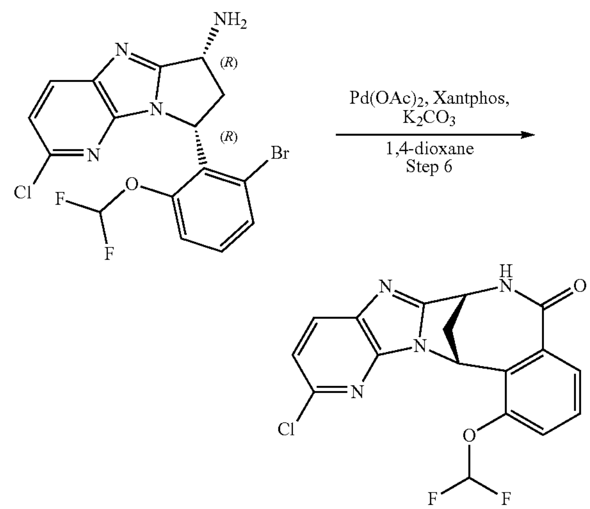

To a stirred mixture of (6R,8R)-8-(2-bromo-6-(difluoromethoxy)phenyl)-2-chloro-7,8-dihydro-6H-pyrrolo[2',1':2,3]imidazo[4,5-b]pyridin-6-amine (250 mg, 0.582 mmol) and $K_2CO_3$ (160 mg, 1.164 mmol) in 1,4-dioxane (10 mL) were added XantPhos (34 mg, 0.058 mmol) and $Pd(OAc)_2$ (13 mg, 0.058 mmol) at room temperature under carbon monoxide atmosphere. The resulting mixture was stirred for 16 h at 100° C. under carbon monoxide atmosphere. The resulting mixture was concentrated under vacuum. The residue was purified by silica gel column chromatography, eluted with $CH_2Cl_2$/MeOH (10:1) to afford (7R,14R)-11-chloro-1-(difluoromethoxy)-6,7-dihydro-7,14-methanobenzo[f]pyrido[3',2':4,5]imidazo[1,2-a][1,4]diazocin-5(14H)-one (50 mg, 23%) as a yellow solid. MS ESI calculated for $C_{17}H_{11}ClF_2N_4O_2$ $[M+H]^+$, 377.05, found 376.95. $^1H$ NMR (400 MHz, Chloroform-d) δ 8.44-8.37 (m, 1H), 7.94 (d, J=8.5 Hz, 1H), 7.56-7.39 (m, 2H), 7.34-7.27 (m, 1H), 7.23-6.93 (m, 2H), 6.55 (d, J=7.4 Hz, 1H), 4.94 (t, J=6.6 Hz, 1H), 3.56-3.37 (m, 1H), 2.87 (d, J=13.4 Hz, 1H). $^{19}F$ NMR (377 MHz, Chloroform-d) δ −76.51, −76.96, −82.32, −82.76.

Preparation 141G: (7R,14R)-11-chloro-1-(difluoromethoxy)-6-(methyl-d3)-6,7-dihydro-7,14-methanobenzo[f]pyrido[3',2':4,5]imidazo[1,2-a][1,4]diazocin-5(14H)-one

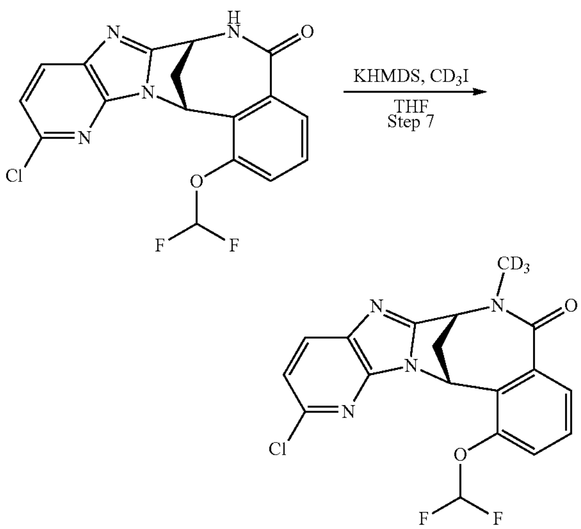

To a stirred mixture of (7R,14R)-11-chloro-1-(difluoromethoxy)-6,7-dihydro-7,14-methanobenzo[f]pyrido[3',2':4,5]imidazo[1,2-a][1,4]diazocin-5(14H)-one (500 mg, 1.327 mmol) in THF (2.5 mL) was added 1M KHMDS in THF (1.73 mL, 1.725 mmol) at −78° C. The resulting mixture was stirred for 1 h at −78° C. under nitrogen atmosphere. To the above mixture was added $CD_3I$ (385 mg, 2.654 mmol) at −78° C. The resulting mixture was stirred for additional 16 h at room temperature. The resulting mixture was quenched with 2 drops water and concentrated under vacuum. The residue was purified by silica gel column chromatography, eluted with $CH_2Cl_2$/MeOH (10:1) to afford (7R,14R)-11-chloro-1-(difluoromethoxy)-6-(methyl-d3)-6,7-dihydro-7,14-methanobenzo[f]pyrido[3',2':4,5]imidazo[1,2-a][1,4]diazocin-5(14H)-one (400 mg, 77%) as a yellow solid. MS ESI calculated for $C_{18}H_{10}D_3ClF_2N_4O_2$ $[M+H]^+$, 394.09, found 394.10. $^1H$ NMR (400 MHz, Chloroform-d) δ 8.50-8.44 (m, 1H), 7.97-7.89 (m, 1H), 7.48-7.39 (m, 2H), 7.24-6.89 (m, 2H), 6.50-6.45 (m, 1H), 5.05-4.97 (m, 1H), 3.53-3.38 (m, 1H), 2.89 (d, J=13.7 Hz, 1H). $^{19}F$ NMR (377 MHz, Chloroform-d) δ −76.87, −77.31, −82.27, −82.71.

Example 141: (7R,14R)-1-(difluoromethoxy)-11-(4-(dimethylphosphoryl)-3-fluorophenyl)-6-(methyl-d3)-6,7-dihydro-7,14-methanobenzo[f]pyrido[3',2':4,5]imidazo[1,2-a][1,4]diazocin-5(14H)-one

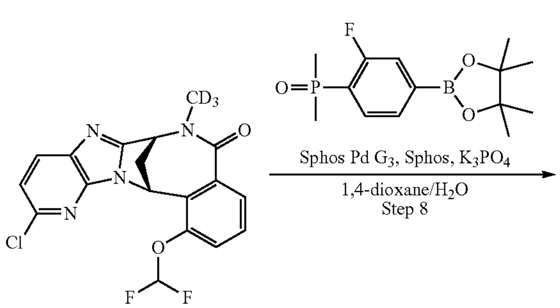

-continued

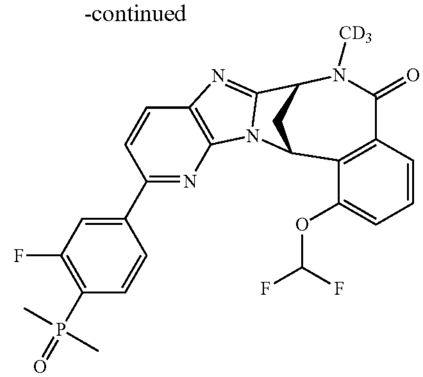

To a stirred mixture of (7R,14R)-11-chloro-1-(difluoromethoxy)-6-(methyl-d3)-6,7-dihydro-7,14-methanobenzo[f]pyrido[3',2':4,5]imidazo[1,2-a][1,4]diazocin-5(14H)-one (65 mg, 0.166 mmol) and 2-[4-(dimethylphosphoryl)-3-fluorophenyl]-4,4,5,5-tetramethyl-1,3,2-dioxaborolane (80 mg, 0.266 mmol) in 1,4-dioxane (2 mL) and $H_2O$ (0.2 mL) were added $K_3PO_4$ (106 mg, 0.498 mmol), Sphos Pd Gen.3 (13 mg, 0.017 mmol) and Sphos (7 mg, 0.017 mmol) at room temperature under nitrogen atmosphere. The resulting mixture was stirred for 16 h at 80° C. The resulting mixture was concentrated under vacuum. The residue was purified by silica gel column chromatography, eluted with $CH_2Cl_2$/MeOH (10:1) following by reversed-phase flash chromatography with the following conditions: column, C18 silica gel; mobile phase, $CH_3CN$ in Water (10 mmol/L $NH_4HCO_3$), 25% to 55% gradient in 25 min; detector, 254 nm. This resulted in (7R,14R)-1-(difluoromethoxy)-11-(4-(dimethylphosphoryl)-3-fluorophenyl)-6-(methyl-d3)-6,7-dihydro-7,14-methanobenzo[f]pyrido[3',2':4,5]imidazo[1,2-a][1,4]diazocin-5(14H)-one (57 mg, 65%) as a white solid. MS ESI calculated for $C_{26}H_{19}D_3F_3N_4O_3P$ $[M+H]^+$, 530.16, found 530.20. $^1H$ NMR (400 MHz, Chloroform-d) δ 8.52-8.40 (m, 1H), 8.10-8.00 (m, 2H), 7.94-7.89 (m, 1H), 7.84-7.75 (m, 1H), 7.69 (d, J=8.4 Hz, 1H), 7.44-7.35 (m, 2H), 7.32-6.88 (m, 1H), 6.55 (d, J=7.2 Hz, 1H), 5.00 (d, J=7.0 Hz, 1H), 3.58-3.39 (m, 1H), 2.91 (d, J=13.6 Hz, 1H), 1.87 (s, 3H), 1.83 (s, 3H). $^{19}F$ NMR (377 MHz, Chloroform-d) δ −78.12, −78.56, −81.58, −82.03, −105.87. $^{31}P$ NMR (162 MHz, Chloroform-d) δ 30.69.

Example 142: (7R,14R)-1-(difluoromethoxy)-11-(4-(dimethylphosphoryl)-2,5-difluorophenyl)-6-(methyl-d3)-6,7-dihydro-7,14-methanobenzo[f]pyrido[3',2':4,5]imidazo[1,2-a][1,4]diazocin-5(14H)-one

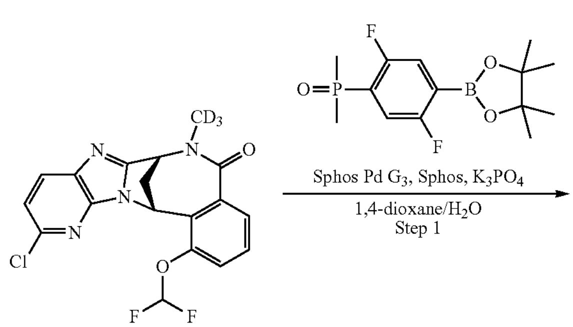

-continued

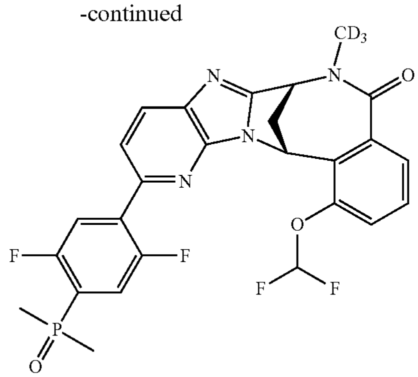

To a stirred mixture of (7R,14R)-11-chloro-1-(difluoromethoxy)-6-(methyl-d3)-6,7-dihydro-7,14-methanobenzo[f]pyrido[3',2':4,5]imidazo[1,2-a][1,4]diazocin-5(14H)-one (65 mg, 0.166 mmol) and 2-[4-(dimethylphosphoryl)-2,5-difluorophenyl]-4,4,5,5-tetramethyl-1,3,2-dioxaborolane (85 mg, 0.266 mmol) in 1,4-dioxane (2 mL) and $H_2O$ (0.2 mL) were added $K_3PO_4$ (106 mg, 0.498 mmol), Sphos Pd Gen.3 (13 mg, 0.017 mmol) and Sphos (7 mg, 0.017 mmol) at room temperature under nitrogen atmosphere. The resulting mixture was stirred for 16 h at 80° C. The resulting mixture was concentrated under vacuum. The residue was purified by silica gel column chromatography, eluted with $CH_2Cl_2$/MeOH (10:1) following by reversed-phase flash chromatography with the following conditions: column, C18 silica gel, mobile phase, $CH_3CN$ in Water (10 mmol/L $NH_4HCO_3$), 25% to 55% gradient in 25 min; detector, 254 nm. This resulted in (7R,14R)-1-(difluoromethoxy)-11-(4-(dimethylphosphoryl)-2,5-difluorophenyl)-6-(methyl-d3)-6,7-dihydro-7,14-methanobenzo[f]pyrido[3',2':4,5]imidazo[1,2-a][1,4]diazocin-5(14H)-one (44 mg, 48%) as a white solid. MS ESI calculated for $C_{26}H_{18}D_3F_4N_4O_3P$ $[M+H]^+$, 548.15, found 548.10. $^1H$ NMR (400 MHz, Chloroform-d) δ 8.54-8.43 (m, 1H), 8.12-8.04 (m, 1H), 7.92-7.65 (m, 3H), 7.45-7.35 (m, 2H), 7.30-6.86 (m, 1H), 6.53 (d, J=7.3 Hz, 1H), 5.00 (d, J=7.1 Hz, 1H), 3.59-3.43 (m, 1H), 2.91 (d, J=13.6 Hz, 1H), 1.88 (s, 3H), 1.84 (s, 3H). $^{19}F$ NMR (377 MHz, Chloroform-d) δ −78.19, −78.63, −81.70, −82.14, −112.16, −120.27. $^{31}P$ NMR (162 MHz, Chloroform-d) δ 30.14.

II. Biological Evaluation

TNFα Induced HEK Blue Cellular Assay

Test articles were diluted in DMSO and serially diluted into 384 well assay plate (Corning 3765), at final concentrations ranging from 30 mM to 0.5 nM. HEK Blue™ TNFα reporter cells were added at a final density of 10,000 cell per well in assay media [DMEM (Gibco, cat #21063-029), 10% fetal bovine serum (ExcelBio, cat #FND500), 1% Penicillin-Streptomycin (Solarbio, cat #P1400-100]. TNFα (R&D 210-TA-020/CF) was then added to the assay plate at a final concentration of 100 pg/ml. This plate was then incubated for 24 hrs at 37° C. and 5% $CO_2$. Secreted alkaline phosphatase expression was then measured using QUANTI-Blue™ (Invivogen), according to manufacturer instructions and read on an Envision microplate reader at 620 nm.

Inhibition data for test compound over a range of concentration was plotted as percentage inhibition of the test compound (100%=maximum inhibition). $IC_{50}$ values were determined after correcting for background [(sample read−mean of low control)/(mean of high control−mean of low control)] where by the low control is DMSO without stimulation and high control is DMSO with stimulation. The $IC_{50}$ is defined as the concentration of test compound which produces 50% inhibition and was quantified using the 4 parameter logistic equation to fit the data.

Representative data for exemplary compounds is presented in Table 3.

TABLE 3

| Ex. No | $IC_{50}$ value |
|---|---|
| 1 | B |
| 2 | A |
| 3 | B |
| 4 | A |
| 5 | A |
| 6 | A |
| 7 | A |
| 8 | B |
| 9 | B |
| 10 | A |
| 11 | C |
| 12 | C |
| 13 | A |
| 14 | A |
| 15 | A |
| 16 | A |
| 17 | A |
| 18 | A |
| 19 | A |
| 20 | A |
| 21 | B |
| 22 | A |
| 23 | A |
| 24 | A |
| 25 | A |
| 26 | A |
| 27 | A |
| 28 | A |
| 29 | A |
| 30 | A |
| 31 | A |
| 32 | A |
| 33 | A |
| 34 | A |
| 35 | B |
| 36 | A |
| 37 | A |
| 38 | A |
| 39 | A |
| 40 | B |
| 41 | A |
| 42 | A |
| 43 | A |
| 44 | A |
| 45 | A |
| 46 | A |
| 47 | A |
| 48 | A |
| 49 | A |
| 50 | A |
| 51 | A |
| 52 | A |
| 53 | A |
| 54 | A |
| 55 | A |
| 56 | A |
| 57 | A |
| 58 | A |
| 59 | A |
| 60 | A |
| 61 | A |
| 62 | A |
| 63 | A |

TABLE 3-continued

| Ex. No | $IC_{50}$ value |
|---|---|
| 64 | B |
| 65 | A |
| 66 | A |
| 67 | A |
| 68 | A |
| 69 | A |
| 70 | A |
| 71 | D |
| 72 | A |
| 73 | A |
| 74 | B |
| 75 | A |
| 76 | A |
| 77 | A |
| 78 | A |
| 79 | A |
| 80 | A |
| 81 | A |
| 82 | B |
| 83 | A |
| 84 | A |
| 85 | A |
| 86 | A |
| 87 | B |
| 88 | A |
| 89 | D |
| 90 | A |
| 91 | A |
| 92 | A |
| 93 | A |
| 94 | A |
| 95 | A |
| 96 | B |
| 97 | A |
| 98 | A |
| 99 | A |
| 100 | A |
| 101 | A |
| 102 | A |
| 103 | A |
| 104 | B |
| 105 | A |
| 106 | A |
| 107 | A |
| 108 | A |
| 109 | A |
| 110 | A |
| 111 | A |
| 112 | A |
| 113 | A |
| 114 | A |
| 115 | A |
| 116 | A |
| 117 | A |
| 118 | A |
| 119 | A |
| 120 | A |
| 121 | B |
| 122 | B |
| 123 | B |
| 124 | A |
| 125 | A |
| 126 | A |
| 127 | A |
| 128 | A |
| 129 | A |
| 130 | A |
| 131 | D |
| 132 | A |
| 133 | A |
| 134 | A |
| 135 | A |
| 136 | A |
| 137 | A |
| 138 | A |
| 139 | A |
| 140 | A |
| 141 | A |
| 142 | A |
| — | — |
| — | — |

Note:
$IC_{50}$ data are designated within the following ranges:
A: ≤0.1 μM
B: >0.1 μM to ≤1.0 μM
C: >1.0 μM to ≤10 μM
D: >10 μM to ≤30 μM

III. Preparation of Pharmaceutical Dosage Forms

Example 1: Oral Capsule

The active ingredient is a compound of Table 1, or a pharmaceutically acceptable salt or solvate thereof. A capsule for oral administration is prepared by mixing 1-1000 mg of active ingredient with starch or other suitable powder blend. The mixture is incorporated into an oral dosage unit such as a hard gelatin capsule, which is suitable for oral administration.

Example 2: Solution for Injection

The active ingredient is a compound of Table 1, or a pharmaceutically acceptable salt or solvate thereof, and is formulated as a solution in sesame oil at a concentration of 50 mg-eq/mL.

The examples and embodiments described herein are for illustrative purposes only and various modifications or changes suggested to persons skilled in the art are to be included within the spirit and purview of this application and scope of the appended claims.

What is claimed is:

1. A compound, or pharmaceutically acceptable salt, solvate, deuteroisotope, or N-oxide thereof, selected from the group consisting of:

(7R,14R)-1-(difluoromethoxy)-11-(4-(dimethylphosphoryl)-3-fluorophenyl)-6-(methyl-d3)-6,7-dihydro-7,14-methanobenzo[f]benzo[4,5]imidazo[1,2-a][1,4]diazocin-5(14H)-one;

(7R,14R)-1-(difluoromethoxy)-11-(4-(dimethylphosphoryl)-2-fluorophenyl)-6-(methyl-d3)-6,7-dihydro-7,14-methanobenzo[f]benzo[4,5]imidazo[1,2-a][1,4]diazocin-5(14H)-one;

(7R,14R)-1-(difluoromethoxy)-11-(4-(dimethylphosphoryl)-3-fluorophenyl)-10-fluoro-6-(methyl-d3)-6,7-dihydro-7,14-methanobenzo[f]benzo[4,5]imidazo[1,2-a][1,4]diazocin-5(14H)-one;

(7R, 14R)-1-(difluoromethoxy)-11-(4-(dimethylphosphoryl)-3,5-difluorophenyl)-6-(methyl-d3)-6,7-dihydro-7,14-methanobenzo[f]benzo[4,5]imidazo[1,2-a][1,4]diazocin-5(14H)-one;

(7R, 14R)-1-(difluoromethoxy)-11-(4-(dimethylphosphoryl)-2-fluorophenyl)-10-fluoro-6-(methyl-d3)-6,7-dihydro-7,14-methanobenzo[f]benzo[4,5]imidazo[1,2-a][1,4]diazocin-5(14H)-one;

(7R, 14R)-1-(difluoromethoxy)-11-(4-(dimethylphosphoryl)phenyl)-10-fluoro-6-(methyl-d3)-6,7-dihydro-7,14-methanobenzo[f]benzo[4,5]imidazo[1,2-a][1,4]diazocin-5(14H)-one;

(7R,14R)-1-(difluoromethoxy)-11-(4-(dimethylphosphoryl)phenyl)-6-(methyl-d3)-6,7-dihydro-7,14-methanobenzo[f]benzo[4,5]imidazo[1,2-a][1,4]diazocin-5(14H)-one;

(7R, 14R)-1-(difluoromethoxy)-11-(4-(dimethylphosphoryl)-3-fluoro-2-methylphenyl)-6-(methyl-d3)-6,7-dihydro-7,14-methanobenzo[f]benzo[4,5]imidazo[1,2-a][1,4]diazocin-5(14H)-one;

(7R,14R)-1-(difluoromethoxy)-11-(4-(dimethylphosphoryl)-3-fluorophenyl)-9-fluoro-6-(methyl-d3)-6,7-dihydro-7,14-methanobenzo[f]benzo[4,5]imidazo[1,2-a][1,4]diazocin-5(14H)-one; and (7R,14R)-1-(difluoromethoxy)-11-(4-(dimethylphosphoryl)-3-fluorophenyl)-12-fluoro-6-(methyl-d3)-6,7-dihydro-7,14-methanobenzo[f]benzo[4,5]imidazo[1,2-a][1,4]diazocin-5(14H)-one.

2. The compound of claim 1, or pharmaceutically acceptable salt, solvate, deuteroisotope, or N-oxide thereof, wherein the compound is (7R, 14R)-1-(difluoromethoxy)-11-(4-(dimethylphosphoryl)-3-fluorophenyl)-6-(methyl-d3)-6,7-dihydro-7,14-methanobenzo[f]benzo[4,5]imidazo[1,2-a][1,4]diazocin-5(14H)-one.

3. The compound of claim 1, or pharmaceutically acceptable salt, solvate, deuteroisotope, or N-oxide thereof, wherein the compound is (7R, 14R)-1-(difluoromethoxy)-11-(4-(dimethylphosphoryl)-2-fluorophenyl)-6-(methyl-d3)-6,7-dihydro-7,14-methanobenzo[f]benzo[4,5]imidazo[1,2-a][1,4]diazocin-5(14H)-one.

4. The compound of claim 1, or pharmaceutically acceptable salt, solvate, deuteroisotope, or N-oxide thereof, wherein the compound is (7R, 14R)-1-(difluoromethoxy)-11-(4-(dimethylphosphoryl)-3-fluorophenyl)-10-fluoro-6-(methyl-d3)-6,7-dihydro-7,14-methanobenzo[f]benzo[4,5]imidazo[1,2-a][1,4]diazocin-5(14H)-one.

5. The compound of claim 1, or pharmaceutically acceptable salt, solvate, deuteroisotope, or N-oxide thereof, wherein the compound is (7R, 14R)-1-(difluoromethoxy)-11-(4-(dimethylphosphoryl)-3,5-difluorophenyl)-6-(methyl-d3)-6,7-dihydro-7,14-methanobenzo[f]benzo[4,5]imidazo[1,2-a][1,4]diazocin-5(14H)-one.

6. The compound of claim 1, or pharmaceutically acceptable salt, solvate, deuteroisotope, or N-oxide thereof, wherein the compound is (7R, 14R)-1-(difluoromethoxy)-11-(4-(dimethylphosphoryl)-2-fluorophenyl)-10-fluoro-6-(methyl-d3)-6,7-dihydro-7,14-methanobenzo[f]benzo[4,5]imidazo[1,2-a][1,4]diazocin-5(14H)-one.

7. The compound of claim 1, or pharmaceutically acceptable salt, solvate, deuteroisotope, or N-oxide thereof, wherein the compound is (7R, 14R)-1-(difluoromethoxy)-11-(4-(dimethylphosphoryl)phenyl)-10-fluoro-6-(methyl-d3)-6,7-dihydro-7,14-methanobenzo[f]benzo[4,5]imidazo[1,2-a][1,4]diazocin-5(14H)-one.

8. The compound of claim 1, or pharmaceutically acceptable salt, solvate, deuteroisotope, or N-oxide thereof, wherein the compound is (7R, 14R)-1-(difluoromethoxy)-11-(4-(dimethylphosphoryl)phenyl)-6-(methyl-d3)-6,7-dihydro-7,14-methanobenzo[f]benzo[4,5]imidazo[1,2-a][1,4]diazocin-5(14H)-one.

9. The compound of claim 1, or pharmaceutically acceptable salt, solvate, deuteroisotope, or N-oxide thereof, wherein the compound is (7R,14R)-1-(difluoromethoxy)-11-(4-(dimethylphosphoryl)-3-fluoro-2-methylphenyl)-6-(methyl-d3)-6,7-dihydro-7,14-methanobenzo[f]benzo[4,5]imidazo[1,2-a][1,4]diazocin-5(14H)-one.

10. The compound of claim 1, or pharmaceutically acceptable salt, solvate, deuteroisotope, or N-oxide thereof, wherein the compound is (7R, 14R)-1-(difluoromethoxy)-11-(4-(dimethylphosphoryl)-3-fluorophenyl)-9-fluoro-6-(methyl-d3)-6,7-dihydro-7,14-methanobenzo[f]benzo[4,5]imidazo[1,2-a][1,4]diazocin-5(14H)-one.

11. The compound of claim 1, or pharmaceutically acceptable salt, solvate, deuteroisotope, or N-oxide thereof, wherein the compound is (7R, 14R)-1-(difluoromethoxy)-11-(4-(dimethylphosphoryl)-3-fluorophenyl)-12-fluoro-6-(methyl-d3)-6,7-dihydro-7,14-methanobenzo[f]benzo[4,5]imidazo[1,2-a][1,4]diazocin-5(14H)-one.

12. A pharmaceutical composition comprising at least one pharmaceutically acceptable excipient and a compound, or pharmaceutically acceptable salt, solvate, deuteroisotope, or N-oxide thereof, selected from the group consisting of:

(7R,14R)-1-(difluoromethoxy)-11-(4-(dimethylphosphoryl)-3-fluorophenyl)-6-(methyl-d3)-6,7-dihydro-7,14-methanobenzo[f]benzo[4,5]imidazo[1,2-a][1,4]diazocin-5(14H)-one;

(7R, 14R)-1-(difluoromethoxy)-11-(4-(dimethylphosphoryl)-2-fluorophenyl)-6-(methyl-d3)-6,7-dihydro-7,14-methanobenzo[f]benzo[4,5]imidazo[1,2-a][1,4]diazocin-5(14H)-one;

(7R, 14R)-1-(difluoromethoxy)-11-(4-(dimethylphosphoryl)-3-fluorophenyl)-10-fluoro-6-(methyl-d3)-6,7-dihydro-7,14-methanobenzo[f]benzo[4,5]imidazo[1,2-a][1,4]diazocin-5(14H)-one;

(7R, 14R)-1-(difluoromethoxy)-11-(4-(dimethylphosphoryl)-3,5-difluorophenyl)-6-(methyl-d3)-6,7-dihydro-7,14-methanobenzo[f]benzo[4,5]imidazo[1,2-a][1,4]diazocin-5(14H)-one;

(7R, 14R)-1-(difluoromethoxy)-11-(4-(dimethylphosphoryl)-2-fluorophenyl)-10-fluoro-6-(methyl-d3)-6,7-dihydro-7,14-methanobenzo[f]benzo[4,5]imidazo[1,2-a][1,4]diazocin-5(14H)-one;

(7R, 14R)-1-(difluoromethoxy)-11-(4-(dimethylphosphoryl)phenyl)-10-fluoro-6-(methyl-d3)-6,7-dihydro-7,14-methanobenzo[f]benzo[4,5]imidazo[1,2-a][1,4]diazocin-5(14H)-one;

(7R, 14R)-1-(difluoromethoxy)-11-(4-(dimethylphosphoryl)phenyl)-6-(methyl-d3)-6,7-dihydro-7,14-methanobenzo[f]benzo[4,5]imidazo[1,2-a][1,4]diazocin-5(14H)-one;

(7R, 14R)-1-(difluoromethoxy)-11-(4-(dimethylphosphoryl)-3-fluoro-2-methylphenyl)-6-(methyl-d3)-6,7-dihydro-7,14-methanobenzo[f]benzo[4,5]imidazo[1,2-a][1,4]diazocin-5(14H)-one;

(7R, 14R)-1-(difluoromethoxy)-11-(4-(dimethylphosphoryl)-3-fluorophenyl)-9-fluoro-6-(methyl-d3)-6,7-dihydro-7,14-methanobenzo[f]benzo[4,5]imidazo[1,2-a][1,4]diazocin-5(14H)-one; and (7R,14R)-1-(difluoromethoxy)-11-(4-(dimethylphosphoryl)-3-fluorophenyl)-12-fluoro-6-(methyl-d3)-6,7-dihydro-7,14-methanobenzo[f]benzo[4,5]imidazo[1,2-a][1,4]diazocin-5(14H)-one.

13. The pharmaceutical composition of claim 12, or pharmaceutically acceptable salt, solvate, deuteroisotope, or N-oxide thereof, wherein the compound is (7R, 14R)-1-(difluoromethoxy)-11-(4-(dimethylphosphoryl)-3-fluorophenyl)-6-(methyl-d3)-6,7-dihydro-7,14-methanobenzo[f]benzo[4,5]imidazo[1,2-a][1,4]diazocin-5(14H)-one.

14. The pharmaceutical composition of claim 12, or pharmaceutically acceptable salt, solvate, deuteroisotope, or N-oxide thereof, wherein the compound is (7R, 14R)-1-(difluoromethoxy)-11-(4-(dimethylphosphoryl)-2-fluorophenyl)-6-(methyl-d3)-6,7-dihydro-7,14-methanobenzo[f]benzo[4,5]imidazo[1,2-a][1,4]diazocin-5(14H)-one.

15. The pharmaceutical composition of claim 12, or pharmaceutically acceptable salt, solvate, deuteroisotope, or N-oxide thereof, wherein the compound is (7R, 14R)-1-(difluoromethoxy)-11-(4-(dimethylphosphoryl)-3-fluorophenyl)-10-fluoro-6-(methyl-d3)-6,7-dihydro-7,14-methanobenzo[f]benzo[4,5]imidazo[1,2-a][1,4]diazocin-5(14H)-one.

16. The pharmaceutical composition of claim 12, or pharmaceutically acceptable salt, solvate, deuteroisotope, or N-oxide thereof, wherein the compound is (7R, 14R)-1-(difluoromethoxy)-11-(4-(dimethylphosphoryl)-3,5-difluorophenyl)-6-(methyl-d3)-6,7-dihydro-7,14-methanobenzo[f]benzo[4,5]imidazo[1,2-a][1,4]diazocin-5(14H)-one.

17. The pharmaceutical composition of claim 12, or pharmaceutically acceptable salt, solvate, deuteroisotope, or N-oxide thereof, wherein the compound is (7R, 14R)-1-(difluoromethoxy)-11-(4-(dimethylphosphoryl)-2-fluorophenyl)-10-fluoro-6-(methyl-d3)-6,7-dihydro-7,14-methanobenzo[f]benzo[4,5]imidazo[1,2-a][1,4]diazocin-5(14H)-one.

18. The pharmaceutical composition of claim 12, or pharmaceutically acceptable salt, solvate, deuteroisotope, or N-oxide thereof, wherein the compound is (7R, 14R)-1-(difluoromethoxy)-11-(4-(dimethylphosphoryl)phenyl)-10-fluoro-6-(methyl-d3)-6,7-dihydro-7,14-methanobenzo[f]benzo[4,5]imidazo[1,2-a][1,4]diazocin-5(14H)-one.

19. The pharmaceutical composition of claim 12, or pharmaceutically acceptable salt, solvate, deuteroisotope, or N-oxide thereof, wherein the compound is (7R, 14R)-1-(difluoromethoxy)-11-(4-(dimethylphosphoryl)phenyl)-6-(methyl-d3)-6,7-dihydro-7,14-methanobenzo[f]benzo[4,5]imidazo[1,2-a][1,4]diazocin-5(14H)-one.

20. The pharmaceutical composition of claim 12, or pharmaceutically acceptable salt, solvate, deuteroisotope, or N-oxide thereof, wherein the compound is (7R, 14R)-1-(difluoromethoxy)-11-(4-(dimethylphosphoryl)-3-fluoro-2-methylphenyl)-6-(methyl-d3)-6,7-dihydro-7,14-methanobenzo[f]benzo[4,5]imidazo[1,2-a][1,4]diazocin-5(14H)-one.

21. The pharmaceutical composition of claim 12, or pharmaceutically acceptable salt, solvate, deuteroisotope, or N-oxide thereof, wherein the compound is (7R, 14R)-1-(difluoromethoxy)-11-(4-(dimethylphosphoryl)-3-fluorophenyl)-9-fluoro-6-(methyl-d3)-6,7-dihydro-7,14-methanobenzo[f]benzo[4,5]imidazo[1,2-a][1,4]diazocin-5(14H)-one.

22. The pharmaceutical composition of claim 12, or pharmaceutically acceptable salt, solvate, deuteroisotope, or N-oxide thereof, wherein the compound is (7R, 14R)-1-(difluoromethoxy)-11-(4-(dimethylphosphoryl)-3-fluorophenyl)-12-fluoro-6-(methyl-d3)-6,7-dihydro-7,14-methanobenzo[f]benzo[4,5]imidazo[1,2-a][1,4]diazocin-5(14H)-one.

* * * * *